US006091893A

United States Patent [19]
Fintel et al.

[11] Patent Number: 6,091,893
[45] Date of Patent: Jul. 18, 2000

[54] METHOD FOR PERFORMING OPERATIONS ON INFORMATIONAL OBJECTS BY VISUALLY APPLYING THE PROCESSES DEFINED IN UTILITY OBJECTS IN AN IT (INFORMATION TECHNOLOGY) ARCHITECTURE VISUAL MODEL

[75] Inventors: Robert P. Fintel, Centerville, Ohio; Julian C. Hope, Jar, Norway; Dag Karlsen, Horten, Norway; Laila Rabe Osnes, Toensberg, Norway

[73] Assignee: NCR Corporation, Dayton, Ohio

[21] Appl. No.: 08/814,181

[22] Filed: Mar. 10, 1997

[51] Int. Cl.[7] ........................................................ G06F 17/50
[52] U.S. Cl. ............................................................. 395/500.27
[58] Field of Search ......................... 364/578; 395/500.27

[56] References Cited

U.S. PATENT DOCUMENTS

| | | |
|---|---|---|
| 4,914,568 | 4/1990 | Kodosky et al. . |
| 5,019,961 | 5/1991 | Addesso et al. . |
| 5,355,472 | 10/1994 | Lewis . |
| 5,432,903 | 7/1995 | Frid-Nielsen . |
| 5,481,740 | 1/1996 | Kodosky . |
| 5,528,735 | 6/1996 | Strasnick et al. . |
| 5,535,325 | 7/1996 | Cattell et al. . |
| 5,603,025 | 2/1997 | Tabb et al. . |
| 5,671,427 | 9/1997 | Nishimura . |
| 5,694,594 | 12/1997 | Chang . |
| 5,727,175 | 3/1998 | Malone et al. . |
| 5,740,444 | 4/1998 | Frid-Nielsen . |
| 5,752,245 | 5/1998 | Parrish et al. . |
| 5,790,116 | 8/1998 | Malone et al. . |
| 5,838,973 | 11/1998 | Carpenter-Smith et al. ........... 395/701 |

OTHER PUBLICATIONS

Rumbaugh et al., Object–Oriented Modeling and Design, Prentice Hall, 1990.
Hill, Object–Oriented Analysis and Simulation, Addison–Wesley, 1996. Booch, Object–Oriented Analysis and Design, Benjamin/Cummings, 1994.
Rational Rose, Software by Rational Software Corporation, 1996.
Paajanen et al.: Adding Value to the Strategy Process using Object–Oriented Modeling and Software Support: Theoretical Background and Practical Results; IEEE: Proc. 25th Hawaii Inter. Conf. System Science; pp. 176–185, Jan. 1992.
Rohloff, "Reference Model and Object Oriented Approach for Business Process Design and Workflow Management", pp. 43–52, IEEE Information Systems Conference of New Zealand.
Product information regarding "IE: Advantage V.6.1.4" appearing in "Computer Select".
Product information regarding "Visual Advantage", http://www.visible.com.
Czejdo, "Design and Implementation of an ER Query and Update Interface", IEEE, pp. 325–334.
Czejdo et al., "A Graphical Data Manipulation Language for an Extended Entity–Relationship Model", IEEE, pp. 26–36.
Dudley, "A Visual Interface to a Conceptual Data Modelling Tool", IEEE, pp. 30–37.
Burns et al., "A Graphical Entity Relationship Database Browser", IEEE, pp. 694–704.
Staes et al., "A Graphical Query Language for Object Oriented Databases", IEEE, pp. 205–210.
Czejdo et al., "Design and Implementation of an Interactive Graphical Query Interface for a Relational Database Management Systems", IEEE, pp. 14–20.

Primary Examiner—Kevin J. Teska
Assistant Examiner—Hugh Jones
Attorney, Agent, or Firm—Ying Tuo; Kenneth M. Berner

[57] ABSTRACT

A computer implemented method of building an architecture visual model is disclosed. A plurality of architecture visual components are created each having a container. Each container includes a plurality of objects. Each of the objects are of a particular type. Each type of object has operations associated therewith for intra-container relationships and inter-container relationships. Each object is linked to at least another object in the same or another container and each object inherits properties from linked objects depending upon the operations associated with the linked objects. At least a portion of the architecture visual model is displayed which includes visual objects and linkages.

23 Claims, 207 Drawing Sheets

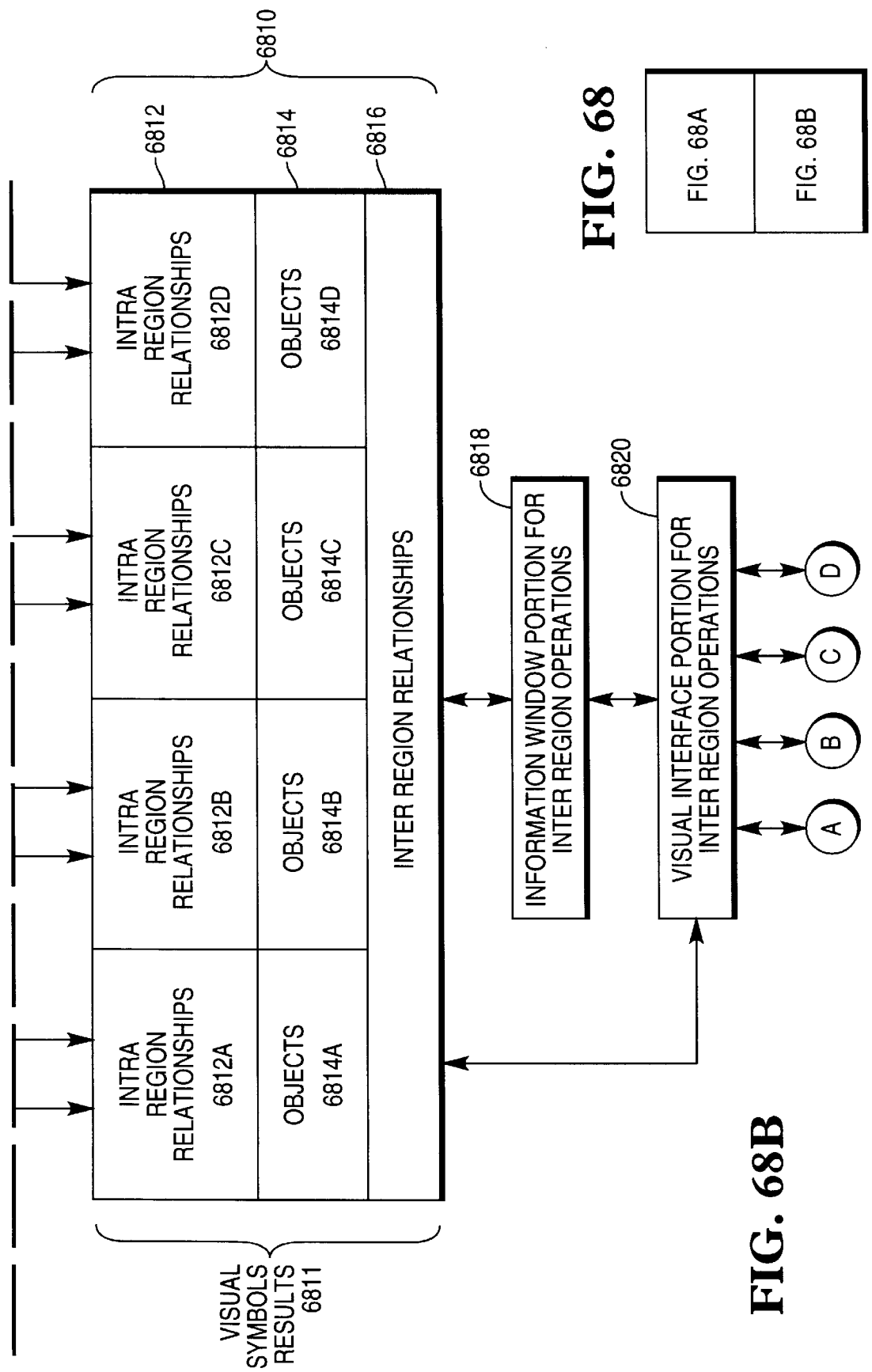

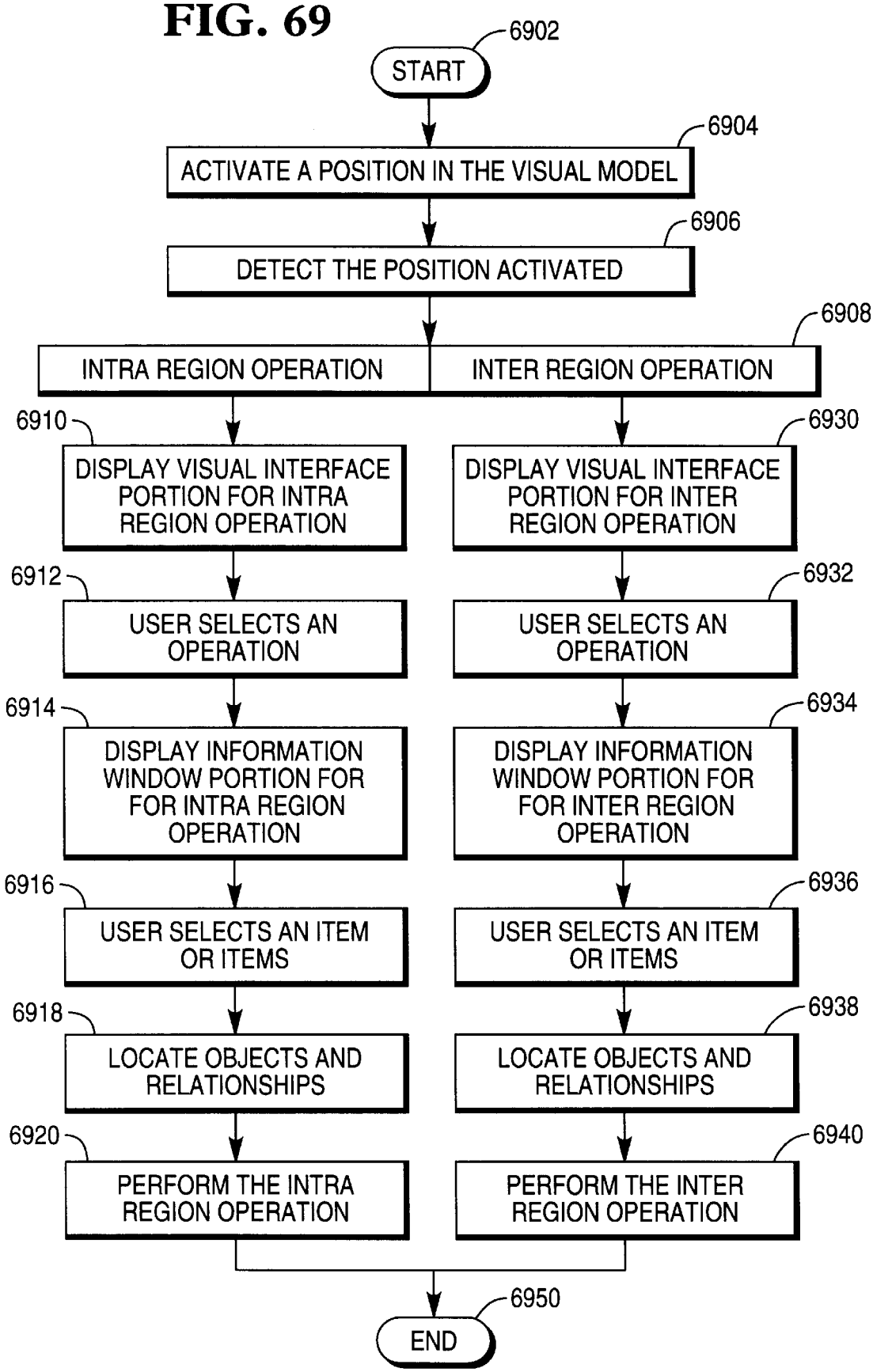

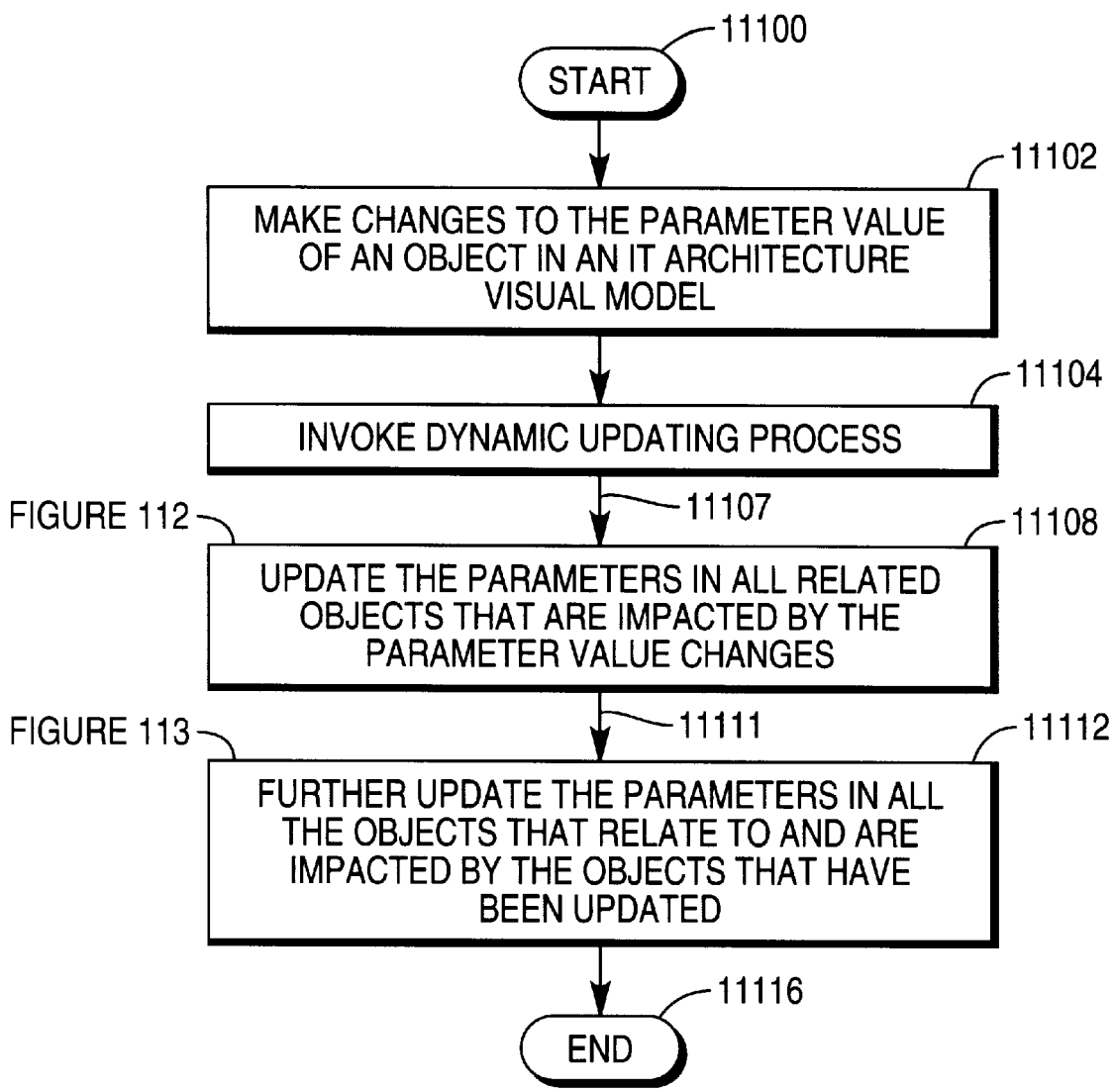

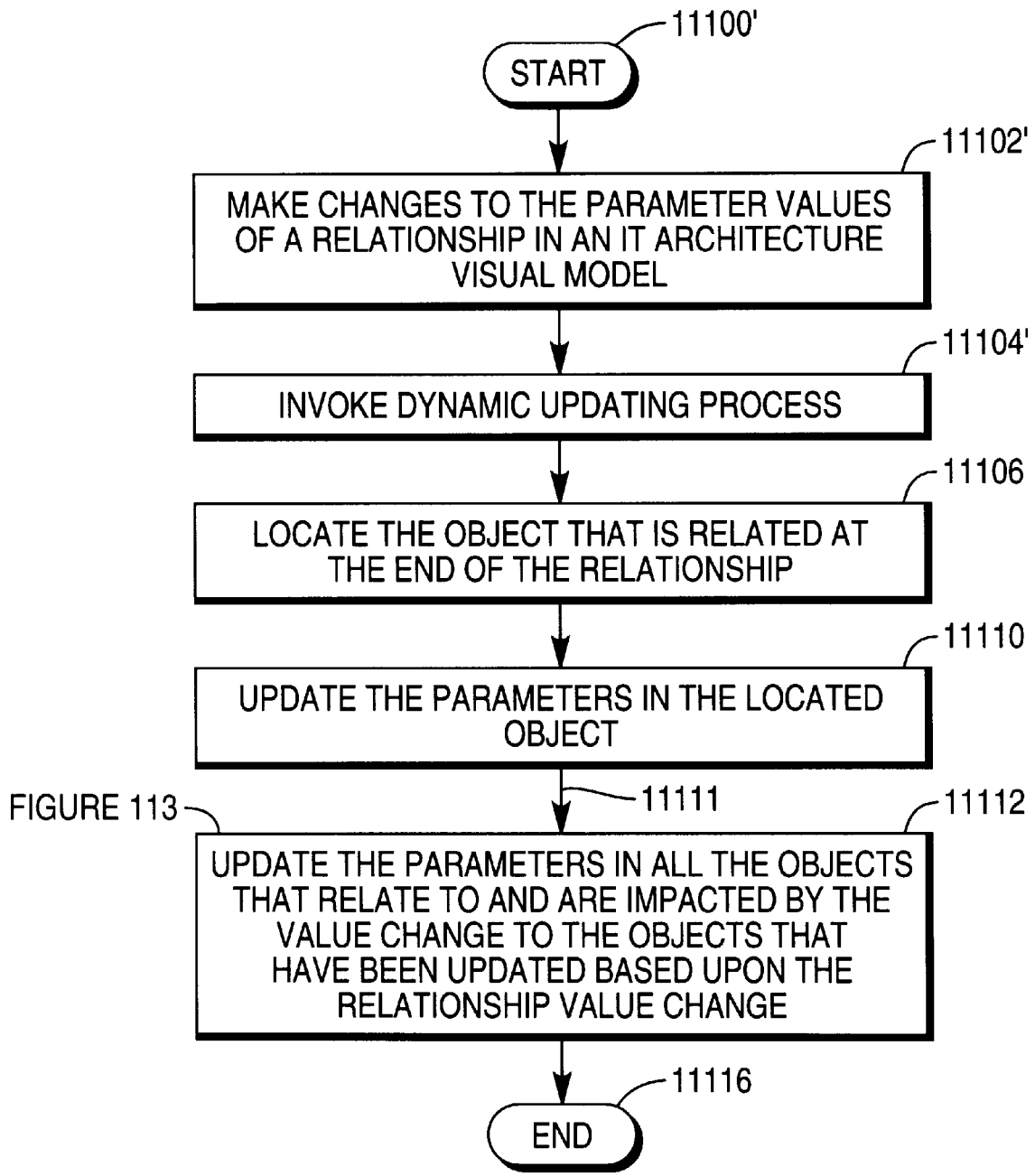

METHOD FOR PERFORMING OPERATIONS ON INFORMATIONAL OBJECTS BY VISUALLY APPLYING THE PROCESSES DEFINED IN UTILITY OBJECTS IN AN IT (INFORMATION TECHNOLOGY) ARCHITECTURE VISUAL MODEL

The present application is related to Ser. No. 08/814,179 filed Mar. 10, 1997, now abandoned; Ser. No. 08/812,889 filed Mar. 10, 1997, now abandoned; Ser. No. 08/814,493 filed Mar. 10, 1997, now abandoned; Ser. No. 08/814,180 filed Mar. 10, 1997, now abandoned; Ser. No. 08/815,408 filed Mar. 10, 1997, now abandoned; Ser. No. 08/914,747 filed Aug. 19, 1997, pending; Ser. No. 08/914,415 filed Aug. 19, 1997, pending; Ser. No. 08/914,559 filed Aug. 19, 1997, pending; Ser. No. 08/914,562 filed Aug. 19, 1997, pending; Ser. No. 08/914,542 filed Aug. 19, 1997, pending; and Ser. No. 08/815,409 filed Mar. 10, 1997; pending, which are incorporated into the present application by reference.

BACKGROUND OF THE INVENTION

The present invention relates generally to a method for planning and designing object-oriented systems, and more specifically, to a method for planning and designing IT (Information Technology) strategies and architecture plans based on which an Information Technology infrastructure can be built.

With the development of the modern technologies prevalent in today's IT infrastructures—such as client/server systems, data warehouses, massively parallel systems and highly distributed networking, it is well acknowledged that Information Technology (IT) can help an enterprise manage its operational business environments, delight customers, predict customers' future needs, increase market shares, and enhance profits. Information Technology can also enable an enterprise to better use its resources and improve coordination among different organizations within the enterprise, thus improving its efficiency and competitiveness.

Information Technology (IT) infrastructures are the platform on which IT-enabled business systems can be implemented. However, designing and building a high quality IT infrastructure solution for an enterprise is a complex task, because it involves business knowledge about the industry in which the enterprise operates, the organizational and operational knowledge of that enterprise, and the technology knowledge to build the IT infrastructure. An infrastructure solution design may involve an evolving decision process from various parties, including executive officers, managers, IT system users, designers, and builders.

To cope with the complexity of an IT infrastructure solution, an IT architecture plays a role to break down a complex task into smaller and simpler components, and allows the various parties to view the IT infrastructure solution with different perspectives and objectives. Based on a business-aligned IT architecture, an IT architecture consultant can develop IT strategy and plan deliverables for an enterprise. Based on the IT strategy architecture planning deliverables for the enterprise, the various parties, including executive officers, managers, users, designers, and builders, can analyze the investment, risk, feasibility, effort, etc. An IT architecture visual model (which is created by a graphical-based or symbol-based tool) is very effective to present an IT architecture deliverable.

Frequently, an IT visual model can have thousands of objects with complex relationships among these objects. In addition, these objects and relationships are visually built and arranged in a format that is suitable to the processes defined by a methodology.

Therefore, there is a need to provide a method for operating on these objects and relationships with efficiency and convenience in a manner consistent with the operation of the IT architecture visual model.

Therefore, there is another need to provide a method for operating on these objects without imposing any or undue changes on the format and the methodology.

The present invention provides such a method to meet these needs.

SUMMARY OF THE INVENTION

In one aspect, the invention provides a method for building an architecture visual model in accordance with a methodology. The method comprising the steps of:

(a) in the architecture visual model, establishing first type of objects for recording information and relationships associated with said first type of objects in accordance with said architecture methodology; and (b) in the architecture visual model, establishing second type of objects for defining operations on said first type of objects.

The features and advantages of the present invention will become apparent from the following description and accompanying drawings.

BRIEF DESCRIPTION OF THE DRAWINGS

The purpose and advantages of the present invention will be apparent to those skilled in the art from the following detailed description in conjunction with the appended drawings, in which:

I. Visually encapsulating multiple IT (Information Technology) planning methodologies

FIG. 69 shows a flowchart illustrating the process of performing operations on the objects and relationships of the results 6810 (shown in FIG. 68) within the IT architecture visual model;

II. Navigating an IT (Information Technology) architecture visual model

Figure 70:
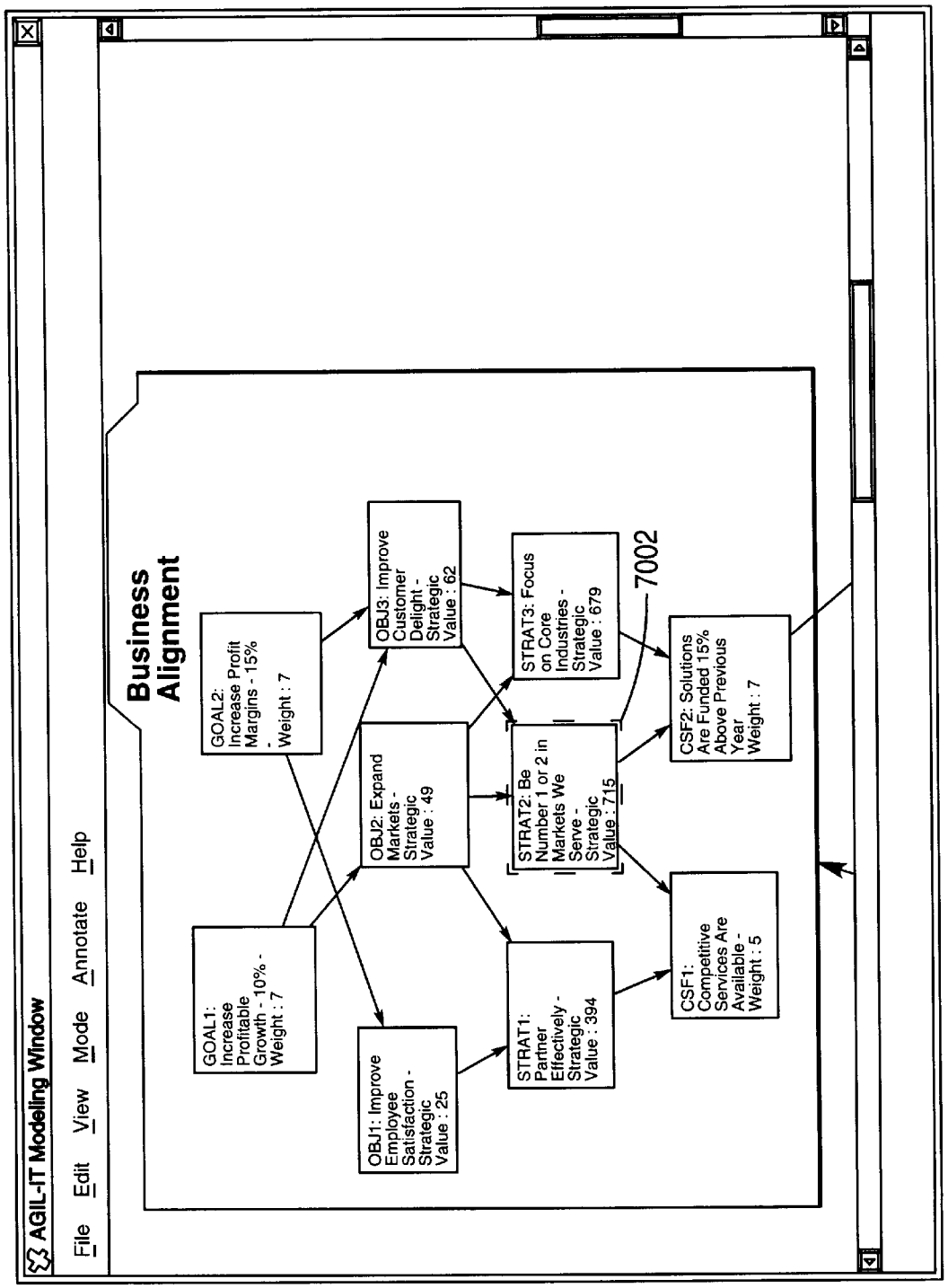
Figure 71:
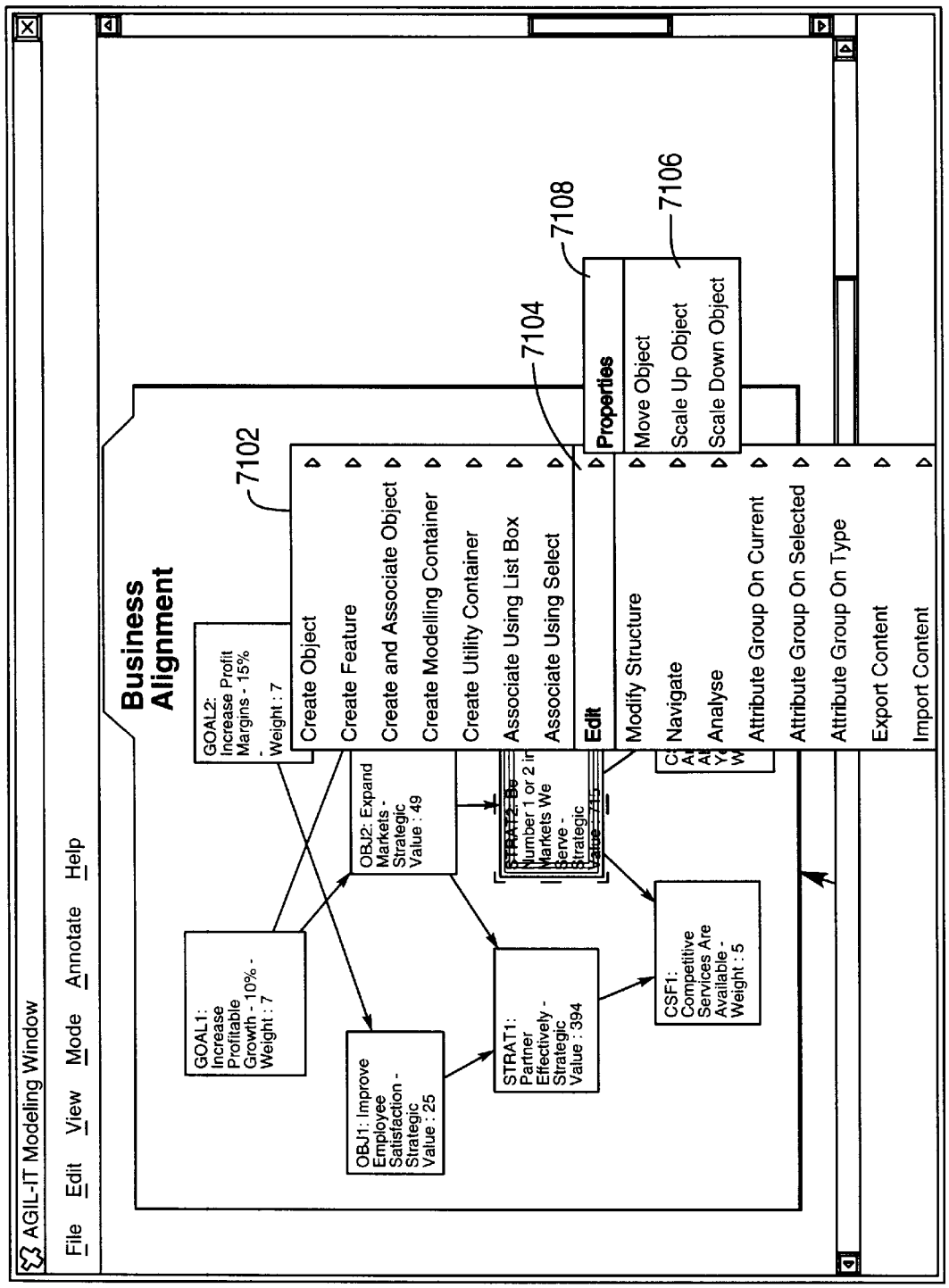
Figure 72:
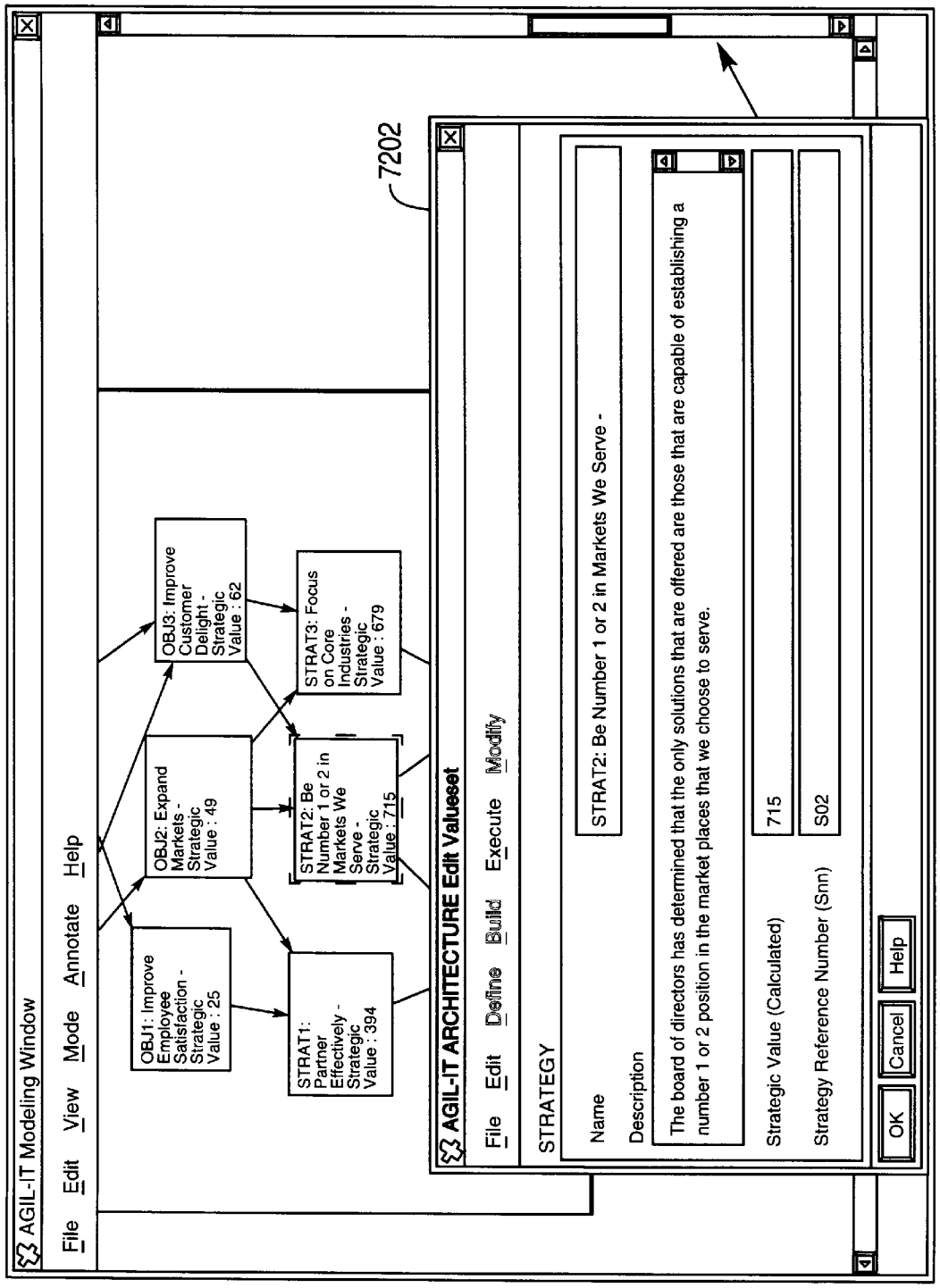
Figure 73:
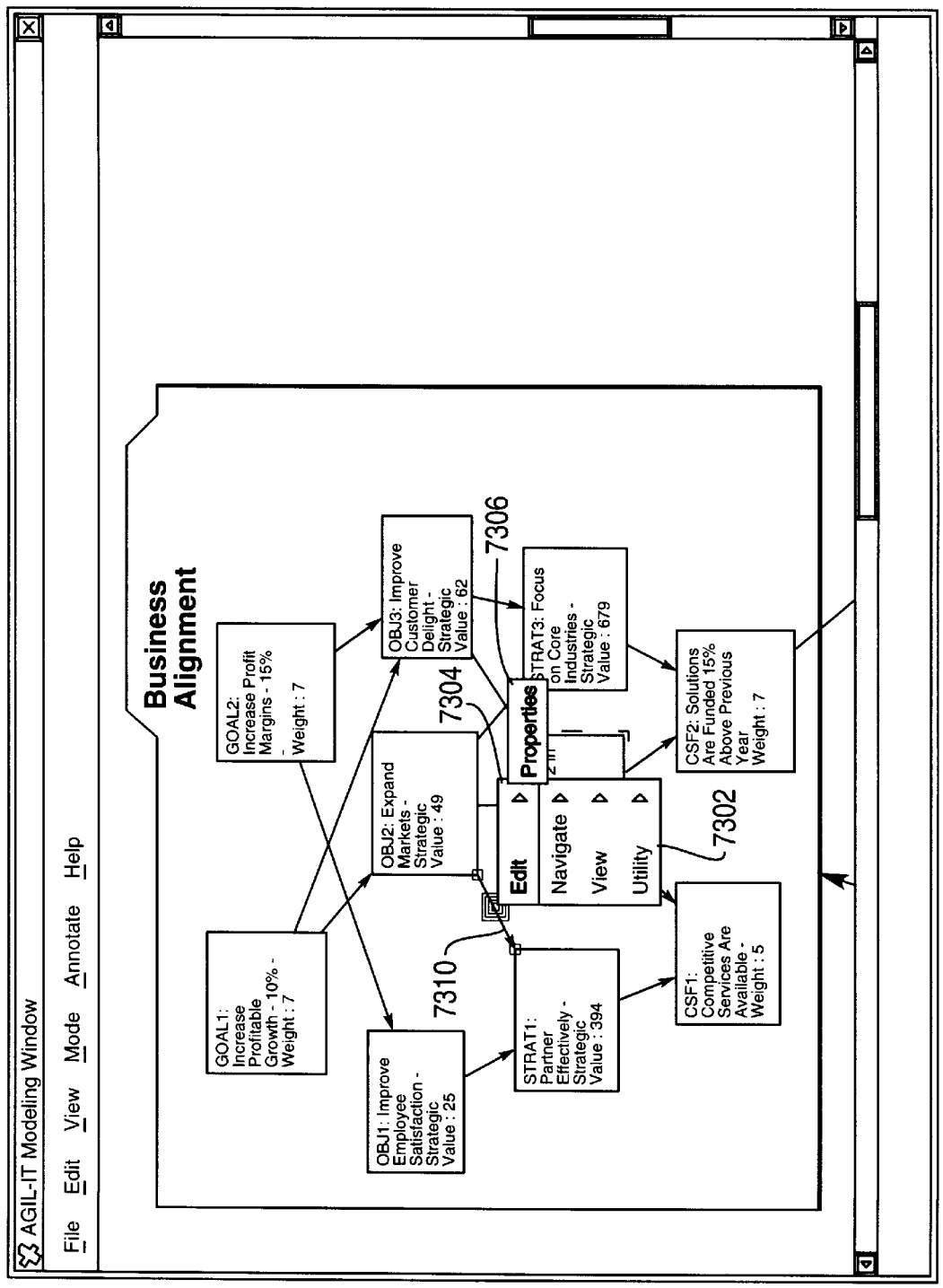
Figure 74:
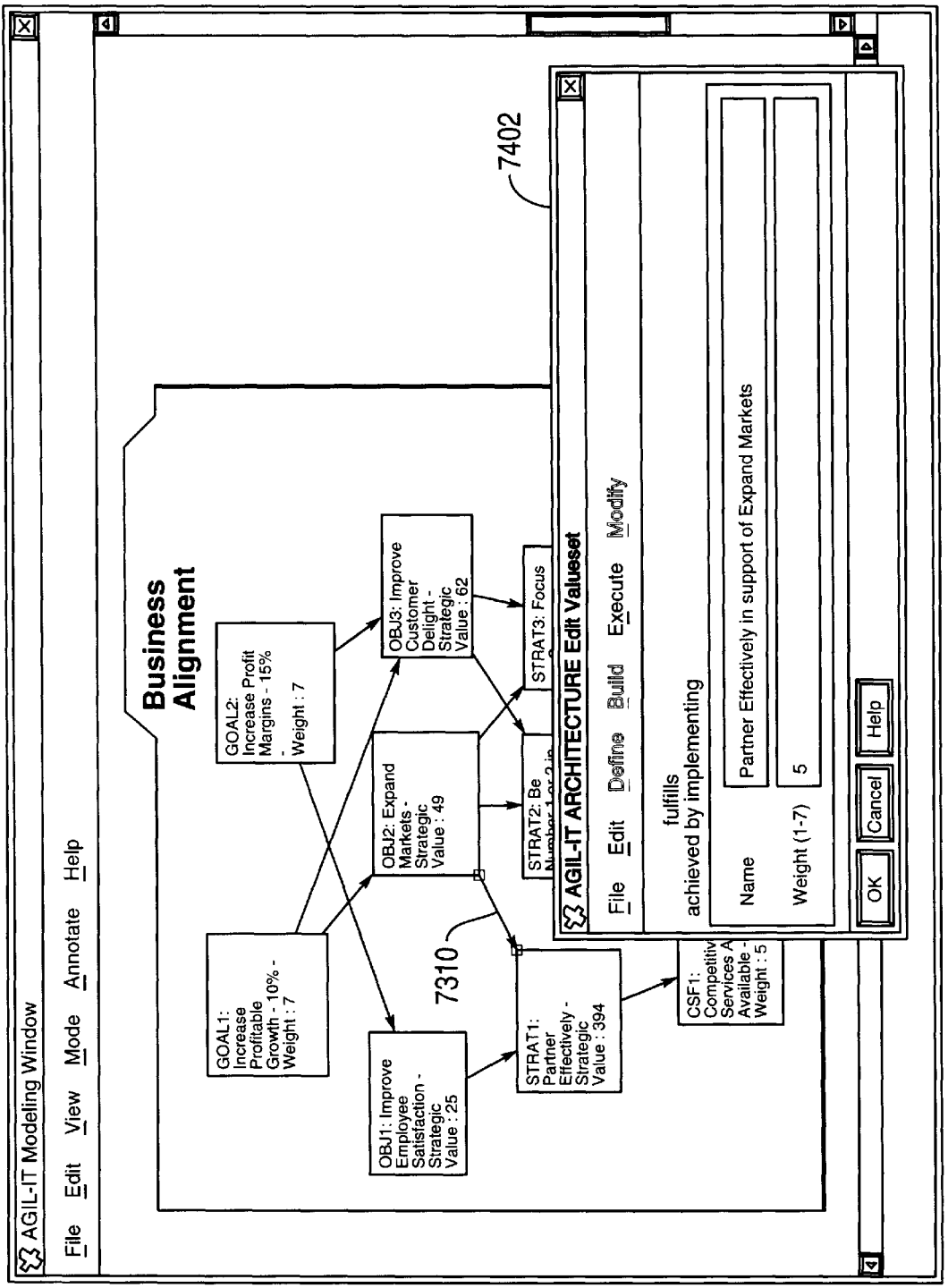
Figure 88:
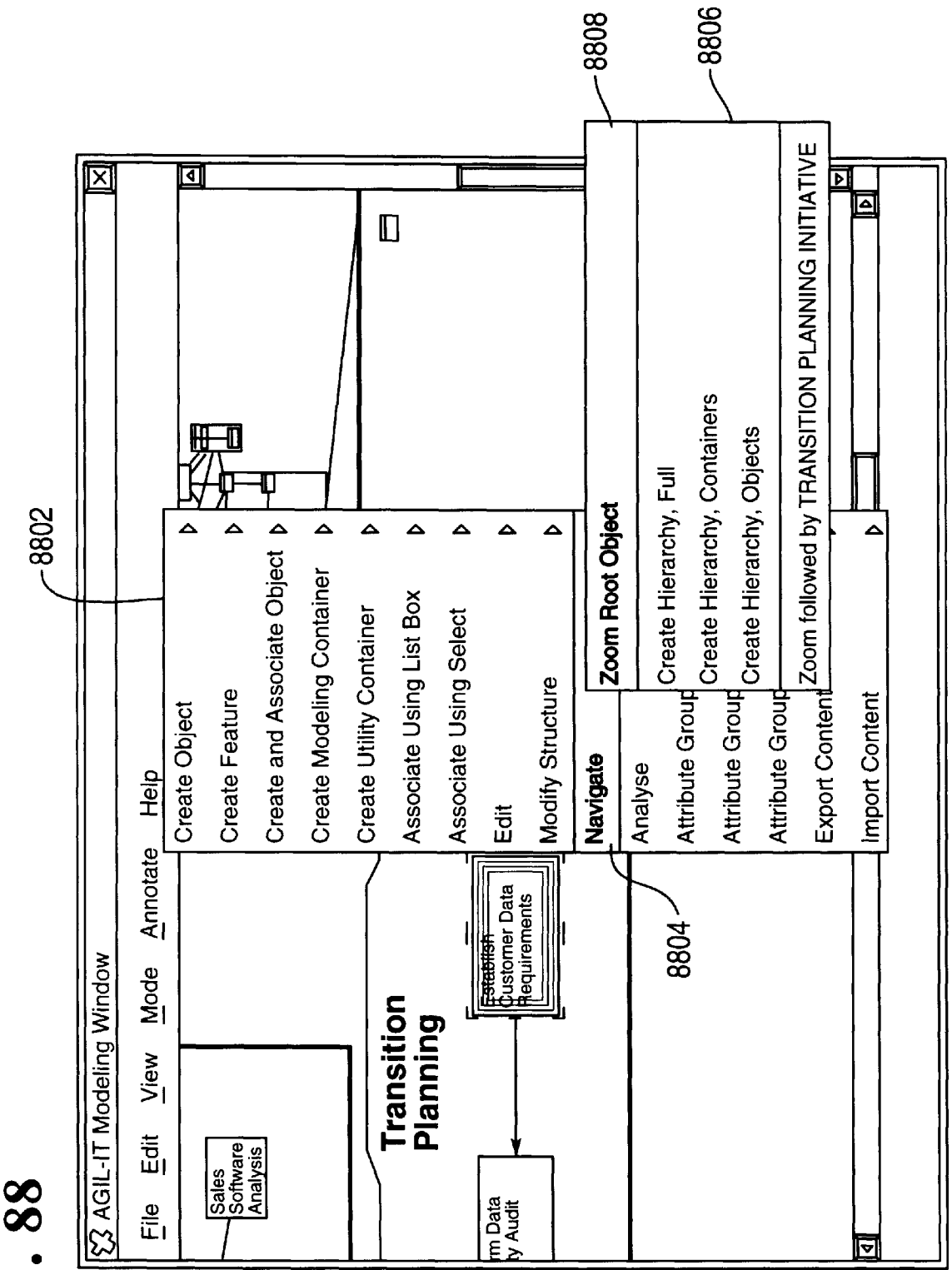
Figure 89:
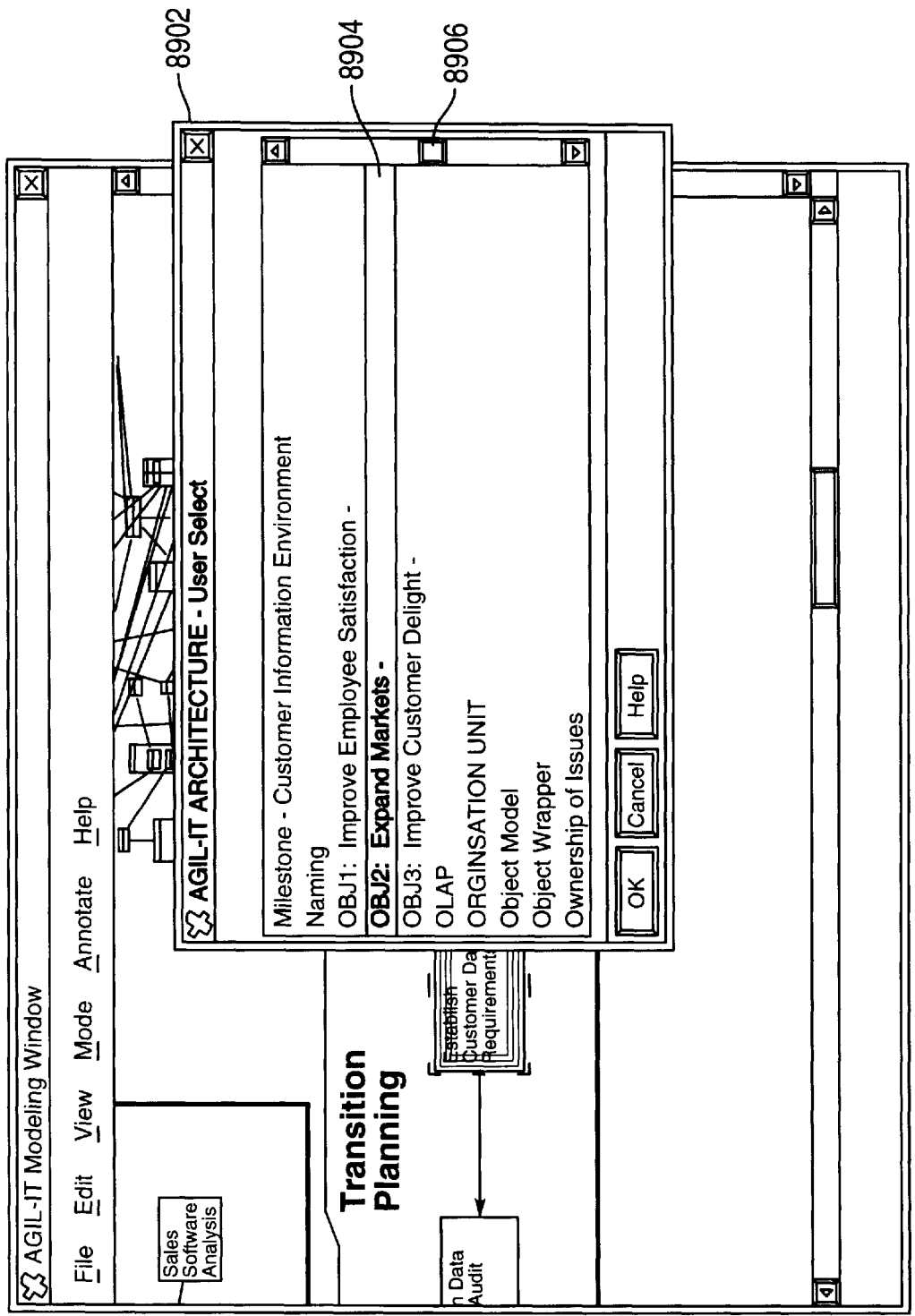
Figure 90:
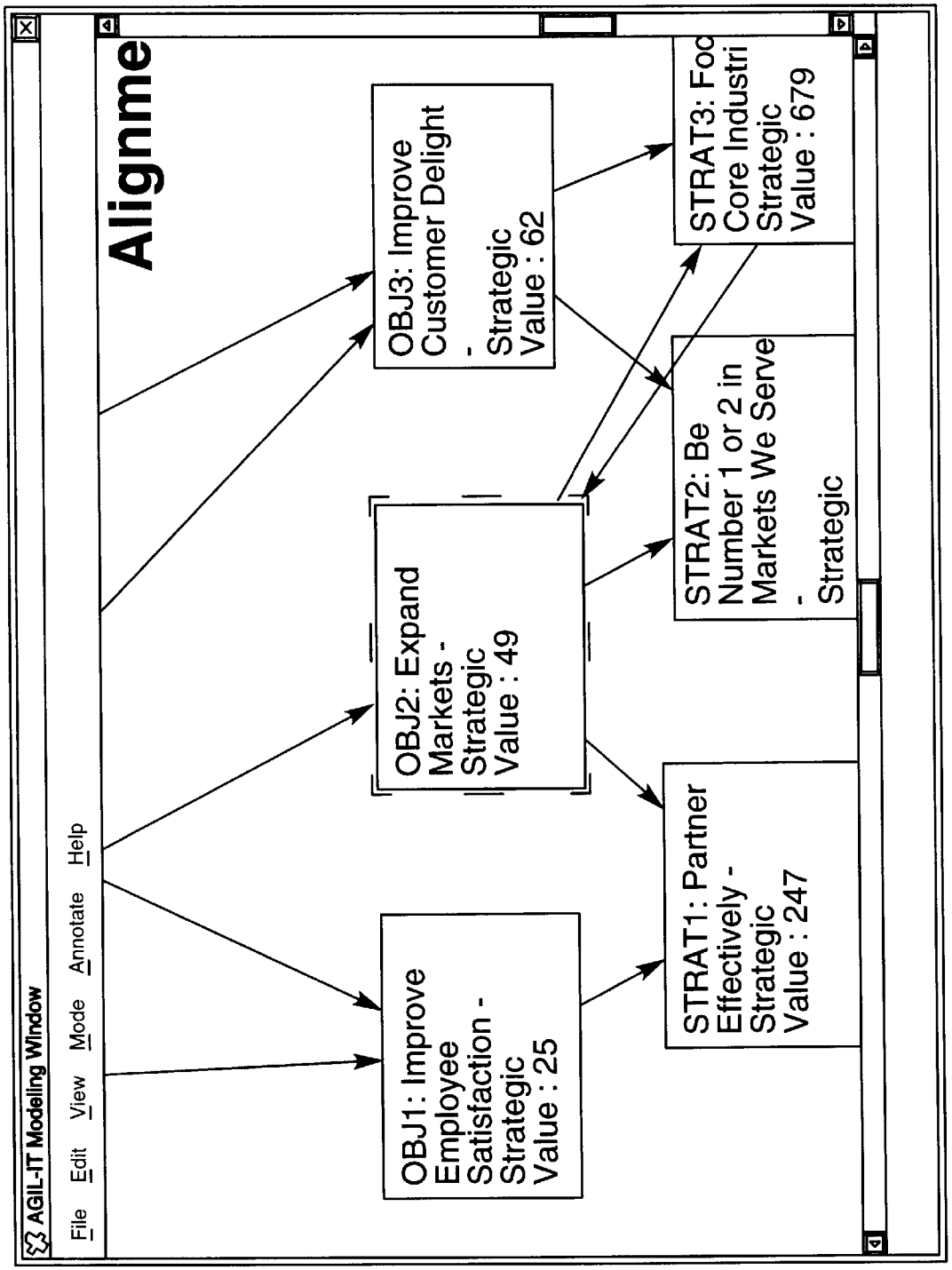
Figure 95:
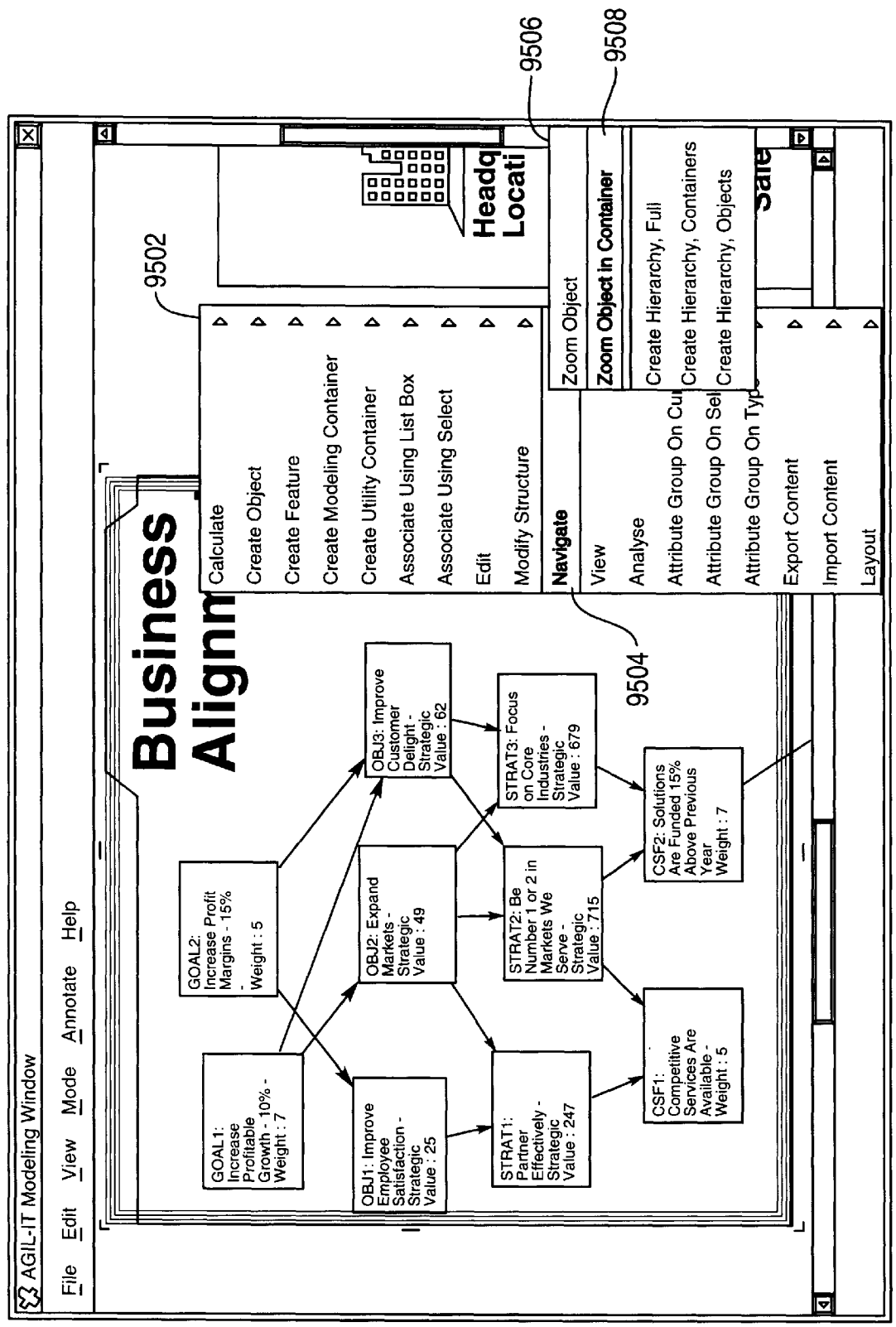
Figure 96:
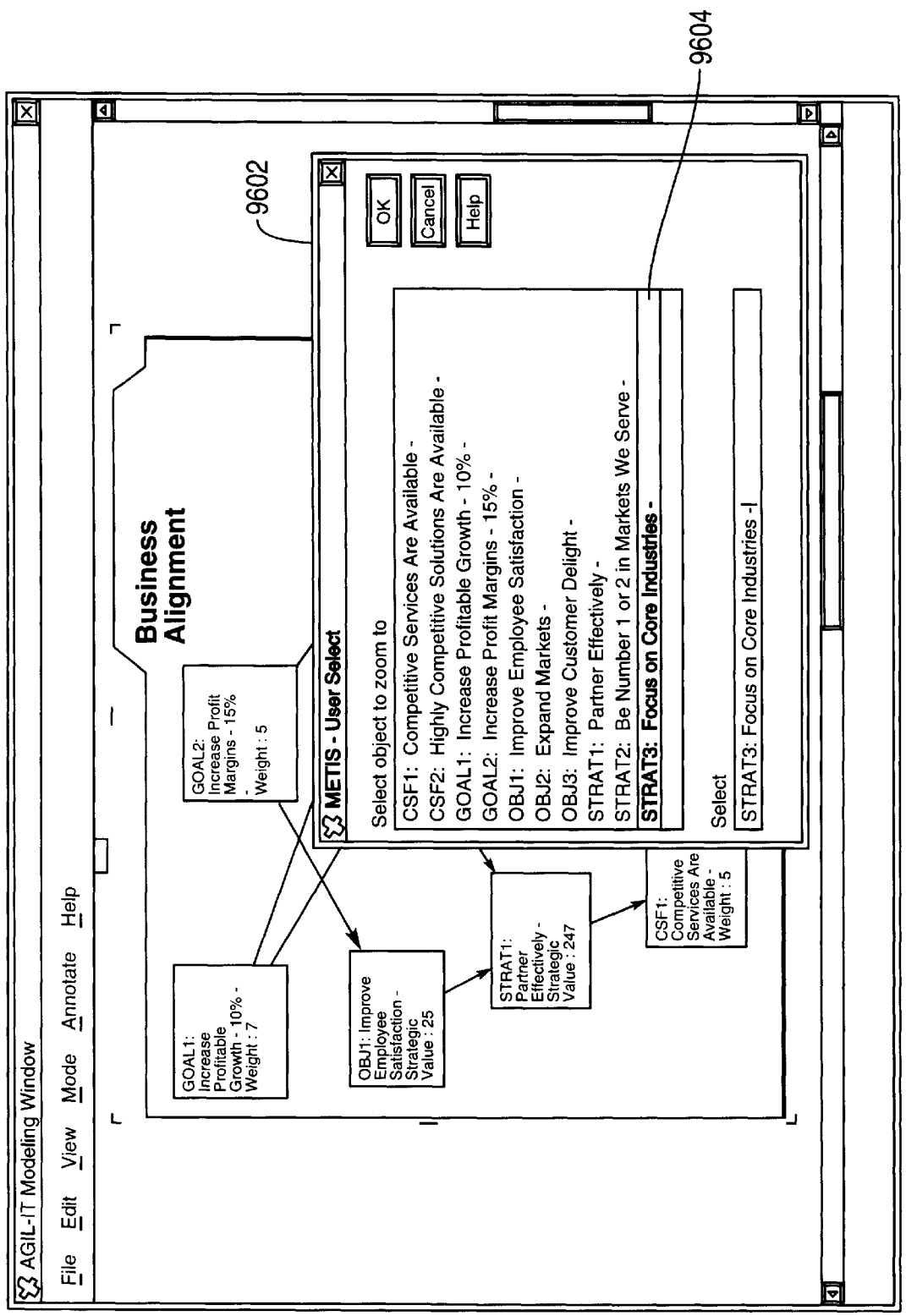
Figure 97:
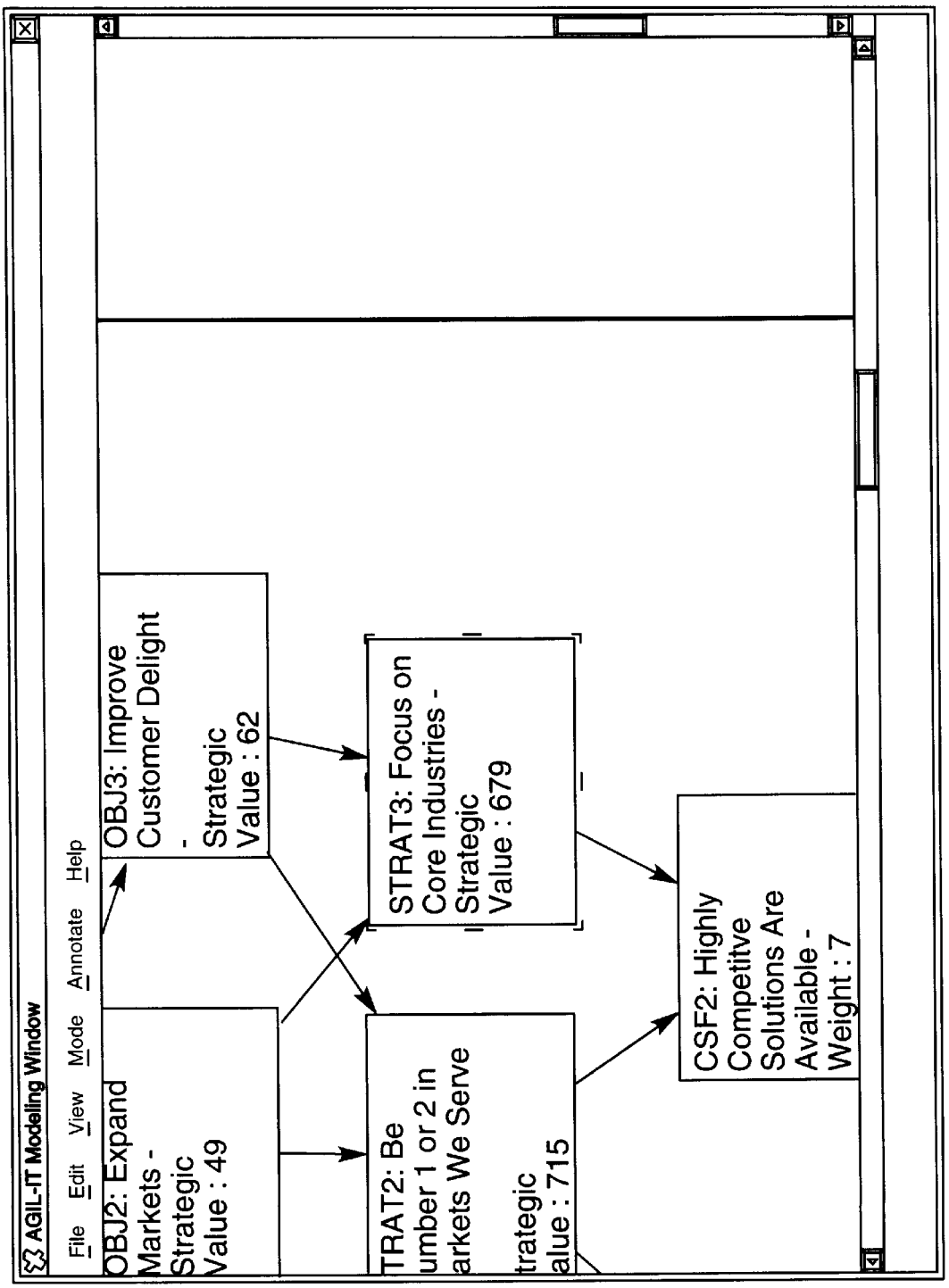
Figure 112:
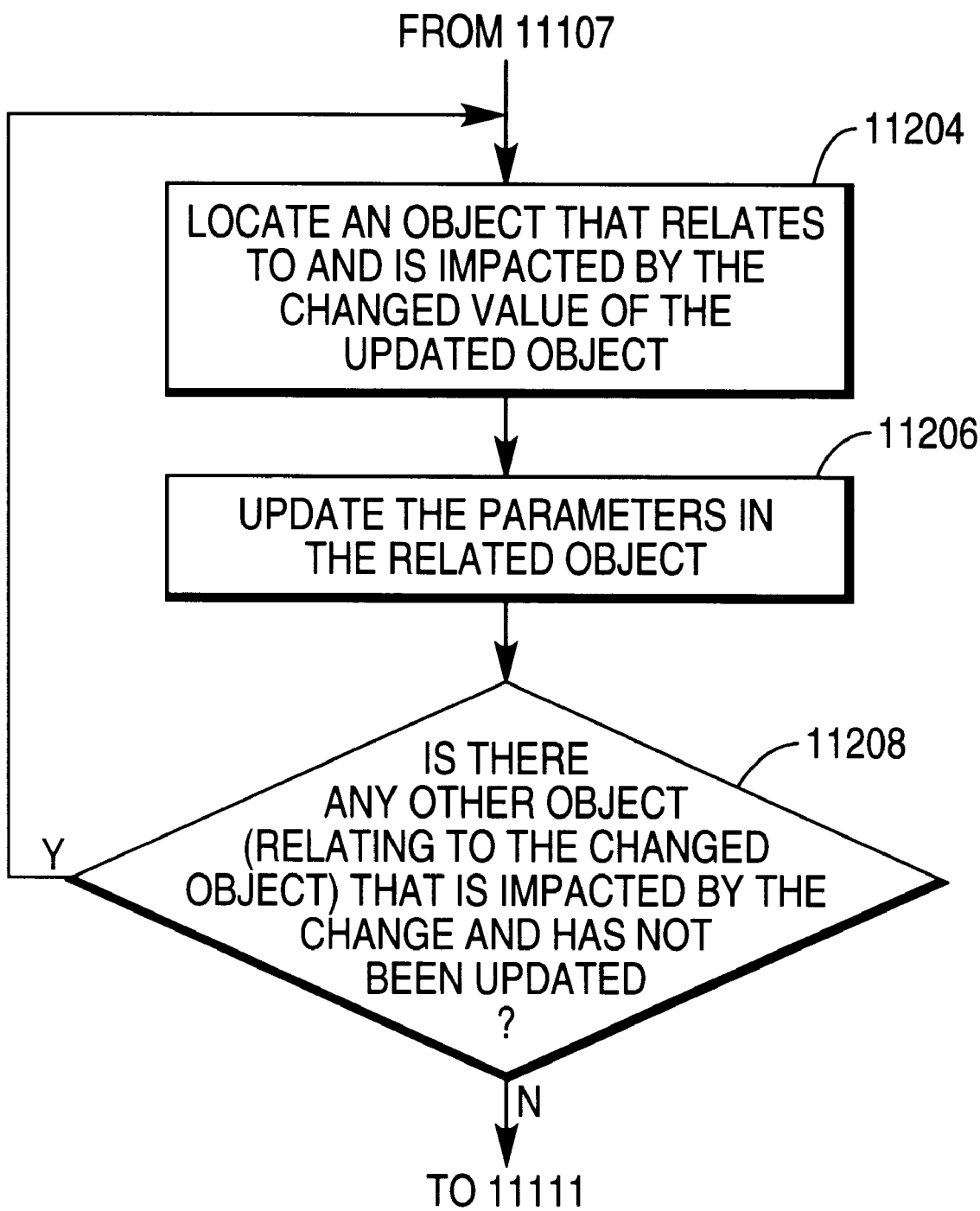
Figure 113:
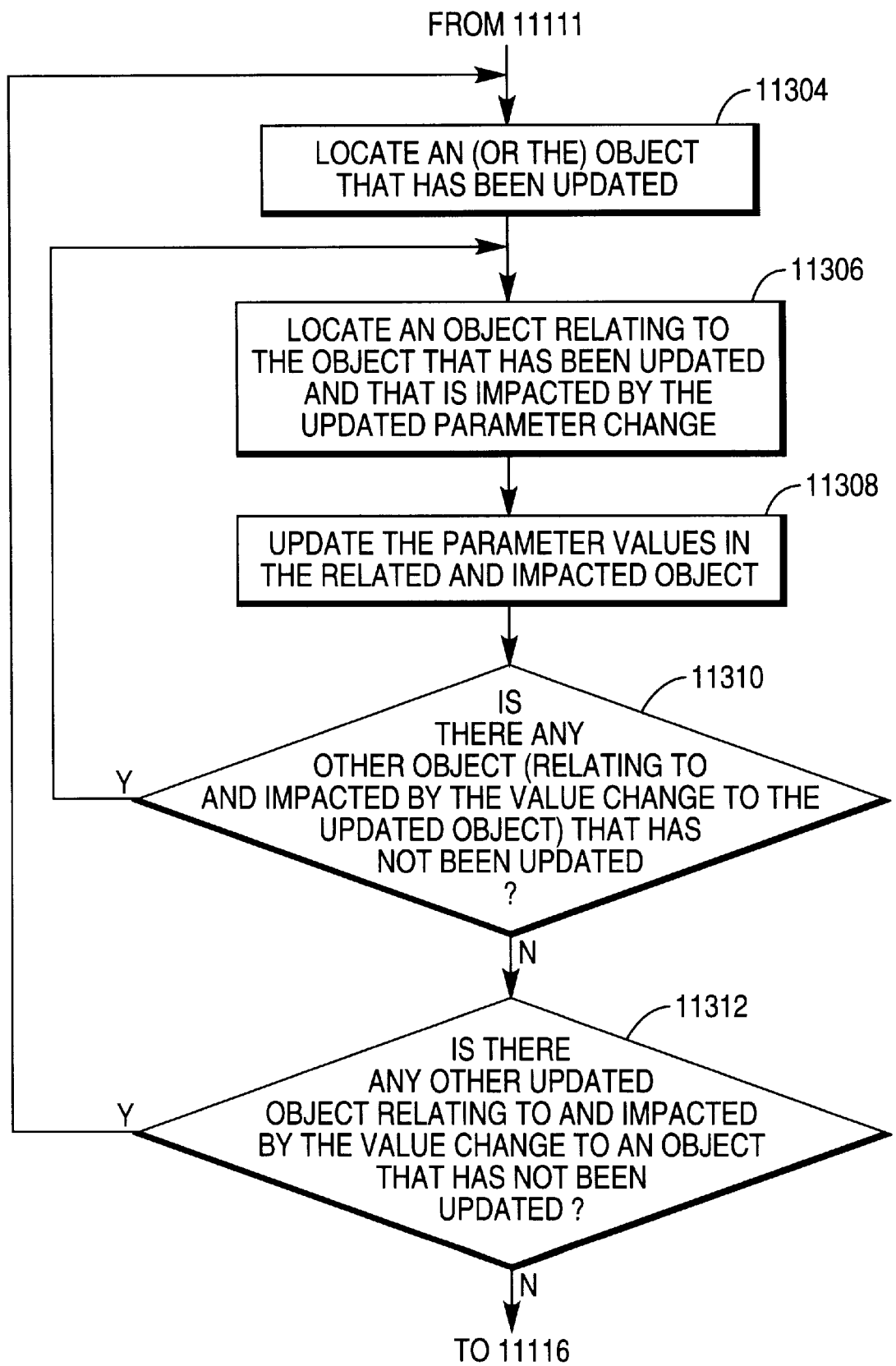
Figure 129:
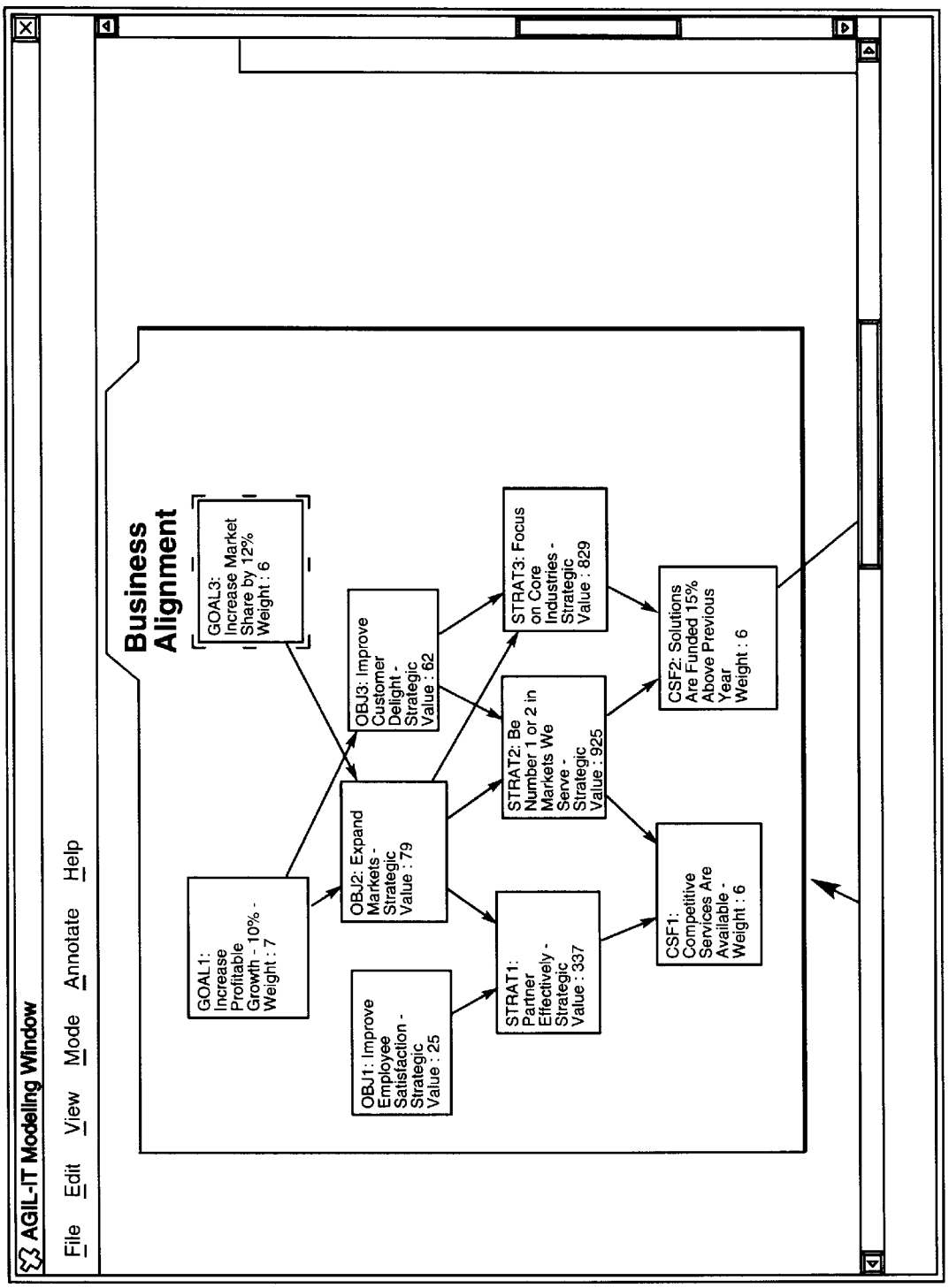
Figure 130:
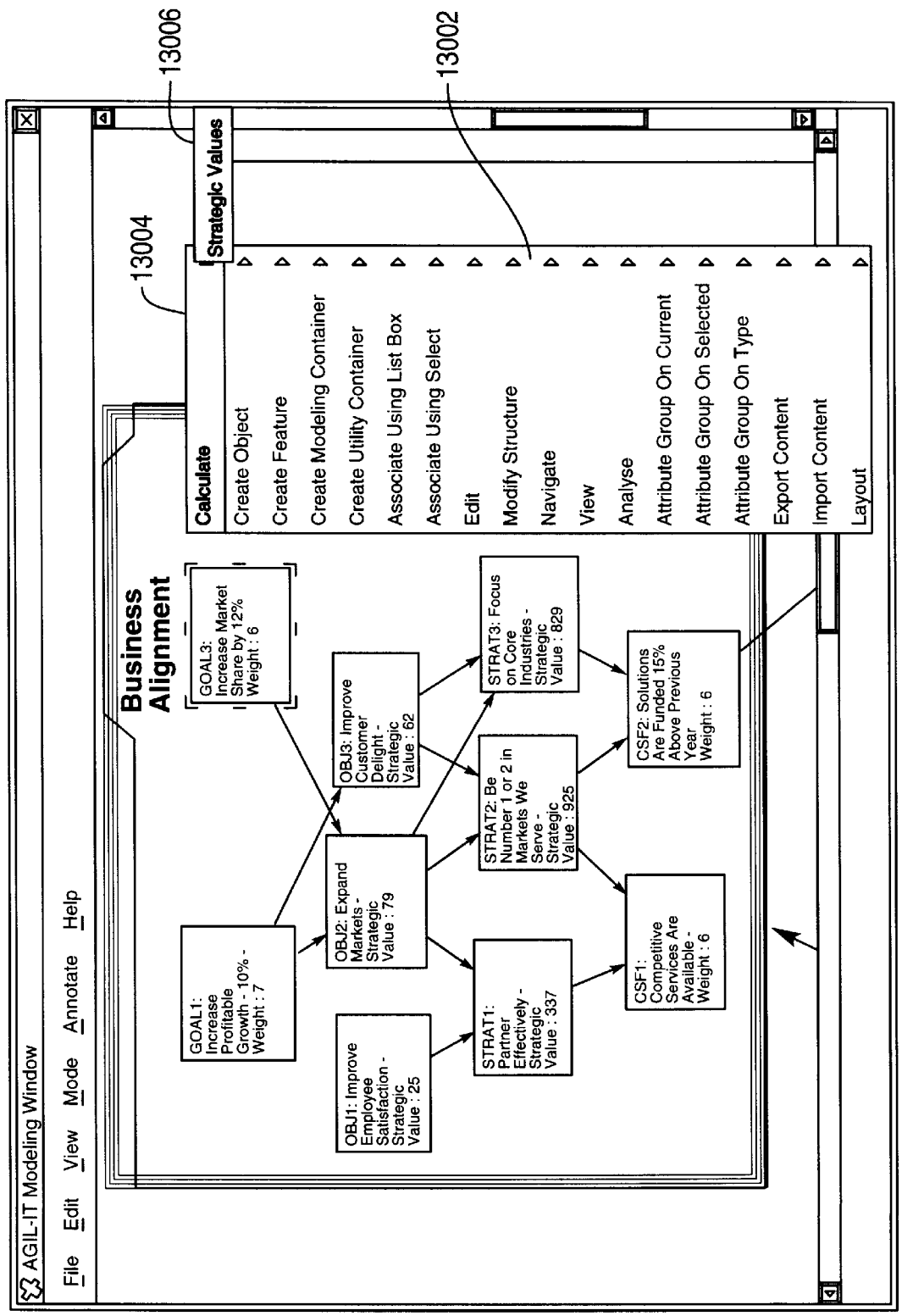
Figure 131:
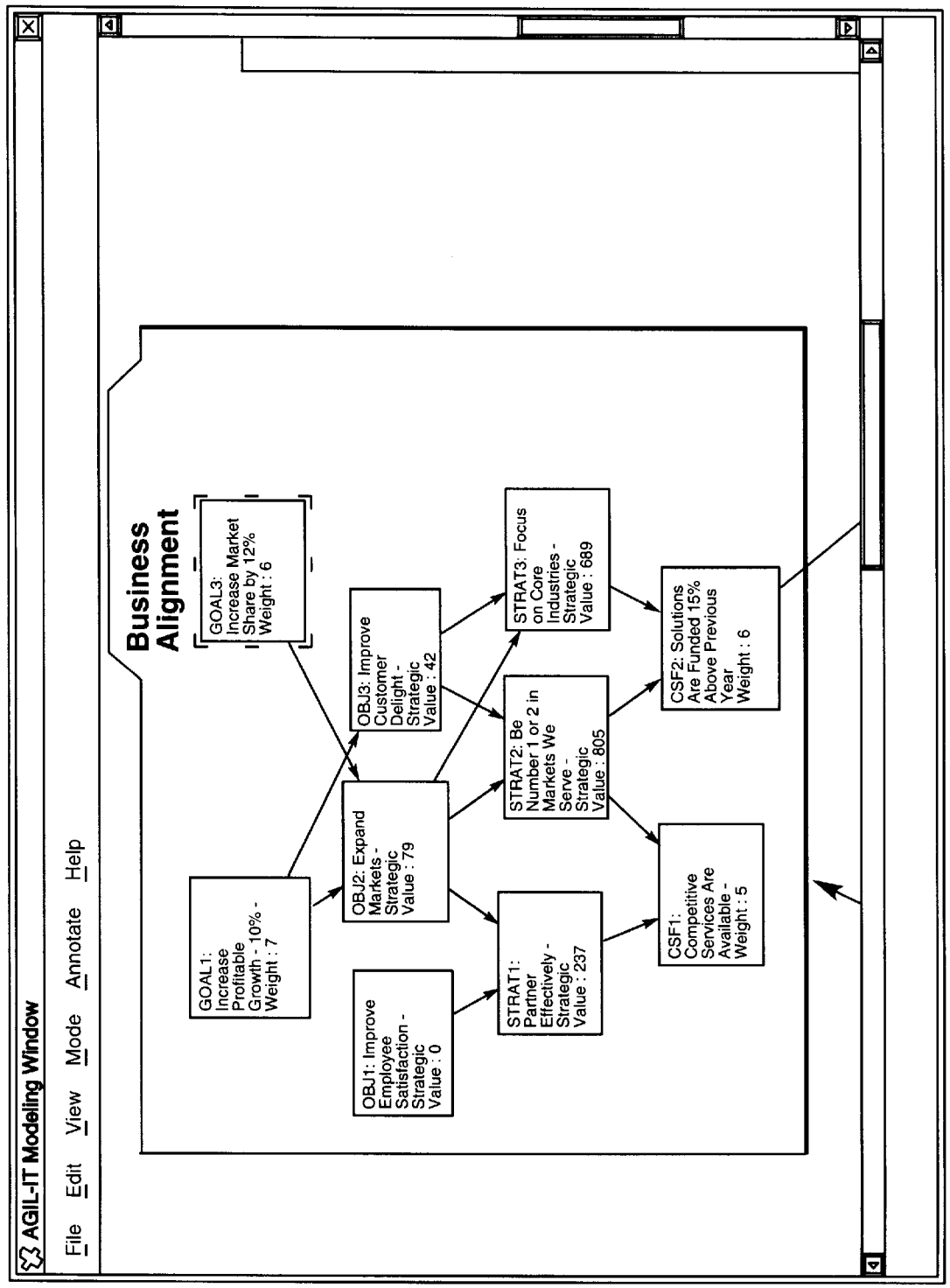
Figure 143:
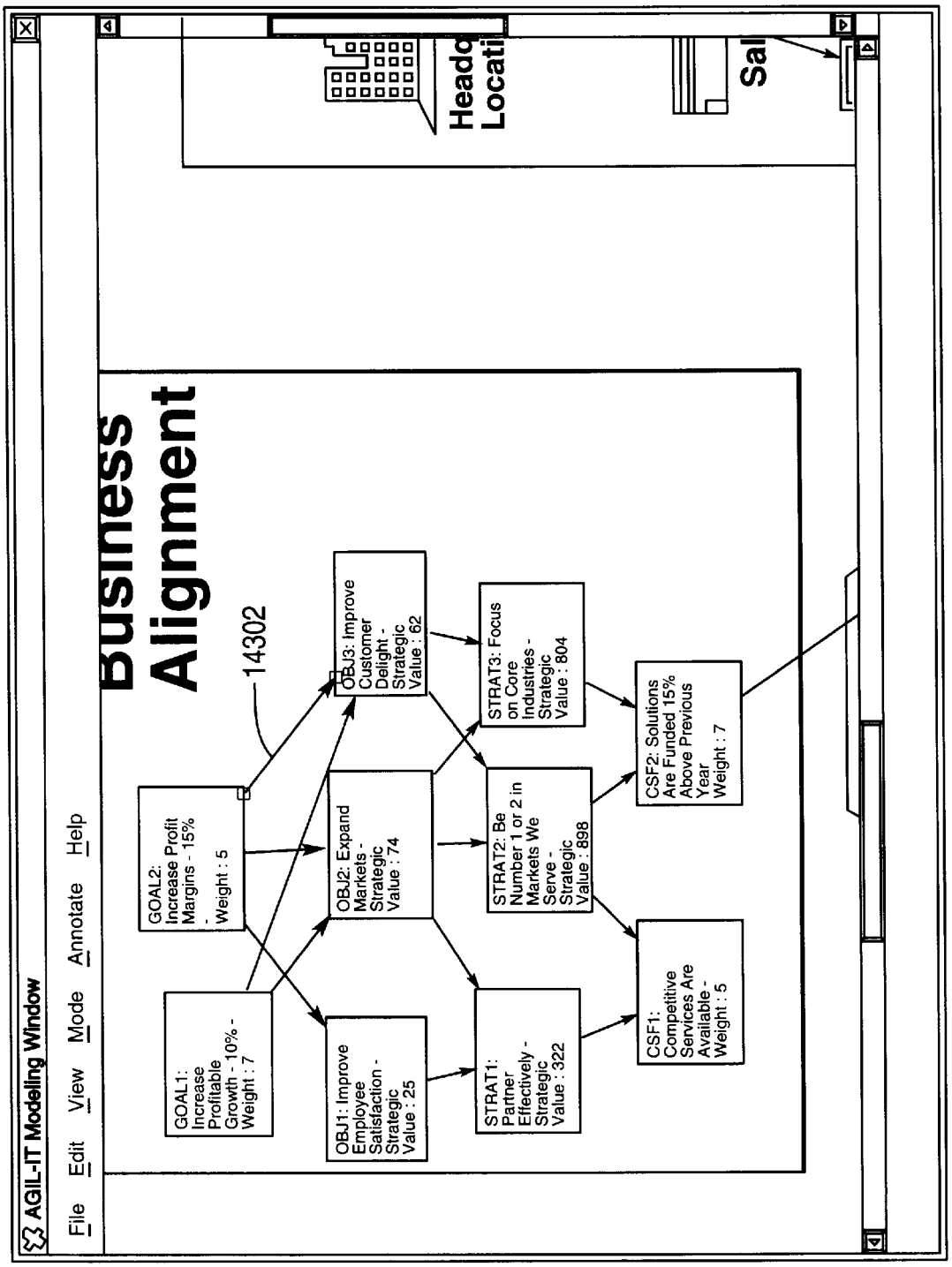
Figure 144:
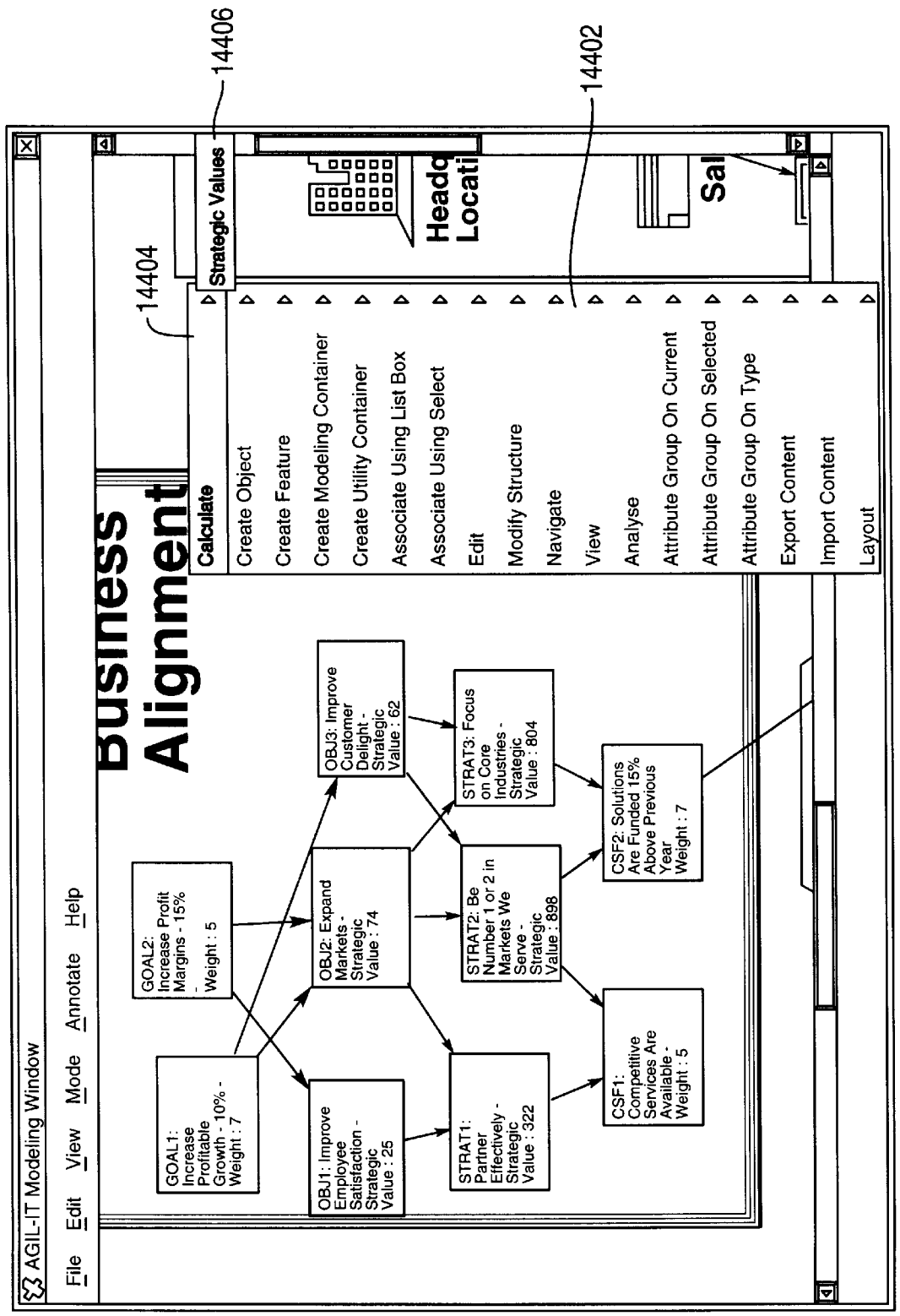
Figure 145:
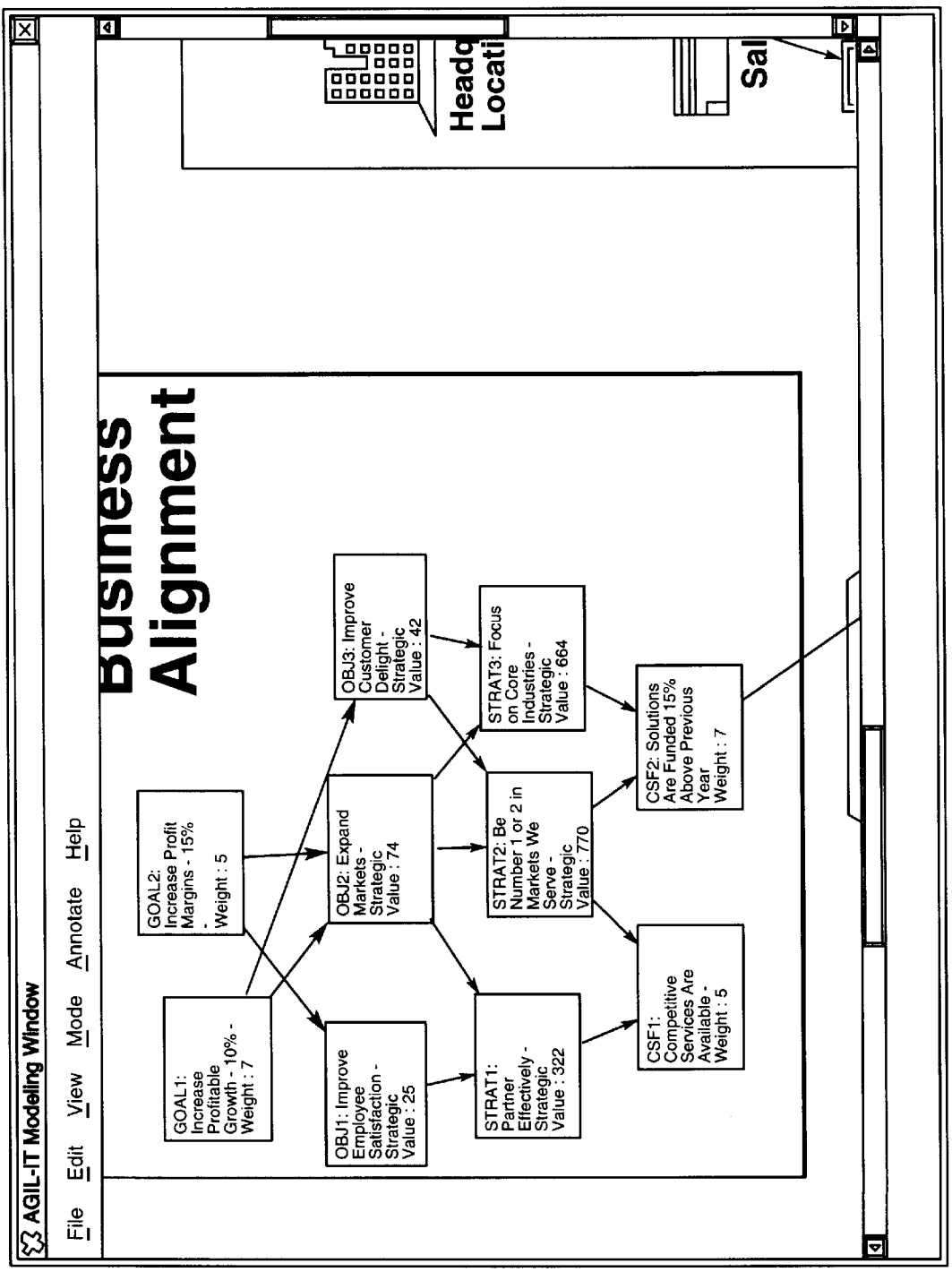
Figure 146:
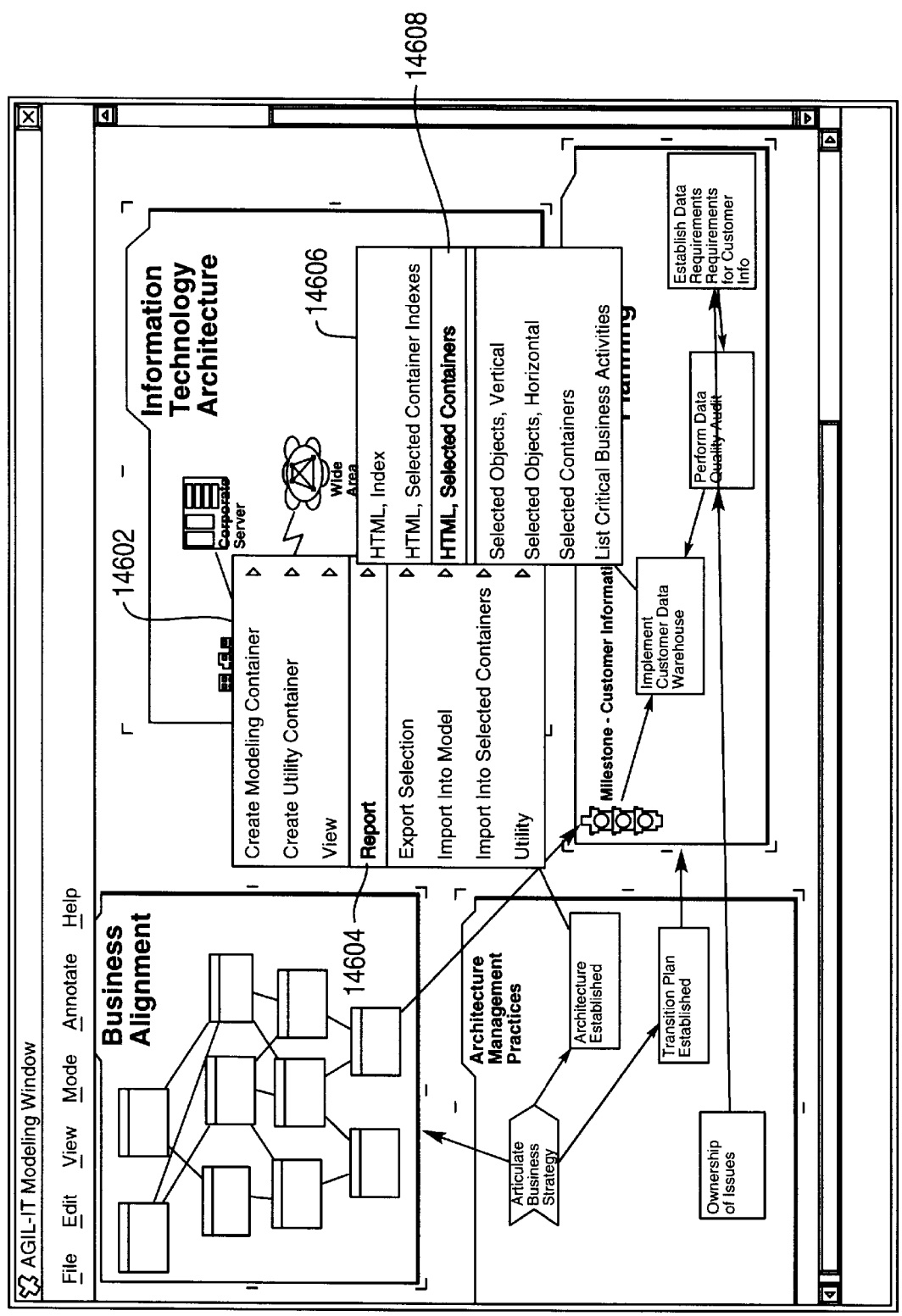
Figure 147:
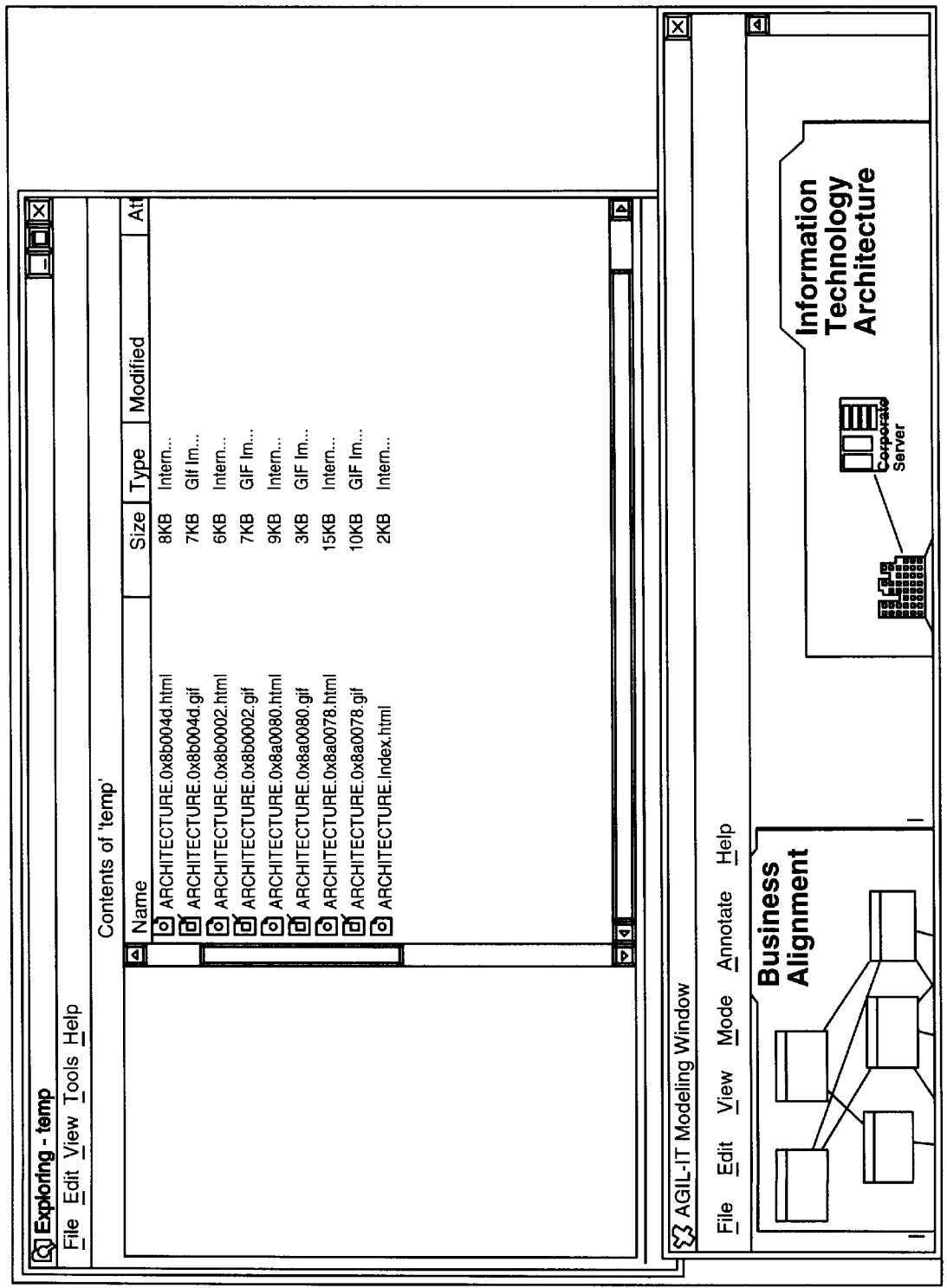
Figure 148:
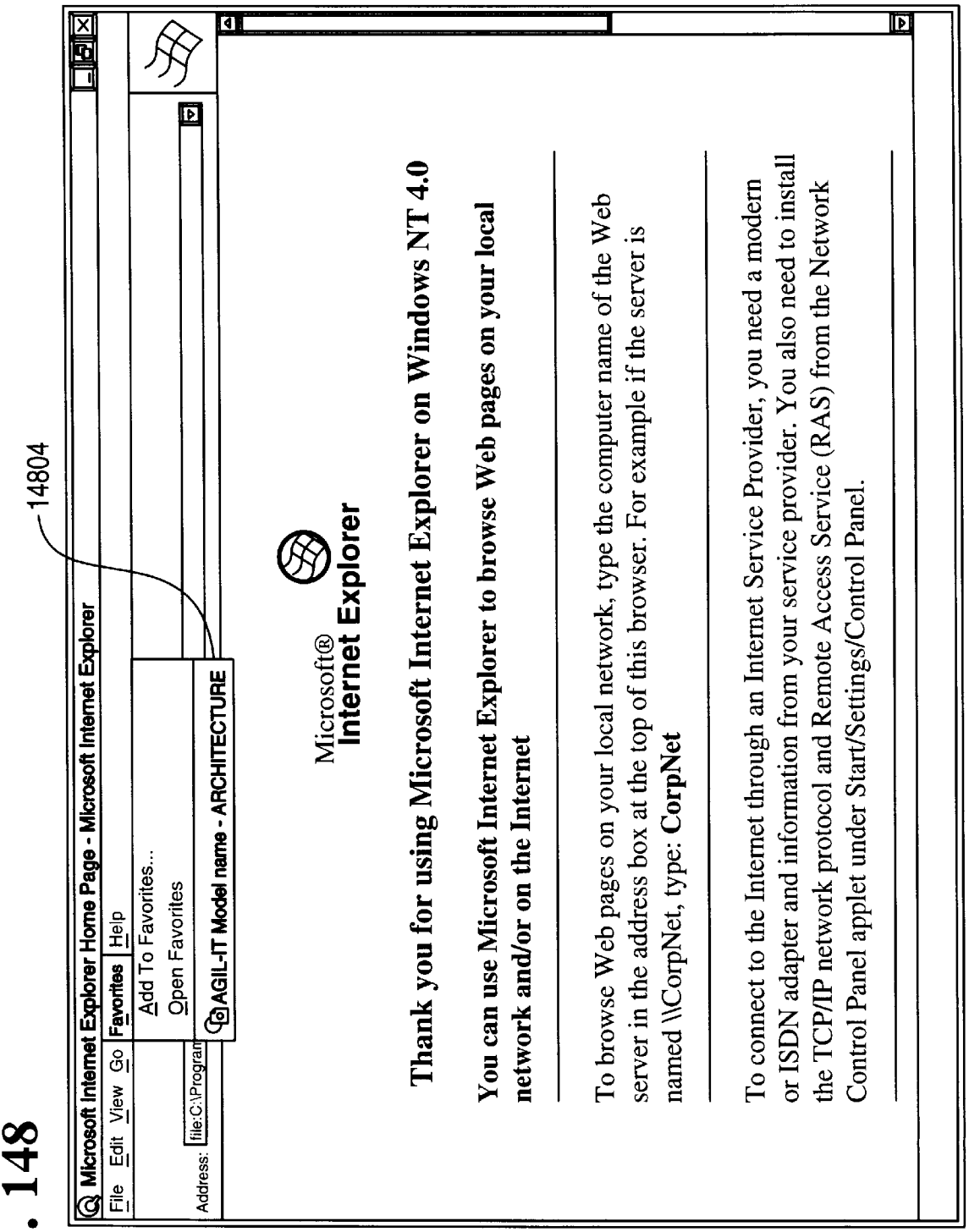
Figure 149:
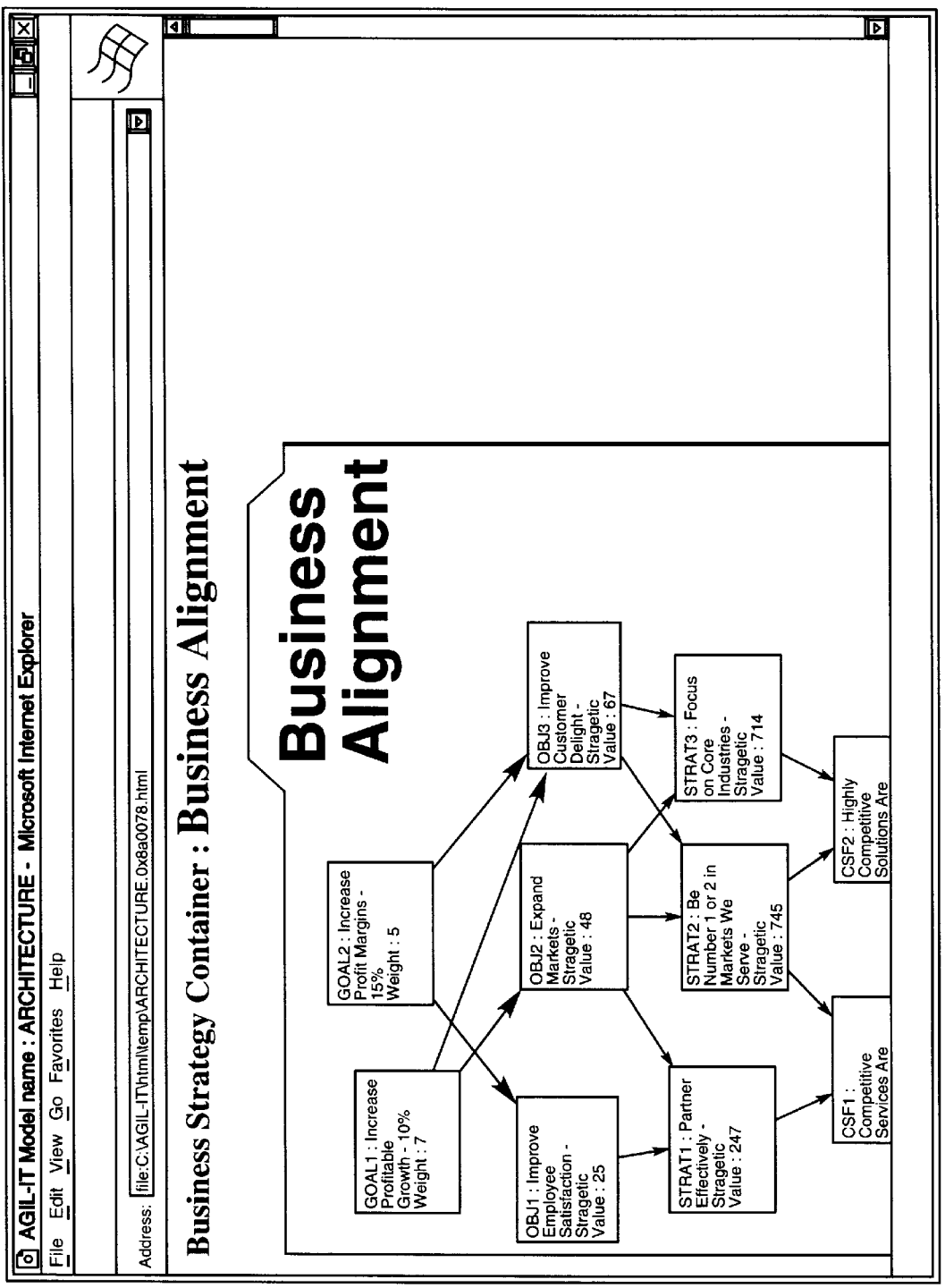
Figure 150:
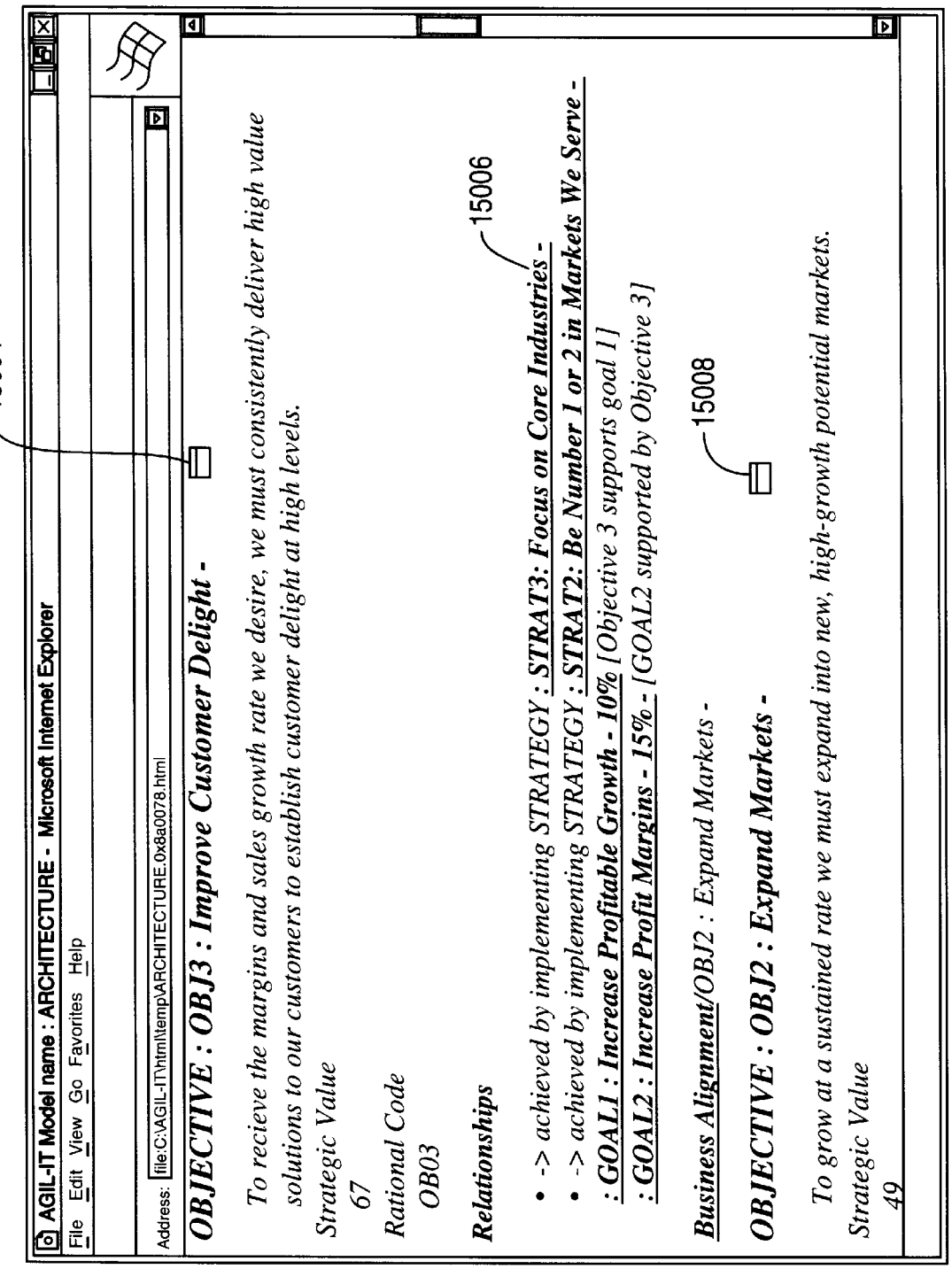
Figure 151:
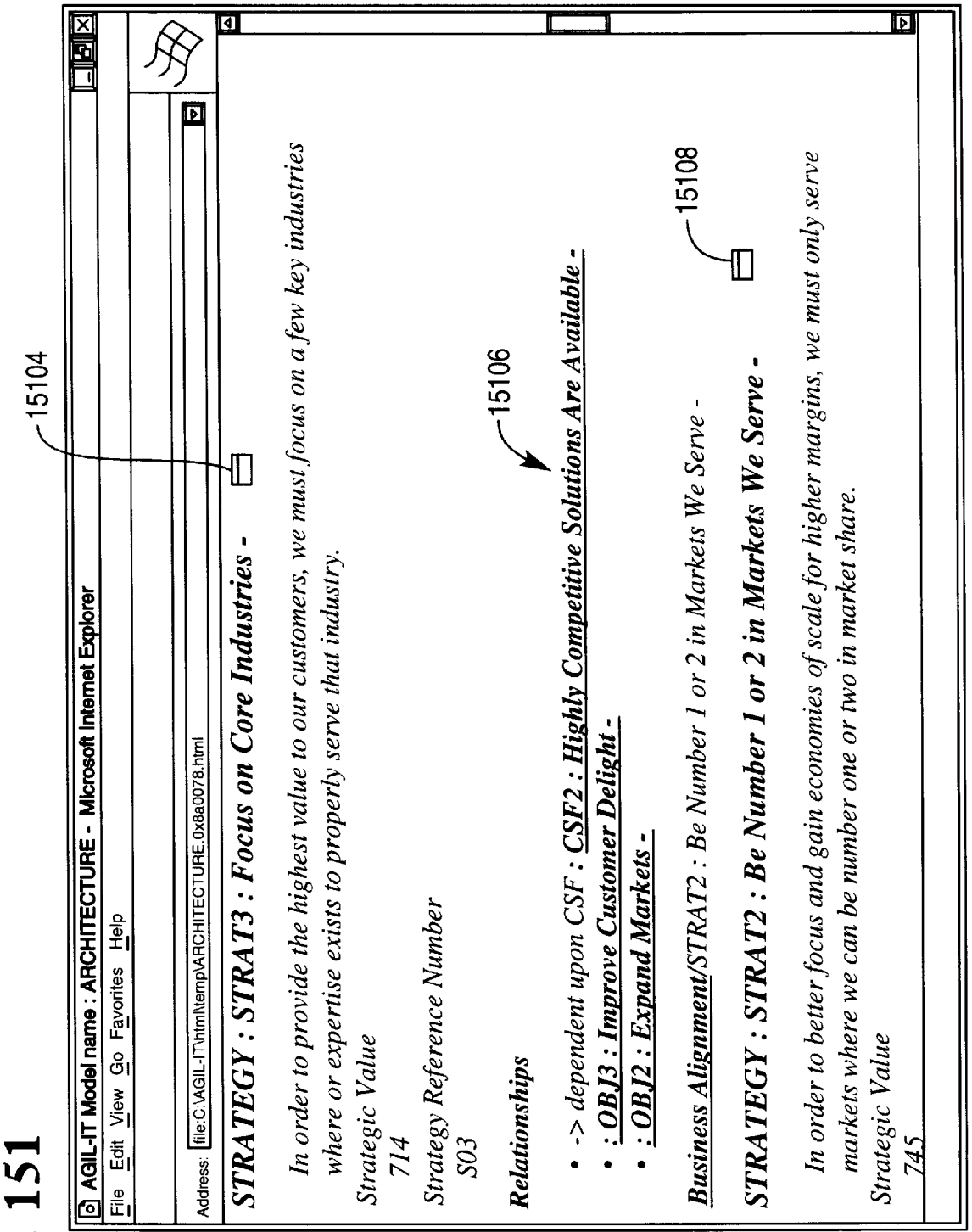
Figure 152:
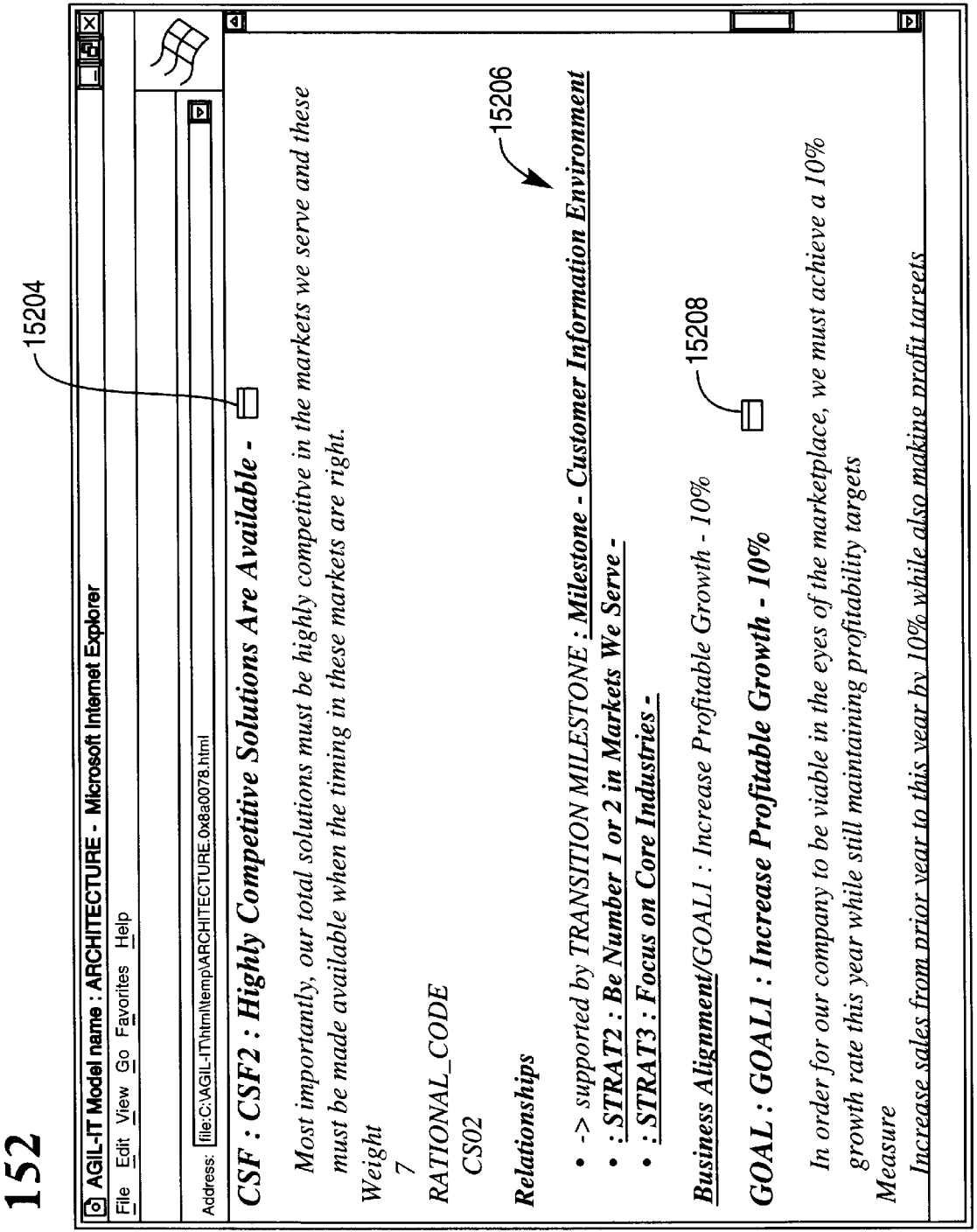
Figure 153:
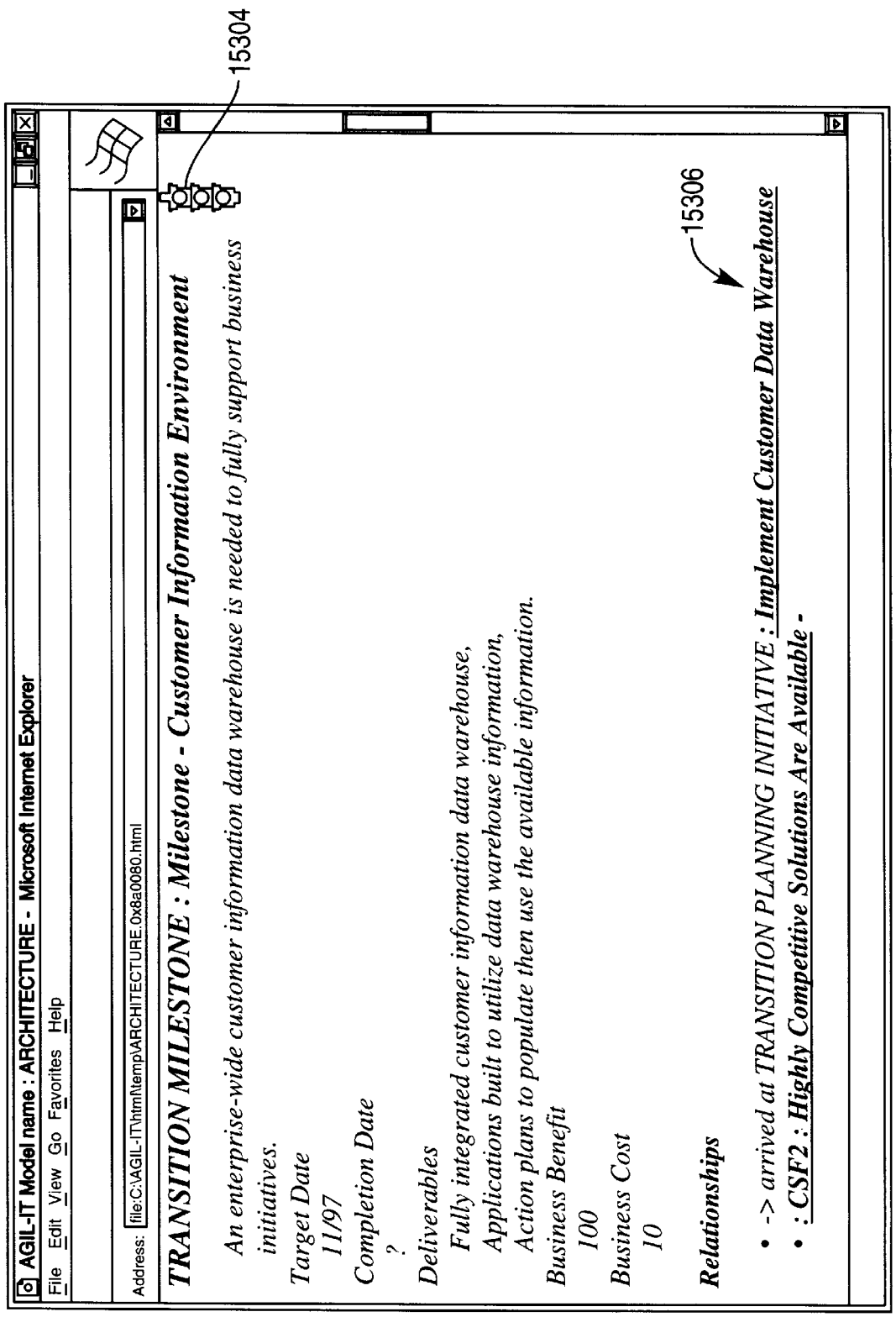
Figure 154:
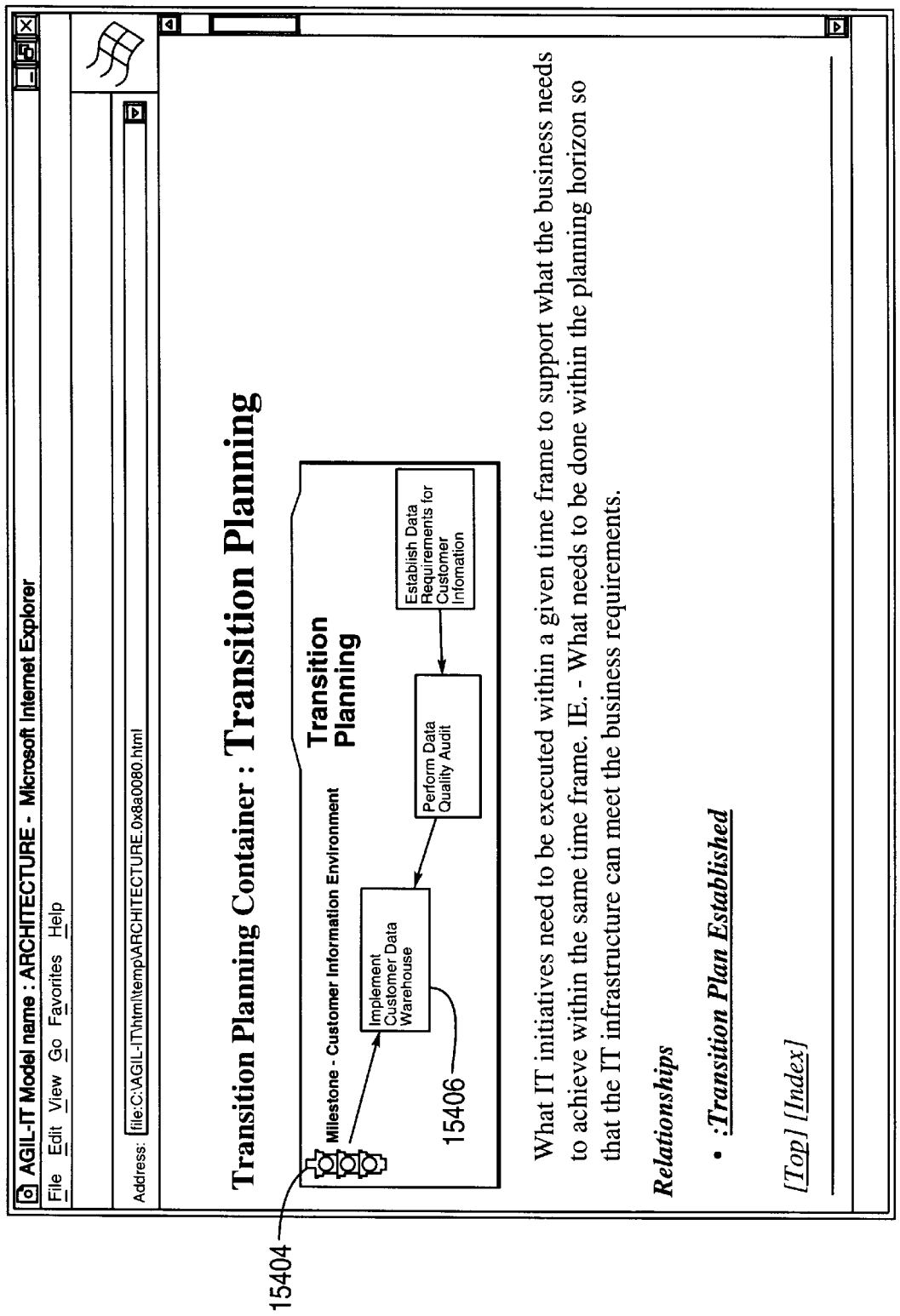
Figure 155:
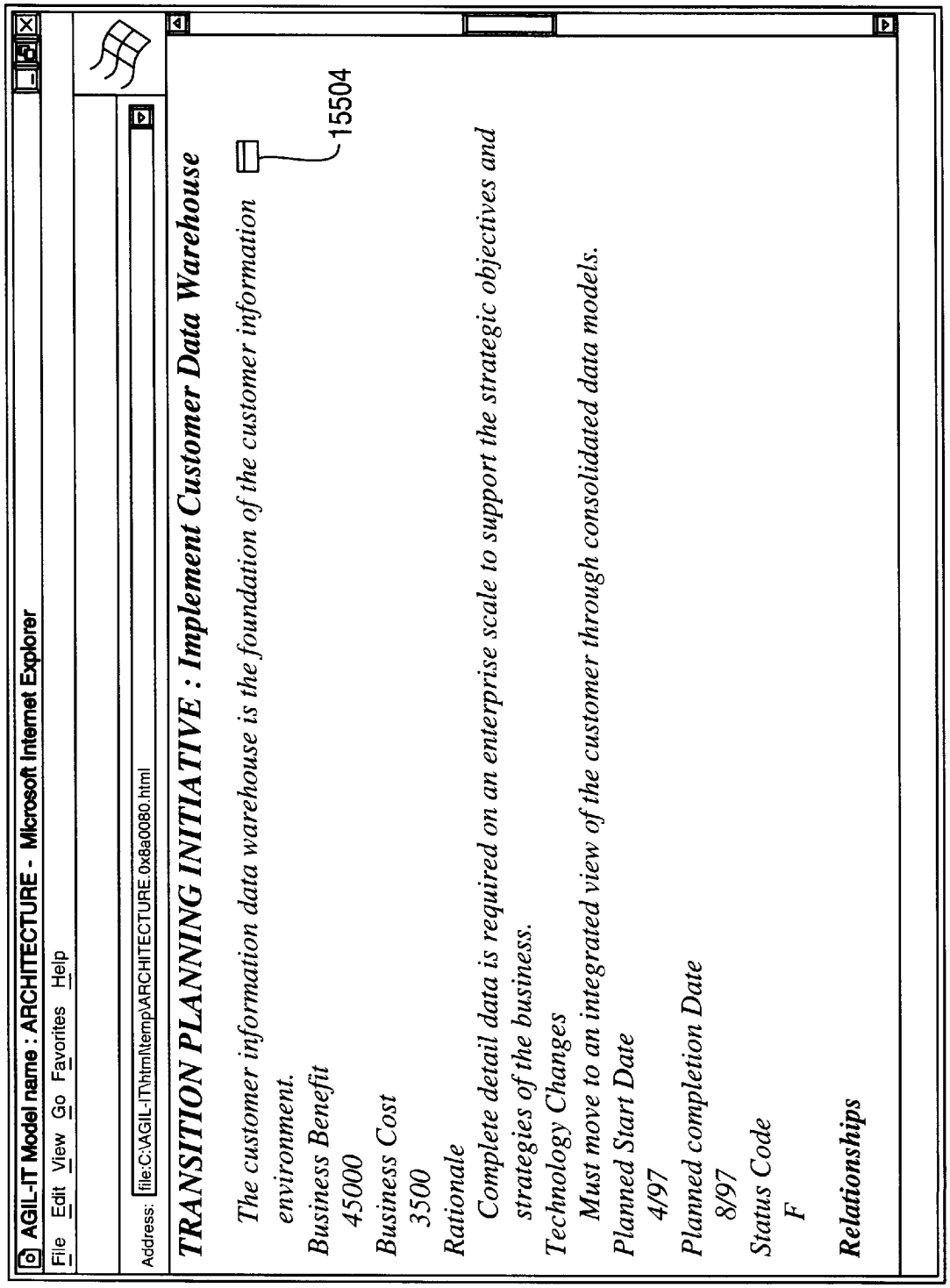
Figure 156:
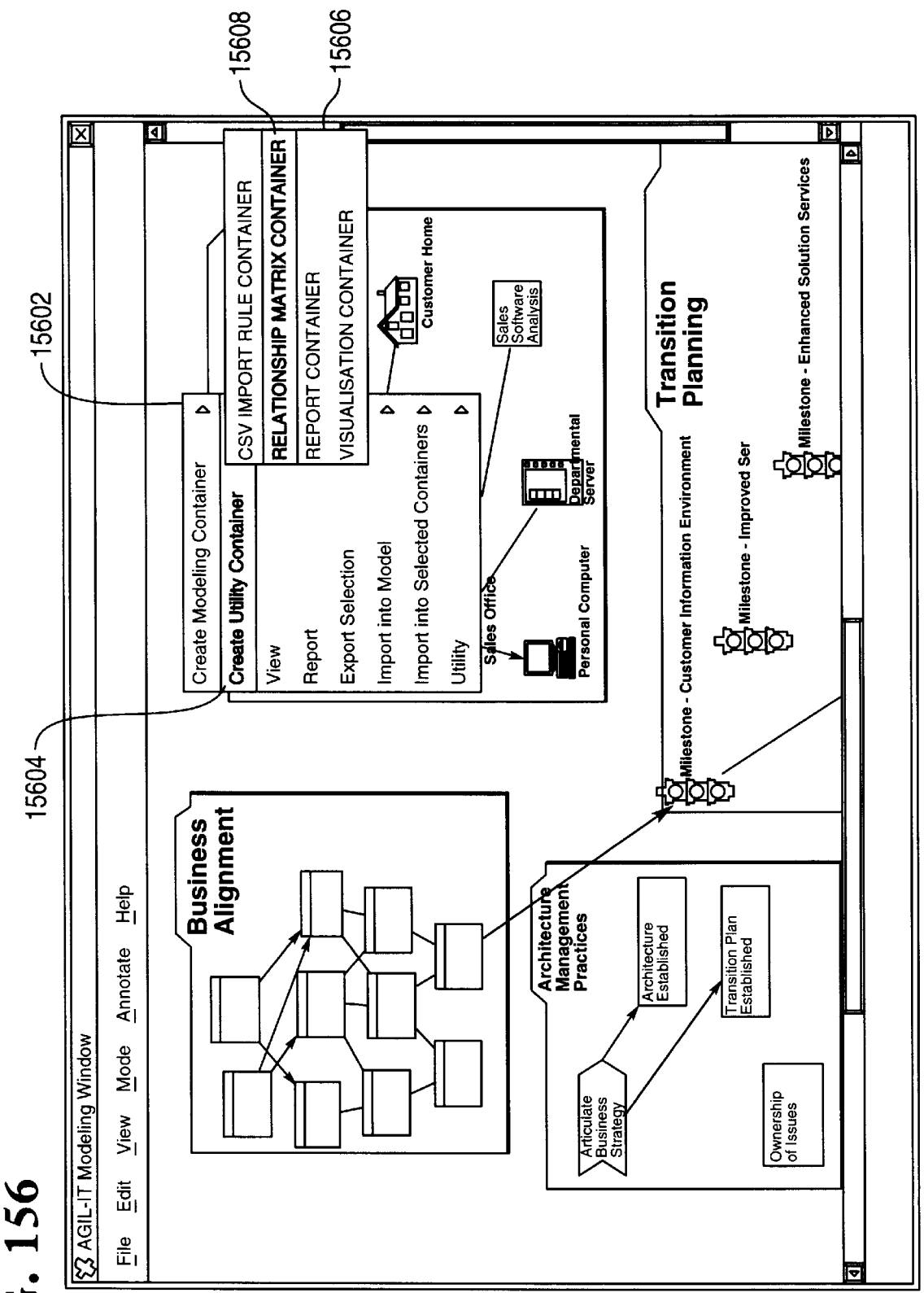
Figure 157:
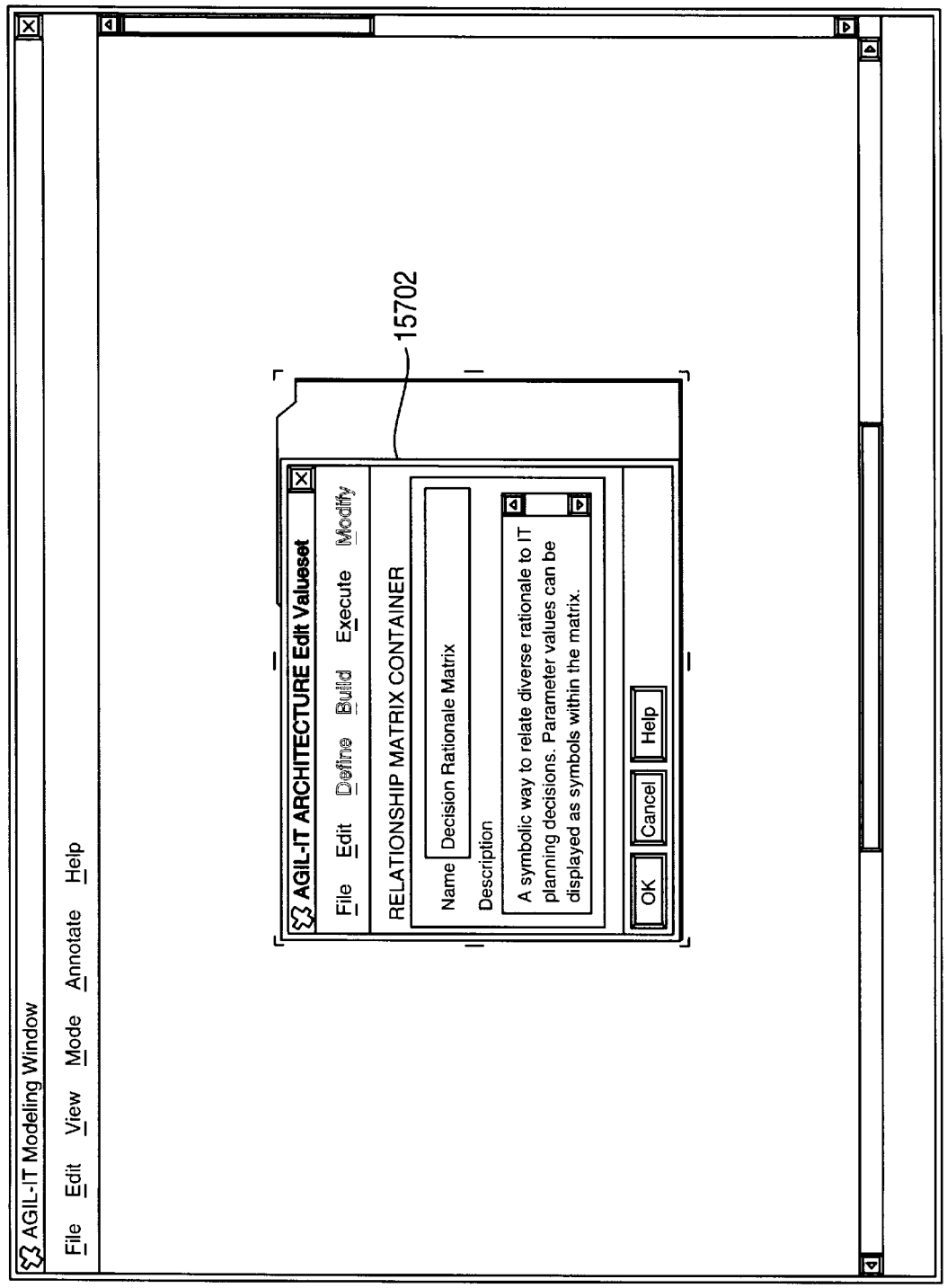
Figure 158:
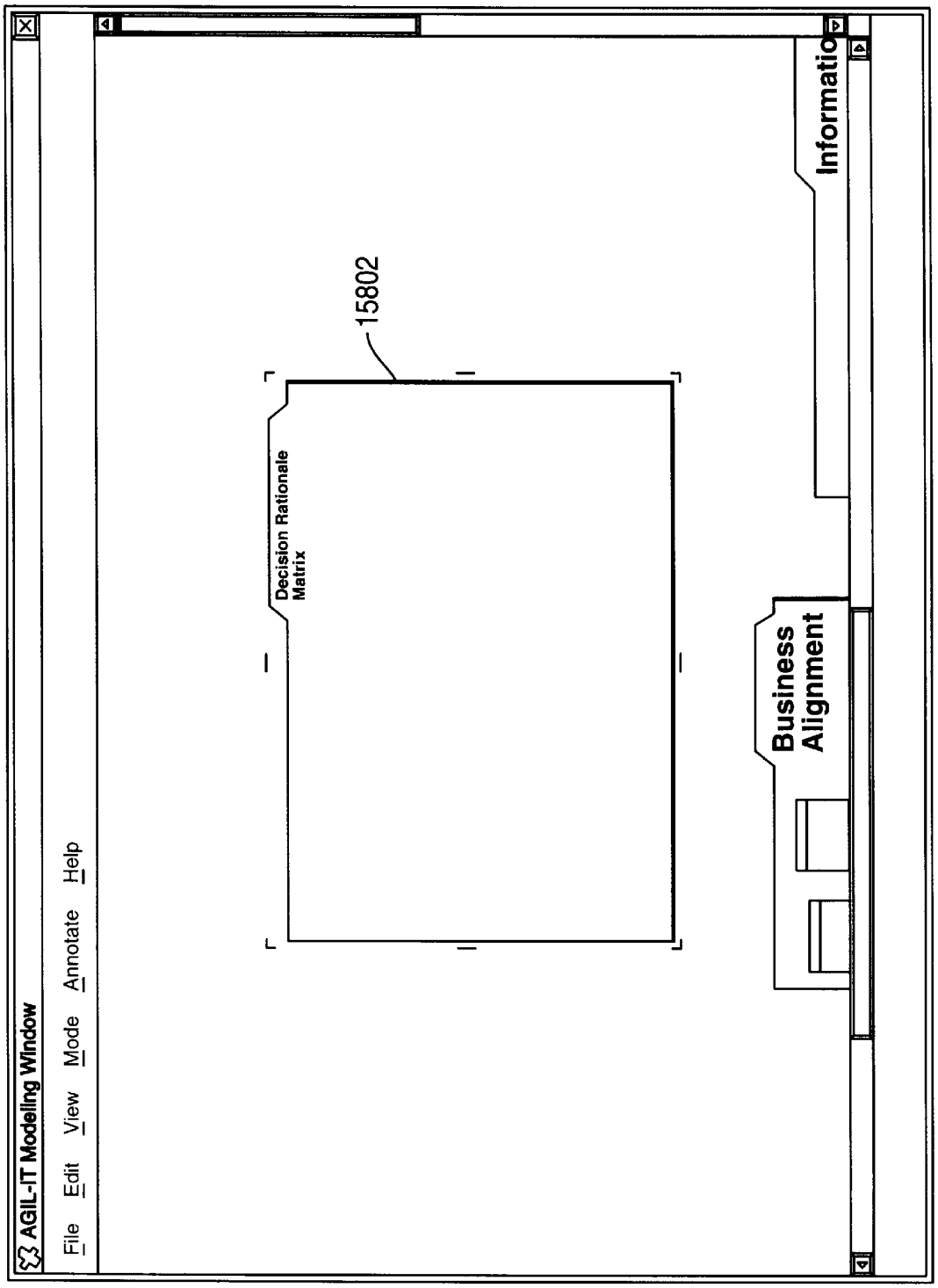
Figure 159A:
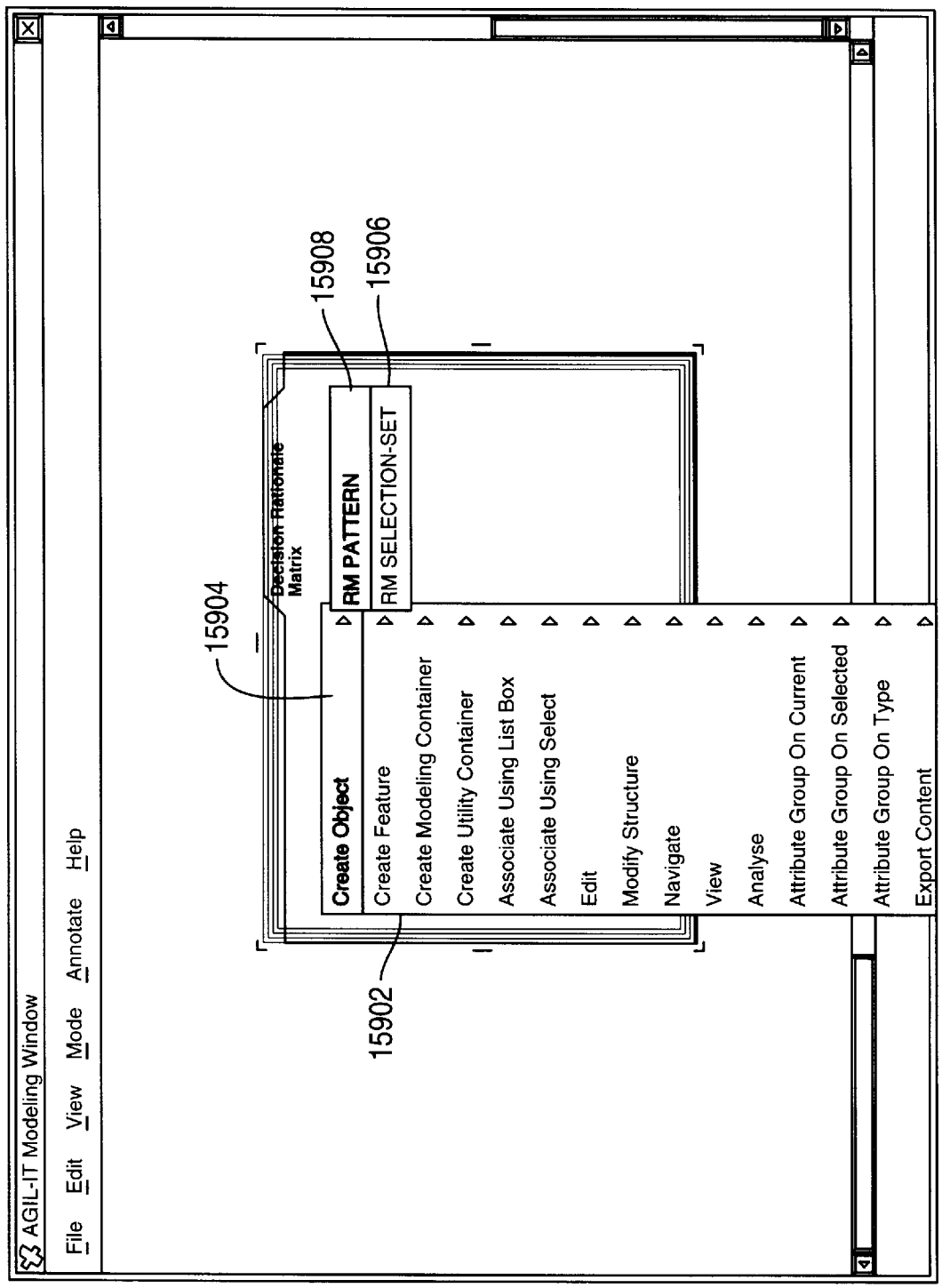
Figure 159B:
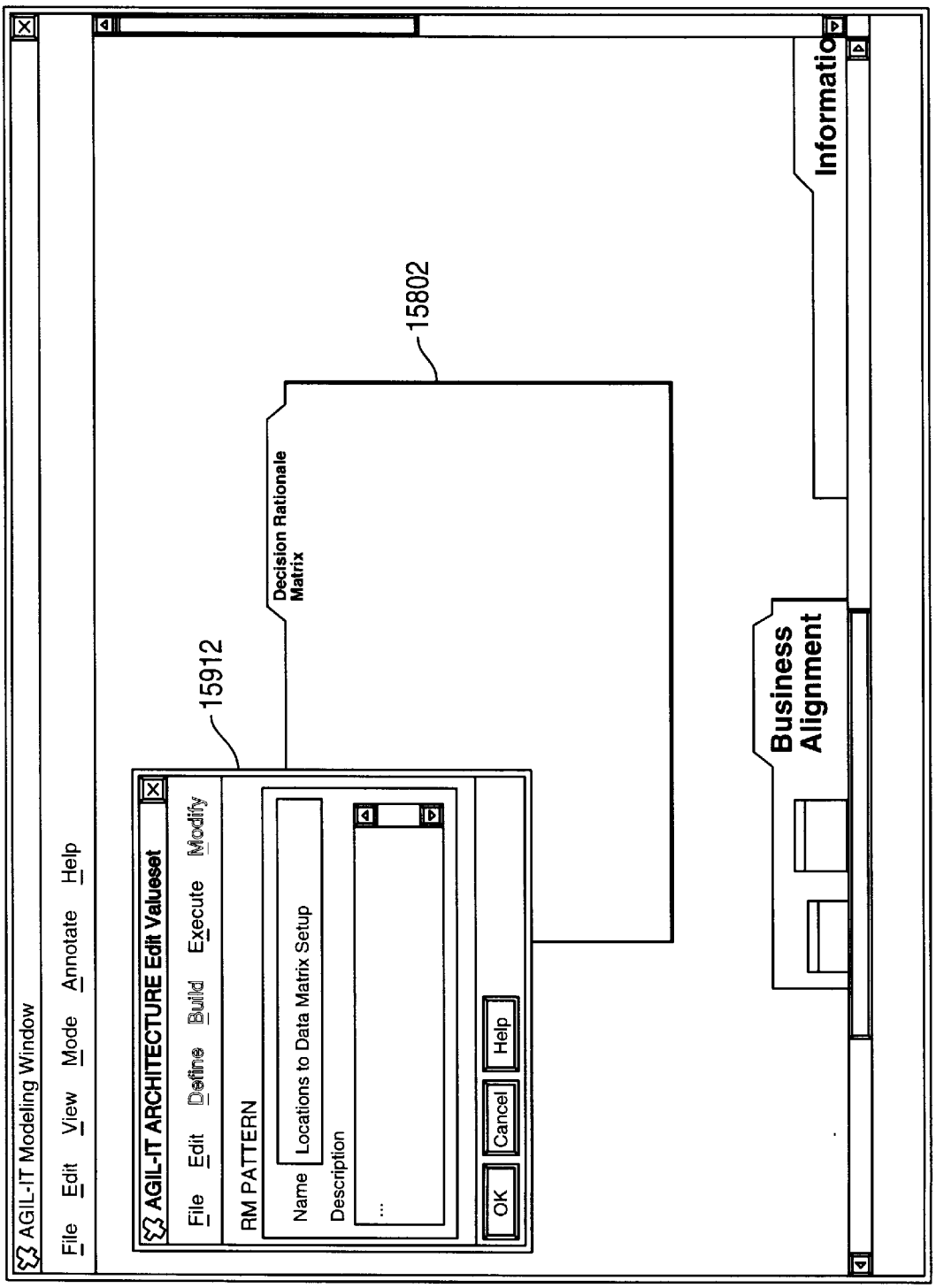
Figure 160:
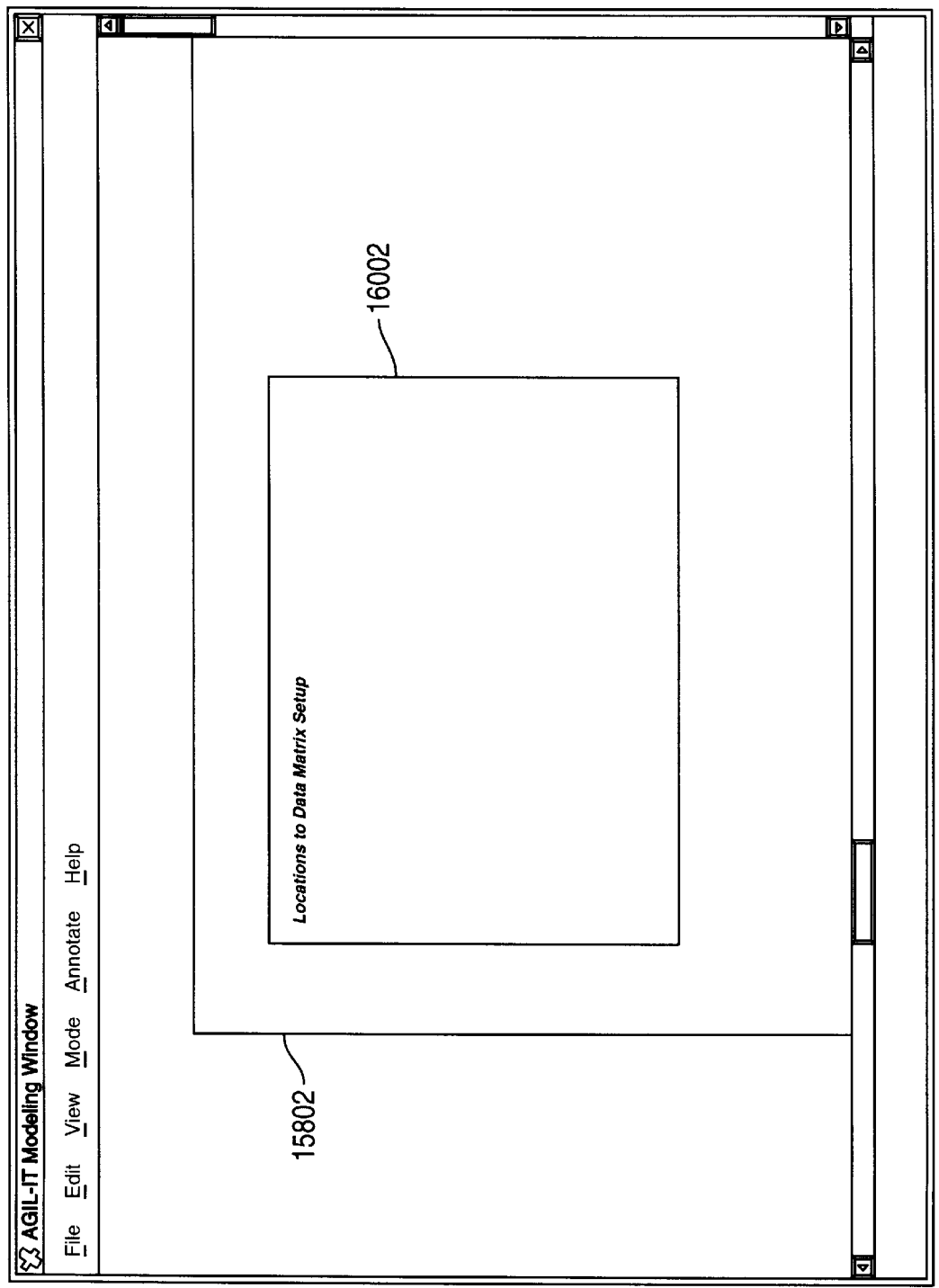
Figure 169:
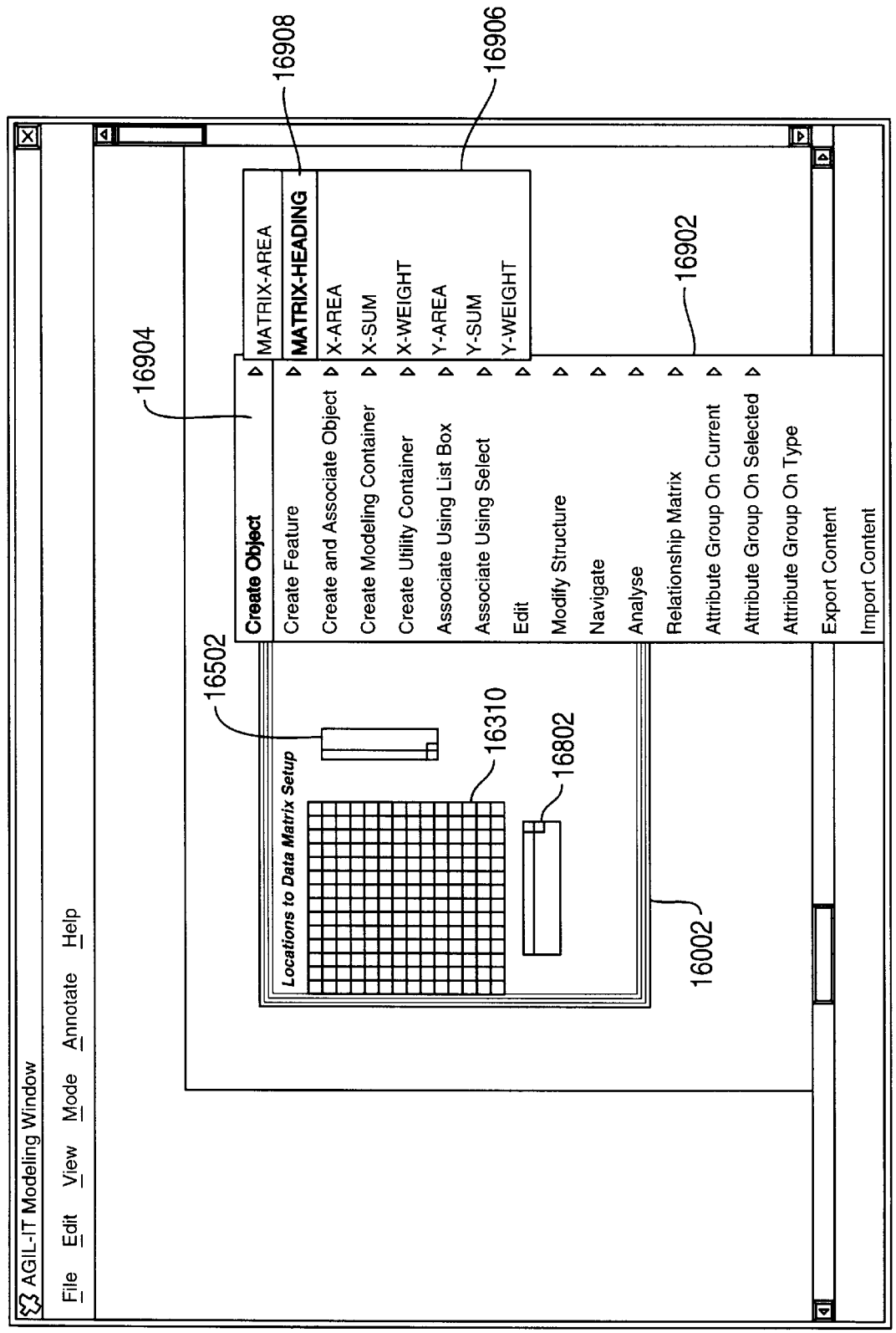
Figure 170:
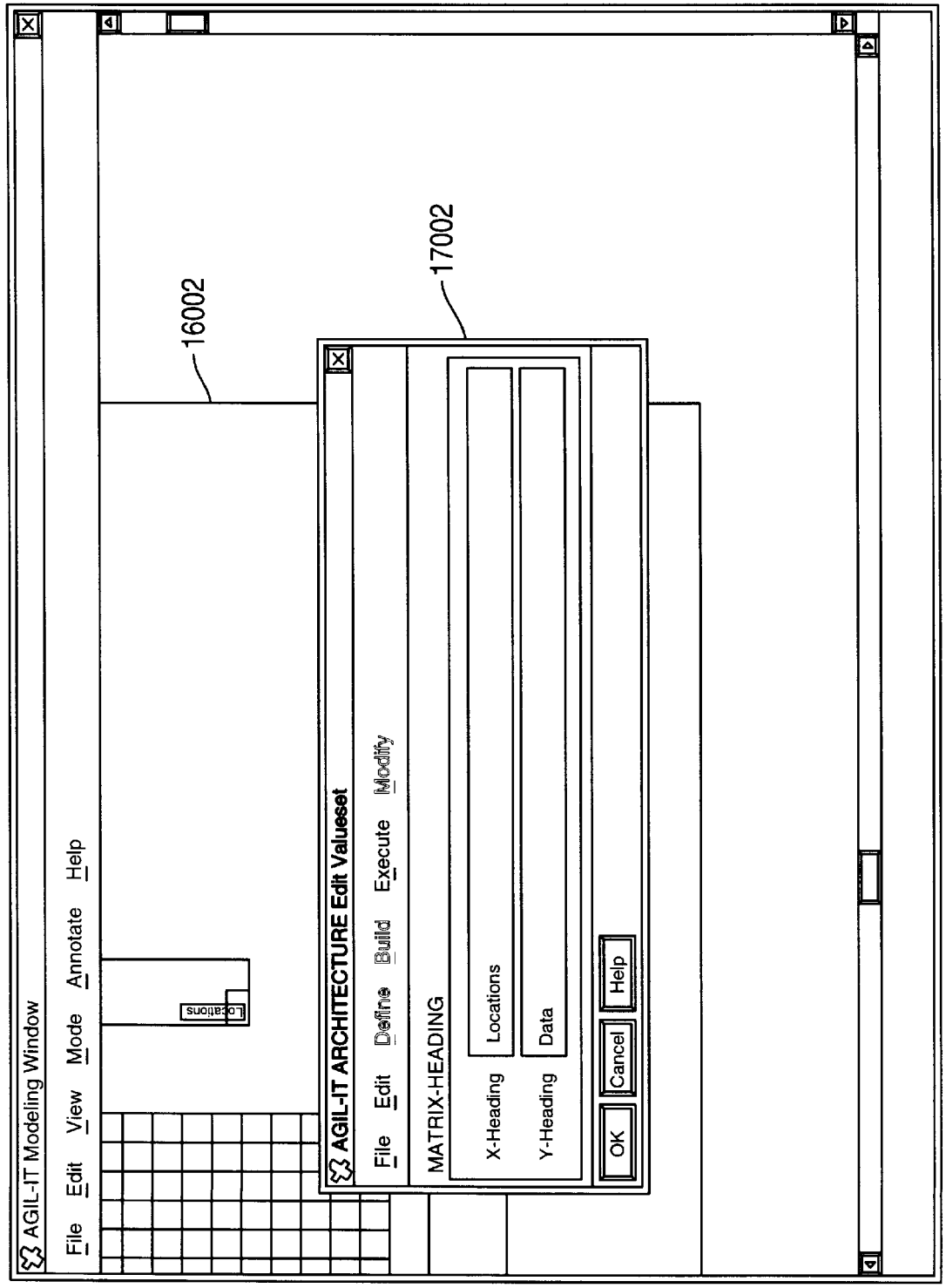
Figure 171:
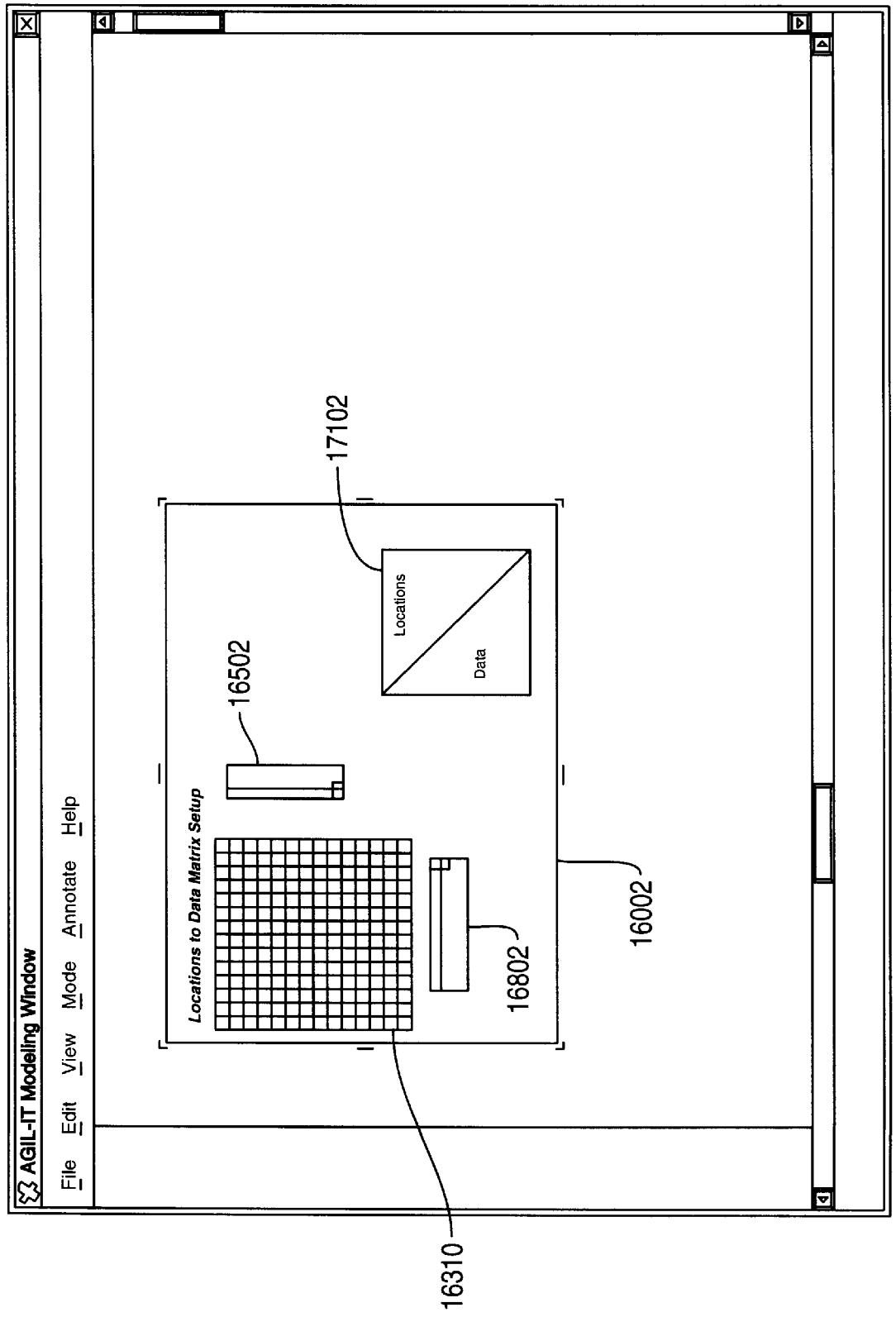
Figure 172:
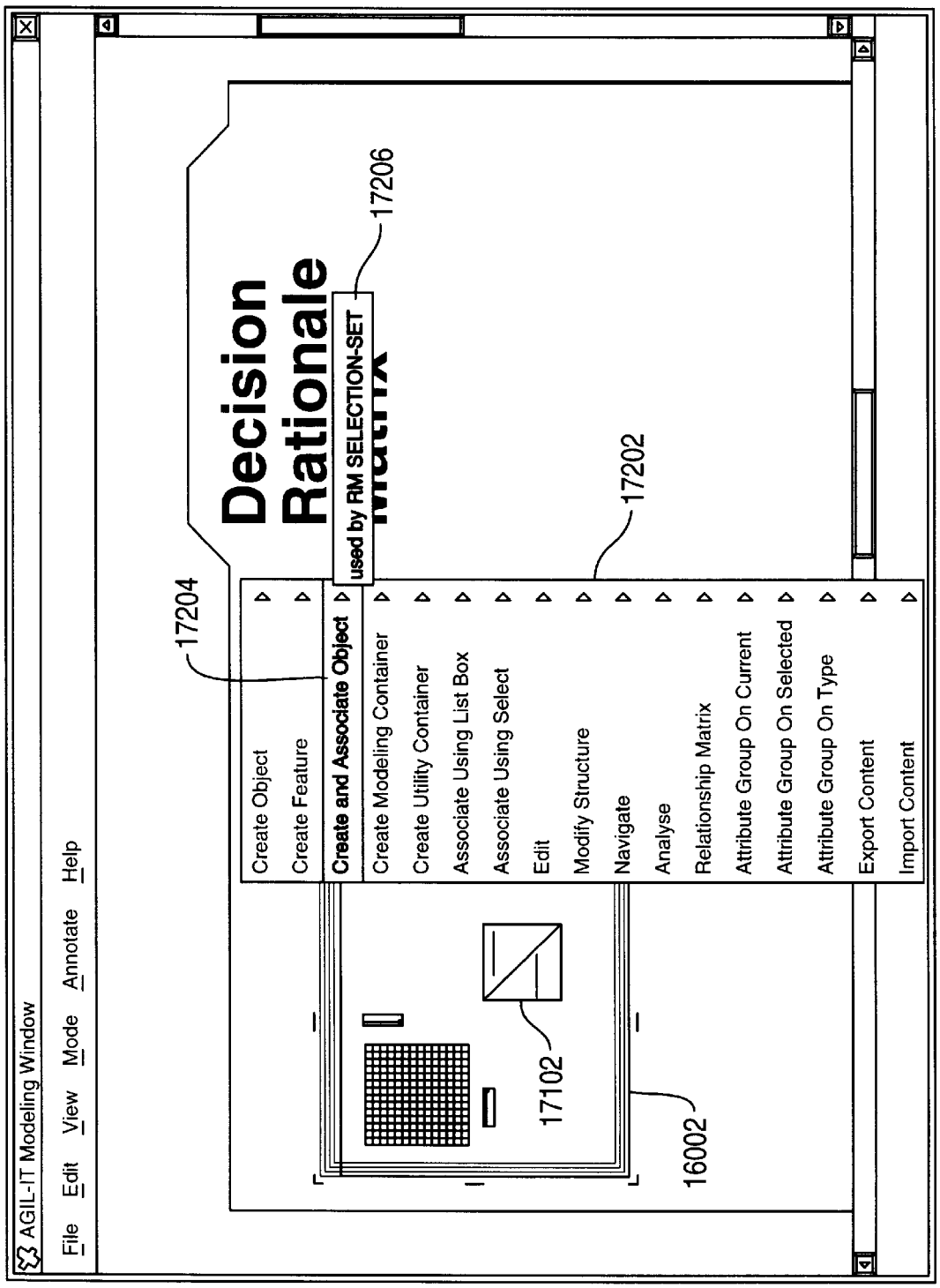
Figure 173:
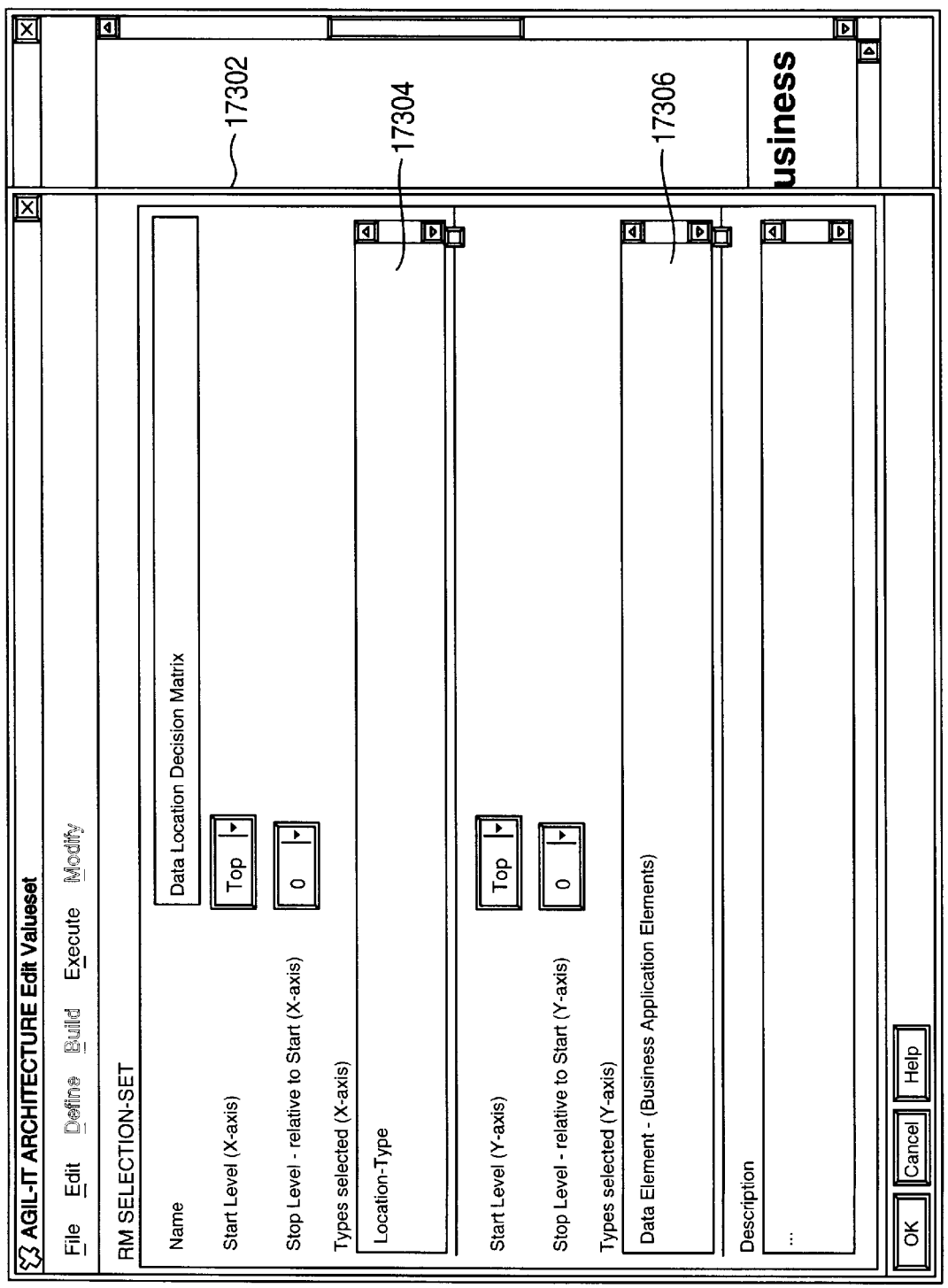
Figure 174:
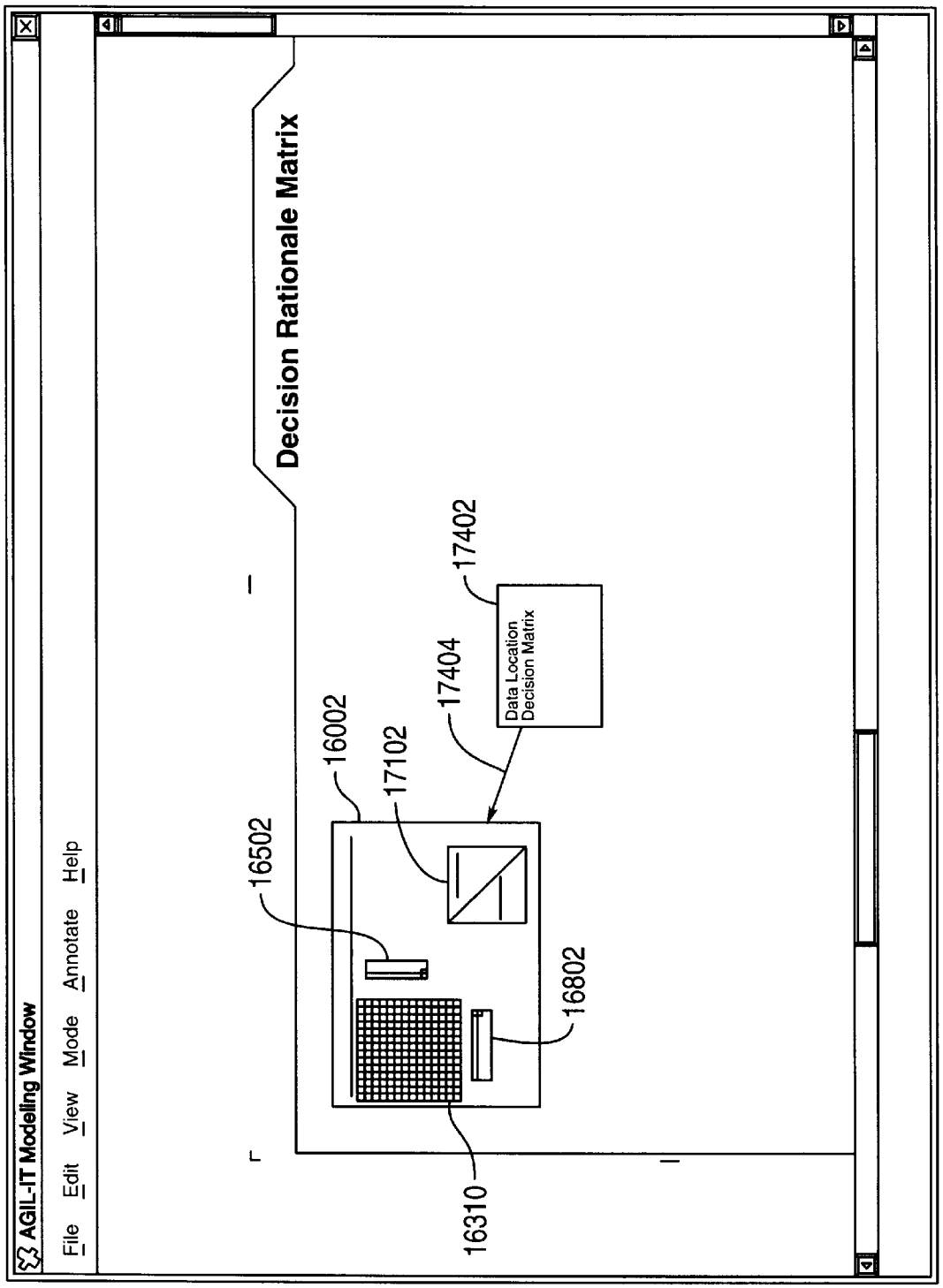
Figure 188:
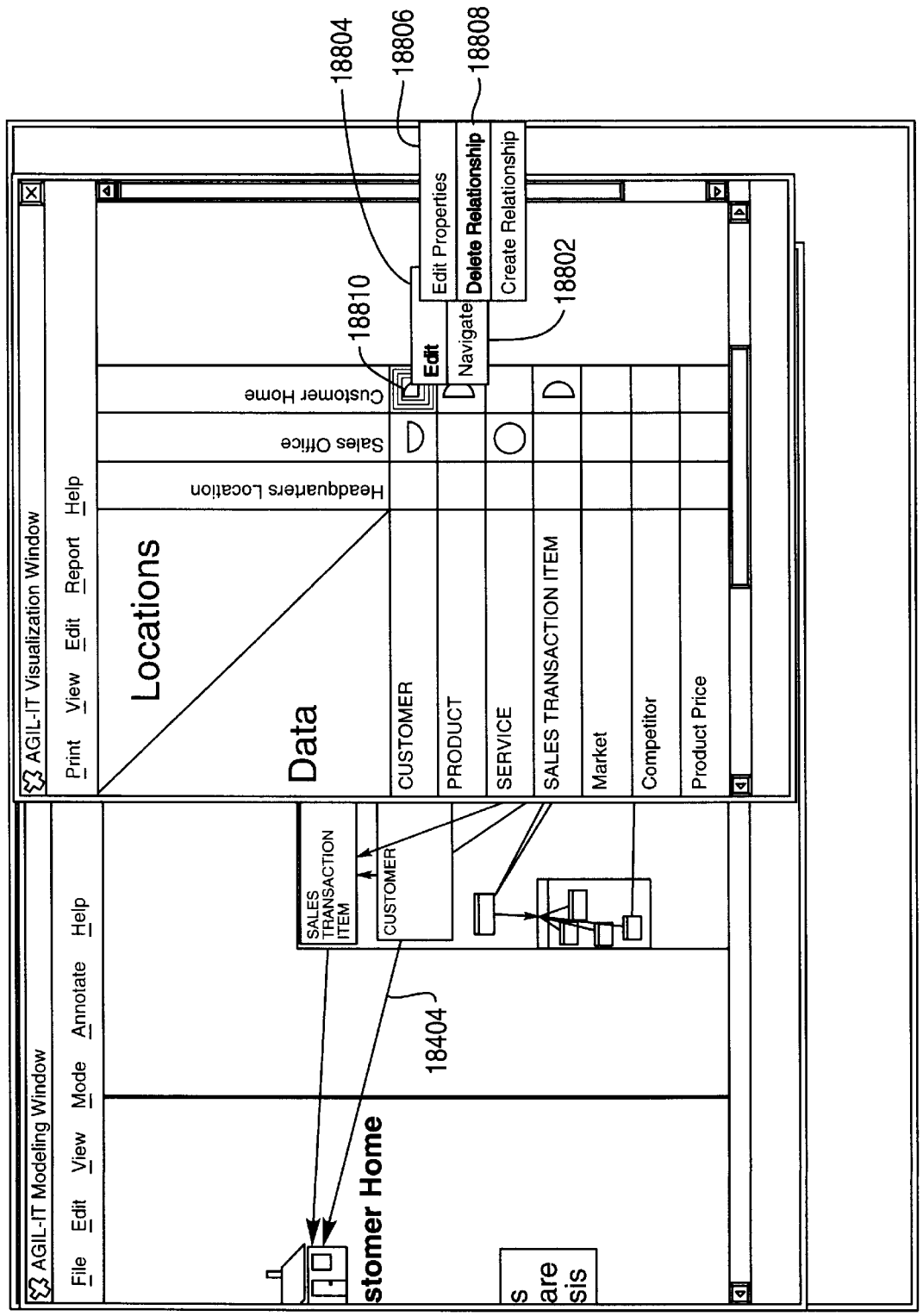
Figure 189:
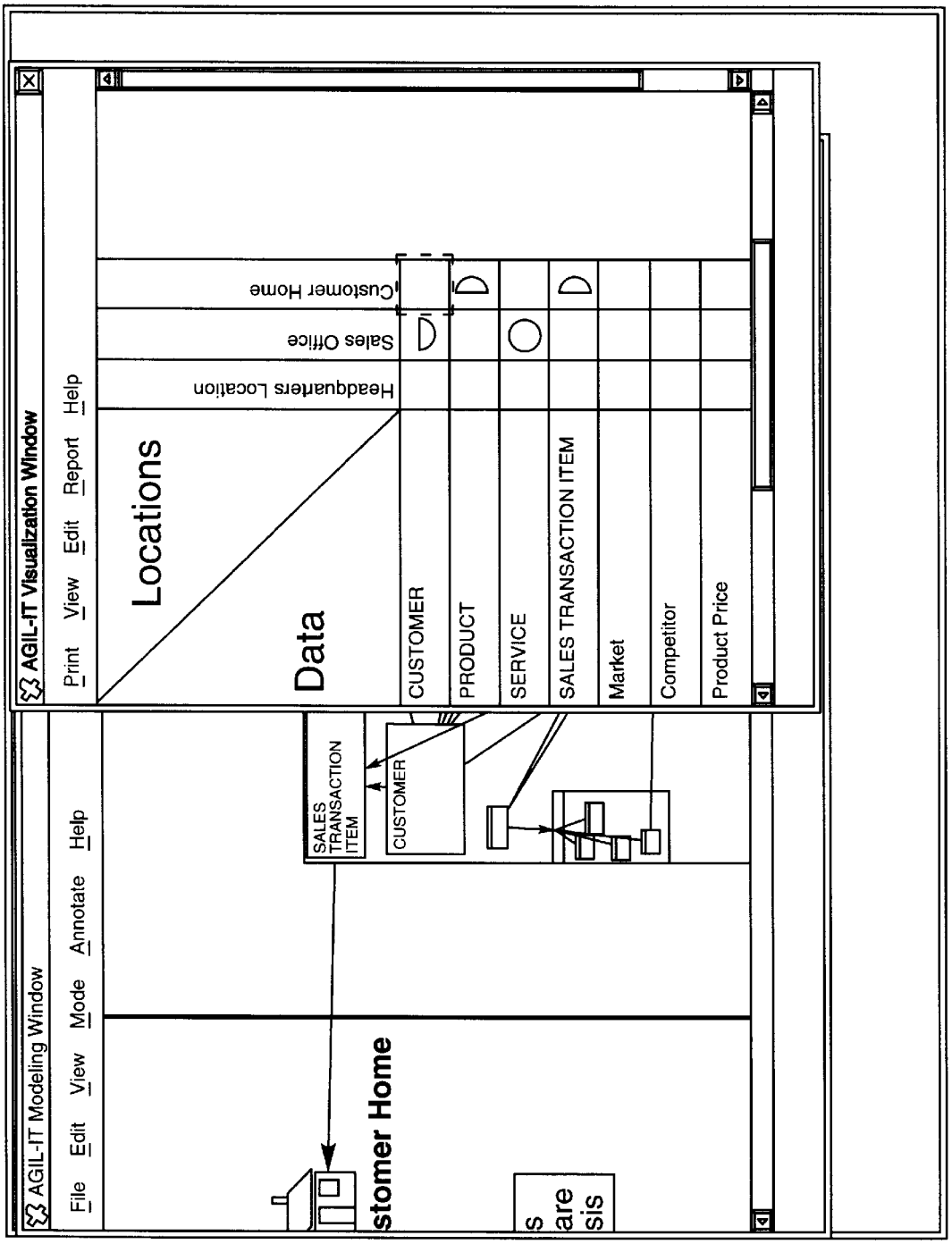
Figure 194:
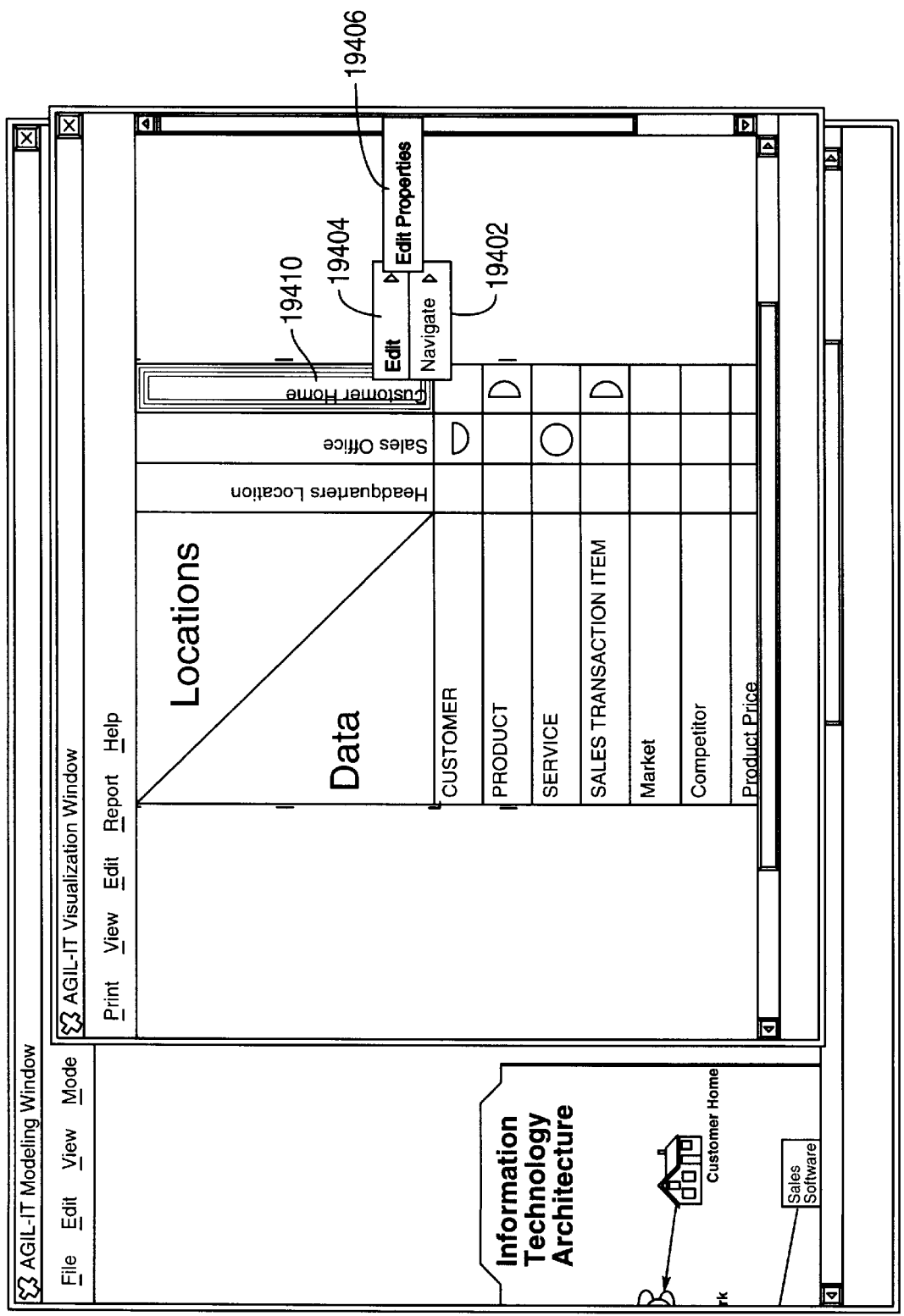
Figure 195:
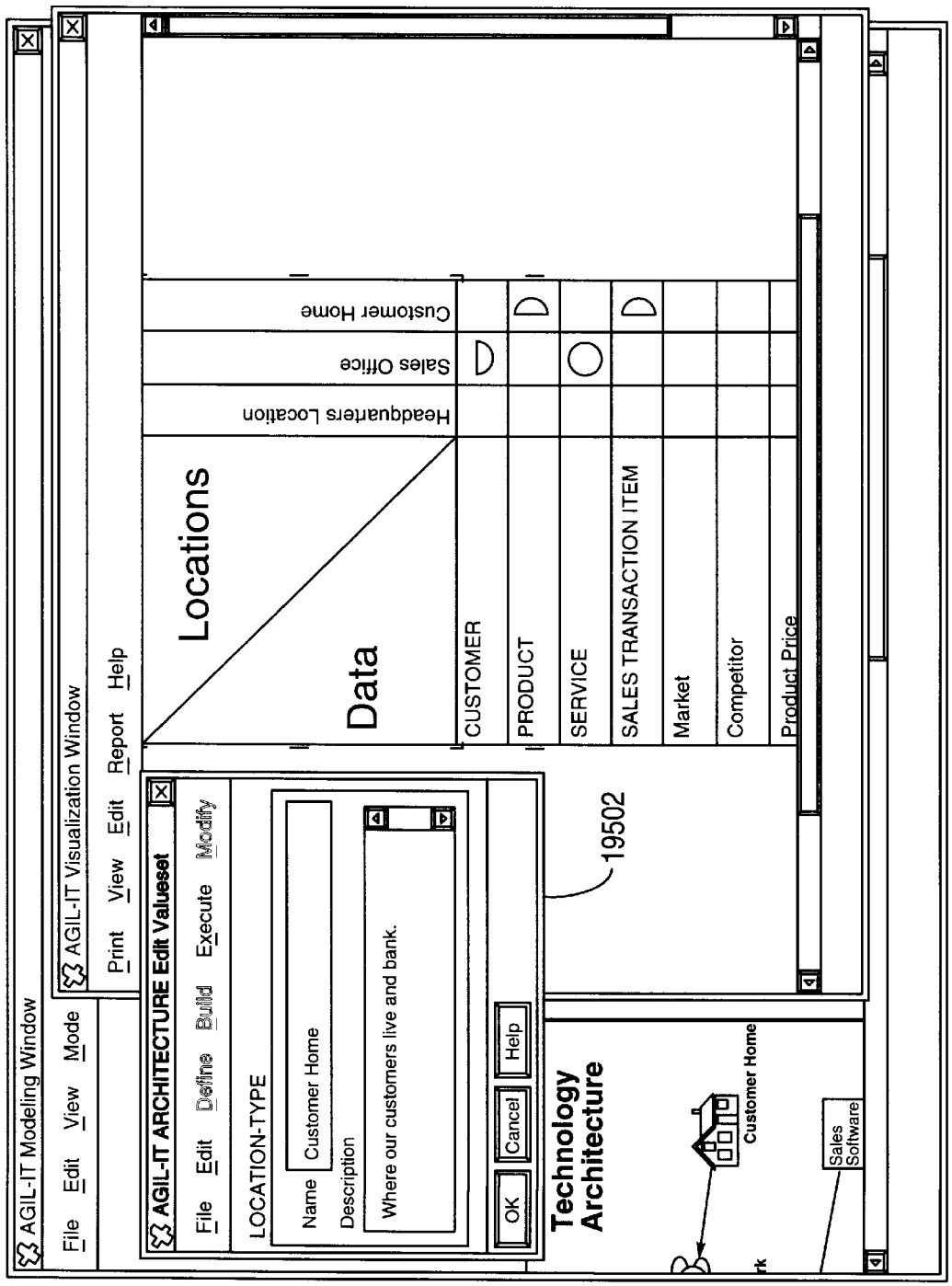
Figure 200:
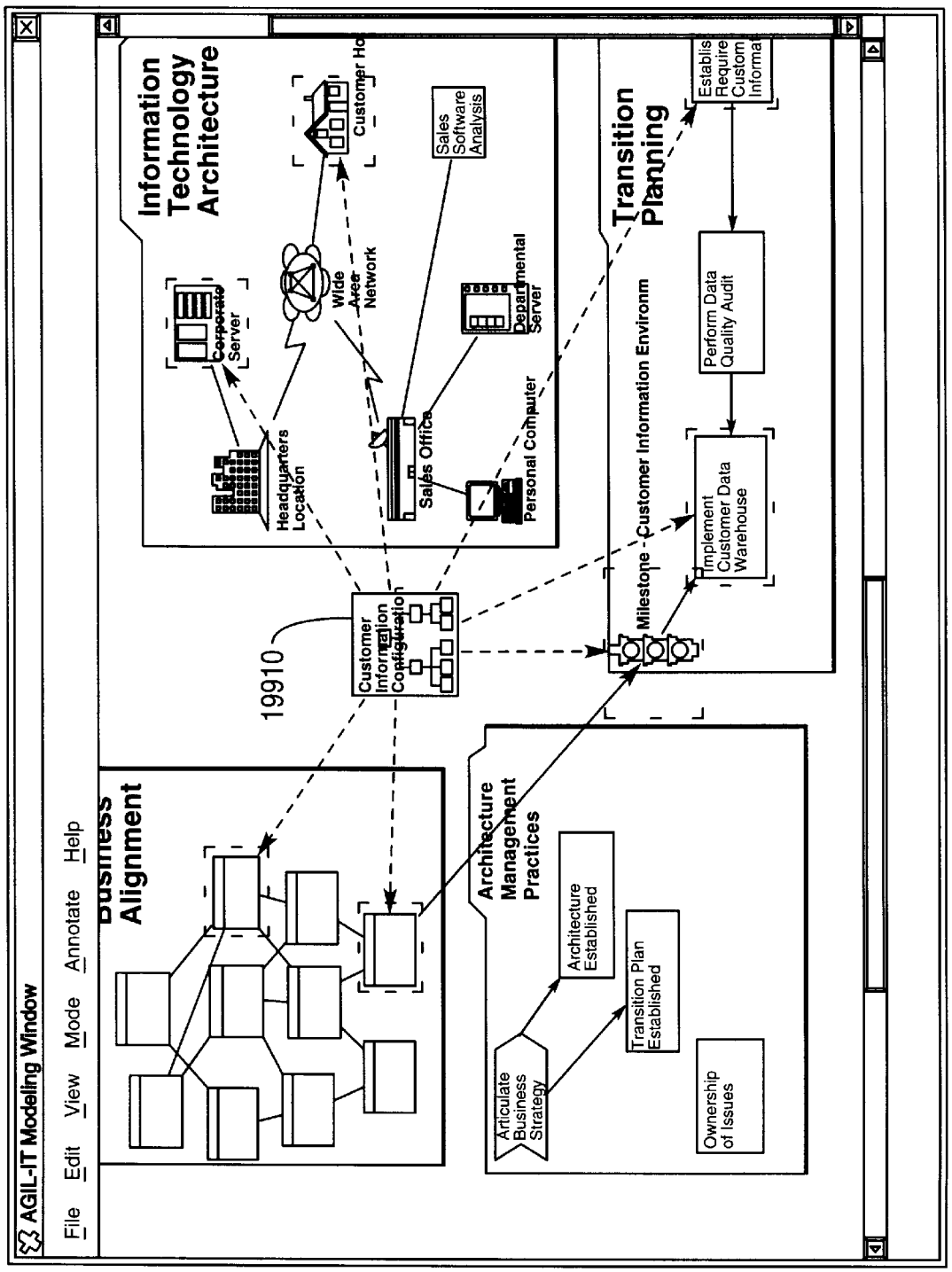
Figure 201:
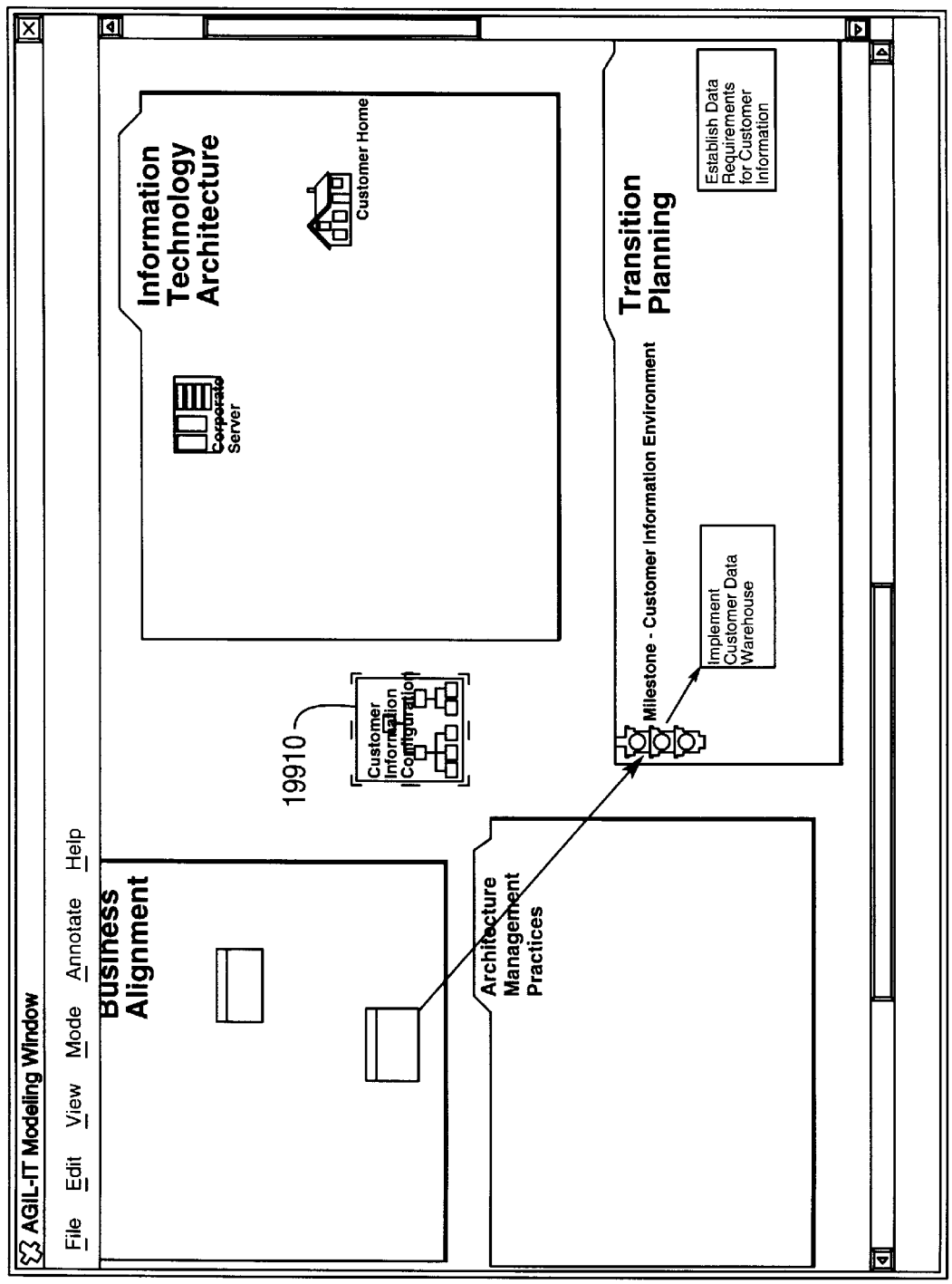
Figure 202:
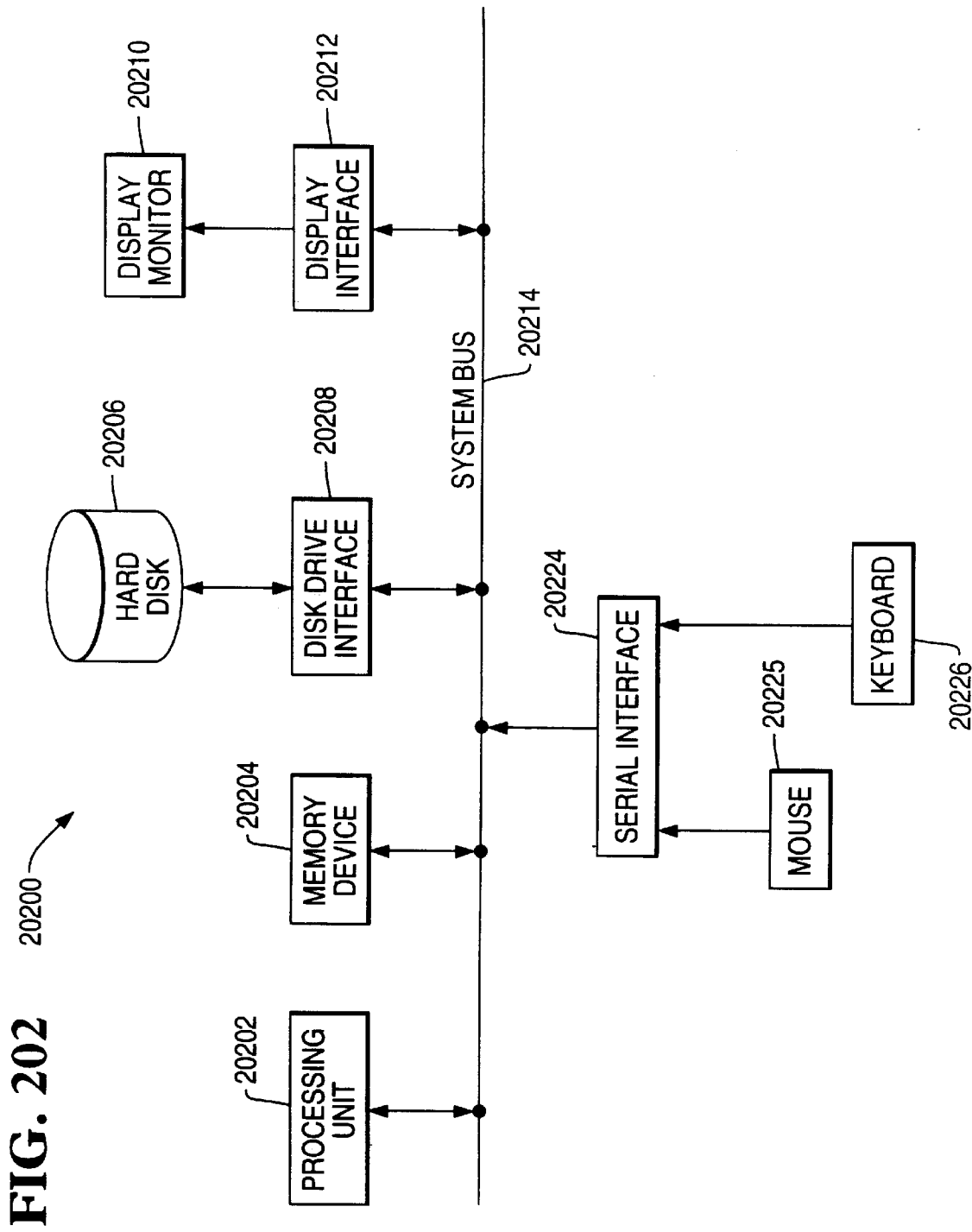

FIGS. 70–72 illustrate the process for displaying the textual content for an object;

FIGS. 73–74 illustrate the process for displaying the textual content for a relationship;

FIGS. 75–78 illustrate the process for locating the starting and ending objects of a relationship;

FIGS. 79–87 illustrate the process for locating an object at one level distance (one level up or down) in the IT architecture visual model;

FIGS. 88–90 illustrate the process for locating objects from a selected object at any location (up or down) within the IT architecture visual model by selecting and activating an item in a textual object list;

FIGS. 91–94 illustrate the process for locating objects from a list of objects at any location within the IT architecture visual model by selecting and activating an item in a visual object list;

FIGS. 95–97 illustrate the process for locating the objects at any level within an container;

FIGS. 98–105 illustrate the process for locating the objects having a certain type of characteristic; and FIGS. 106–110 illustrate the process for locating and navigating the objects from a selected object;

III. Changing and dynamically updating an IT (Information Technology) architecture visual model FIG. 111A shows a flowchart illustrating the steps of changing the parameters in an object and updating the changes in all the objects that are directly related or related via other objects to the changed object, in accordance with the present invention;

FIG. 111B shows a flowchart illustrating the steps of changing the parameters in a relationship and update all the changes in all the objects that are directly related or related via other objects to the changed relationship, in accordance with the present invention;

FIG. 112 shows a flowchart illustrating the detail steps within step 11108 shown in FIG. 111A;

FIG. 113 shows a flowchart illustrating the detailed steps within step 11112 shown in FIGS. 111A and 111B;

FIGS. 114–120 illustrate the updating process corresponding to changes of the parameters in an object;

FIGS. 121–128 illustrate the updating process corresponding to adding an object;

FIGS. 129–131 illustrate the updating process corresponding to deleting an object;

FIGS. 132–136 illustrate the updating process corresponding to changes of the parameter values in a relationship;

FIGS. 137–142 illustrate the updating process corresponding to adding a relationship between two objects;

FIGS. 143–145 illustrate the updating process corresponding to deleting a relationship between two objects;

IV. Textually navigating an IT (Information Technology) architecture visual model FIG. 146 shows a display on a computer screen, illustrating a process to generate a navigable, symbolic and textual-based deliverable based on the IT architecture visual model shown in FIG. 7;

FIG. 147 shows a display on a computer screen illustrating the file structure generated by the process shown in FIG. 146;

FIG. 148 shows a display on a computer screen illustrating a menu of Internet Explorer by Microsoft;

FIG. 149 shows a display on a computer screen, illustrating the beginning portion of the report for Business Alignment container;

FIG. 150 shows a display on a computer screen illustrating the table for OBJ3 object;

FIG. 151 shows a display on a computer screen illustrating the table for STRAT3 object;

FIG. 152 shows a display on a computer screen illustrating the table for CSF2 object;

FIG. 153 shows a display on a computer screen illustrating the table for Transition Milestone object;

FIG. 154 shows a display on a computer screen illustrating the beginning portion of the report for Transition Planning container;

FIG. 155 shows a display on a computer screen illustrating the table for Implement Customer Data Warehouse object;

V. Using utility objects for displaying an IT (Information Technology) architecture visual model in a symbol-based table FIGS. 156–158 illustrate a process of establishing a utility container like that created for a symbol-based decision rationale table;

FIGS. 159A, 159B and 160 illustrate the process of establishing a utility type object within the symbol-based decision rationale table;

FIGS. 161–168 illustrate a process of establishing the two dimensions of the symbol-based decision rationale table;

FIGS. 169–171 illustrate a process of establishing headings in the symbol-based decision rationale table;

FIGS. 172–174 illustrate a process of establishing a utility type of object;

FIGS. 175–181 illustrate a process of establishing relationships between the objects that will be included in the symbol-based decision rationale table;

FIGS. 182–187 illustrate a process of establishing a relationship by using the symbol-based decision rationale table;

FIGS. 188–189 illustrate a process of deleting a relationship by using the symbol-based decision rationale table;

FIGS. 190–193 illustrate a process of navigating a relationship or an object by using the symbol-based decision rationale table;

FIGS. 194–195 illustrate a process of displaying or updating the properties for a relationship or an object by using the symbol-based decision rationale table;

FIGS. 196–201 illustrate a process of creating, configuring, and using a general visual modeling technique to readily locate and navigate a configuration of objects contained within an IT architecture visual model; and FIG. 202 shows a computer system that can run the Agil-IT visual modeling tool, in accordance with the present invention.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiment(s) will be readily apparent to those skilled in the art, and the principles defined herein may be applied to other embodiments and applications without departing from the spirit and scope of the invention. Thus, the present invention is not intended to be limited to the embodiment(s) shown, but is to be accorded with the broadest scope consistent with the principles and features disclosed herein.

The method in the present application is suitable for planning and designing object-oriented systems. In an object-oriented system, an object combines static data structure and dynamic processing behavior, which are insulated from other objects, a relationship defines a conceptual connection between two objects, and a message provides a mechanism to enable two objects, which are otherwise insulated from each other, to interact with each other through the relationships between these two objects.

Figure 1:
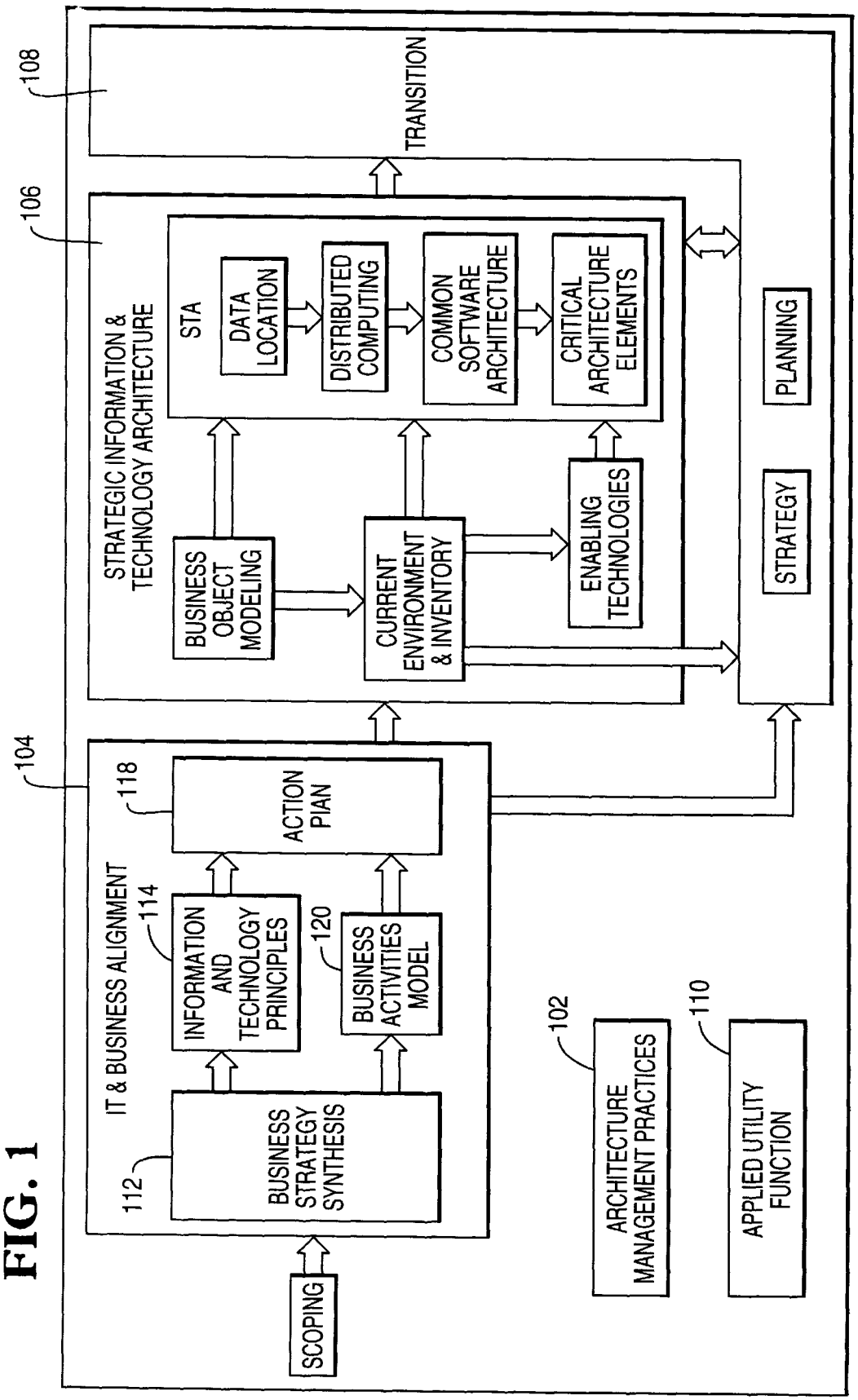
FIGS. 1–2 illustrate a methodology, comprising four sub-methodologies, for building, maintaining, and operating an IT architecture visual model, in accordance with the present invention.

Referring to FIG. 1, there is shown an illustration of a methodology (called Global Information and Technology Planning or GITP) used in IT architecture consulting by NCR Corporation. The methodology comprises four components (or sub-methodologies) and an applied utility function, namely: (1) Architecture Management Practices 102, (2) IT and Business Alignment 104, (3) Strategic Information and Technology Architecture 106, (4) Transition Strategy and Planning 108, and (5) Applied Utility Function 110. Each of the components is designed to accomplish one or more aspects of the information technology planning process and the function is used to support these IT aspects.

Architecture Management Practices (AMP) process 102 establishes a framework for successfully completing the IT architecture and for reviewing and maintaining the architecture as business condition changes. In this process, IT architecture consultants work with the company's personnel to mentor the architecture owner and to define architecture management tasks.

Figure 2:
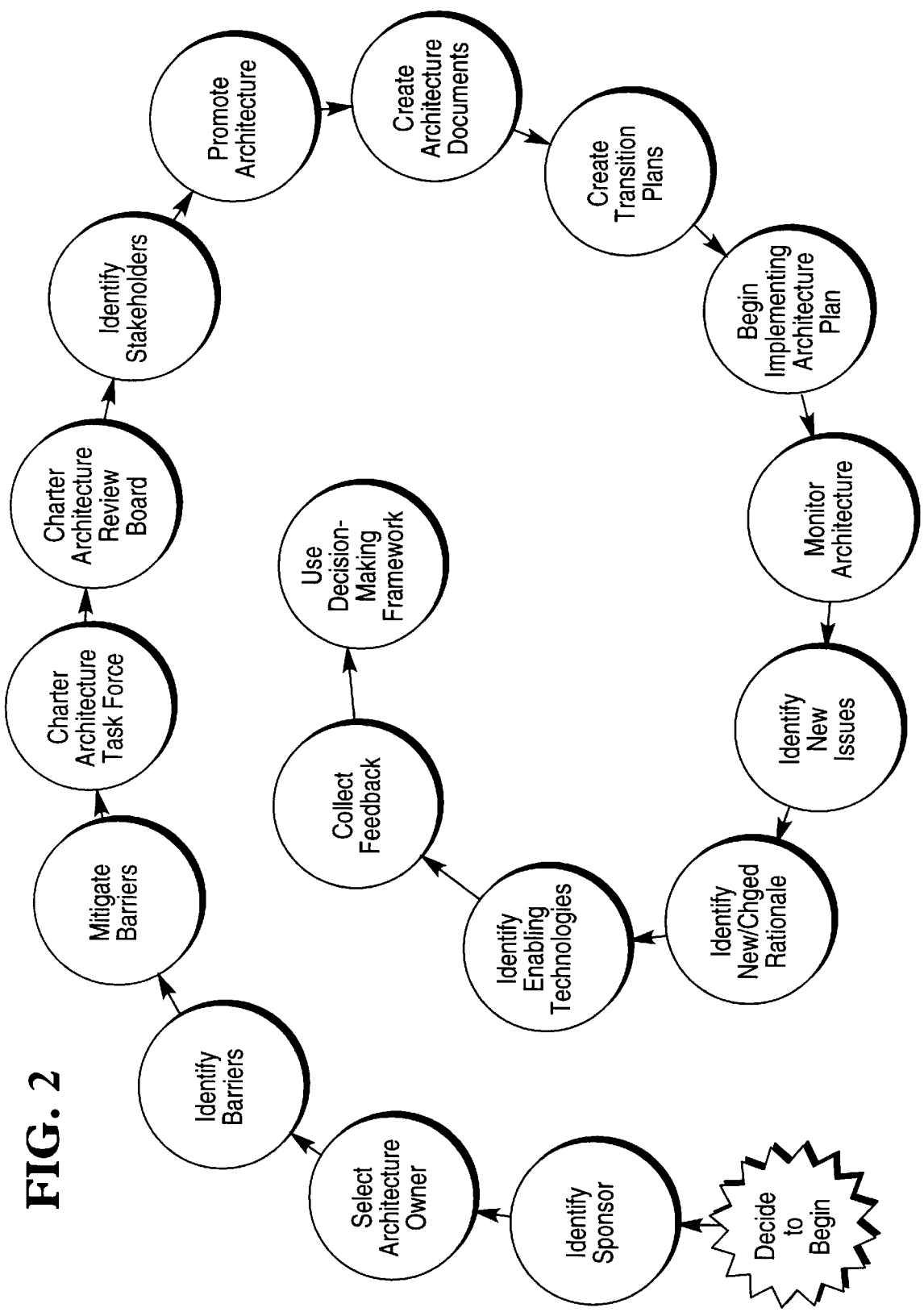

Referring to FIG. 2, there is shown various tasks in Architecture Management Practices process 102. As shown in FIG. 2, three of the tasks are to:

(1) identify and mitigate barriers to the success of the architecture effort;

(2) promote the IT architecture within the company; and (3) ensure that an architecture review process is created to guarantee successful architecture development, life cycle management, and compliance.

Since business requirements and technology innovation changes are constantly occurring, an IT architecture must be adaptable to these changes. The activities in Architecture Management Practices process 102 provide for continuous updating of the architecture to support an evolving business vision.

IT and Business Alignment process 104 ensures that a company's business drivers (such as goals, objectives, and critical success factors) are documented as a baseline for assuring the explicit linkage of the IT infrastructure to business requirements. If IT architectures are defined and implemented with purely a technology focus, business needs may not be satisfied. Therefore, IT and Business Alignment process 104 defines the company's business by:

(1) determine the customer's long-range business goals and strategies;

(2) outlining IT principles, which indicates how the enterprise will use information technology over the long term in support of the business;

(3) creating a model of the customer's enterprise that identifies areas in which architecture planning can help maximize business success; and (4) documenting key issues and recommended actions.

As shown in FIG. 1, IT and Business Alignment process 104 comprises four activities:

(1) to develop business strategy synthesis, including the tasks of: (a) identifying, validating, and documenting the company's business vision, goals, objectives, strategies, and critical success factors: (b) performing an environmental analysis to determine internal and external influences that help or hinder achieving the goals and objectives, and (c) identifying the company's requirements;

(2) to develop information and technology principles, including the tasks of: (a) extracting information and technology principles from business requirements, (b) formulating justification for each information and technology principle, and (c) determining the implications of each principle on the IT architecture;

(3) to develop business activities model, including the tasks of: (a) identifying and documenting the company's business activities, (b) prioritizing key business activities and sub-activities according to their strategic value to the enterprise, (c) identifying the relative reliance of business activities and sub-activities on IT, as well as the effectiveness of IT in the enterprise, and (d) preparing business value models that assist in choosing which business activities should be the focus of the consulting engagement; and (4) to develop a recommended action plan, including the tasks of: compiling and consolidating actionable themes for the company to address, and (b) identifying recommended initiatives.

Strategic Information and Technology Architecture (SITA) process 106 helps an IT consultant attain a clear understanding of the architecture that best fulfills a company's evolving needs. The IT strategy and architecture plan are based on inputs from the IT and Business Alignment process 104.

The focus in the SITA activities is on the customer's business requirements, information needs, and technology requirements. Considering this focus, the main objectives of the Strategic Information and Technology Architecture process 106 are:

(1) to determine major business objects important to the enterprise;

(2) to discover aspects of the customer's current IT environment for which future planning is essential;

(3) to define data distribution and client/server strategies;

(4) to identify standards and technologies needed to support business; and (5) to produce a business-focused software architecture which links key business activities with information technology necessary to support those activities.

Therefore, Strategic Information and Technology Architecture process 106 comprises four major activities:

(1) to develop a business object model, including the tasks of: (a) capturing high-level objects or entities of interest to the company, (b) identifying relationship among those objects or entities, (c) defining the relationship of the objects or entities to business activities;

(2) to gather current environment and inventory information, including the tasks of: (a) providing a baseline for defining the target architecture, and (b) creating a starting point for transition strategies and planning;

(3) to define enabling technologies, including the tasks of: (a) determining the areas that are likely to change within the business, in order to build flexibility into the architecture, and (b) identifying technologies that can enable the plan; and (4) to develop strategic technical architecture, in including the tasks of: (a) identifying logical location and distribution schemes for high-level data entities and objects identified in the business object modeling activity, (b) creating rules and guidelines for distributing application elements, (c) identifying software architecture requirements by using an object oriented approach to application architecture, and (d) defining the standards and technologies which comprise the IT computing infrastructure.

The primary objective of Transition Strategy and Planning process 108 is to assist a customer in determining the best method for incrementally moving business initiatives and existing IT infrastructure to the targeted state. In addition to identifying critical elements common across business and technology initiatives, Transition Strategy and Planning process 108 organizes them into tactical planning initiatives. These initiatives include short term actions as well as initiatives that are logically sequenced over a specific time frame. All recommendations are linked back to the business priorities explicitly defined by the customer.

Transition Strategy and Planning process 108 comprises six activities:

(1) to blend business and technology strategies into actionable transition plans;

(2) to reduce redundant project initiatives;

(3) to identify and mitigate conflicting project initiatives;

(4) to incorporate ongoing projects and initiatives as part of the transition process;

(5) to identify dependencies between business, technology and organizational imperatives; and (6) to provide a global, or integrated, view of transition activities.

The applied utility function is focused at practically applying the use of visual modeling techniques to assist in the understanding and analysis of IT architecture visual models based upon the results of the four sub-methodologies. Therefore, the applied utility function's purpose is to support the four sub-methodologies use within the context of an IT architecture visual model.

Figure 7:
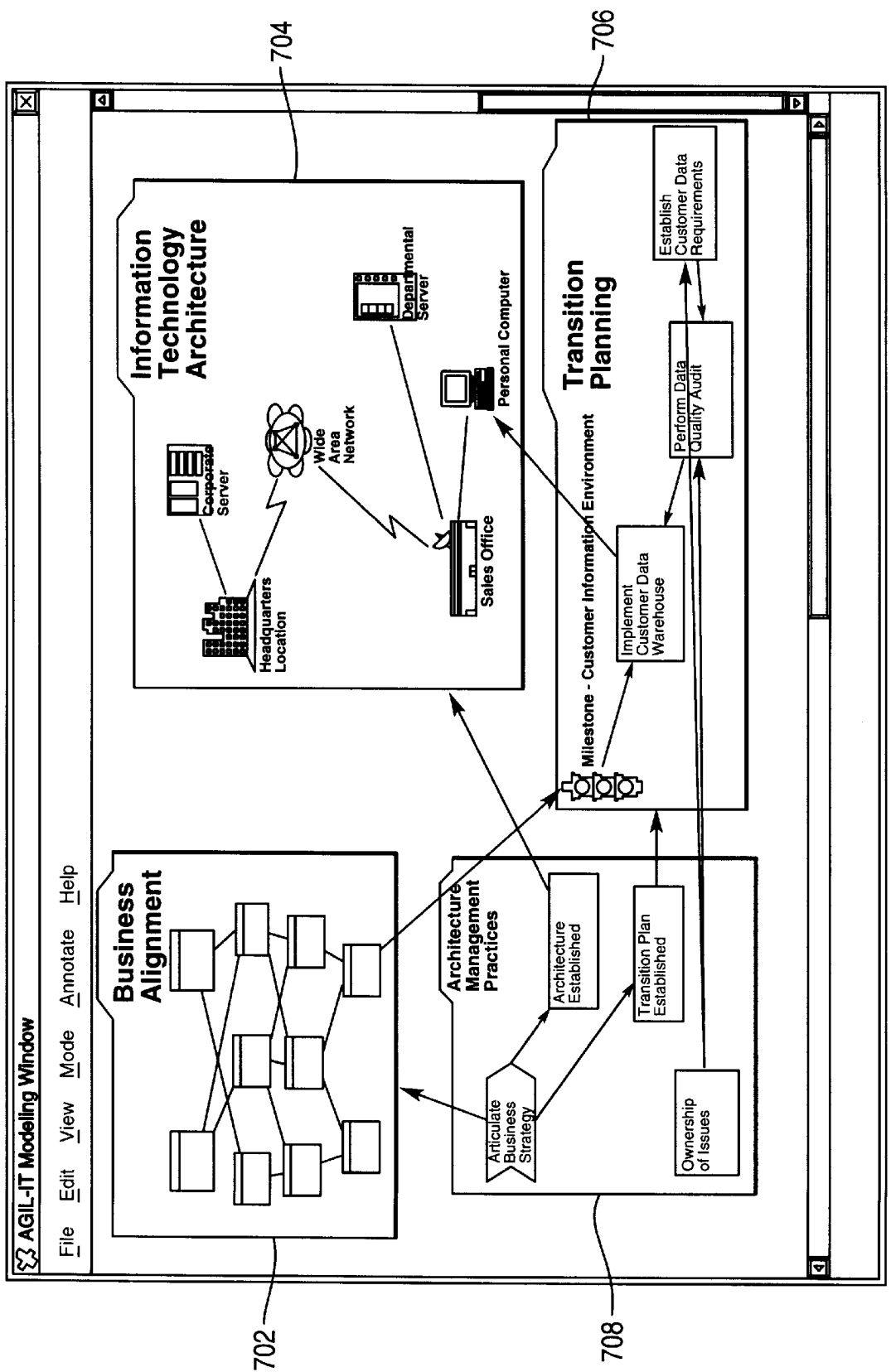
FIG. 7 shows a display of a computer screen, illustrating an IT architecture visual model.

It should be noted that each of the four sub-methodologies (or processes) and the applied utility function each has its unique characteristics. More specifically, Business Alignment sub-methodology is a hierarchical decomposition and abstraction modeling process. It consists of relationship types between objects where one object is further defined or specified in terms of lower or higher level objects. These relationship types are hierarchical in nature where the top level object is decomposed or abstracted as needed to represent the sub-methodology in a hierarchy of layers, either adding specificity or generalization from the root object or objects contained in the hierarchy. This type of methodology is illustrated in FIG. 7 Business Alignment 702.

Strategic Information & Technology Architecture 106 sub-methodology is a networked relationship modeling process. By using networked means of representation, it consists of type relationships between objects where the information used in the IT architecture can flow from one object to another according to a respective relationship. The network presentation allows flexibility in that how relationships between objects are established, but still remains a representative structure for relating objects in a networked representation. Additionally, the networked approach does not require varying levels of decomposition or abstraction. In the example illustrated in FIG. 7 Information Technology Architecture 704, all objects in the networked model representation are conceptually or logically at the same level as specified by this methodology, but are related in a flexible network fashion for ease of understanding.

Architecture Management Practices 102 sub-methodology is a linear or fixed order modeling process. It provides a visual representation for the process where step by step actions are used to show how the process is performed. Each object in this sub-methodology is dependent on only one other object in a linear fashion. This type of methodology is useful for representing process where a fixed order of steps is required. This type of methodology is illustrated in FIG. 2.

Transition Strategy and Planning 108 sub-methodology is a synchronized and time-based modeling process. It takes the linear modeling approach further by adding time-based synchronization and potentially parallelism across multiple linear process represented by objects representing steps in a process. This is often useful for project planning where multiple threads of project execution must be performed in parallel and eventually join at a milestone point in a project plan. A simple example of this type of methodology is illustrated in FIG. 7 Transition Planning 706.

The Applied Utility Function 110 defines specific visual modeling representations of the objects and relationships created by the other four sub-methodologies. Therefore, its methodology is unique to each type of visual modeling technique applied within the IT architecture visual model in which these functions are used. The applied utility functions are created and used in a manner that is consistent with the creation and use of the objects and relationships established for the four sub-methodology processes. Therefore, the use of this applied utility function can be performed seamlessly with the use of the other four sub-methodology processes when creating an IT architecture visual model.

Figure 3:
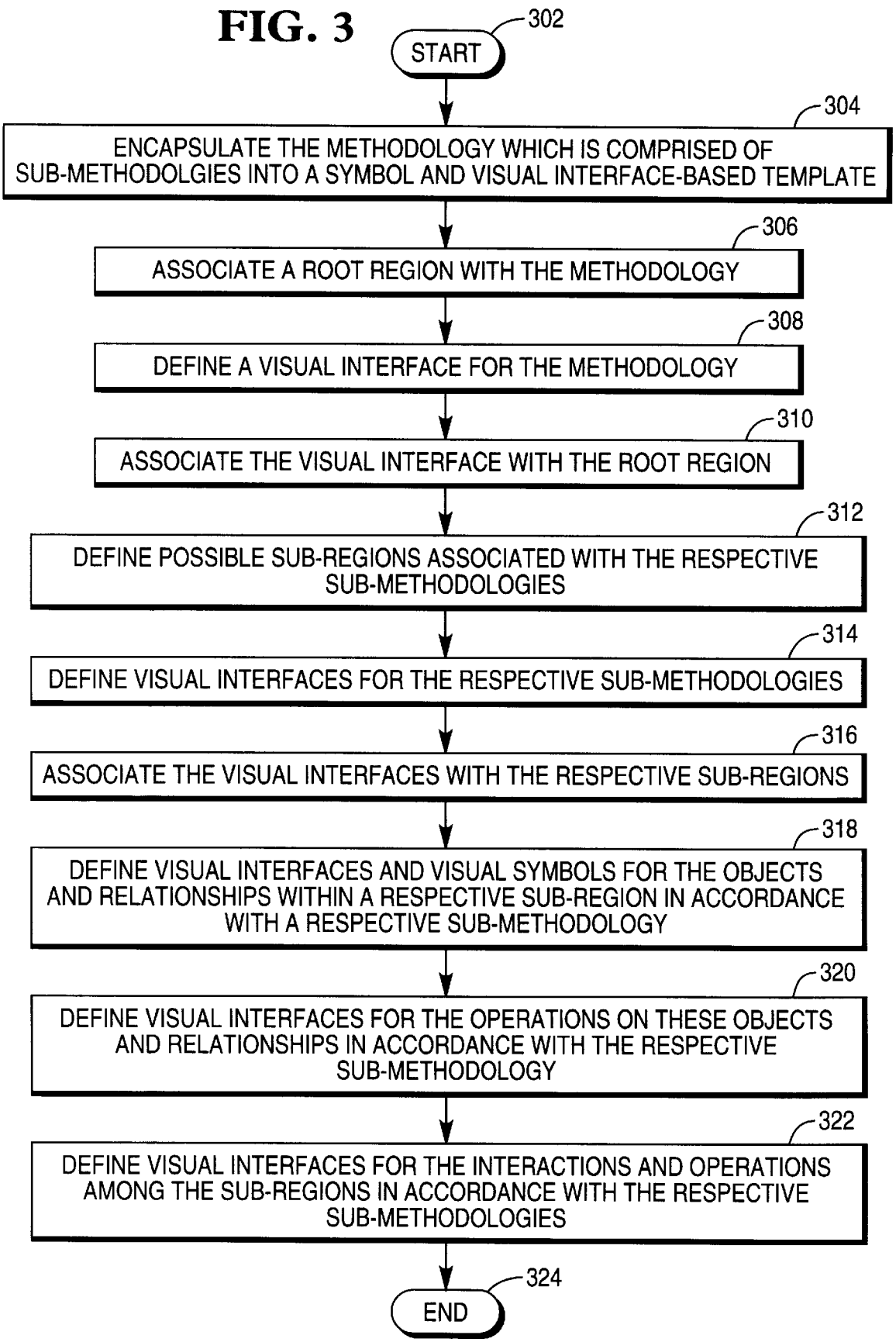
FIG. 3 shows a flowchart illustrating the process of encapsulating and capturing the knowledge and information in a methodology by using the visual modeling tool (called Agil-IT), in accordance with the present invention.

Referring to FIG. 3, there is shown a flowchart illustrating the process of encapsulating and capturing the knowledge and information in a methodology by using the visual modeling tool (called Agil-IT) designed by NCR Corporation, in accordance with the present invention.

As shown in FIG. 3, step 304 encapsulates information and knowledge of a methodology that is comprised of several sub-methodologies into a symbol and visual interface-based template. The template then represents the visual modeling encapsulation of the sub-methodologies from which IT architecture —visual models will be developed.

Step 306 defines a root region associated with the methodology. This root region serves as a 'starting point' for capturing IT architecture objects and relationships within a visual model.

Step 308 defines a visual interface to reflect the information and knowledge of the methodology to the visual modeling tool user.

Step 310 associates the visual interface for the methodology with the root region.

Step 312 defines sub-regions associated with the respective sub-methodologies, in accordance with the entire methodology.

Step 314 defines visual interfaces to reflect the information and knowledge needed or produced by the respective sub-methodologies.

Step 316 associates the visual interfaces with the respective sub-regions.

Step 318 defines visual interfaces and visual symbols for the possible objects and relationships within a respective sub-region in accordance with a respective sub-methodology.

Step 320 defines visual interfaces for the operations on these objects and relationships in accordance with each respective sub-methodology.

Step 322 defines visual interfaces for the interactions and operations among the sub-regions in accordance the methodology and sub-methodologies.

Figure 4:
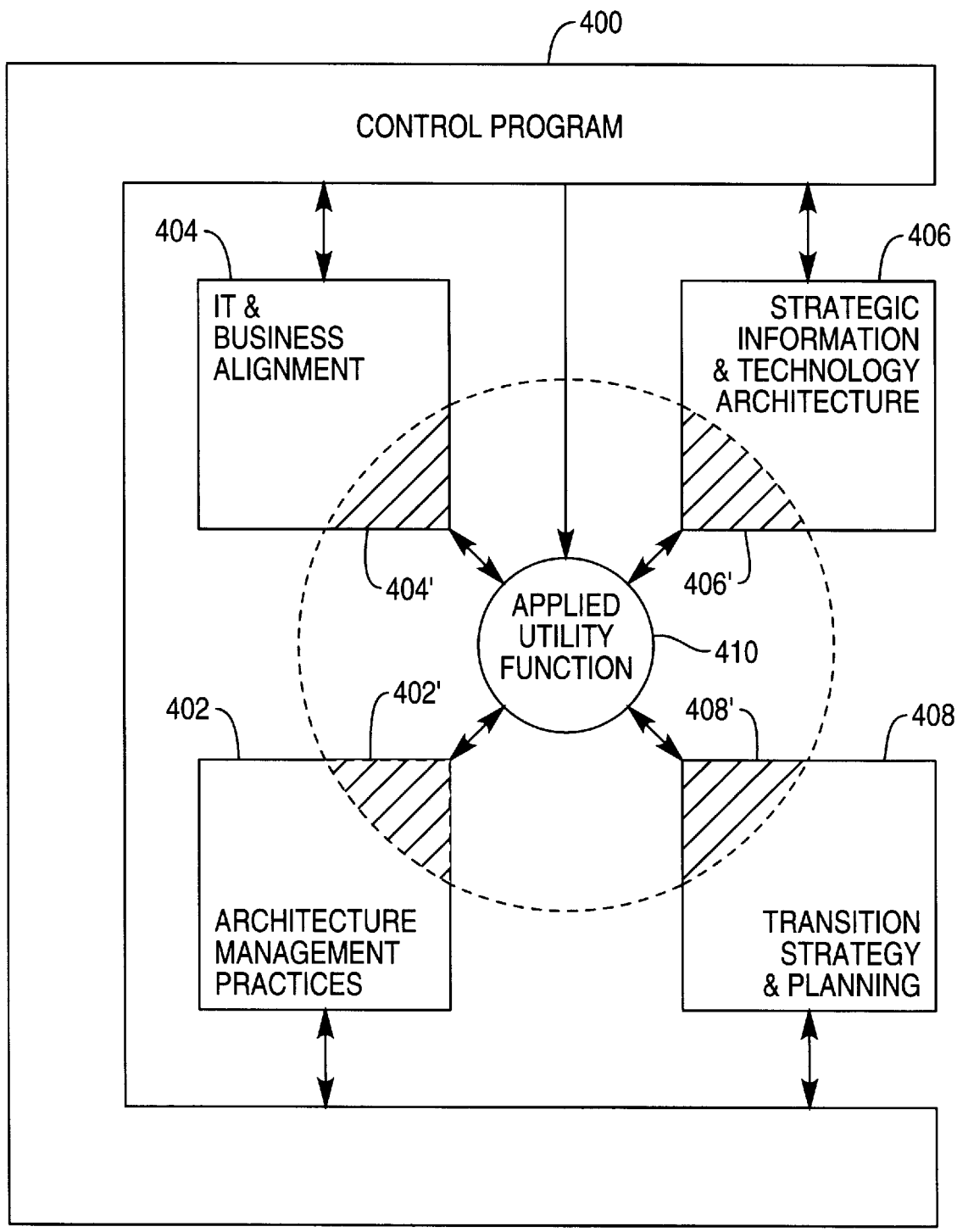
FIG. 4 shows the logical relationships among the software components within the Agil-IT modeling tool, in accordance with the present invention.

Referring to FIG. 4, there is shown the logical relationships among the software components corresponding to the methodology and sub-methodologies as shown in FIG. 1 within the Agil-IT modeling tool developed and owned by NCR Corporation.

The Agil-IT modeling tool comprises six software components, including: (1) control program 400, Architecture Management Practices 402, IT and Business Alignment 404, Strategic Information and Technology Architecture 406, Transition Strategy and Planning 408, and Applied Utility Function 410.

As shown in FIG. 4, control program 400 controls the operation of the other five software components. Control program 400 also enables the display of visual interfaces to invoke the other five software components based upon the methodology specifications encapsulated within the template (FIG. 3, 304).

Each of the other five software components 402, 404, 406, 408, and 410 is able to: (1) provide visual interfaces associated with its respective sub-region according its respective sub-methodology, (2) provide visual symbols for the possible objects and relationships within the respective sub-region, and (3) provide descriptions and parameters for the objects and relationships. It should be noted that this process can be used in a recurring (or nested) fashion. By way of example, IT and Business Alignment sub-methodology shown in FIG. 1 further contains four activities (Business Strategy Synthesis 112, Information and Technology Principles 114, Action Plan 118, and Business Activity Model 120). Correspondingly, IT and Business Alignment software component 404 is able to provide a visual interface reflecting these four activities within IT and Business Alignment sub-methodology. In response to selecting one of the four activities, IT and Business Alignment software component is able to provide the visual interface for the selected activity.

Software components 402, 404, 406 and 408 also have their respective inter-methodology software components 402', 404', 406' and 408'. Each of the inter-methodology software components is able to provide: (1) the knowledge as to how to pass the information about the objects and inter-region relationships within its associated sub-region to the other three inter-methodology software components, (2) the knowledge as how to apply the information passed from the other three inter-methodology software components. The Applied Utility Function is able to provide the knowledge as to how to relate to and pass inter-region information from objects contained within one of the four sub-methodology sub-regions.

Figure 5:
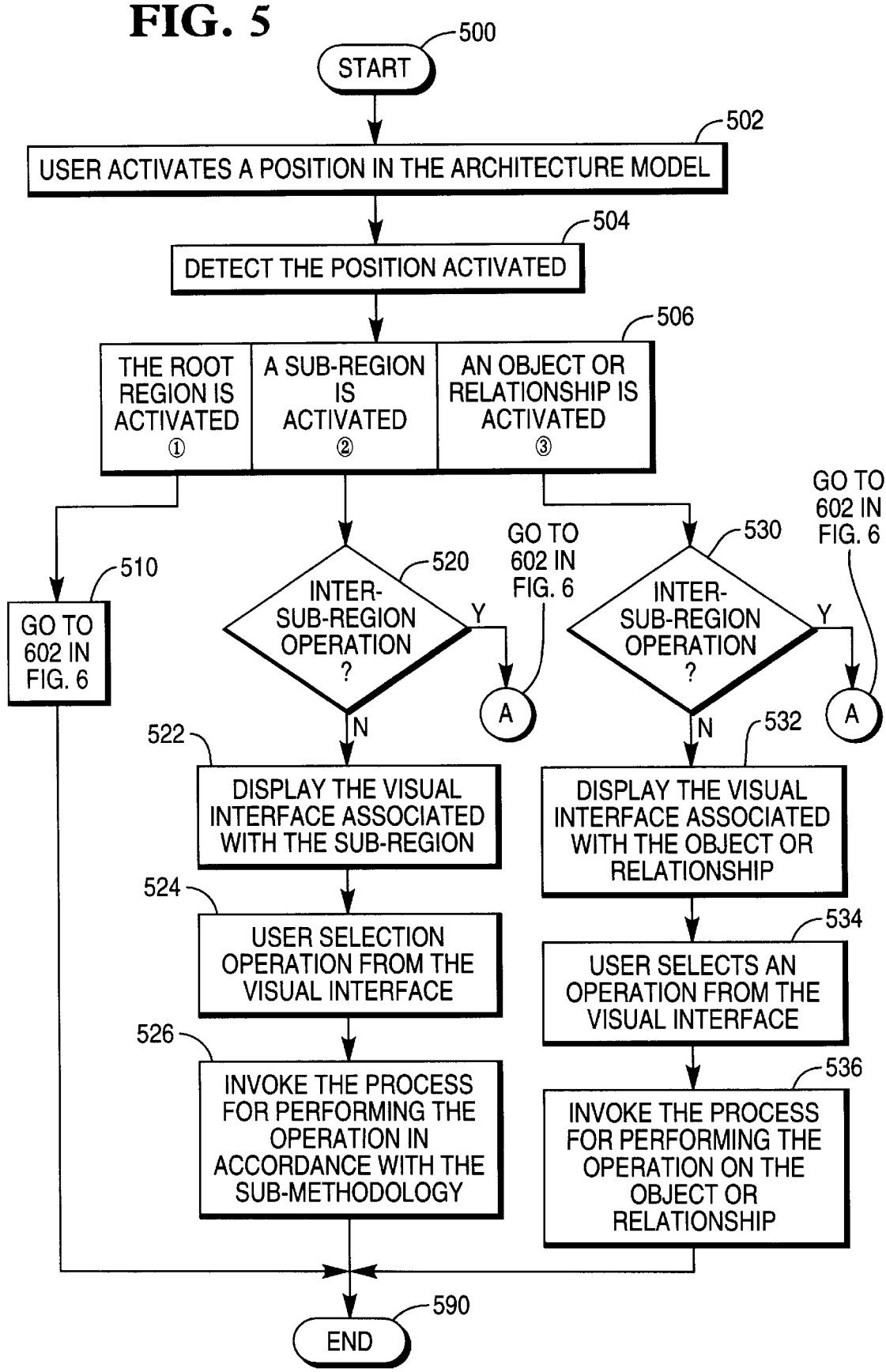
FIG. 5 shows a flowchart illustrating a process of building an IT visual model and recording associated methodology and sub-methodology information into the IT visual model, in accordance with the principles described in FIGS. 14.

Referring to FIG. 5, there is shown a flowchart illustrating a process of building an IT architecture visual model and recording associated methodology and sub-methodology information into the IT architecture visual model, in accordance with the principles described in FIGS. 1–4.

As shown FIG. 5, in step 502, a user activates a position within the root region, a sub-region, or a visual symbol, in the IT architecture visual model.

Step 504 detects the position that has been activated.

Step 506 detects one of the three possible activated positions, that is the activated position is: (1) within the root region (but outside of the five sub-regions), (2) within a sub-region (but outside of objects or relationships), and (3) on an object or relationship symbol.

Figure 6:
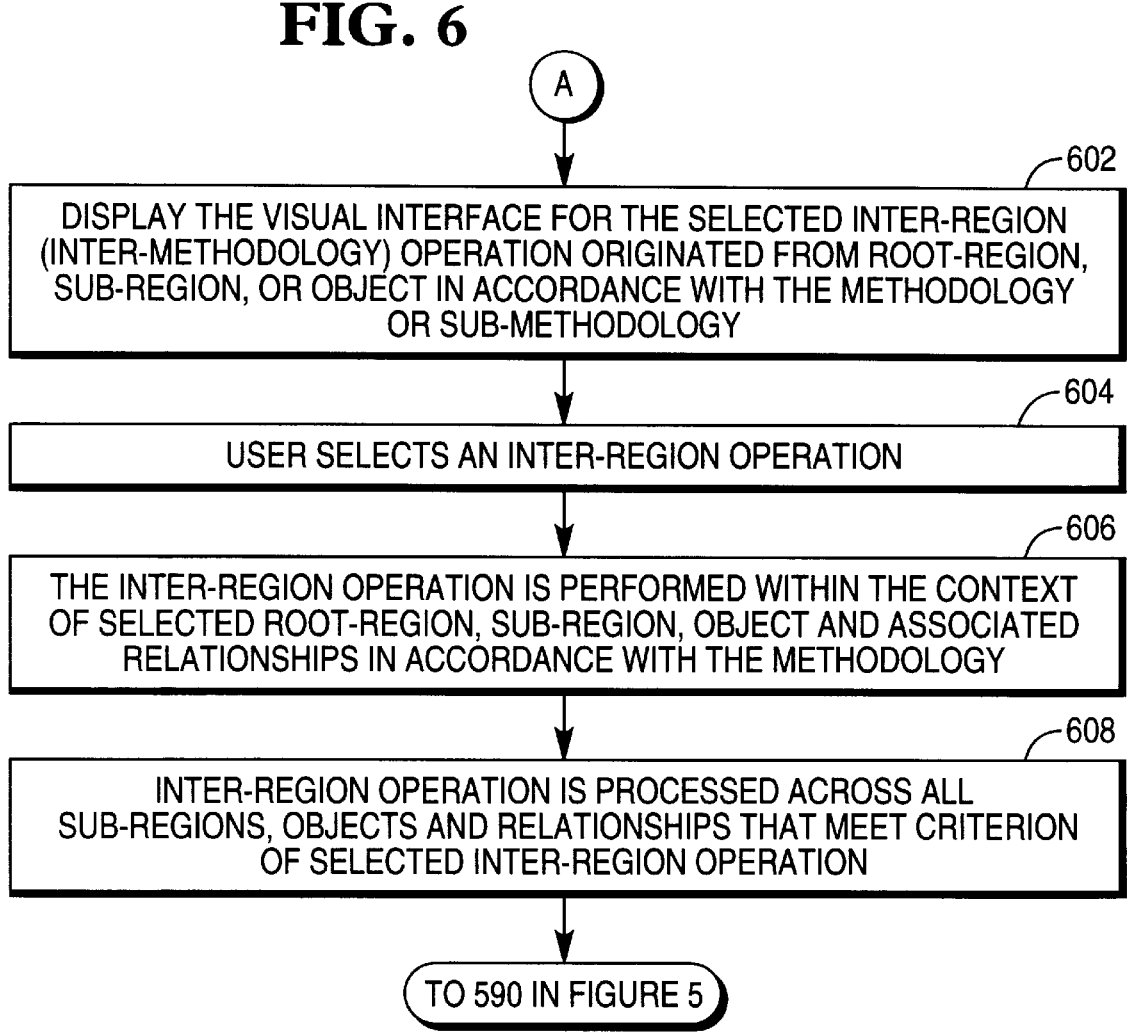
FIG. 6 shows a process of performing inter-sub-region (or cross-sub-region) operation, in accordance with the principles described in FIGS. 1–4.

In response to situation (1) at step 506 (a position within the root region is activated), the process is led to the steps shown in FIG. 6 to handle the inter-sub-region operation as requested from the root region.

In response to situation (2) at step 506 (a position within a sub-region is activated), the process is led to step 520.

Step 520 determines whether the operation requested by the user is an inter-sub-region operation or an intra-sub-region operation. The process is led to the steps listed in FIG. 6 if the operation requested is an inter-sub-region operation. And the process is led to step 522 if the operation requested is an intra-sub-region operation.

Step 522 displays the visual interface associated with the respective region in accordance with the respective sub-methodology. The visual interface reflects the knowledge and information of the respective sub-methodology.

In step 524, the user selects an operation from the visual interface. Step 526 invokes the process for performing the selected operation in accordance with the respective sub-methodology related to the sub-region which is activated in situation 2, step 506.

In response to situation (3) at step 506 (a position on an object or a relationship is activated), the process is led to step 530.

Step 530 determines whether the operation requested by the user is an inter-sub-region operation or an intra-sub-region operation. The process is led to the steps shown in FIG. 6 if the operation requested is an inter-sub-region operation. And the process is led to step 532 if the operation requested is an intra-sub-region operation.

Step 532 displays the visual interface associated with the object or relationship in accordance with the respective sub-methodology. The visual interface reflects the knowledge and information of the respective sub-methodology for the object or relationship.

In step 534, the user selects an operation from the visual interface.

Step 536 invokes the process for performing the selected operation in accordance with the respective sub-methodology for the activated object or relationship in the sub-region.

Referring to FIG. 6, there is shown a process of performing inter-sub-region (or multiple sub-region) operation, in accordance with the principles described in FIGS. 1–4.

As shown in FIG. 6, step 602 displays the visual interface for the selected inter-sub-region (inter-sub-methodology)

operation originated from the root region, activated sub-region, activated object or activated relationship in accordance with the methodology (GITP) or respective sub-methodology.

In step 604, the user selects an inter-region operation from the visual interface.

Step 606 performs the inter-sub-region operation within the context of the activated root region, sub-region, objects or relationships, in accordance with the methodology or sub-methodology.

Step 608 performs inter-region operation on objects or relationships across two or more sub-regions that meet criteria of the selected inter-region operation. The operation is then led to step 590 in FIG. 5.

Referring to FIG. 7, there is shown a display of a computer screen, illustrating an IT architecture visual model. The IT architecture visual model is created and can be navigated by using the visual modeling tool (called Agil-IT) designed by NCR Corporation. As shown in FIG. 1, there are four containers, namely: (1) Business Alignment, (2) Architecture Management Practices, (3) Information Technology Architecture, and (4) Transition Planning. Within the four containers, the relationships are depicted by lines and objects are depicted by the other symbols. It should be noted that relationships contained within the IT architecture visual model can be hidden from display even though the relationship still exists within the IT architecture visual model. It should be appreciated that the simple model shown in FIG. 7 is an example of what can be an IT architecture visual model containing hundreds of containers and thousands of objects and relationships.

I. Building an IT Architecture visual model

Figure 8:
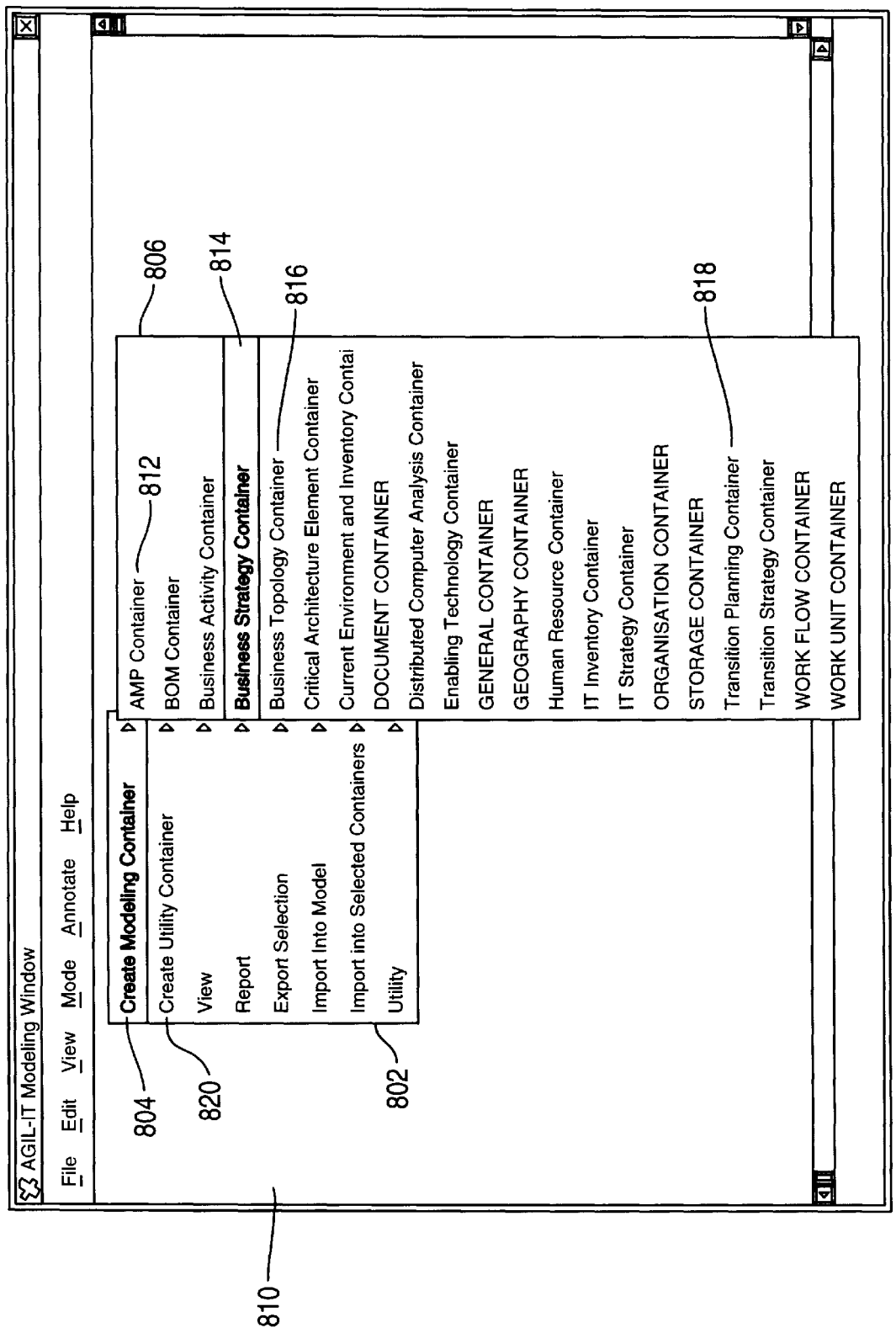
FIGS. 8–10 illustrate the process for creating Business Alignment container.

FIGS. 8–69 illustrate the process for building the IT architecture visual model as shown in FIG. 7.

Figure 9:
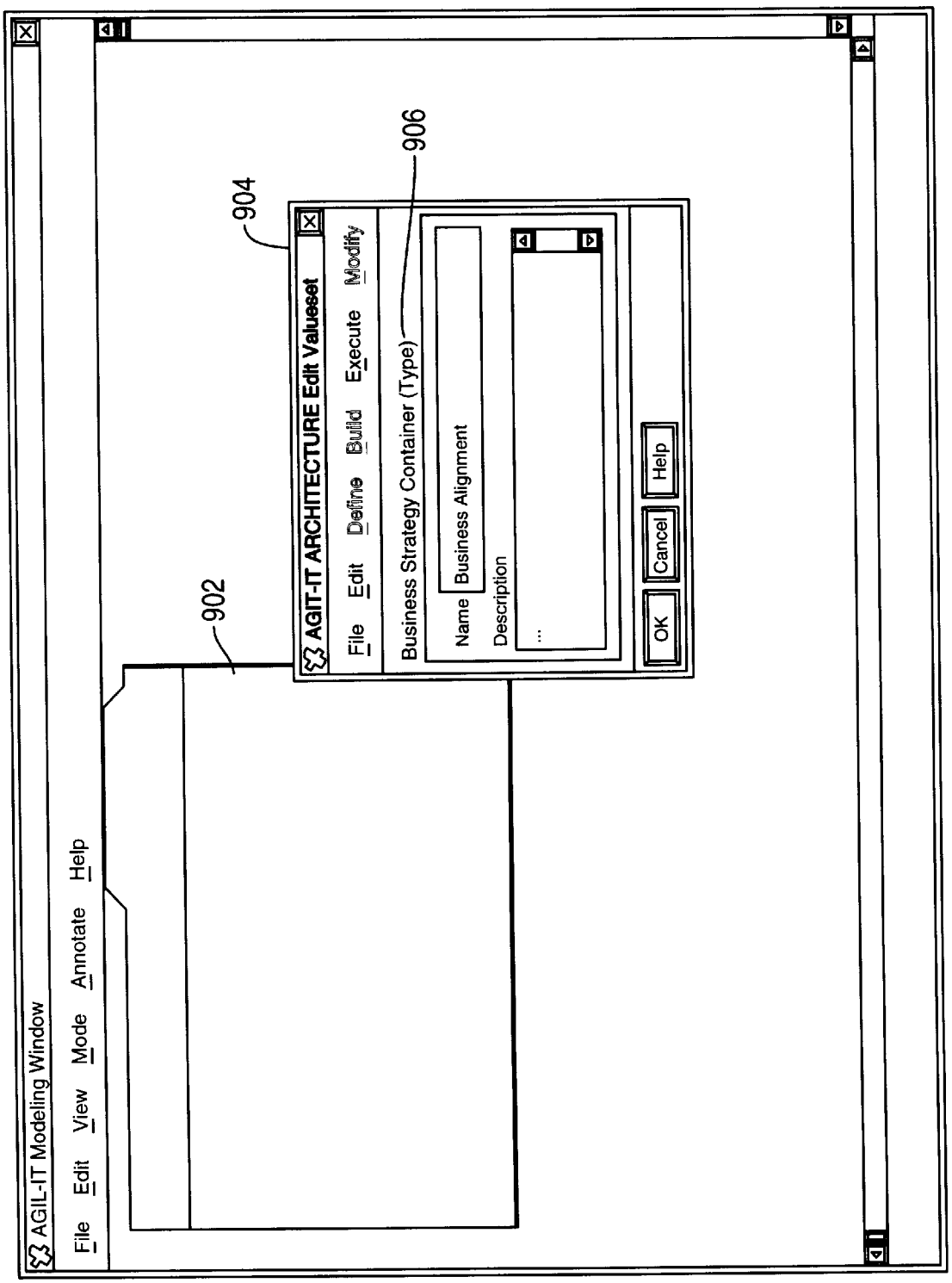
Figure 10:
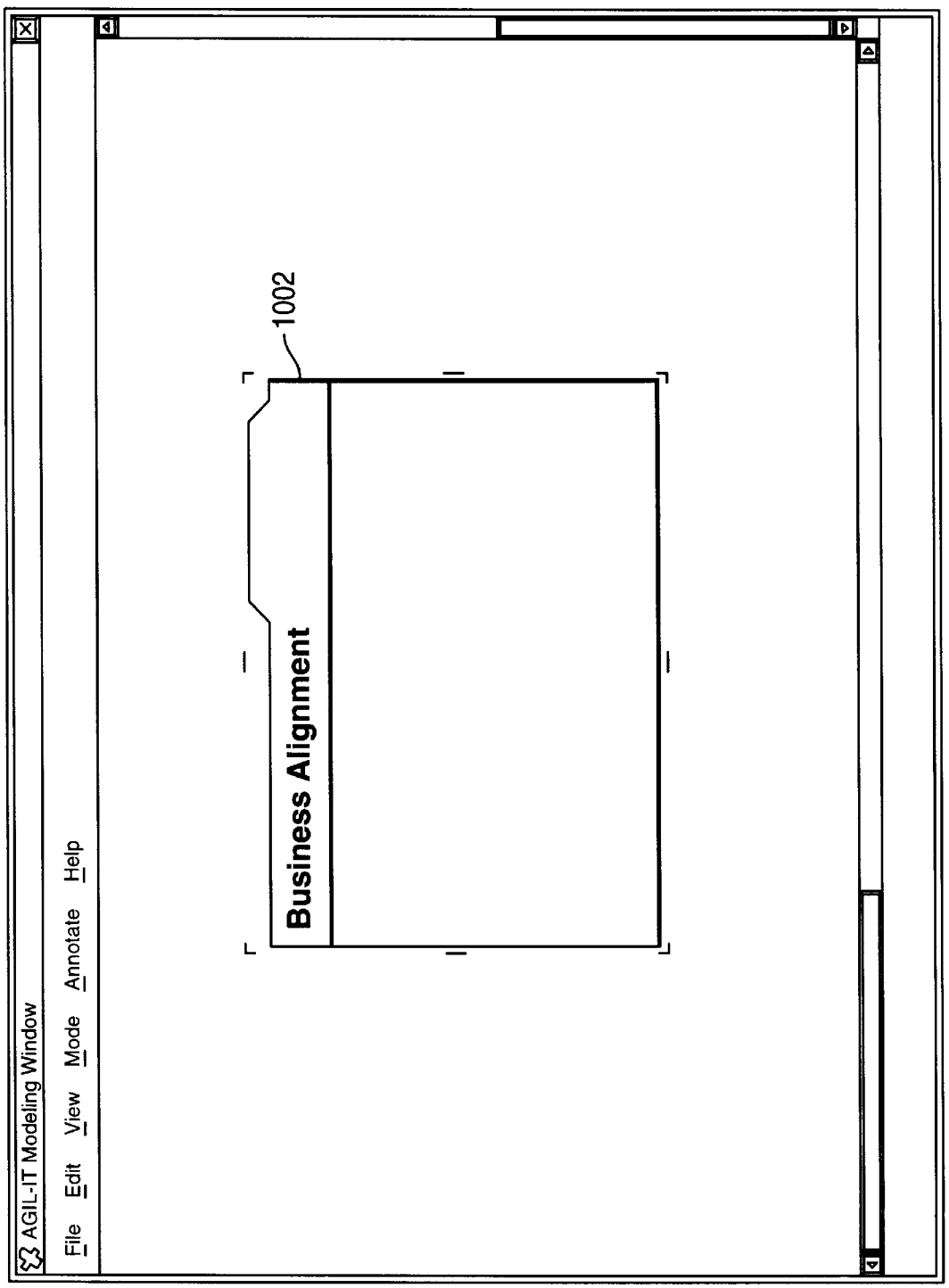

FIGS. 8–10 illustrate the process for creating the Business Alignment container 702.

Referring to FIG. 8, there is shown a display on a computer screen, illustrating visual interfaces 802 and 806. As shown in FIG. 8, visual interface 802 is invoked by clicking on the root region, and visual interface 806 is invoked by selecting and activating item 804 (Create Modeling Container) in visual interface 802. Among all items within visual interface 806, AMP container 812, Business Strategy Container 814, Business Topology Container 816, and Transition Planning Container 818 are associated with Architecture Management Practices (402 and 402'), IT and Business Alignment (404 and 404'), Strategic Information & Technology Architecture (406 and 406'), and Transition Strategy and Planning (408 and 408') software components shown in FIG. 4, respectively. Among all items within visual interface 802, Create Utility container 820 is associated with Applied Utility Function 410 shown in FIG. 4. By selecting and activating item 814 (Business Strategy Container), the process is led to FIG. 9.

Referring to FIG. 9, there is shown a display on a computer screen, illustrating a newly created container 902, and information window 904 for entering a name and description for the created container. As shown in information window 904, the name entered for the container is Business Alignment, and the created container is of Business Strategy type (906).

Referring to FIG. 10, there is shown a display on a computer screen, illustrating a created container 1002 with the name of Business Alignment. It should be noted that the information and knowledge captured by, and the visual interfaces and visual symbols created by the IT and Business Alignment (404 and 404') software component is associated with the Business Strategy type container. In other words, depending on the position selected, or activated object or activated relationship in a Business Strategy type container, a respective process, visual interface, and visual symbol within Business Alignment (404 and 404') software component will be invoked.

Figure 11:
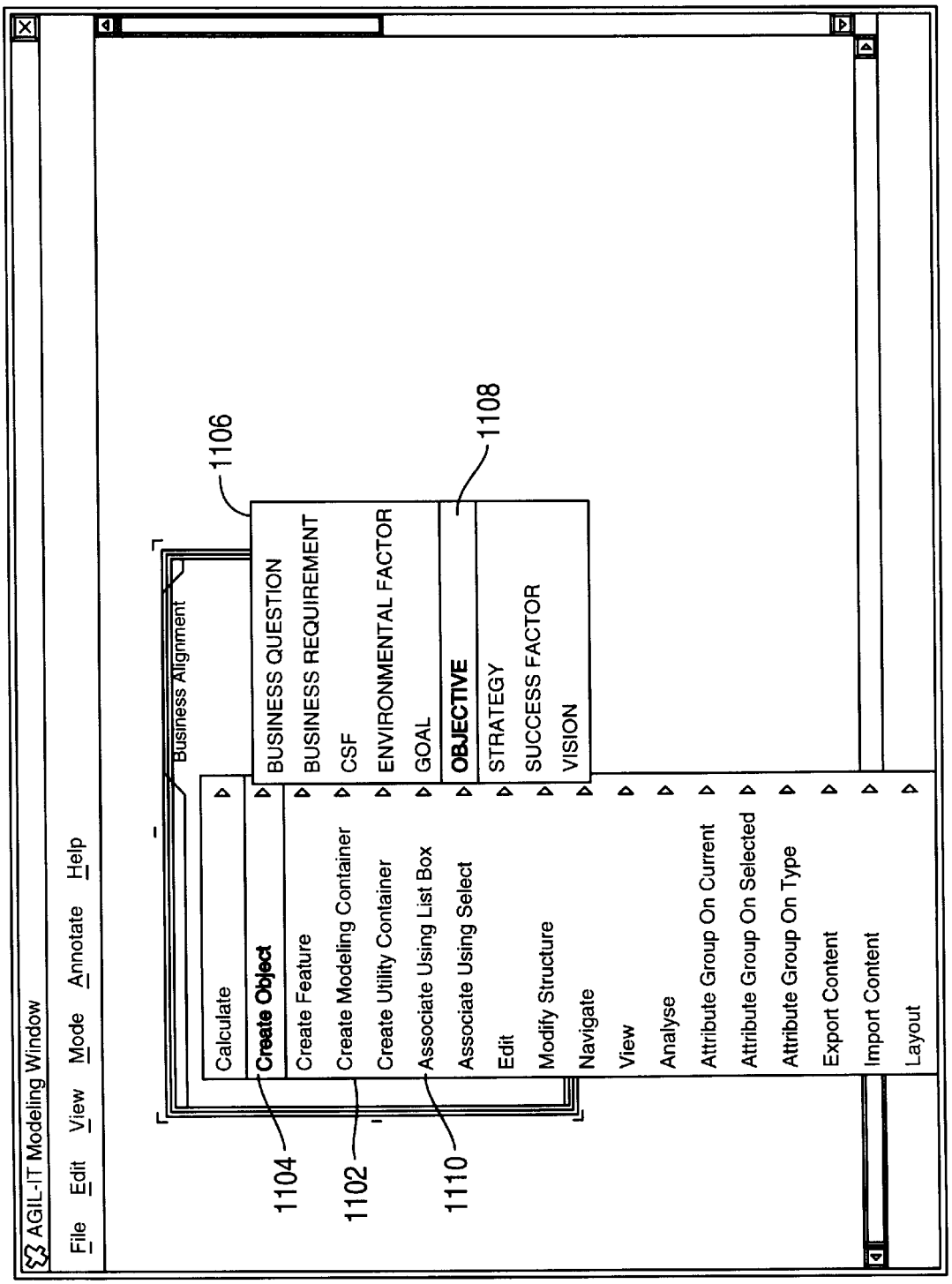
FIGS. 11–13 illustrate the process for creating an object in Business Alignment container.
Figure 12:
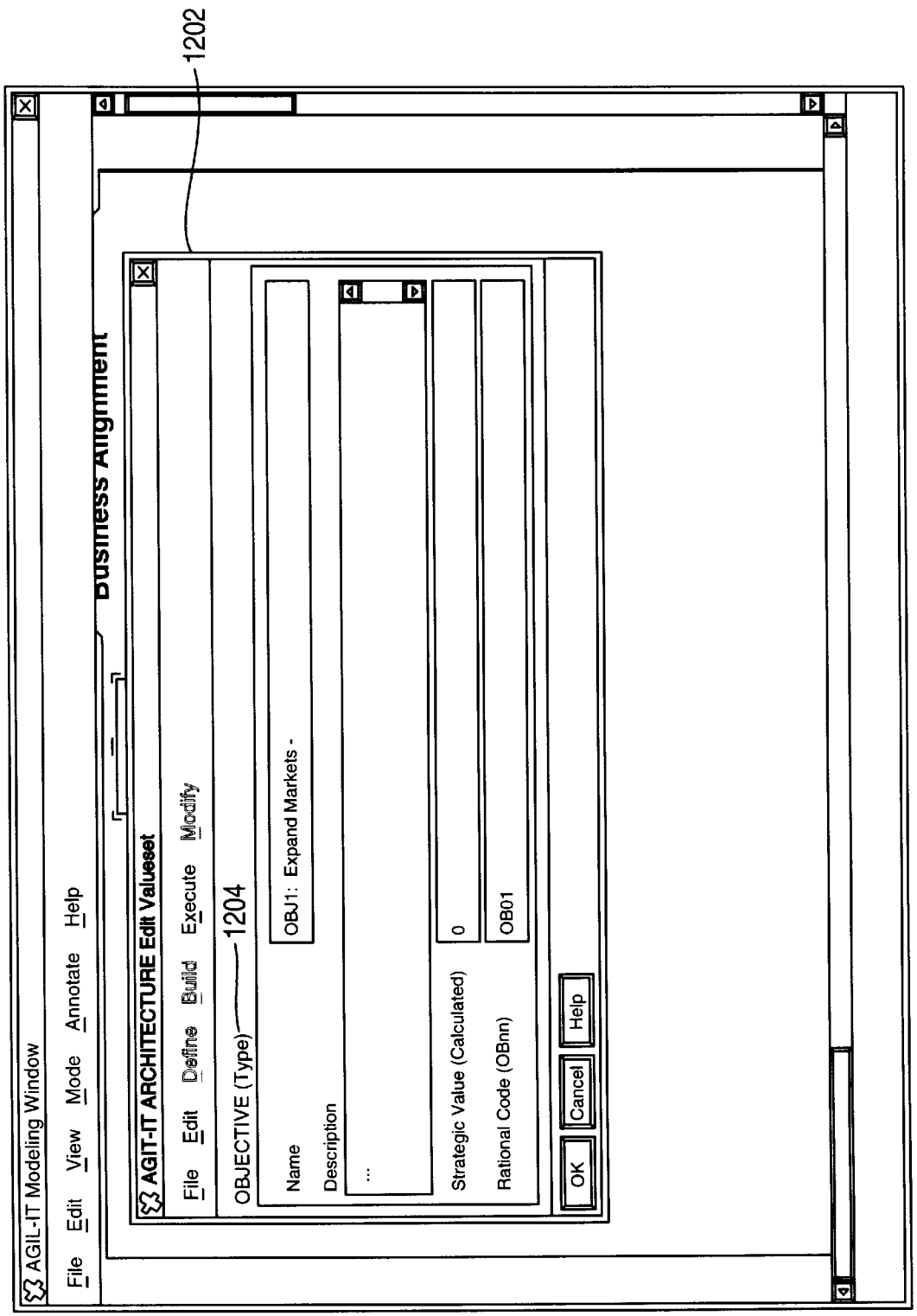
Figure 13:
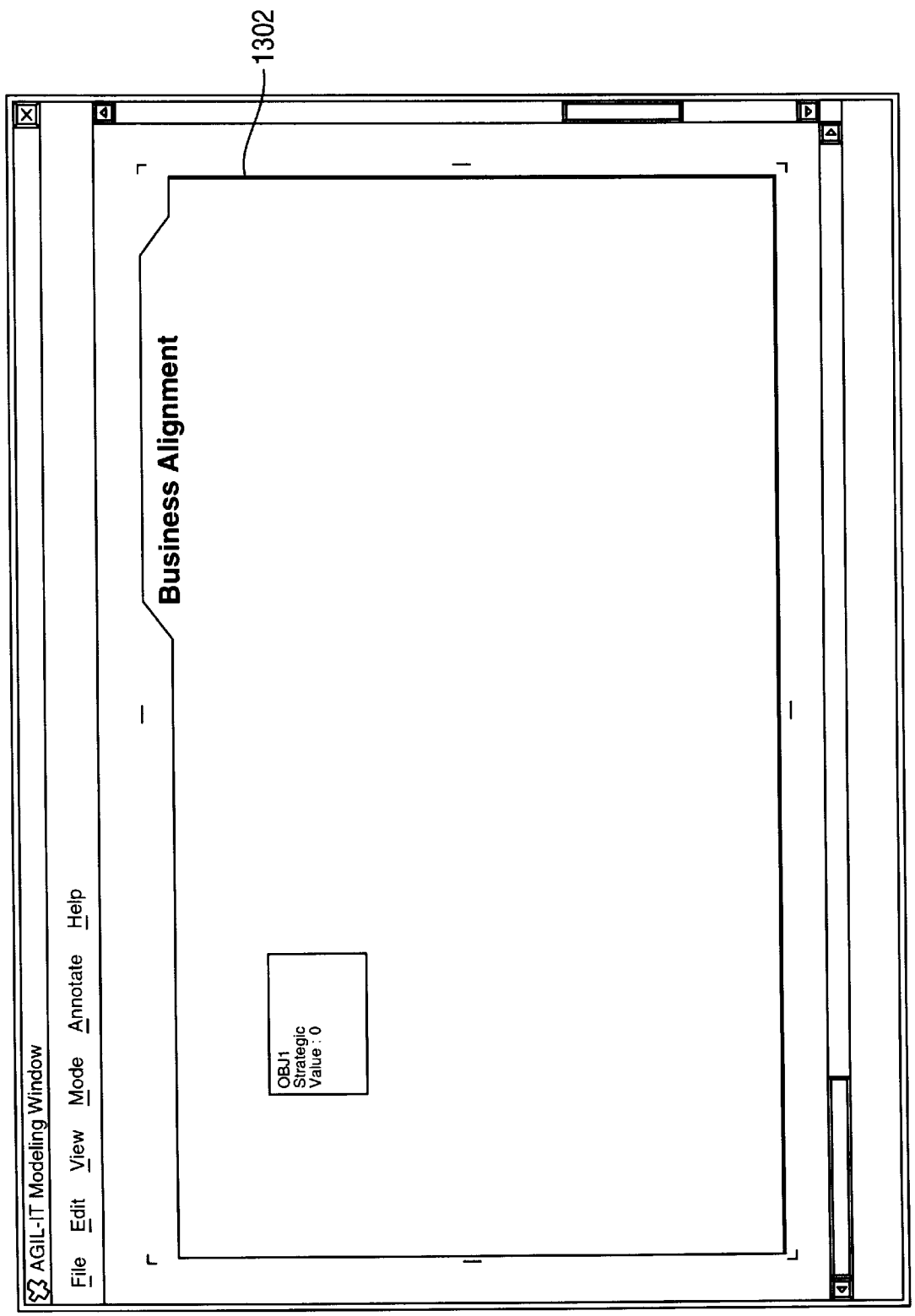

FIGS. 11–13 illustrate the process for creating an object in Business Alignment container.

Referring to FIG. 11, there is shown a display on a computer screen, illustrating visual interfaces 1102 and 1106. Visual interface 1102 is invoked by clicking a position within the Business Alignment container, and visual interface 1106 is invoked by selecting and activating item 1104 (Create Object) in visual interface 1102. As shown in FIG. 11, visual interface 1102 displays all operations for Business Strategy type container, including intra-sub-methodology (intra-container) operations and inter-sub-methodology (or inter-container) operations that are defined by the IT and Business Alignment methodology shown in FIG. 1. An example of an intra-container operation for the Business Strategy type of container is the Create Object 1104 operation and an example of an inter-container operation is the Associate Using List Box 1110 operation. Visual interface 1106 displays the types of objects that are defined the by the IT and Business Alignment methodology. Each type of object in the Business Strategy type container has predetermined characteristics meaningful to the IT and Business Alignment sub-methodology 104 as shown in FIG. 1. At this point, one can already appreciate the advantage that the Agil-IT visual modeling tool can guide a user to use IT and Business Alignment methodology to design an IT architecture visual model without knowing the detail about the methodology. By selecting and activating item 1108 (OBJECTIVE), the process is led to FIG. 12.

Referring to FIG. 12, there is shown a display on a computer screen, illustrating information window 1202 for entering properties and descriptions for a newly created object. As shown in FIG. 12, the created object is an objective type (1204) object. IT and Business Alignment software component (404 and 404') will record all objective type objects, encapsulate them, and arrange them in a fashion meaningful to IT and Business Alignment methodology 104 (shown FIG. 1). By selecting and activating OK button, the process is led to FIG. 13.

Referring to FIG. 13, there is shown a display on a computer screen, illustrating the visual symbol 1302 for the newly created objective type object (OBJ1 object). The visual symbol is encapsulated in IT and Business Alignment software component (404 and 404'). It should be noted that the value for OBJ1 object is zero (0) at this time because it depends on the values of other objects.

Figure 14:
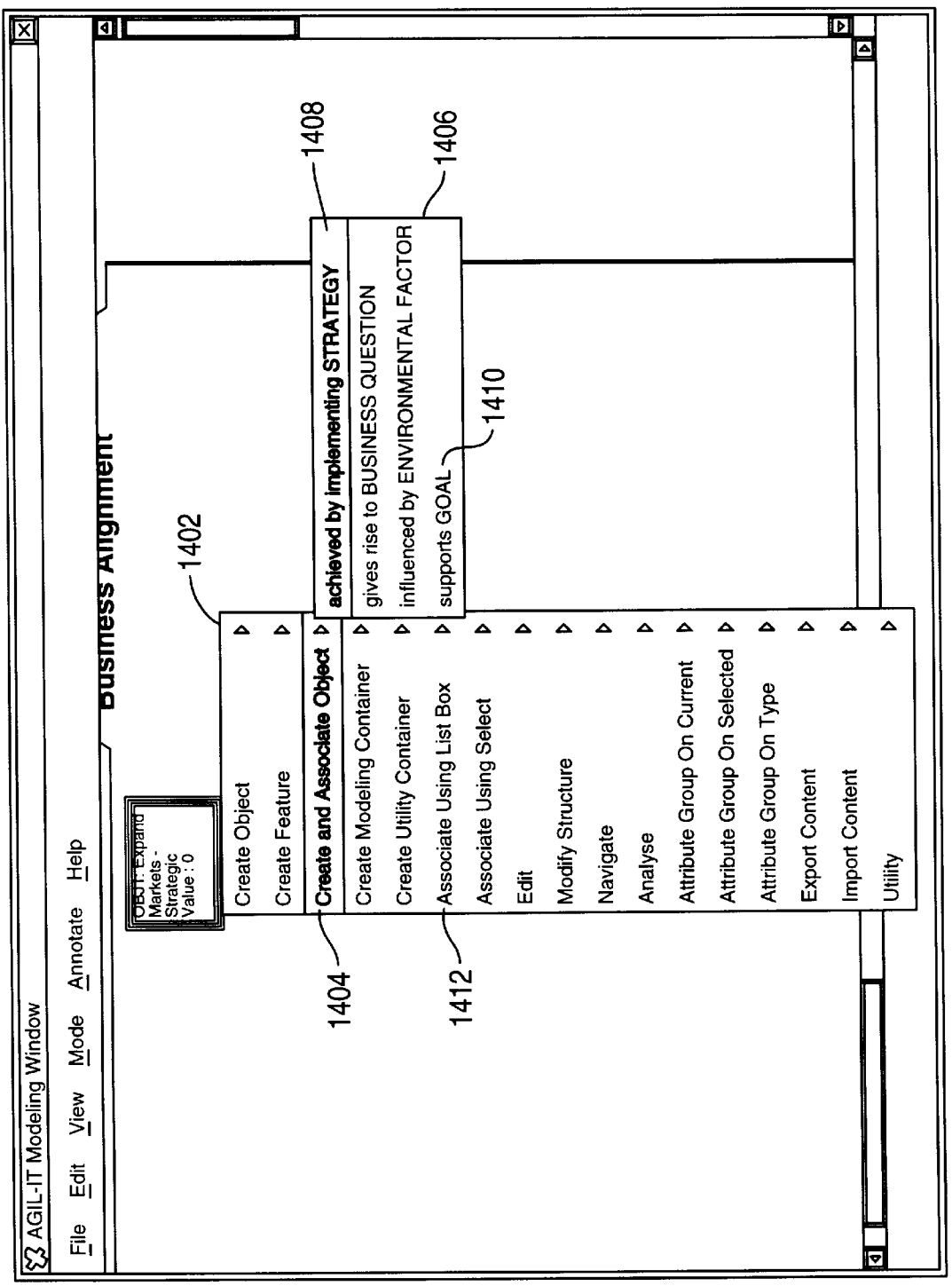
FIGS. 14–16 illustrate the process for creating an object and a relationship in Business Alignment container.
Figure 15:
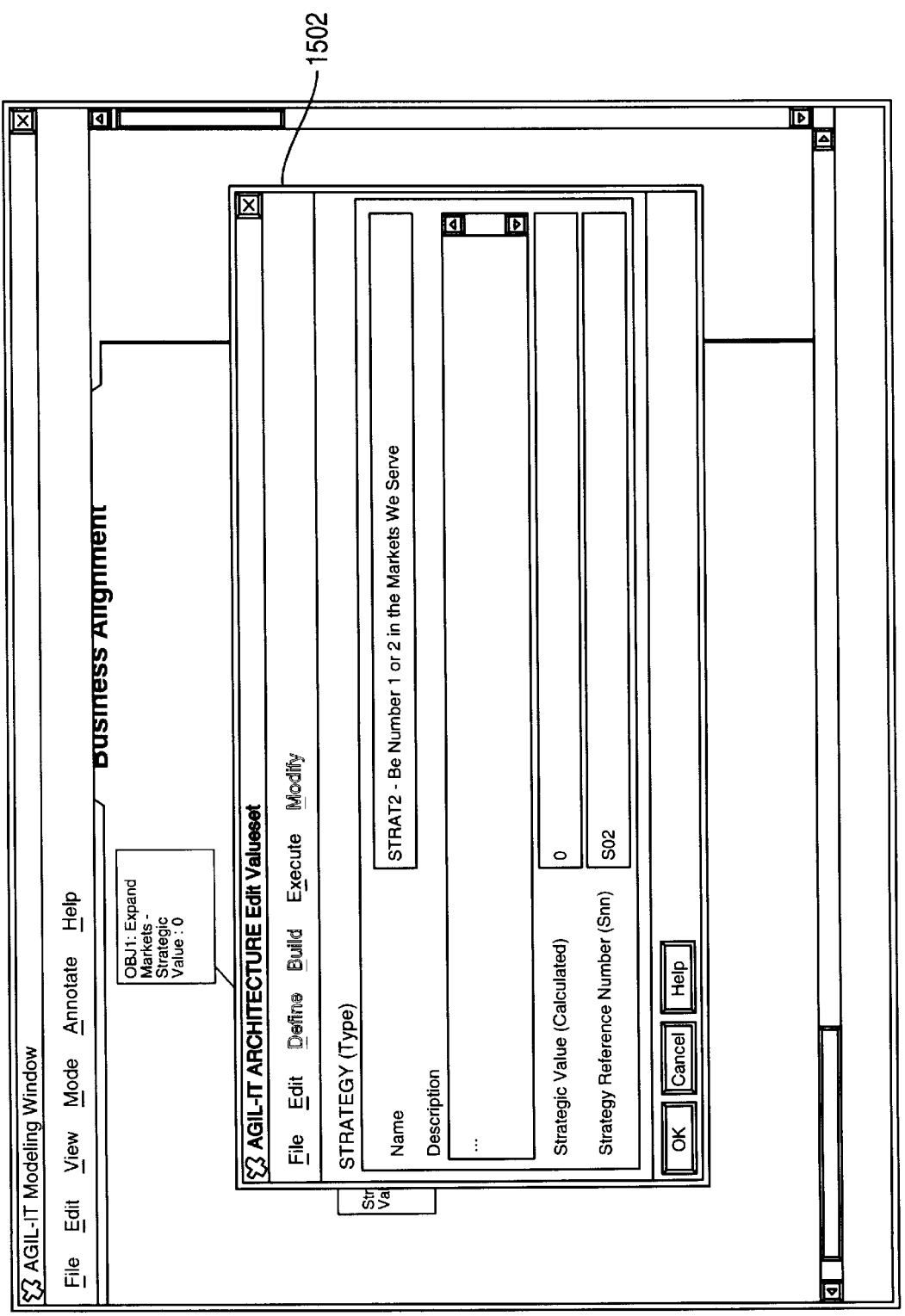
Figure 16:
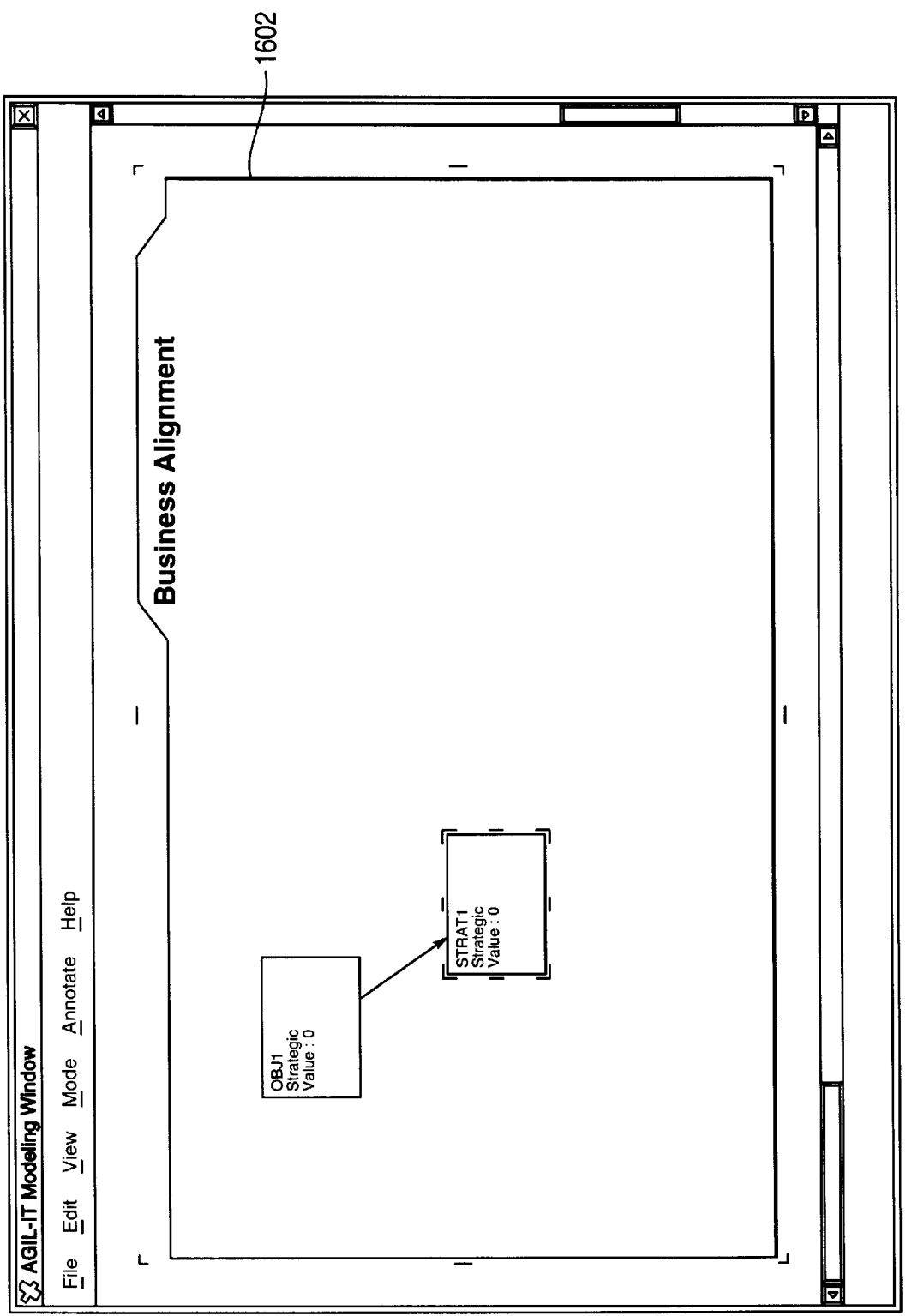

FIGS. 14–16 illustrate the process for creating an object and a relationship in Business Alignment container.

Referring to FIG. 14, there is shown a display on a computer screen, illustrating visual interfaces 1402 and 1406. Visual interface 1402 is invoked by selecting and activating OBJ1 object, and visual interface 1406 is invoked by selecting and activating item 1404 (Create and Associate Object) in visual interface 1402. As shown in FIG. 14, visual interface 1402 displays all operations for (or behaviors of) the objective type objects, including intra-sub-methodology (intra-container) operations and inter-sub-methodology (or inter-container) operation, that are defined by the IT and Business Alignment methodology shown in FIG. 1. An example of an intra-container operation for the objective type of object is the Create and Associate Object (1404) operation, and an example of an inter-container operation is illustrated by the Associate Using List Box 1412 operation. Visual interface 1406 displays the types of objects that an objective type object can be related to within this sub-container type in accordance with IT and Business Alignment methodology. Visual interface 1406 also displays the types of relationships an objective type object can be related to within this sub-container type in accordance with IT and Business Alignment methodology. For example, as indicated by item 1410, an objective type object can support (the relationship type) a goal object (the object type). By selecting and activating item 1408 (achieved by implementing STRATEGY), the process is led to FIG. 15.

Referring to FIG. 15, there is shown a display on a computer screen, illustrating information window 1502 for entering property and description for a newly created object. As shown in FIG. 15, the created object is a strategy type object. IT and Business Alignment software component (404 and 404') will record all objective type objects, encapsulate them, and arrange them in a fashion meaningful to IT and Business Alignment methodology 104 (shown FIG. 1). By selecting and activating OK button, the process is led to FIG. 16.

Referring to FIG. 16, there is shown a display on a computer screen, illustrating the visual symbols for the newly created strategy type object (STRAT1 object) and associated relationship. The visual symbols are encapsulated in IT and Business Alignment software component (404 and 404'). It should be noted that the value for STRAT1 is zero (0) at this time because it depends on the values of other objects.

Figure 17:
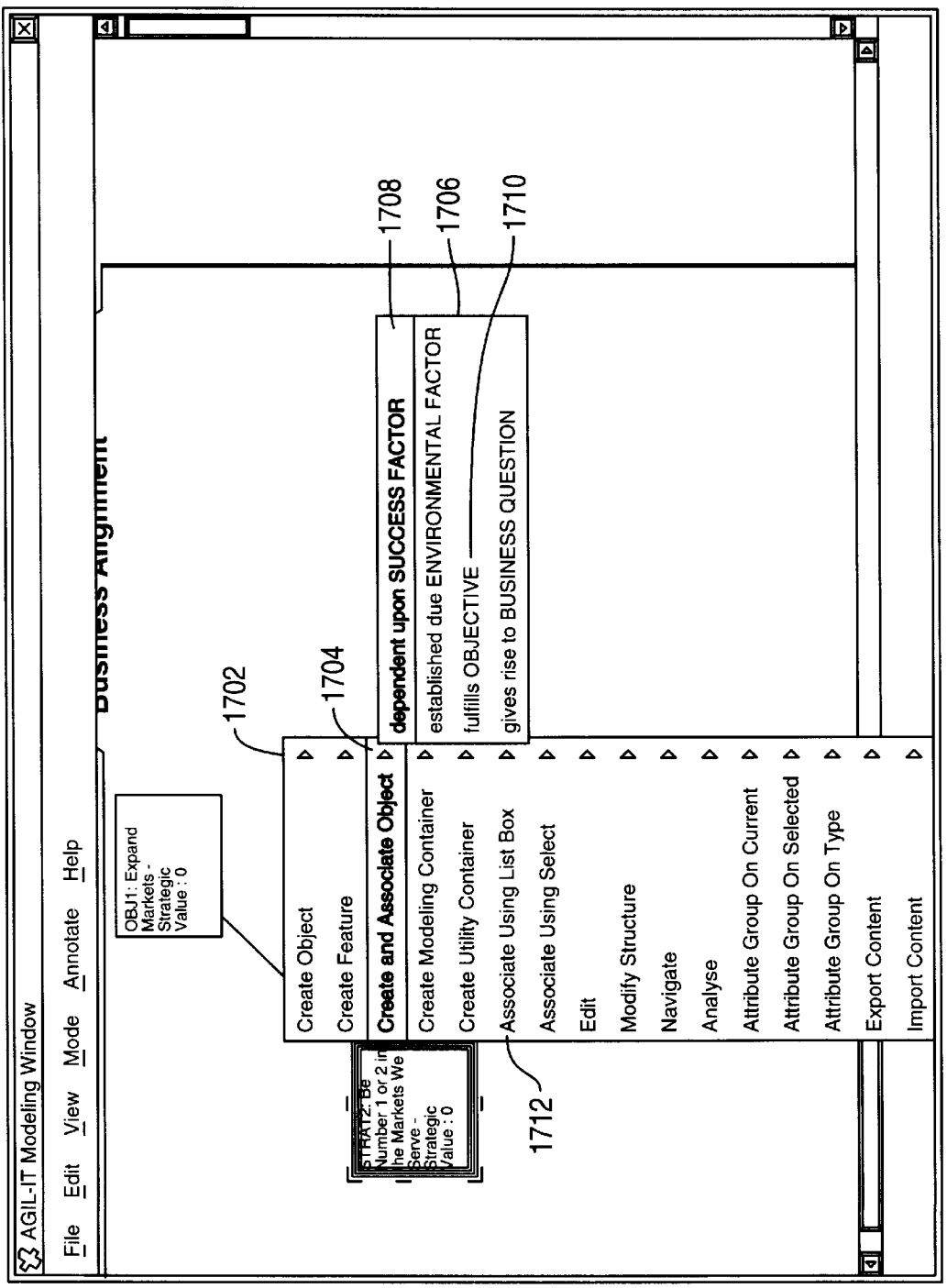
FIGS. 17–19 illustrate the process for creating an object and a relationship in Business Alignment container.
Figure 18:
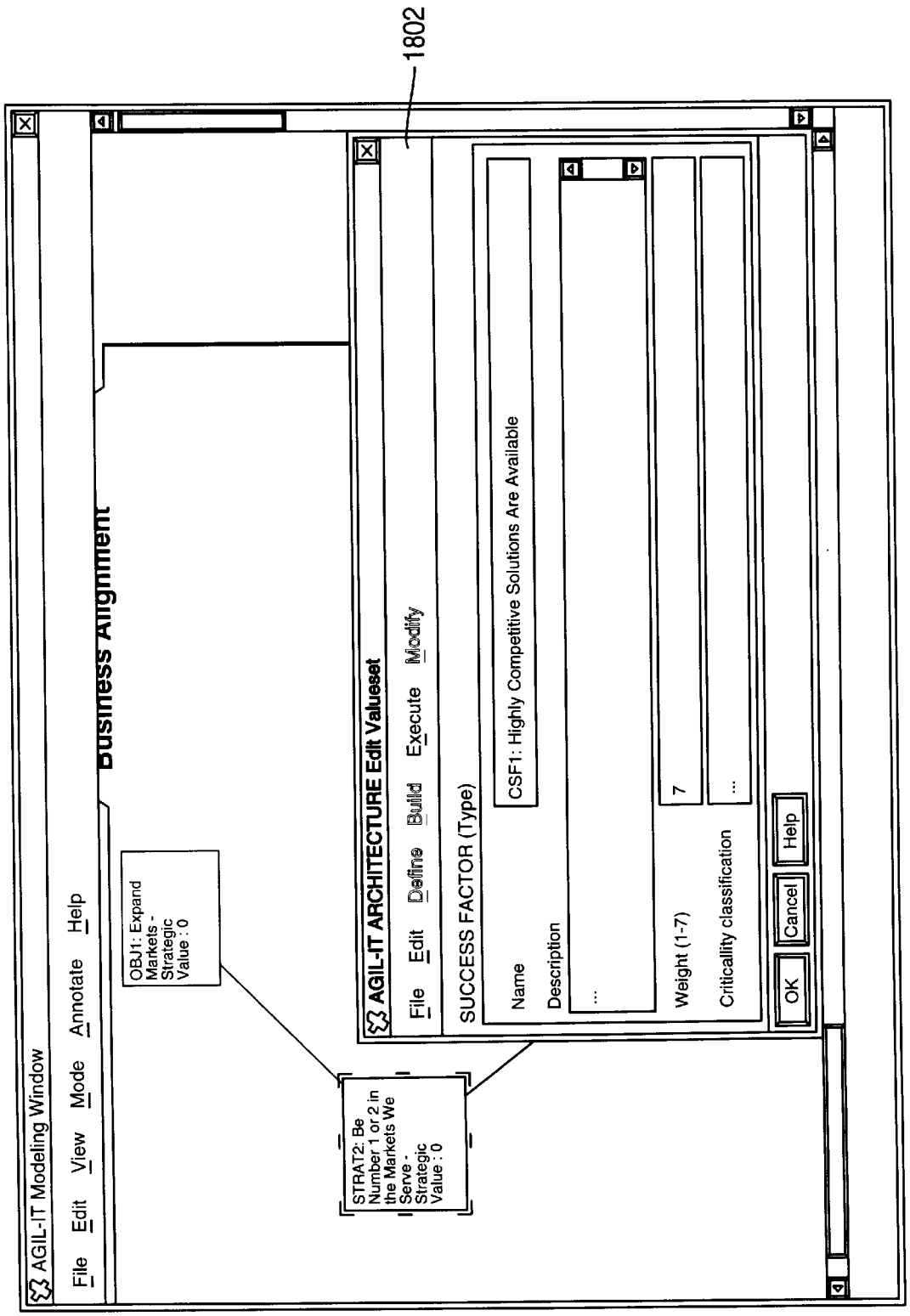
Figure 19:
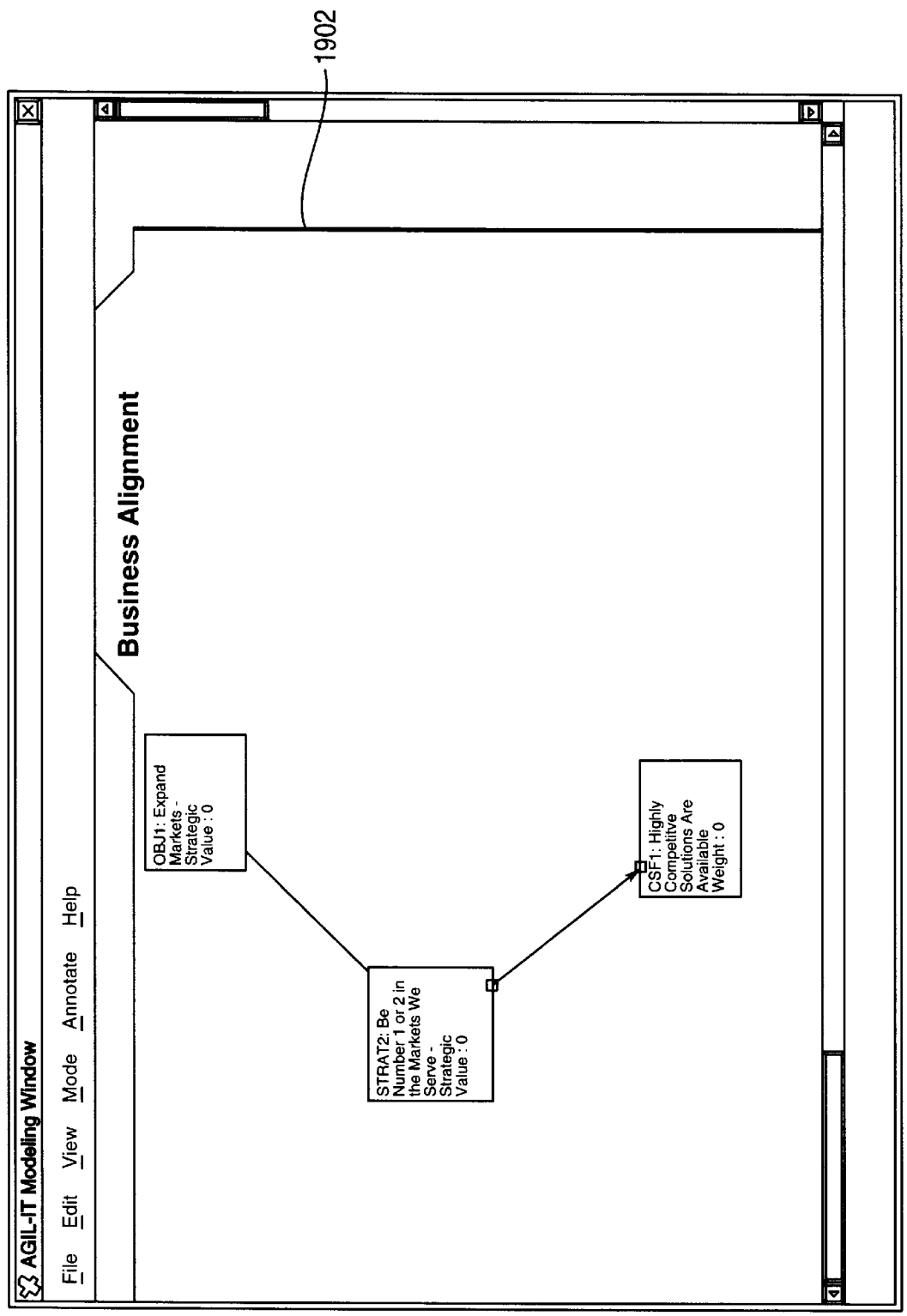

FIG. 17–19 illustrate the process for creating an object and a relationship in Business Alignment container.

Referring to FIG. 17, there is shown a display on a computer screen, illustrating visual interfaces 1702 and 1706. Visual interface 1702 is invoked by selecting and activating STRAT2 object, and visual interface 1706 is invoked by selecting and activating item 1704 (Create and Associate Object) in visual interface 1702. As shown in FIG. 17, visual interface 1702 displays all operations for (or behaviors of) the strategy type objects, including intra-sub-methodology (intra-container) operation and inter-sub-methodology (or inter-container) operation, that are defined by the IT and Business Alignment methodology shown in FIG. 1. An example of an intra-container operation for the strategy type of object is the Create and Associate Object (1704) operation, and an example of an inter-container operation is illustrated by the Associate Using List Box (1712) operation. Visual interface 1706 displays the types of objects that a strategy type object can be related in accordance with IT and Business Alignment methodology. Visual interface 1706 also displays the types of relationships a strategy type object can be related in accordance with IT and Business Alignment methodology. For example, as indicated by item 1710, a strategy type object can fulfill an objective type object. By selecting and activating item 1708 (dependent upon SUCCESS FACTOR), the process is led to FIG. 18.

Referring to FIG. 18, there is shown a display on a computer screen, illustrating information window 1802 for entering property and description for a newly created object. As shown in FIG. 18, the created object is a success factor type object. IT and Business Alignment software component (404 and 404') will record all success factor type objects, encapsulate them, and arrange them in a fashion meaningful to IT and Business Alignment methodology 104 (shown FIG. 1). By selecting and activating OK button, the process is led to FIG. 19.

Referring to FIG. 19, there is shown a display on a computer screen, illustrating the visual symbols for the newly created success factor type object (CSF1 object) and relationship to the STRAT1 strategy object as selected in operation 1708 in FIG. 17. The visual symbols are encapsulated in IT and Business Alignment software component (404 and 404'). It should be noted that the value for CSF1 is zero (0) at this time because it depends on the values of other objects that have not been established.

Figure 20:
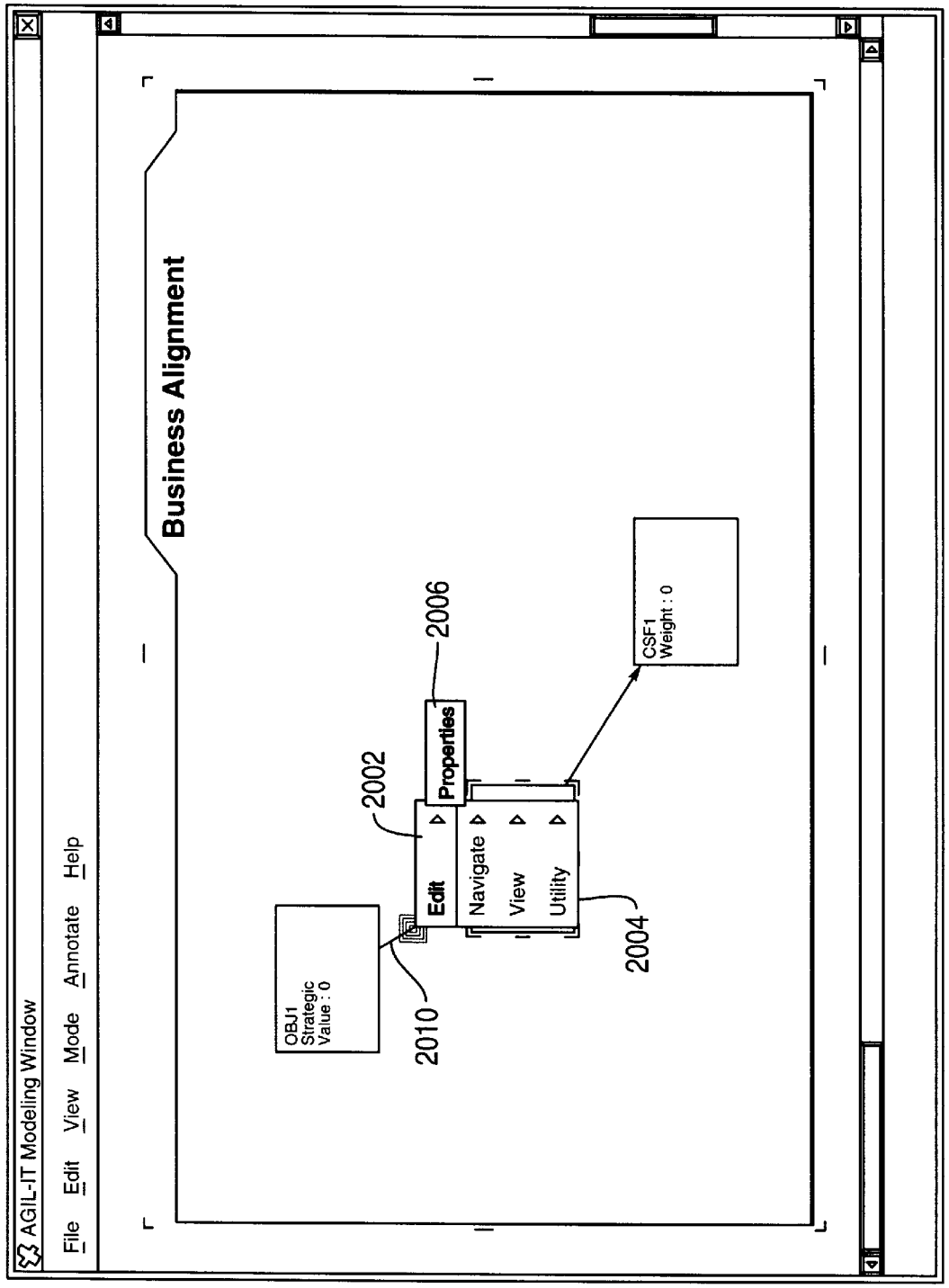
FIGS. 20–21 illustrate the process for entering property values for a relationship.
Figure 21:
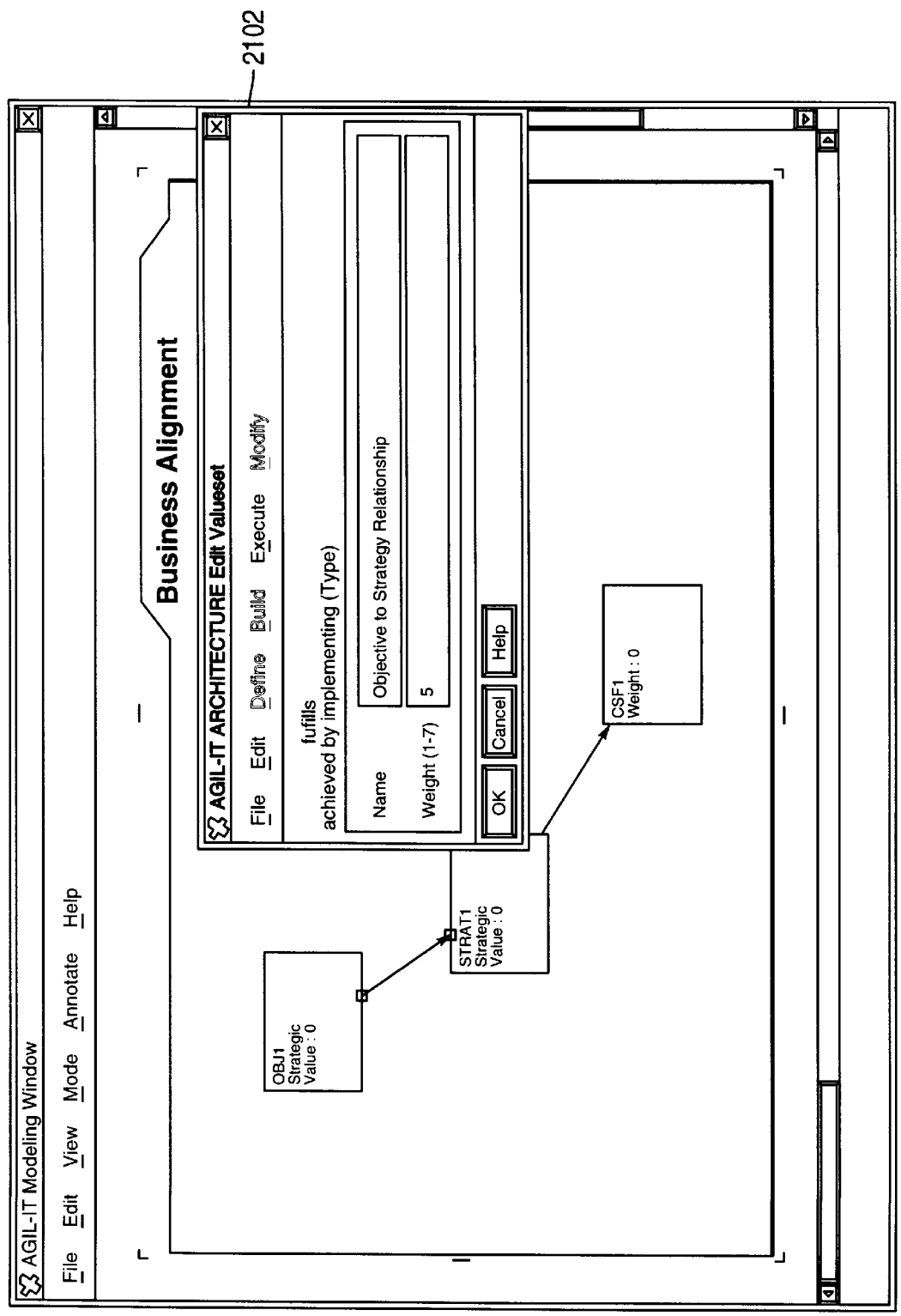

FIG. 20–21 illustrate the process for entering property values for a relationship.

Referring to FIG. 20, there is shown a display on a computer screen, illustrating visual interfaces 2002 and 2006 for entering properties values for a relationship. Visual interface 2002 is invoked by selecting and activating relationship 2010, and visual interface 2006 (Properties) is invoked by selecting and activating item 2004 (Edit) in visual interface 2002. As shown in FIG. 20, visual interface 2002 displays all operations for (or behaviors of) the relationship between objective type and strategy type objects. By selecting and activating item 2006 (Properties), the process is led to FIG. 21.

Referring to FIG. 21, there is shown a display on a computer screen, illustrating information window 2102 for entering property and description values for a selected relationship. As shown in FIG. 21, the entered weight value is 5, which indicates strength of the relationship between OBJ1 and STRAT1 objects. The relationship type is defined as "fulfills—achieved by implementing". By selecting and activating OK button, the process is led to FIG. 22.

Figure 22:
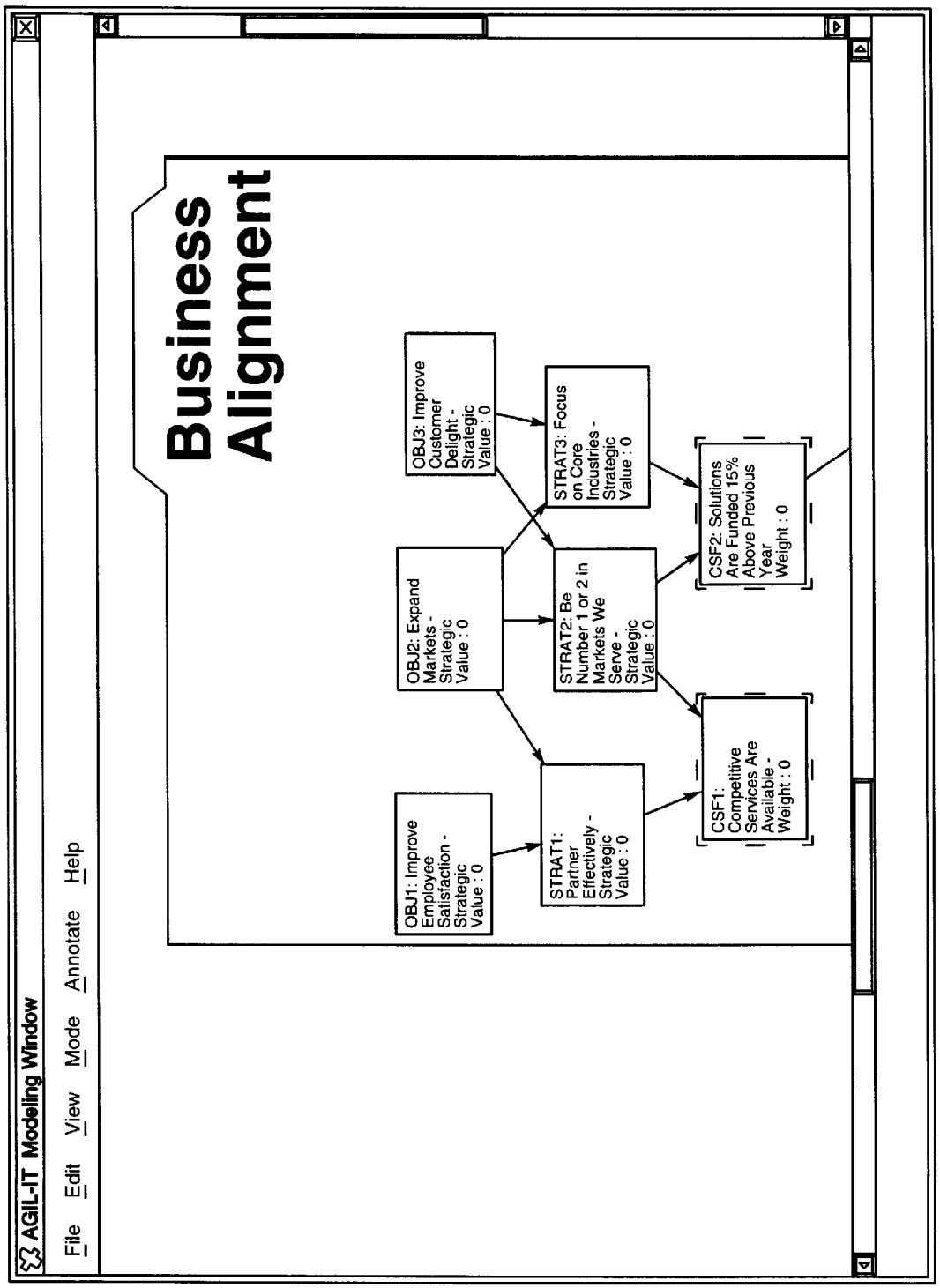
FIG. 22 illustrates a container including additional objects in the business alignment container.

Referring to FIG. 22, there is shown a display on a computer screen, illustrating additional five objects (OBJ2, OBJ3, STRAT2, STRAT3, and CSF2) and respective relationships, created by using a process similar to that discussed above.

FIGS. 23–28 illustrate the process for creating two objects and respective relationships in Business Alignment container.

Figure 23:
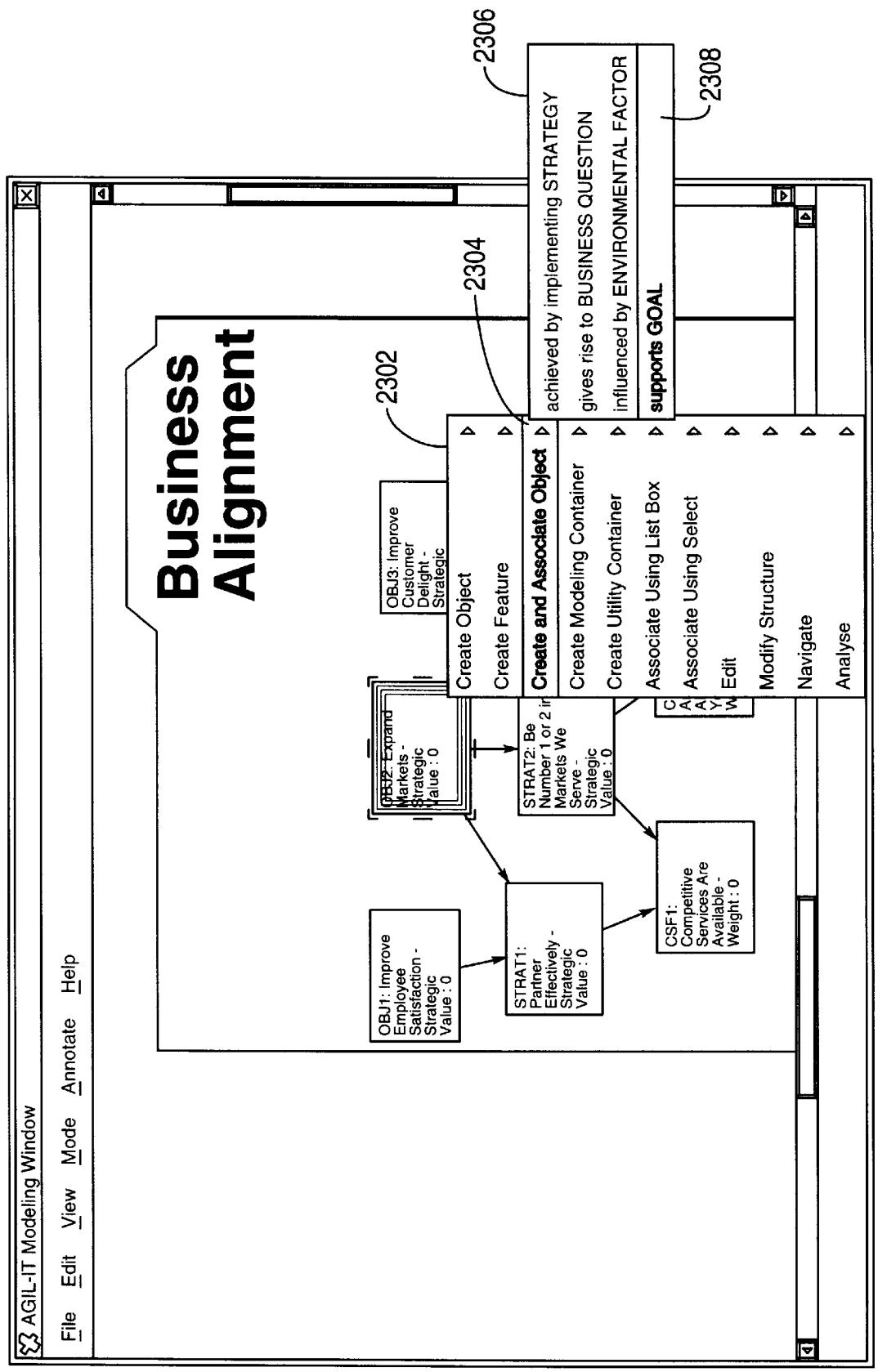
FIGS. 23–28 illustrate the process for creating two objects and respective relationships in Business Alignment container.

Referring to FIG. 23, there is shown a display on a computer screen, illustrating visual interfaces 2302 and 2306. Visual interface 2302 is invoked by selecting and activating OBJ2 object, and visual interface 2306 is invoked by selecting and activating item 2304 (Create and Associate Object) in visual interface 2302. By selecting and activating item 2308 (supports GOAL), the process is led to FIG. 24.

Figure 24:
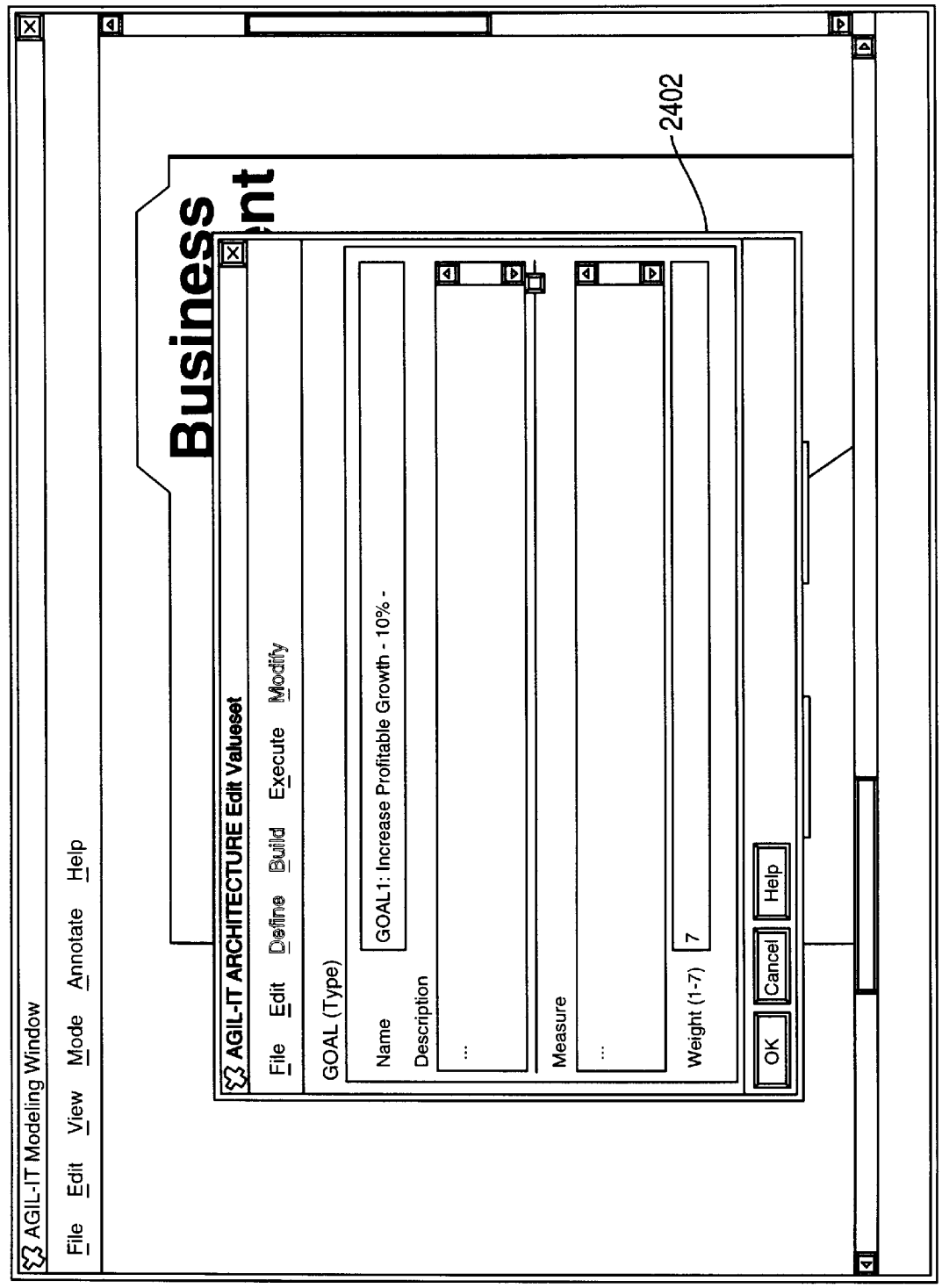

Referring to FIG. 24, there is shown a display on a computer screen, illustrating information window 2402 for entering property and description for a newly created object. As shown in FIG. 24, the created object is a goal type object. IT and Business Alignment software component (404 and 404') will record all goal type objects, encapsulate them, and arrange them in a fashion meaningful to IT and Business Alignment methodology 104 (shown FIG. 1). The weight value of the newly created goal type object is seven (7), indicating that this goal is of relatively high importance to the business. By selecting and activating OK button, the process is led to FIG. 25.

Figure 25:
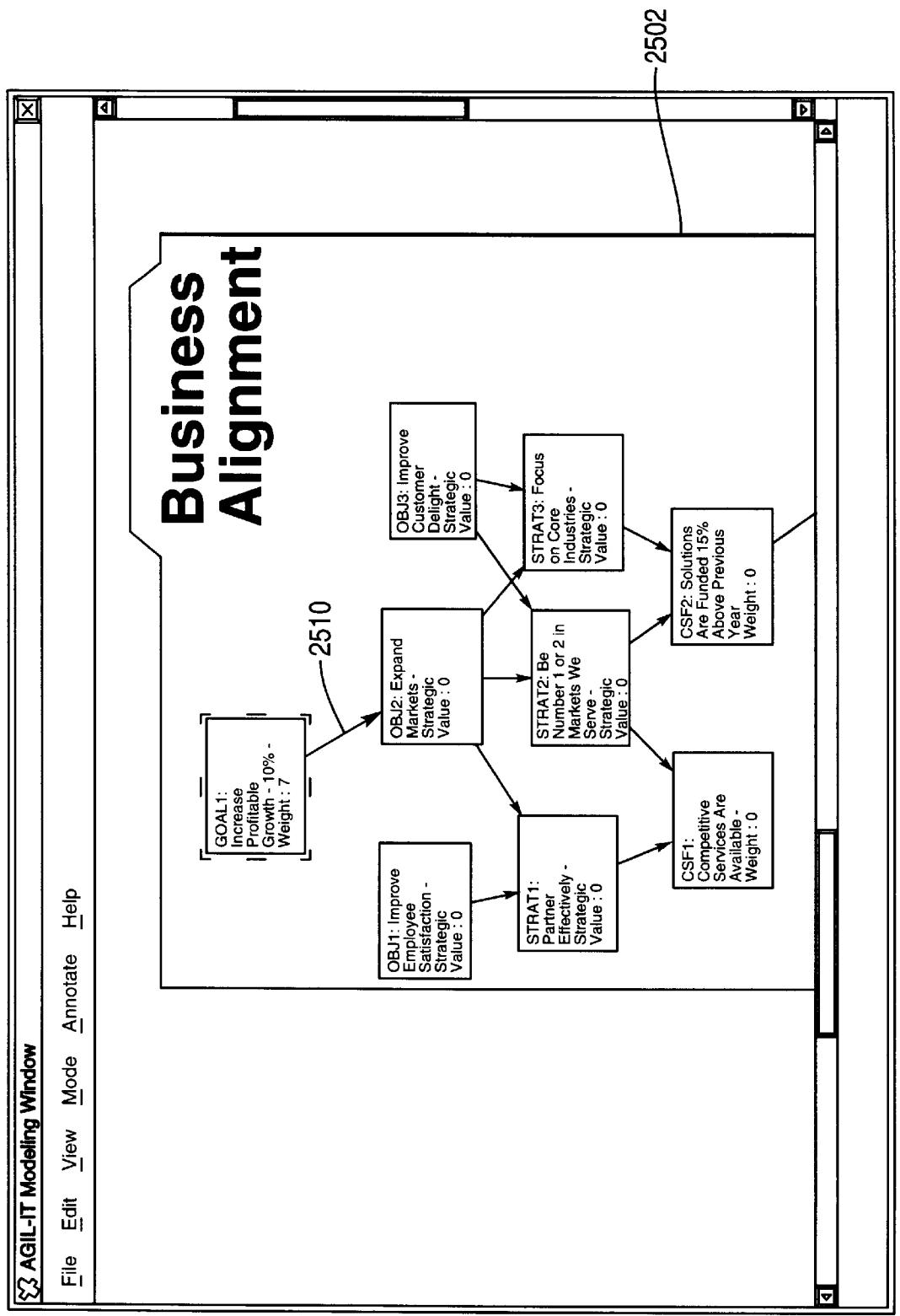

Referring to FIG. 25, there is shown a display on a computer screen, illustrating the visual symbols for the newly created goal type object (GOAL1 object) and relationship (2510).

Figure 26:
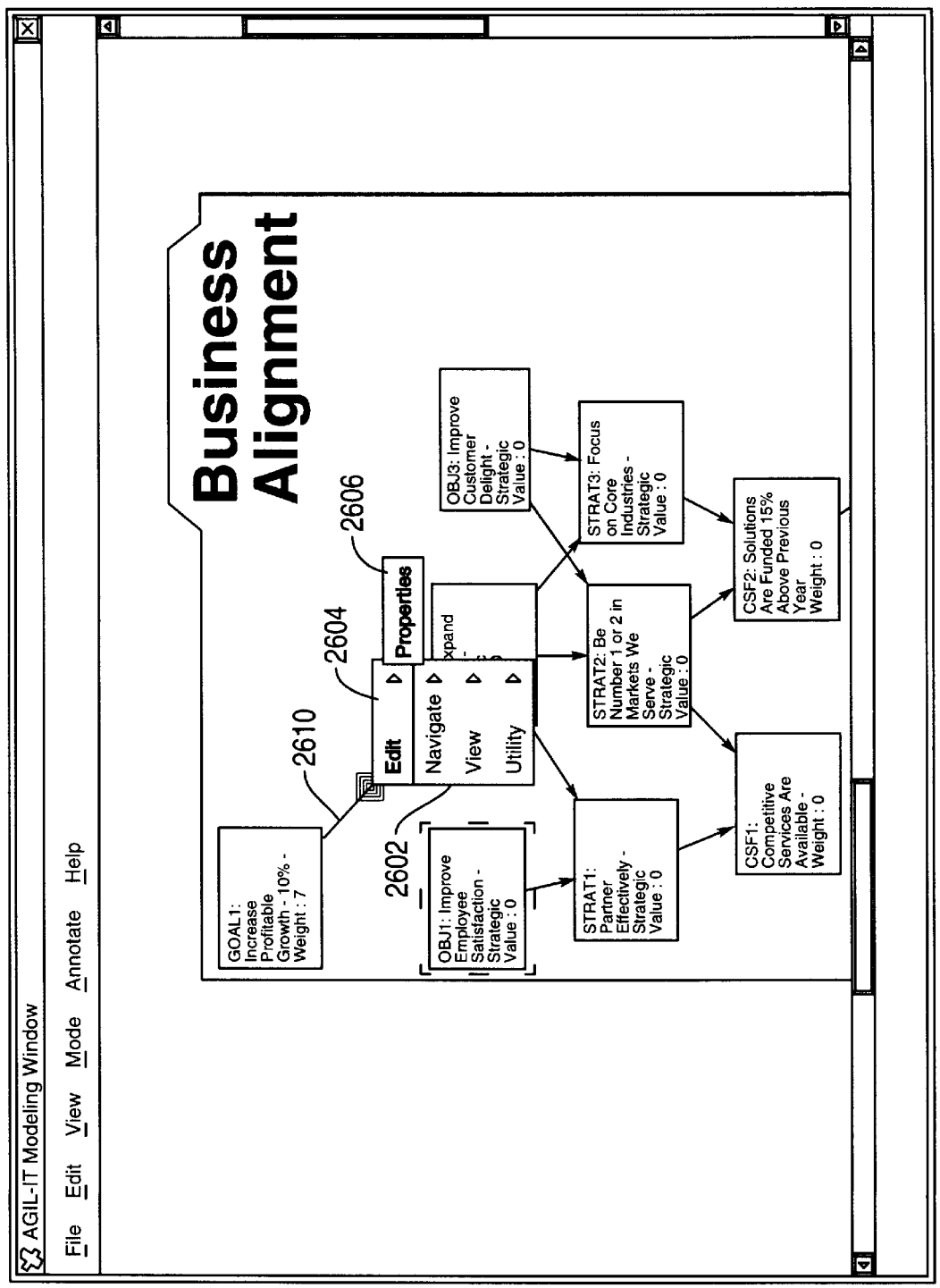

Referring to FIG. 26, there is shown a display on a computer screen, illustrating visual interfaces 2602 and 2606 for entering properties to a relationship. Visual interface 2602 is invoked by selecting and activating relationship 2610, and visual interface 2606 is invoked by selecting and activating item 2604 (Edit) in visual interface 2602. As shown in FIG. 26, visual interface 2602 displays all operations for (or behaviors of) the relationship between a goal type and an object type of objects. By selecting and activating item 2606 (Properties), the process is led to FIG. 27.

Figure 27:
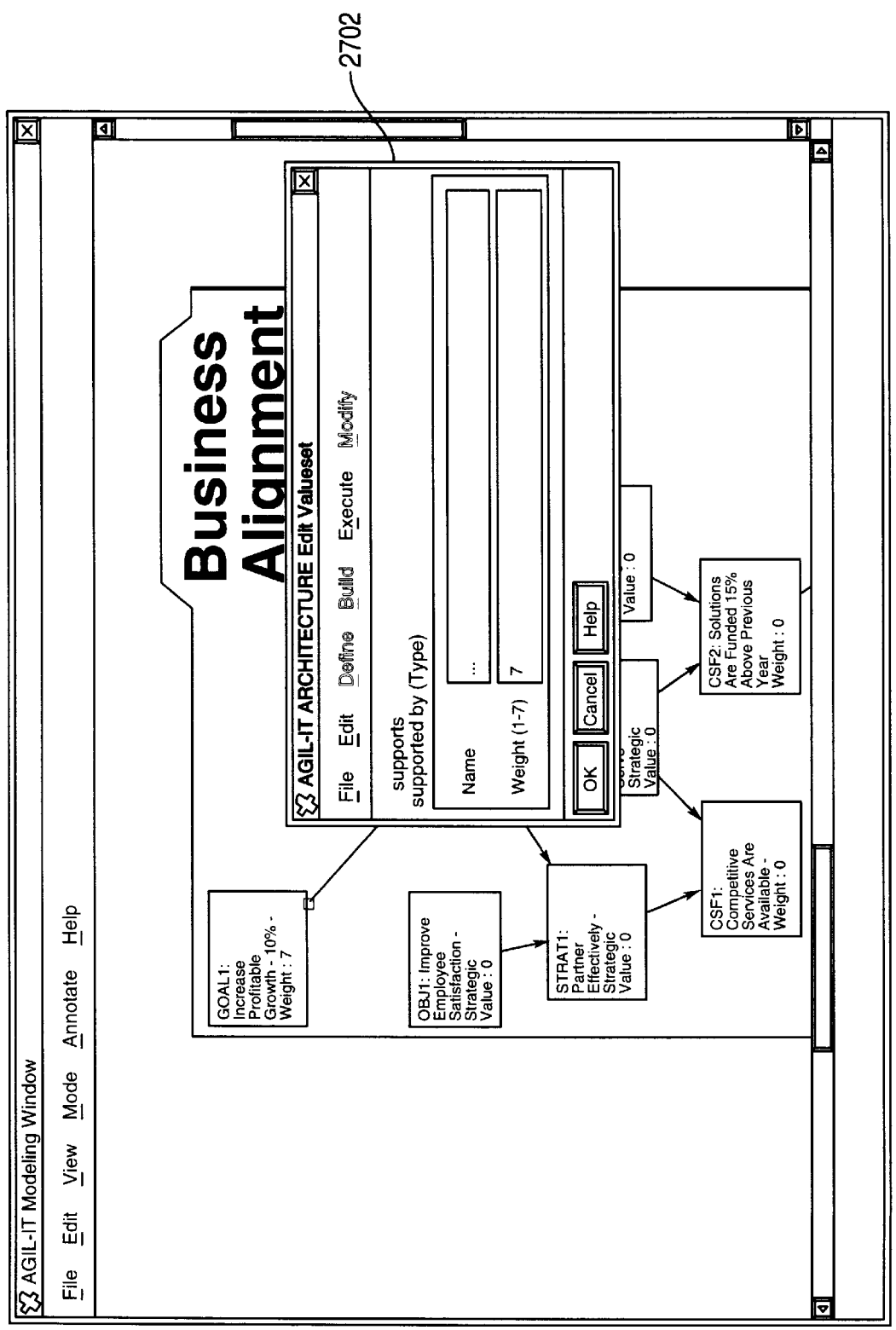

Referring to FIG. 27, there is shown a display on a computer screen, illustrating information window 2702 for entering property and description for a selected relationship. As shown in FIG. 27, the entered weight value is 7, which indicates strength of the relationship between GOAL1 and OBJ2 objects. The relationship type is defined as "supports supported by". By selecting and activating OK button, the relationship property values is recorded by the IT and Business Alignment software component (404).

Figure 28:
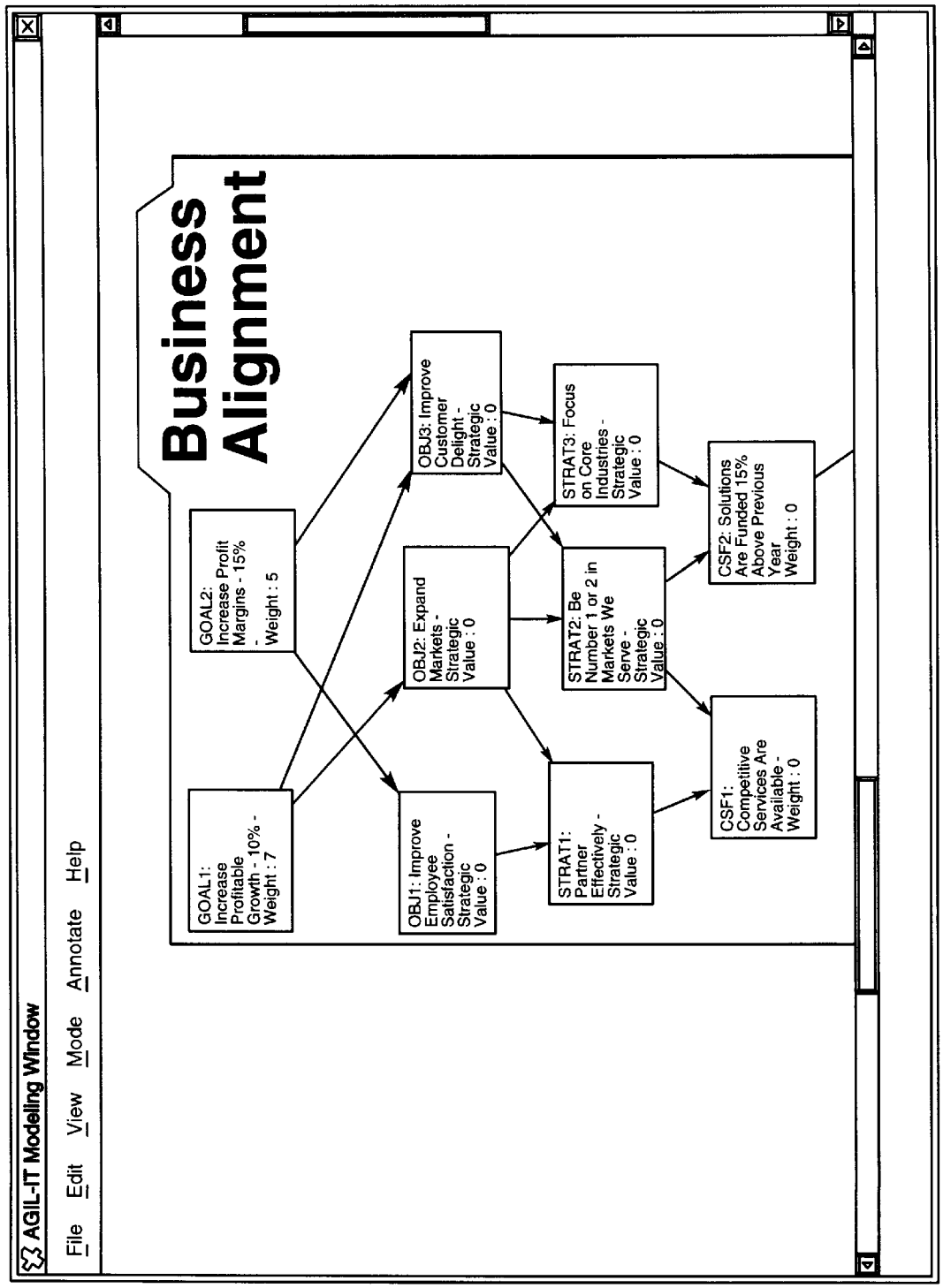

Referring to FIG. 28, there is shown a display on a computer screen, illustrating an additional goal object (GOAL2) and respective relationships, created by using a process similar to that discussed above.

Figure 29:
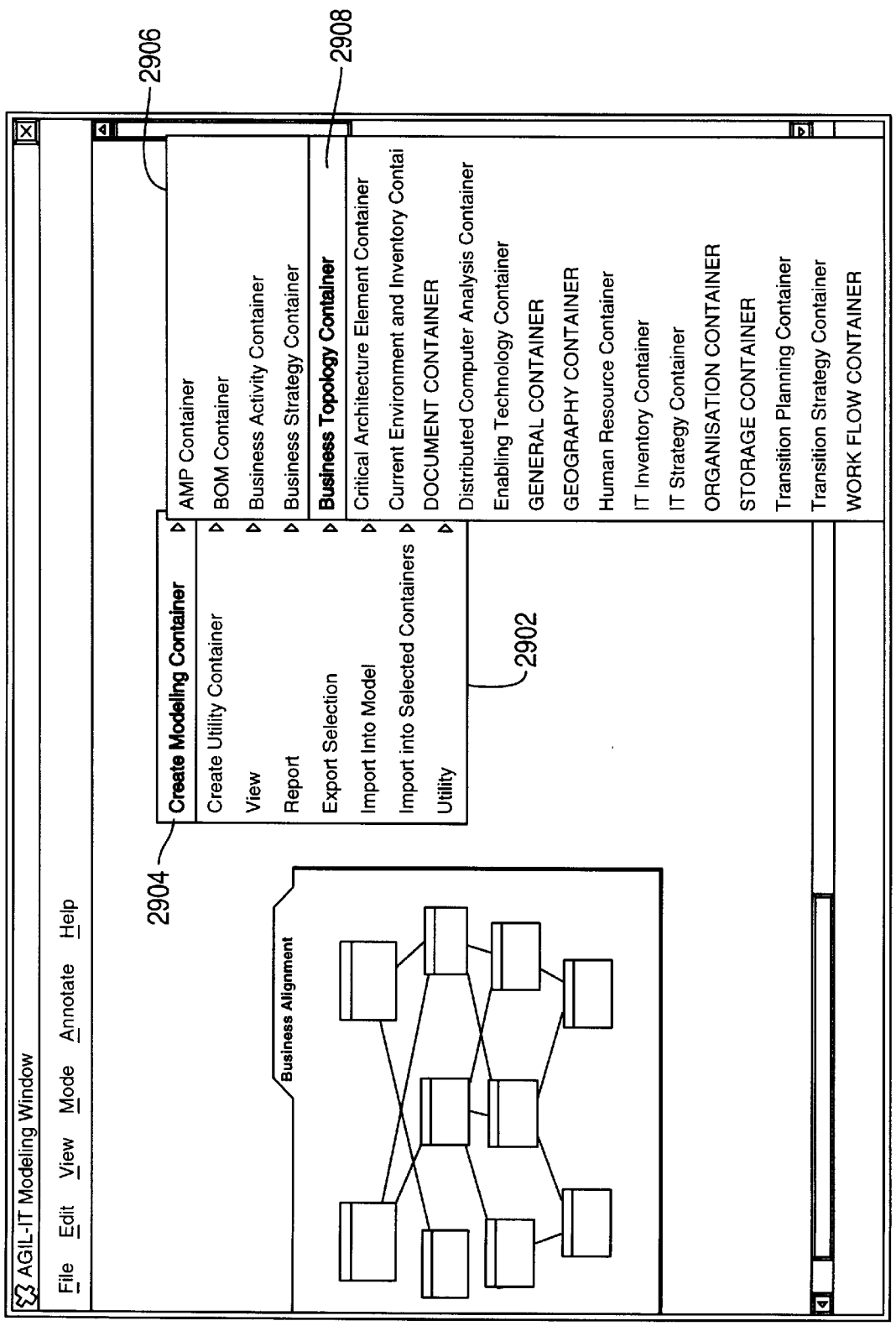
FIGS. 29–30 illustrate the process for creating Information Technology Architecture container.
Figure 30:
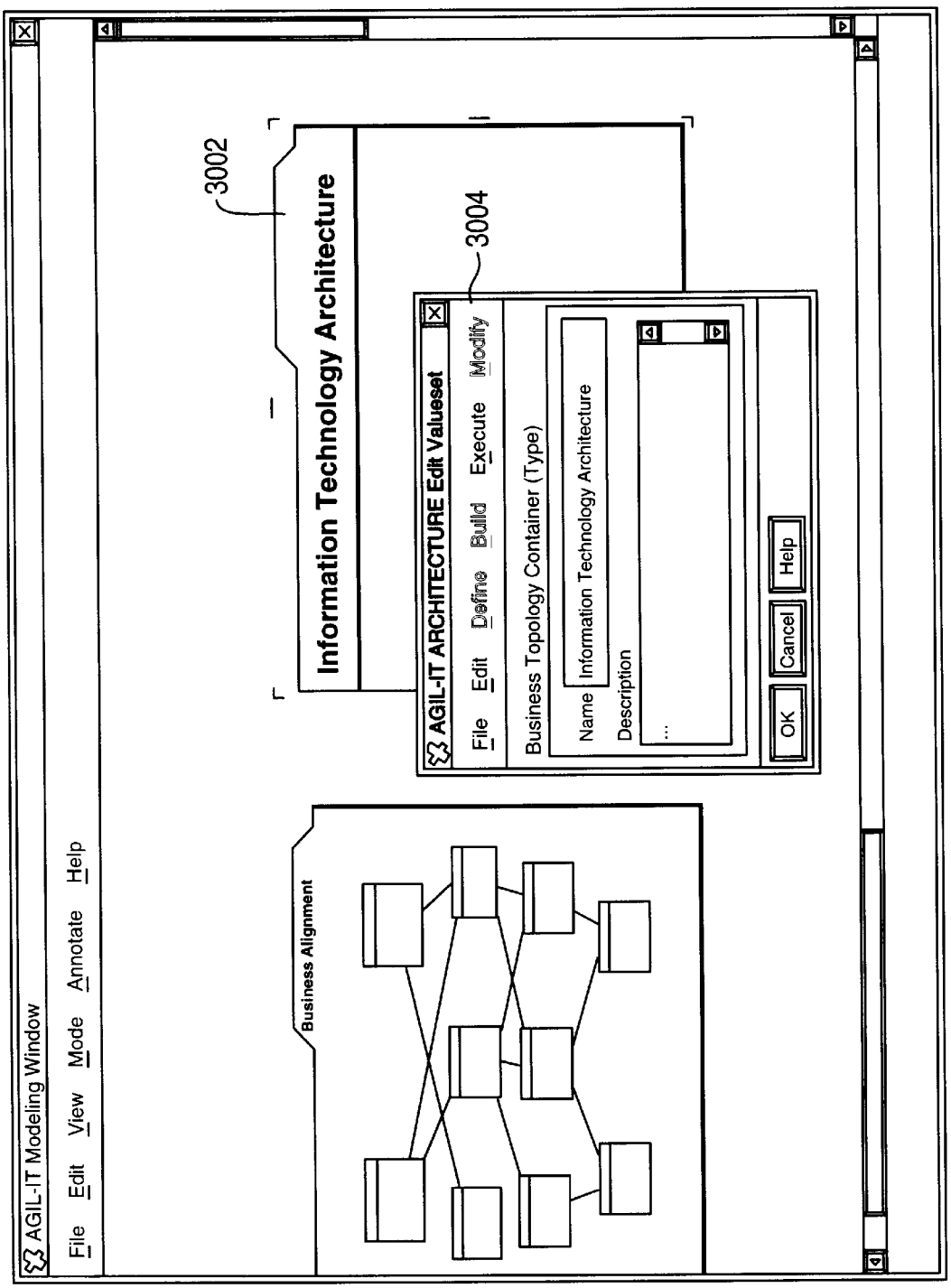

FIGS. 29–30 illustrate the process for creating an Information Technology Architecture container.

Referring to FIG. 29, there is shown a display on a computer screen, illustrating visual interfaces 2902 and 2906. As shown in FIG. 29, visual interface 2902 is invoked by clicking on root region (but outside the Business Alignment container), and visual interface 2906 is invoked by selecting and activating item 2904 (Create Modeling Container) in visual interface 2902. By selecting and activating item 2908 (Business Topology Container), the process is led to FIG. 30.

Referring to FIG. 30, there is shown a display on a computer screen, illustrating a newly created container 3002, and information window 3004 for entering a name and description for the created container. As shown in information window 3004, the name entered for the container is Information Technology Architecture, and the created container is of Business Topology type.

Figure 31:
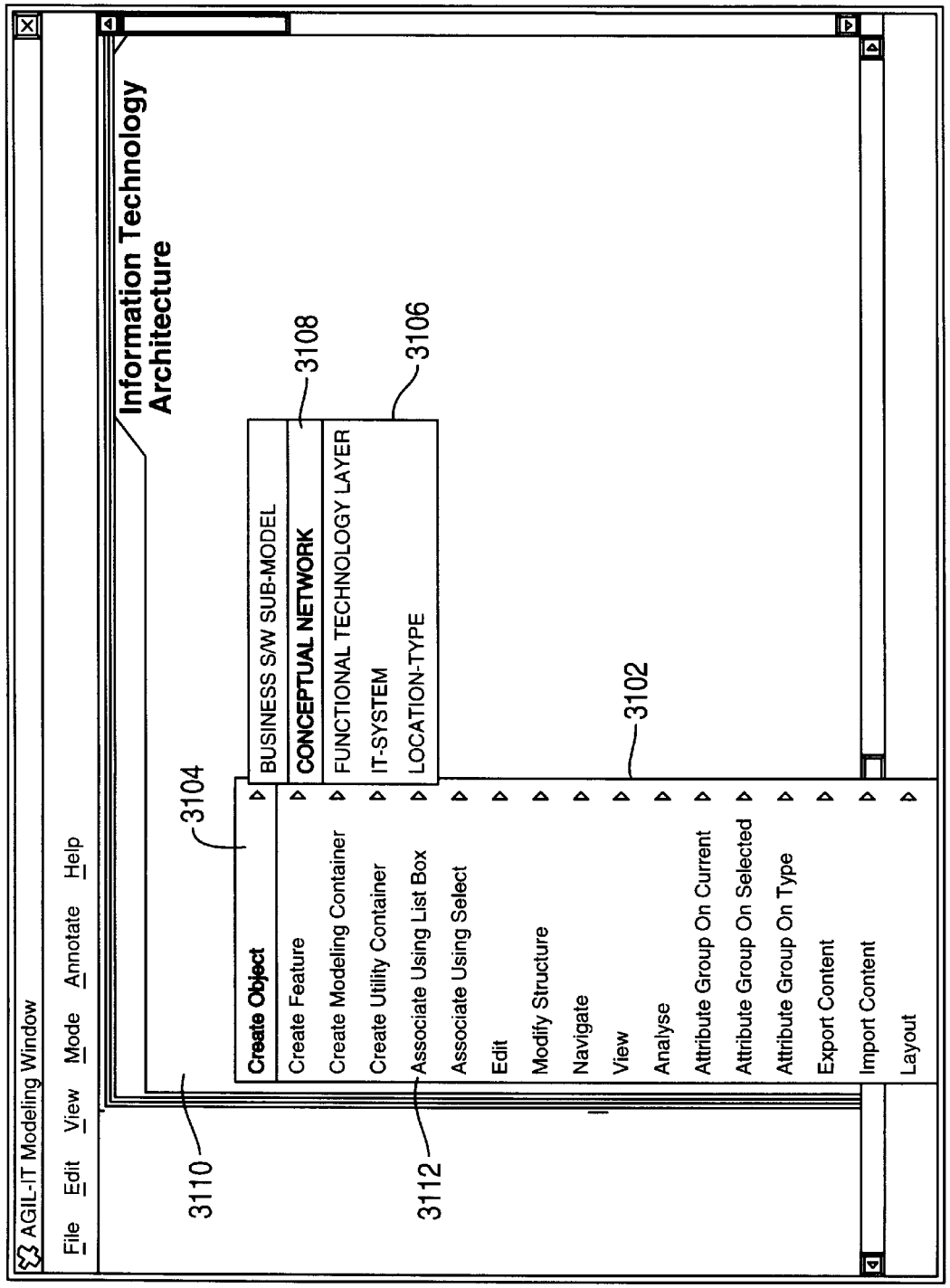
FIGS. 31–33 illustrate the process for creating an object in Information Technology Architecture container.
Figure 32:
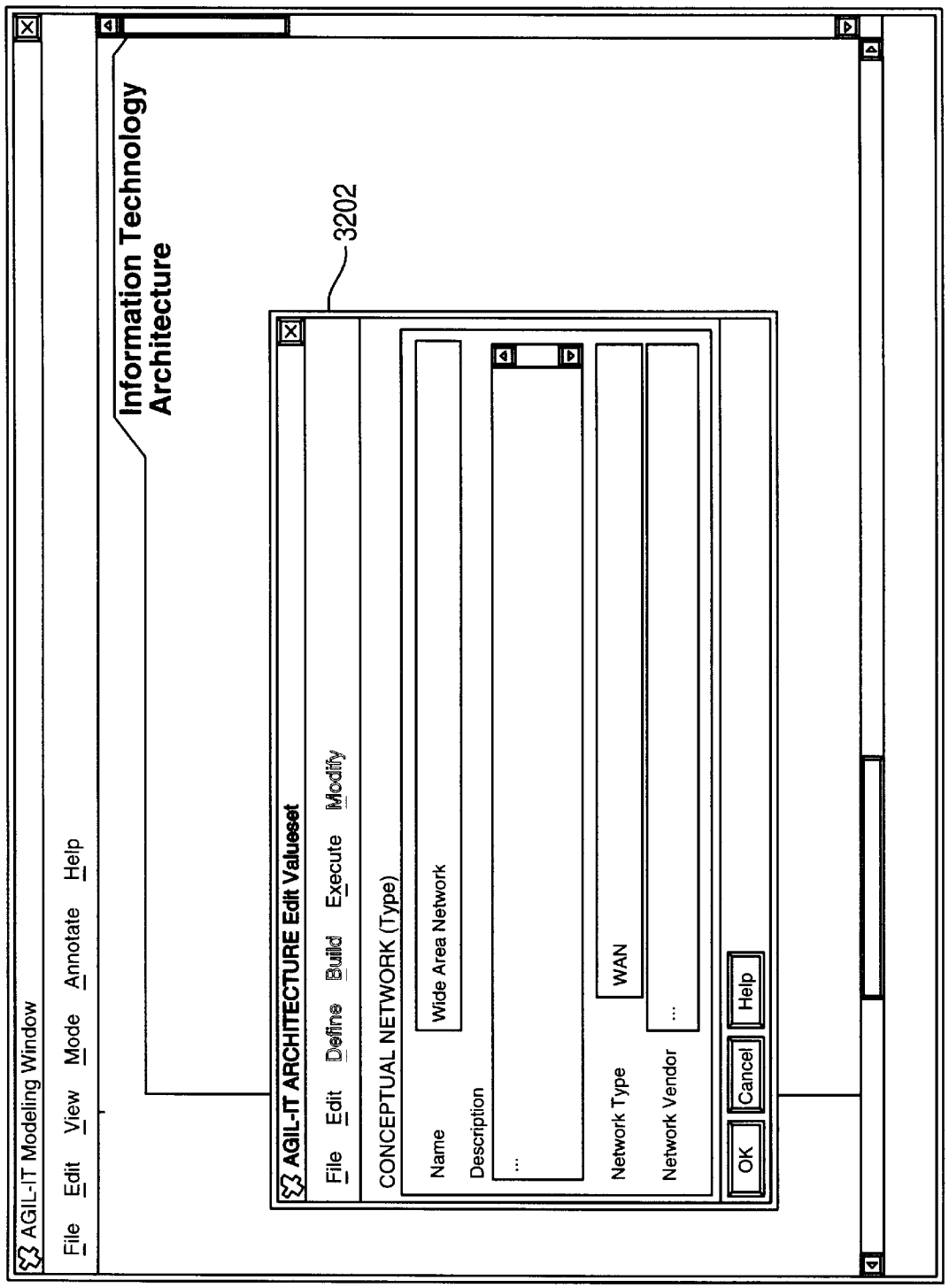
Figure 33:
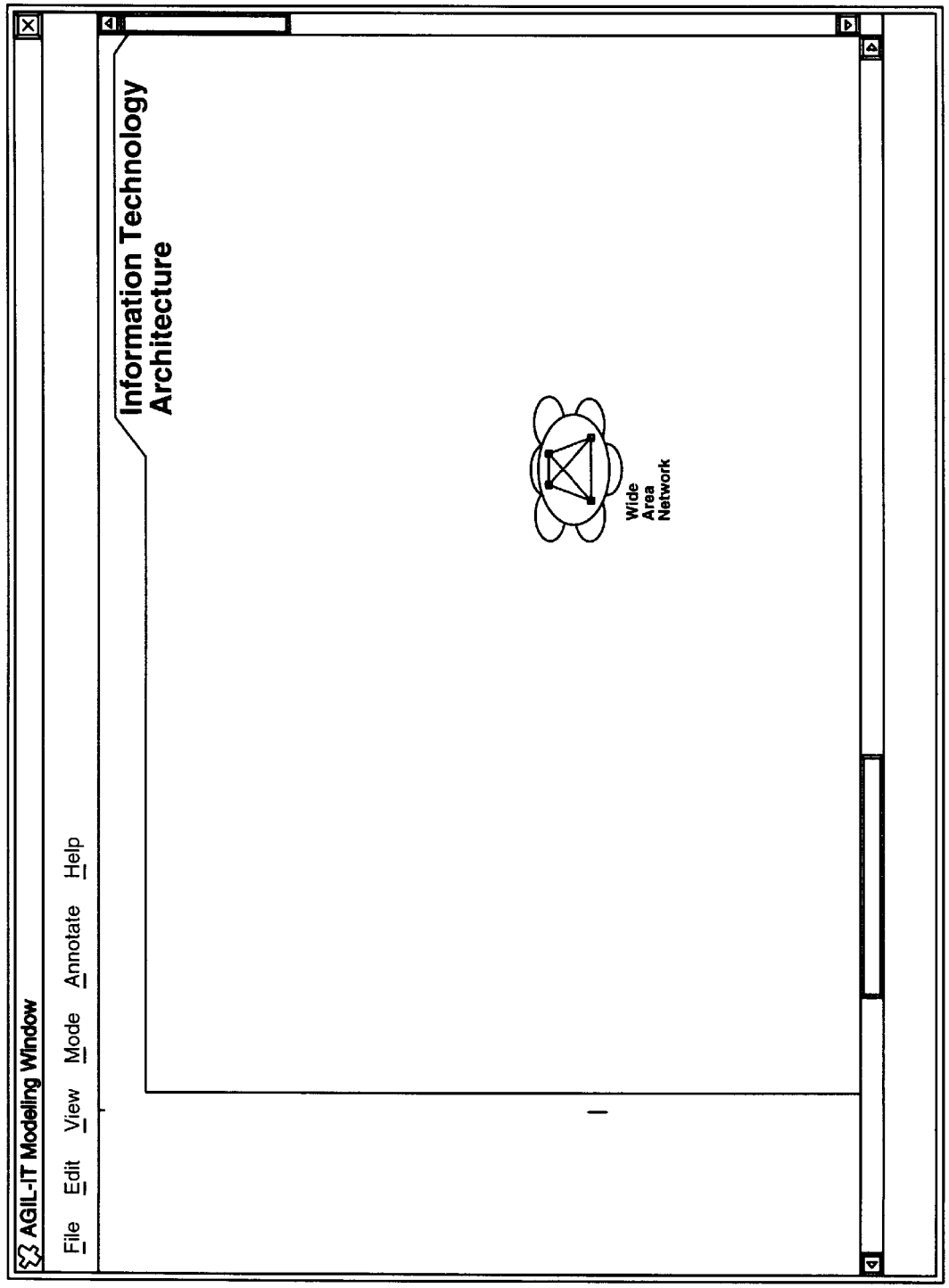

FIGS. 31–33 illustrate the process for creating an object in Information Technology Architecture container.

Referring to FIG. 31, there is shown a display on a computer screen, illustrating a created container 3110, named as Information Technology Architecture. It should be noted that all the information and knowledge captured by, all the visual interfaces and visual created by, Strategic Information and Technology Architecture (406 and 406') software component is associated with this Business Topology type container. In other words, depending the position selected in a Business Topology type container, a respective process and visual interface within Strategic Information and Technology Architecture (406 and 406') software component will be invoked.

FIG. 31 also shows a display on a computer screen, illustrating visual interfaces 3102 and 3106. In FIG. 31, visual interface 3102 is invoked by clicking a position within the Information Technology Architecture container, and visual interface 3106 is invoked by selecting and activating item 3104 (Create Object) in visual interface 3102. As shown in FIG. 31, visual interface 3102 displays all operations for Business Topology type container, including intra-sub-methodology (intra-container) operations and inter-sub-methodology (or inter-container) operations that are defined by the Strategic Information and Technology Architecture methodology (106) as shown in FIG. 1. For the Business Topology type of container, an example of an intra-container operation is the Create Object 3104 operation and an example of an inter-container operation is the Associate Using List Box 3112 operation. Visual interface 3106 displays all type of objects that are defined by the business topology sub-methodology within the Strategic Information and Technology Architecture methodology. Each type of object in the Business Topology type container has predetermined characteristics meaningful to the Strategic Information and Technology Architecture methodology (106) as shown in FIG. 1. By selecting and activating item 3108 (Conceptual Network), the process is led to FIG. 32.

It should noted that the Business SAN (Software) Sub-Model type object shown in visual interface 3106 is an object created within a Business Topology type container. As will be shown in FIGS. 99–104, the Business S/W (Software) Sub-Model object is related to Business Application Element type objects, which are also located within the Information Technology Architecture container and include many software object types.

Referring to FIG. 32, there is shown a display on a computer screen, illustrating information window 3202 for entering property and description for a newly created object. As shown in FIG. 32, the created object is a conceptual network type object. Strategic Information and Technology Architecture software component (406 and 406' in FIG. 4) will record all conceptual network type objects, encapsulate them, and arrange them in a fashion meaningful to Strategic Information and Technology Architecture methodology 106 (shown FIG. 1). By selecting and activating OK button, the process is led to FIG. 33.

Referring to FIG. 33, there is shown a display on a computer screen, illustrating the visual symbol for the newly created conceptual network type object (Wide Area Network object). The visual symbol is encapsulated in Strategic Information and Technology Architecture software component (406 and 406' in FIG. 4).

FIGS. 34–39 illustrate two objects and respective relationships in Information Technology Architecture container.

Figure 34:
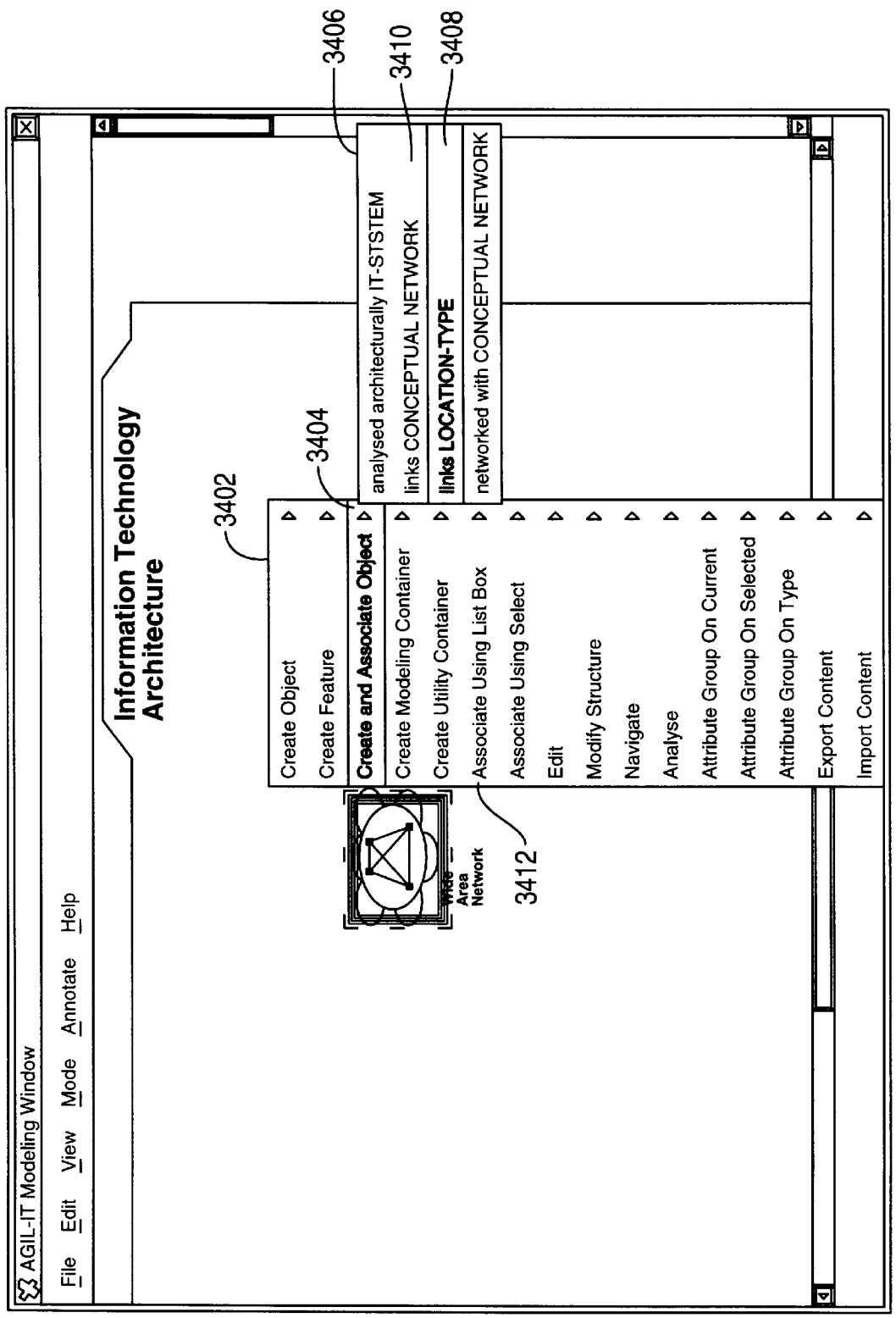
FIGS. 34–39 illustrate two objects and respective relationships in Information Technology Architecture container.

Referring to FIG. 34, there is shown a display on a computer screen, illustrating visual interfaces 3402 and 3406. Visual interface 3402 is invoked by selecting and activating Wide Area Network object, and visual interface 3406 is invoked by selecting and activating item 3404 (Create and Associate Object) in visual interface 3402. As shown in FIG. 34, visual interface 3402 displays all operations for (or behaviors of) the conceptual network objects, including intra-sub-methodology (intra-container) operation and inter-sub-methodology (or inter-container) operation, that are defined by the Strategic Information and Technology Architecture (106) methodology shown in FIG. 1. An example of an intra-container operation for the conceptual network type of object is the Create and Associate Object 3404 operation and an example of an inter-container operation is illustrated by the Associate Using List Box 3412 operation. Visual interface 3406 displays the types of objects that a conceptual network type object can be related in accordance with Strategic Information and Technology Architecture software component (406 and 406' in FIG. 4). Visual interface 3406 also displays the types of relationships a conceptual network type object can be related in accordance with Strategic Information and Technology Architecture methodology (106) as shown in FIG. 1. For example, as indicated by item 3410, a conceptual network type object can link to another conceptual network type object. By selecting and activating item 3408 (links LOCATION-TYPE), the process is led to FIG. 35.

Figure 35:
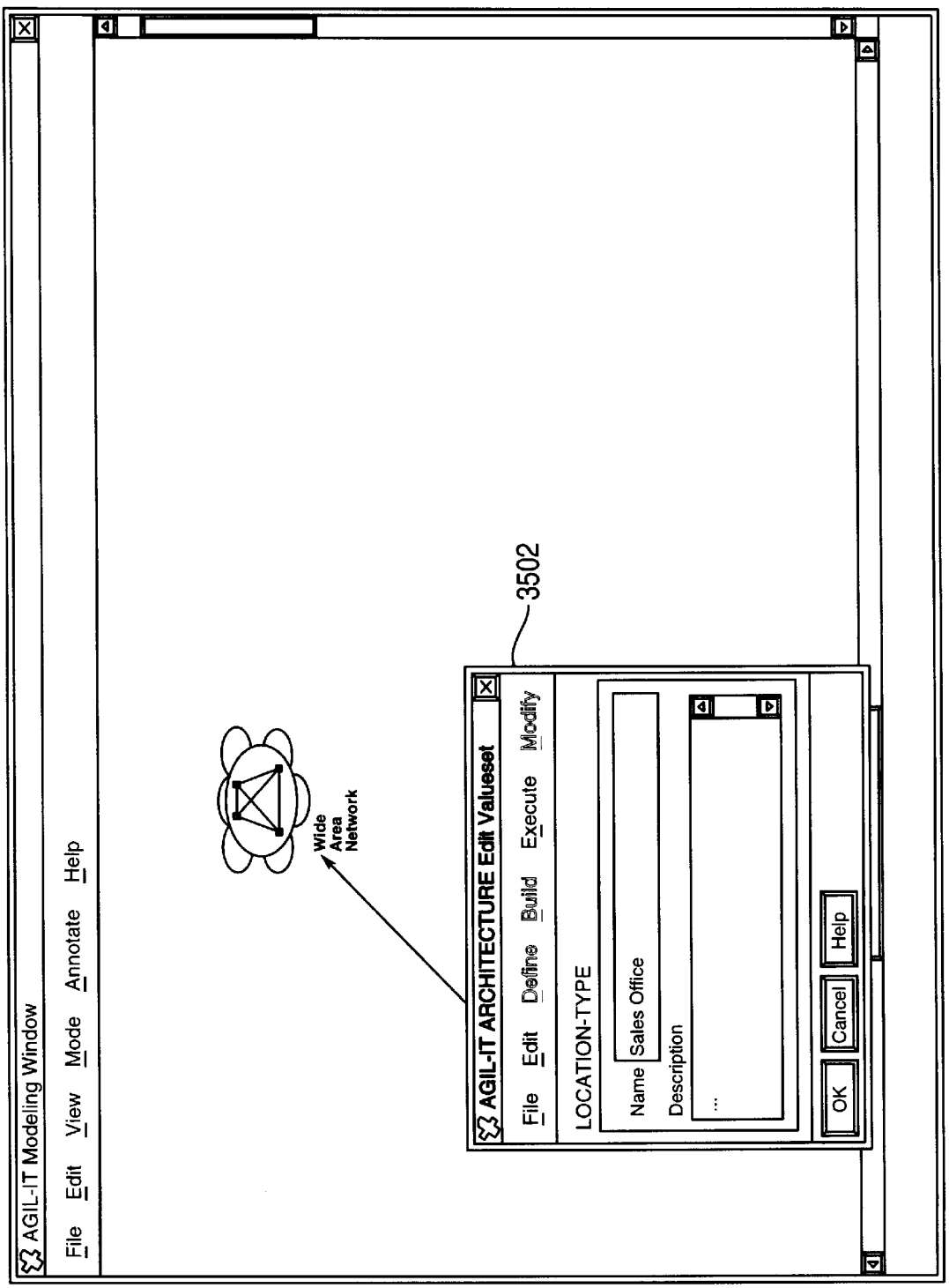

Referring to FIG. 35, there is shown a display on a computer screen, illustrating information window 3502 for entering property and description for a newly created object. As shown in FIG. 35, the created object is a Location-Type object. Strategic Information and Technology Architecture software component (406 and 406' in FIG. 4) will record all location type objects, encapsulate them, and arrange them in a fashion meaningful to Strategic Information and Technology Architecture methodology 106 (shown in FIG. 1). By selecting and activating OK button, the process is led to FIG. 36.

Figure 36:
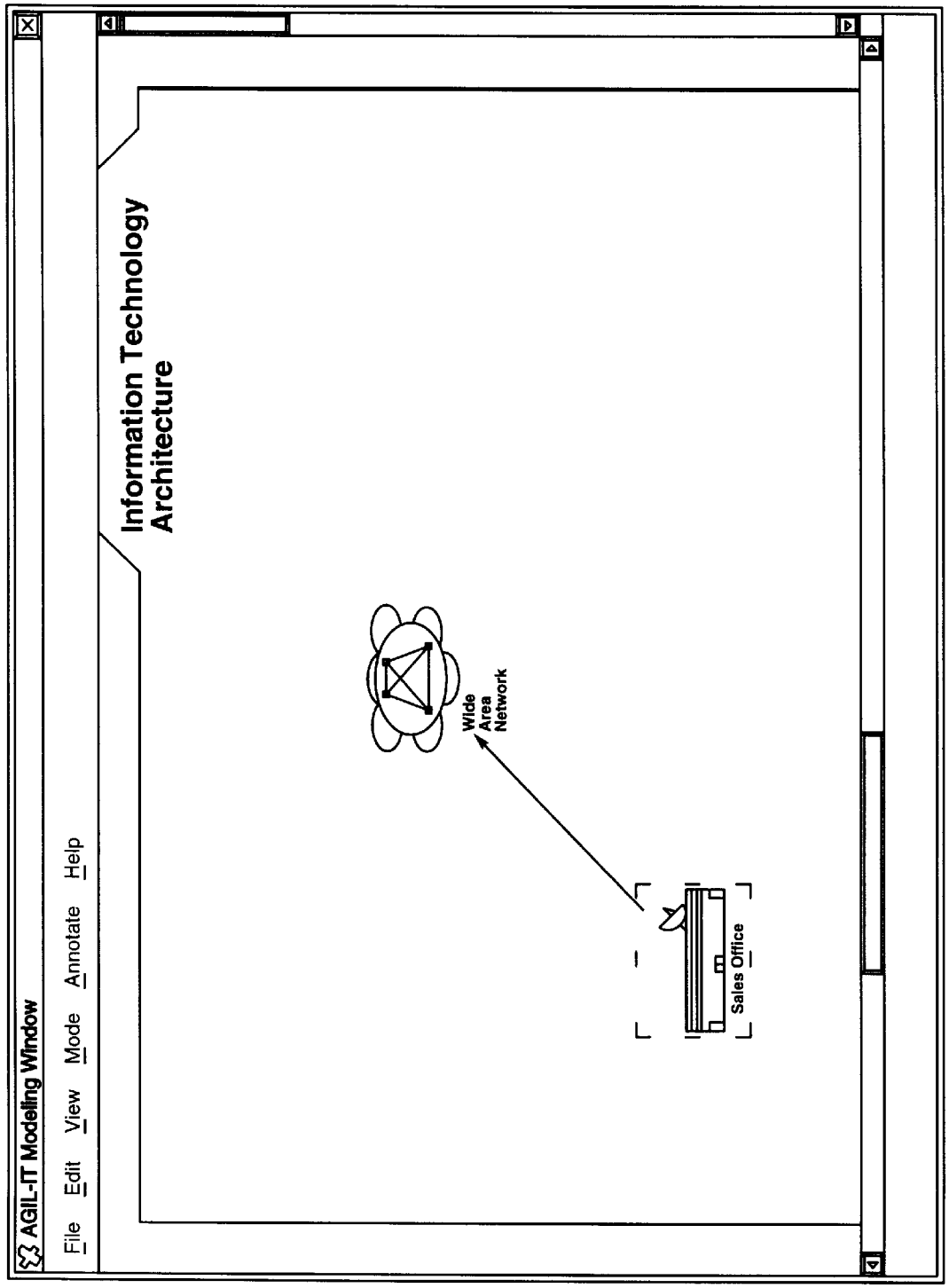

Referring to FIG. 36, there is shown a display on a computer screen, illustrating the visual symbols for the newly created location type object (Sales Office object) and relationship. The visual symbols are encapsulated in Strategic Information and Technology Architecture software component (406 and 406').

Figure 37:
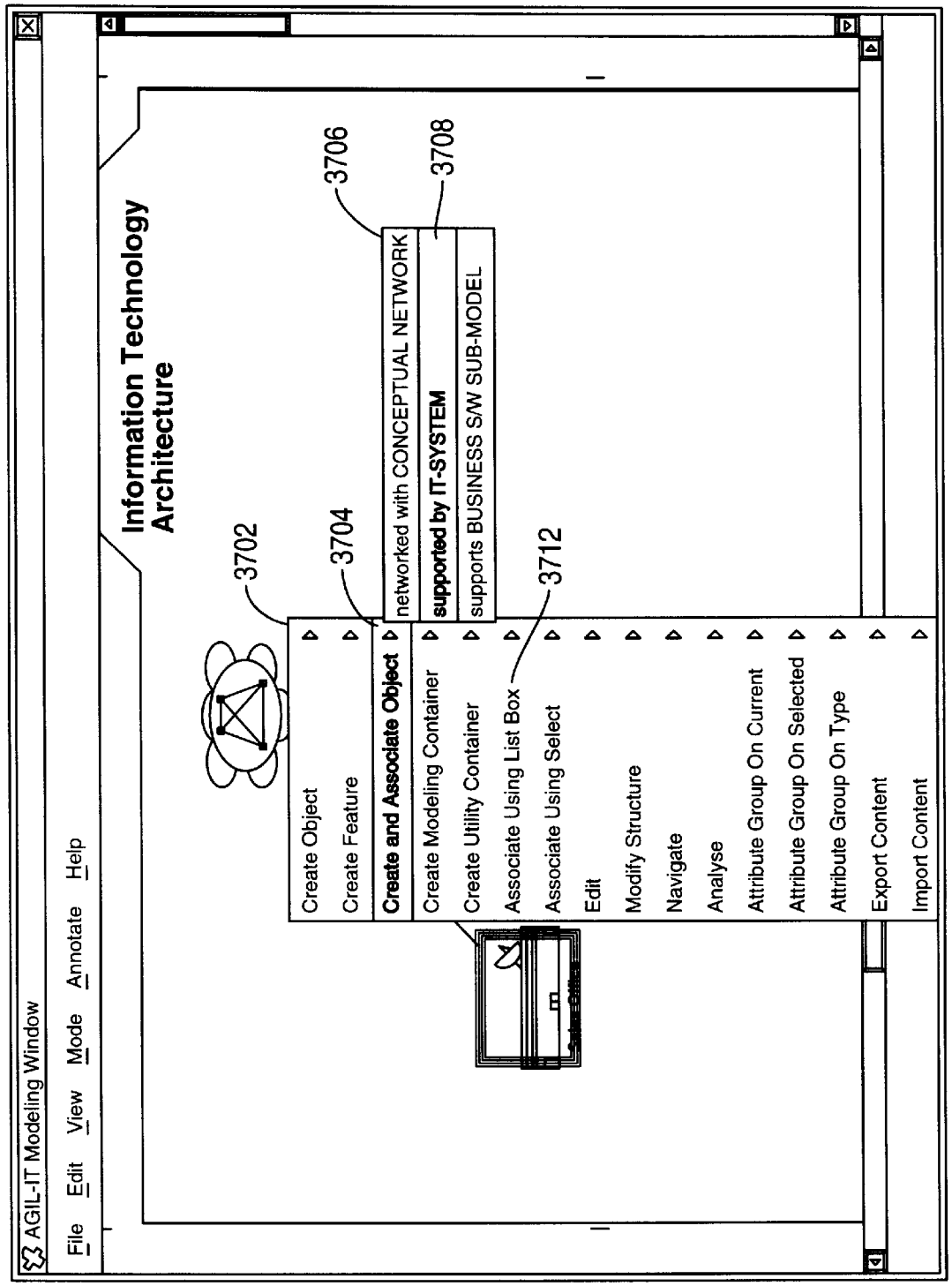

Referring to FIG. 37, there is shown a display on a computer screen, illustrating visual interfaces 3702 and 3706. Visual interface 3702 is invoked by selecting and activating Sales Office object, and visual interface 3706 is invoked by selecting and activating item 3704 (Create and Associate Object) in visual interface 3702. As shown in FIG. 37, visual interface 3702 displays all operations for (or behaviors of) the location-type objects, including intra-sub-methodology (intra-container) operation and inter-sub-methodology (or inter-container) operation, which are defined by the Strategic Information and Technology Architecture methodology shown in FIG. 1. An example of an intra-container operation for the Location-Type object is the Create and Associate Object (3704) operation, and an example of an inter-container operation is illustrated by the Associate Using List Box (3712) operation. Visual interface 3706 displays the types of objects that a location type object can be related in accordance with Strategic Information and Technology Architecture methodology (106) as shown in FIG. 1. Visual interface 3706 also displays the types of relationships a location type object can be related in accordance with Strategic Information and Technology Architecture methodology (106) as shown in FIG. 1. By selecting and activating item 3708 (supported by IT-SYSTEM), the process is led to FIG. 38.

Figure 38:
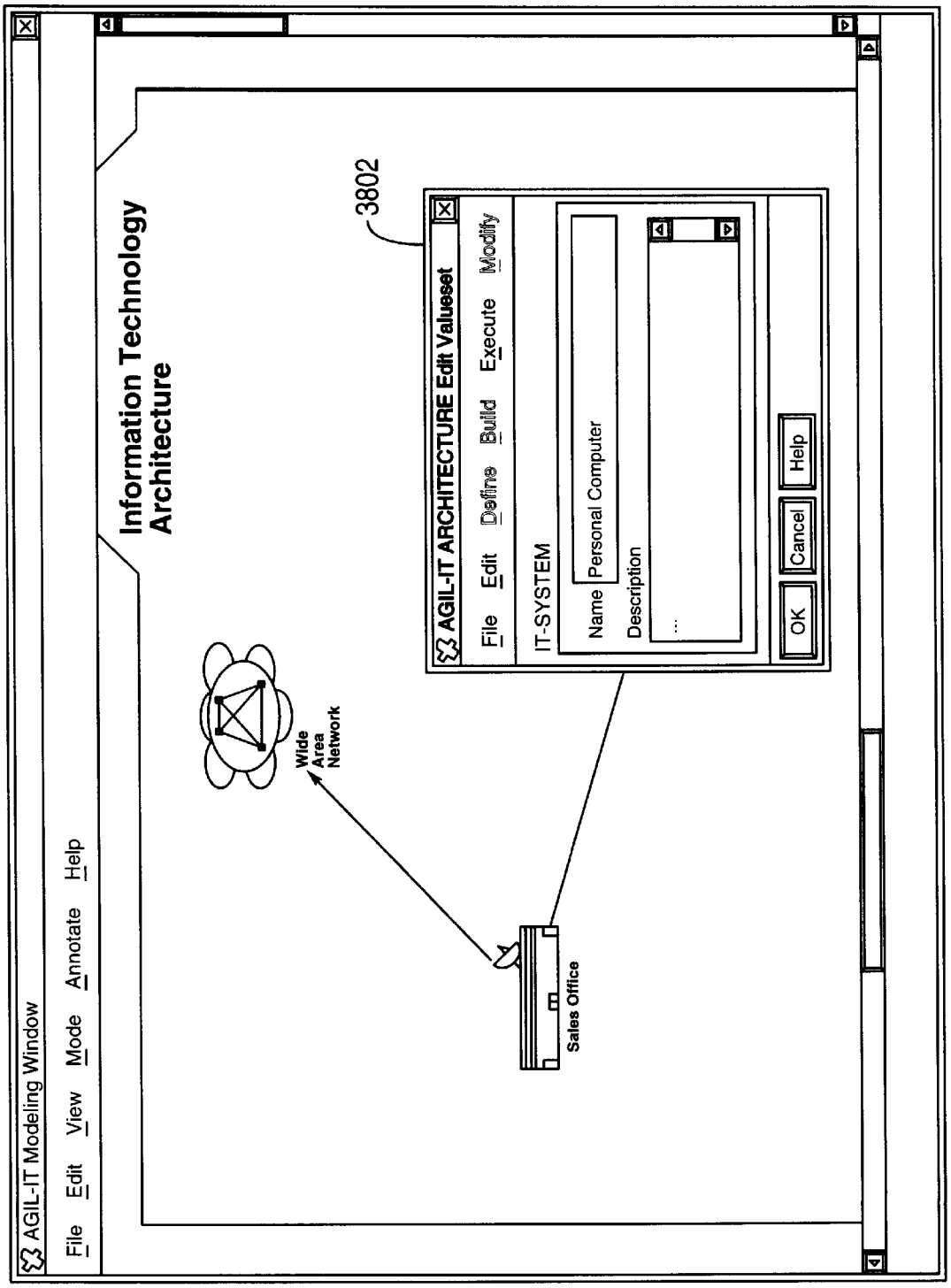

Referring to FIG. 38, there is shown a display on a computer screen, illustrating information window 3802 for entering property and description for a newly created object. As shown in FIG. 38, the created object is an IT-System type of object. Strategic Information and Technology Architecture software component (406 and 406') will record all IT system type objects, encapsulate them, and arrange them in a fashion meaningful to Strategic Information and Technology Architecture 106 (shown FIG. 1). By selecting and activating OK button, the process is led to FIG. 39.

Figure 39:
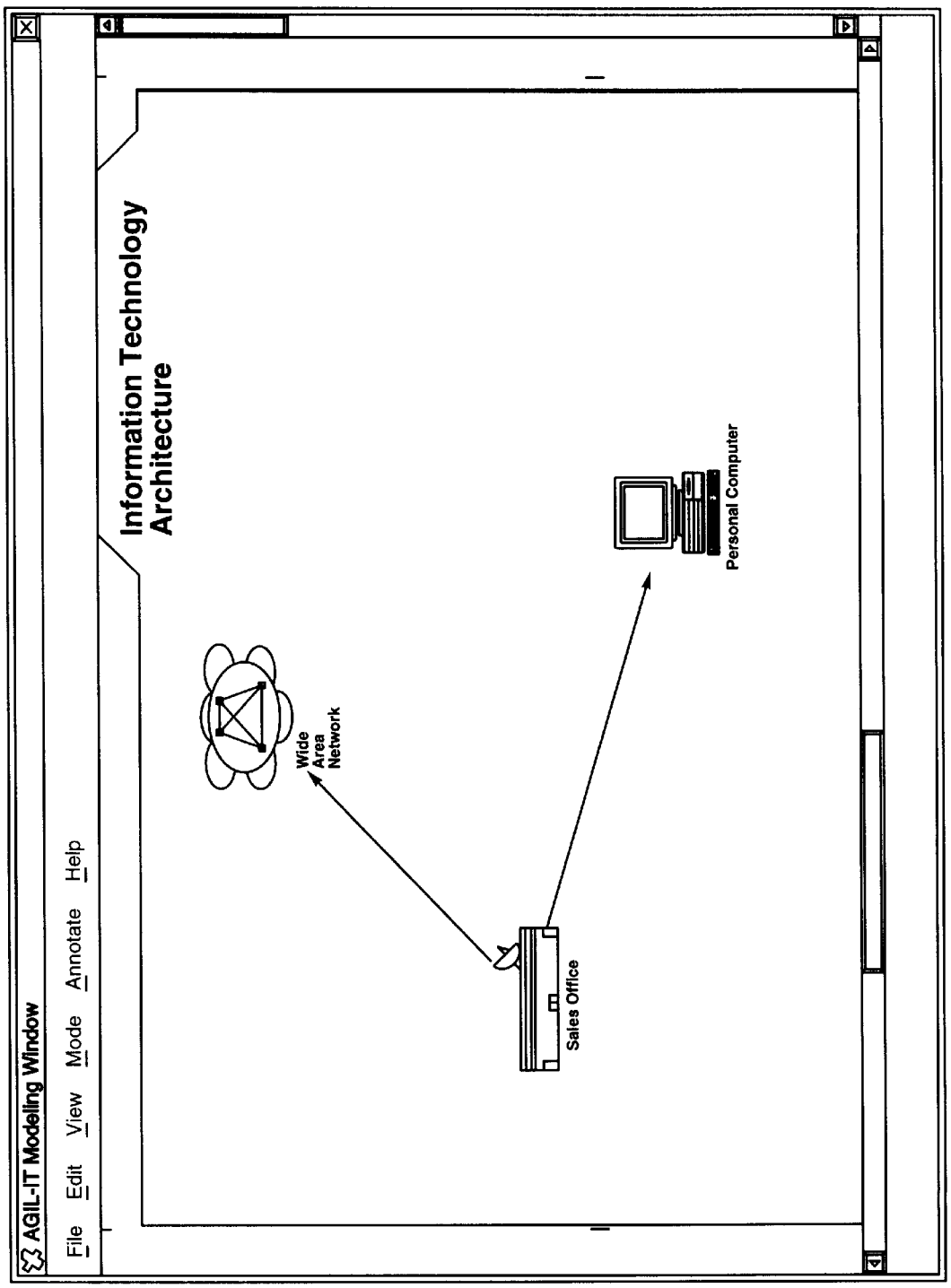

Referring to FIG. 39, there is shown a display on a computer screen, illustrating the visual symbols for the newly created IT system type object (Personal Computer object) and relationship.

The Server, Headquarters Location, and Department Server objects in the Information Technology Architecture container and respective relationships as shown in container 704 of FIG. 7 can be built by using a process similar to that discussed above.

Figure 40:
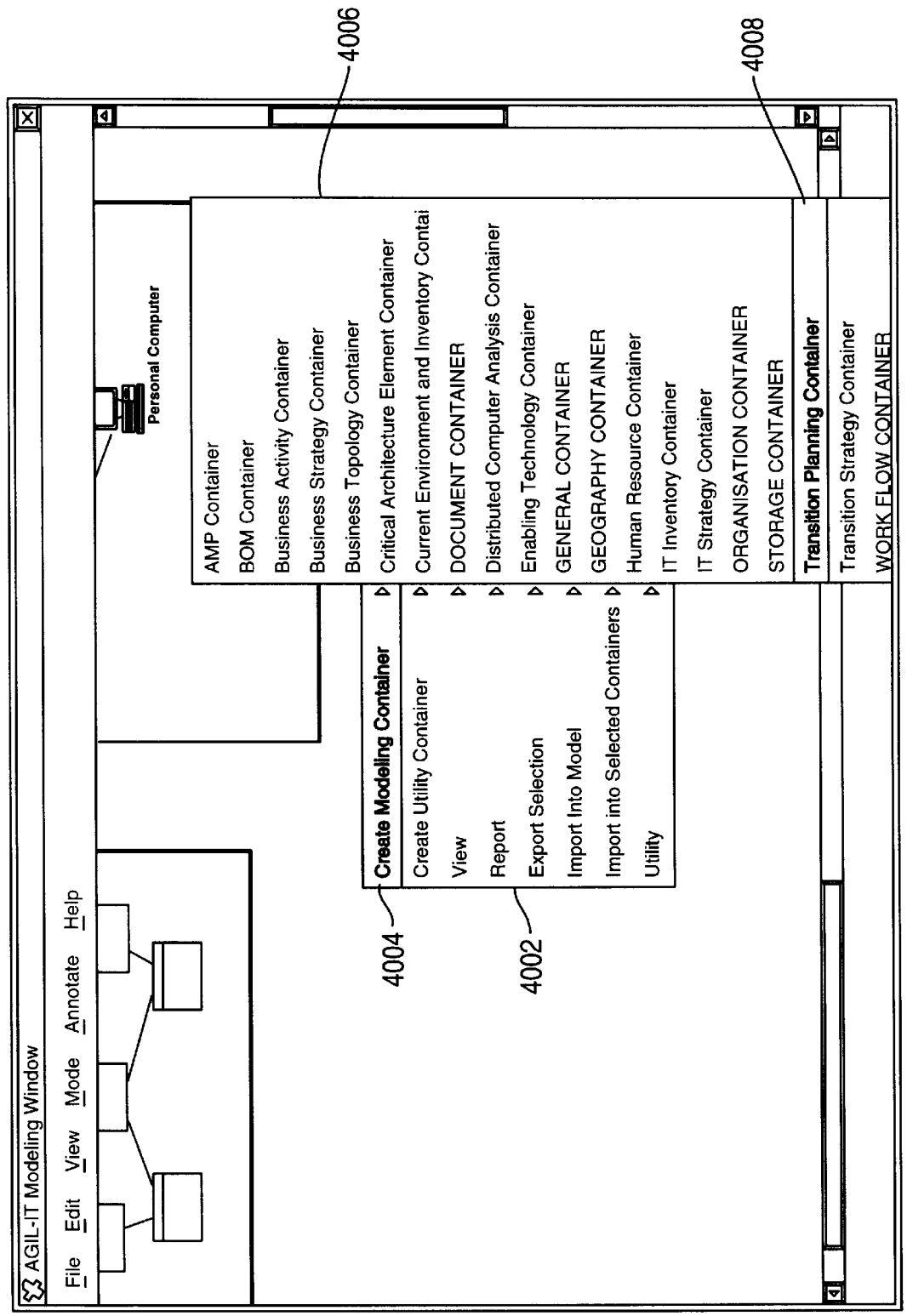
FIGS. 40–41 illustrate the process for creating Transition Planning container.
Figure 41:
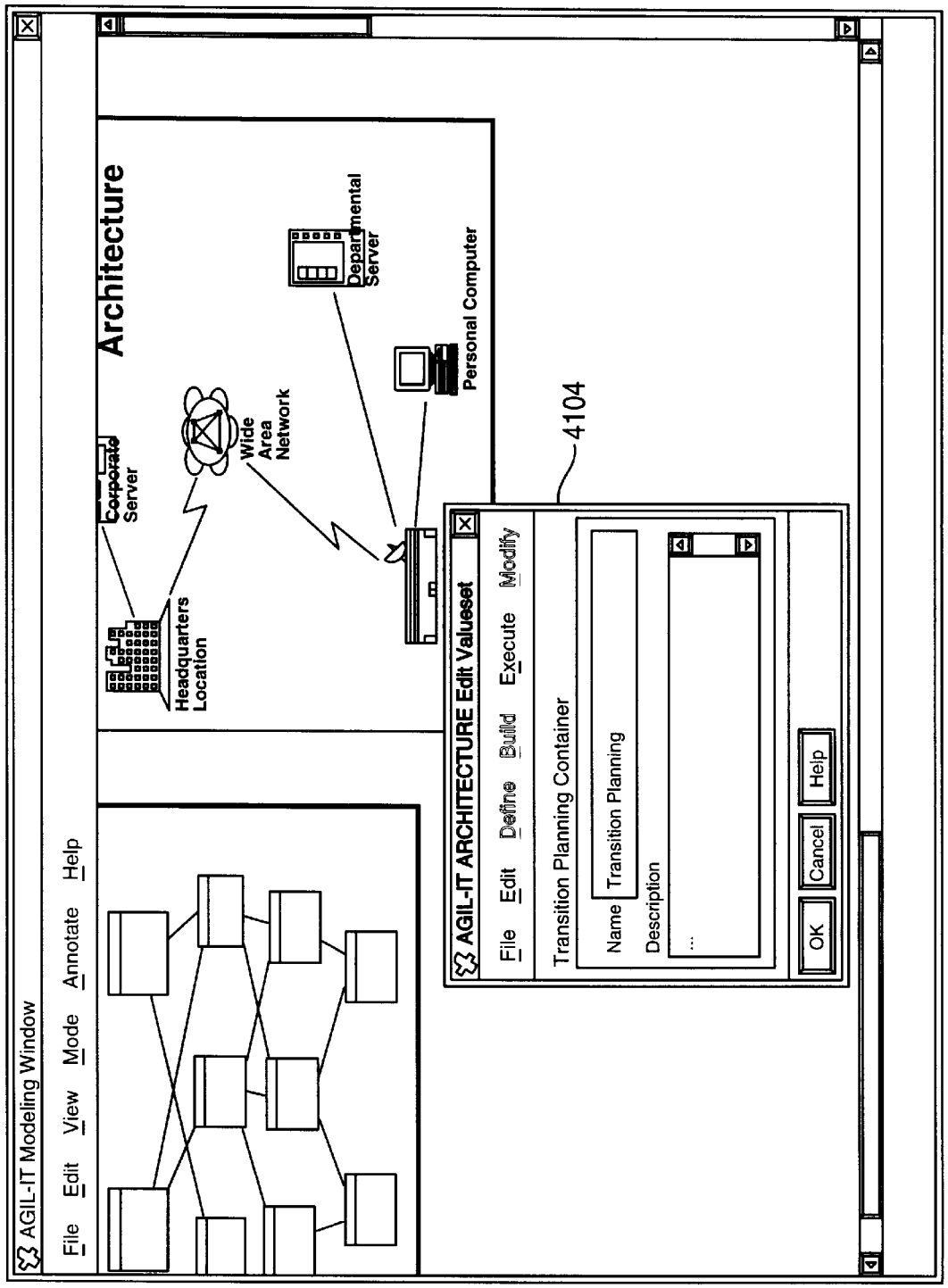

FIGS. 40–41 illustrate the process for creating Transition Planning container.

Referring to FIG. 40, there is shown a display on a computer screen, illustrating visual interfaces 4002 and 4006. As shown in FIG. 40, visual interface 4002 is invoked by clicking on root region (but outside the Business Alignment and Information Technology Architecture containers), and visual interface 4006 is invoked by selecting and activating item 4004 (Create Modeling Container) in visual interface 4002. By selecting and activating item 4008 (Transition Planning Container), the process is led to FIG. 41.

Referring to FIG. 41, there is shown a display on a computer screen, illustrating information window 4104 for entering a name and description for the created container. As shown in information window 4104, the name entered for the container is Transition Planning, and the created container is Transition Planning type. By clicking OK button, the process is led to FIG. 42.

FIGS. 42–47 illustrate the process for creating two objects and a relationship in Transition Planning container.

Figure 42:
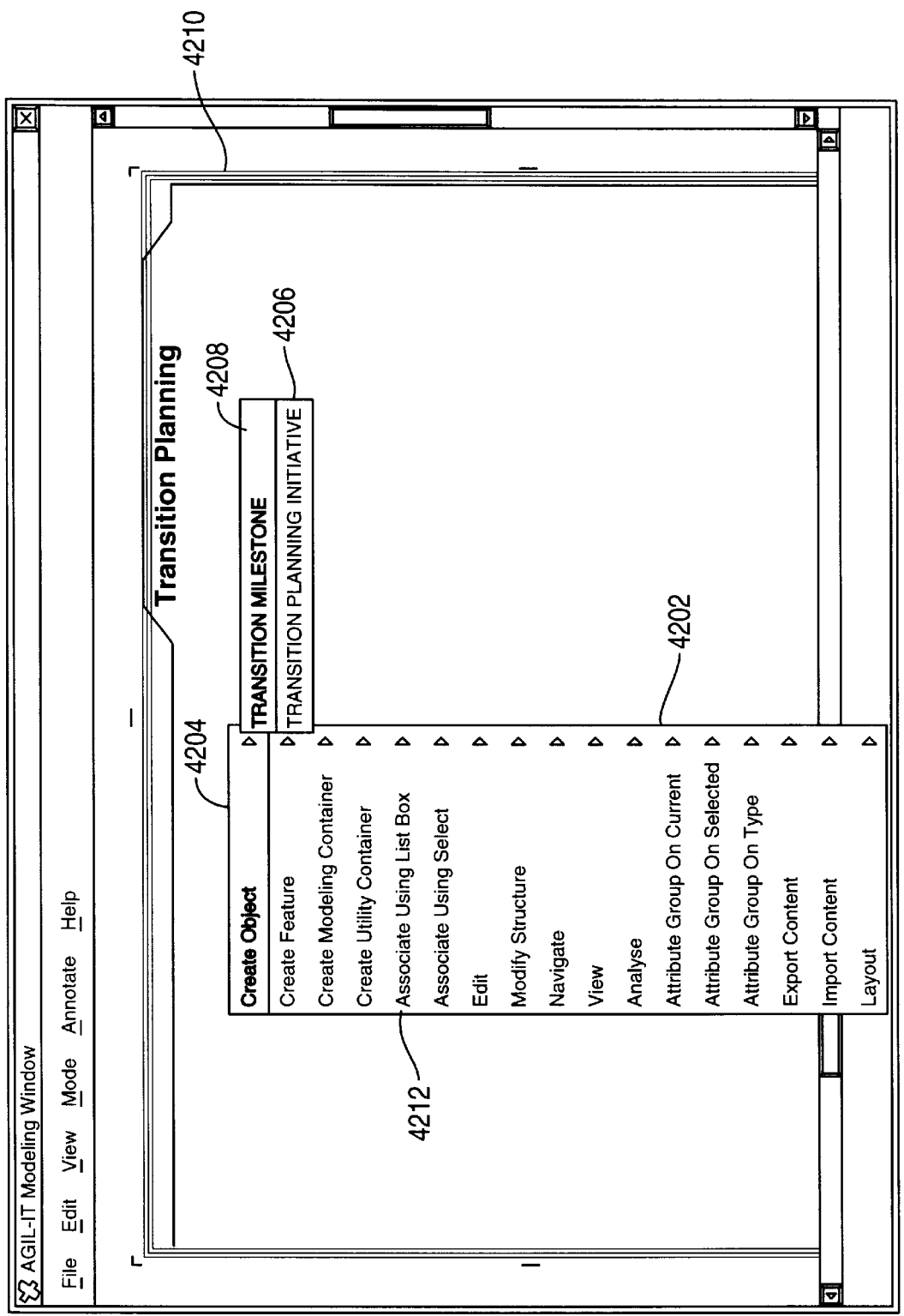
FIGS. 42–47 illustrate the process for creating two objects and a relationship in Transition Planning container.

Referring to FIG. 42, there is shown a display on a computer screen, illustrating a created container 4210 (named as Transition Planning) and visual interfaces 4202 and 4206. It should be noted that all the information and knowledge captured by, all the visual interfaces and visual created by, Transition Strategy & Planning (408 and 408' in FIG. 4) software component is associated with Transition Planning type container. In other words, depending on the position selected in a Transition Planning type container, a respective process and visual interface within Transition Strategy and Planning (408 and 408') software component will be invoked.

As shown in FIG. 42, visual interface 4202 is invoked by clicking a position within the Transition Planning container, and visual interface 4206 is invoked by selecting and activating item 4204 (Create Object) in visual interface 4202. Visual interface 4202 displays all operations for Transition Planning type container, including intra-sub-methodology (intra-container) operations and inter-sub-methodology (or inter-container) operations that are defined by the Transition Strategy and Planning methodology shown in FIG. 1. For the Transition Planning type of container, an example of an intra-container operation is the Create Object (4204) operation, and an example of an inter-container operation is the Associate Using List Box (4212) operation. Visual interface 4206 displays two type of objects that are defined by the Transition and Planning methodology (108) as shown in FIG. 1. Each type of object in Transition Planning type container has predetermined characteristics meaningful to the Transition Strategy and Planning methodology (108) as shown in FIG. 1. By selecting and activating item 4208 (TRANSITION MILESTONE), the process is led to FIG. 43.

Figure 43:
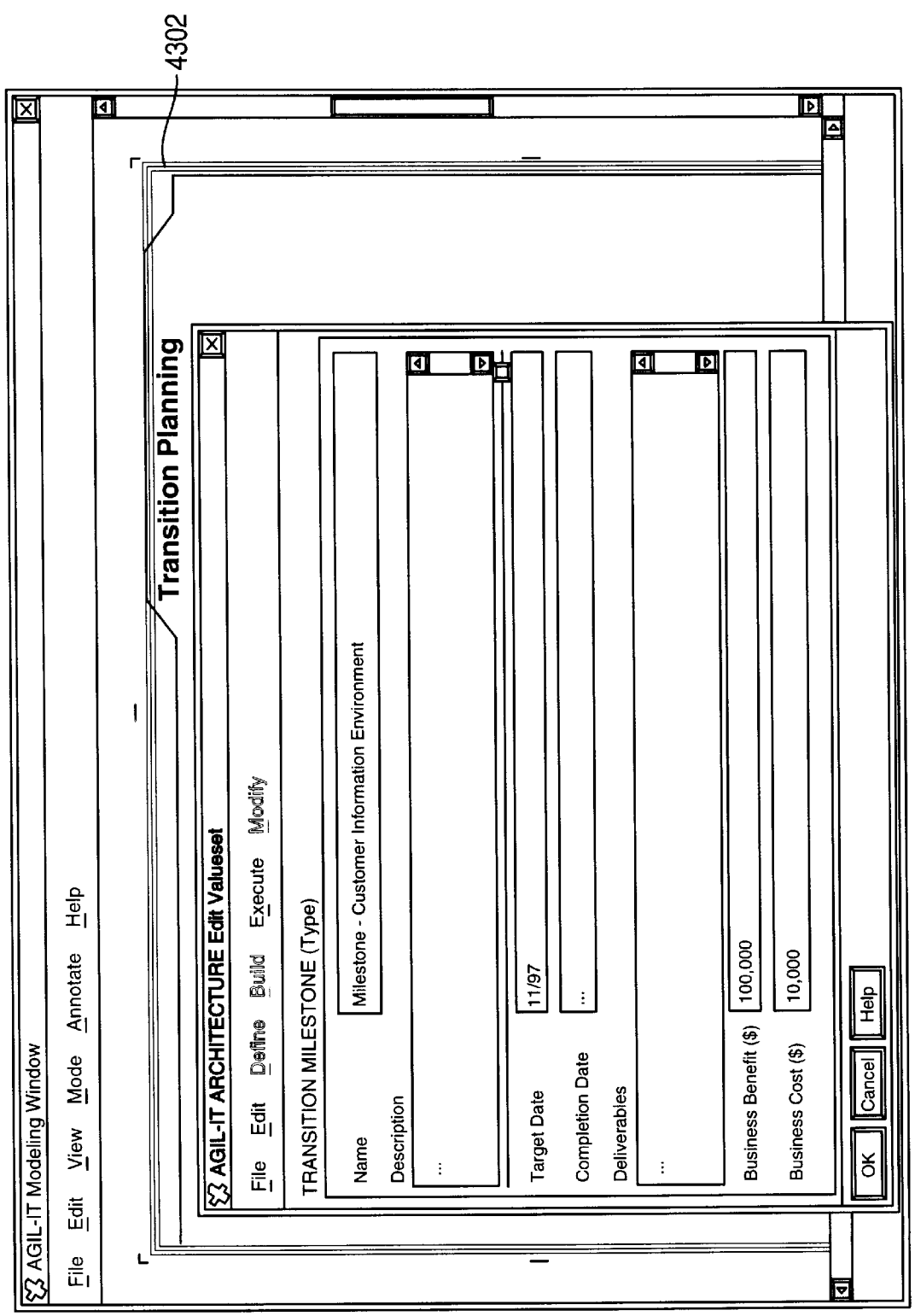

Referring to FIG. 43, there is shown a display on a computer screen, illustrating information window 4302 for entering property and description for a newly created object. Information window 4302 indicates that the created object is a Transition Milestone type object. Transition Strategy & Planning software component (408 and 408' in FIG. 4) will record all Transition Milestone type objects, encapsulate them, and arrange them in a fashion meaningful to Transition Strategy and Planning methodology (108) as shown in FIG. 1. By selecting and activating OK button, the process is led to FIG. 44.

Figure 44:
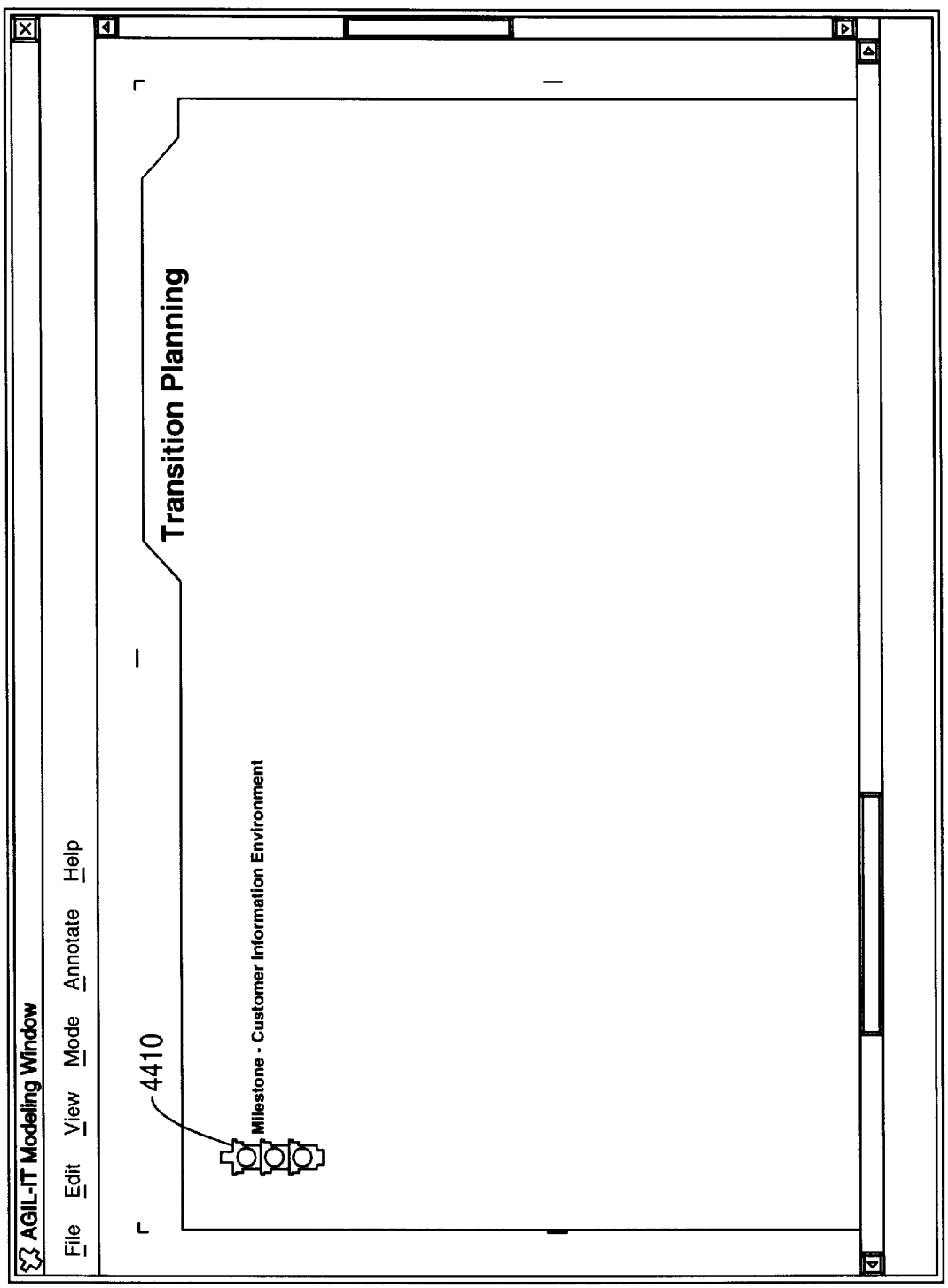

Referring to FIG. 44, there is shown a display on a computer screen, illustrating the visual symbol for the newly created Transition Milestone type object (Milestone object 4410). The visual symbol is encapsulated in Transition Strategy and Planning software component (408 and 408' in FIG. 4).

Figure 45:
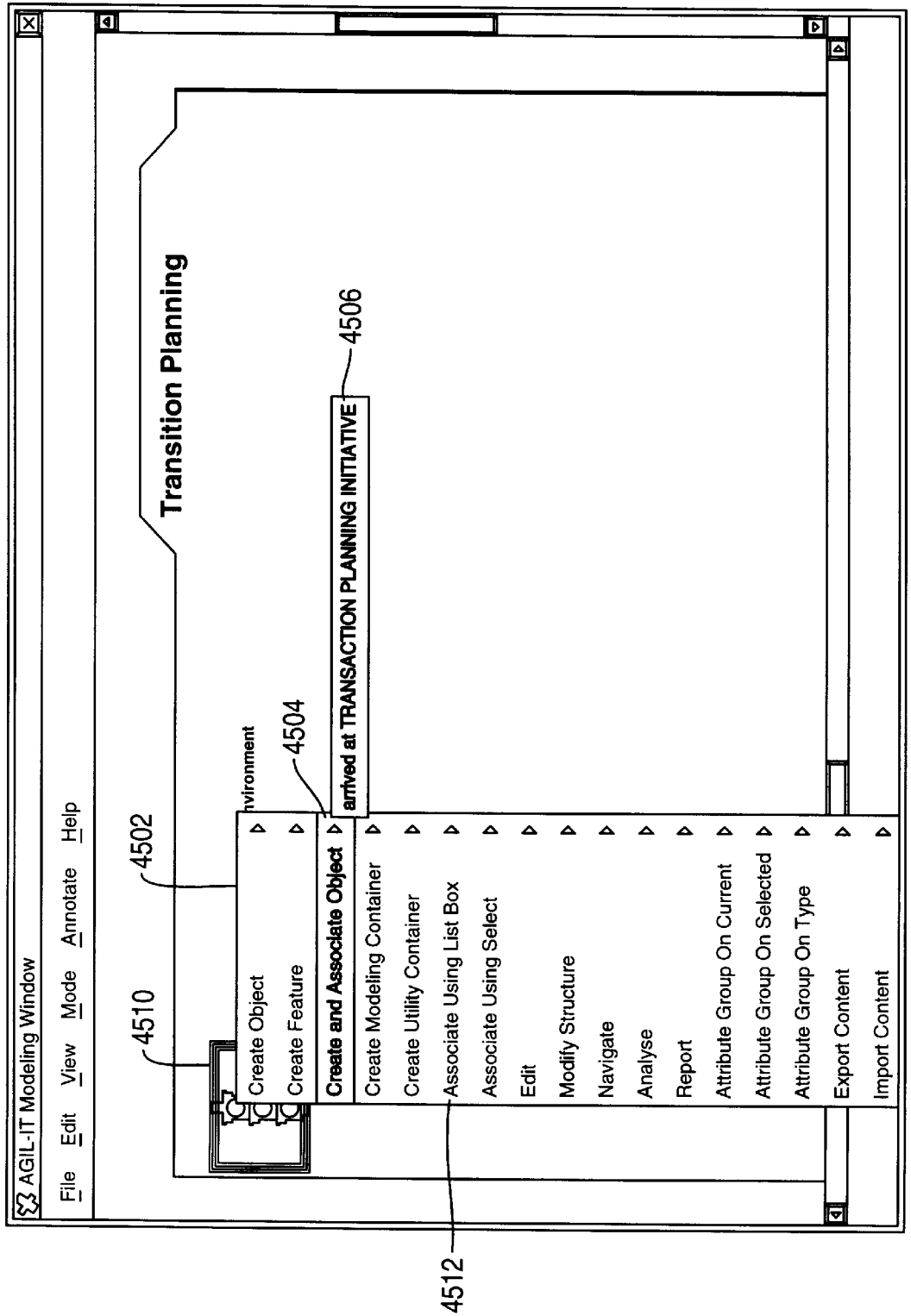

Referring to FIG. 45, there is shown a display on a computer screen, illustrating visual interfaces 4502 and 4506. Visual interface 4502 is invoked by selecting and activating Milestone object, and visual interface 4506 is invoked by selecting and activating item 4504 (Create and Associate Object) in visual interface 4502. As shown in FIG. 45, visual interface 4502 displays all operations for (or behaviors of) the Transition Milestone type objects, including intra-sub-methodology (intra-container) operations and inter-sub-methodology (or inter-container) operations, which are defined by the Transition and Planning methodology (108) as shown in FIG. 1. An example of an intra-container operation for the Transition Milestone type of object is the Create and Associate Object 4504 operation and an example of an inter-container operation is illustrated by the Associate Using List Box 4512 operation. Visual interface 4506 displays one type of object that a Transition Milestone type object can be related in accordance with Transition Strategy and Planning software component (408 and 408' in FIG. 4). Visual interface 4506 also displays one type of relationship (arrived at) a Transition Milestone type object can be related in accordance with Transition Strategy and Planning methodology shown in FIG. 1. By selecting and activating visual interface 4506 (arrive at TRANSITION PLANNING INITIATIVE), the process is led to FIG. 46.

Figure 46:
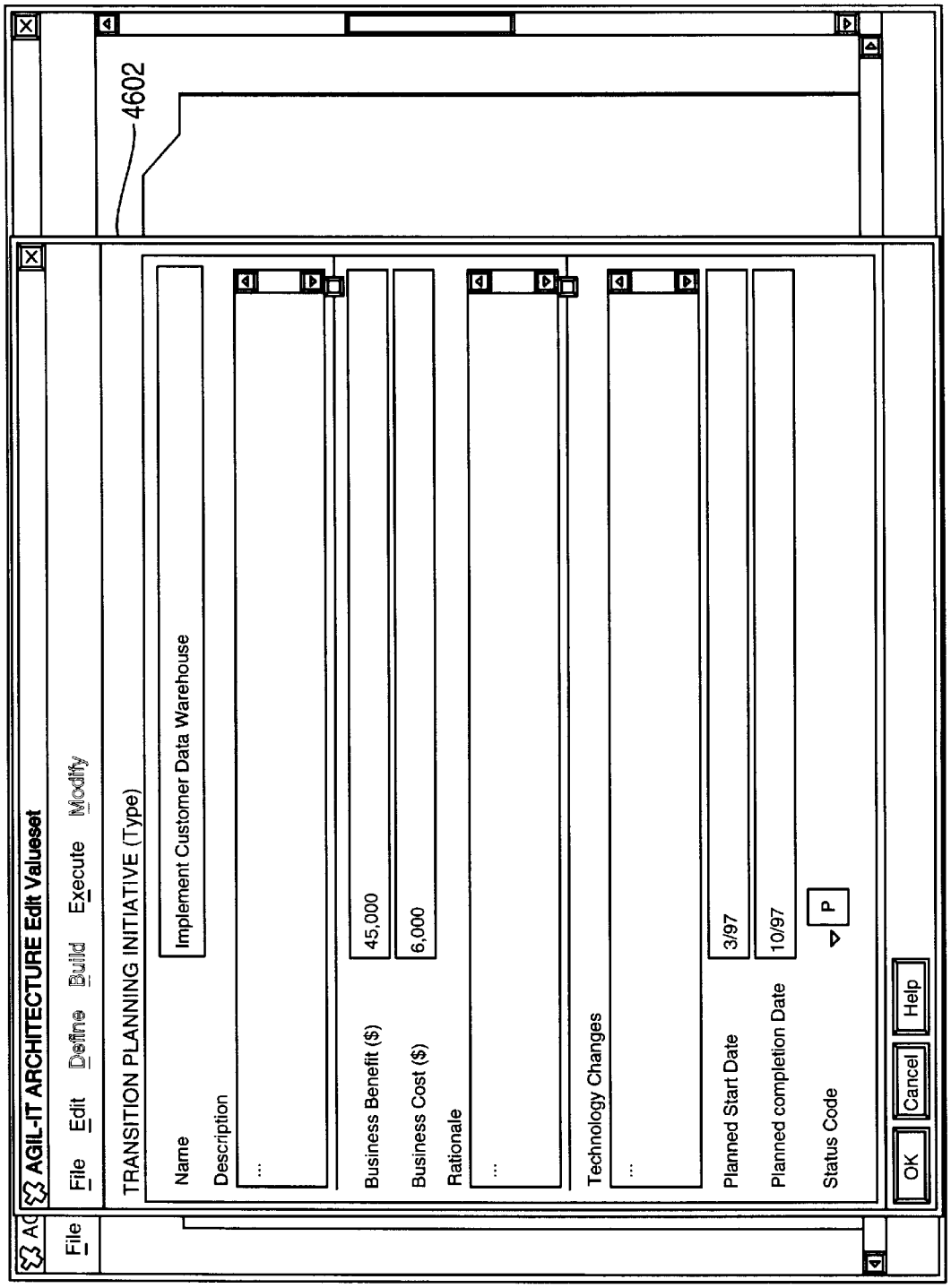

Referring to FIG. 46, there is shown a display on a computer screen, illustrating information window 4602 for entering property and description for a newly created object. As shown in FIG. 46, the created object is a Transition Planning Initiative type object. Transition Strategy and Planning software component (408 and 408' in FIG. 4) will record all Transition Planning Initiative type objects, encapsulate them, and arrange them in a fashion meaningful to Transition Strategy and Planning methodology 108 (shown FIG. 1). By selecting and activating OK button, the process is led to FIG. 47.

Figure 47:
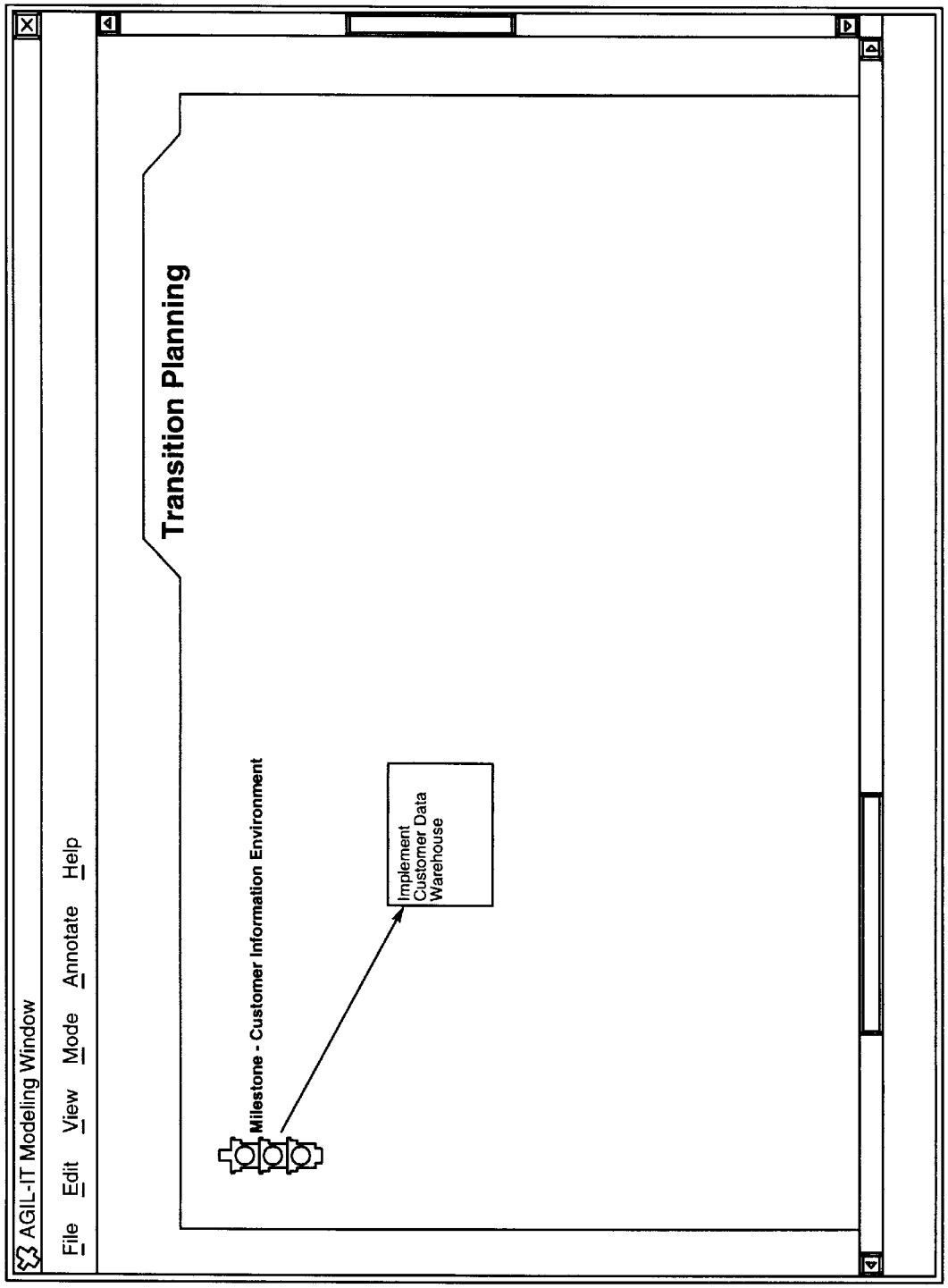

Referring to FIG. 47, there is shown a display on a computer screen, illustrating the visual symbols for the newly created Transition Planning Initiative type object (Implement Customer Data Warehouse object) and the respective relationship. The visual symbols are encapsulated in Transition Strategy and Planning software component (408 and 408').

The Perform Data Quality Audit and Establish Customer Data Requirements objects in the Transition Planning container and respective relationships as shown in container 706 of FIG. 7 can be built by using a process similar to that discussed above.

Figure 48:
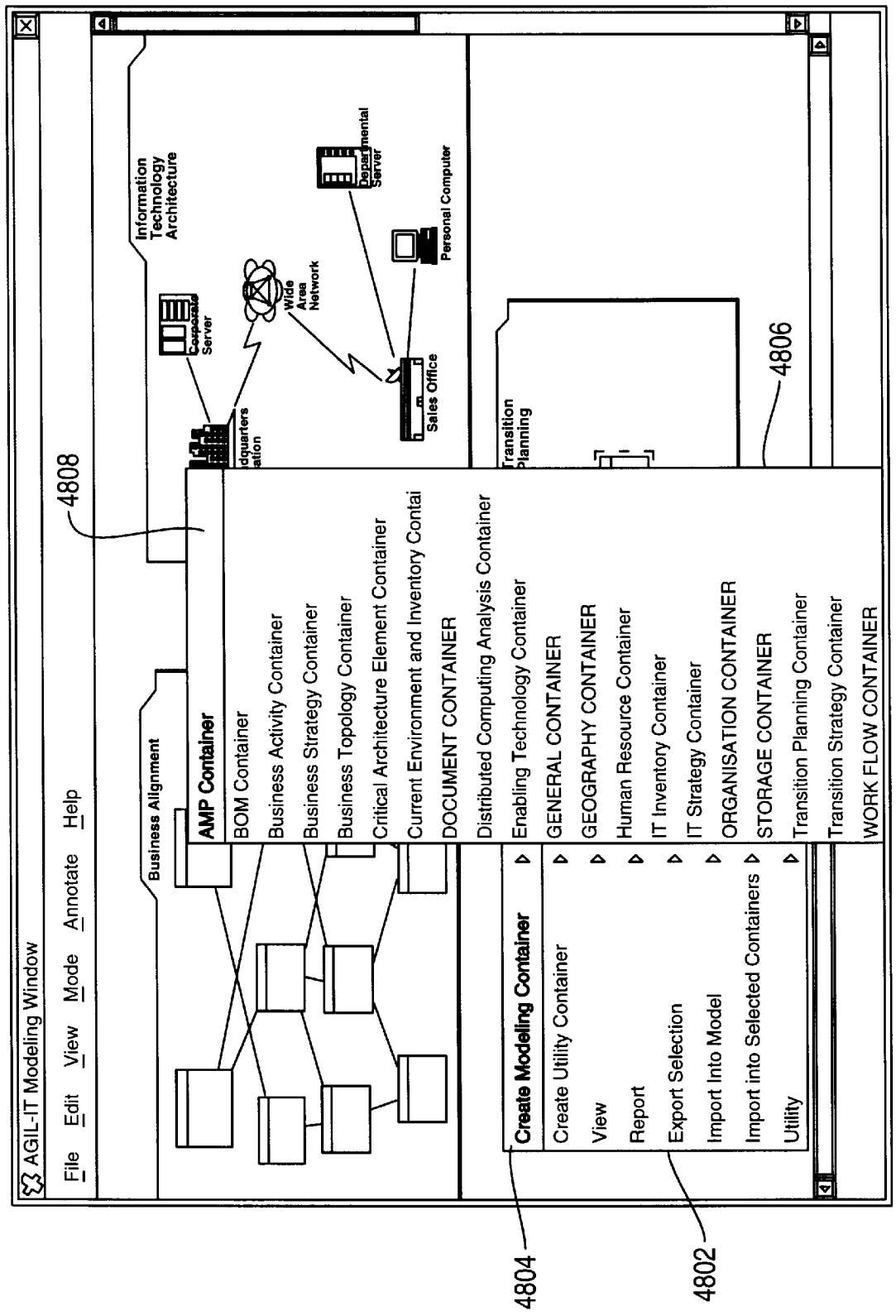
FIGS. 48–49 illustrate the process for creating Architecture Management Practices container.
Figure 49:
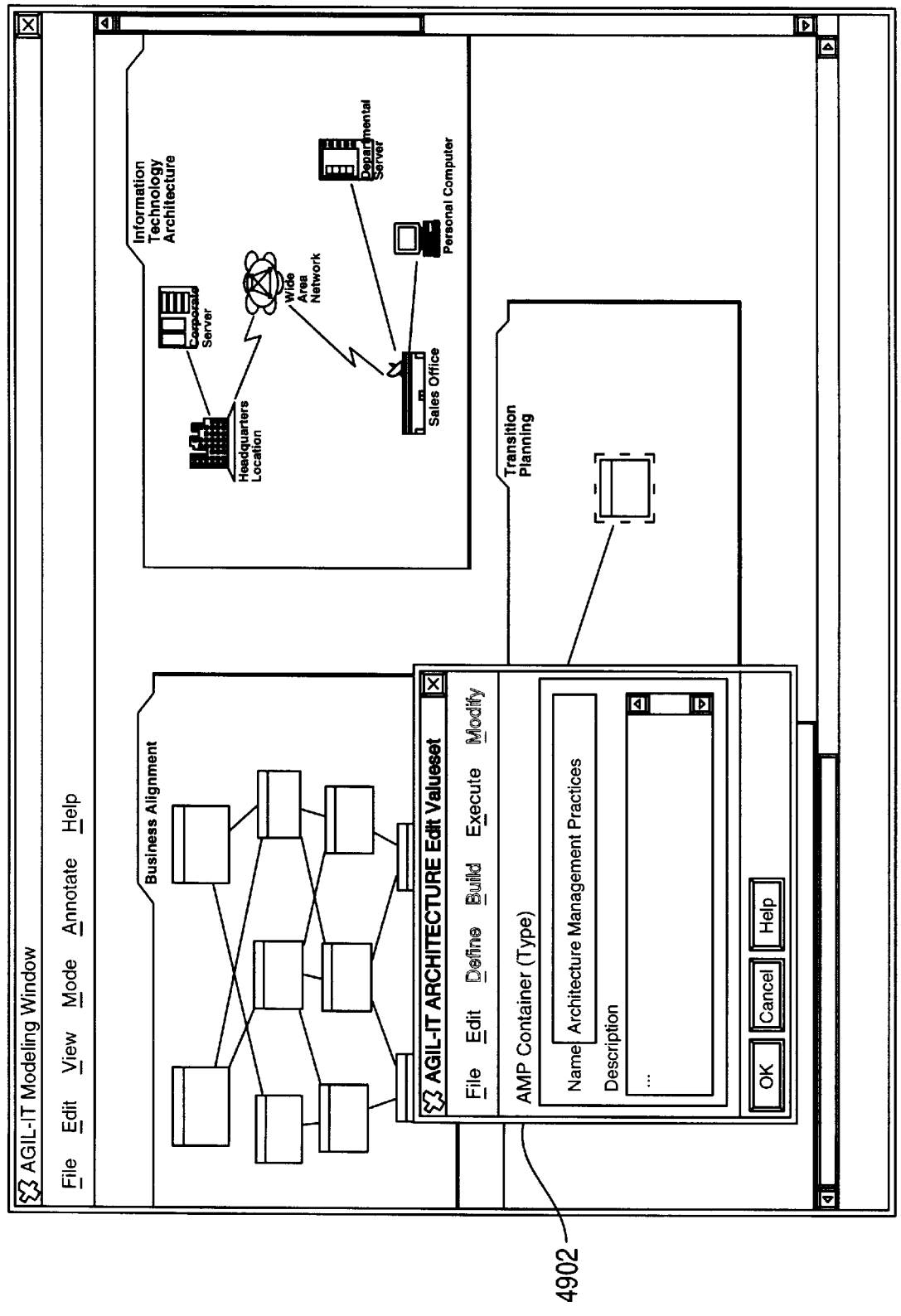

FIGS. 48–49 illustrate the process for creating Architecture Management Practices container.

Referring to FIG. 48, there is shown a display on a computer screen, illustrating visual interfaces 4802 and 4806. As shown in FIG. 48, visual interface 4802 is invoked by clicking on root region (but outside the Business Alignment, Information Technology Architecture, and Transition Planning containers), and visual interface 4806 is invoked by selecting and activating item 4804 (Create Modeling Container) in visual interface 4802. By selecting and activating item 4808 (AMP Container), the process is led to FIG. 49.

Referring to FIG. 49, there is shown a display on a computer screen, illustrating information window 4902 for entering a name and description for the created container. As shown in information window 4902, the name entered for the container is Architecture Management Practices, and the created container is AMP (Architecture Management Practices) type. By clicking OK button, the process is led to FIG. 50.

FIGS. 50–57 illustrate the process of creating three objects and a relationship in Architecture Management Practices container.

Figure 50:
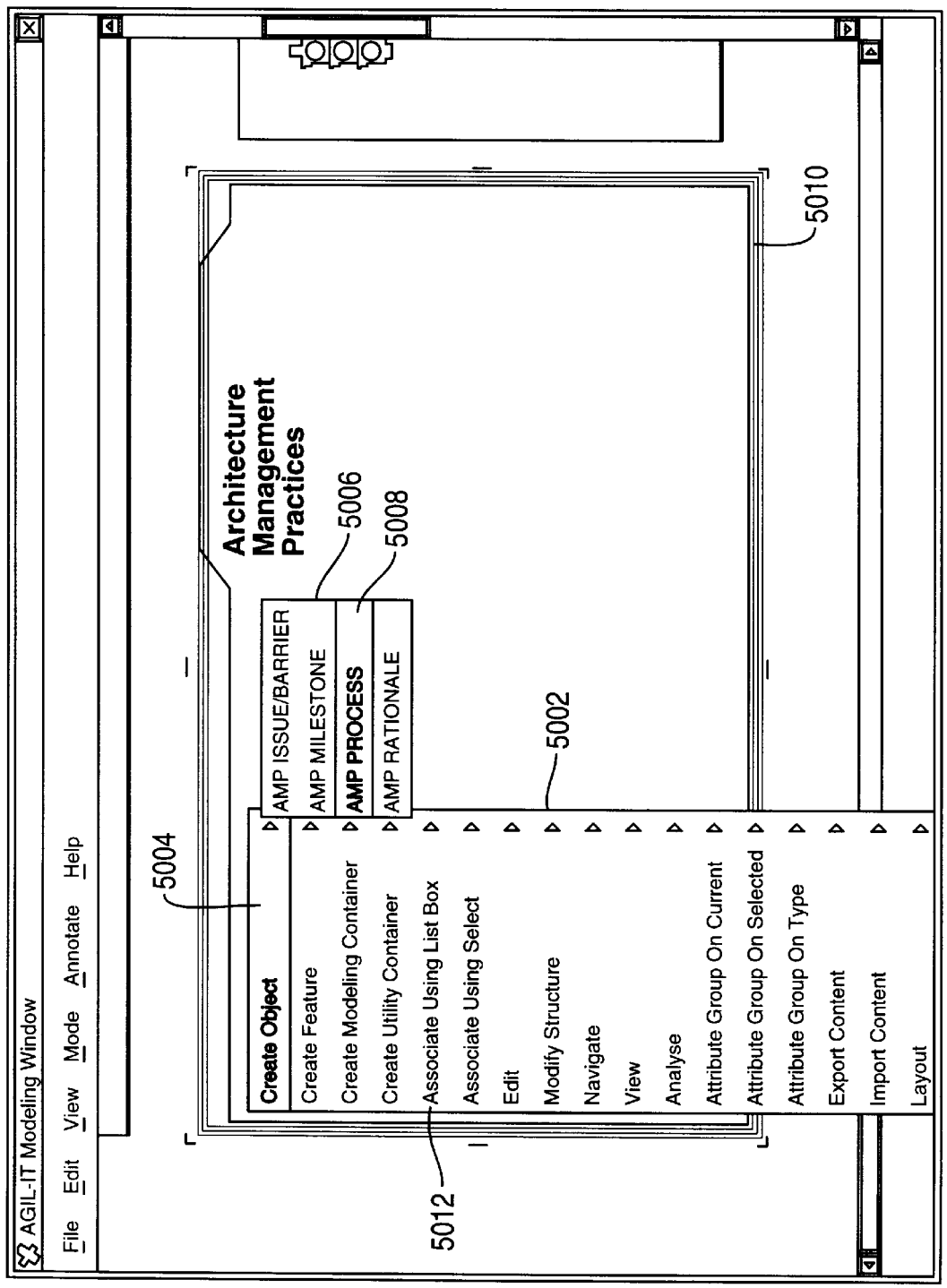
FIGS. 50–57 illustrate the process of creating three objects and a relationship in Architecture Management Practices container.

Referring to FIG. 50, there is shown a display on a computer screen, illustrating a created container 5010 (named as Architecture Management Practices) and visual interfaces 5002 and 5006. It should be noted that all the information and knowledge captured by, and all the visual interfaces and visual defined by, Architecture Management Practices software component (402 and 402') is associated with AMP type container. In other words, depending the position selected in an AMP type container, a respective process and visual interface within Architecture Management Practices software component (402 and 402') software component will be invoked.

Figure 51:
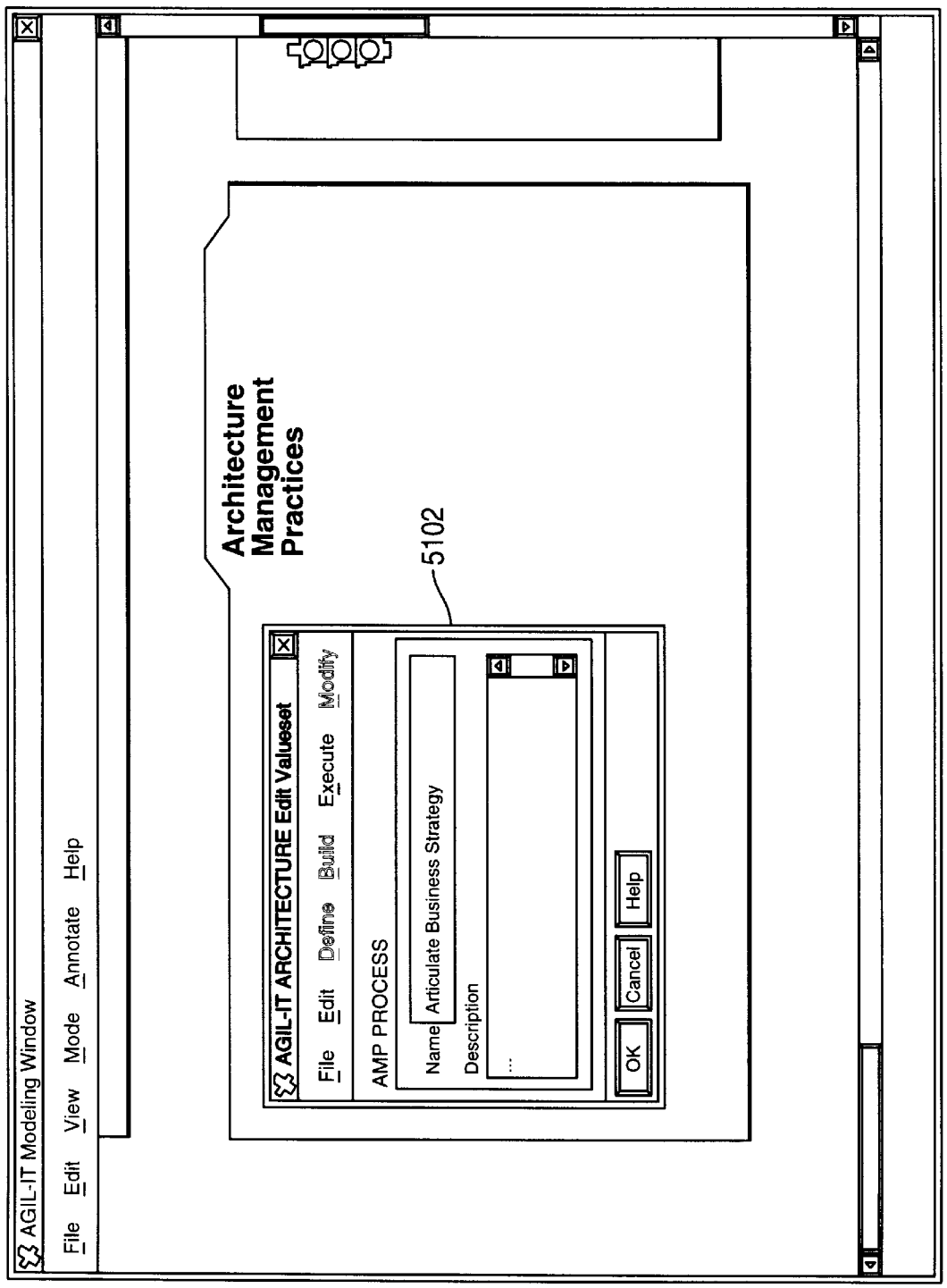

As shown in FIG. 50, visual interface 5002 is invoked by clicking a position within the Architecture Management Practices container, and visual interface 5006 is invoked by selecting and activating item 5004 (Create Object) in visual interface 5002. Visual interface 5002 displays all operations for AMP type container, including intra-sub-methodology (intra-container) operations and inter-sub-methodology (or inter-container) operations that are defined by the Architecture Management Practices methodology (102) as shown in FIG. 1. For the Architecture Management Practices type of container, an example of an intra-container operation is the Create Object (5004) operation and an example of an inter-container operation is the Associate Using List Box (5012) operation. Visual interface 5006 displays four types of objects that are defined by the Architecture Management Practices methodology 102 shown in FIG. 1. Each type of object in AMP type container has predetermined characteristics meaningful to the Architecture Management Practices methodology (102) as shown in FIG. 1. By selecting and activating item 5008 (AMP process), the process is led to FIG. 51. Referring to FIG. 51, there is shown a display on a computer screen, illustrating information window 5102 for entering property and description for a newly created object. Information window 5102 indicates that the created object is an AMP process type object. Architecture Management Practices software component (402 and 402' in FIG. 4) will record all AMP process type objects, encapsulate them, and arrange them in a fashion meaningful to Architecture Management Practices methodology (102) as shown FIG. 1. By selecting and activating OK button, the process is led to FIG. 52.

Figure 52:
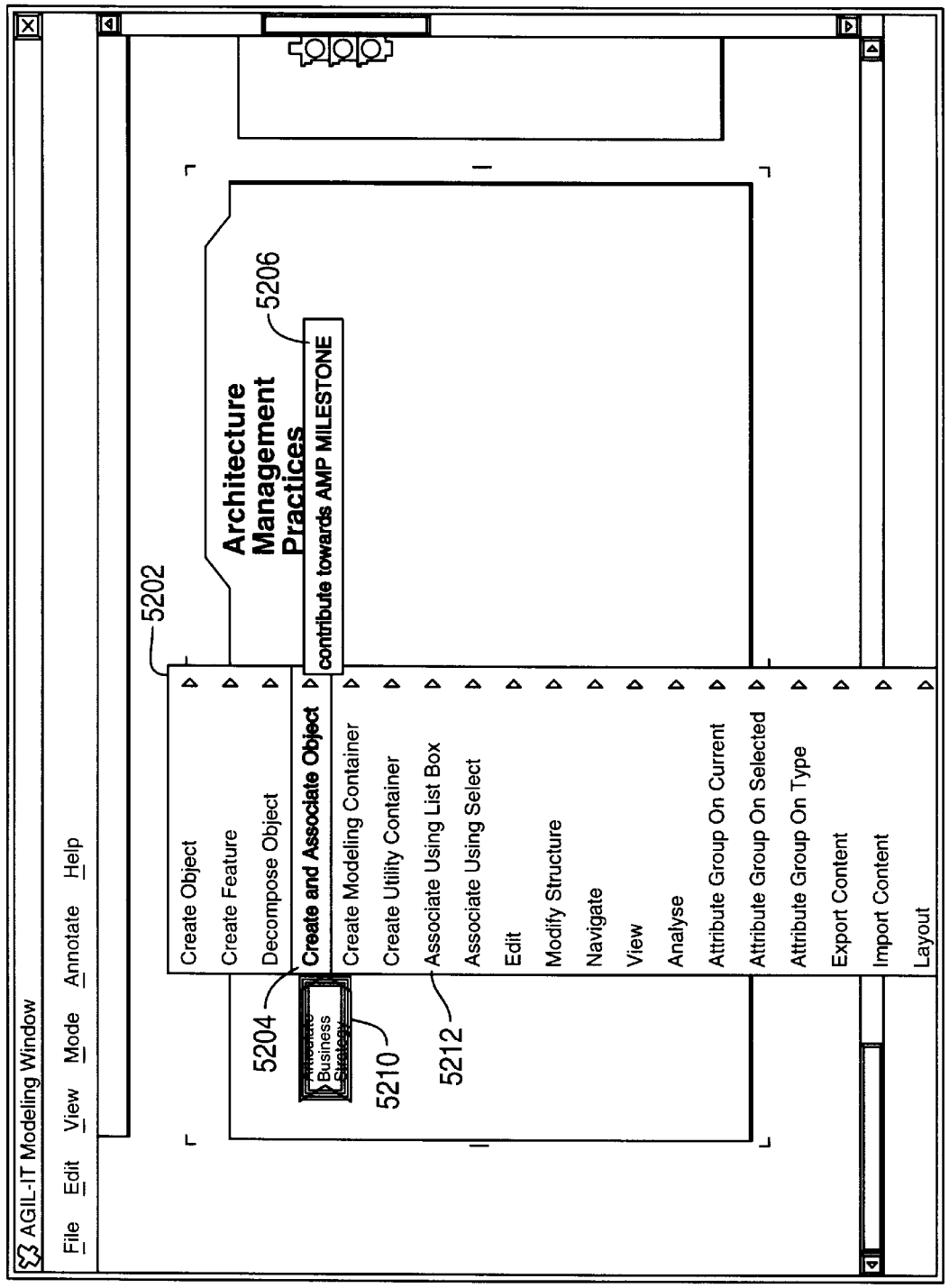

Referring to FIG. 52, there is shown a display on a computer screen, illustrating the visual symbol for the newly created AMP process type object (Articulate Business Strategy object), and visual interfaces 5202 and 5206. The visual symbol is encapsulated in Architecture Management Practices software component (402 and 402' in FIG. 4). As shown in FIG. 52, visual interface 5202 is invoked by selecting and activating Articulate Business Strategy object, and visual interface 5206 is invoked by selecting and activating item 5204 (Create and Associate Object). Visual interface 5202 displays all operations for (or behaviors of) the AMP process type objects, including intra-sub-methodology (intra-container) operations and inter-sub-methodology (or inter-container) operations, which are defined by the Architecture Management Practices methodology (102) as shown in FIG. 1. An example of an intra-container operation for the AMP Process type of object is the Create and Associate Object 5204 operation and an example of an inter-container operation is illustrated by the Associate Using List Box 5212 operation. Visual interface 5206 displays one type of objects (AMP Milestone type object) that an AMP Process type object can be related in accordance with Architecture Management Practices software component (402 and 402' in FIG. 4). Visual interface 5206 also displays one type of relationship (contributed towards) an AMP Process type object can be related in accordance with Architecture Management methodology (102) as shown in FIG. 1. By selecting and activating visual interface 5206 (contributes towards AMP Milestone), the process is led to FIG. 53.

Figure 53:
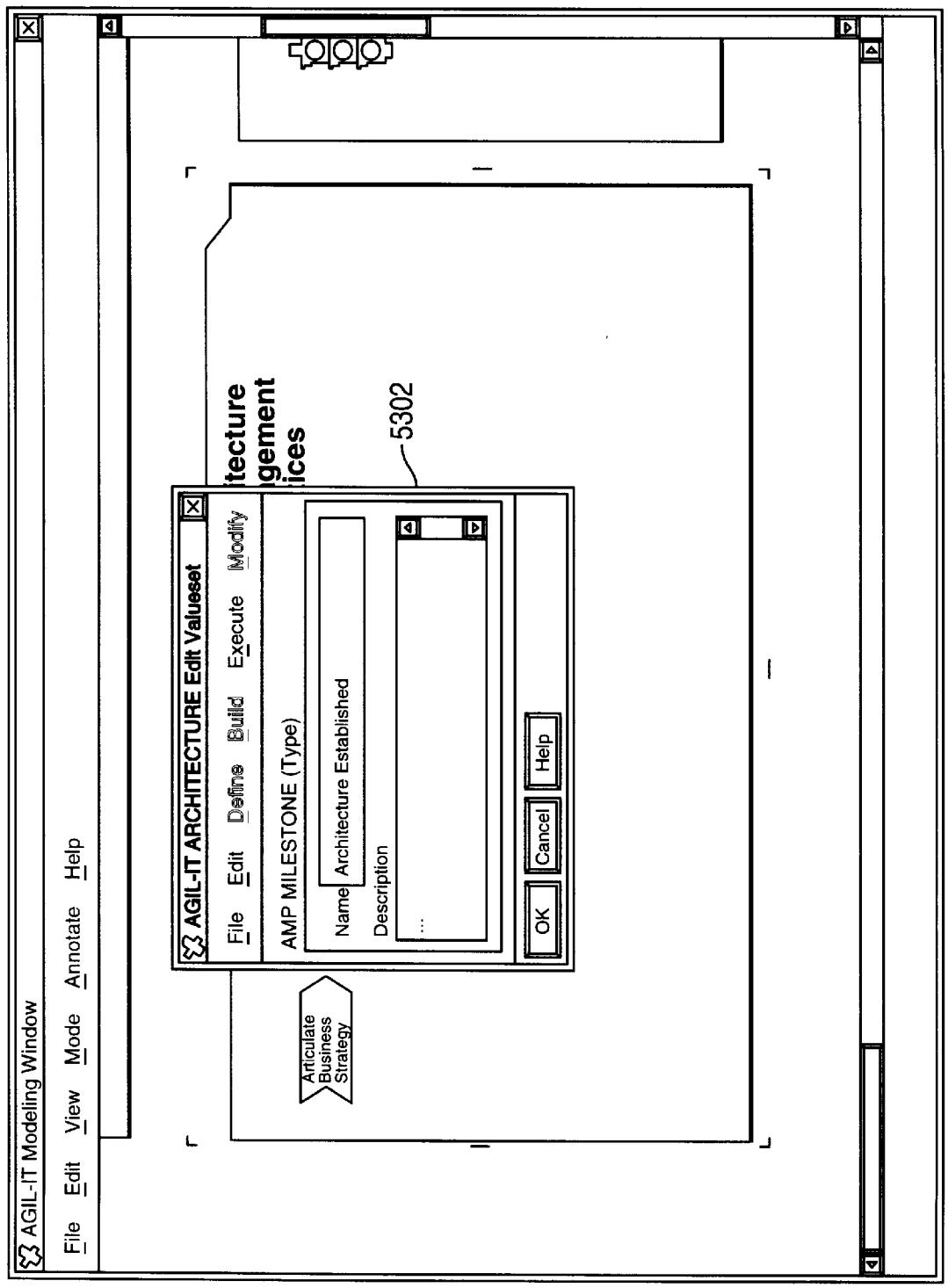

Referring to FIG. 53, there is shown a display on a computer screen, illustrating information window 5302 for entering property and description for a newly created object. As shown in FIG. 53, the created object is an AMP Milestone type object. Architecture Management Practices software component (402 and 402' in FIG. 4) will record all AMP Milestone type objects, encapsulate them, and arrange them in a fashion meaningful to Architecture Management Practices methodology (102) as shown FIG. 1. By selecting and activating OK button, the process is led to FIG. 54.

Figure 54:
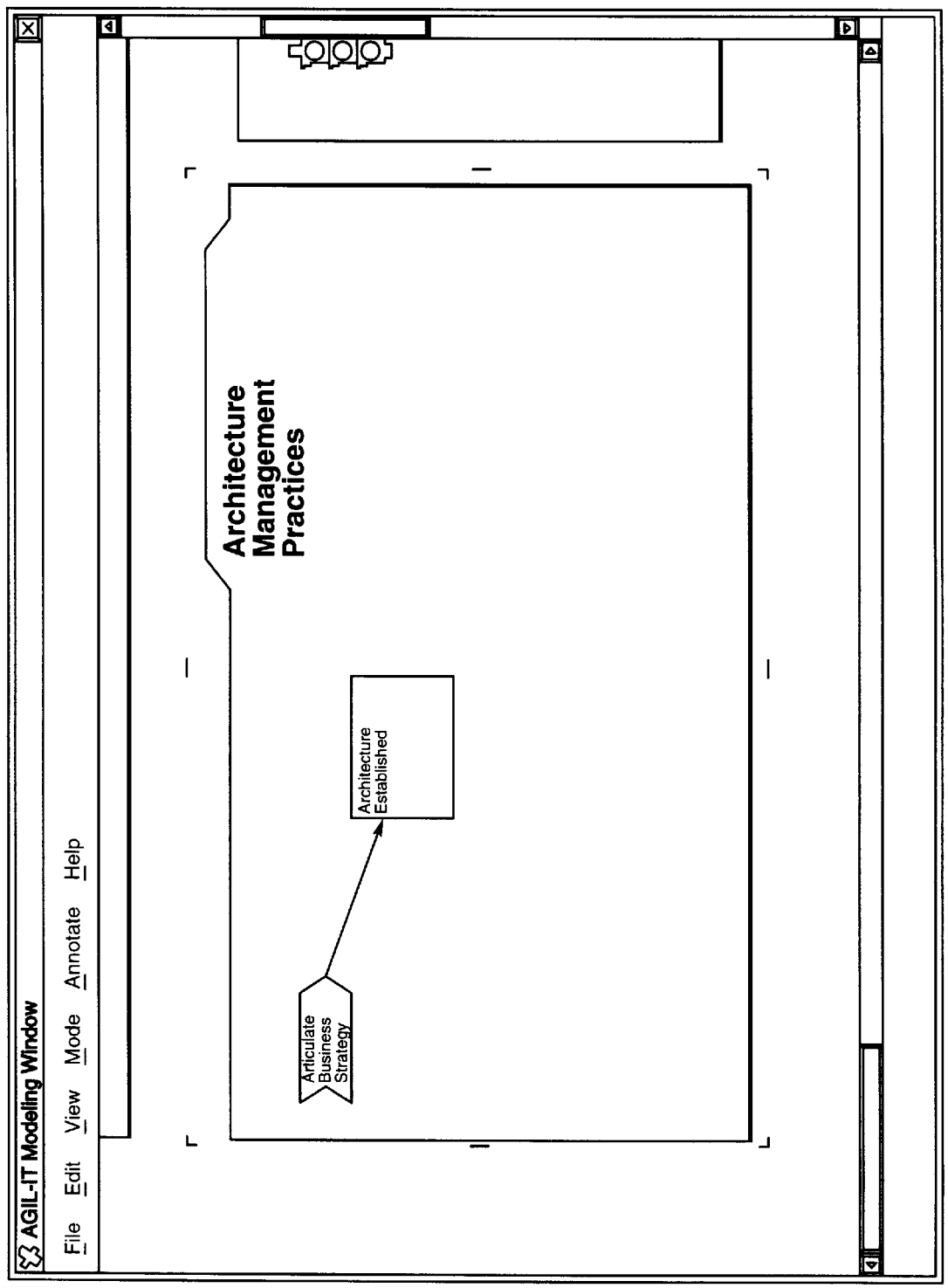

Referring to FIG. 54, there is shown a display on a computer screen, illustrating the visual symbols for the newly created AMP Milestone type object (Architecture Established object) and the respective relationship. The visual symbols are encapsulated in architecture software component (402 and 402').

Figure 55:
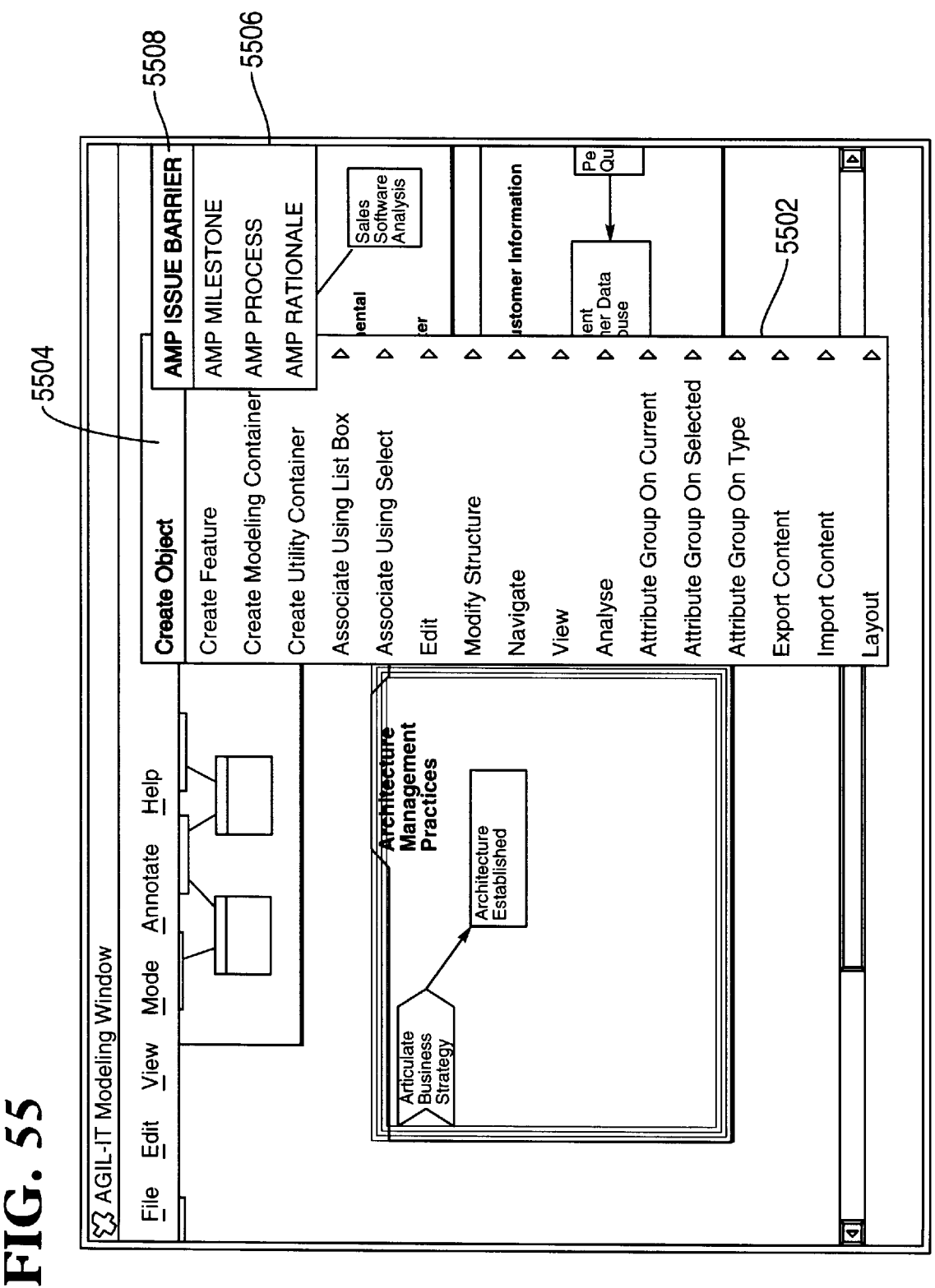

Referring to FIG. 55, there is shown a display on a computer screen, illustrating visual interfaces 5502 and 5506. As shown in FIG. 55, visual interface 5502 is invoked by clicking a position within the Architecture Management Practices container (but outside the two objects and one relationship that have been established), and visual interface 5506 is invoked by selecting and activating item 5504 (Create Object) in visual interface 5502. By selecting and activating item 5508 (AMP ISSUE BARRIER), the process is led to FIG. 56.

Figure 56:
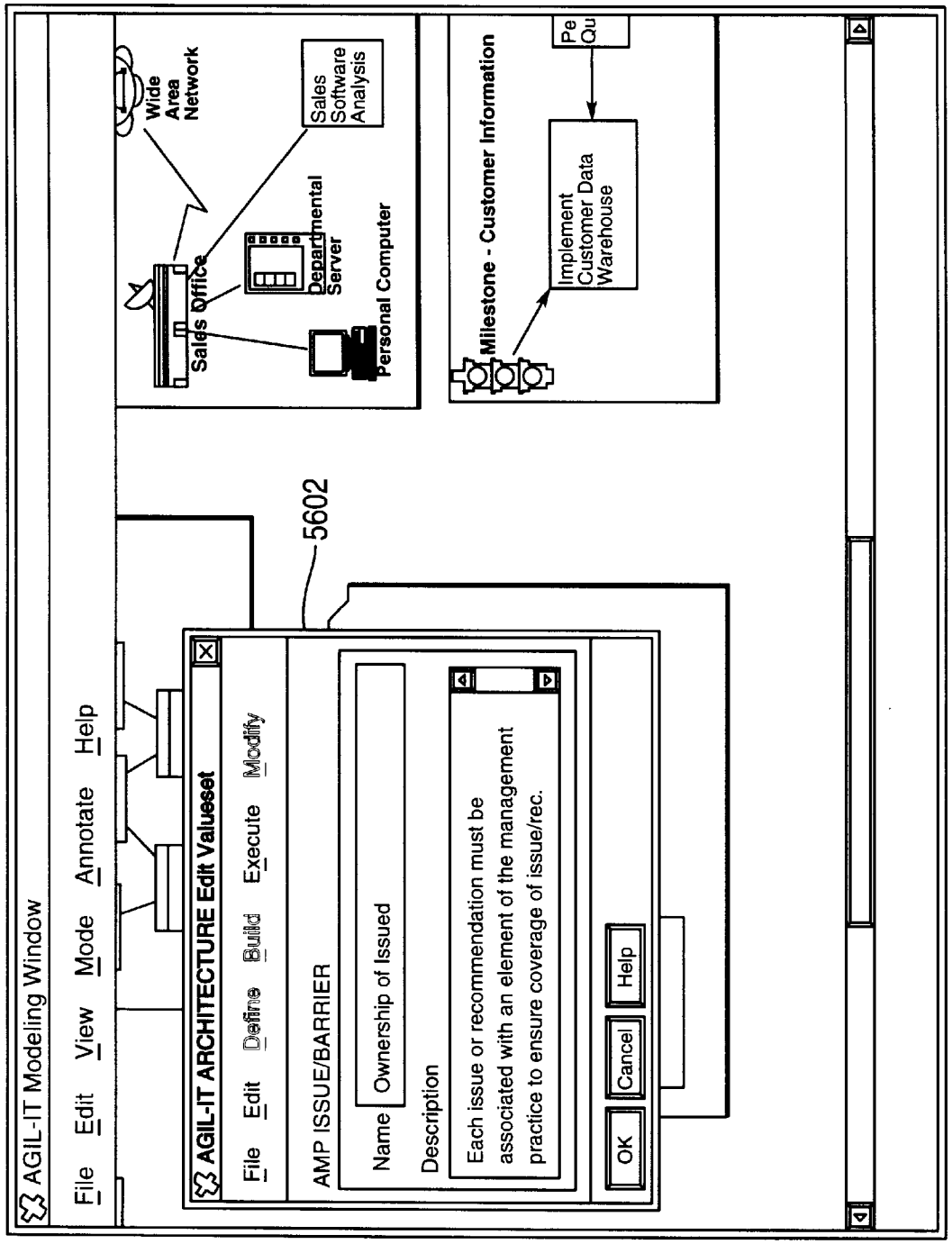

Referring to FIG. 56, there is shown a display on a computer screen, illustrating information window 5602 for entering property and description for a newly created object. As shown in FIG. 56, the created object is an AMP Issue/Barrier type object. Architecture Management Practices software component (402 and 402') will record all AMP Issue/Barrier type objects, encapsulate them, and arrange them in a fashion meaningful to the Architecture Management Practices methodology (102) as shown in FIG. 1. By selecting and activating OK button, the process is led to FIG. 57.

Figure 57:
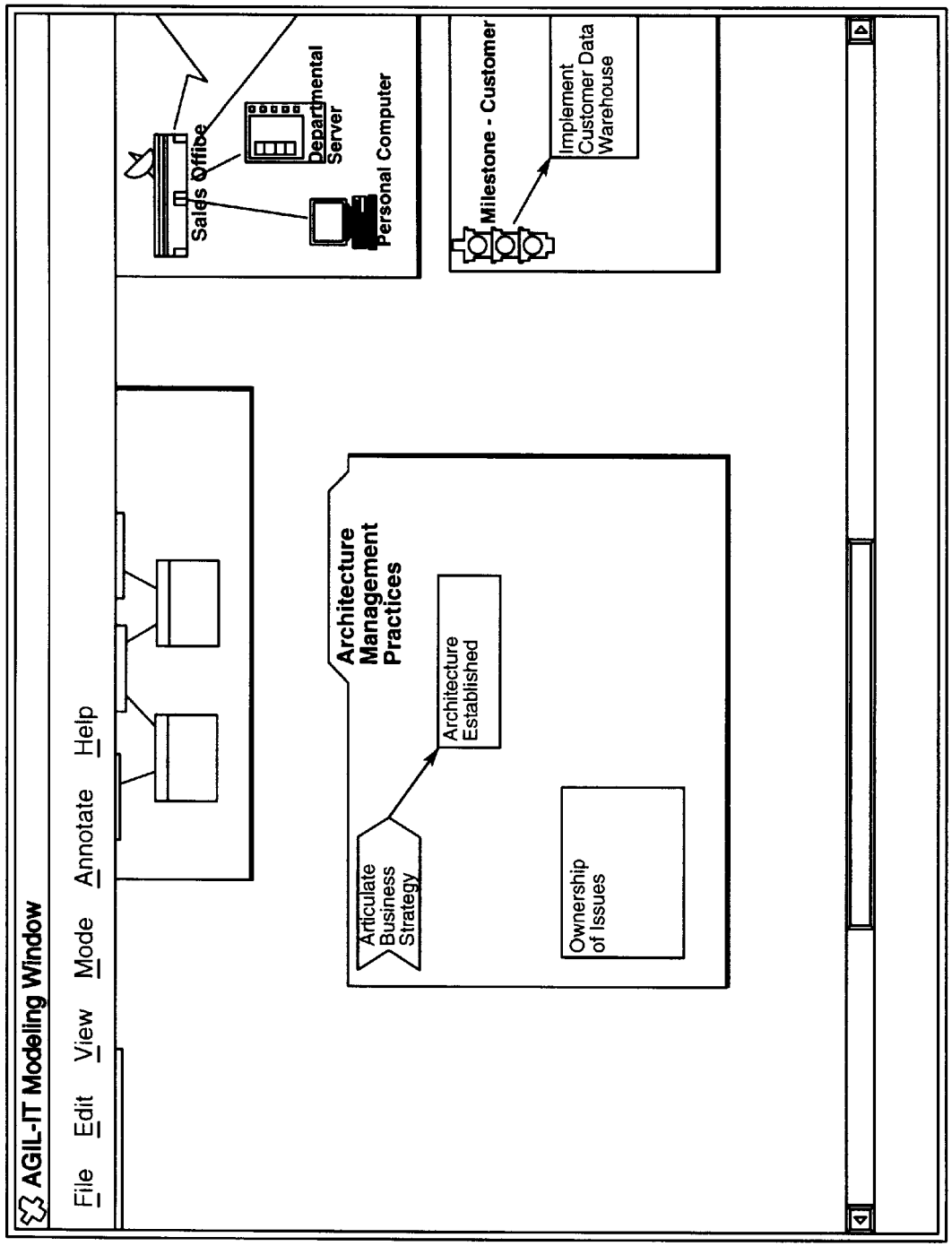

Referring to FIG. 57, there is shown a display on a computer screen, illustrating the visual symbol for the newly created AMP Issue/Barrier type object (Ownership of Issues object). The visual symbol is encapsulated in Architecture Management Practices software component (402 and 402').

The Transition Plan Established object and the other relationships as illustrated in container 708 of FIG. 7 can be built by using a process similar to that described above.

FIGS. 58–65 illustrate the process for creating inter container relationships among the four containers.

Figure 58:
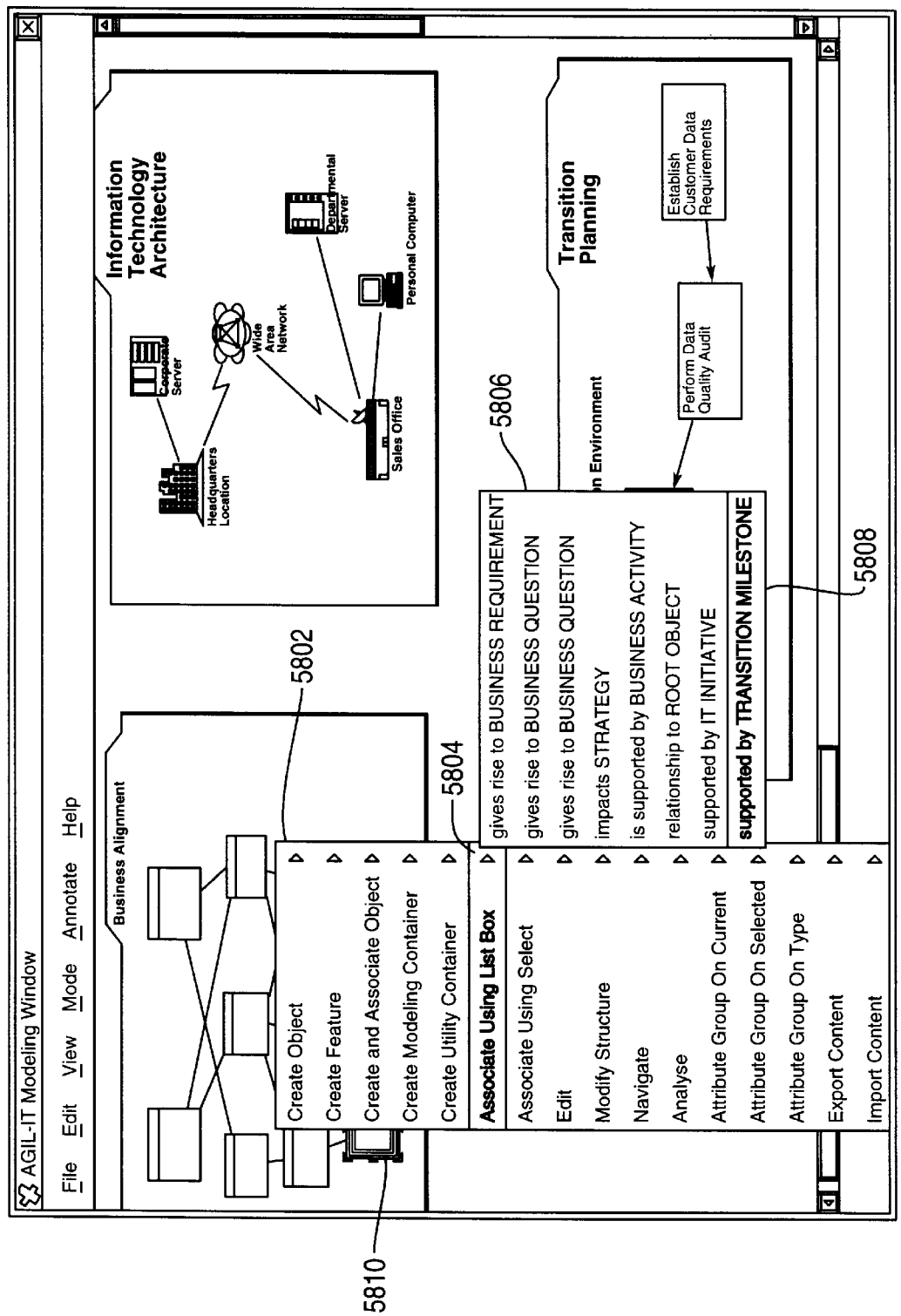
FIGS. 58–65 illustrate the process for creating inter container relationships among the four containers.

Referring to FIG. 58, there is shown a display on a computer screen, illustrating visual interfaces 5802 and 5806 for establishing a relationship between two objects in two different containers or sub-regions. Within visual interface 5806 there are displayed the different intra and inter-container object types that CSF2 object (5810) can relate to. Object types such as BUSINESS QUESTION, IT INITIATIVE, and TRANSITION MILESTONE are examples of object types that can have inter-container relationships to the CSF2 object (5810). As shown in FIG. 58, visual interface 5802 is invoked by selecting and activating CSF2 object, and visual interface 5806 is invoked by selecting and activating item 5804 (Associate Using List Box) in visual interface 5802. By selecting and activating item 5808 (supported by Transition Milestone), the process is led to FIG. 59.

Figure 59:
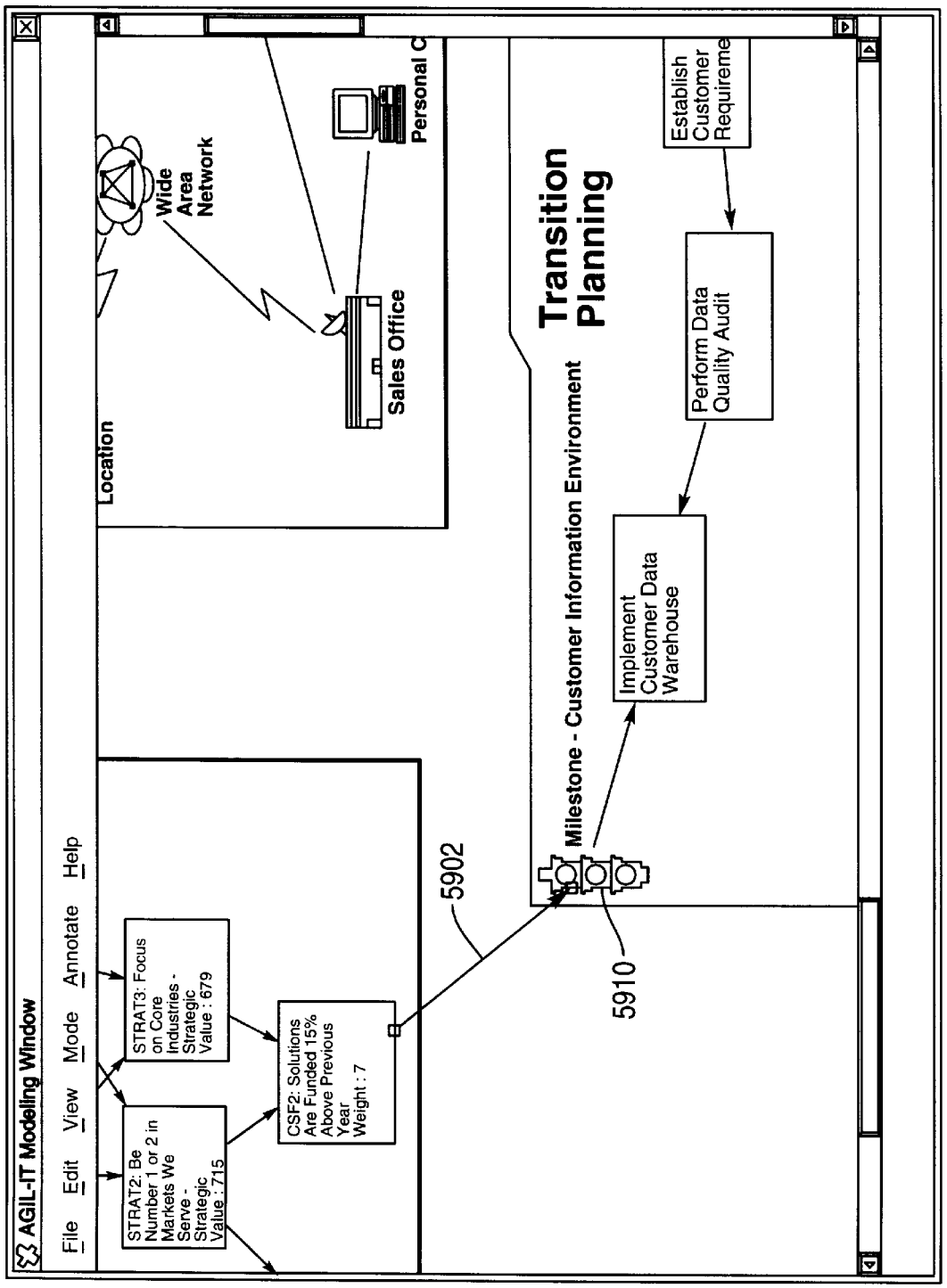

Referring to FIG. 59, there is shown a display on a computer screen illustrating the visual symbol 5902 for a relationship established between object CSF2 and the selected Milestone object. Since there is only one Transition Milestone type object in this IT architecture visual model, the Agil-IT modeling tool establishes the relationship to Milestone object (5910) without further prompting the user.

Figure 60:
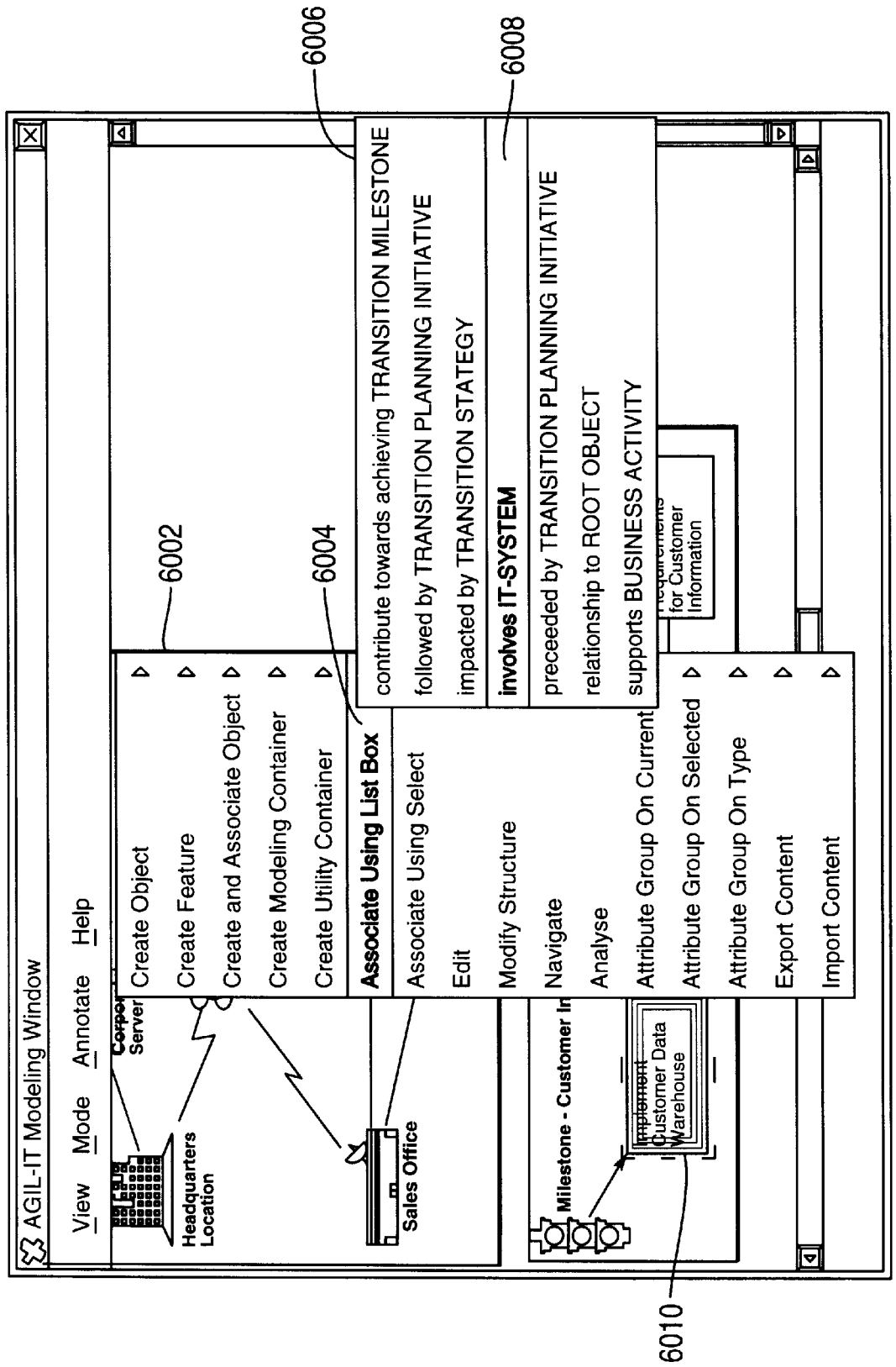

Referring to FIG. 60, there is shown a display on a computer screen, illustrating visual interfaces 6002 and 6006 for establishing a relationship between two objects in two different containers. Within visual interface 6006 there are displayed the different intra and inter-container object types that the activated TRANSITION PLANNING INITIATIVE object (6010) can relate to. Object types such as TRANSITION STRATEGY, IT-SYSTEM, and BUSINESS ACTIVITY are examples of object types that can have inter-container relationships to the objects of type TRANSITION PLANNING INITIATIVE (6010). As shown in FIG. 60, visual interface 6002 is invoked by selecting and activating Implement Customer Data Warehouse object (6010), and visual interface 6006 is invoked by selecting and activating item 6004 (Associate Using List Box) in visual interface 6002. By selecting and activating item 6008 (involves IT-SYSTEM), the process is led to FIG. 61.

Figure 61:
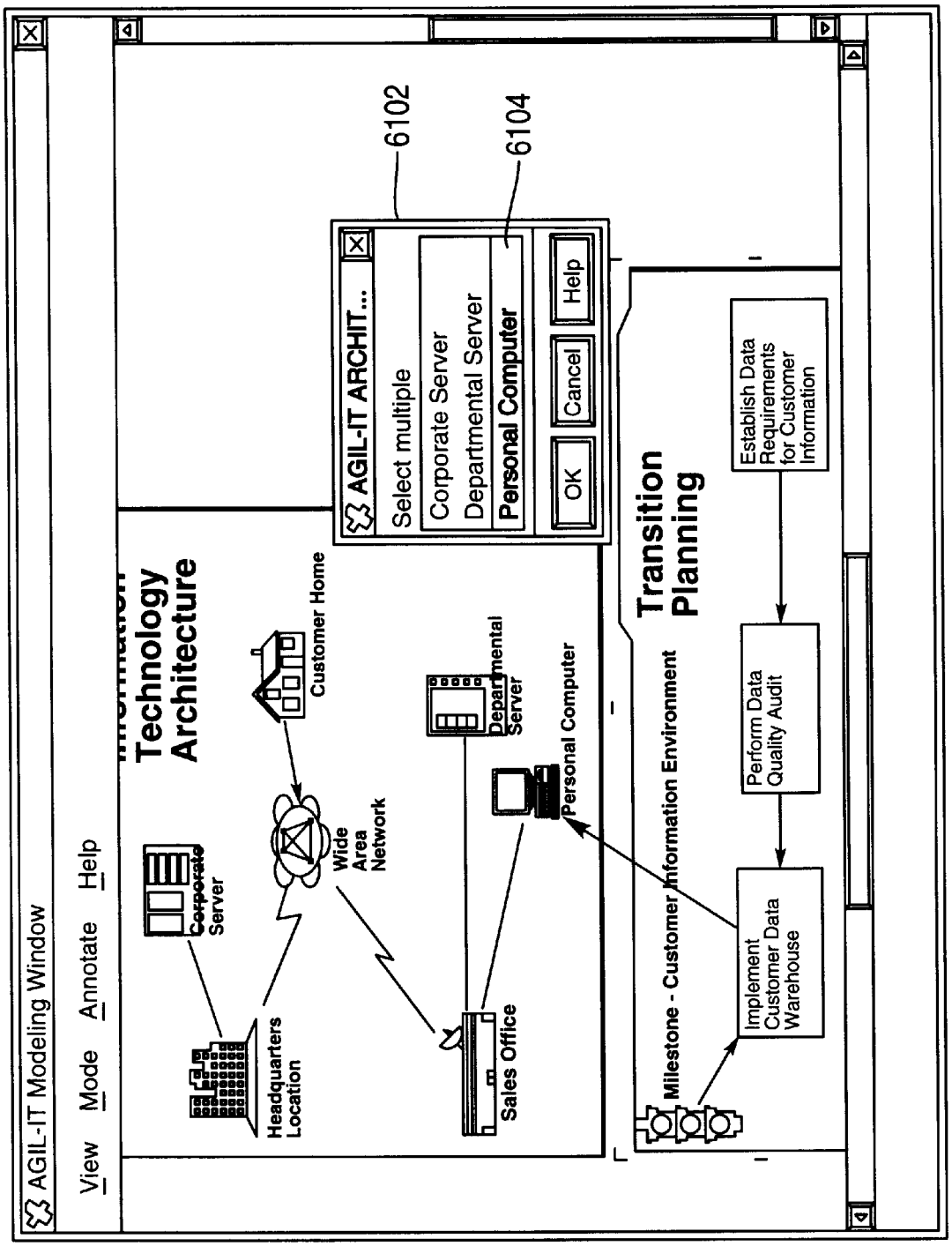

Referring to FIG. 61, there is shown a display on a computer screen illustrating information window 6102. Since there are three IT-SYSTEM type objects in the displayed IT architecture visual model, the Agil-IT modeling tool displays the three available IT-SYSTEM type objects in visual interface 6102. As shown in FIG. 61, Personal Computer object (6104) is selected. By clicking OK button, the process is led to FIG. 62.

Figure 62:
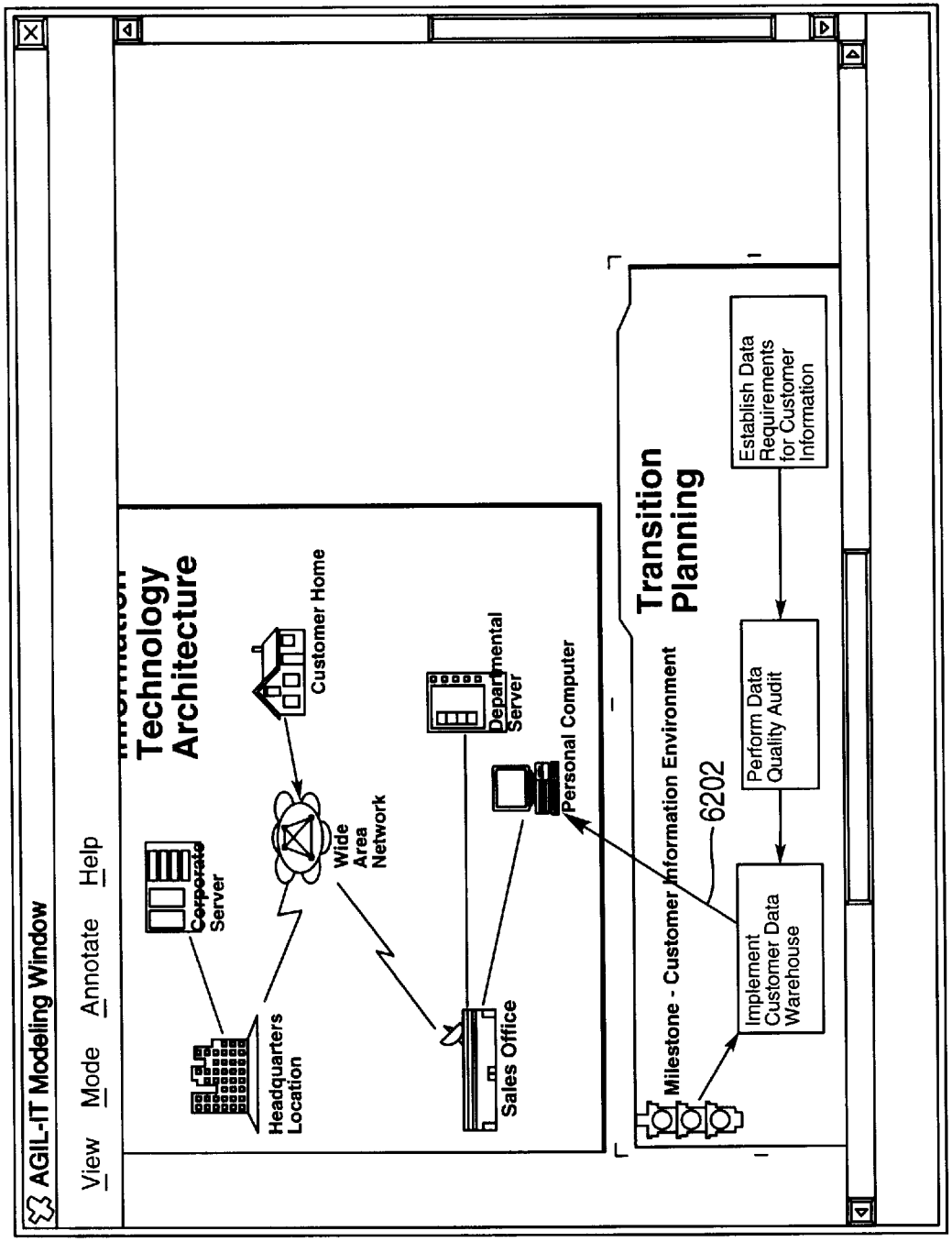

Referring to FIG. 62, there is shown a display on a computer screen illustrating the relationship visual symbol (6202) has been established between the Implement Customer Data Warehouse (type TRANSITION PLANNING INITIATIVE) and Personal Computer (IT-SYSTEM) objects.

Figure 63:
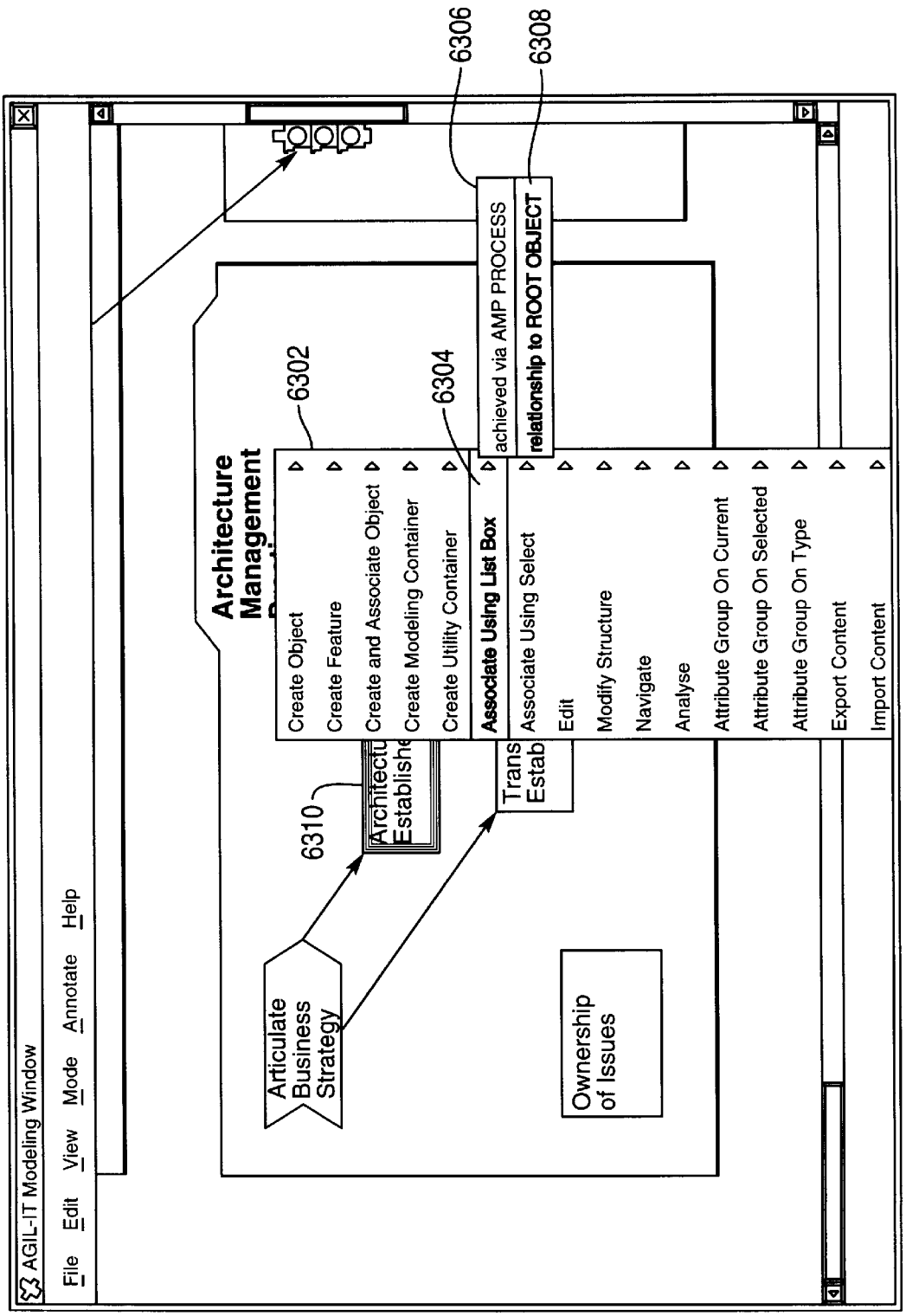

Referring to FIG. 63, there is shown a display on a computer screen, illustrating visual interfaces 6302 and 6306 for establishing an inter-container relationship between an object and a container. As shown in FIG. 63, visual interface 6302 is invoked by selecting and activating Architecture Established object (6310), and visual interface 6306 is invoked by selecting and activating item 6304 (Associate Using List Box) in visual interface 6302. By selecting and activating item 6308 (relationship to Root Object), the process is led to FIG. 64.

Figure 64:
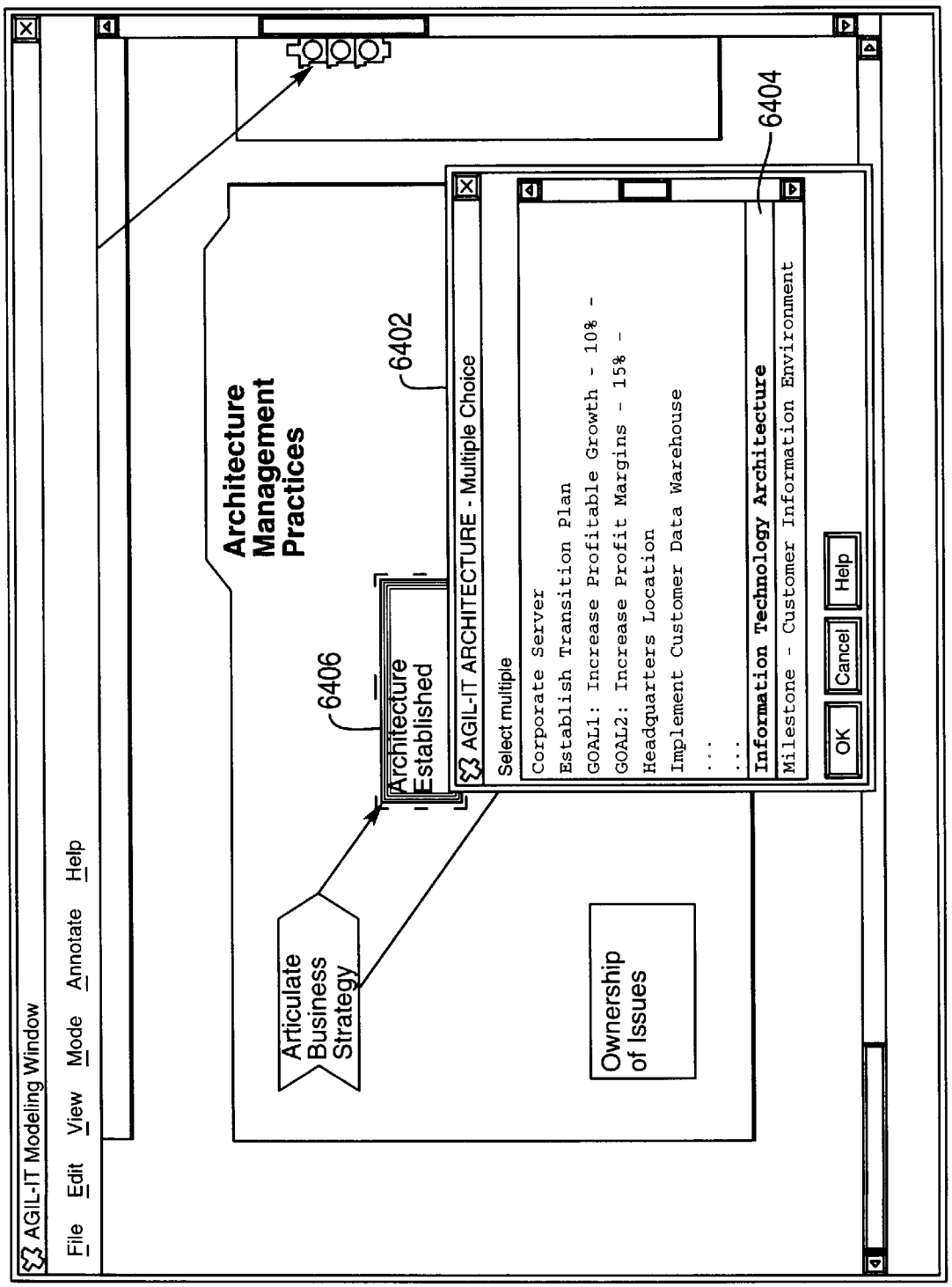

Referring to FIG. 64, there is shown a display on a computer screen illustrating information window 6402. Visual interface 6402 displays all the objects and containers that Architecture Established (AMP MILESTONE) object (6406) can relate to. As shown in FIG. 64, Information Technology Architecture container is selected (6404). By clicking OK button, the process is led to FIG. 65.

Figure 65:
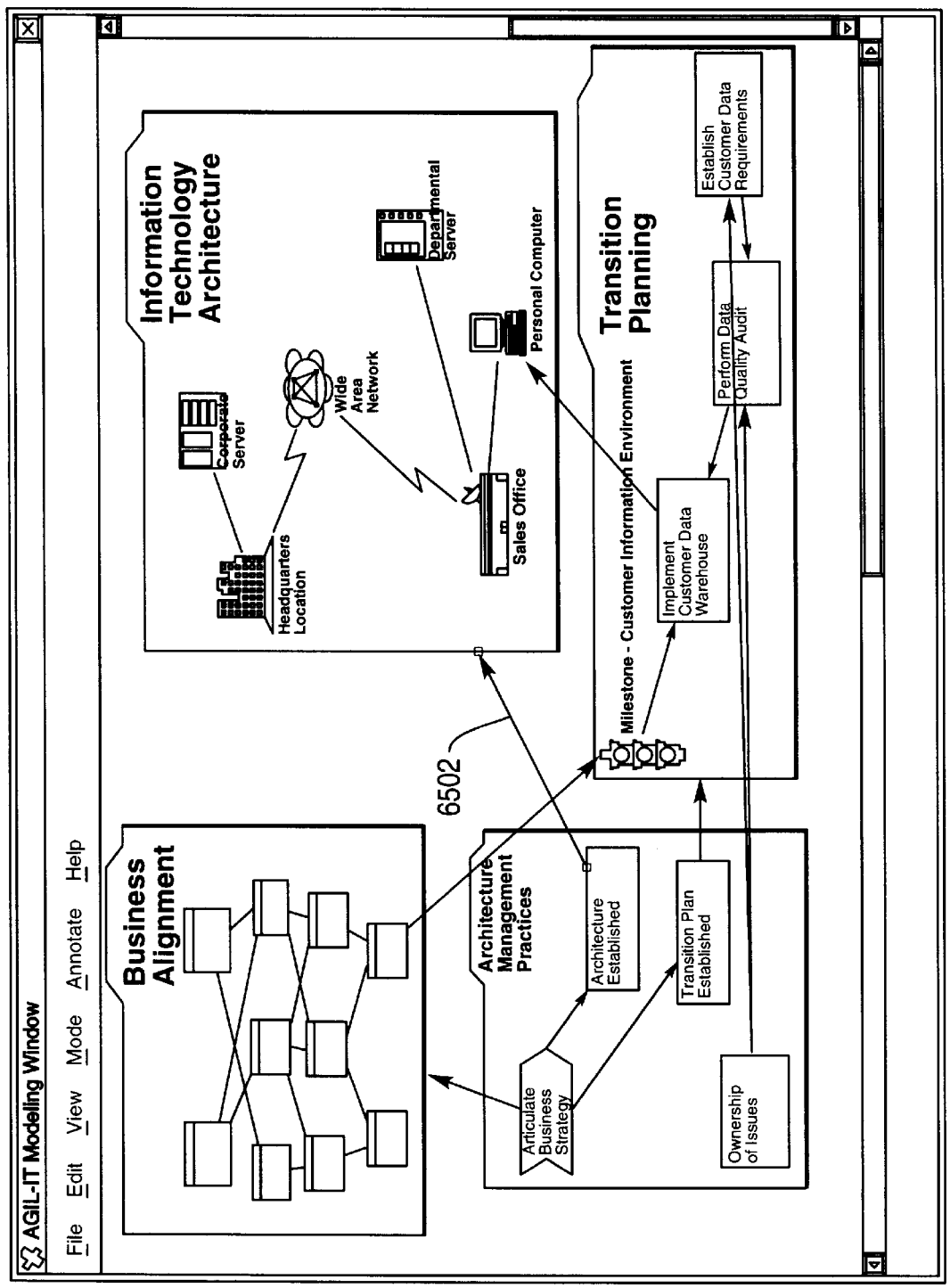

Referring to FIG. 65, there is shown a display on a computer screen illustrating the relationship visual symbol (6502) that has been established between the Architecture Established (AMP MILESTONE) object and the Information Technology Architecture (BUSINESS TOPOLOGY) container. This relationship indicates that the AMP MILESTONE indicated by the Architecture Established object is fulfilled when the Information Technology Architecture is complete.

The other inter-container relationships as shown in FIG. 7 can be established by using a process similar to that described above.

Figure 66:
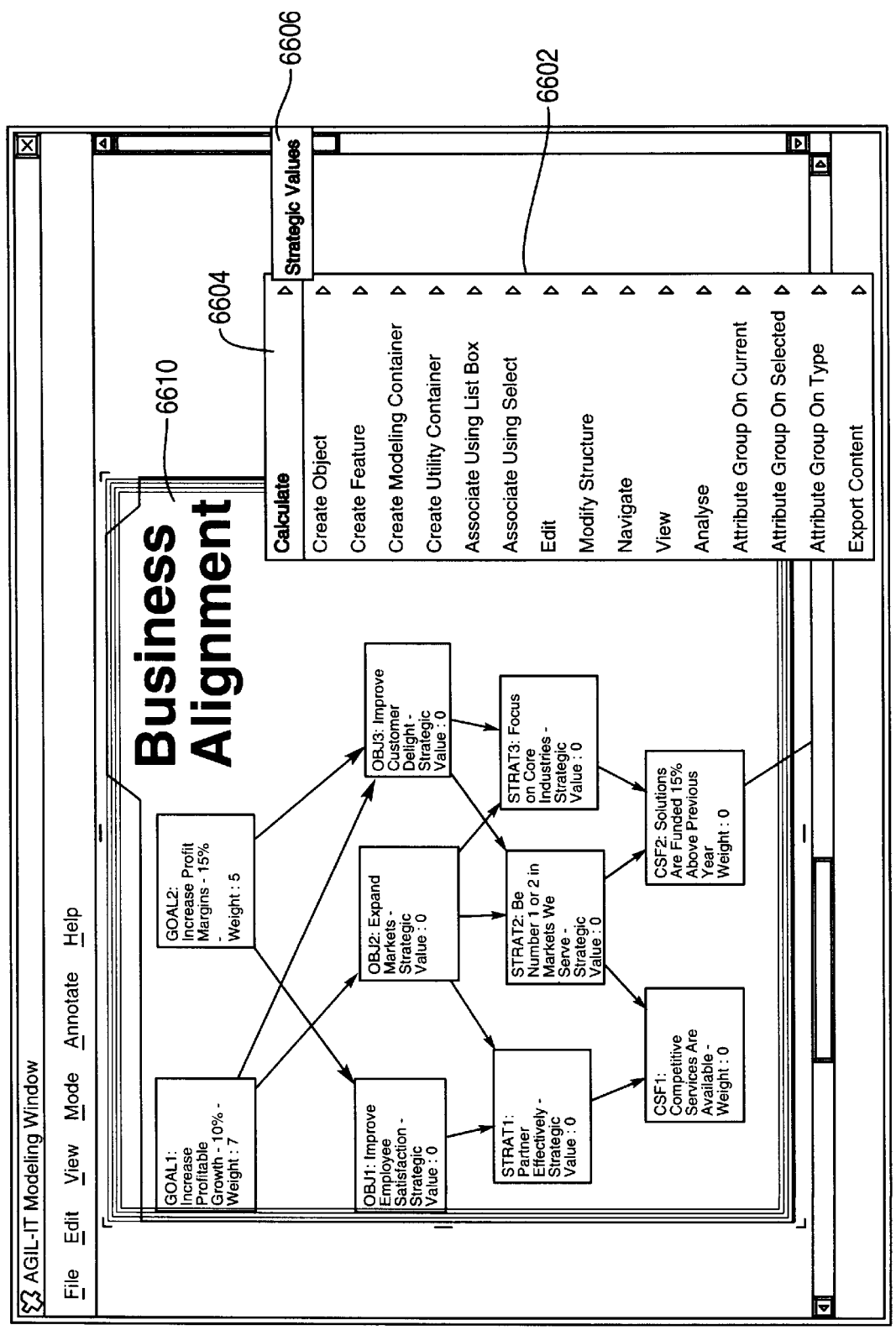
FIGS. 66–67 illustrate the process for setting parameter values for the created objects and relationships.
Figure 67:
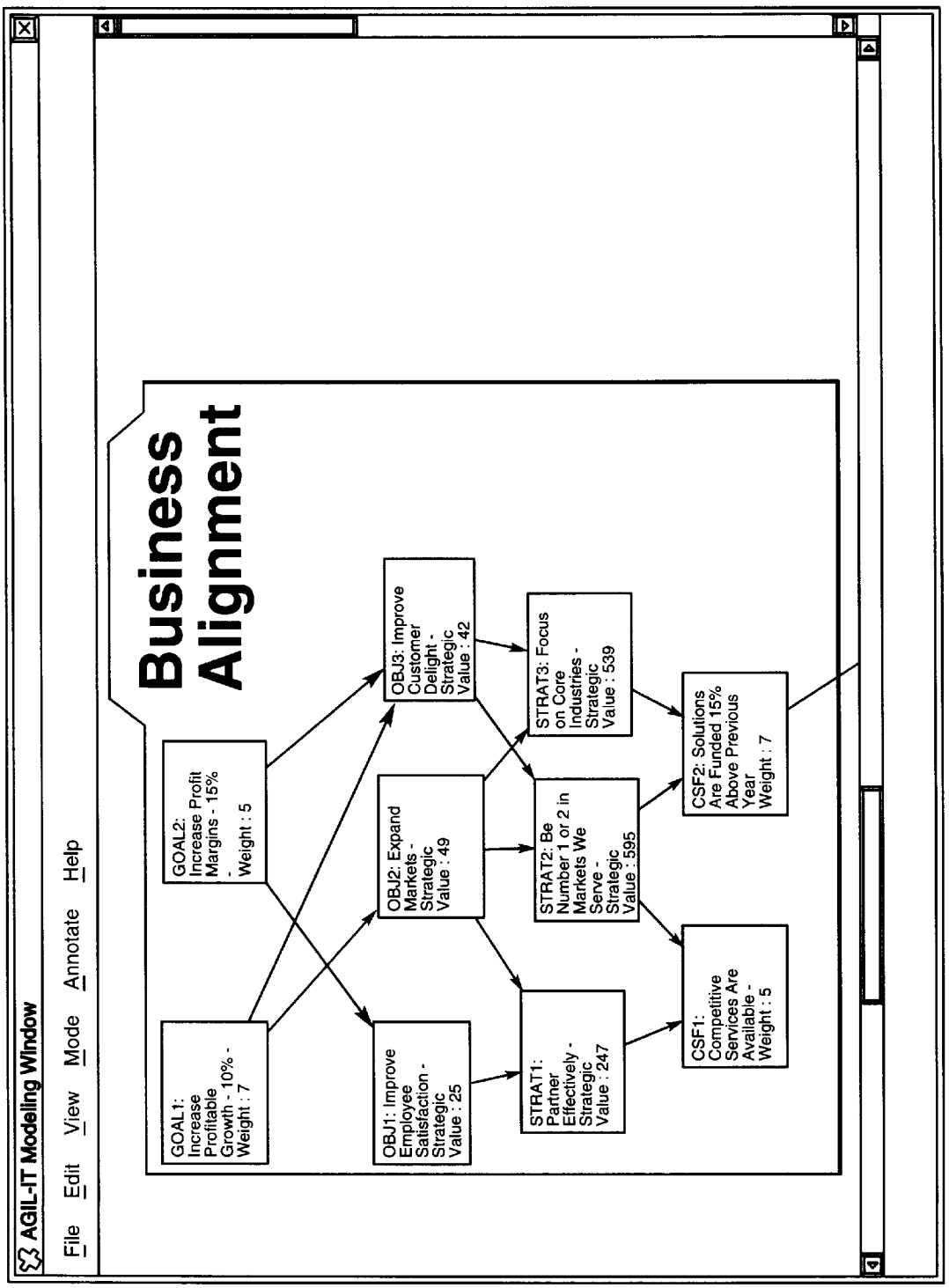

FIGS. 66–67 illustrate the process for setting parameter values for the created objects and relationships.

Referring to FIG. 66, there is shown a display on a computer screen, illustrating visual interfaces 6602 and 6606 for automatically setting parameter values for the objects and relationships in the IT architecture visual model; based on the values in GOAL1 and GOAL2 objects, the types of objects, the property values and characteristics of the relationships, in accordance with the IT architecture methodology and sub-methodologies as shown in FIG. 1. As shown in FIG. 66, visual interface 6602 is invoked by selecting and activating the Business Alignment container (6610), and visual interface 6606 (Strategic Values) is invoked by selecting and activating item 6604 (Calculate) in visual interface 6602. By selecting and activating visual interface 6606 (Strategic Values), the process is led to FIG. 67.

Referring to FIG. 67, there is shown a display on a computer screen illustrating the values and weights of the objects in Business Alignment container, in response to the process shown in FIG. 66. As can be readily seen in FIG. 67, all the displayed parameter values for the objects that were displayed as zero (0) in FIG. 66 before the Calculate—Strategic Values operation (6606) are now set according to the weight values of GOAL1 (7) and GOAL2 (5) and all the relationship parameter values between all the objects displayed in the Business Alignment container. All the parameters for the objects and relationships in the other three containers as shown in FIG. 2 are also set by the process shown in FIG. 66.

Figure 68A:
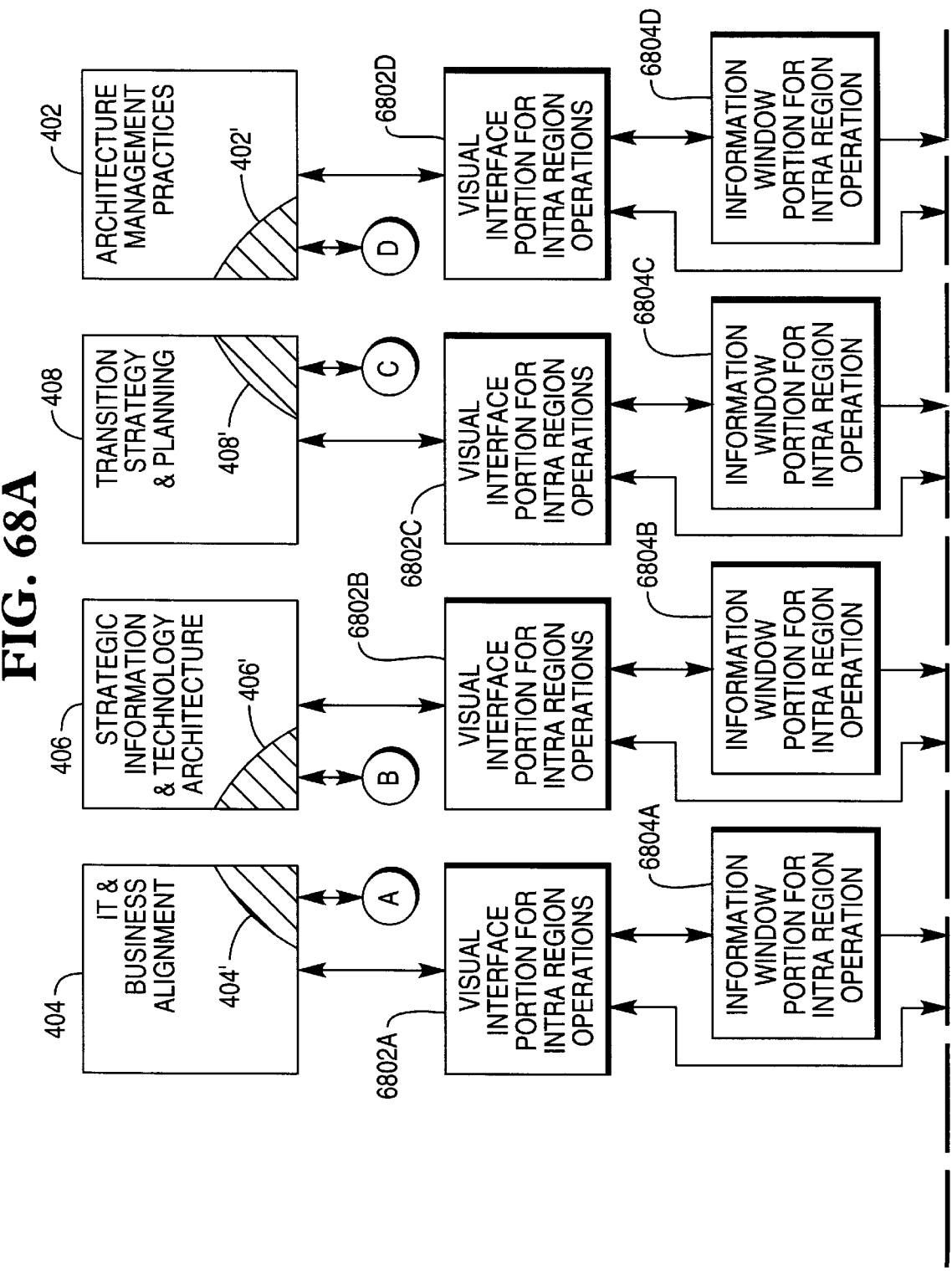
FIG. 68 (consisting of FIGS. 68A and 68B) shows a logical structure between the four software components and the results created by the process shown in FIGS. 8–67.

Referring to FIG. 68 (consisting of FIGS. 68A and 68B), there is shown a logical structure between the four software components (402 and 402', 404 and 404', 406 and 406', and 408 and 408', as shown in FIG. 4) and the results created by the process shown in FIGS. 8–67. The results (6810 as shown in FIG. 68B) are stored in the computer system (20200 as shown in FIG. 202) on which the Agil-IT visual modeling tool is run. The visual presentation of the results are shown in FIG. 7.

As shown in FIG. 68B, the result is comprised of three parts: (1) intra region (or intra sub-methodology) relationships 6812, (2) objects 6814, and (3) inter region (or inter sub-methodologies) relationships 6816.

Intra region relationships 6812 comprises four parts: (1) intra region relationship 6812A created by IT & Business Alignment software component (404 and 404'), (2) intra region relationship 6812B created by Strategic Information & Technology Architecture software component (406 and 406'), (3) intra region relationship 6812C created by Transition Strategy & Planning software component (408 and 408'), and (4) intra region relationship 6812D created by Architecture Management Practices software component (402 and 402').

Objects 6814 comprises four parts: (1) objects 6814A created by IT & Business Alignment software component (404 and 404'), (2) objects 6814B created by Strategic Information & Technology Architecture software component (406 and 406'), (3) objects 6814C created by Transition Strategy & Planning software component (408 and 408'), and (4) objects 6814D created by Architecture Management Practices software component (402 and 402').

Inter region relationships 6816 can be created by any one of the four software components (402 and 402', 404 and 404', 406 and 406', 408 and 408' as shown in FIGS. 4 and 68A). It should be noted the objects (6814 in FIG. 68B) are linked together through both intra and inter region relationships 6812 and 6816 respectively.

Referring to FIG. 69, there is shown a flowchart illustrating the process of performing operations on the objects and relationships of the results 6810 (shown in FIG. 68) within the IT architecture visual model, in accordance with the IT architecture methodology and sub-methodologies shown in FIG. 1.

It should be noted that before starting the process, the knowledge and information of the processes contained within the four sub-methodologies (102, 104, 106, and 108 as shown in FIG. 1) have been encapsulated in each respective software component (402 and 402', 404 and 404', 406 and 406', 408 and 408' as shown in FIGS. 4 and 68).

In step 6904, a user activates a position within the IT architecture visual model.

In step 6906, control program 400 (shown in FIG. 4) detects the position activated; if the position is within a region (or container), the control program further detects which container the position is in; and if the position is on an object or a relationship, the control program further detects which object or relationship the position is on. The control program 400 then associates the activated position with a respective software component (with 402, 404, 406, or 408, if it is an intra region operation; with 402', 404', 406' and 408', if it is an inter region operation) based on the detected region, the control program associates a respective process (or routine) with the detected object or relationship.

In step 6908, the process is led to step 6930, if the activated region requests an inter region (or inter sub-methodology) operation; the process is led to step 6910, if the activated region requests an intra region (or intra sub-methodology) operation.

Step 6910 displays a visual interface portion (6802A, 6802B, 6802C, or 6802D, as shown in FIG. 68A, depending on which software component has been associated with the detected position) that contains the possible intra region operations based on the associated software component and the content in result 6810 (6812A and 6814A, 6812B and 6814B, 6812C and 6814C, or 6812D and 6814D, as shown in FIG. 68B, depending on which software component has been associated with the detected position).

In step 6912, the user selects an operation from the visual interface portion (6802A, 6802B, 6802C, and 6802D in FIG. 68) for the intra-region operation.

In step 6914, the associated software component displays an information window portion (6804A, 6804B, 68024, or 6804D, as shown in FIG. 68A, depending on which software component has been associated with the detected position) that contains possible objects and relationships (from 6812A and 6814A, 6812B and 6814B, 6812C and 6814C, or 6812D and 6814D, as shown in FIG. 68B, depending on which software component has been associated with the detected position) which can be operated on, in accordance with the associated software component.

In step 6916, the user selects object(s) and/or relationship (s) from the information window (6804A, 6804B, 68024, or 6804D, as shown in FIG. 68).

In step 6918, the associated software component locates the object(s) and/or relationship(s) selected from the information window (6804A, 6804B, 6804C, or 6804D as shown in FIG. 68A, depending on which software component has been associated with the detected position). Frequently, the selected objects can be located based on intra region relationships (6812A, 6812B, 6812C, or 6812D as shown in FIG. 68B, depending on which software component has been associated with the detected position).

In step 6920, the associated software component performs the intra region operation on the located object(s) and/or relationship(s) based on the sub-methodology associated with the respective software component.

As mentioned above, in step 6908, the process is led to step 6930, if the activated region requests an inter region (or inter sub-methodology) operation.

Step 6930 displays a visual interface portion (6820 as shown in FIG. 68) that contains the possible inter region operations based on the associated software component and the content in results 6810 (6812A and 6814A, 6812B and 6814B, 6812C and 6814C, or 6812D and 6814D, as shown in FIG. 68B).

In step 6932, the user selects an operation from the visual interface portion (6820 as shown in FIG. 68B).

In step 6934, the associated software component displays an information window portion (6818 as shown in FIG. 68B) that contains possible objects and relationships (from 6812A and 6814A, 6812B and 6814B, 6812C and 6814C, or 6812D and 6814D, as shown in FIG. 68B) which can be operated on, in accordance with the associated software component.

In step 6936, the user selects object(s) and/or relationship (s) from the information window (6818 as shown in FIG. 68B).

In step 6938, the associated software component locates the object(s) and/or relationship(s) selected from the information window in 6818. Frequently, the selected objects can be located based on the inter region relationships (6816 as shown in FIG. 68B) found in the results (6810 as shown in FIG. 68B). It should be noted that the related objects can be in different sub-regions which are controlled by respective sub-methodology software components.

In step 6940, the associated software components performs the inter region operation on the located object(s) and/or relationship(s).

II. Navigating an IT (Information Technology) architecture visual model

FIGS. 70–72 illustrate the process for displaying the textual content for an object.

Referring to FIG. 70, there is shown a display on a computer screen illustrating that STRAT2 object (encircled by dotted lines) is selected (7002).

Referring to FIG. 71, there is shown a display on a computer screen illustrating visual interfaces 7102 and 7106. As shown in FIG. 71, visual interface 7102 is invoked by clicking on (activating) STRAT2 object, and visual interface 7106 is invoked by selecting and activating item 7104 (Edit) within visual interface 7102. The operation is led to FIG. 72 by selecting and activating item 7108 (Properties) in visual interface 7106.

Referring to FIG. 72, there is shown a display on a computer screen illustrating information window 7202. As shown in FIG. 72, information window 7202 displays textual description and calculated strategic value (715) for STRAT2.

FIGS. 73–74 illustrate the process for displaying the textual content for a relationship.

Referring to FIG. 73, there is shown a display on a computer screen illustrating visual interfaces 7302 and 7306. As shown in FIG. 73, visual interface 7302 is invoked by selecting and activating relationship line symbol 7310, and visual interface 7306 is invoked by selecting and activating item 7304 (Edit) in visual interface 7302. The process is led to FIG. 74 by selecting and activating visual interface 7306 (Properties).

Referring to FIG. 74, there is shown a display on a computer screen illustrating information window 7402. As shown in FIG. 74, information window 7402 displays textual information about relationship 7310 (as shown in FIG. 73).

FIGS. 75–78 illustrate the process for locating the starting and ending objects of an inter-container relationship.

Figure 75:
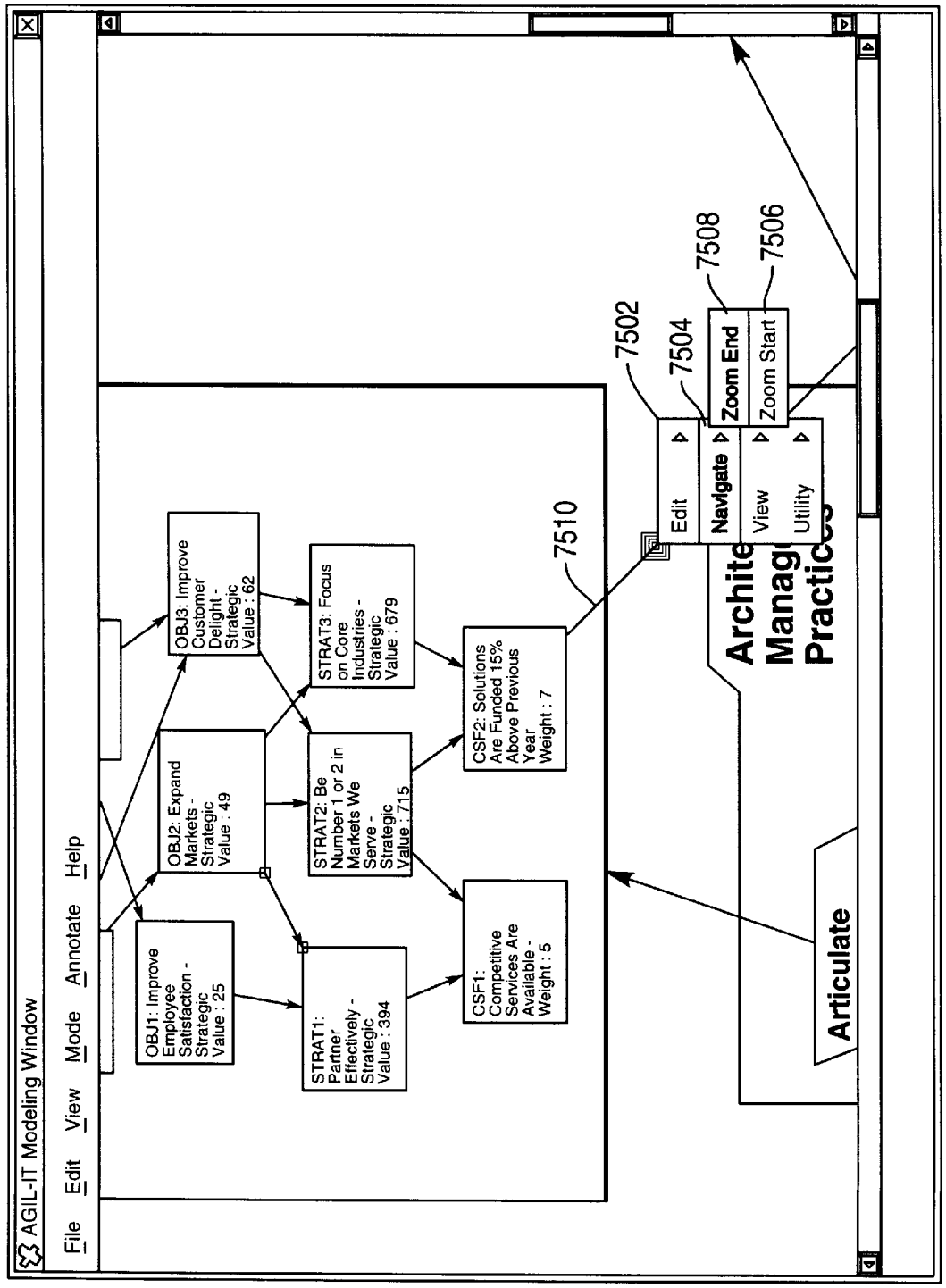

Referring to FIG. 75, there is shown a display on a computer screen illustrating visual interfaces 7502 and 7506. As shown in FIG. 75, visual interface 7502 is invoked by selecting and activating relationship 7510, and visual interface 7506 is invoked by selecting and activating item 7504 (Navigate) within visual interface 7502. By selecting and activating item 7508 (Zoom End) within visual interface 7506, the process is led to FIG. 76.

Figure 76:
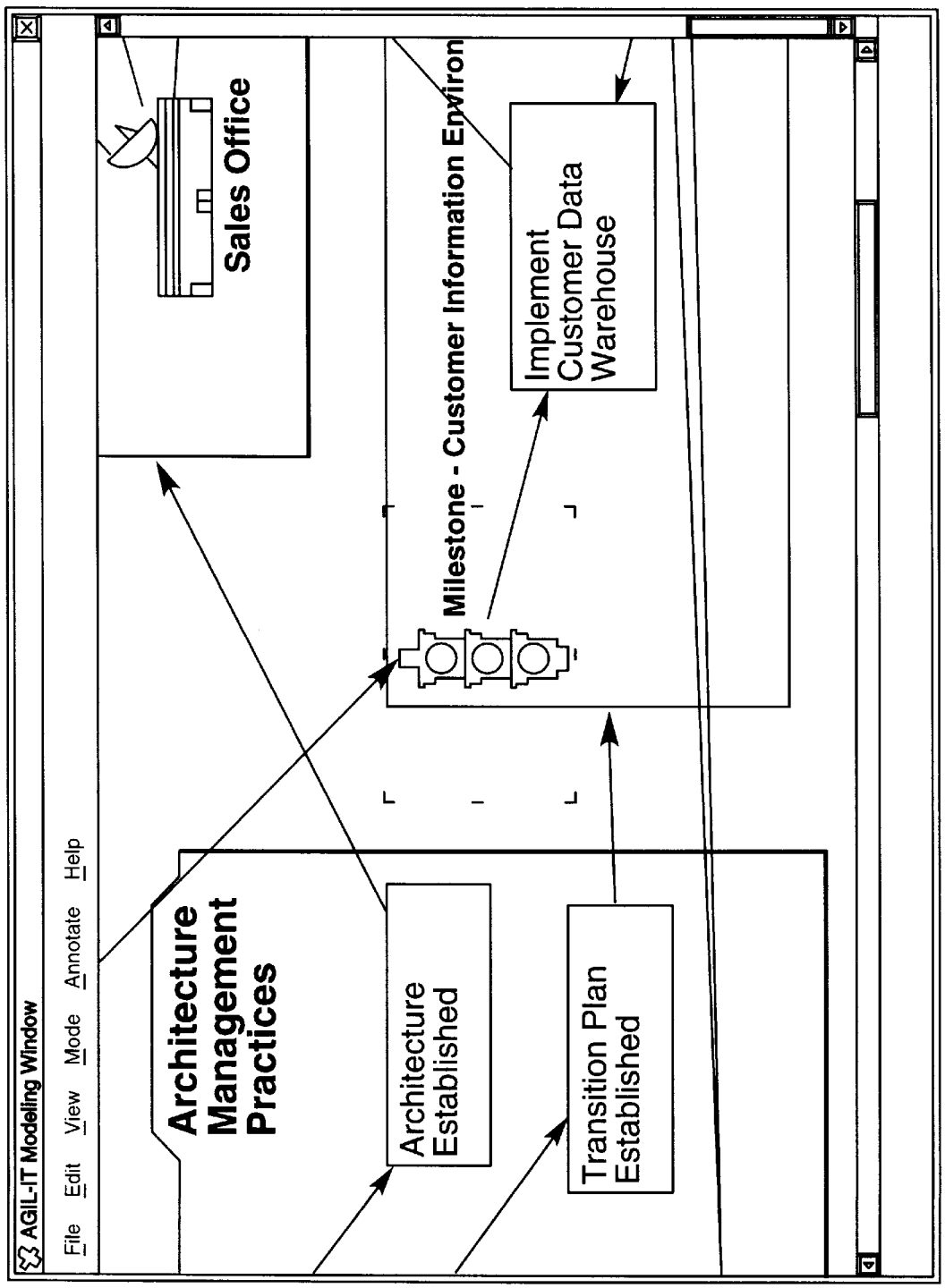

Referring to FIG. 76, there is shown a display on a computer screen illustrating the Milestone object that is related at the end (one level down) of relationship 7510 (as shown in FIG. 75). As can be seen with relationship 7510, this relationship spans two containers—the Business Alignment and Transition Planning containers. Relationship 7510 is therefore an example of an inter-region/inter-sub-methodology relationship as discussed in FIGS. 68A, 68B, and 69. As shown in FIG. 76, the dotted lines encircling the Milestone object indicate this object is located in response to the selection of item 7508 (Zoom End, shown in FIG. 75).

Figure 77:
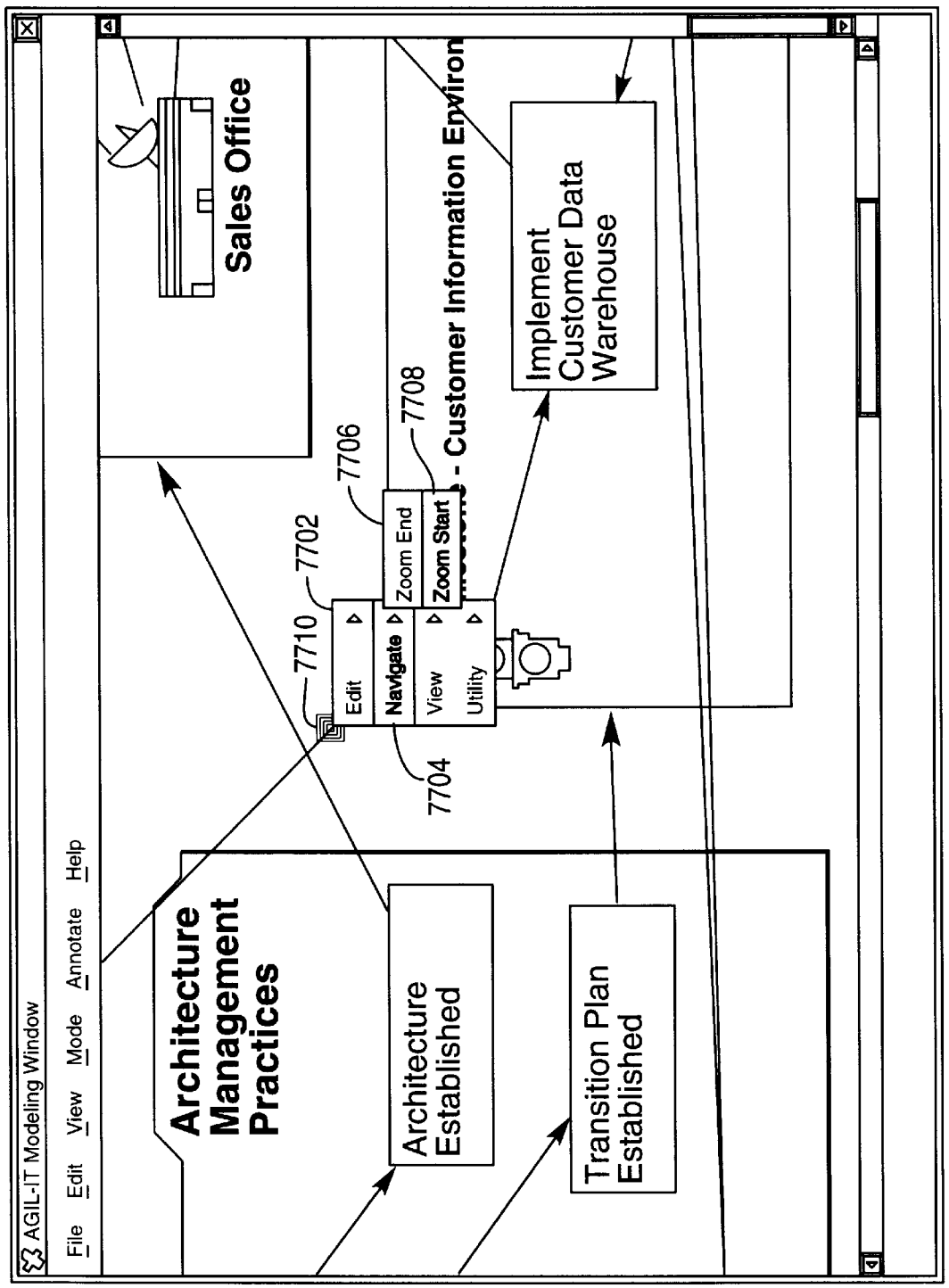

Referring to FIG. 77, there is shown a display on a computer screen illustrating visual interfaces 7702 and 7706. As shown in FIG. 77, visual interface 7702 is invoked by selecting and activating relationship 7710, and visual interface is invoked by selecting and activating item 7704 (Navigate) within visual interface 7702. By selecting and activating item 7708 (Zoom Start) within visual interface 7706, the process is led to FIG. 78.

Figure 78:
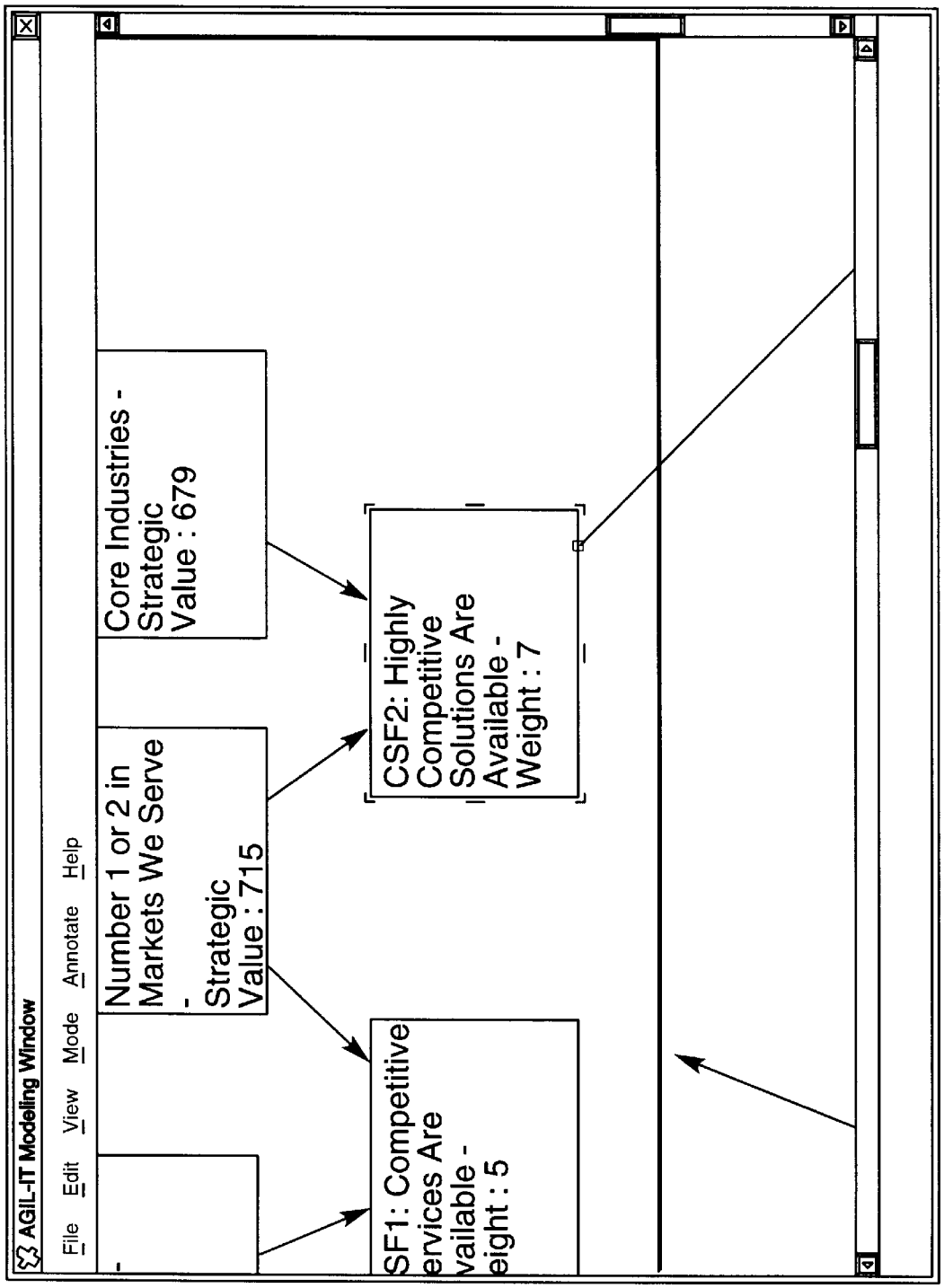

Referring to FIG. 78, there is shown a display on a computer screen illustrating CSF2 object that is related at the beginning (one level up) of relationship 7710 in FIG. 77. As shown in FIG. 78, the dotted lines encircling the CSF2 object indicate this object is located in response to the selection of item 7708 (Zoom Start, shown in FIG. 77).

FIGS. 79–87 illustrate the process for locating an object at one level distance (one level up or down) in the IT architecture visual model.

Figure 79:
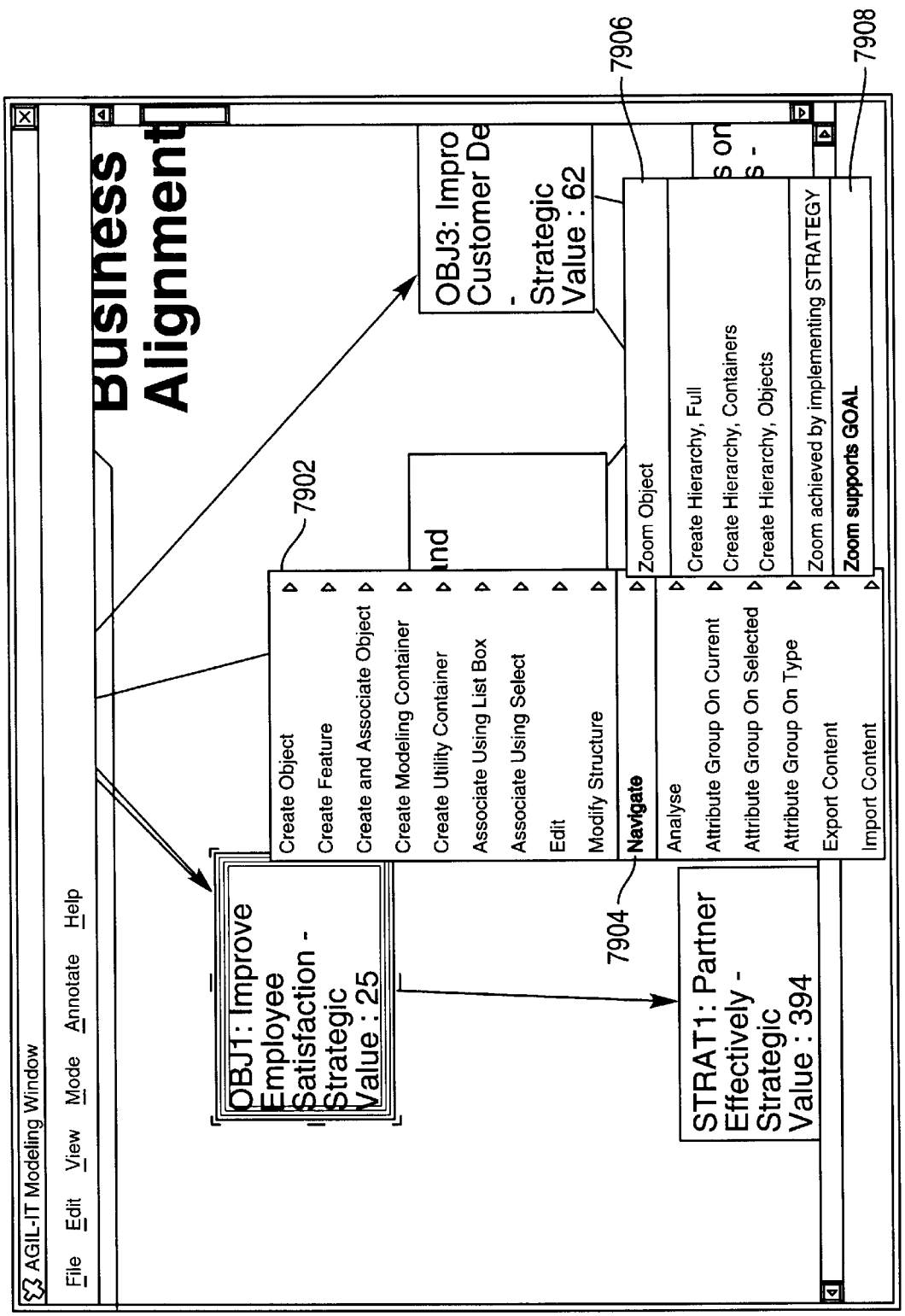

Referring to FIG. 79, there is shown a display on a computer screen illustrating visual interfaces 7902 and 7906. As shown in FIG. 79, visual interface 7902 is invoked by selecting and activating OBJ1 object, and visual interface 7906 is invoked by selecting and activating item 7904 (Navigate) within visual interface 7902. By selecting and activating item 7908 (Zoom supports GOAL) within visual interface 7906, the process is led to FIG. 80.

Figure 80:
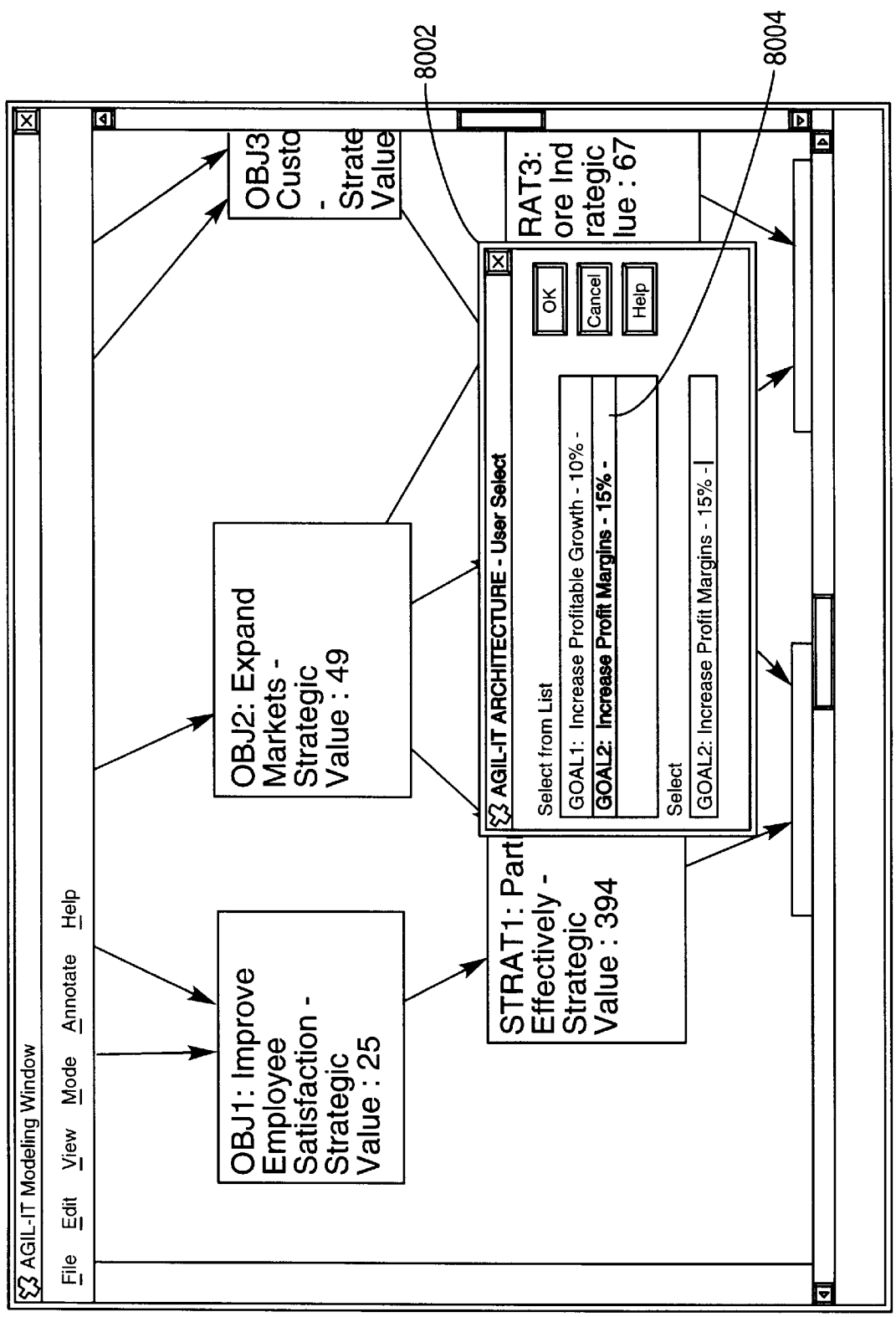

Referring to FIG. 80, there is shown a display on a computer screen illustrating visual interface 8002. As shown in FIG. 80 there are two goal type objects in the Business Alignment container and visual interface 8002 therefore displays two options: GOAL1 or GOAL2 objects. By selecting and activating item 8004 (GOAL2 object) within visual interface 8002, the process is led to FIG. 81.

Figure 81:
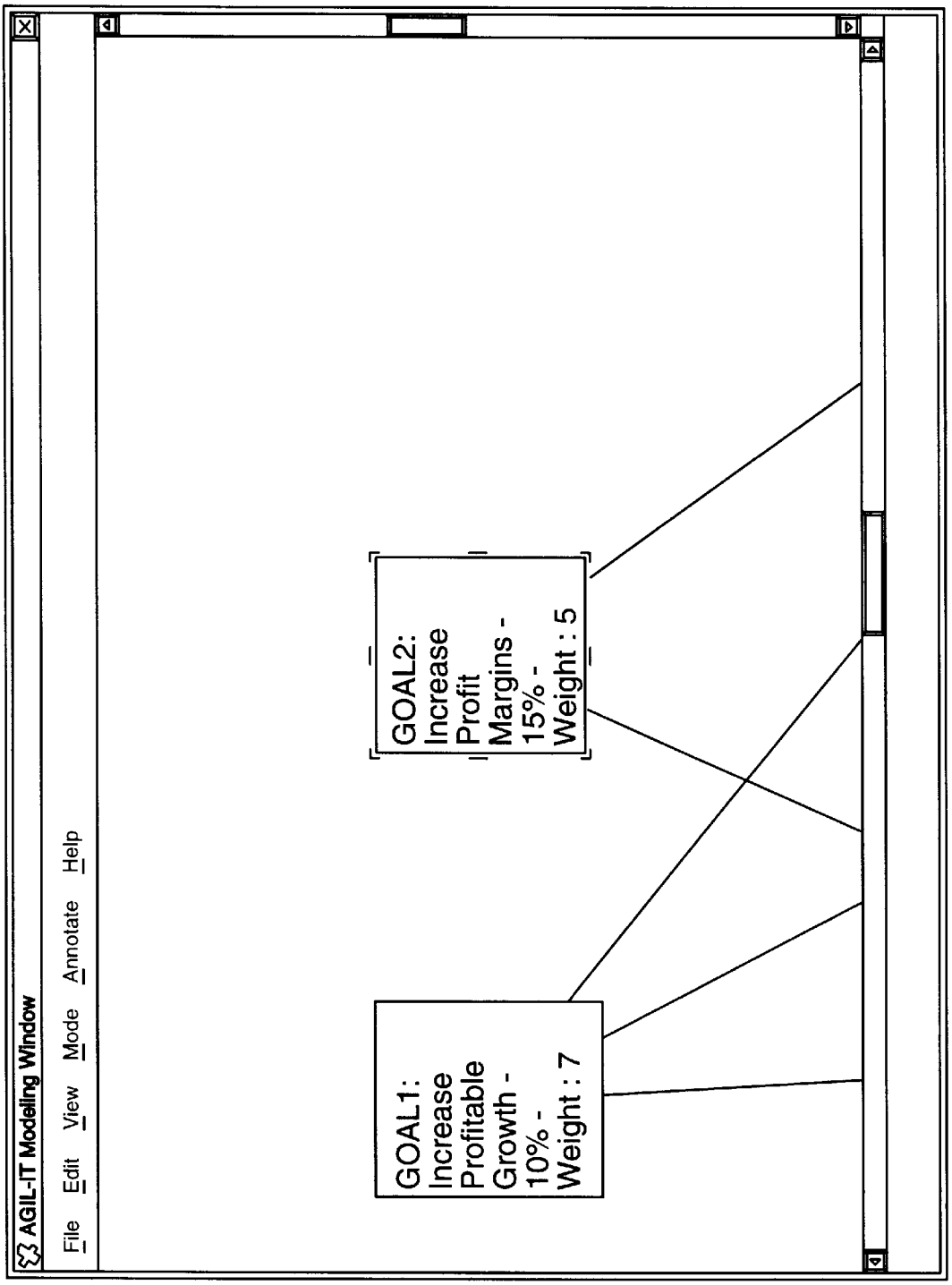

Referring to FIG. 81, there is shown a display on a computer screen illustrating GOAL2 object. As shown in FIG. 81, the dotted lines encircling the GOAL2 object indicate that this object is located in response to the selection of GOAL2 in FIG. 80.

Figure 82:
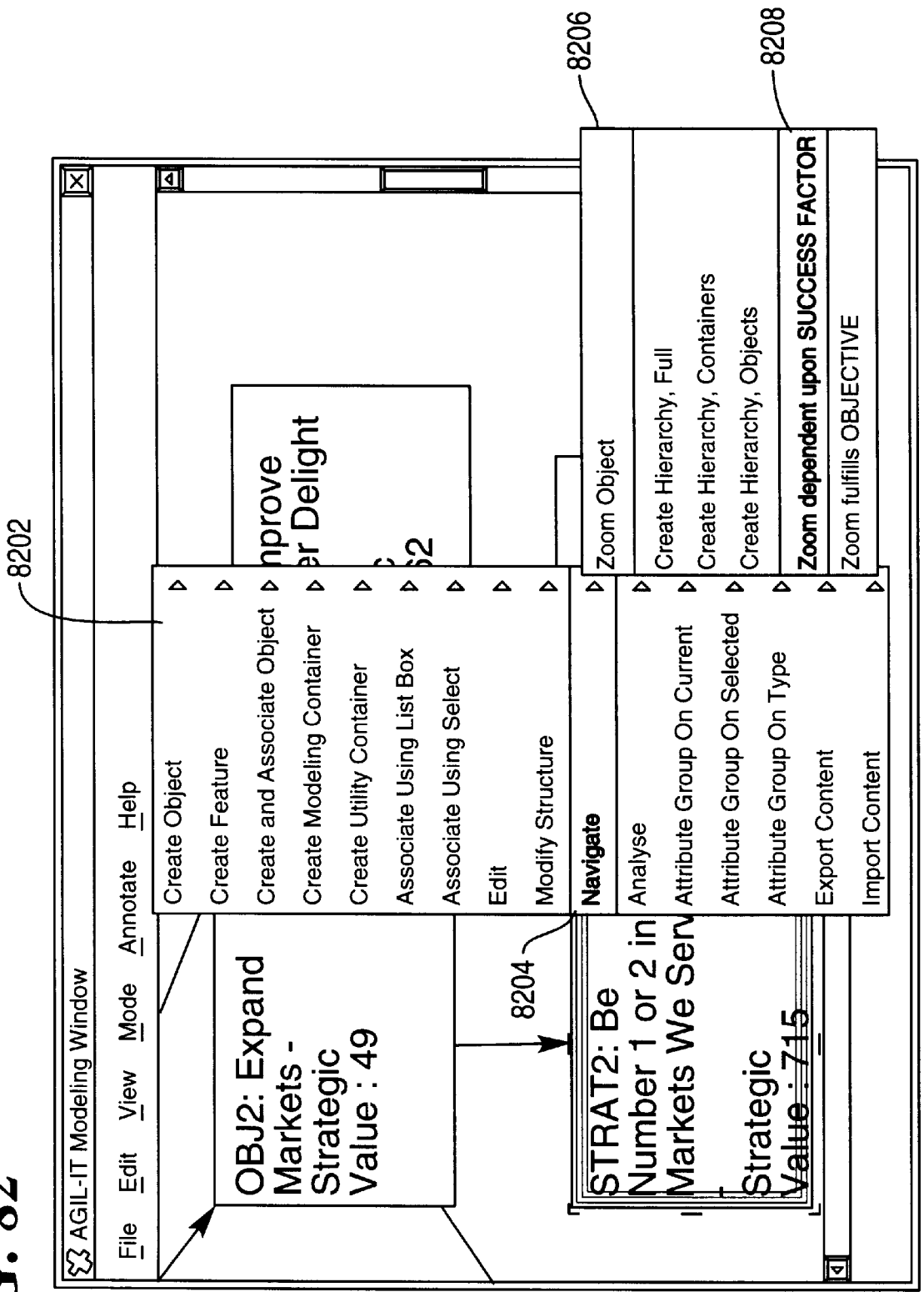

Referring to FIG. 82, there is shown a display on a computer screen illustrating visual interfaces 8202 and 8206. As shown in FIG. 82, visual interface 8202 is invoked by selecting and activating STRAT2 object, and visual interface 8206 is invoked by selecting and activating item 8204 (Navigate) within visual interface 8202. By selecting and activating item 8208 (Zoom dependent upon SUCCESS FACTOR) within visual interface 8206, the process is led to FIG. 83.

Figure 83:
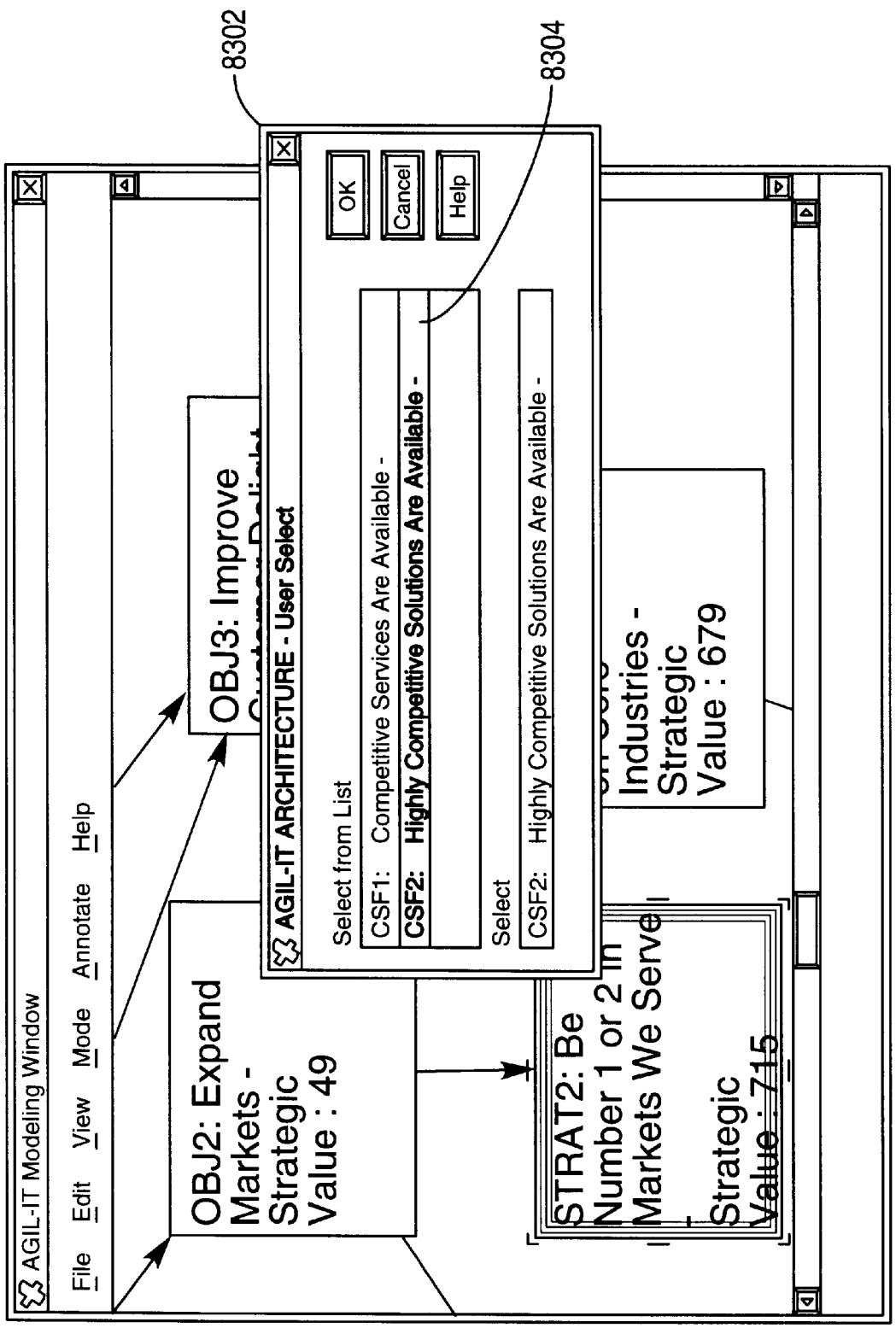

Referring to FIG. 83, there is shown a display on a computer screen illustrating visual interface 8302. As shown in FIG. 83 there are two success factor type objects in the Business Alignment container and therefore visual interface 8302 displays two options: CSF1 or CSF2 objects (CSF—Critical Success Factor). By selecting and activating item 8304 (CSF2 object) within visual interface 8302, the process is led to FIG. 84.

Figure 84:
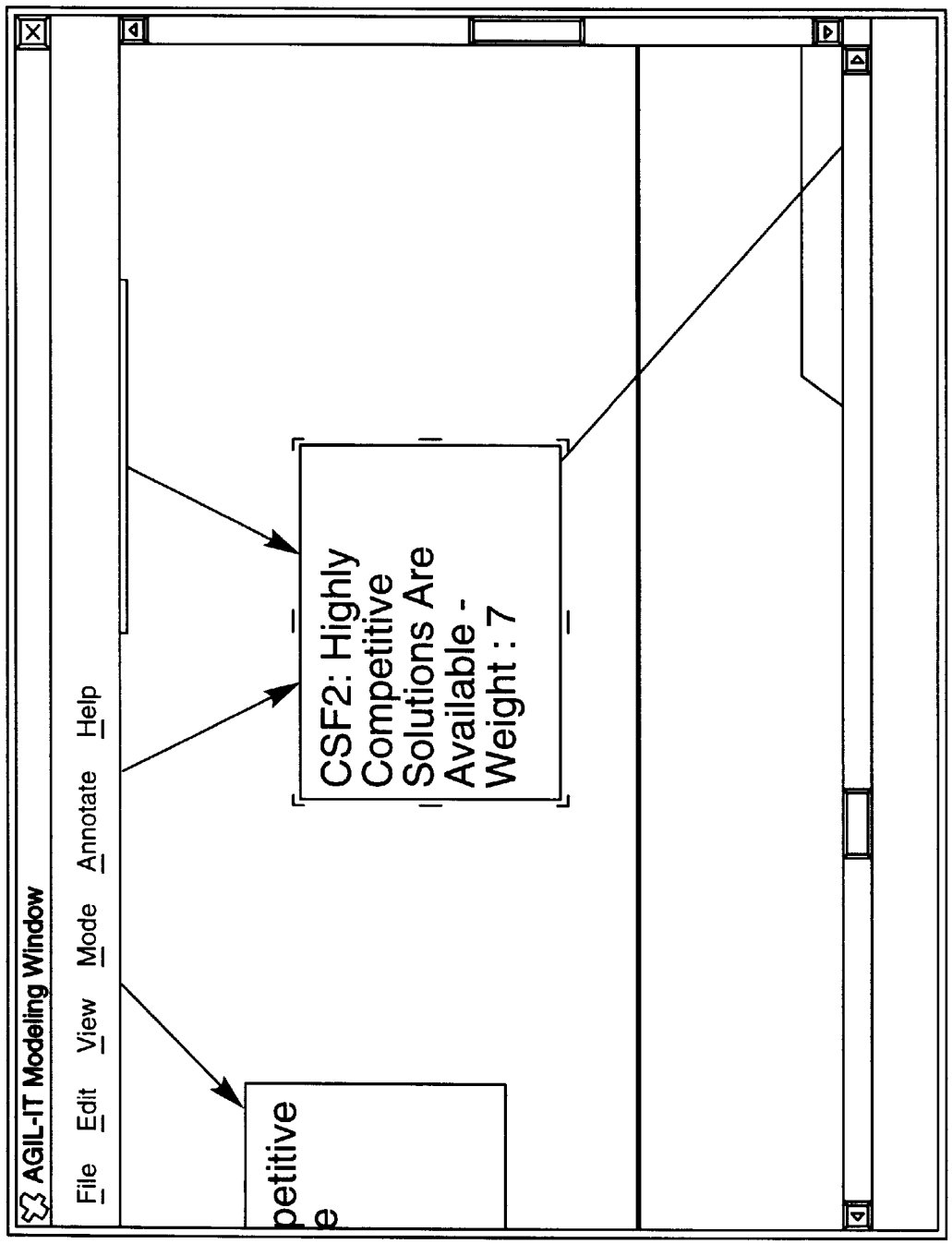

Referring to FIG. 84, there is shown a display on a computer screen illustrating CSF2 object. As shown in FIG. 84, the dotted lines encircling the CSF2 object indicate that this object is located in response to the selection of CSF2 in FIG. 83.

Figure 85:
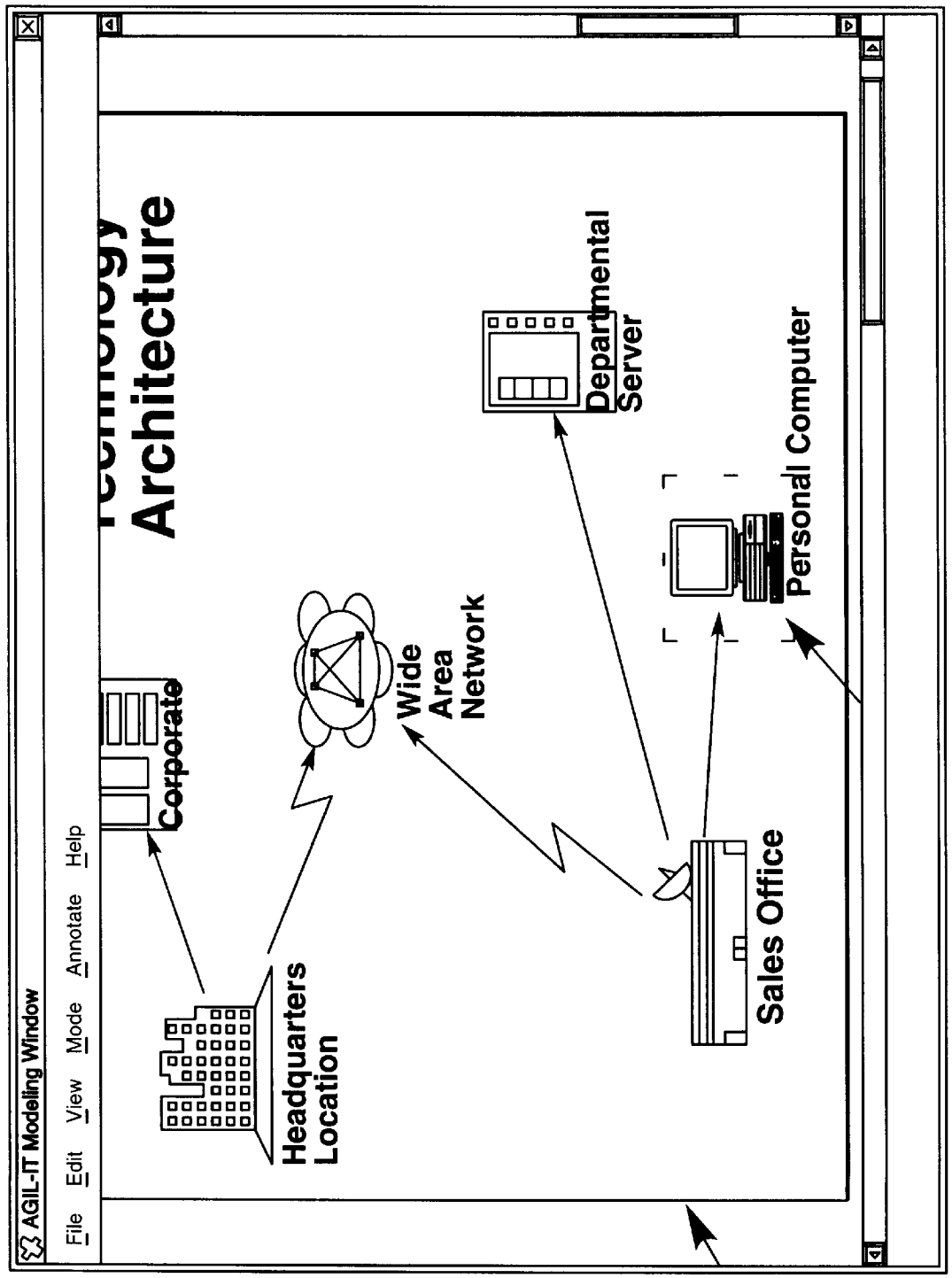

Referring to FIG. 85, there is shown a display on a computer screen illustrating Personal Computer object symbol. As shown in FIG. 85, the dotted lines encircling the Personal Computer object indicates that this object is selected.

Figure 86:
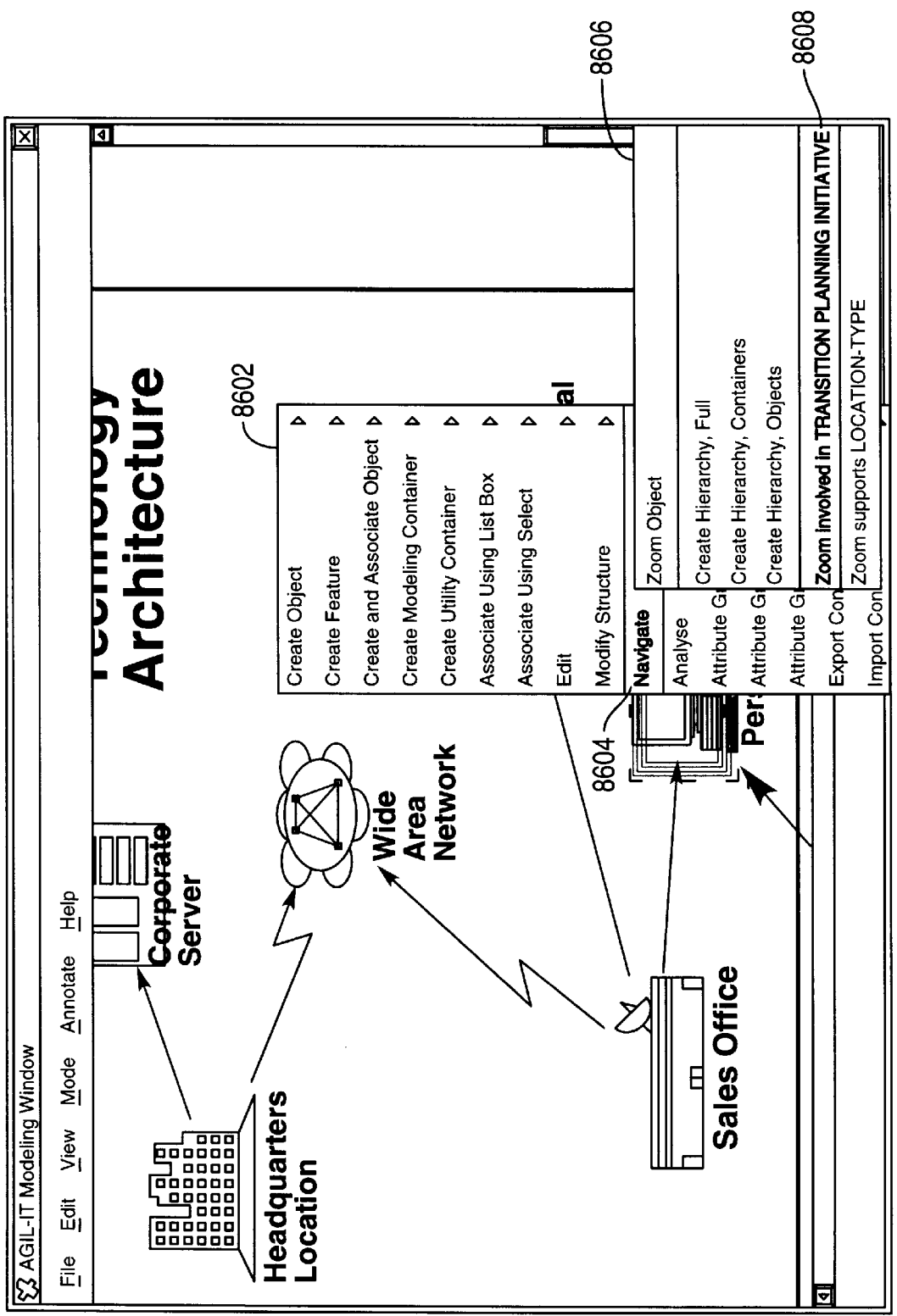

Referring to FIG. 86, there is shown a display illustrating visual interfaces 8602 and 8606. As shown in FIG. 86, visual interface 8602 is invoked by activating Personal Computer object, and visual interface 8606 is invoked by selecting and activating item 8604 (Navigate) within visual interface 8602. By selecting and activating item 8608 (Zoom involved in TRANSITION PLANNING INITIATIVE) within visual interface 8606, the process is led to FIG. 87.

Figure 87:
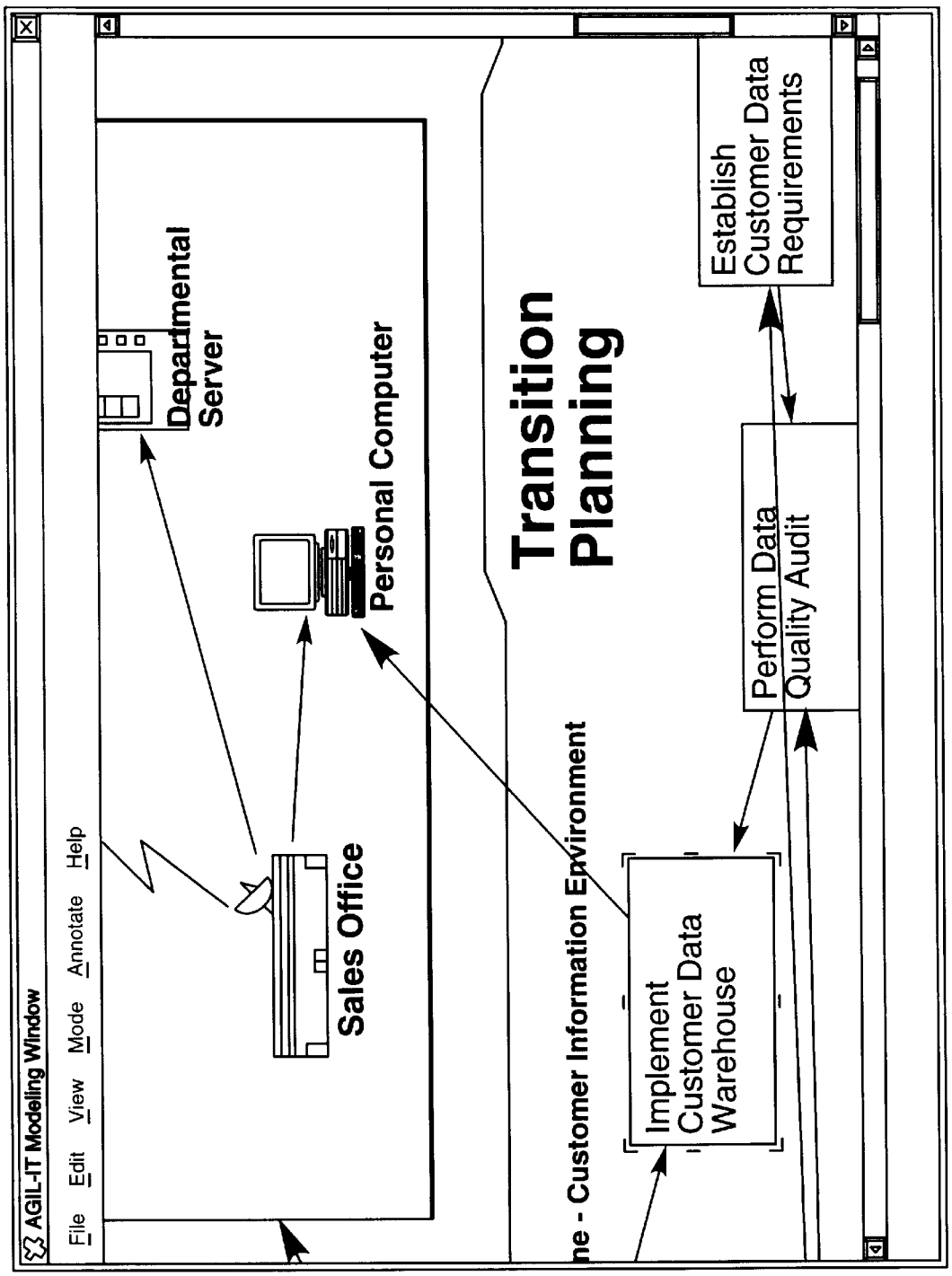

Referring to FIG. 87, there is shown a display shown on a computer screen, illustrating Implement Customer Data Warehouse object. As shown in FIG. 87, the dotted lines encircling the Implement Customer Data Warehouse object indicate that this object is located in response to the selection in FIG. 86. Since there is only one TRANSITION PLANNING INITIATIVE object related to the Personal Computer object, the system immediately zooms to that single TRANSITION PLANNING INITIATIVE object, in this case Implement Customer Data Warehouse.

FIGS. 88–90 illustrate the process for locating objects from a selected object at any location (up or down) within the IT architecture visual model by selecting and activating an item in a textual object list.

Referring to FIG. 88, there is shown a display on a computer screen, illustrating visual interfaces 8802 and 8806. As shown in FIG. 88, visual interface 8802 is invoked by selecting and activating an object or a sub-region, and visual interface 8806 is invoked by selecting and activating item 8804 (Navigate) within visual interface 8802. By selecting and activating item 8808 (Zoom Root OBJECT) within visual interface 8806, the process is led to FIG. 89.

Referring to FIG. 89, there is shown a display on a computer screen, illustrating visual interface 8902 that contains a textual list all objects in the IT architecture visual model. By pulling up or down scroll bar 8906, the objects in the IT architecture visual model can be scrolled up or down accordingly. By selecting and activating item 8904 (OBJ2 object), the process is led to FIG. 90.

Referring to FIG. 90, there is shown a display shown on a computer screen, illustrating six objects in the IT architecture visual model. The dotted lines encircling the OBJ2 object indicate that this object is located in response to the selection of OBJ2 in FIG. 89.

FIGS. 91–94 illustrate the process for locating objects from a list of objects at any location within the IT architecture visual model by selecting and activating an item in a visual object list.

Figure 91:
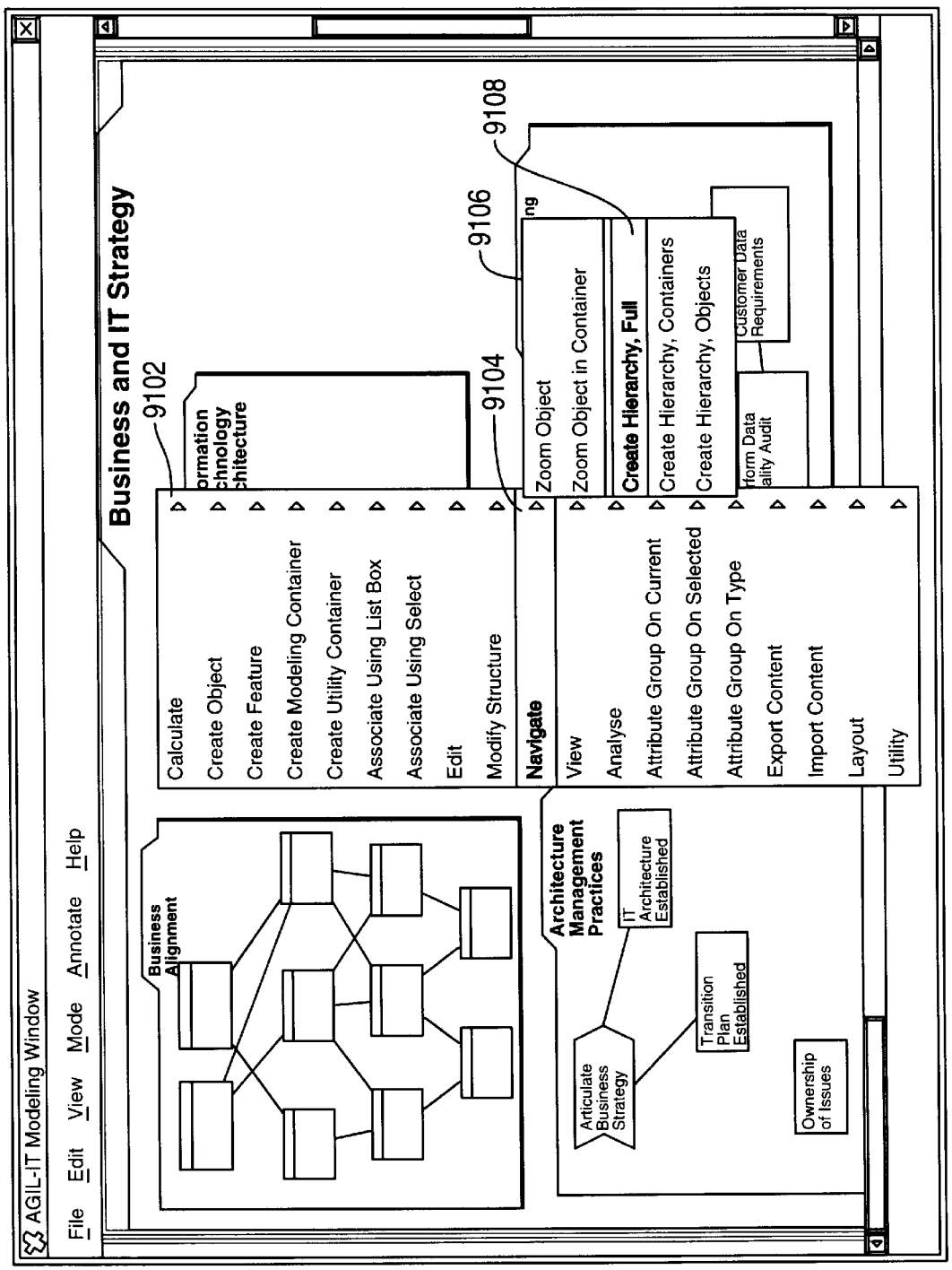

Referring to FIG. 91, there is shown a display on a computer screen, illustrating visual interfaces 9102 and 9106. As shown in FIG. 91, visual interface 9102 is invoked by selecting and activating an object or a sub-region, and visual interface 9106 is invoked by selecting and activating item 9104 (Navigate) within visual interface 9102. By selecting and activating item 9108 (Create Hierarchy, Full) within visual interface 9106, the process is led to FIG. 92.

Figure 92:
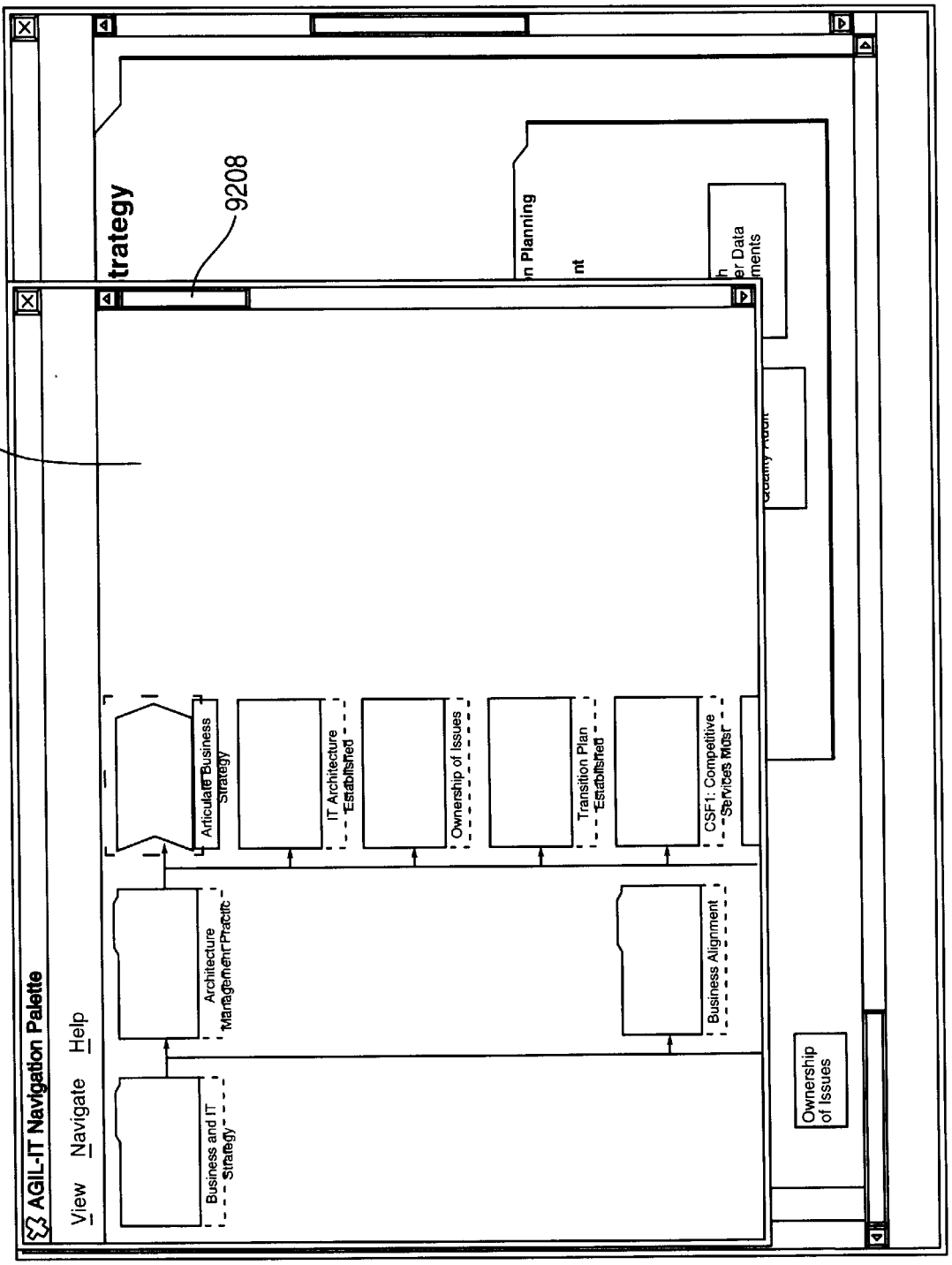

Referring to FIG. 92, there is shown a display shown on a computer screen, illustrating visual interface 9202 that contains the visual symbol list for all objects in the IT architecture visual model. As shown in FIG. 92, visual interface 9202 contains visual symbols for Architecture Management Practices and Business Alignment containers. Each of the two containers connects to the visual symbols for all the objects within that container. By pulling up or down scroll bar 9208, the visual symbols for the objects in the IT architecture visual model can be scrolled up or down accordingly. By pulling down scroll bar 9208, more visual symbols will be displayed as shown in FIG. 93.

Figure 93:
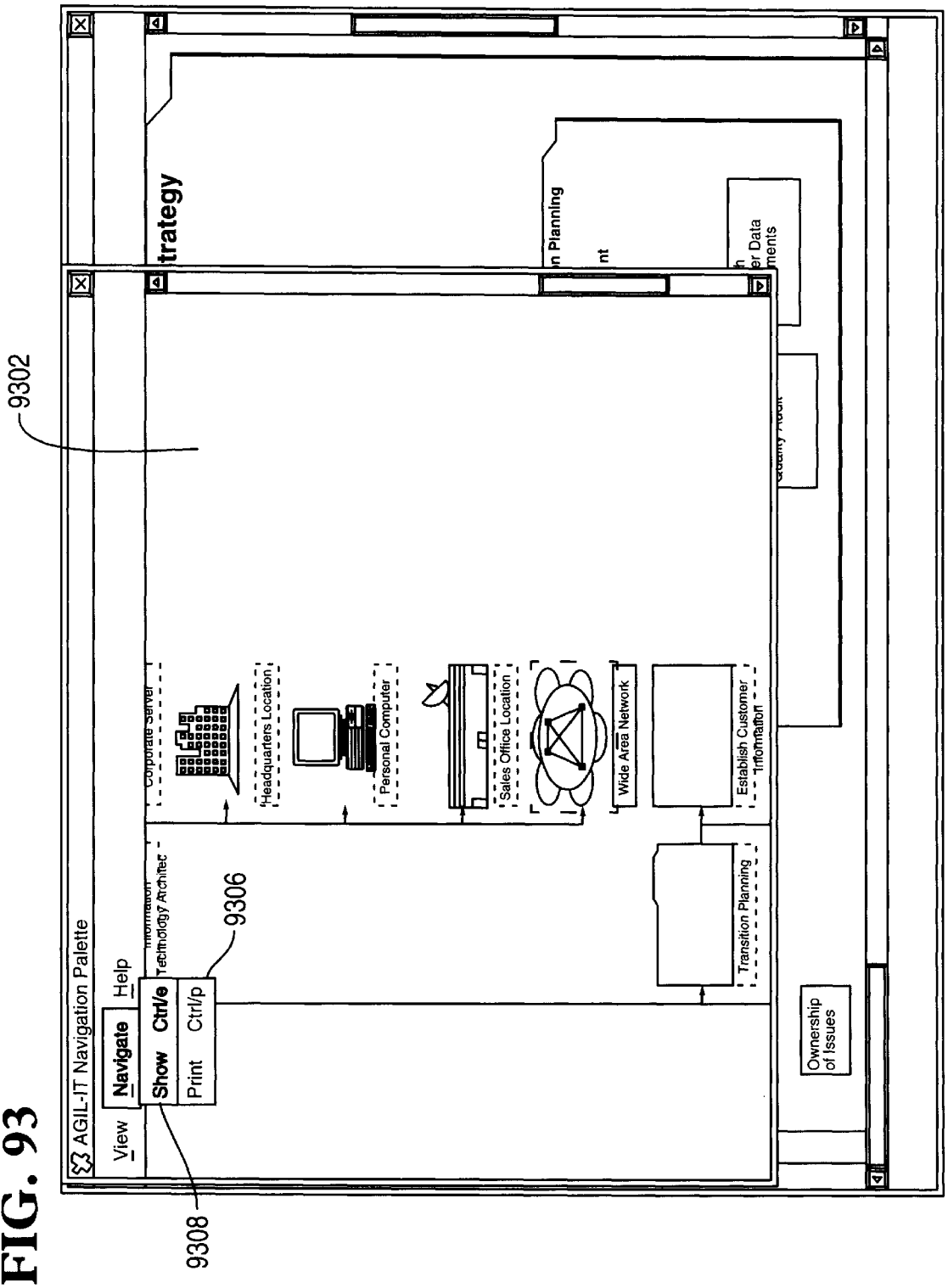

Referring to FIG. 93, there is shown a display on a computer screen, illustrating four objects in the Information Technology Architecture container. The dotted lines encircling the visual symbol for the Wide Area Network object indicate that this object is selected. By selecting and activating item 9308 (Navigate—Show) from visual interface 9306, the process is led to FIG. 94.

Figure 94:
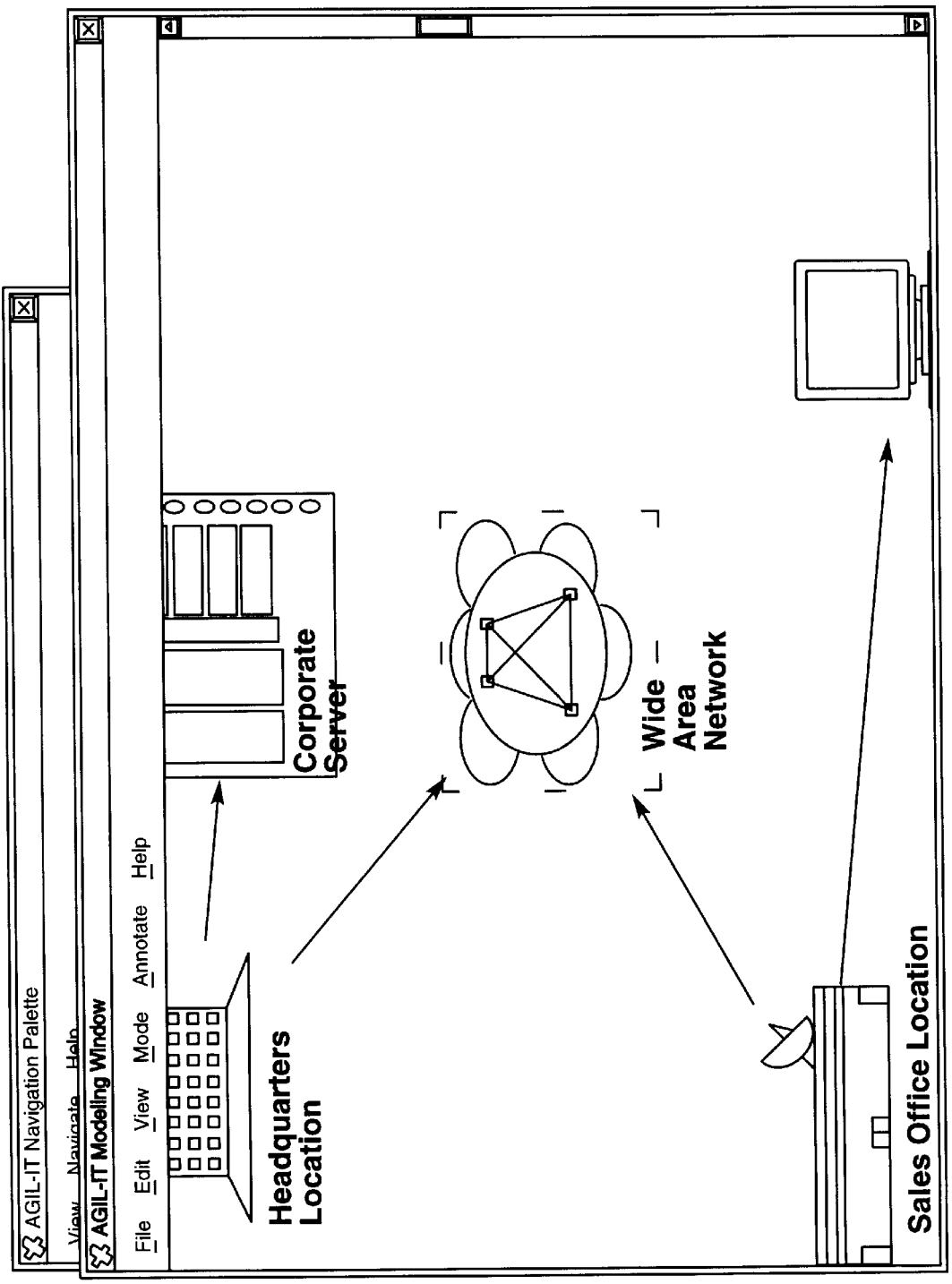

Referring to FIG. 94, there is shown a display on a computer screen, illustrating five objects in the Information Technology Architecture container. The dotted lines encircling the Wide Area Network object indicate that this object is located in response to the selection in FIG. 93 (Navigate—Show).

FIGS. 95–97 illustrate the process for locating the objects at any level within a container.

Referring to FIG. 95, there is shown a display on a computer screen, illustrating visual interfaces 9502 and 9506. As shown in FIG. 95, visual interface 9502 is invoked by selecting and activating a position in Business Alignment container (but outside the objects and relationships in the container), and visual interface 9506 is invoked by selecting and activating item 9504 (Navigate) within visual interface 9502. By selecting and activating item 9508 (Zoom Object in Container) within visual interface 9506, the process is led to FIG. 96.

Referring to FIG. 96, there is shown a display on a computer screen, illustrating visual interface 9602 that contains a textual list of all objects in Business Alignment container. By selecting and activating item 9604 (STRAT3 object), the process is led to FIG. 97.

Referring to FIG. 97, there is shown a display shown on a computer screen, illustrating five objects in Business Alignment container. The dotted lines encircling the STRAT3 object indicate that this object is located in response to the selection in FIG. 96.

FIGS. 98–105 illustrate the process for locating the objects having a certain type of characteristic.

Figure 98:
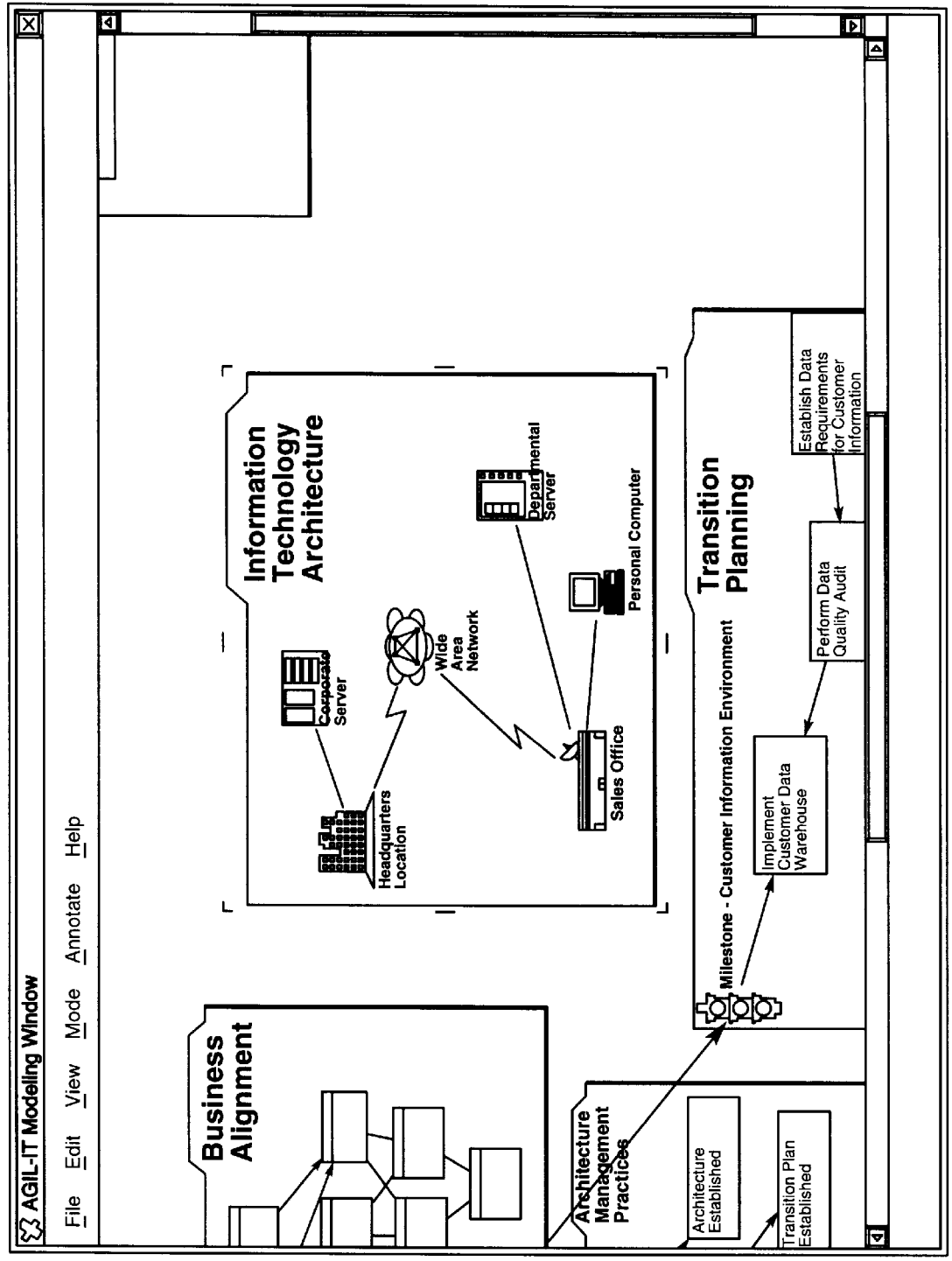

Referring to FIG. 98, there is shown a display on a computer screen, illustrating that Information Technology Architecture container is selected as indicated by the dotted lines encircling the container.

Figure 99:
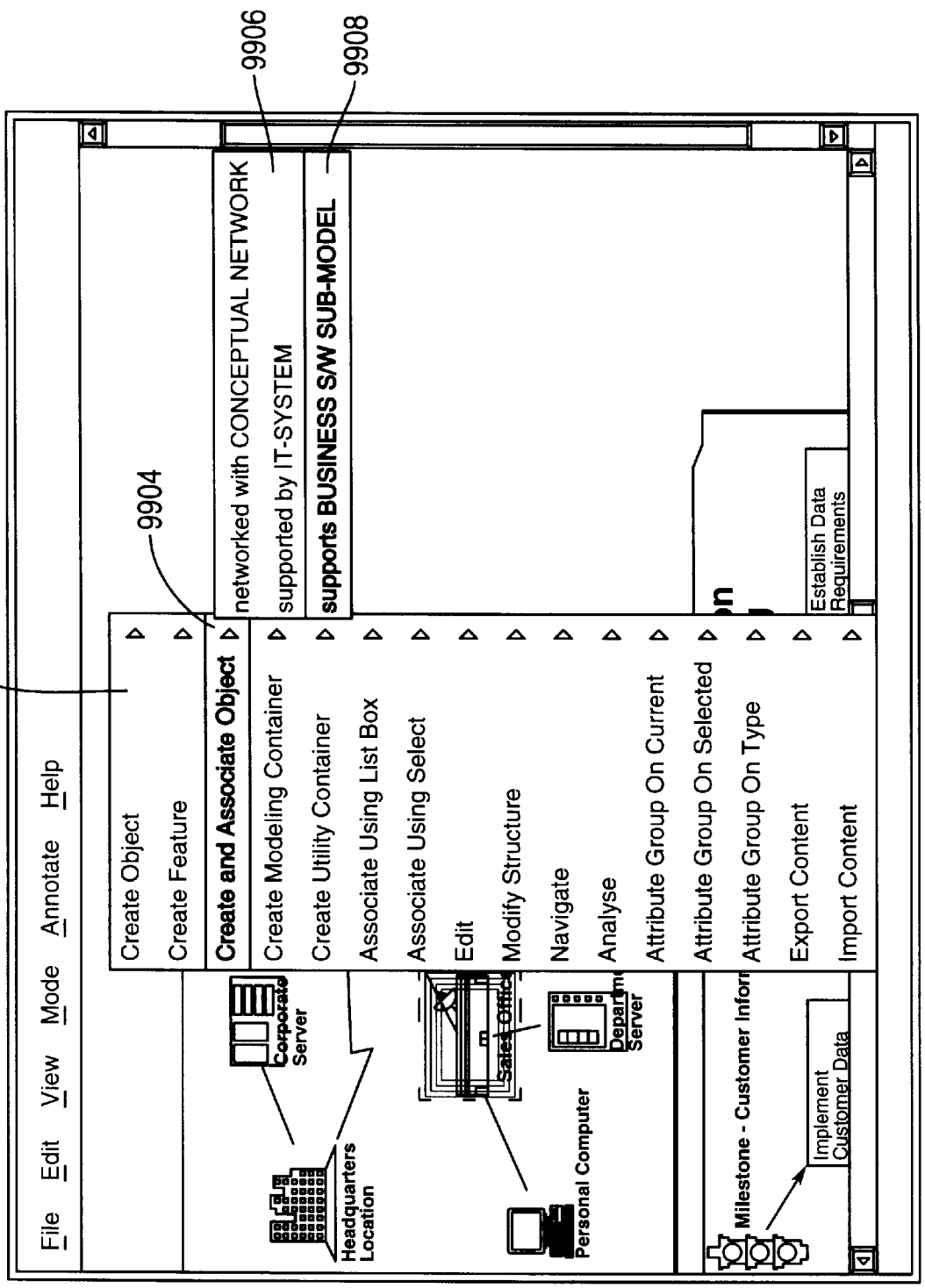

Referring to FIG. 99, there is shown a display on a computer screen, illustrating visual interfaces 9902 and 9906. As shown in FIG. 99, visual interface 9902 is invoked by selecting and activating Sales Office object, and visual interface 9906 is invoked by selecting and activating item 9904 (Create and Associate Object) within visual interface 9902. Visual interface 9906 contains three items, and each of the three items can be used to create an object with pre-determined characteristics. The created object can be used to search the objects having the pre-determined characteristics. By selecting and activating item 9908 (supports BUSINESS SOFTWARE SUB-MODEL) within visual interface 9906, the process is led to FIG. 100.

Figure 100:
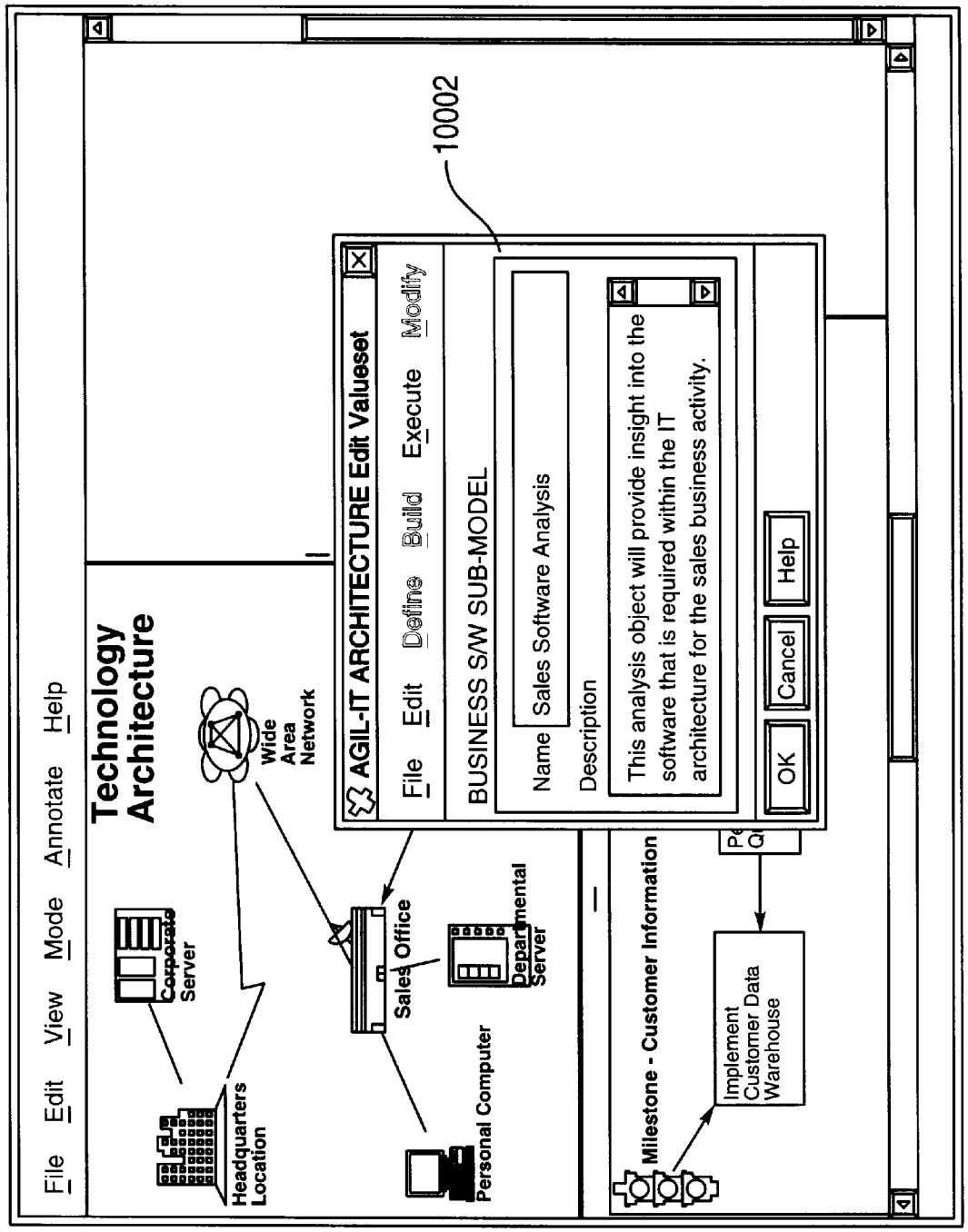

Referring to FIG. 100, there is shown a display shown on a computer screen, illustrating information window 10002 for entering name and description for a created object. As shown in FIG. 100, the object is created for the purpose of understanding the types of software that are needed by the sales office, in this case, those that have software characteristics. The process is led to FIG. 101 by clicking OK button.

Figure 101:
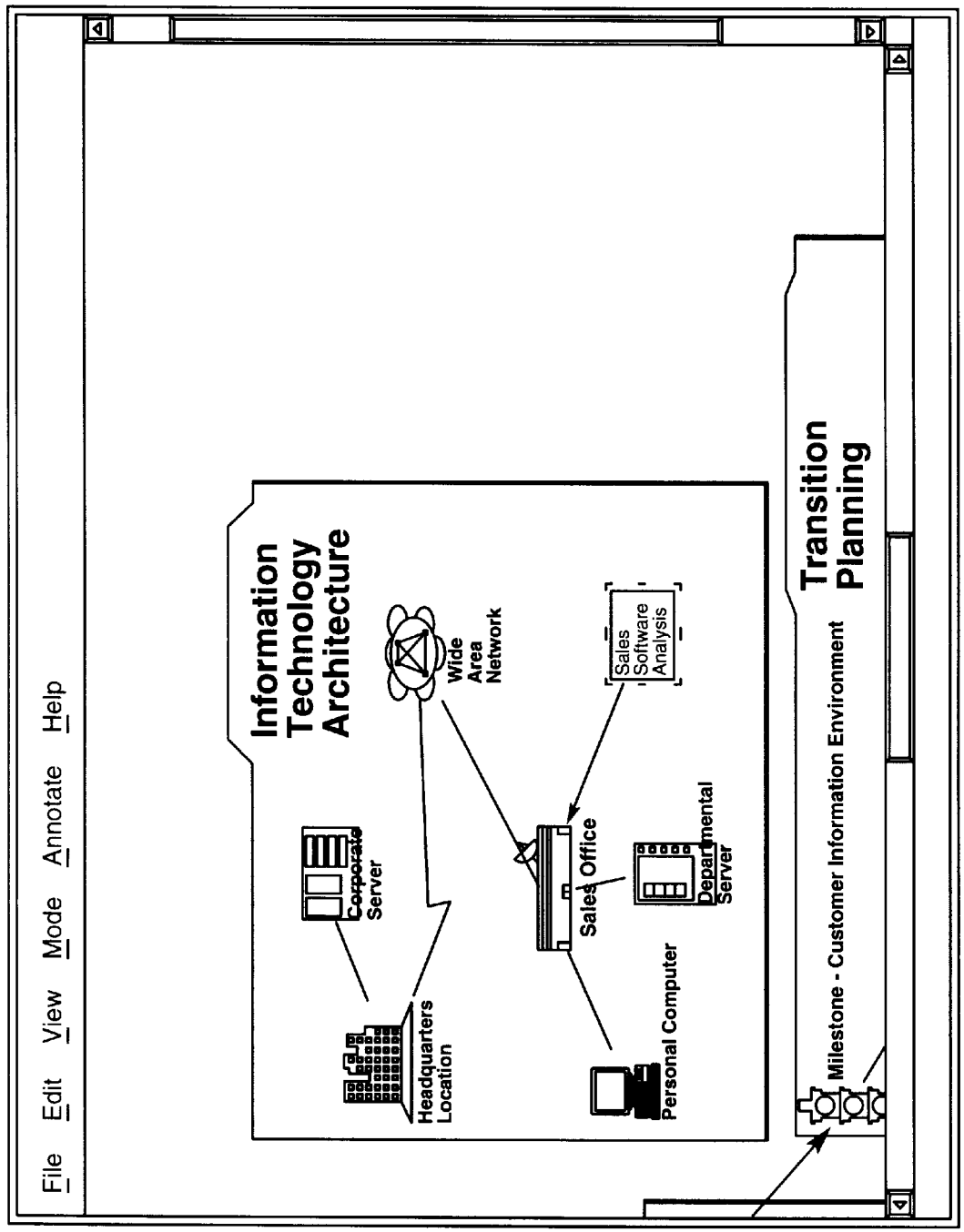

Referring to FIG. 101, there is shown a display shown on a computer screen, illustrating Sales Software Analysis object is created and related to the Sales Office object for the purpose of visualizing and navigating objects with software characteristics in the IT architecture pertaining to the sales office.

Figure 102:
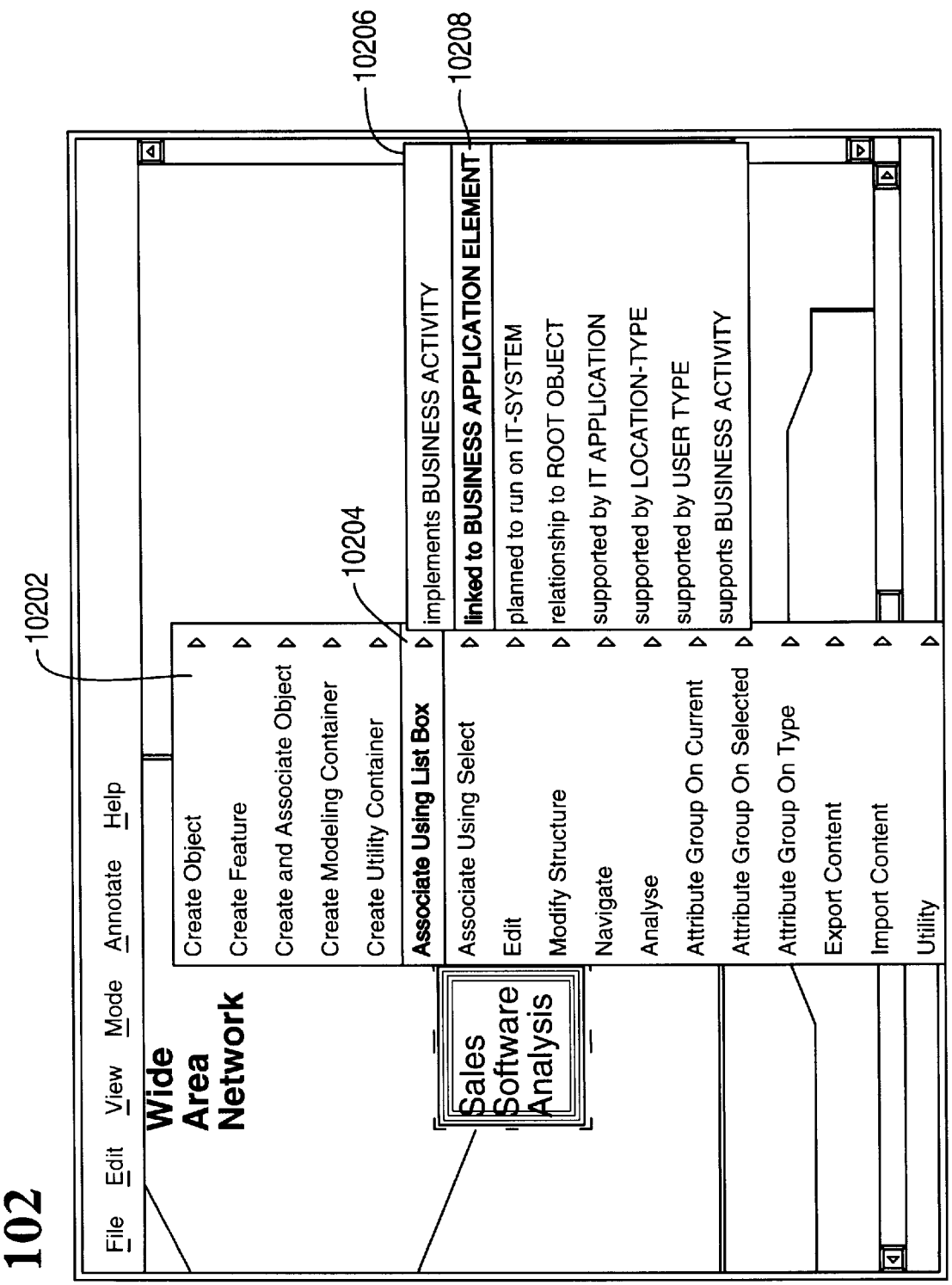

Referring to FIG. 102, there is shown a display on a computer screen, illustrating visual interfaces 10202 and 10206. As shown in FIG. 102, visual interface 10202 is invoked by selecting and activating Sales Software Analysis object, and visual interface 10206 is invoked by selecting and activating item 10204 (Associate Using List Box) within visual interface 10202. By selecting and activating item 10208 (linked to BUSINESS APPLICATION ELEMENT) within visual interface 10206, the process is led to FIG. 103.

Figure 103:
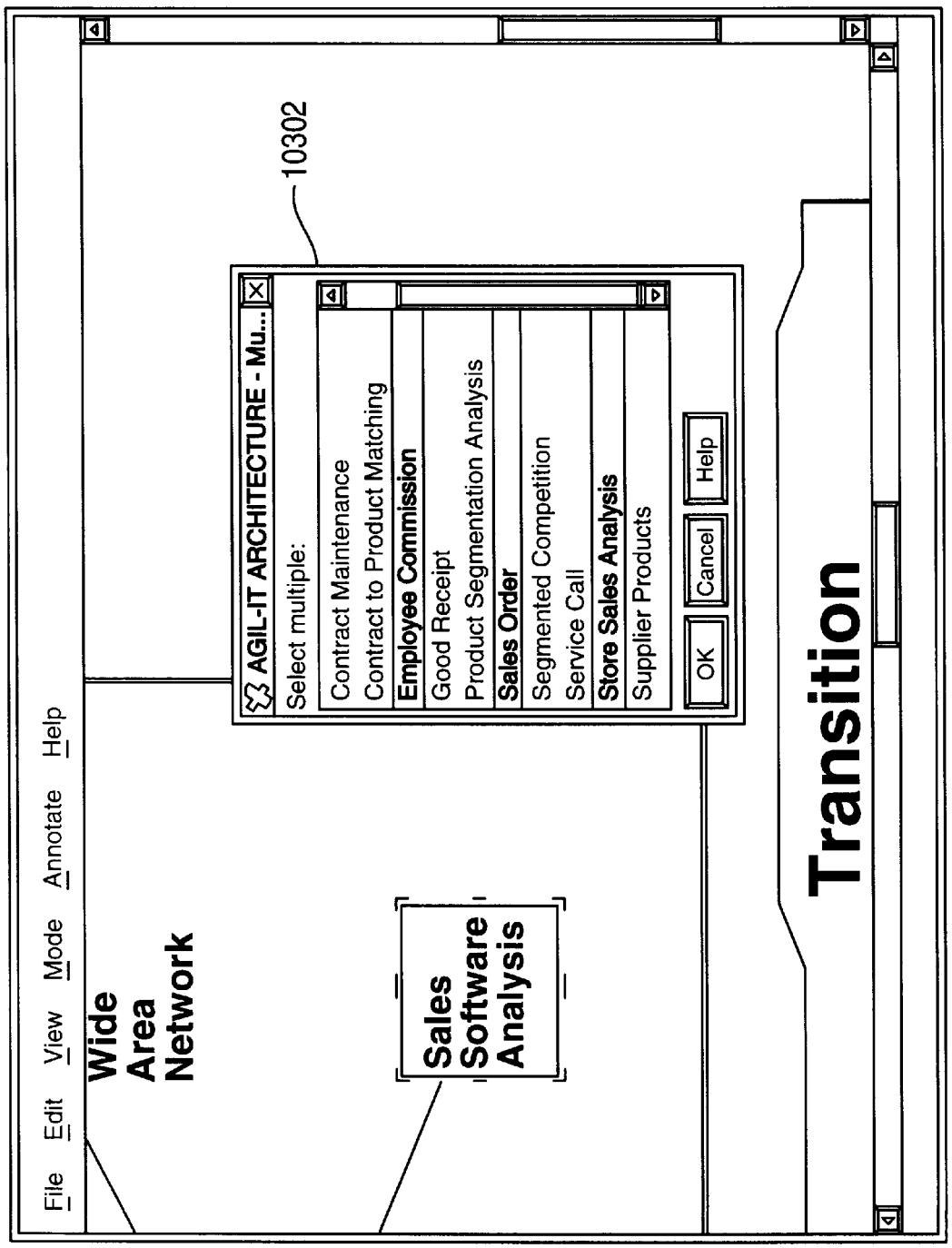

Referring to FIG. 103, there is shown a display on a computer screen, illustrating information window 10302 containing all objects with software characteristics in BUSINESS APPLICATION ELEMENT container. As shown in FIG. 103, selected are three objects, namely: Employee Commission, Sales Order, and Store Sales Analysis. By clicking OK button, the process is led to FIG. 104.

Figure 104:
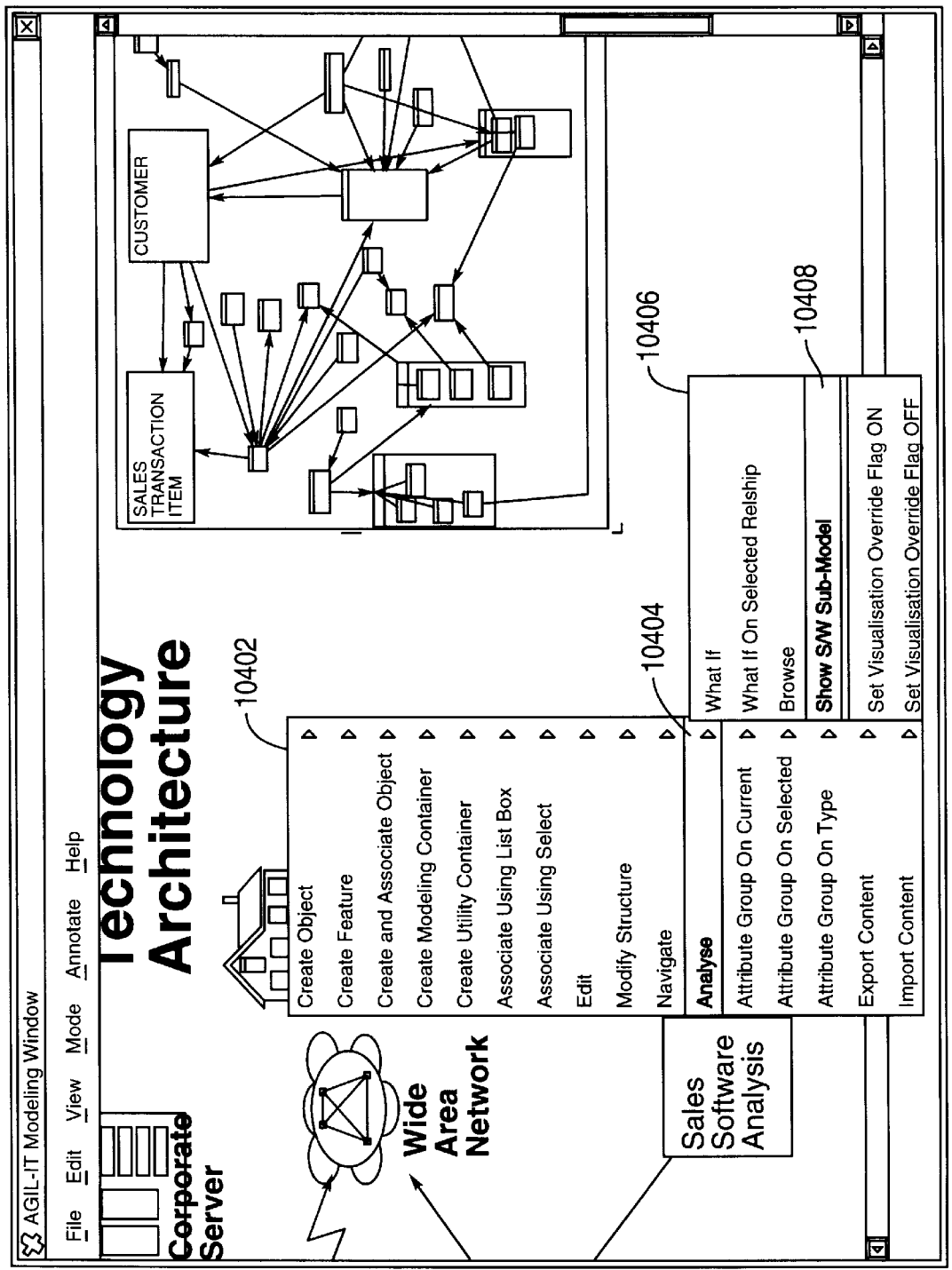

Referring to FIG. 104, there is shown a display on a computer screen, illustrating visual interfaces 10402 and 10406. As shown in FIG. 104, visual interface 10402 is invoked by selecting and activating Sales Software Analysis object, and visual interface 10406 is invoked by selecting and activating item 10404 (Analyse) within visual interface 10402. Note that the current symbolic representation of the Business Application Element container is complex. This is due to the fact that this container holds application elements for all locations or business activities found within the IT architecture and not just for the Sales Office location. By selecting and activating item 10408 (Show S/W Sub-Model) within visual interface 10406, the process is led to FIG. 105.

Figure 105:
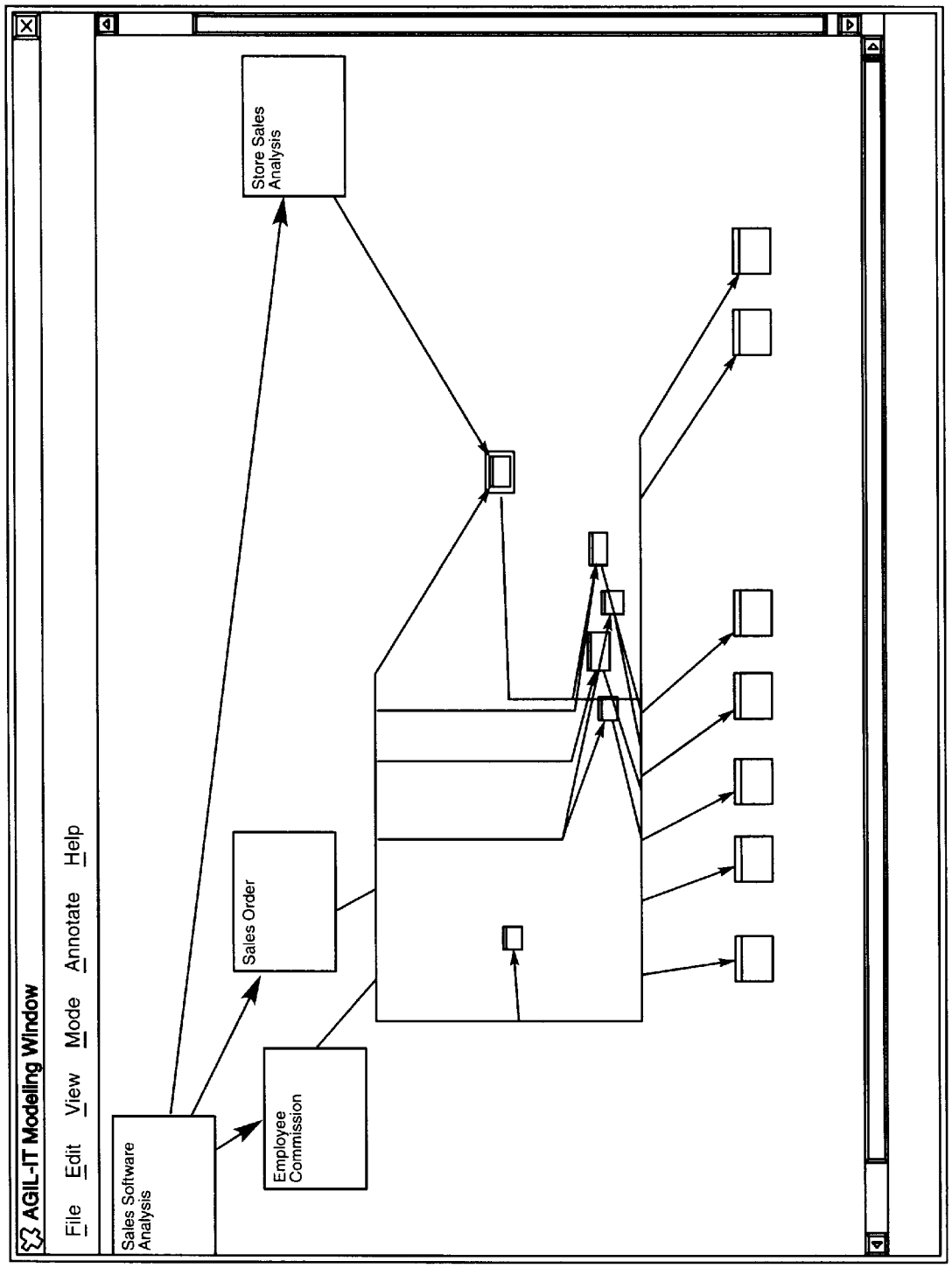

Referring to FIG. 105, there is shown a display on a computer screen, illustrating the three selected objects (Employee Commission, Sales Order, and Store Sales Analysis) and all the objects in the Business Application Element container that are software in nature or have software components dealing now with only the Sales Office location, as specified in the Sales Software Analysis object selected in FIG. 105. Therefore, the complexity of analyzing the full set of objects found in the Business Application Element container is simplified to allow the user to focus and navigate only those objects pertaining to the Sales Office location and having software characteristics within the visual IT architecture model.

FIGS. 106–110 illustrate the process for locating and navigating the objects from a selected object.

Figure 106:
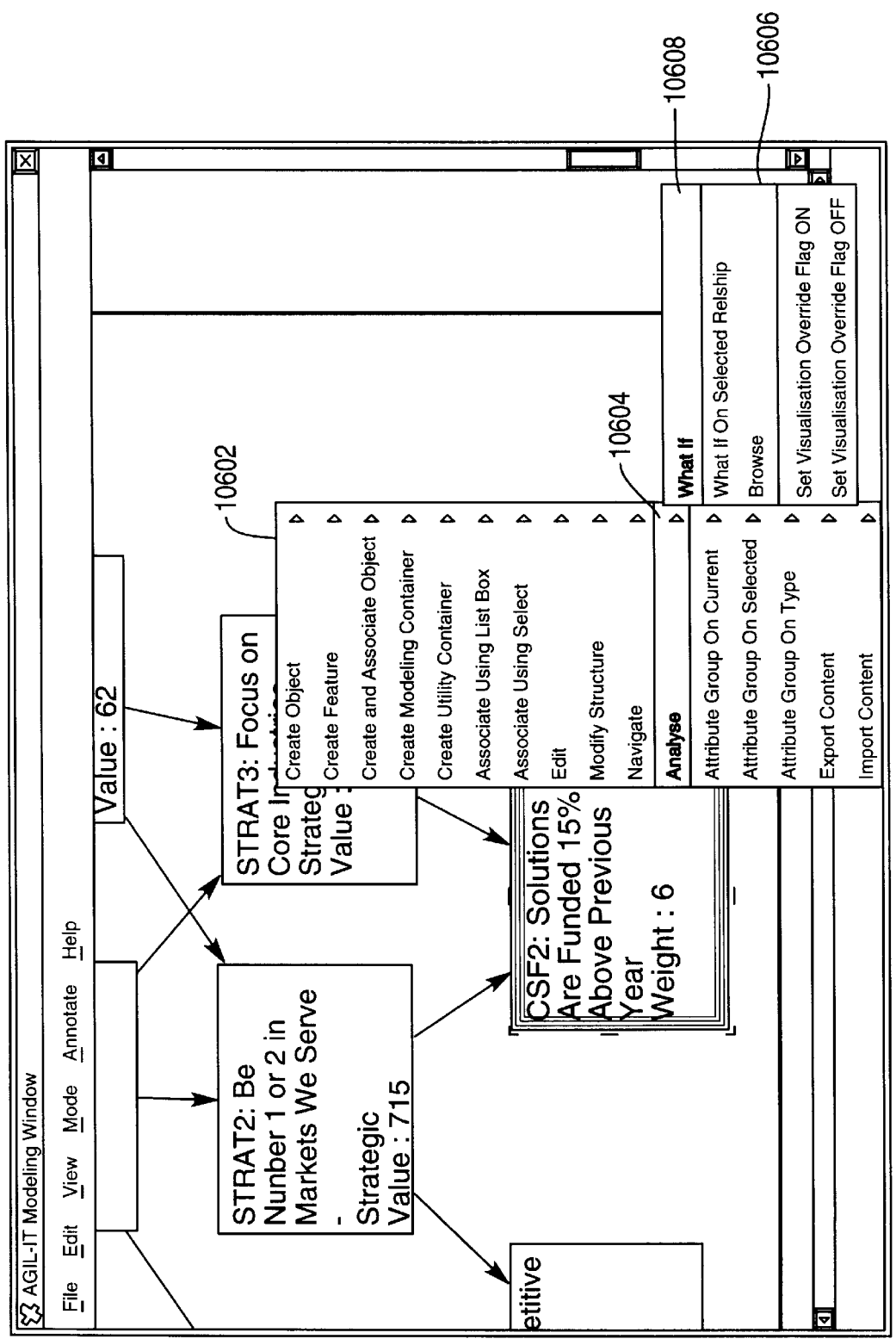

Referring to FIG. 106, there is shown a display on a computer screen, illustrating visual interfaces 10602 and 10606. As shown in FIG. 106, visual interface 10602 is invoked by selecting and activating CSF2 object, and visual interface 10606 is invoked by selecting and activating item 10604 (Analyse) within visual interface 10602. By selecting and activating item 10608 (What If) within visual interface 10606, the process is led to FIG. 107A, 107B, or 107C.

Figure 107A:
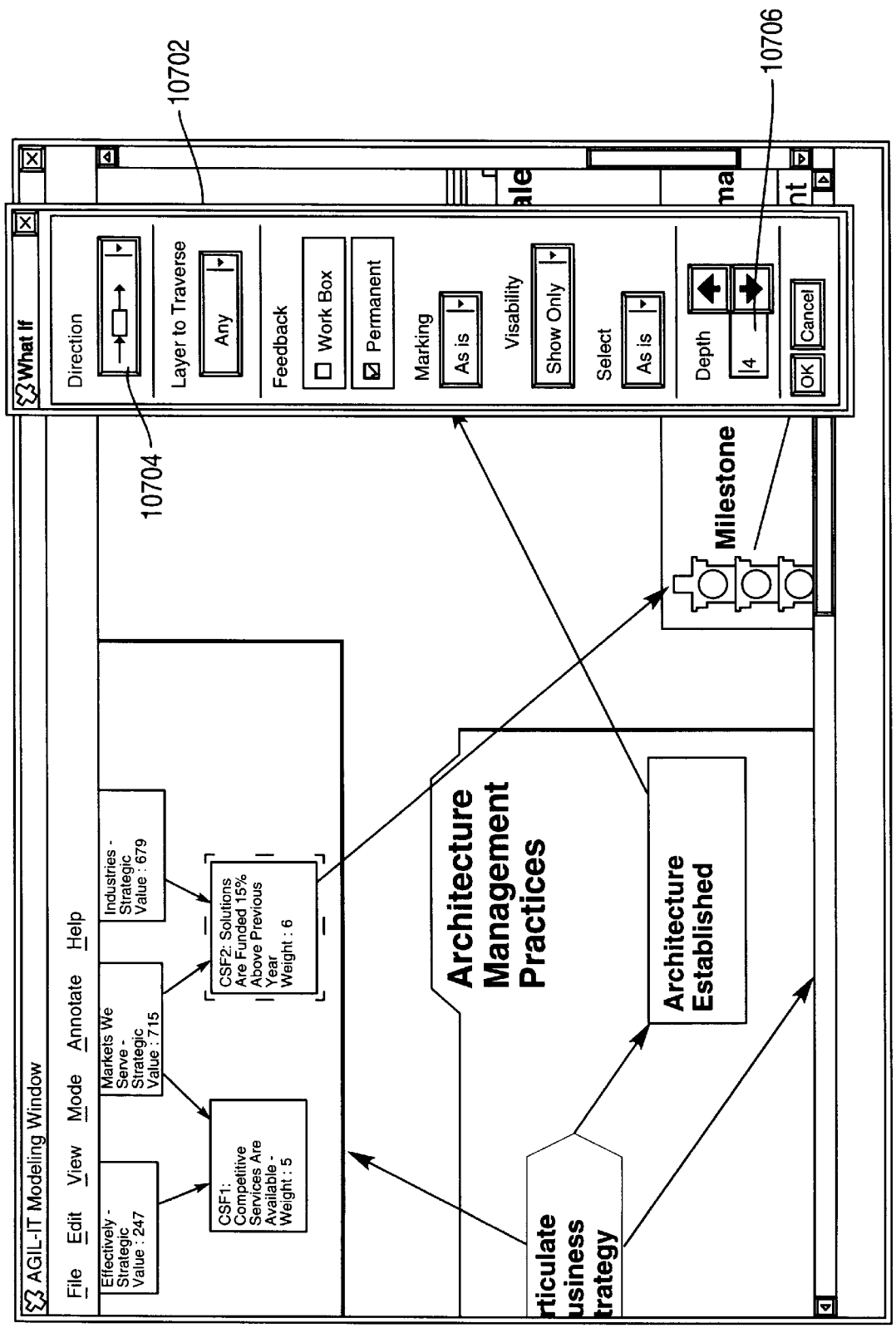

Referring to FIG. 107A, there is shown a display on a computer screen, illustrating visual interface 10702. As shown in FIG. 107A, the value of 4 in button 10706 indicates that the search will be performed four levels up or down within the visual model; and the two arrows in button 10704 indicate that all objects that have relationships either to or from (bidirectional) the CSF2 object within the specified levels (10706) will be searched. By clicking OK button, the process is led to FIG. 108, which illustrates all the objects related to CSF2 object within four bidirectional relationship levels.

Figure 107B:
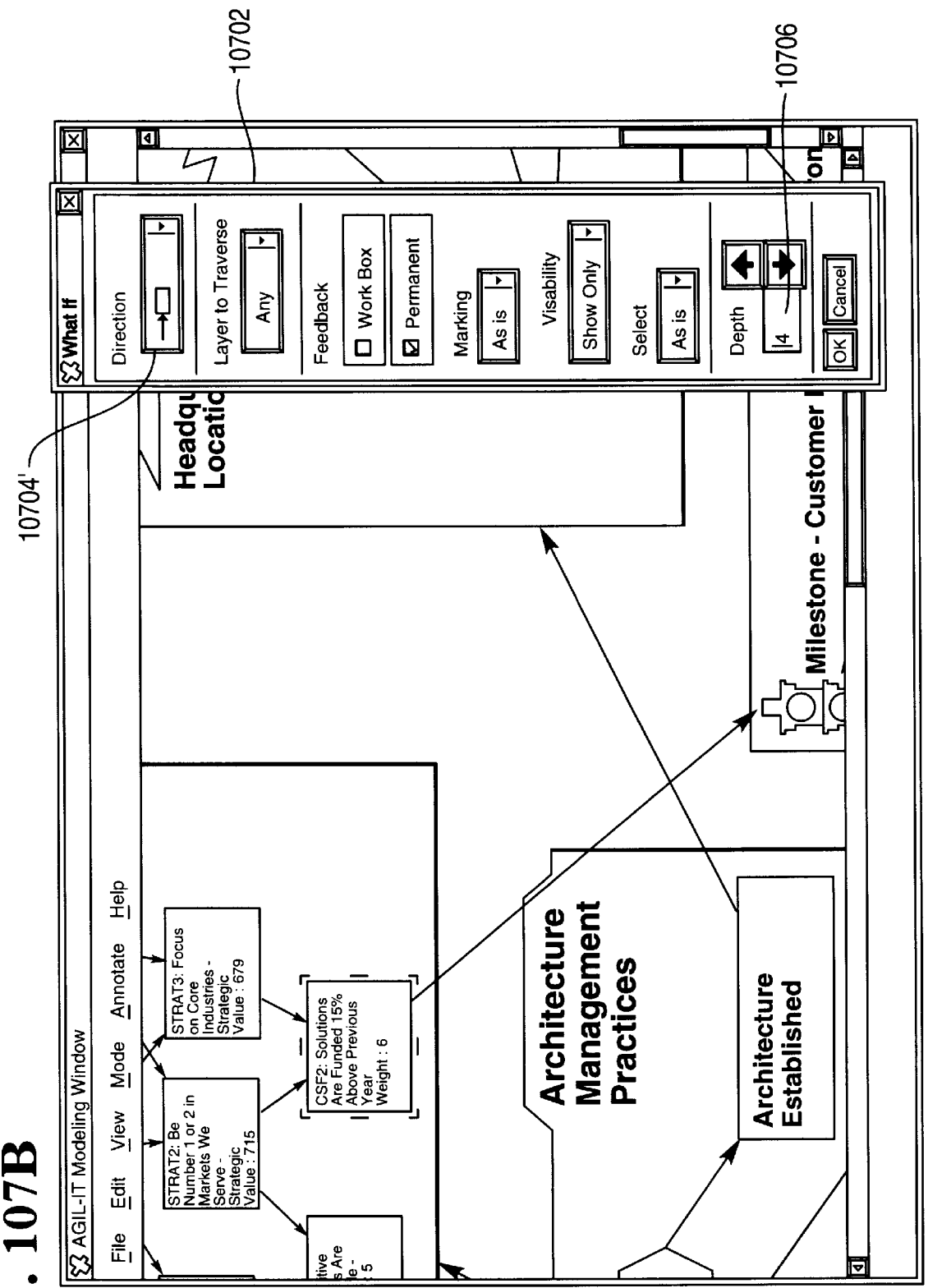

Referring to FIG. 107B, there is shown a display on a computer screen, again illustrating visual interface 10702. As shown in FIG. 107B, the value of 4 in button 10706 indicates that the search will be performed four levels up or down; and the left-side arrow in button 10704' indicates that all objects that have a single input relationship with the CSF2 object within the specified levels (10706) will be searched. By clicking OK button, the process is led to FIG. 109, which shows all the objects related to CSF2 object within four levels up, as specified by the input relationship arrow selection in button 10704'.

Figure 107C:
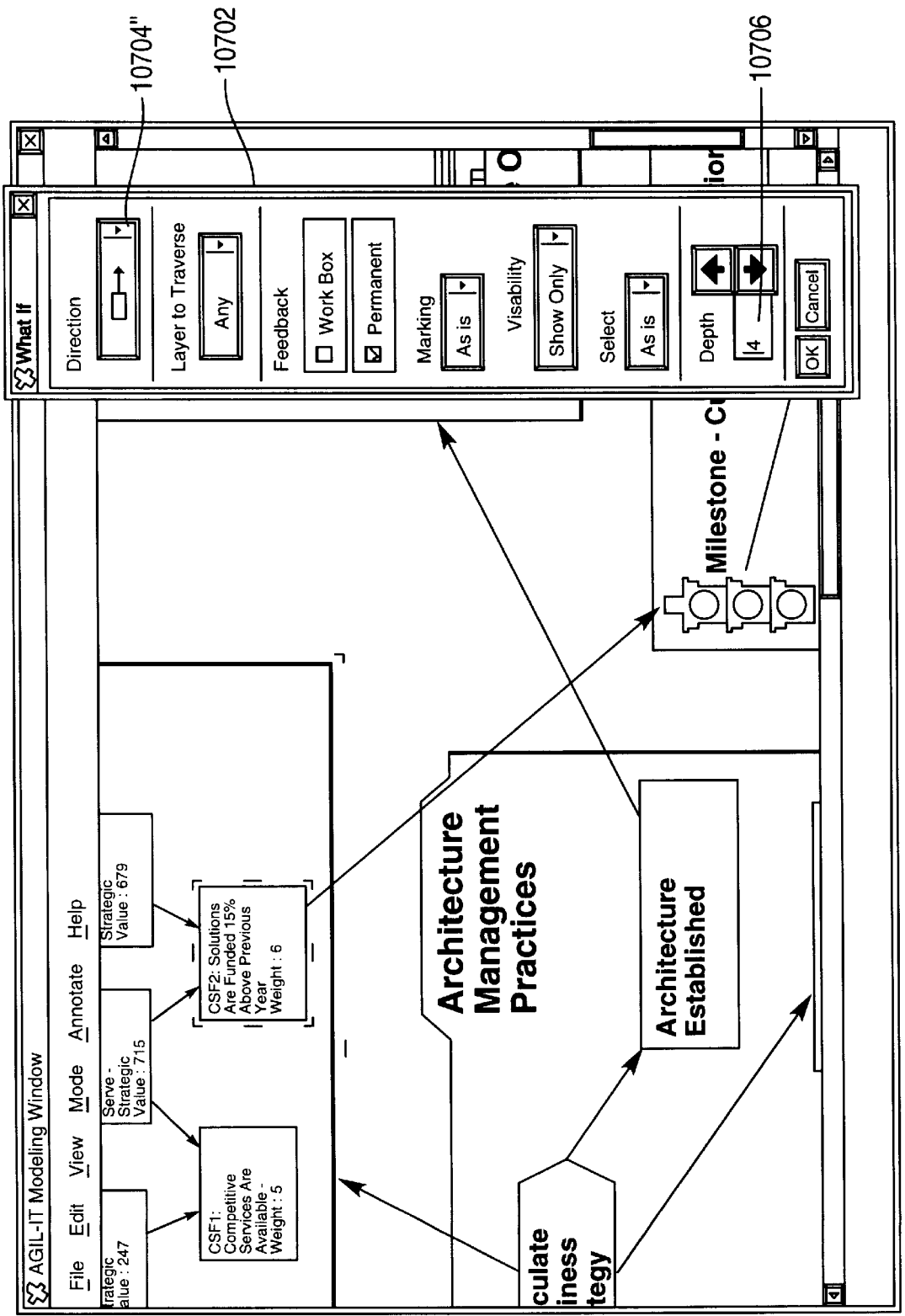
Figure 108:
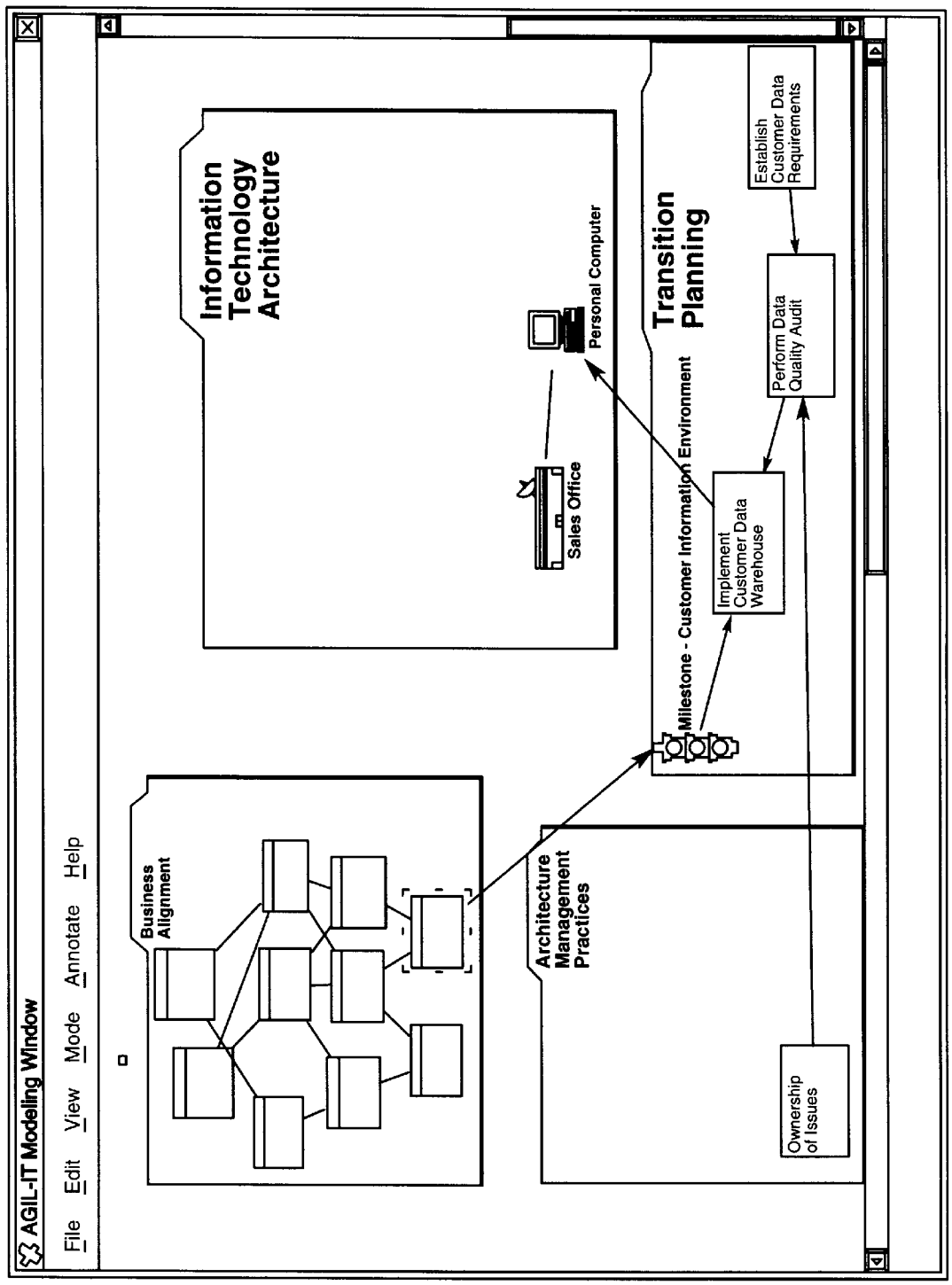
Figure 109:
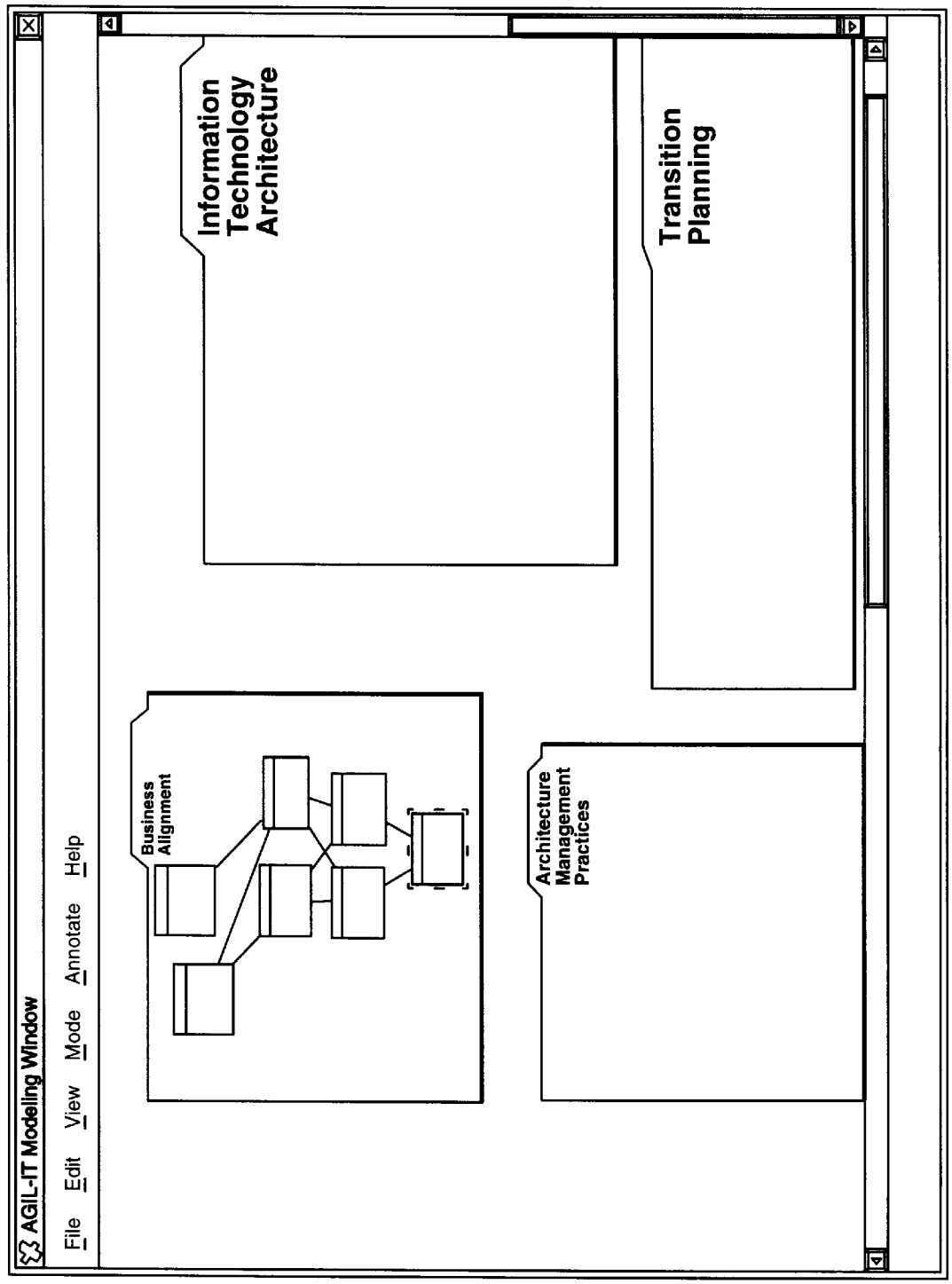
Figure 110:
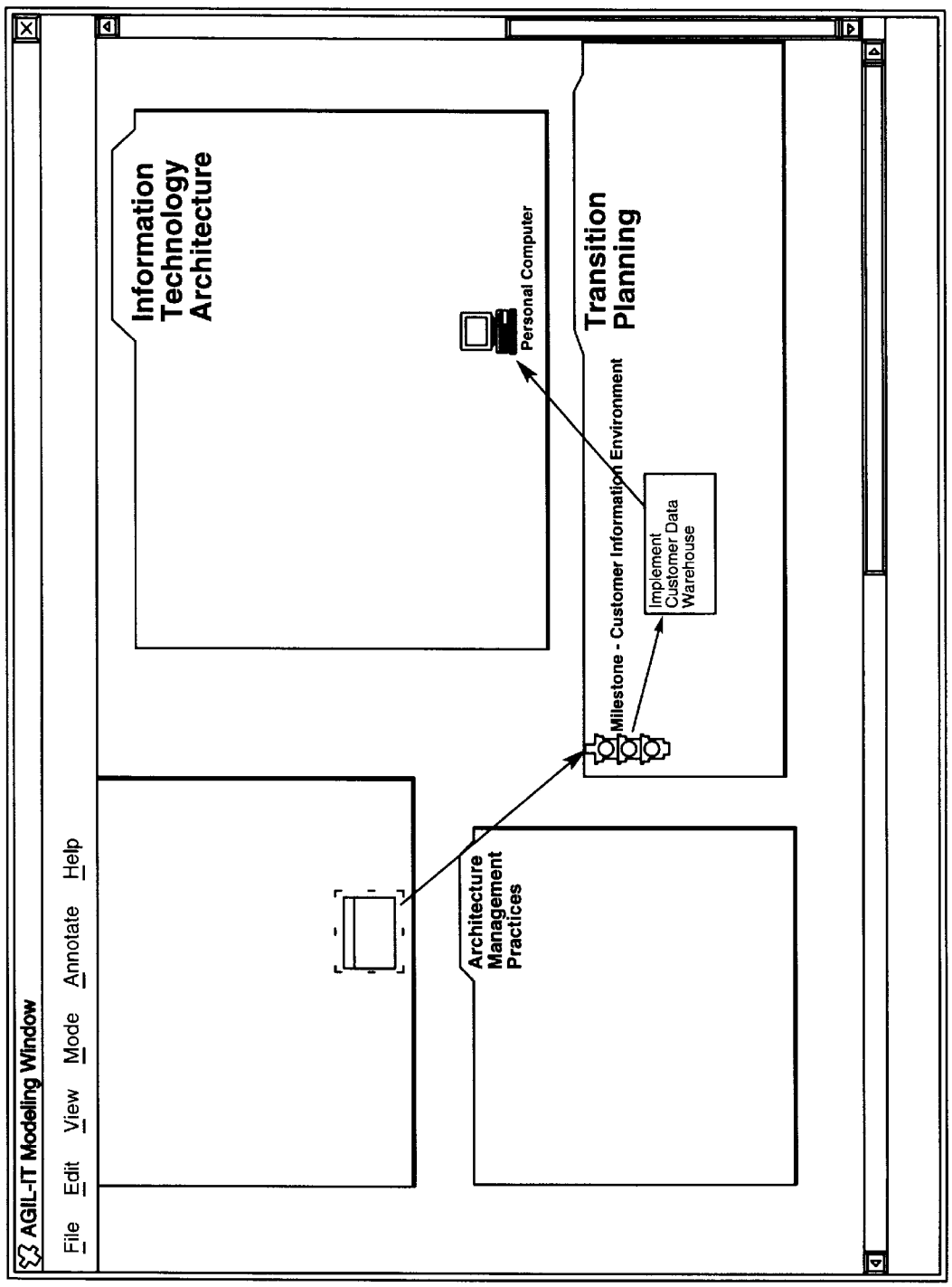

Referring to FIG. 107C, there is shown a display on a computer screen, again illustrating visual interface 10702. As shown in FIG. 107C, the value of 4 in button 10706 indicates that the search will be performed four levels up or down; and the right-side arrow in button 10704" indicate that all objects that have single output relationships with the CSF2 object within the specified levels (10706) down will be searched. By clicking OK button, the process is led to FIG. 110, which shows all the objects related to CSF2 object within four levels down as specified by the output relationship arrow selection in button 10704".

III. Changing and dynamically updating an IT (Information Technology) architecture visual model Referring to FIGS. 111A, 111B, 112 and 113, there are shown flowcharts illustrating the steps of dynamically changing and updating an IT architecture visual model, under the control of the visual modeling tool (called Agil-IT) designed by NCR Corporation, in accordance with the present invention.

Referring to FIG. 111A, there is shown a flowchart illustrating the steps of changing the parameters in an object and updating the changes in all the objects that are directly related or related via other objects and are impacted by the changes to the changed object, in accordance with the present invention.

In response to a request from a user, step 11102 makes changes to the parameters of an object in the IT architecture visual model. The parameters in the object reflect the property value of the object.

In response to the object parameter value change, step 11104 invokes the updating process in the Agil-IT visual modeling tool.

Step 11108 updates the parameters in all the objects that have relationships to and are impacted by the changed object, according to the changed parameters and the properties of the relationships as specified by the methodology.

Step 11112 further updates the parameters in all the objects that relate to and are impacted by the changed parameter value in the objects that have been updated.

Referring to FIG. 111B, there is shown a flowchart illustrating the steps of changing the parameters in a relationship and updating all the parameter values in all the objects that are impacted by and directly related or related via other objects to the changed relationship, in accordance with the present invention.

In response to a request from a user, step 11102' makes changes to the parameters of a relationship in the IT architecture visual model. The parameters in the relationship reflect the property of the relationship.

In response to the relationship parameter value change, step 11104' invokes the updating process in the Agil-IT visual modeling tool.

Step 11106 locates the object that is related at the end of the relationship.

Step 11110 updates the parameters in the located object, according to the changed parameters in the relationship.

Step 11112 updates the parameters in all the objects that relate to and are impacted by the changed parameter values in the objects that have been updated.

Referring to FIG. 112, there is shown a flowchart illustrating the detailed steps within step 11108 shown in FIG. 111A.

As shown in FIG. 112, step 11204 locates an object that relates to and is impacted by the changed parameter value of the updated object.

Step 11206 updates the parameters in the related object according to the changed parameters and the property value or characteristic of the relationship.

Step 11208 determines whether there is any other object that has a relationship with and is impacted by the changed object and has not been updated. If the decision is positive, the operation is led back to step 11204 to locate the object. If the decision is negative, the operation is led to 11111 in FIG. 111A.

Referring to FIG. 113, there is shown a flowchart illustrating the detailed steps within step 11112 shown in FIGS. 111A and 111B.

As shown in FIG. 113, step 11304 locates an object whose parameters have been updated, due to the changes the user has initiated.

Step 11306 locates an object relating to the object that has been updated and that is impacted by the updated parameter value change.

Step 11308 updates the parameters in the related and impacted object that has been located.

Step 11310 determines whether there is any other object that has a relationship with the updated object in step 11304 and whose parameters have not been updated based again upon the parameter value of the updated object. If the determination is positive, the operation is led to step 11304 to locate the object. And if the determination is negative, the operation is led to step 11312.

Step 11312 further determines whether there is any other object that has been updated and is related to and impacts at least one non-updated object. If the determination is positive, the operation is led to step 11304. And if the determination is negative, the operation is led to step 11116 shown in FIGS. 111A and 111B. This recursive process, as illustrated in FIG. 113, continues until all objects that are related to and impacted by the object or relationship change have been updated.

FIGS. 114–120 illustrate the updating process corresponding to changes of the parameter values in an object.

Figure 114:
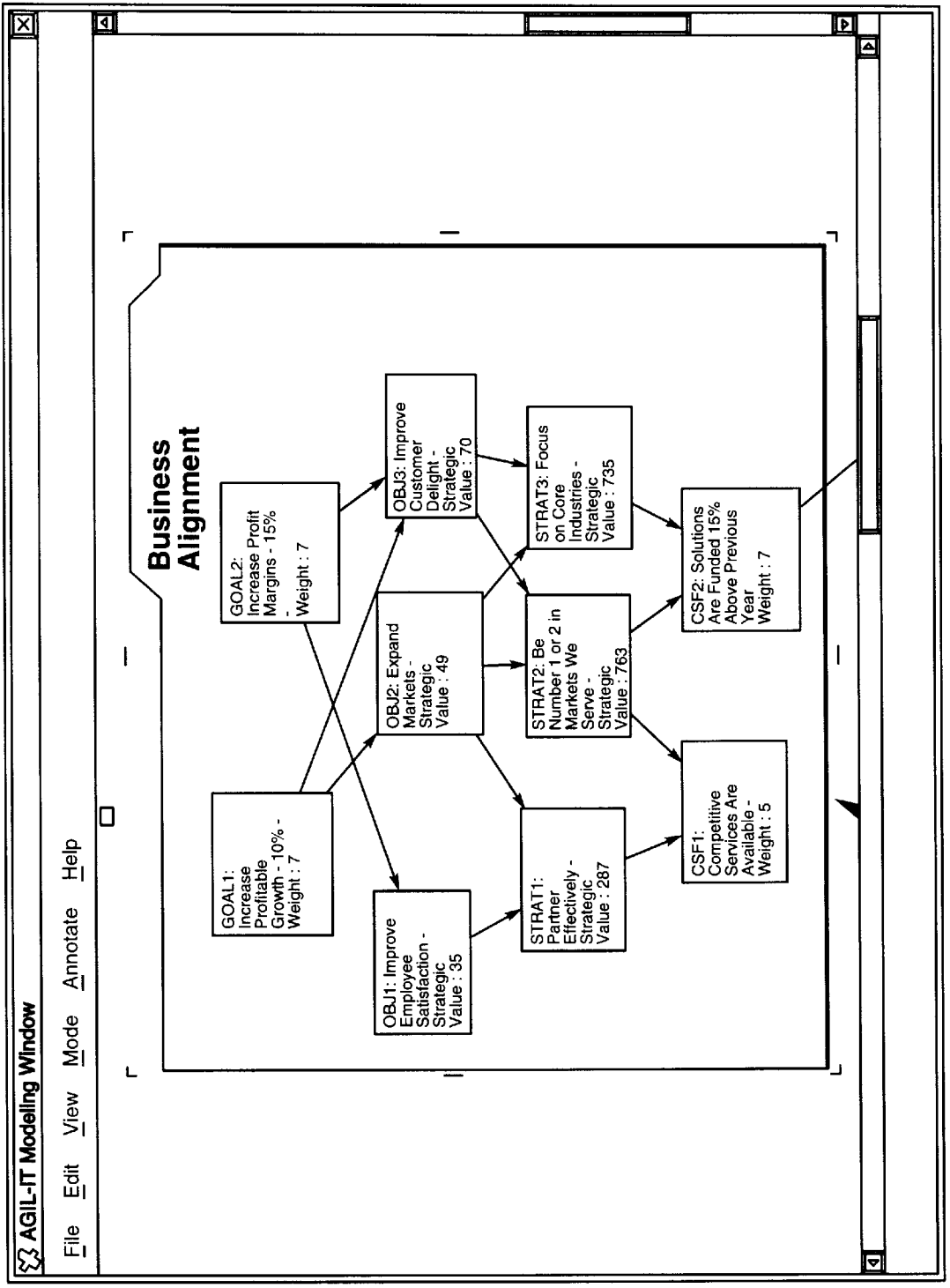

Referring to FIG. 114, there is shown a display on a computer screen, illustrating the parameter values inside the visual symbols for the objects within Business Alignment container. More specifically, GOAL1 and GOAL2 objects are both associated with a weight value of 7; OBJ1, OBJ2 and OBJ3 are associated with values 35, 49 and 70, respectively; STRAT1, STRAT2 and STRAT3 are associated with values 287, 763 and 735, respectively; CSF1 and CSF2 objects are associated with weights 5 and 7, respectively.

Figure 115:
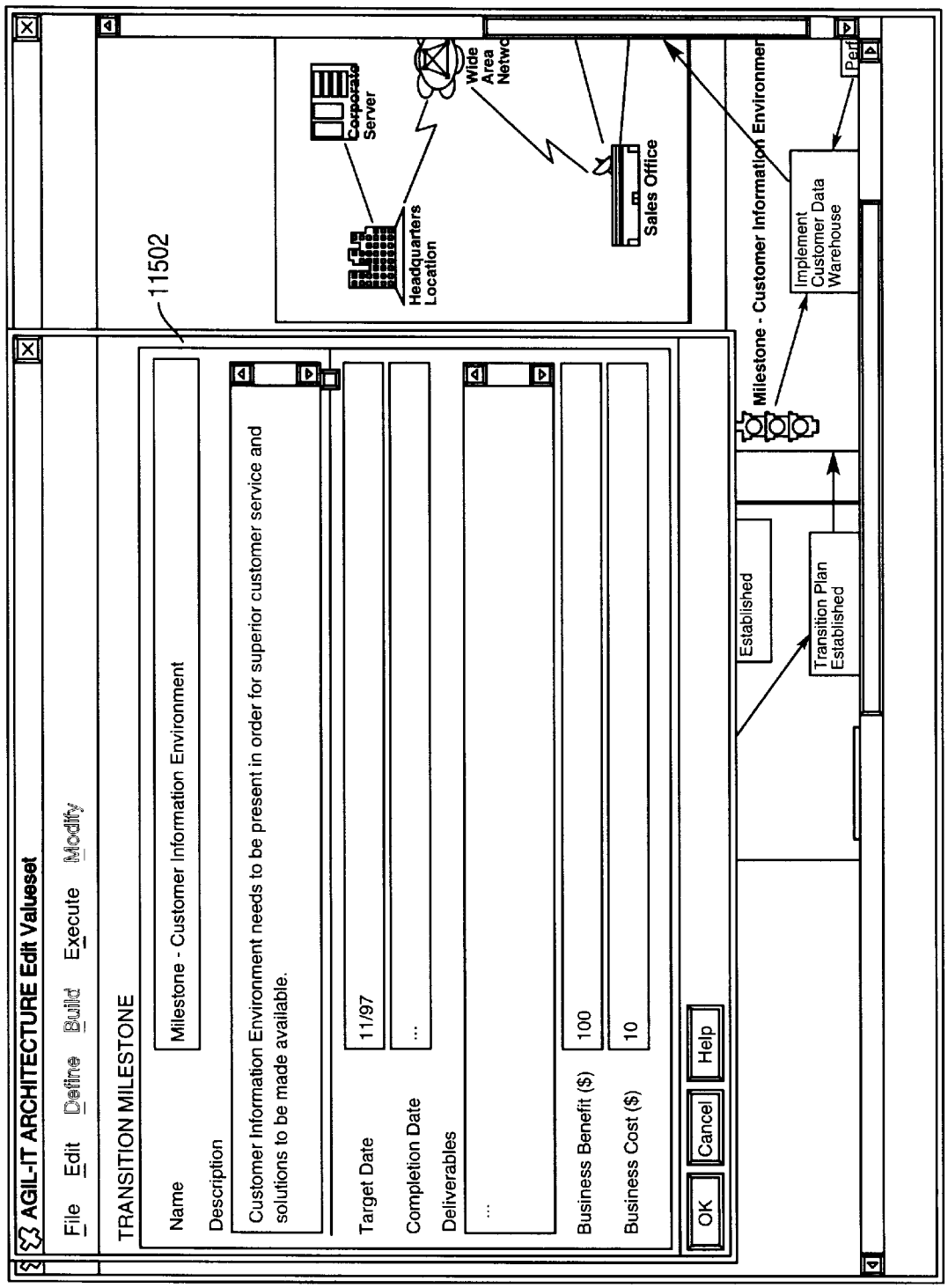

Referring to FIG. 115, there is shown a display on a computer screen, illustrating the parameter values for the Milestone object within Transition Planning container. The parameter values associated with Milestone object are displayed in information window 11502, which can be invoked by selecting and activating the visual symbol (a traffic light symbol) for the Milestone object. As shown in information interface 11502, the business benefit is $100 million and the business cost $10 million. Accordingly, the benefit to cost ratio is 10/1.

Figure 116:
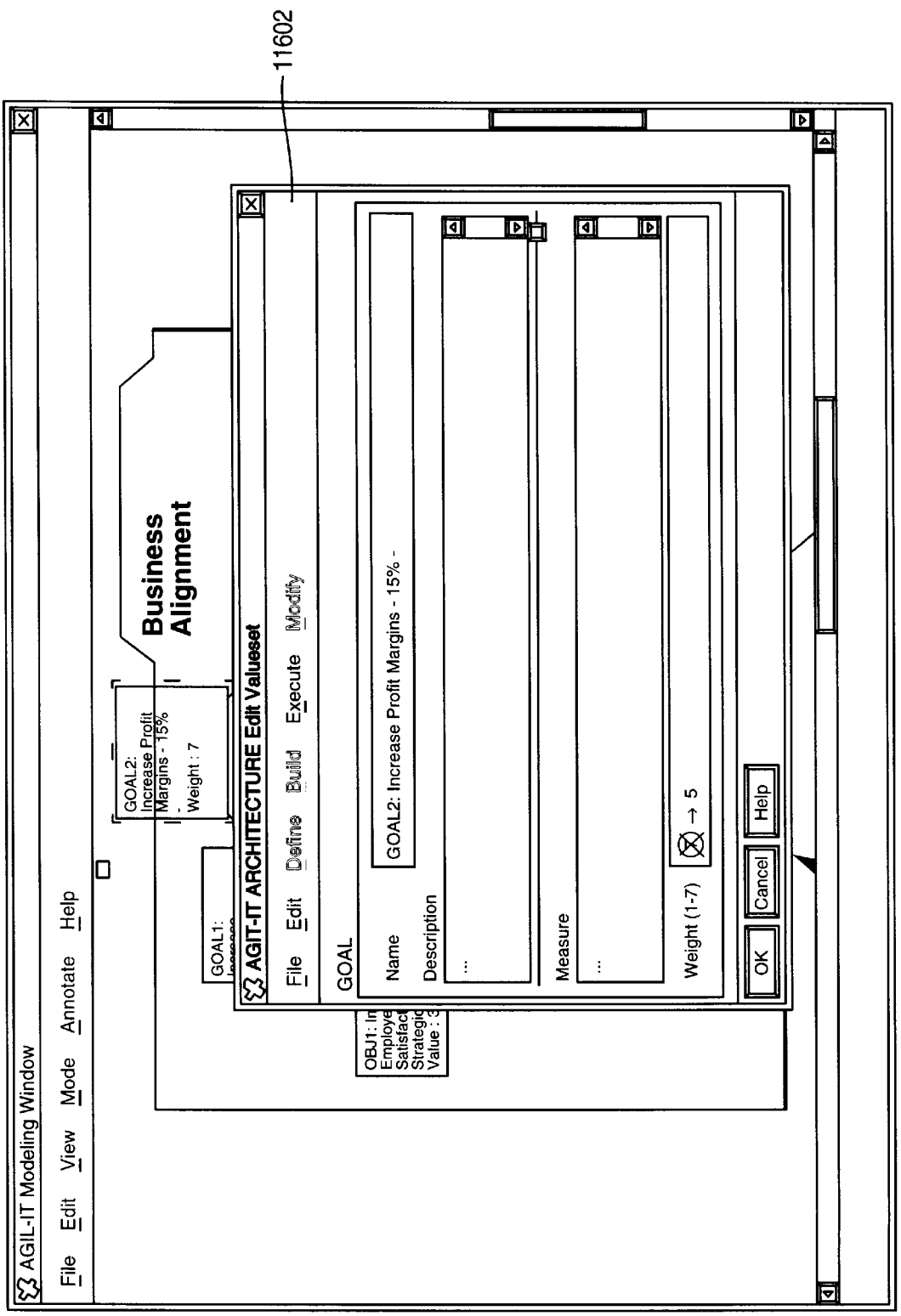

Referring to FIG. 116, there is shown a display on a computer screen, illustrating a parameter for GOAL2 object is changed. As shown in information window 11602, the weight value for GOAL2 is changed from 7 to 5. Information window 11602 can be invoked by selecting and activating the visual symbol for GOAL2 object.

Figure 117:
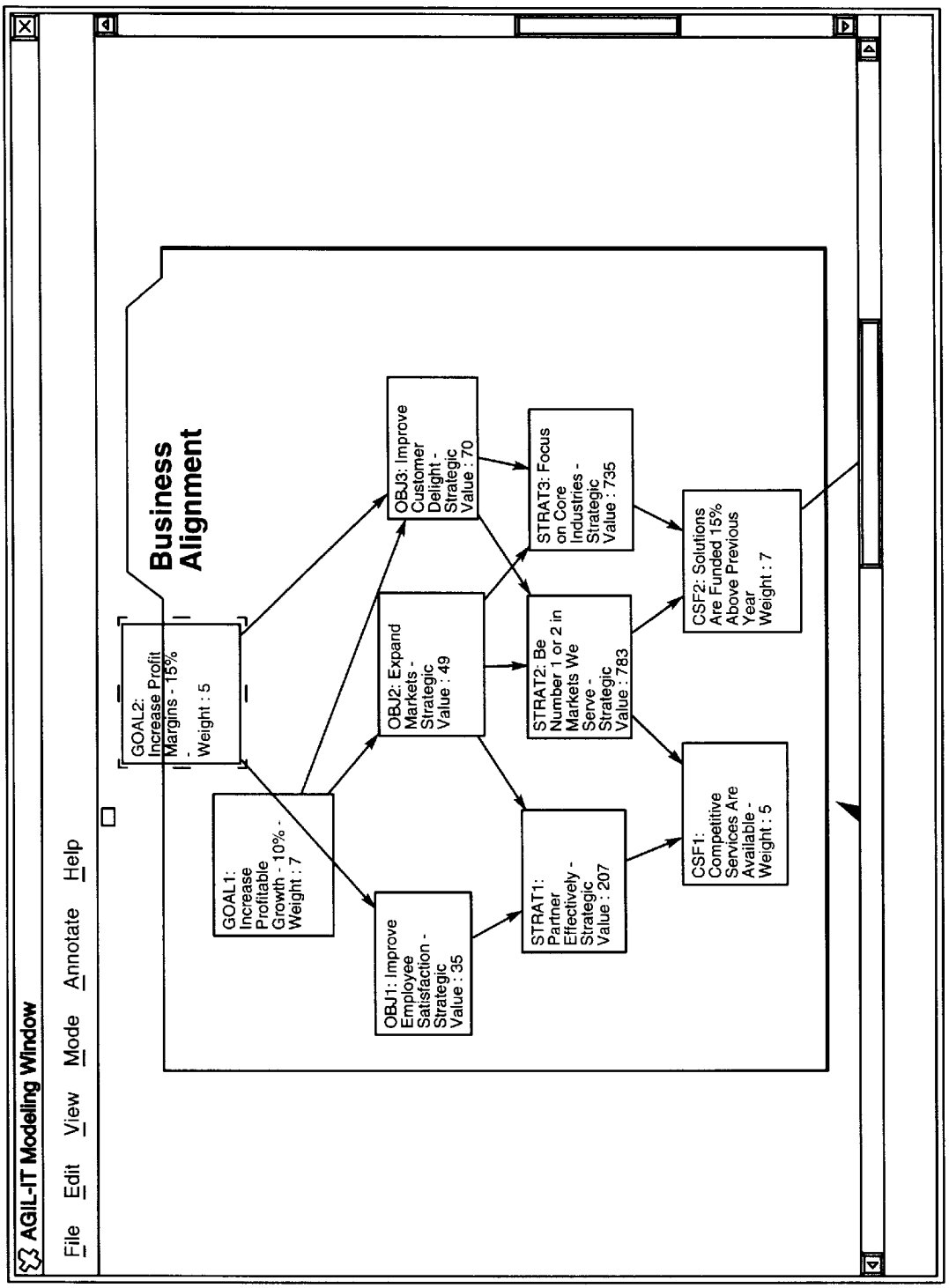

Referring to FIG. 117, there is shown a display on a computer screen, illustrating the weight parameter value change on GOAL2 object. As shown in FIG. 117, the weight parameter value inside the visual symbol for GOAL2 is changed from 7 to 5.

Figure 118:
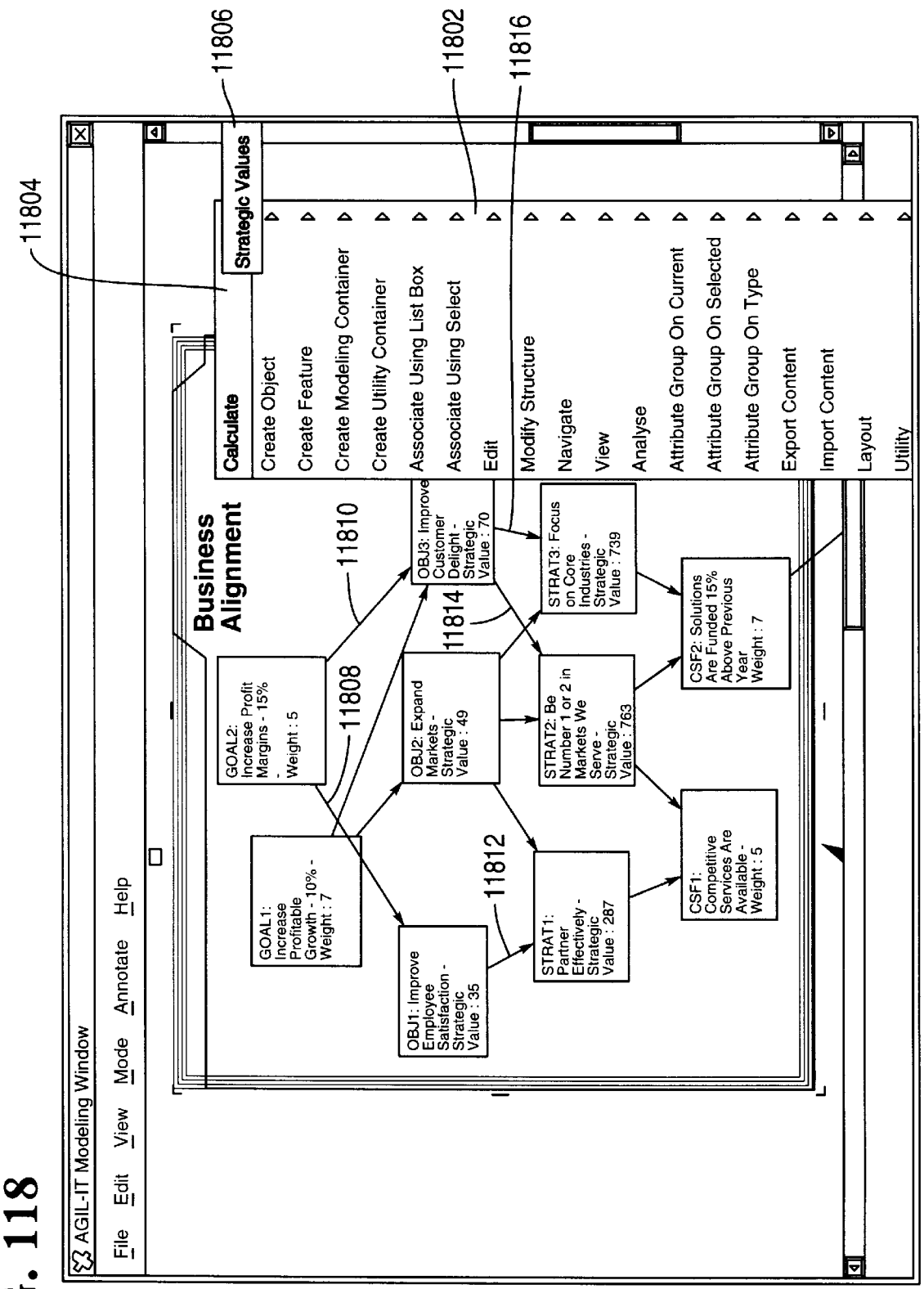

Referring to FIG. 118, there is shown a display on a computer screen, illustrating the updating process for the objects that are impacted by and directly related or related via other objects to GOAL2 object after the weight value in GOAL2 object has been changed. As shown in FIG. 118, visual interface 11802 is invoked by selecting a region within Business Alignment container (but outside the objects within the container). The updating process can be initiated by selecting and activating item 11804 (Calculate) in visual interface 11802 and then activating visual interface 11806 (Strategic Values). Visual interface 11802 is provided and controlled by the encapsulated sub-methodology associated with the Business Alignment container's software component (404 as shown in FIG. 4). Under the control of the Agil-IT visual modeling tool, the updating process first locates and updates the objects that have direct relationships with GOAL2 object (the first level updating), in the sequence of: (1) locating OBJ1 object (having a relationship 11808 with GOAL2) and updating the parameter values for OBJ1 object according to the changed weight for GOAL2 and the property value (and characteristics) of relationship 11808, and (2) locating OBJ3 (having a relationship 11810 with GOAL2) updating the parameters values for OBJ3 object according to the changed weight for GOAL2 and the property (and characteristics) of relationship 11810.

The updating process then locates and updates the objects that have direct relationships with OBJ1 or OBJ3 object (the second level updating), in the sequence of: (1) locating STRAT1 object (having a relationship 11812 with OBJ1 object) and updates the parameters for STRAT1 object according to the changed parameters for OBJ1 and the property (and characteristic) of relationship 11812, (2) locating STRAT2 object (having a relationship 11814 with OBJ3 object) and updates the parameters for STRAT2 object according to the changed parameters for OBJ3 and the property (and characteristic) of relationship 11814, and (3) locating STRAT3 object (having a relationship 11816 with OBJ3 object) and updates the parameters for STRAT3 object according to the changed parameters for OBJ3 and the property (and characteristic) of relationship 11816.

The updating process then locates and updates the objects (CSF1 and CSF2 objects) that have direct relationships with STRAT1, STRAT2 or STRAT3 object (the third level updating) according to the updated parameters for STRAT1, STRAT2 or STRAT3 object and the property (or characteristics) of one of the relationships.

The updating process then locates and updates the objects that have direct relationships with and are impacted by the updated changes to CSF1 or CSF2 object (the forth level updating) according to the updated parameter values for CSF1 or CSF2 object and the property (and characteristics) of one of the relationships.

Since CSF2 object is related to Milestone object that is located within Transition Planning container, and the Milestone object is impacted by the CSF value change, the updating process performs an inter-container search to find Milestone object and updates it. The updating process repeats at deeper level(s) until all related and impacted objects in the IT architecture visual model (shown in FIG. 7) are updated, in accordance with each architecture sub-methodology region in which these objects are contained.

Figure 119:
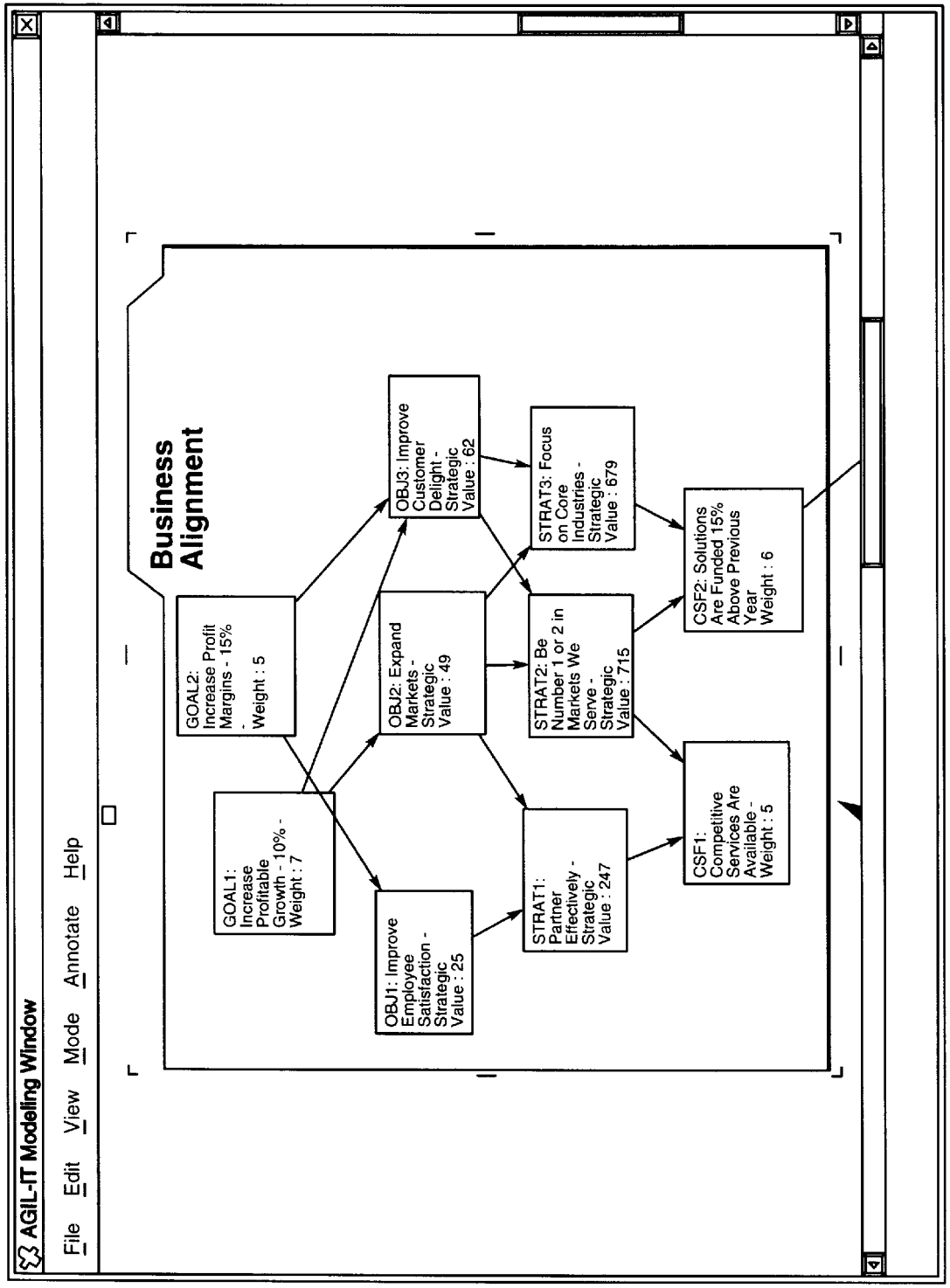

Referring to FIG. 119, there is shown a display on a computer screen, illustrating the updates of the parameter values for the objects in Business Alignment container based on the changed weight parameter value in GOAL2.

By comparing FIG. 119 with FIG. 114, it can be readily seen that the values and weights in the objects related to GOAL2 have been updated based upon the single parameter value change of GOAL2.

Figure 120:
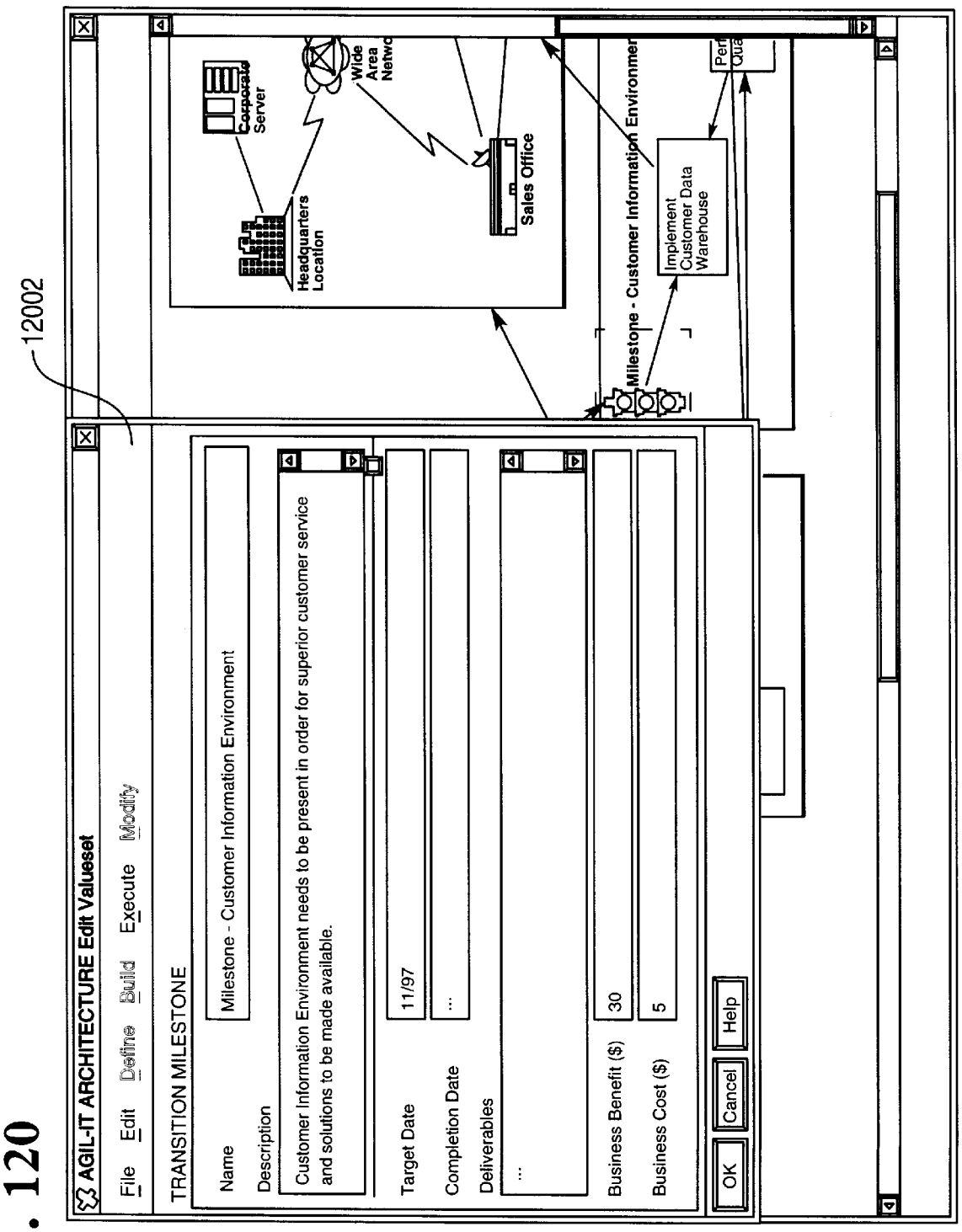

Referring to FIG. 120, there is shown a display on a computer screen, illustrating the updates of business benefit and business cost associated with Milestone object. As shown in visual information window 12002, the business benefit and business cost are $30 million and $5 million, respectively.

Comparing with the parameters shown in FIG. 115, the benefit to cost ratio is reduced from 10/1 to what is now 6/1 after the object parameter value change illustrated in FIG. 116. The updating process described in FIGS. 118–120 demonstrates both intra and inter-sub-region/sub-methodology processing performed within the Agil-IT visual modeling tool. The updating of objects within the Business Alignment container exemplifies intra-sub-region/sub-methodology processing and the updating of the Milestone object as shown in FIG. 120 exemplifies the inter-sub-region/sub-methodology processing controlled by the software components and control program previously described in FIGS. 4, 68A, and 68B.

Figure 121:
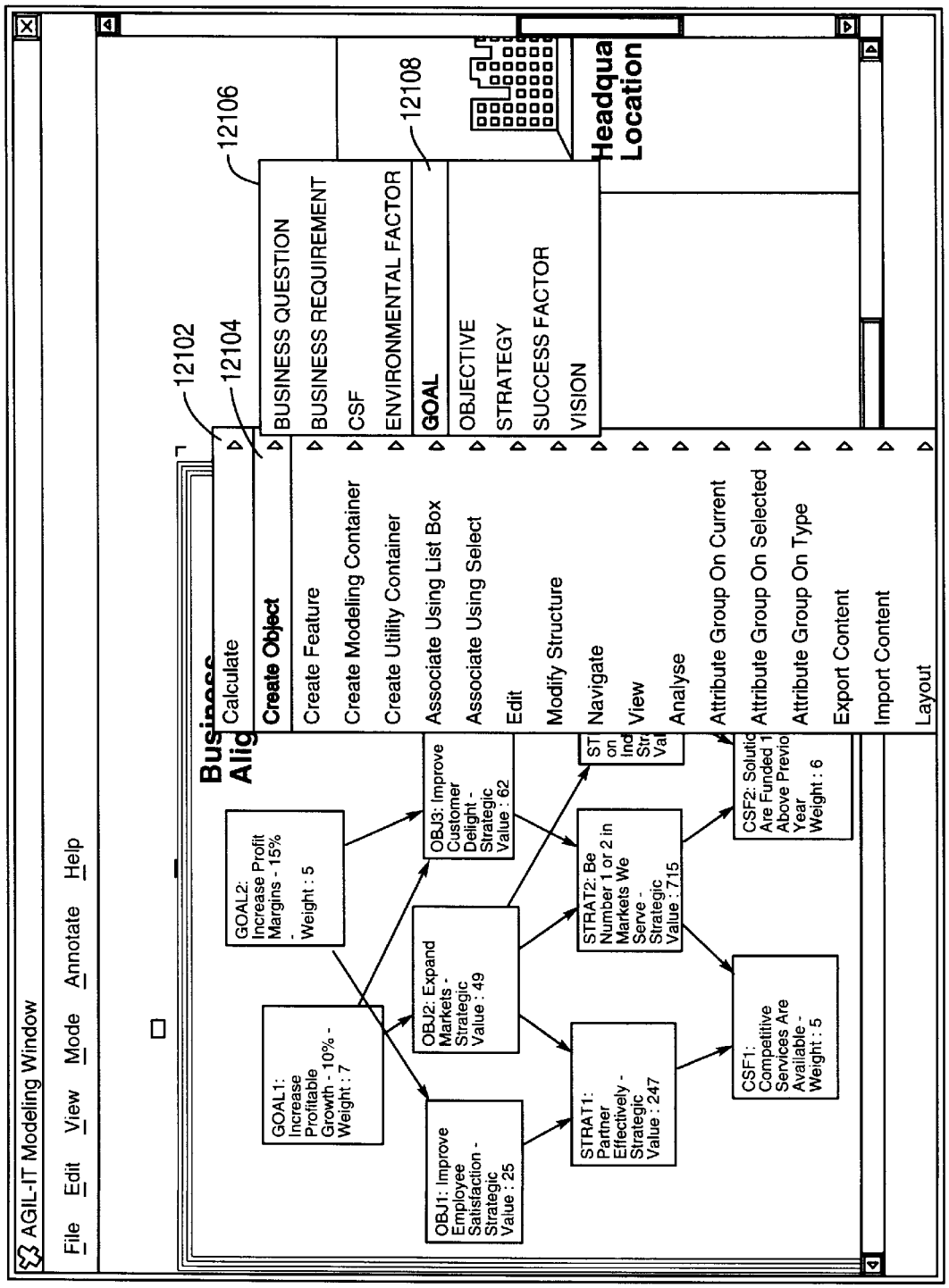

FIGS. 121–128 illustrate the updating process corresponding to adding an object. Referring to FIG. 121, there is shown a display on a computer screen, illustrating visual interfaces 12102 and 12106 for creating a new goal type of object. Visual interface 12102 is invoked by clicking a region within Business Alignment container (but outside of the objects and relationships in the container), and visual interface 12106 is invoked by selecting and activating item 12104 (Create Object) located within visual interface 12102. By selecting and activating item 12108 (GOAL) located within visual interface 12106, the operation is led to FIG. 122.

Figure 122:
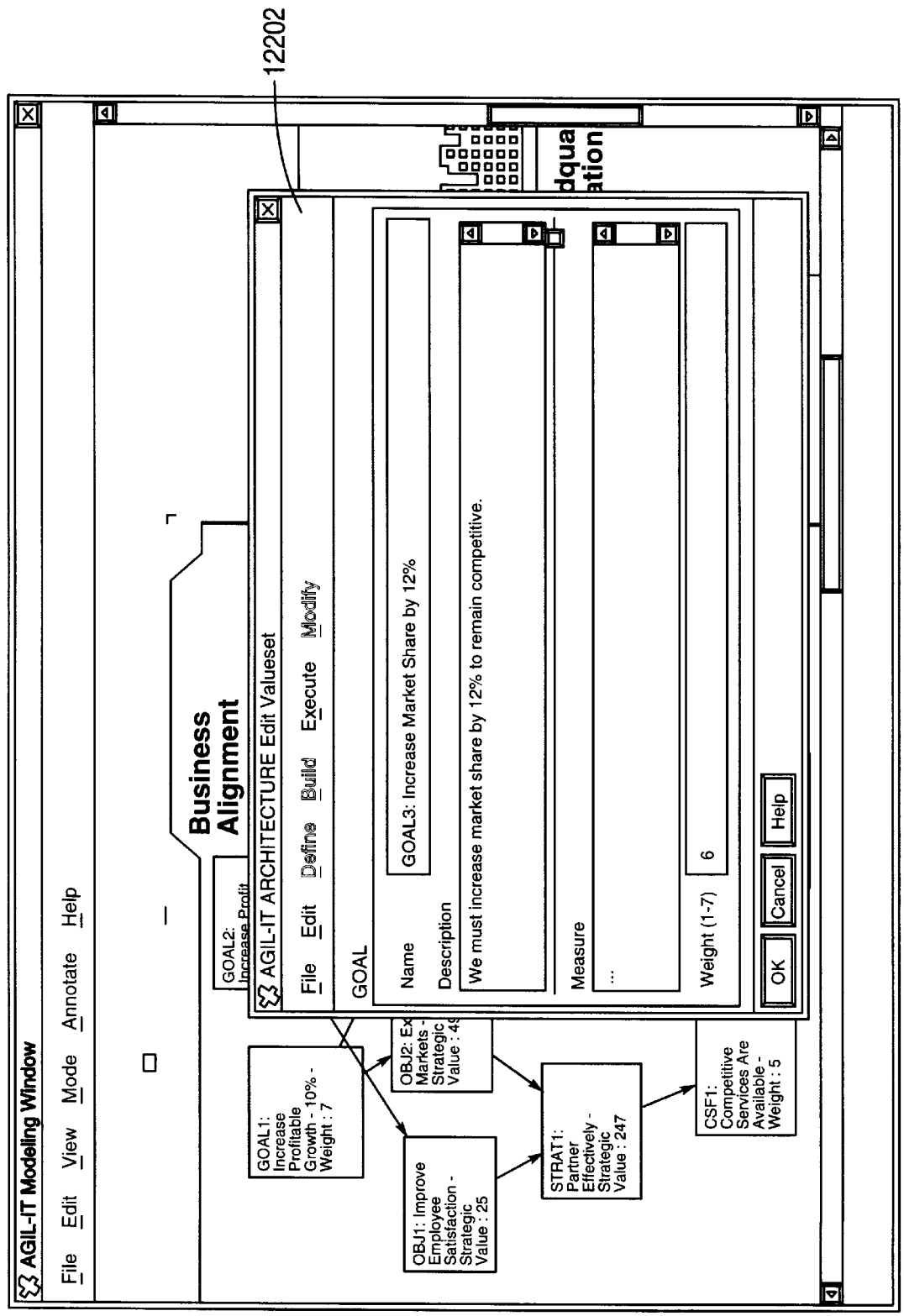

Referring to FIG. 122, there is shown a display on a computer screen, illustrating information window 12202 for entering name and weight value of a goal type of object. As shown in FIG. 122, the name of the object is GOAL3, and the weight value of the object is 6.

Figure 123:
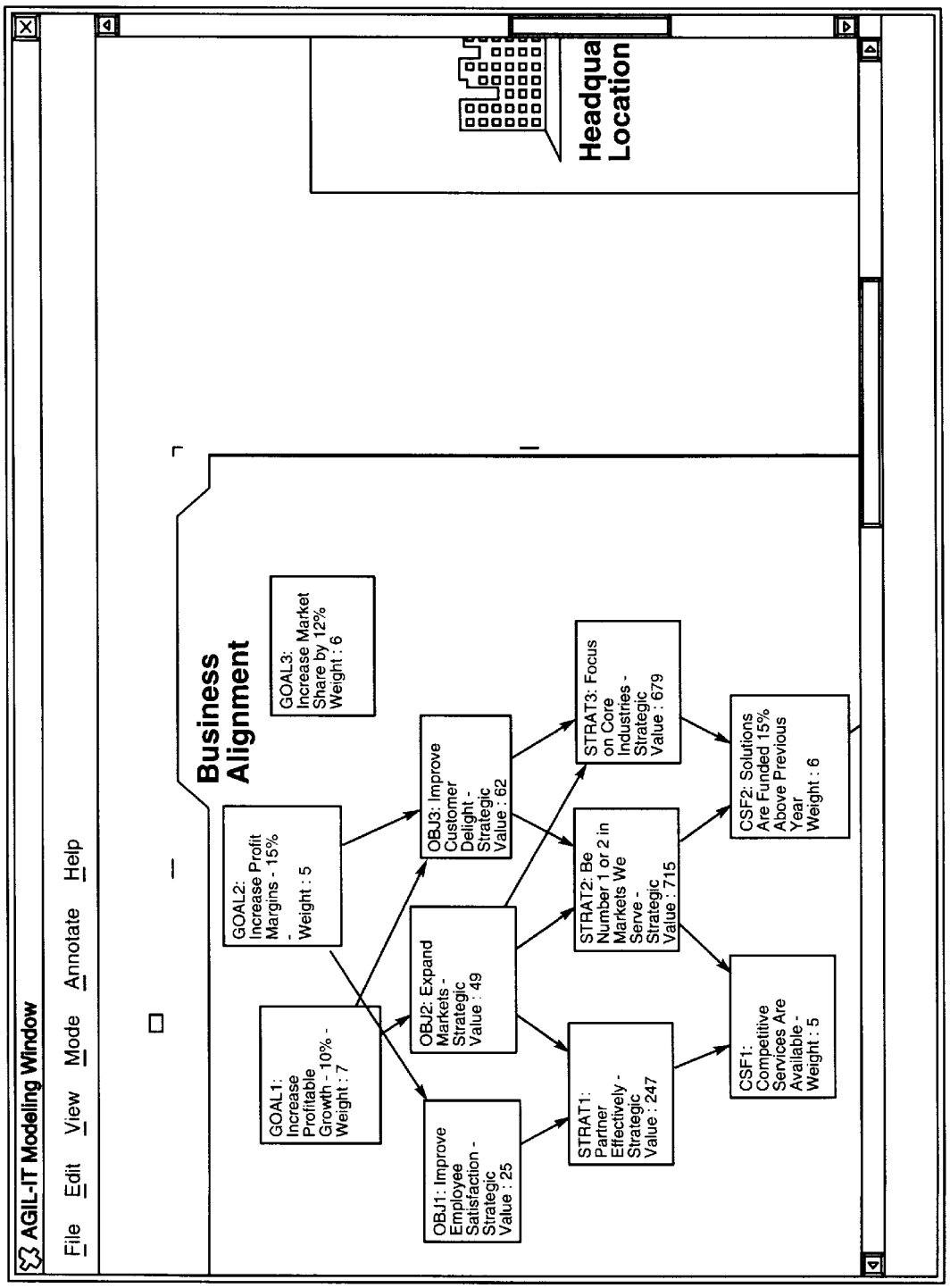

Referring to FIG. 123, there is shown a display on a computer screen, illustrating that a visual symbol is created for GOAL3 object within Business Alignment container.

Figure 124:
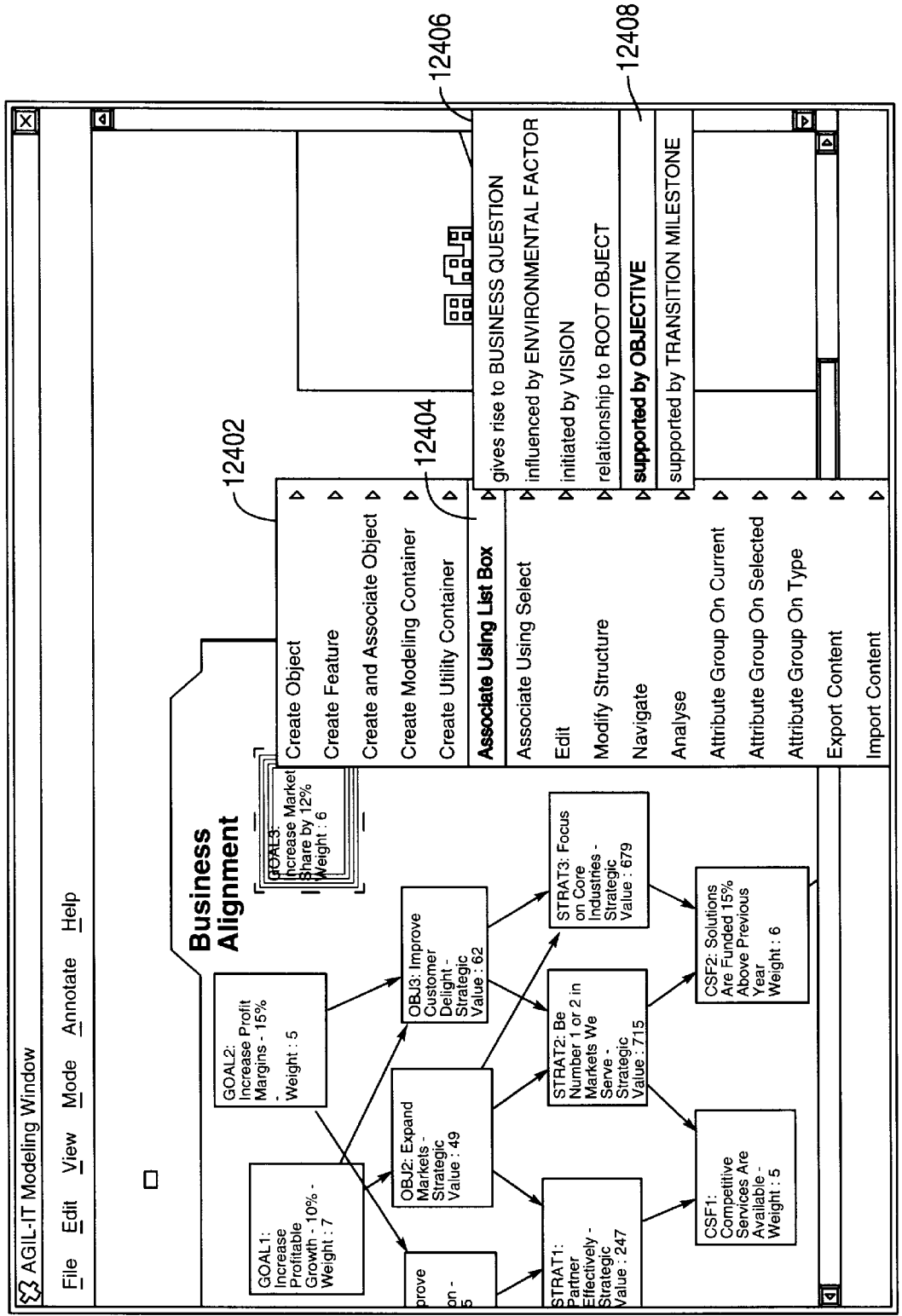

Referring to FIG. 124, there is shown a display on a computer screen, illustrating visual interfaces 12402 and 12406 for creating a new relationship for GOAL3 object. Visual interface 12402 is invoked by clicking a region within GOAL3, and visual interface 12406 is invoked by selecting and activating item 12404 (Associate Using List Box) located within visual interface 12402. Visual interface 12406 specifies six other types of objects and relationships that GOAL3 can be related to. By selecting and activating item 12408 (supported by OBJECTIVE) located within visual interface 12406, the operation is led to FIG. 125.

Figure 125:
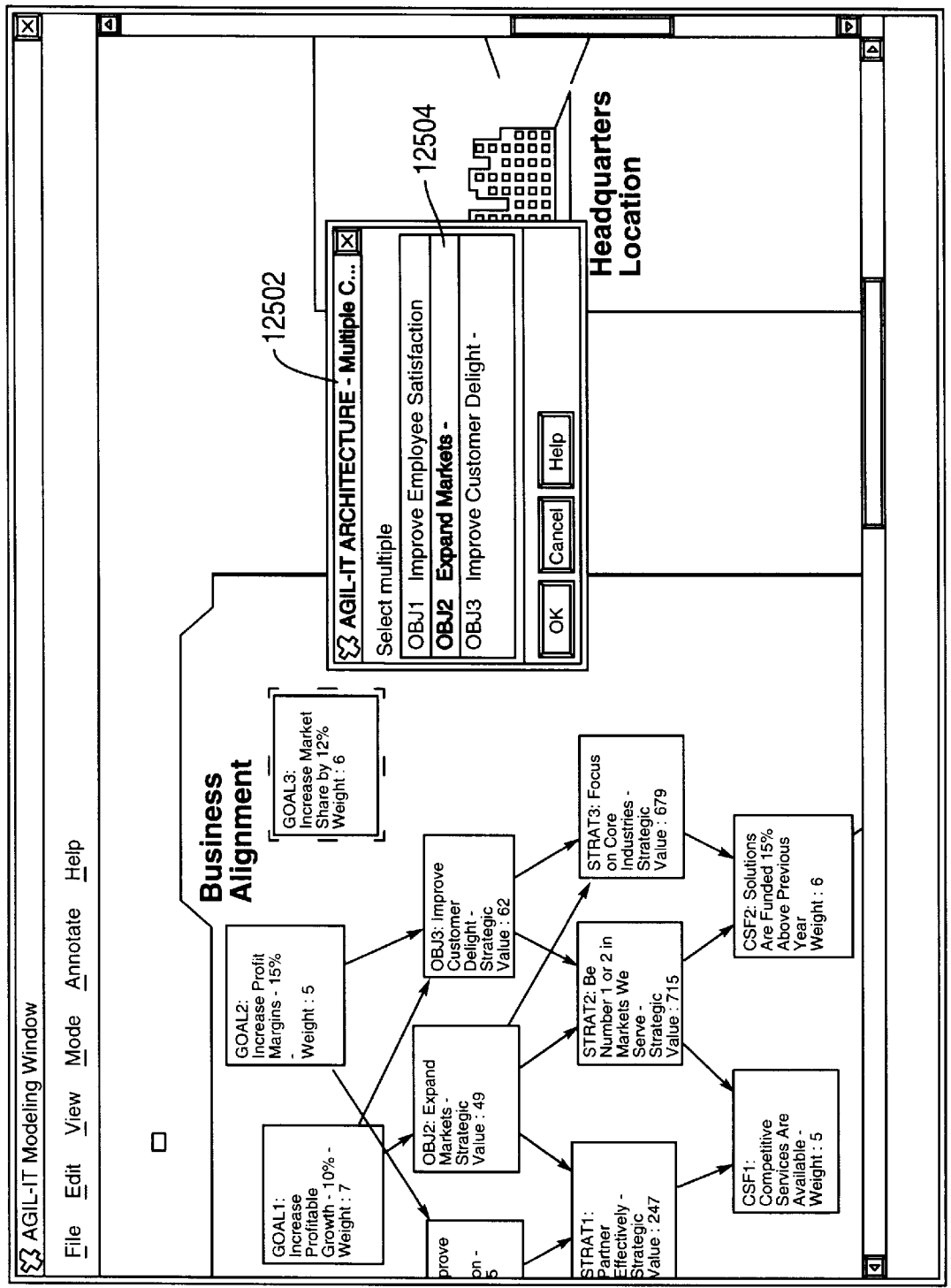

Referring to FIG. 125, there is shown a display on a computer screen, illustrating visual interface 12502. Since there are three OBJECTIVE type objects in the Business Alignment container, visual interface 12502 displays three objects, namely OBJ1, OBJ2 and OBJ3 objects. By selecting and activating item 12504 (OBJ2), the operation is led to FIG. 126.

Figure 126:
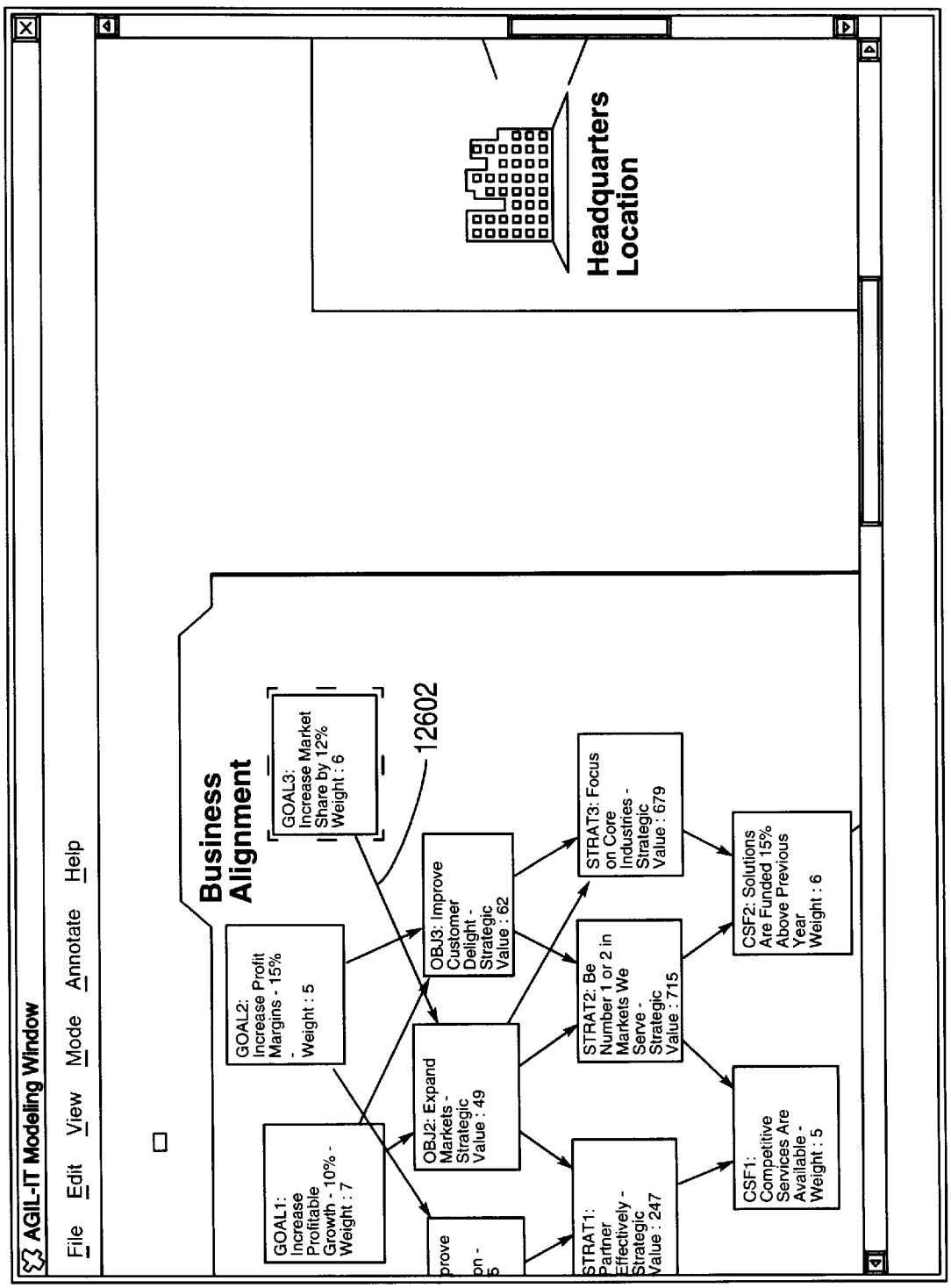
Figure 132:
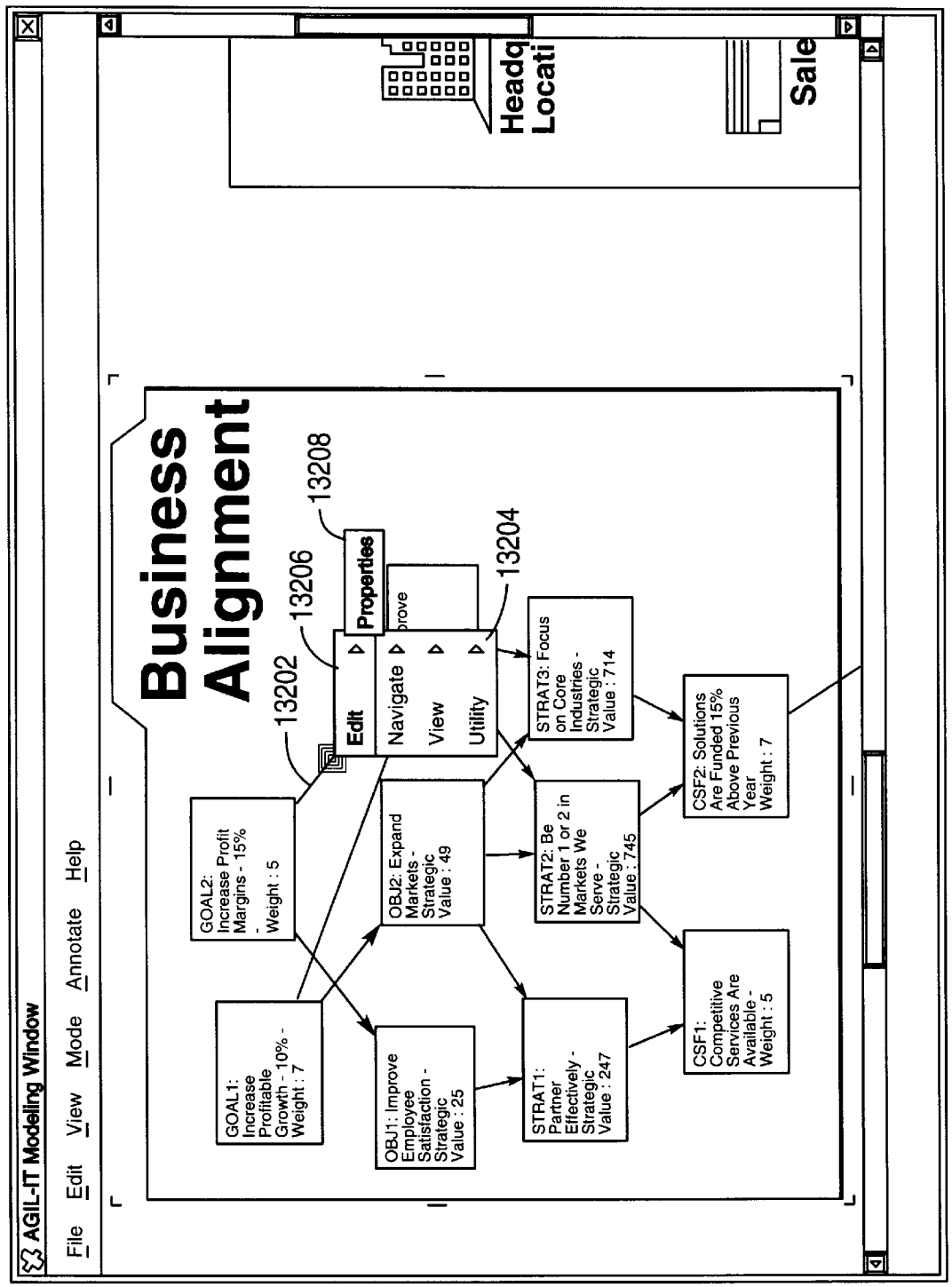
Figure 133:
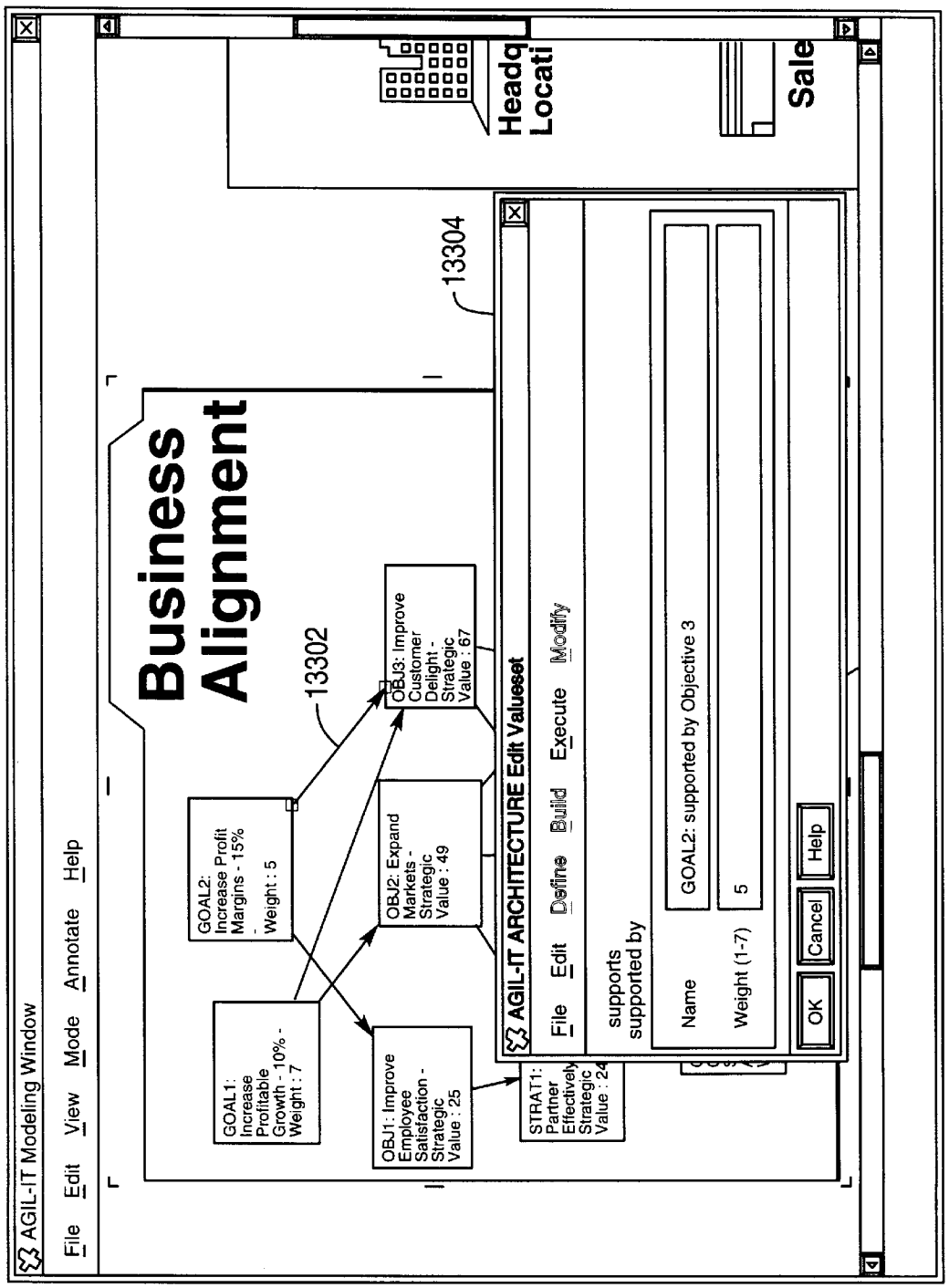

Referring to FIG. 126, there is shown a display on a computer screen, illustrating that a relationship has been established between GOAL3 and OBJ2 object. The parameter value of the relationship (12602) between GOAL3 and OBJ2 is established in a manner similar to that as shown in FIGS. 132 and 133 and is described below.

Figure 127:
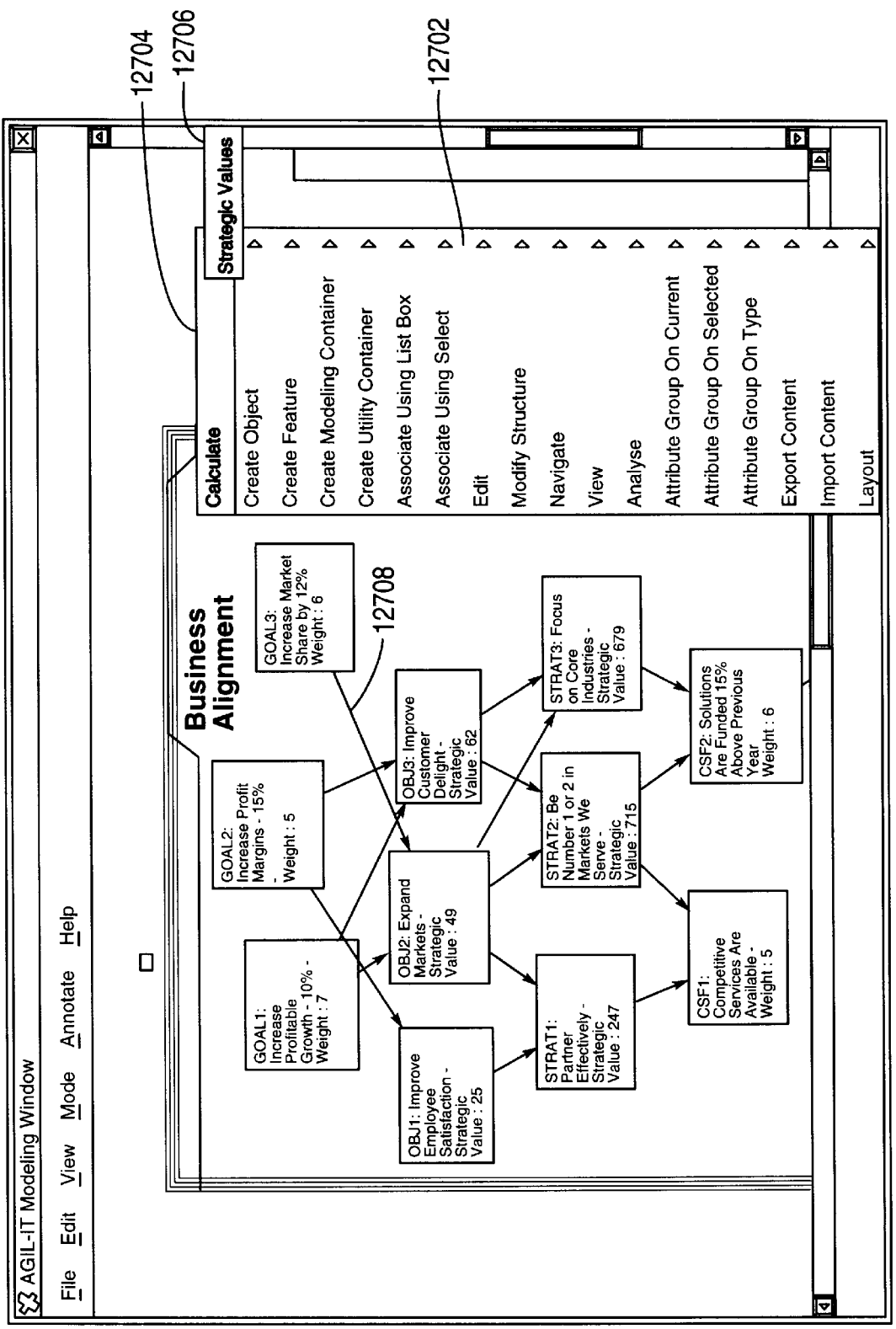

Referring to FIG. 127, there is shown a display on a computer screen, illustrating the updating process for the objects that are impacted by the change to and are directly related or related via other objects to GOAL3 object after it has been added. As shown in FIG. 127, visual interface 12702 is invoked by selecting a region within Business Alignment container (but outside the objects within the container). The updating process can be initiated by selecting and activating item 12704 (Calculate) in visual interface 12702 and then activating visual interface 12706 (Strategic Values). Under the control of the Agil-IT visual modeling tool, the updating process first locates and updates OBJ2 object that has a relationship 12708 with and is impacted by the added GOAL3 object (the first level updating).

The updating process then locates and updates STRAT1, STRAT2, and STRAT3 objects that have direct relationships with and are impacted by the updated OBJ3 object (the second level updating).

In the similar fashion as described in connection with FIG. 9, the updating process of FIG. 127 performs updating at deeper levels until all related and impacted objects in the IT visual model (shown in FIG. 7) are updated.

Figure 128:
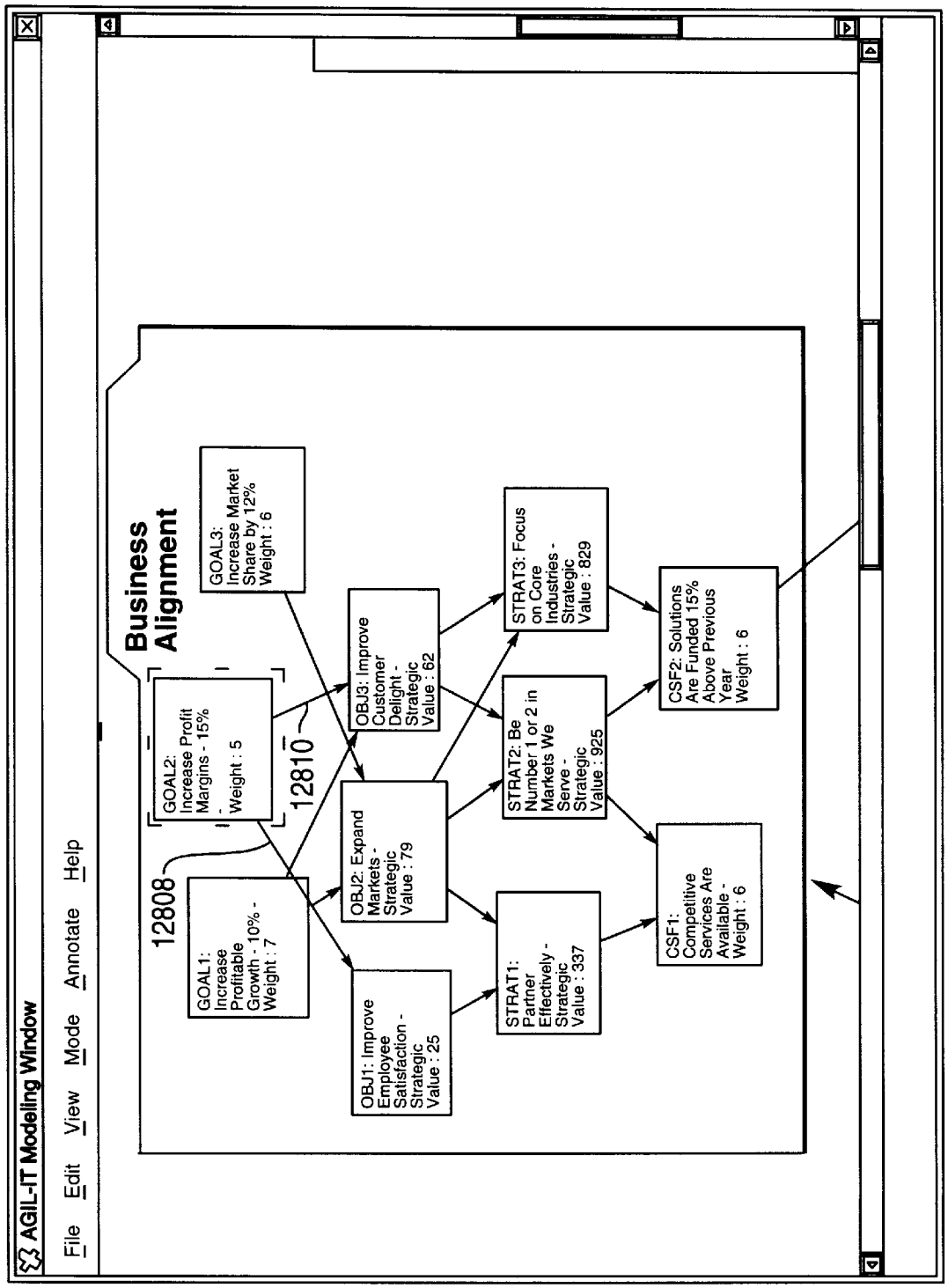

Referring to FIG. 128, there is shown a display on a computer screen, illustrating the updated parameter values for the objects in the Business Alignment container based on the added OBJ3 object. By comparing FIG. 128 with FIG. 126, it can be readily seen that the values and weights in the objects related to GOAL3 have been updated, and the parameter values of the objects related to and impacted by these updated objects are also changed within the IT architecture visual model.

FIGS. 129–131 illustrate the updating process corresponding to deleting an object.

Referring to FIG. 129, there is shown a display on a computer screen, illustrating that the GOAL2 object and its relationships have been deleted. A user can delete GOAL2 object and its relationships by first selecting it (as shown in FIG. 128) and then simultaneously pressing "Control" and "D" keys on the computer that is running the Agil-IT visual modeling tool.

Referring to FIG. 130, there is shown a display on a computer screen, illustrating the updating process for the objects that are directly related or related via other objects to GOAL2 object after it has been deleted. The updating process of FIG. 130 is initiated by using visual interface 13004 and 13006 in a similar fashion as described in connection with FIG. 118. The updating process first locates and updates the objects that originally had direct relationships with GOAL2 object before its deletion (the first level updating), in the sequence of: (1) locating OBJ1 object (having a relationship 12808 with GOAL2 in FIG. 128) and updating the parameter values for OBJ1 object according to the changed weight for GOAL2 and the property (or characteristic) of relationship 12808, and (2) locating OBJ3 (having a relationship 12810 with GOAL2 in FIG. 128) updating the parameters for OBJ3 object according to the changed weight for GOAL2 and the property (or characteristic) of relationship 12810. Since GOAL2 has been deleted, its weight value and relationship value are both zero (0) with respect to the previously related OBJ1 and OBJ3 objects (as shown in FIG. 128). This zero weight value will be used when performing the parameter value updates of the OBJ1 and OBJ3 objects.

In the similar fashion as described in connection with FIG. 118, the updating process of FIG. 130 performs updating at deeper levels until all related and impacted objects in the IT visual model (shown in FIG. 7) are updated.

Referring to FIG. 131, there is shown a display on a computer screen, illustrating the updates of the parameter values for the objects in Business Alignment container based on the deletion of GOAL2. By comparing FIG. 131 with FIG. 130, it can be readily seen that the values and weights in the objects related to and impacted by the deletion of GOAL2 have been updated and the parameter values of objects related to and impacted by these updated objects are also changed within the visual model.

FIGS. 132–136 illustrate the updating process corresponding to changes of the parameter values in a relationship.

Referring to FIG. 132, there is shown a display on a computer screen, illustrating visual interfaces 13204 and 13208 which can be used to invoke a information window for a relationship. As shown in FIG. 132, visual interface 13204 is invoked by selecting and activating the relationship line symbol 13202 (representing a relationship between GOAL2 and OBJ3 objects), and visual interface 13208 (Properties) is invoked by selecting and activating item 13206 (Edit). The operation is led to FIG. 133 by selecting and activating item 13208.

Referring to FIG. 133, there is shown a display on a computer screen, illustrating information window 13304. As shown in FIG. 133, information window 13304 contains a weight value of 5. The weight parameter value here indicates the strength of the relationship between the GOAL2 and OBJ3 objects (13302).

Figure 134:
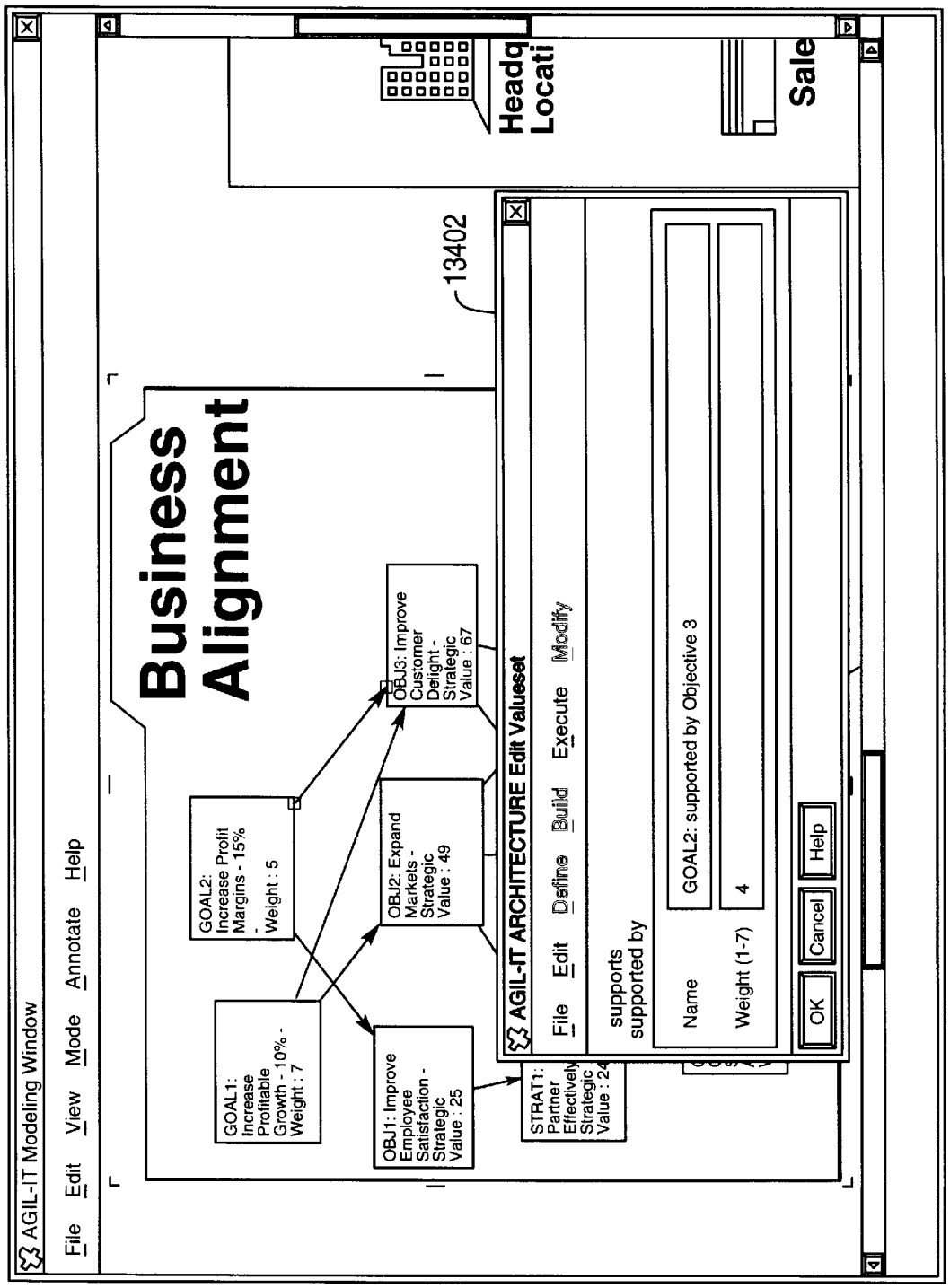

Referring to FIG. 134, there is shown a display on a computer screen, illustrating information window 13402. As shown in information window 13402, the weight value in information window 13304 (as shown in FIG. 133) has been changed from 5 to 4.

Figure 135:
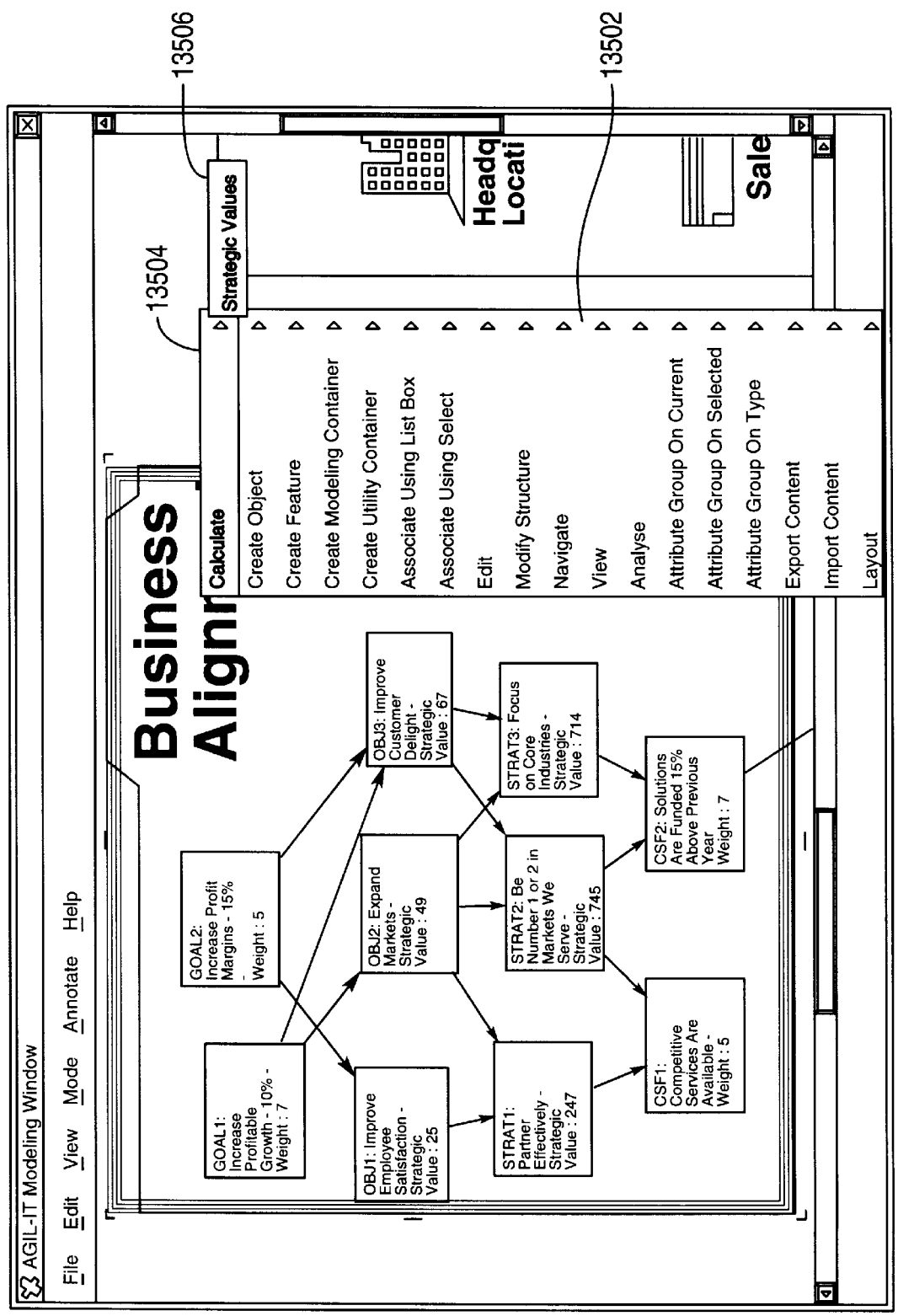

Referring to FIG. 135, there is shown a display on a computer screen, illustrating the updating process after the weight value in relationship 13302 (see FIG. 133) has been changed. It should be noted that the visual symbol for relationship 13302 has an arrow from GOAL2 to OBJ3. This means that GOAL2 is fulfilled or supported by achieving OBJ3. The updating process of FIG. 135 is initiated by using visual interface 13504 and 13506 in a similar fashion as described in connection with FIG. 118. The updating process first locates and updates OBJ3 object due to its relationship (13302) with GOAL2.

In the similar fashion as described in connection with FIG. 118, the updating process of FIG. 135 performs updating at deeper levels until all objects related to and impacted by the parameter value change to OBJ3 in the IT visual model (shown in FIG. 7) are updated.

Figure 136:
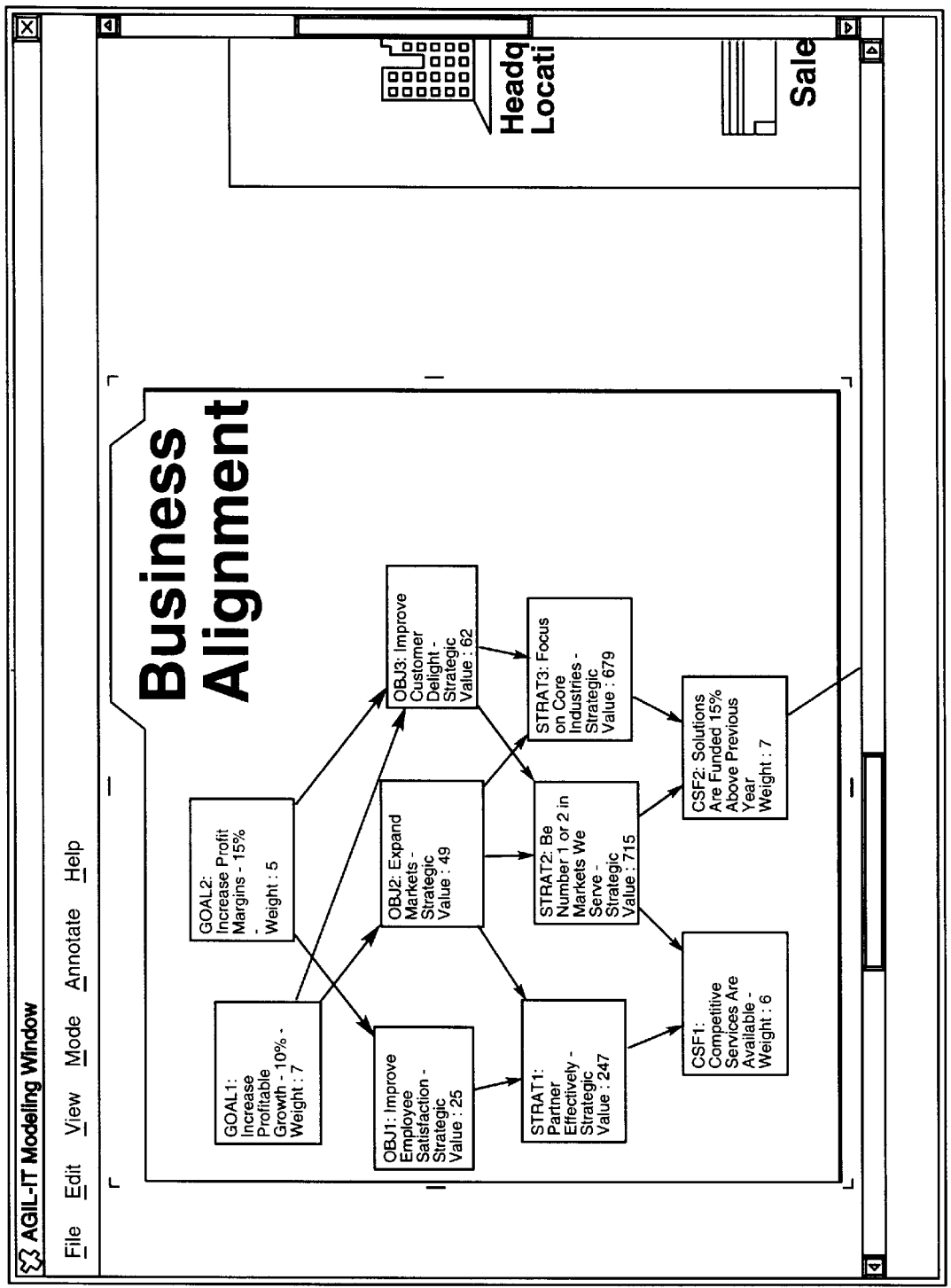

Referring to FIG. 136, there is shown a display on a computer screen, illustrating the updates of the parameters for the objects in Business Alignment container based on the weight value change of relationship 13304 (see FIG. 133). By comparing FIG. 136 with FIG. 133, it can be readily seen that the values and weights in the objects effected by relationship 13302 have been updated and the parameter values of objects related to and impacted by these updated objects are also changed within the visual model.

FIGS. 137–142 illustrate the updating process corresponding to adding a relationship between two objects.

Figure 137:
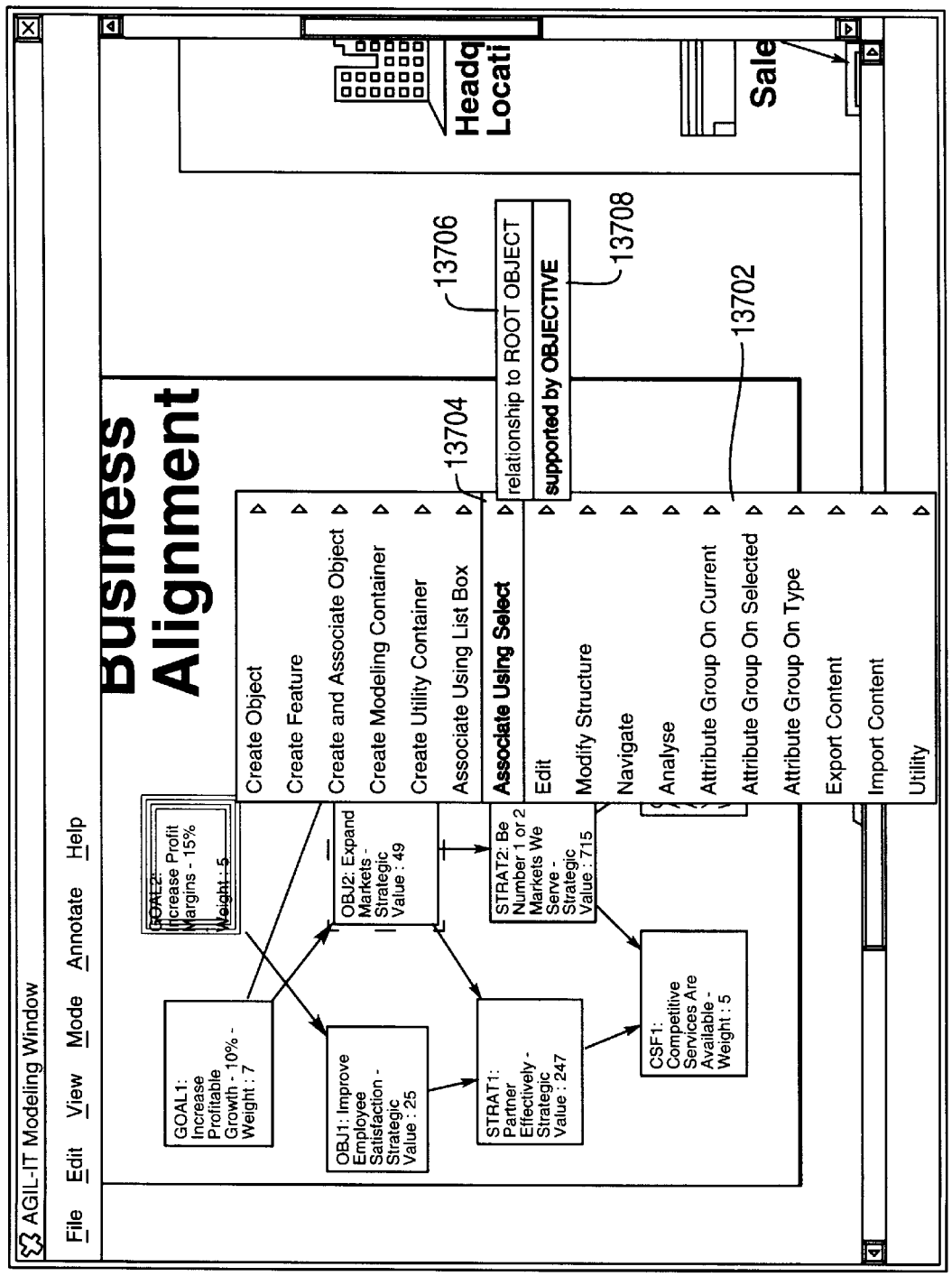

Referring to FIG. 137, there is shown a display on a computer screen, illustrating visual interfaces 13702 and 13706 for adding a new relationship between GOAL2 and OBJ2 objects. Visual interface 13702 is invoked by clicking on GOAL2, and visual interface 13706 is invoked by selecting and activating item 13704 (Associate Using Select) located within visual interface 13702. By selecting and activating item 13708 (supported by OBJECTIVE) located within visual interface 13706, the operation performed establishes a relationship line symbol between GOAL2 and OBJ2, which was the object selected for establishing a relationship from GOAL2. The result of this operation is leads to FIG. 138.

Figure 138:
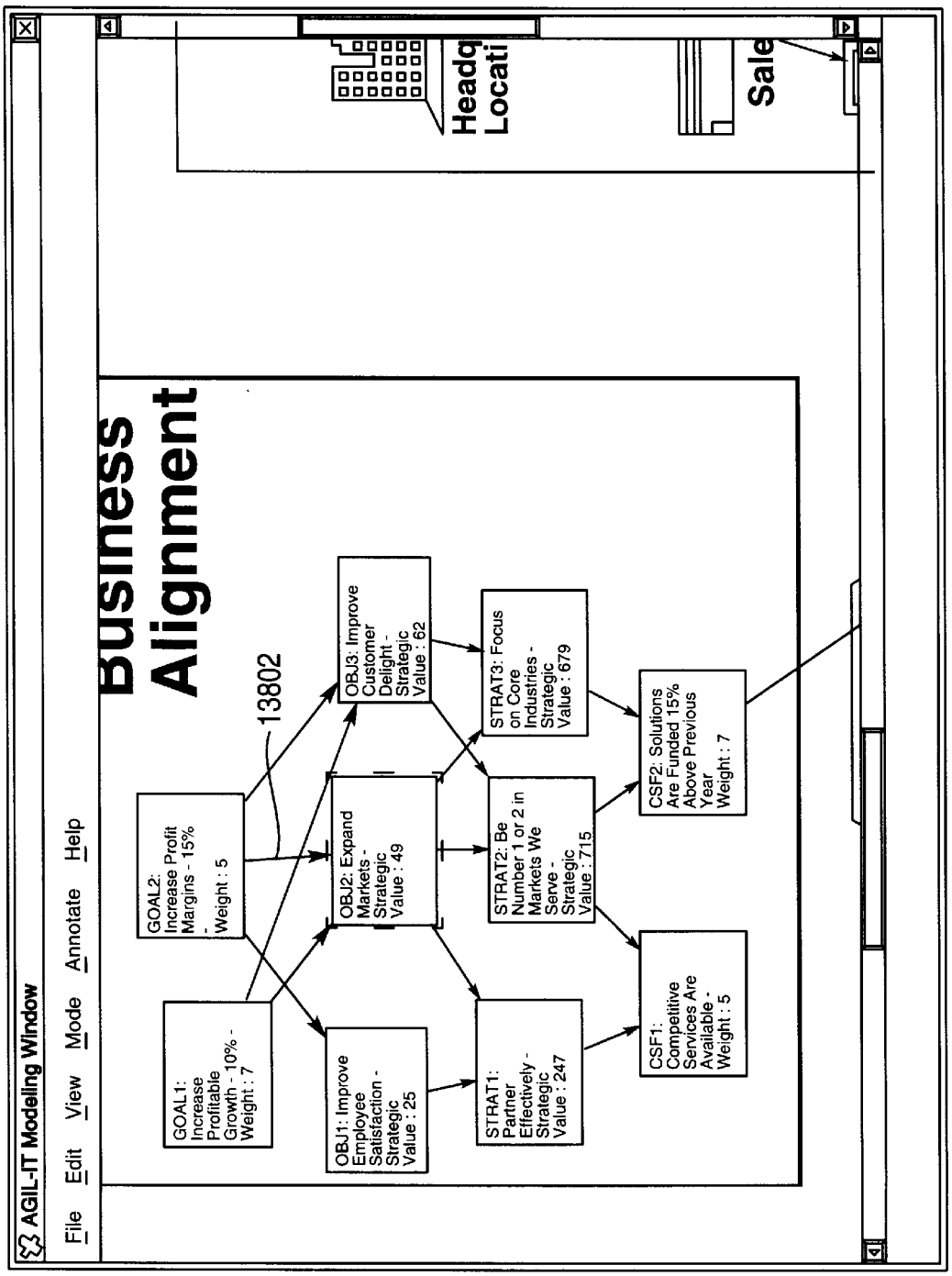

Referring to FIG. 138, there is shown a display on a computer screen, illustrating that a relationship line symbol 13802 has been established between GOAL2 and OBJ2 objects.

Figure 139:
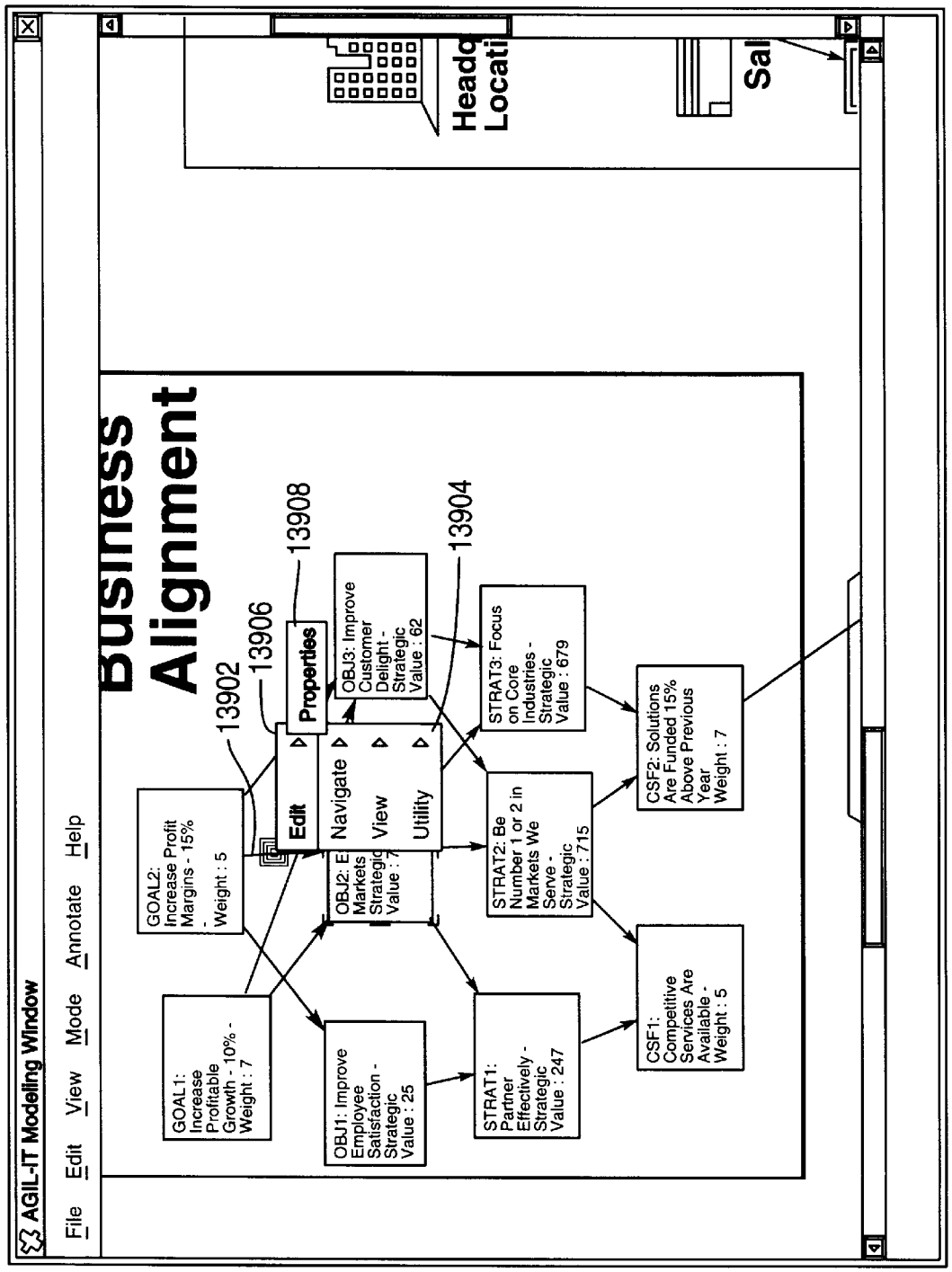

Referring to FIG. 139, there is shown a display on a computer screen, illustrating visual interfaces 13904 and 13908 which can be used to invoke an information window for a relationship. As shown in FIG. 139, visual interface 13904 is invoked by selecting and activating relationship line symbol 13902, and visual interface 13908 (Properties) is invoked by selecting and activating item 13906 (Edit). The operation is led to FIG. 140 by selecting item 13908.

Figure 140:
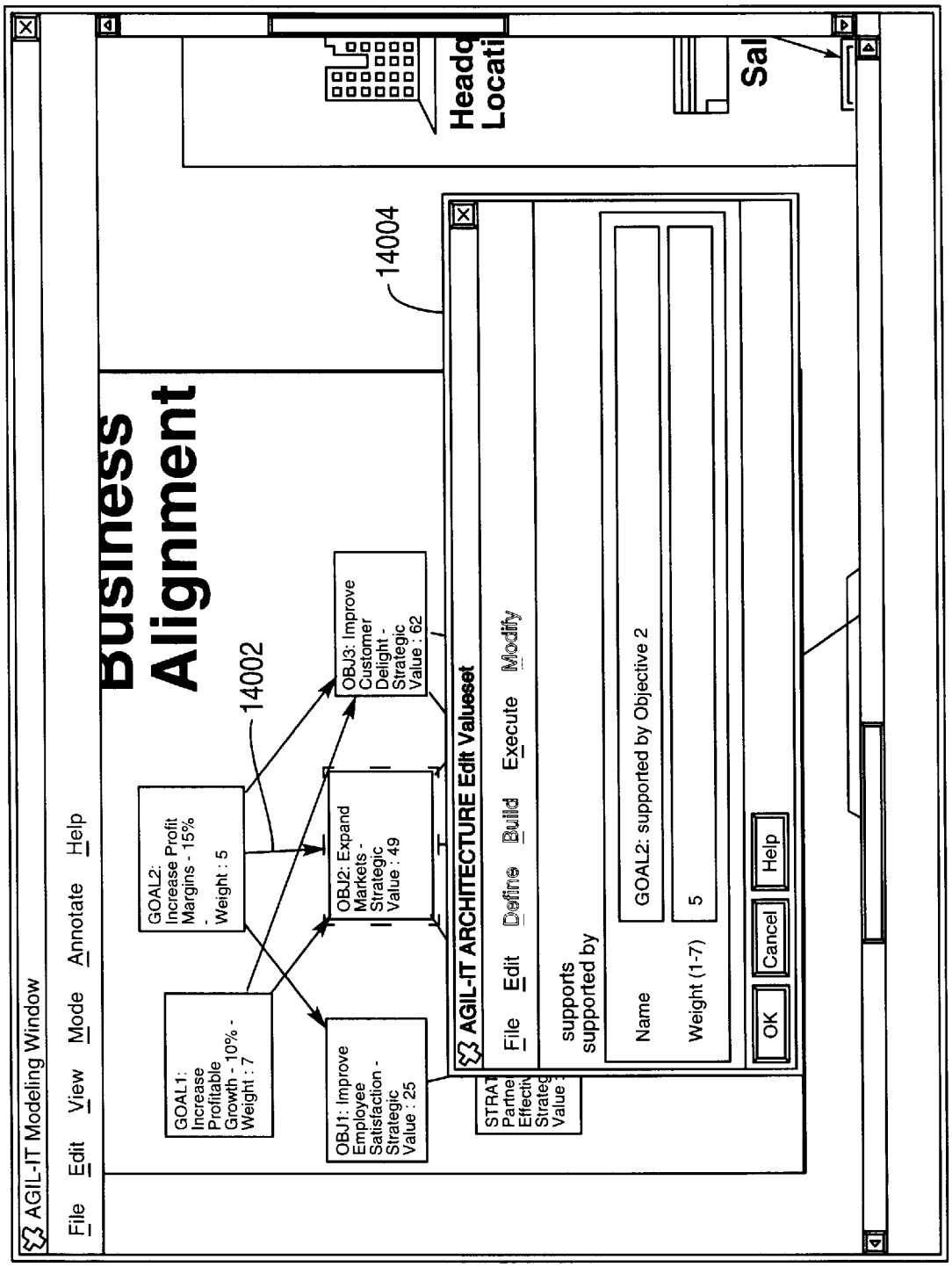

Referring to FIG. 140, there is shown a display on a computer screen, illustrating information window 14004. As shown in FIG. 140, a weight value of 5 is entered into information window 14004 for relationship line symbol 14002.

Figure 141:
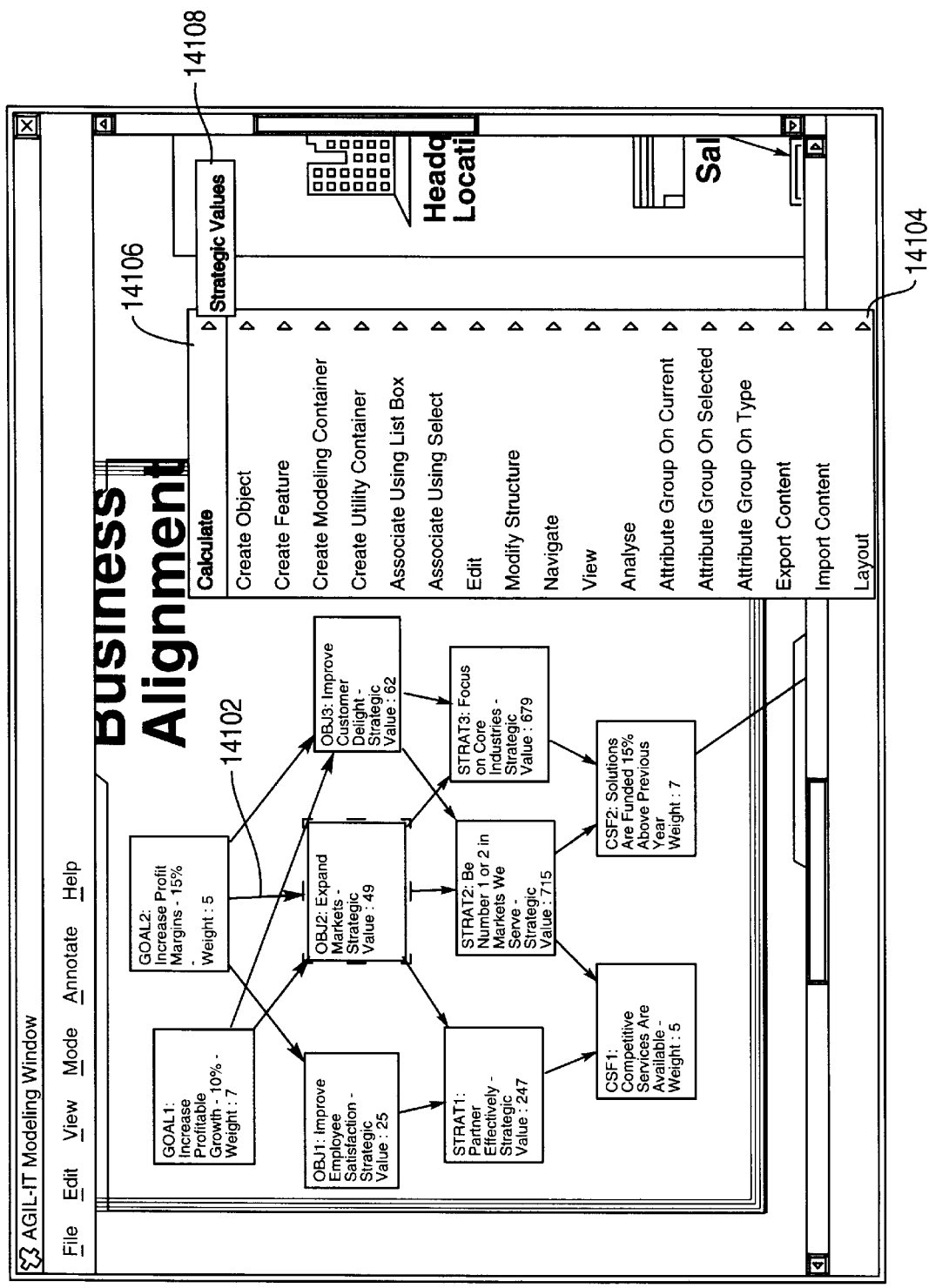

Referring to FIG. 141, there is shown a display on a computer screen, illustrating the updating process for the objects that are effected by newly added relationship 14102. As shown in FIG. 141, visual interface 14104 is invoked by selecting a region within Business Alignment container (but outside the objects within the container). The updating process can be initiated by selecting item 14106 (Calculate) in visual interface 14104 and then activating visual interface 14108 (Strategic Values). Under the control of the Agil-IT visual modeling tool, the updating process first locates and updates the OBJ2 object that is related at the arrow end of relationship 14102 (the first level updating).

The updating process then locates and updates STRAT1, STRAT2, and STRAT3 objects that have direct relationships with the OBJ2 object (the second level of updating).

In the similar fashion as described in connection with FIG. 118, the updating process of FIG. 141 performs updating at deeper levels until all related and impacted objects in the IT visual model (shown in FIG. 7) are updated.

Figure 142:
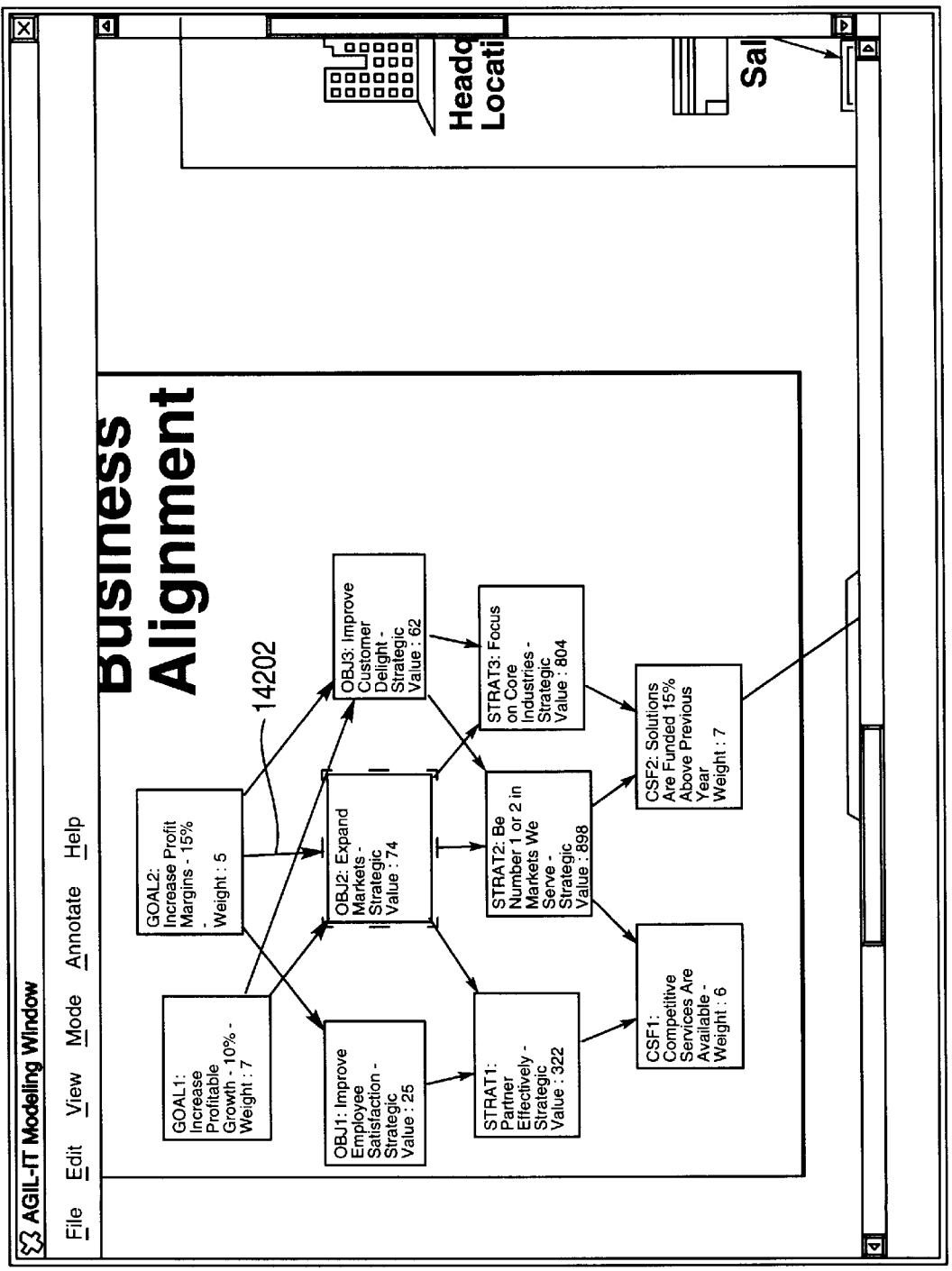

Referring to FIG. 142, there is shown a display on a computer screen, illustrating the updates of the parameters for the objects in Business Alignment container based on the added relationship 14102 in FIG. 141. By comparing FIG. 142 with FIG. 141, it can be readily seen that the values and weights in the objects related to and impacted by the added relationship have been updated, and the parameter values of objects related to and impacted by these updated objects are also changed in the visual model.

FIGS. 143–145 illustrate the updating process corresponding to deleting a relationship between two objects.

Referring to FIG. 143, there is shown a display on a computer screen, illustrating that relationship 14302 is selected.

Referring to FIG. 144, there is shown a display on a computer screen, illustrating all objects and relationships in Business Alignment container. As shown in FIG. 144, relationship 14302 (see FIG. 143) is deleted from FIG. 144 by simultaneously pressing the "Control" and "D" keys on the computer that is running the Agil-IT visual modeling tool.

Again referring to FIG. 144, there is shown a display on a computer screen, illustrating the updating process for the objects that are effected by the deleted relationship 14302 (see FIG. 143). As shown in FIG. 144, visual interface 14402 is invoked by selecting a region within Business Alignment container (but outside the objects within the container). The updating process can be initiated by selecting item 14404 (Calculate) in visual interface 14402 and then activating visual interface 14406 (Strategic Values). Under the control of the Agil-IT visual modeling tool, the updating process first locates and updates OBJ3 object that was related at the arrow end of the deleted relationship line symbol 14302 (the first level updating).

The updating process then locates and updates the STRAT2 and STRAT3, objects that have direct relationships with OBJ3 object (the second level updating).

In the similar fashion as described in connection with FIG. 118, the updating process of FIG. 144 performs updating at deeper levels until all related and impacted objects in the IT visual model (shown in FIG. 7) are updated.

Referring to FIG. 145, there is shown a display on a computer screen, illustrating the updates of the parameters for the objects in Business Alignment container based on the deleted relationship 14302. By comparing FIG. 145 with FIG. 144, it can be readily seen that the values and weights in the objects related to and impacted by the deleted relationship have been updated and the parameter values of objects related to and impacted by these updated objects are also changed within the visual model.

IV. Textually navigating an IT (Information Technology) architecture visual model Referring to FIG. 146, there is shown a display on a computer screen, illustrating a process to generate a navigable symbolic and textual-based deliverable based on the IT architecture visual model (see FIG. 7).

To generate a navigable textual-based deliverable for the objects and relationships within the four containers, a user first selects the four containers (e.g. by clicking respective positions within the four containers). The dotted lines encircling the four containers indicate that the four containers have been selected. The user then activates a position within the root region of the computer screen (a position outside of the four containers). After detecting the activation in the root region, the Agil-IT modeling tool displays a visual interface 14602 associated with the root region. The user subsequently selects "Report" 14604 from visual interface 14602. After detecting the selection of "Report", the modeling tool displays a visual interface 14606. The user finally selects "HTML, Selected Containers" 14608 from visual interface 14606 to generate the navigable textual-based deliverable for the objects and relationships within the four selected containers.

Referring to FIG. 147, there is shown a display on a computer screen, illustrating the file structure generated by the HTML report process shown in FIG. 146.

As shown in FIG. 147, the navigable textual-based deliverable is contained within a file named as ARCHITECTURE which includes eight sub-files and an Index.html (or index to HTML) file. Each of the eight sub-files has a three part name: file name (e.g. ARCHITECTURE), a numerical container identification name (e.g. 0x8b004d), and format (e.g. html or gif). Each of the four containers are associated with two files: an html file and a figure (gif) file. For example, Business Alignment container is associated with ARCHITECTURE.0x8a0078.html and ARCHITECTURE.0x8a0078.gif. More specifically, the visual symbols in Business Alignment container are stored in ARCHITECTURE.0x8a0078.gif, and the textual contents associated with the visual symbols are stored in ARCHITECTURE.0x8a0078.html. The other three containers (Information Technology Architecture, Transition Planning, Architecture Management Practices) have the same file structure as the Business Alignment container, only with different "0x - - - " numbers. As will be shown, all the visual symbols and textual contents are linked together, so that the visual symbols and the textual contents can be easily navigated. The content in an ARCHITECTURE file is arranged in the format that can be navigated by using standard Internet "Web Browser" technology (examples include Netscape Navigator and Microsoft Internet Explorer) . The ARCHITECTURE.Index.html file (the index to HTML file) indicates a starting point for navigating textual-based deliverable.

It is important to note that the control program (400 as shown in FIG. 4 performs the Report operation (14604 as shown in FIG. 146) for the four IT architecture visual model containers as selected in FIG. 146. The control program will generate the file names and files for each selected container and will generate the html report accordingly.

Referring to FIG. 148, there is shown a display on a computer screen, illustrating a menu of Internet Explorer by Microsoft.

As shown in FIG. 148, the name of ARCHITECTURE file is shown in button 14804. By clicking menu choice 14804, Internet Explorer starts the navigation process by using the information in the ARCHITECTURE file and the navigation process is led to the display shown in FIG. 149.

Referring to FIGS. 149–152, there are shown displays on a computer screen, illustrating a report, which includes the visual symbols and textual tables for Business Alignment container. The reports for Architecture Management Practices, Information Technology Architecture, and Transition Planning containers have the similar format or layout in which a combination of visual symbols and textual links and descriptions are used to navigate and describe the IT strategy and plan that corresponds to the visual model produced with the Agil-IT tool.

Referring to FIG. 149, there is shown a display on a computer screen, illustrating the beginning portion of the report for Business Alignment container. As shown in FIG. 149, all visual symbols for objects and relationships are displayed within Business Alignment container. By clicking the OBJ3 (objective 3) object, the navigation process will be led to FIG. 150, displaying the table for OBJ3 object. All other report tables for the other objects in Business Alignment container can be located in same fashion.

Referring to FIG. 150, there is shown a display on a computer screen, illustrating the table for OBJ3 object.

As shown in FIG. 150, the table includes the title of and textual descriptions for OBJ3 object. The table also includes four hypertext links corresponding to the four relationships (STRAT3, STRAT2, GOAL1 and GOAL2) related to OBJ3 object, brief descriptions of the relationships, and the titles of the objects that are related to OBJ3 object. The table further contains a box symbol 15004. The visual symbol associated with OBJ3 object in the report for Business Alignment container can be located and displayed by clicking box symbol 15004. More specifically, by clicking box symbol 15004, the visual symbol for OBJ3 object as shown in FIG. 149 will be displayed in the computer screen. In FIG. 150, hypertext link 15006 links the table for OBJ3 object to the table for STRAT3 (strategy 3) object. By clicking hypertext link 15006, the navigation process is led to FIG. 151, displaying the table for STRAT3 object.

Referring to FIG. 151, there is shown a display on a computer screen, illustrating the table for STRAT3 object.

As shown in FIG. 151, the table includes the title of and textual descriptions for STRAT3 object. The table also includes three hypertext links corresponding the three relationships (CSF2, OBJ3 and OBJ2) related to STRAT3 object, brief descriptions of the relationships, and the titles of the objects that are related to STRAT3 object. The table further contains a box symbol 15104. The visual symbol associated with STRAT3 object in the report can be located and displayed by clicking box symbol 15104. More specifically, by clicking box symbol 15104, the visual symbol for STRAT3 object as shown in FIG. 5 will be displayed in the computer screen. In FIG. 151, hypertext link 15106 links the table for STRAT3 object to the table for CSF2 (critical success factor 2) object. By clicking hypertext link-15108, the navigation process is led to FIG. 152, displaying the table for CSF2 object. By clicking box symbol 15108, the visual symbol for STRAT 2 object will be displayed on te computer screen.

Referring to FIG. 152, there is shown a display on a computer screen, illustrating the table for CSF2 object.

As shown in FIG. 152, the table includes the title of and textual descriptions for CSF2 object. The table also includes three hypertext links corresponding to the three relationships (Milestone, STRAT2 and STRAT3) related to CSF2 object, brief descriptions of the relationships, and the titles of the objects that are related to CSF2 object. The table further contains a box symbol 15204. The visual symbol associated with CSF2 object in the IT architecture visual model can be located and displayed by clicking box symbol 15204. More specifically, by clicking box symbol 15204, the visual symbol for CSF2 object as shown in FIG. 149 will be displayed in the computer screen. In FIG. 152, hypertext link 15206 links the table for CSF2 object to the table for Milestone object. By clicking hypertext link 15206, the navigation process is led to FIG. 153 , displaying the table for the Milestone object. By clicking box symbol 15108, the visual symbol for the GOAL 1 object will be displayed on the computer screen.

Referring to FIG. 153, there is shown a display on a computer screen, illustrating the table for Milestone object.

As shown in FIG. 153, the table includes the title of and textual descriptions for Milestone object. The table also includes two hypertext links corresponding to the two relationships (CSF2 and Implement Customer Data Warehouse) related to Milestone object, brief descriptions of the relationships, and the titles of the two objects that are related to Milestone object. The table further contains a traffic light symbol 15304. In FIG. 153, hypertext link 15306 links the table for Milestone object to the table for the Implement Customer Data Warehouse object. By clicking hypertext link 15306, the navigation process is led to FIG. 155, displaying the table for Implement Customer Data Warehouse object. The visual symbol associated with Milestone object in the IT architecture visual model can be located and displayed by clicking traffic light symbol 15304.

More specifically, by clicking traffic light symbol 15304, the visual symbol for Milestone object as shown in FIG. 154 will be displayed in the computer screen.

Referring to FIG. 154, there is shown a display on a computer screen, illustrating the beginning portion of the report for Transition Planning container. Clicking on traffic light symbol 15304 in FIG. 153 causes the display of the visual symbol associated with the Milestone object in Transition Planning container, because the Milestone object is located in a container separated from Business Alignment container. By clicking the traffic light symbol associated with the Milestone object in FIG. 154 (15404), the navigation process is again led back to FIG. 153, displaying the table for the Milestone object.

Referring to FIG. 155, there is shown a display on a computer screen, illustrating the table for Implement Customer Data Warehouse object. As shown in FIG. 155, the table for Implement Customer Data Warehouse object has the similar format as the tables described above.

V. Using utility objects for displaying an IT (Information Technology) architecture visual model in a symbol-based table FIGS. 156–181 illustrate the process of establishing and activating a symbol-based decision rationale table.

FIGS. 156–158 illustrate a process of establishing a utility container. Referring to FIG. 156, there is shown a display on a computer screen, illustrating visual interfaces 15602 and 15606. As shown in FIG. 156, visual interface 15602 is invoked by selecting and activating a position in root region (a position outside the four containers), and visual interface 15606 is invoked by selecting and activating item 15604 (Create Utility Container) in visual interface 15602. By selecting and activating item 15608 (RELATIONSHIP MATRIX CONTAINER), the process is led to FIG. 157.

Referring to FIG. 157, there is shown a display on a computer illustrating information window 15702 for entering parameters for a newly created container. By clicking OK button, the process is led to FIG. 158.

Referring to FIG. 158, there is shown Decision Rationale Matrix container 15802 created in response to the operations in FIGS. 156 and 157. The dotted lines encircling the Decision Rationale Matrix container indicate that the container is selected.

FIGS. 159A, 159B, and 160 illustrate the process of establishing a utility type object within Decision Rationale Matrix container 15802.

Referring to FIG. 159A, there is shown a display on a computer screen, illustrating visual interfaces 15902 and 15906. As shown in FIG. 159A, visual interface 15902 is invoked by selecting and activating a position in the utility container region, and visual interface 15906 is invoked by selecting and activating item 15904 (Create Object) in visual interface 15902. By selecting and activating item 15908 (RM PATTERN) in visual interface 15906, the process is led to FIG. 159B. Referring to FIG. 159B, there is shown a display on a computer screen illustrating information window 15912 for entering name (Locations to Data Matrix Setup) and description of a created utility type object. By clicking OK button, the operation is led to FIG. 160.

Referring to FIG. 160, there is shown a display on a computer screen illustrating Locations to Data Matrix Setup object 16002, which is a utility type object.

FIGS. 161–168 illustrate a process of establishing X-AREA and Y-AREA in the Decision Rationale Matrix of the symbol-based decision rationale table.

Figure 161:
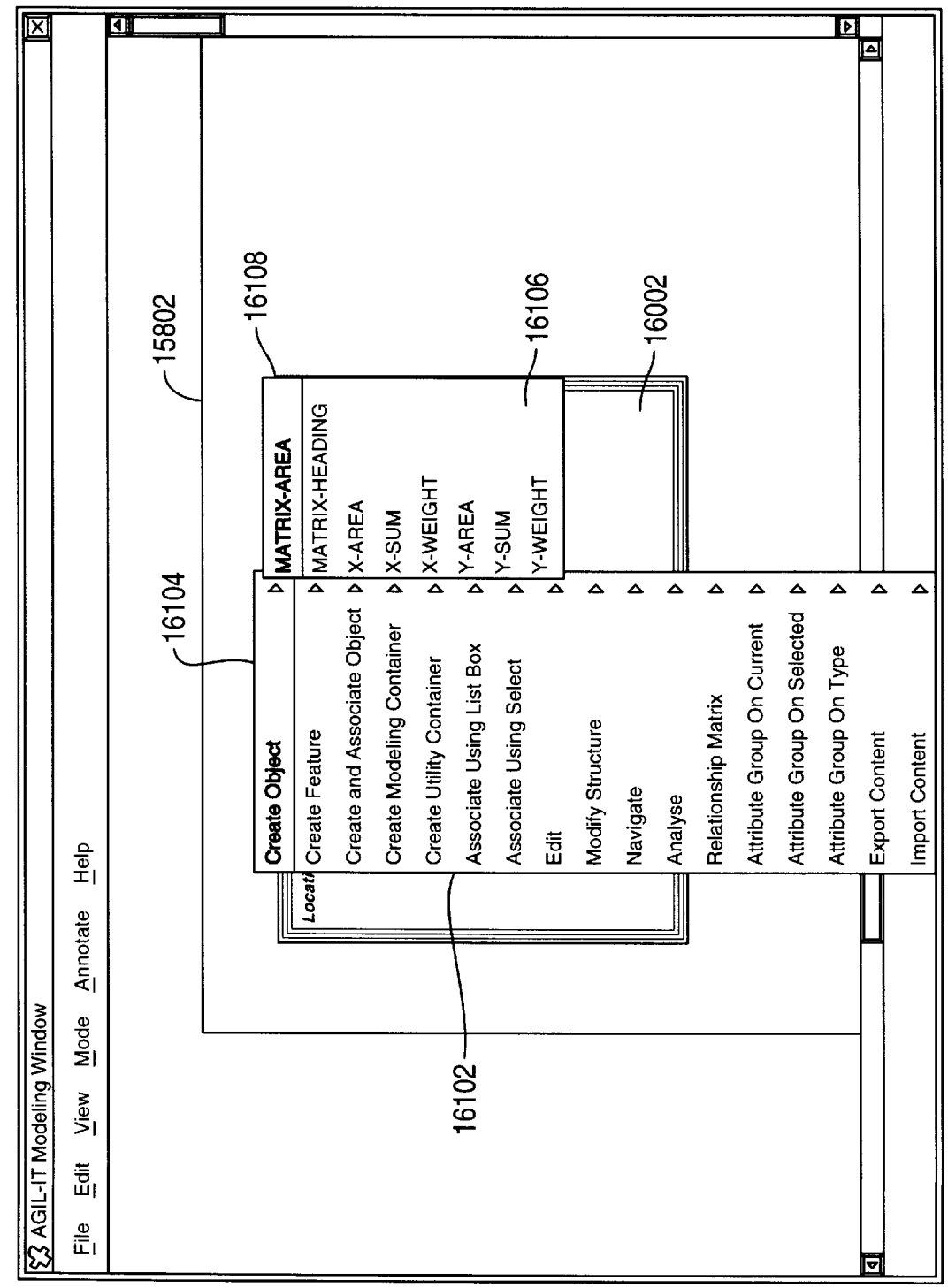

Referring to FIG. 161, there is shown a display on a computer screen, illustrating visual interfaces 16102 and 16106. As shown in FIG. 161, visual interface 16102 is invoked by selecting and activating Locations to Data Matrix Setup object 16002, and visual interface 16106 is invoked by selecting and activating item 16104 (Create Object) in visual interface 16102. By selecting and activating 16108 (MATRIX-AREA), the process is led to FIG. 162.

Figure 162:
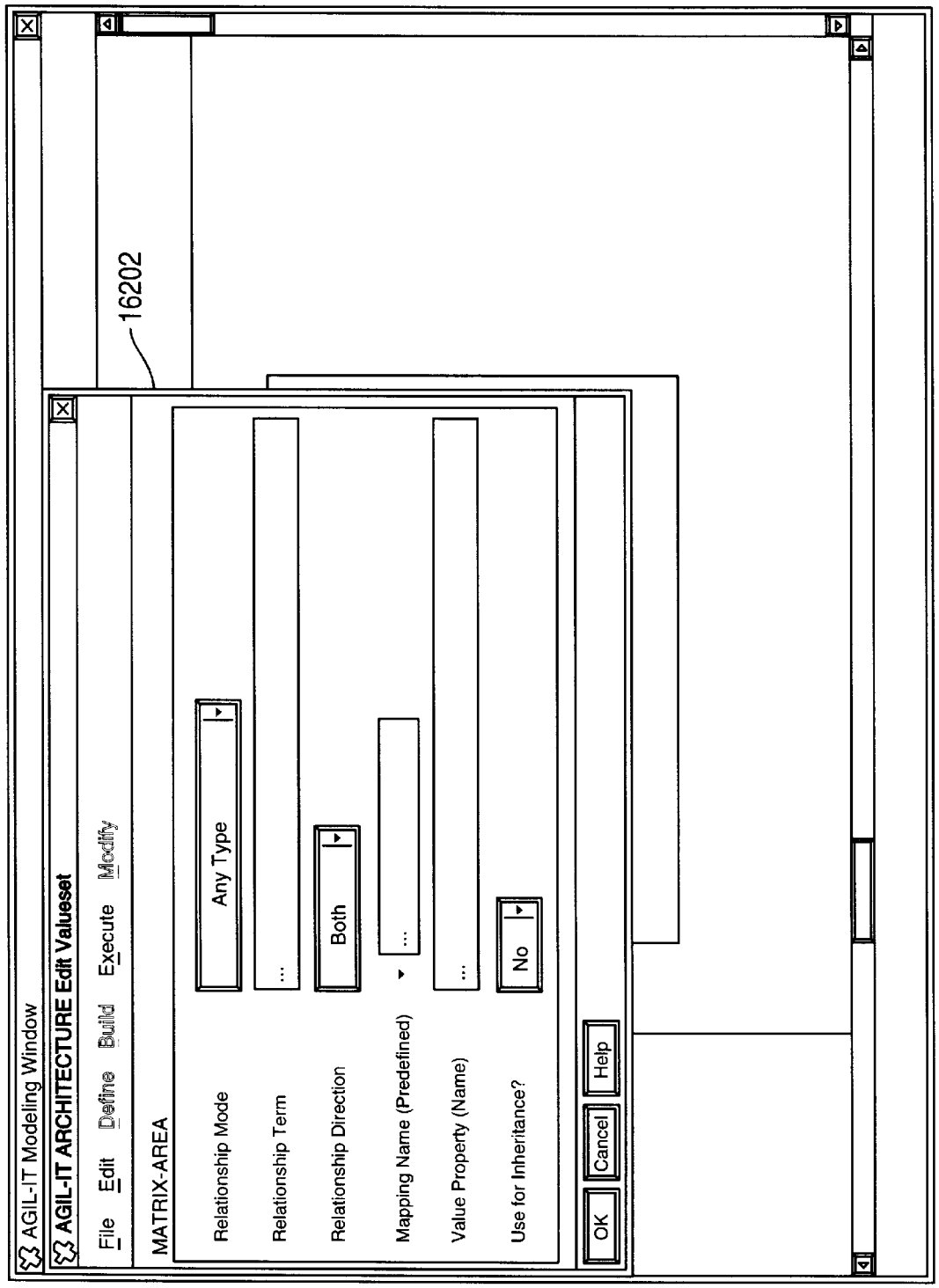

Referring to FIG. 162, there is shown a display on a computer screen, illustrating information window 16202 for entering parameters for the MATRIX-AREA. As shown in FIG. 162, default parameters are chosen for the MATRIX-AREA. By clicking OK button, the process is led to FIG. 163.

Figure 163:
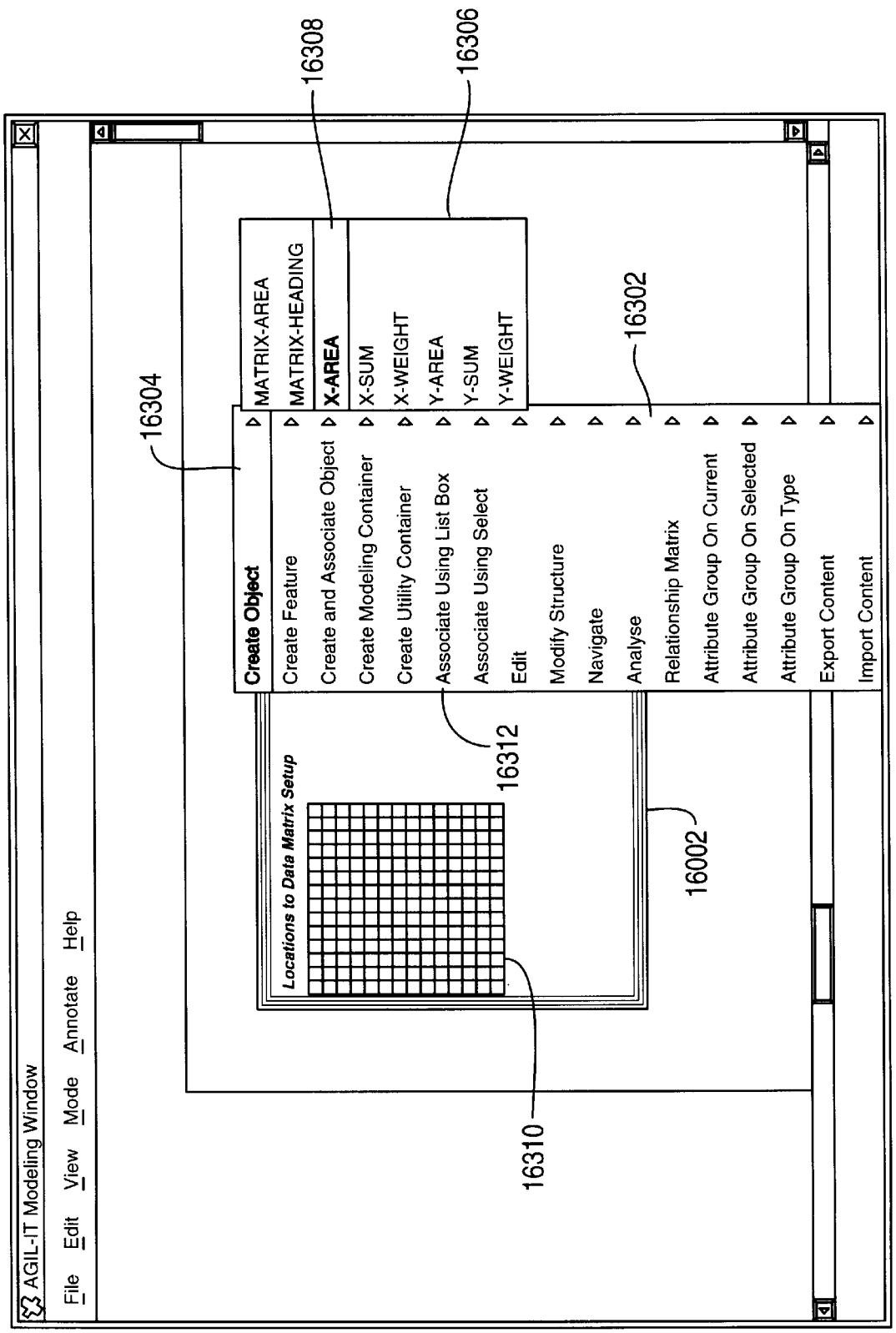

Referring to FIG. 163, there is shown visual interfaces 16302 and 16306, and the symbol for MATRIX-AREA 16310. As shown in FIG. 163, visual interface 16302 is invoked by selecting and activating Locations to Data Matrix Setup object 16002, and visual interface 16306 is invoked by selecting and activating item 16304 (Create Object) in visual interface 16302. The Create Object operation 16304 is an example of an intra-container operation for this utility type of object 16002, and the Associate Using List Box operation 16312 is an example of an inter-container operation that can be performed for utility object Locations to Data Matrix Setup (16002). By selecting and activating item 16308 (X-AREA), the operation is led to FIG. 164.

Figure 164:
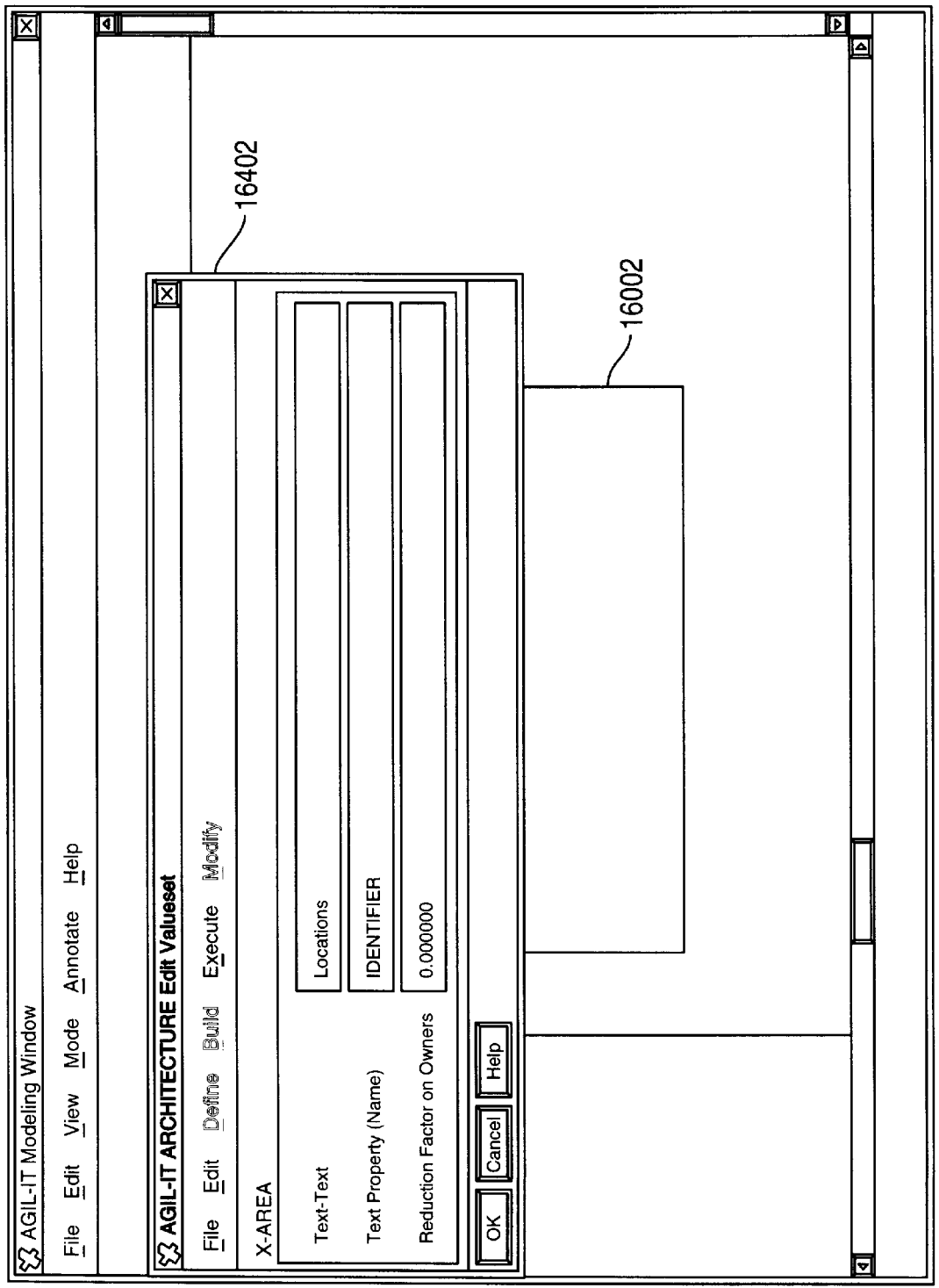

Referring to FIG. 164, there is shown a display on a computer screen illustrating information window 16402. As shown by Test-Text in FIG. 164, the objects in X-AREA are location type objects. The Text Property (Name) 'IDENTIFIER' value in FIG. 164 specifies that the actual parameter value of an object selected for display in the X-AREA will be the identifier name value established when said object is created. By clicking OK button, the process is led to FIG. 165.

Figure 165:
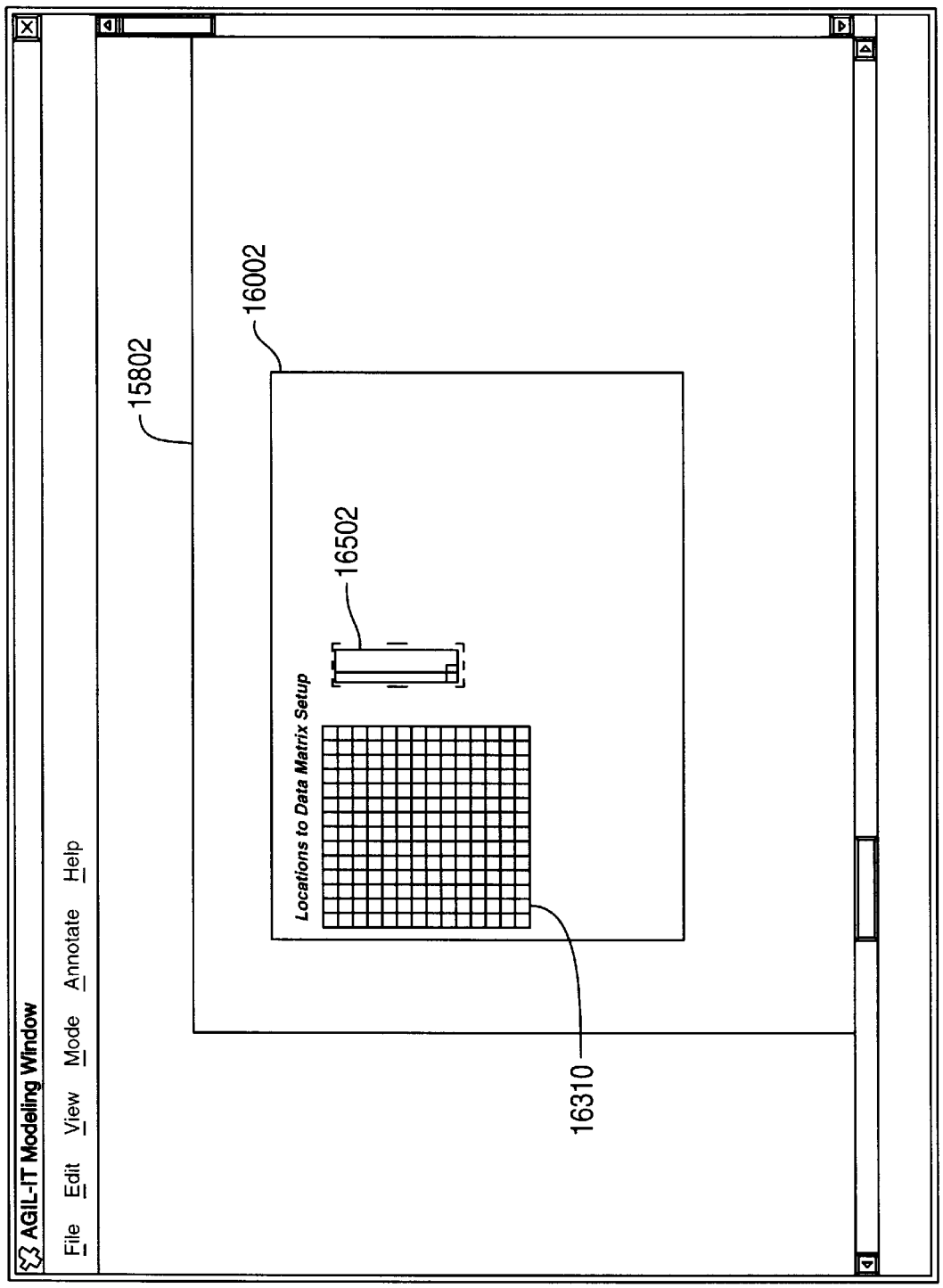

Referring to FIG. 165, there is shown a display on a computer screen illustrating visual symbol 16502 for X-AREA within Locations to Data Matrix Setup object 16002.

Figure 166:
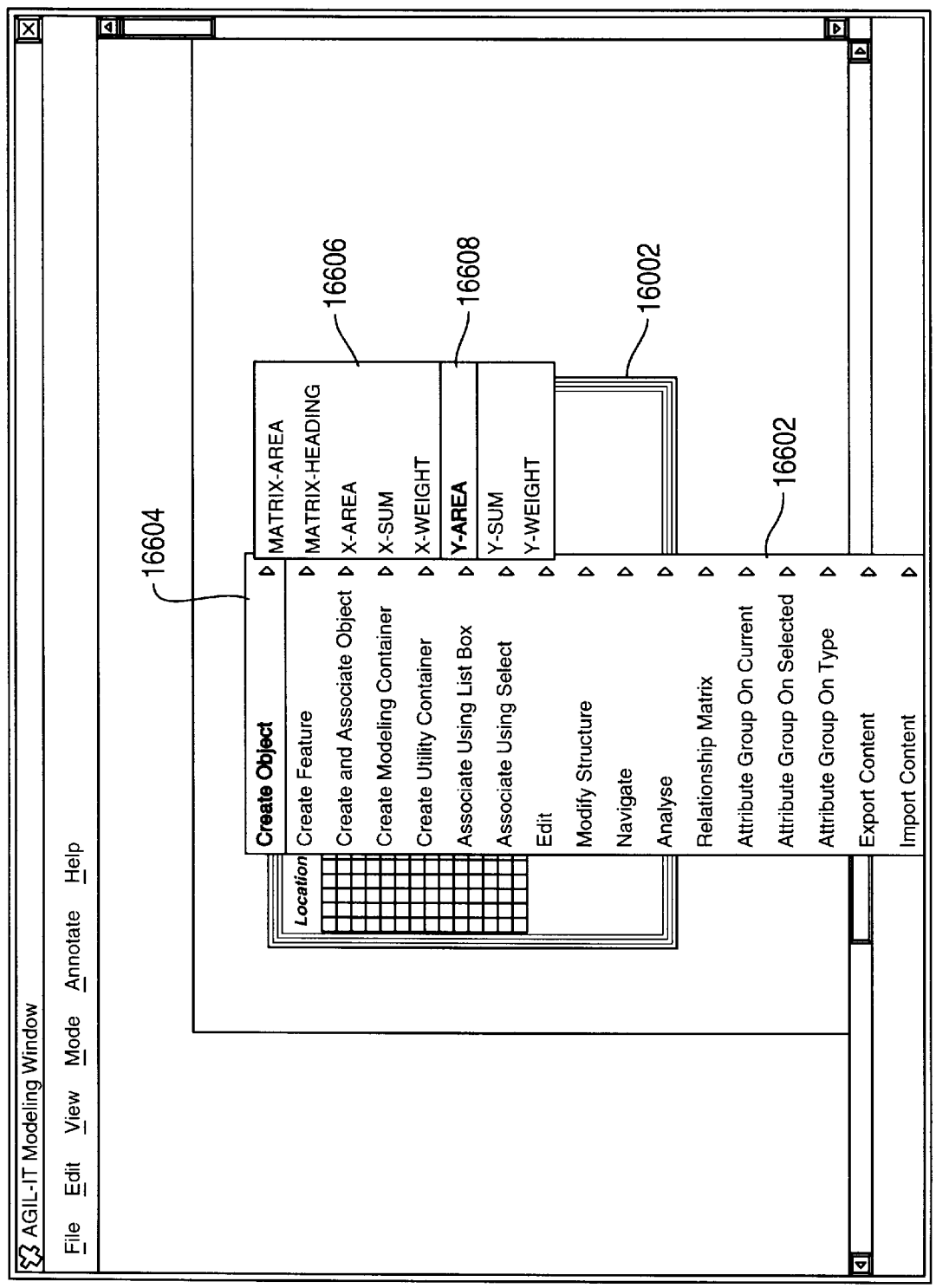

Referring to FIG. 166, there is shown a display on a computer screen illustrating visual interfaces 16602 and 16606. As shown in FIG. 166, visual interface 16602 is invoked by selecting and activating Locations to Data Matrix Setup object 16002, and visual interface 16606 is invoked by selecting and activating item 16604 (Create Object) in visual interface 16602. By selecting and activating item 16608 (Y-AREA), the process is led to FIG. 167.

Figure 167:
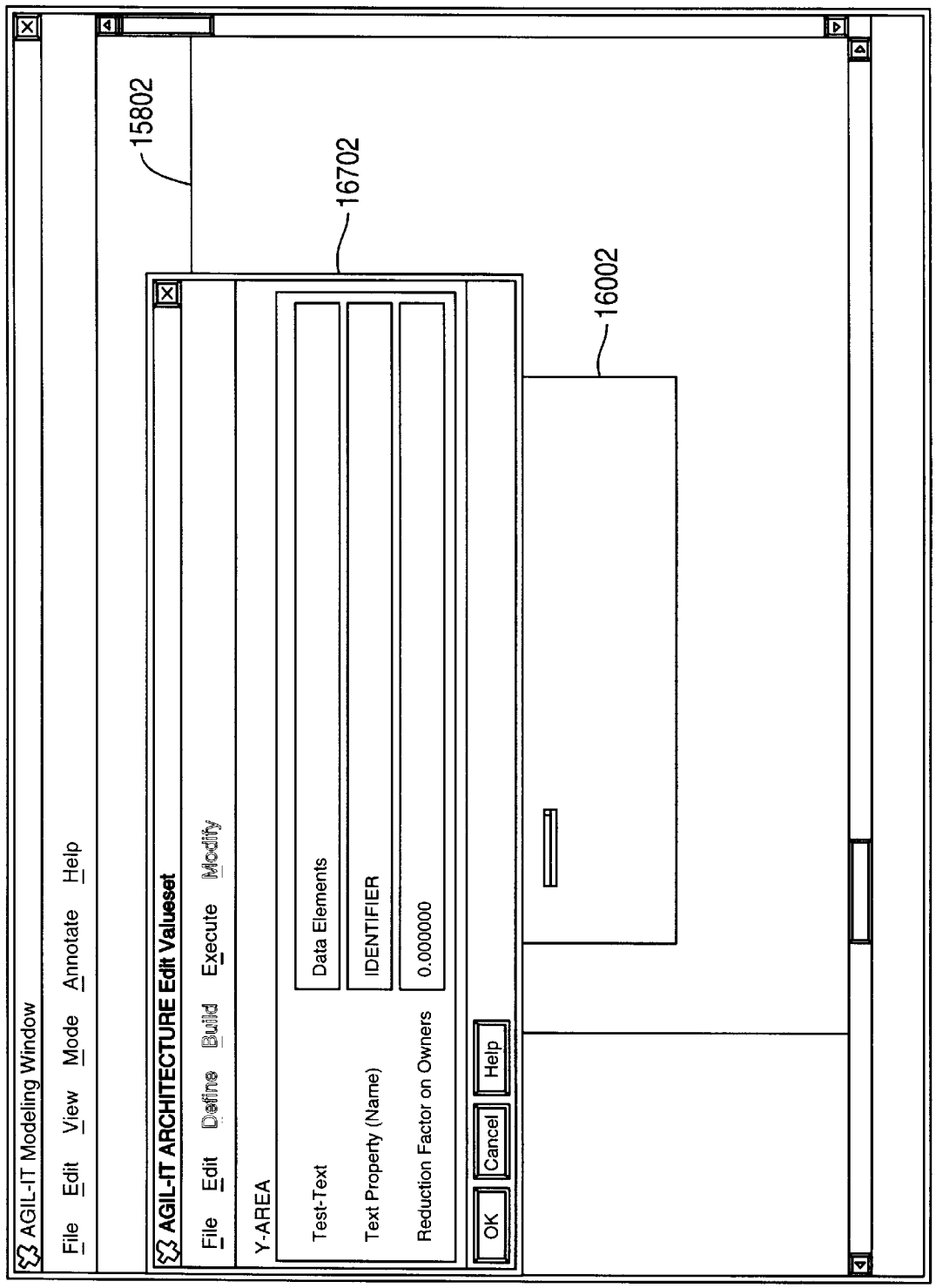

Referring to FIG. 167, there is shown a display on a computer screen illustrating information window 16702. As shown by Test-Text in FIG. 167, the objects in Y-AREA are data element type objects. The Text Property (Name) 'IDENTIFIER' value in FIG. 167 specifies that the actual parameter value of an object selected for display in the Y-AREA will be the identifier name value established when said object is created. By clicking the OK button, the process is led to FIG. 168.

Figure 168:
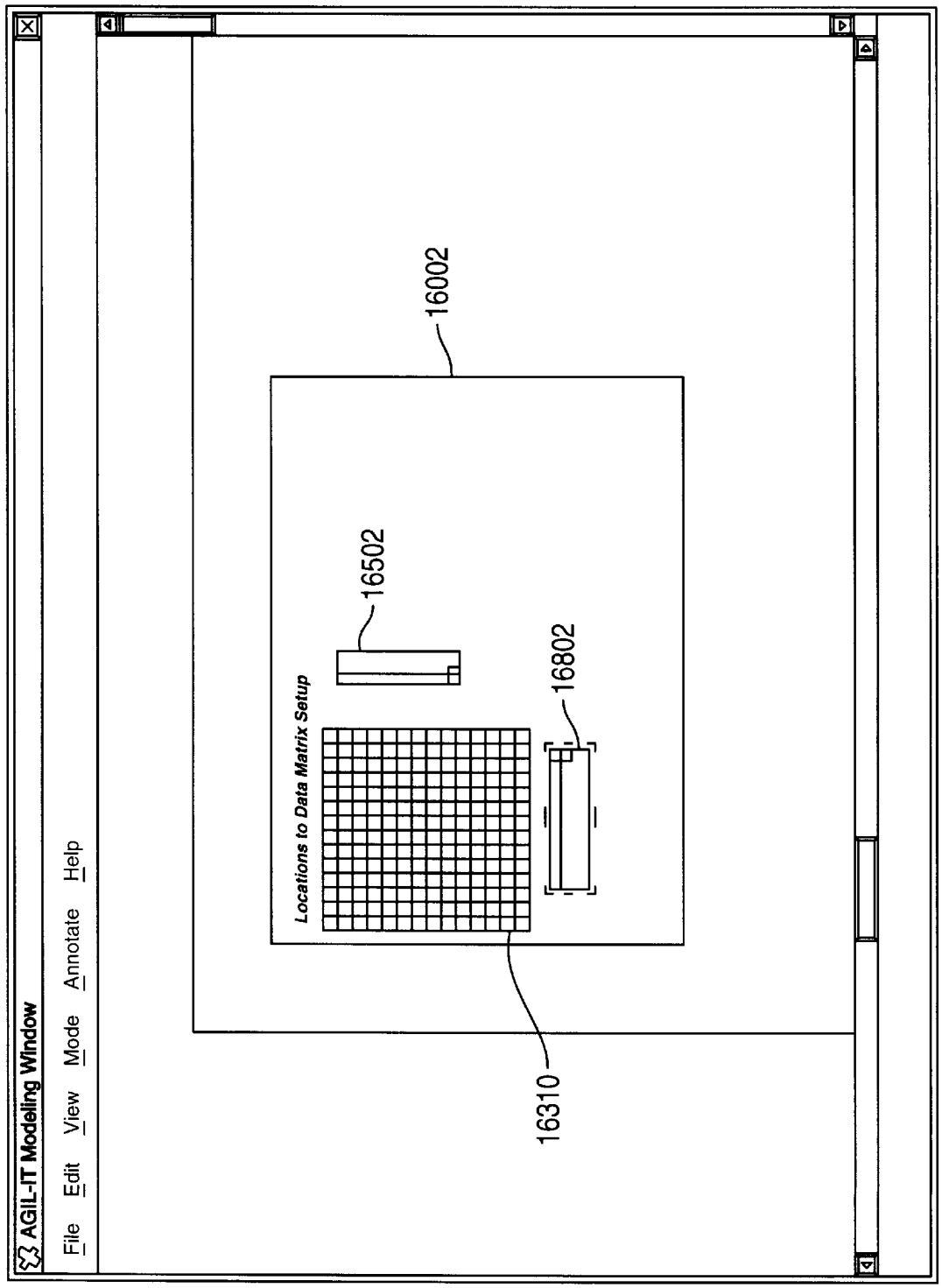

Referring to FIG. 168, there is shown a display on a computer screen illustrating visual symbol 16802 for Y-AREA within Locations to Data Matrix Setup object 16002.

FIGS. 169–171 illustrate a process of establishing headings for the X-AREA and Y-AREA in the Decision Rationale Matrix.

Referring to FIG. 169, there is shown a display on a computer screen illustrating visual interfaces 16902 and 16906. As shown in FIG. 169, visual interface 16902 is invoked by selecting and activating object 16002, and visual interface 16906 is invoked by selecting and activating item 16904 (Create Object) in visual interface 16902. By selecting and activating item 16908 (MATRIX-HEADING), the process is led to FIG. 170.

Referring to FIG. 170, there is shown a display on a computer screen illustrating information window 17002 for entering the headings for the X-AREA and Y-AREA. As shown in FIG. 170, the headings for X-AREA and Y-AREA are Locations and Data, respectively. By clicking OK button, the process is led to FIG. 171.

Referring to FIG. 171, there is shown a display on a computer screen illustrating visual symbol 17102 for the headings of X-AREA (Locations) and Y-AREA (Data) within Locations to Data Matrix Setup object 16002.

FIGS. 172–174 illustrate a process of establishing a utility type of object.

Referring to FIG. 172, there is shown a display on a computer screen illustrating visual interfaces 17202 and 17206. As shown in FIG. 172, visual interface 17202 is invoked by selecting and activating object 16002, and visual interface 17206 is invoked by selecting and activating item 17204 (Create and Associated Object) in visual interface 17202. By selecting and activating visual interface 17206 (used by RM SELECTION-SET), the process is led to FIG. 173.

Referring to FIG. 173, there is shown a display on a computer screen, illustrating information window 17302 for entering parameters (including the name) for a newly created utility object. As shown in FIG. 173, parameter fields 17304 (Location-Type) and 17306 (Data Element—(Business Application Element)) are specified to give the object types of the X-axis and Y-axis respectively. All other parameters (except the name) are accepted as default parameters. By clicking OK button, the process is led to FIG. 174.

Referring to FIG. 174, there is shown a display on a computer screen, illustrating a newly created Data Location Decision Matrix utility object 17402 with a line symbol 17404 establishing a relationship between the Data Location Decision Matrix utility object and the Locations to Data Matrix Setup object 16002.

FIGS. 175–181 illustrate a process of establishing relationships between Decision Matrix object 17402 and the objects that will be included in Locations to Data Matrix Setup object 16002.

Figure 175:
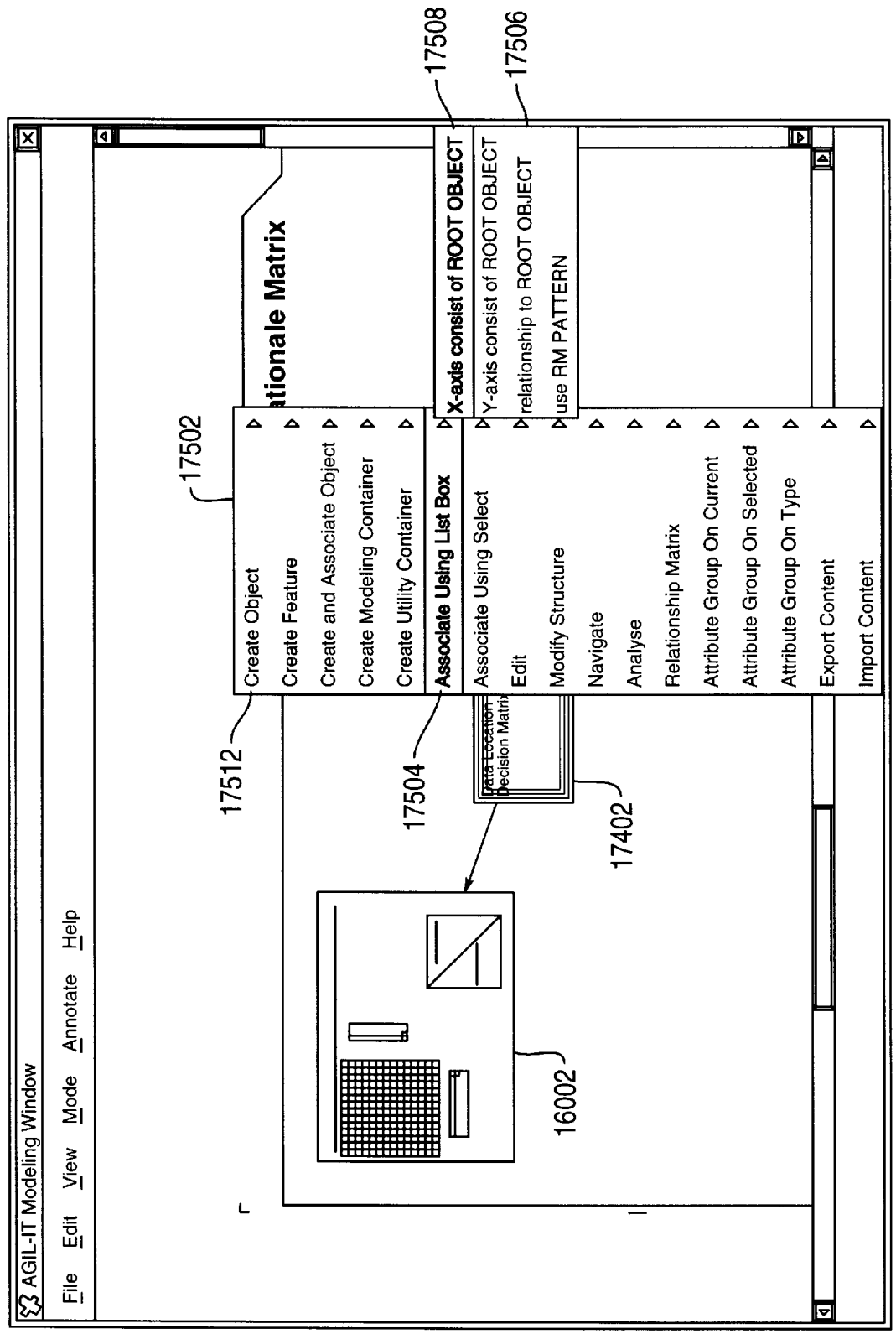

Referring to FIG. 175, there is shown a display on a computer screen illustrating visual interfaces 17502 and 17506. As shown in FIG. 175, visual interface 17502 is invoked by selecting and activating Data Location Decision Matrix object 17402, and visual interface 17506 is invoked by selecting and activating item 17504 (Associate Using Listing Box) in visual interface 17502. As shown in visual interface 17502, the Create Object operation 17512 is an example of an intra-container operation for this utility type of object 17402 and the Associate Using List Box operation 17504 is an example of an inter-container operation that can be performed for utility object Data Location Decision Matrix (17402). By selecting and activating item 17508 (X-axis consist of ROOT OBJECT), the process is led to FIG. 176.

Figure 176:
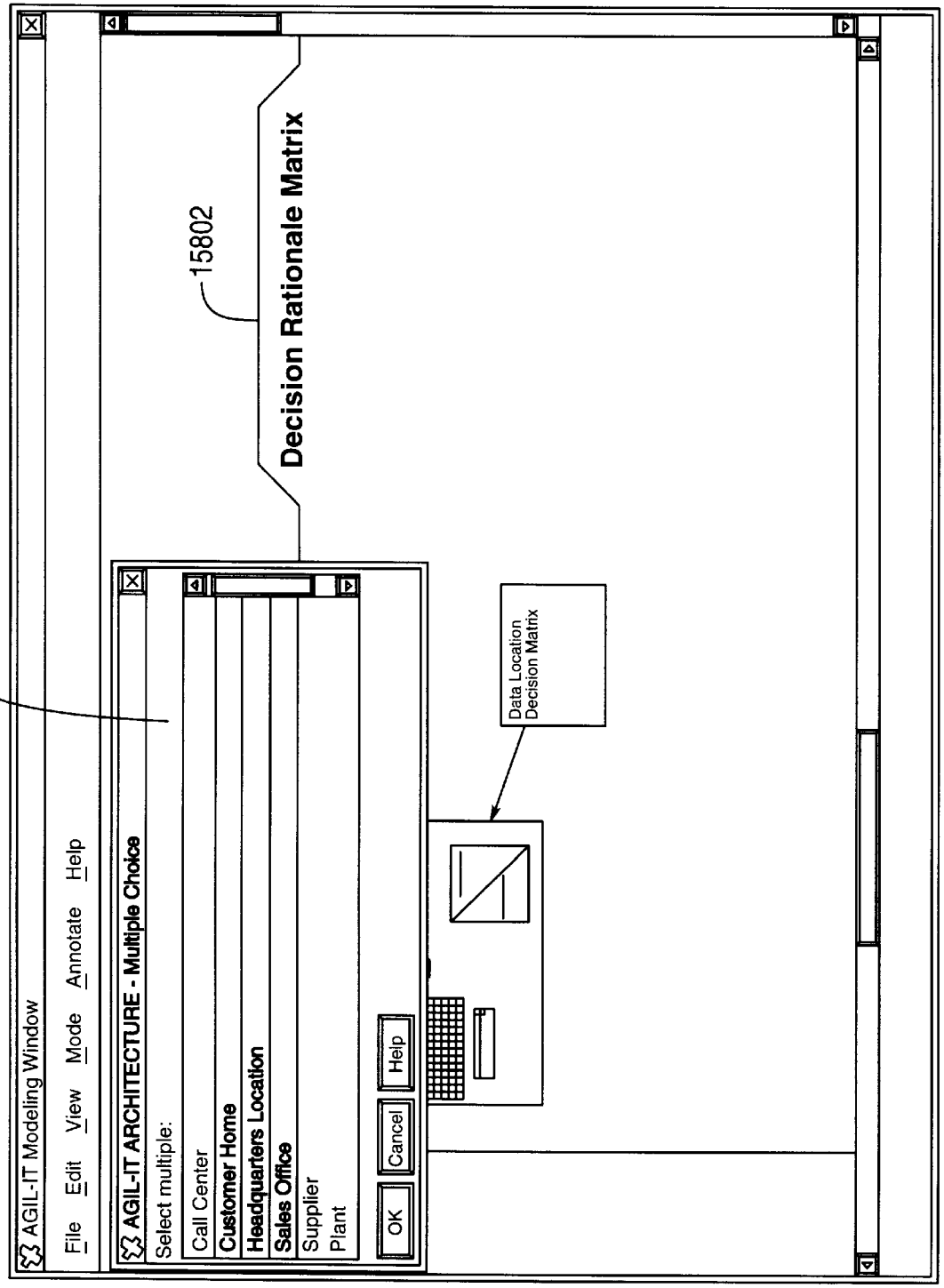

Referring to FIG. 176, there is shown a display on a computer screen illustrating information window 17602. As shown in FIG. 176, information window 17602 contains all location related objects. Only location objects are listed due to the X-axis type specification (Location-Type) as shown in FIG. 173, parameter field 17304. By selecting OK button, the process is led to FIG. 177.

Figure 177:
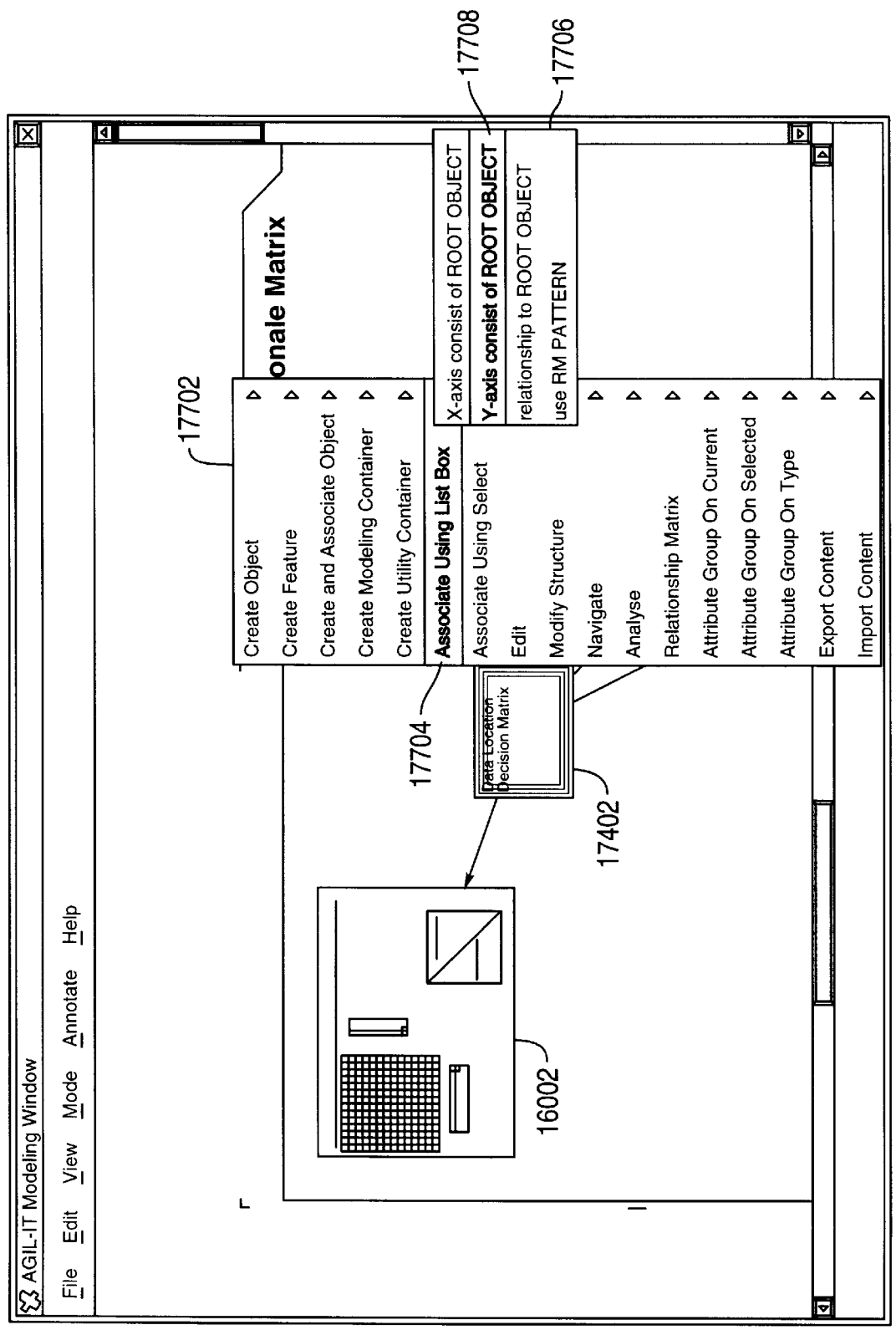

Referring to FIG. 177, there is shown a display on a computer screen illustrating visual interfaces 17702 and 17706. As shown in FIG. 177, visual interface 17702 is invoked by selecting and activating Data Location Decision Matrix object 17402, and visual interface 17706 is invoked by selecting and activating item 17704 (Associate Using Listing Box) in visual interface 17702. By selecting and activating item 17708 (Y-axis consist of ROOT OBJECT), the process is led to FIG. 178.

Figure 178:
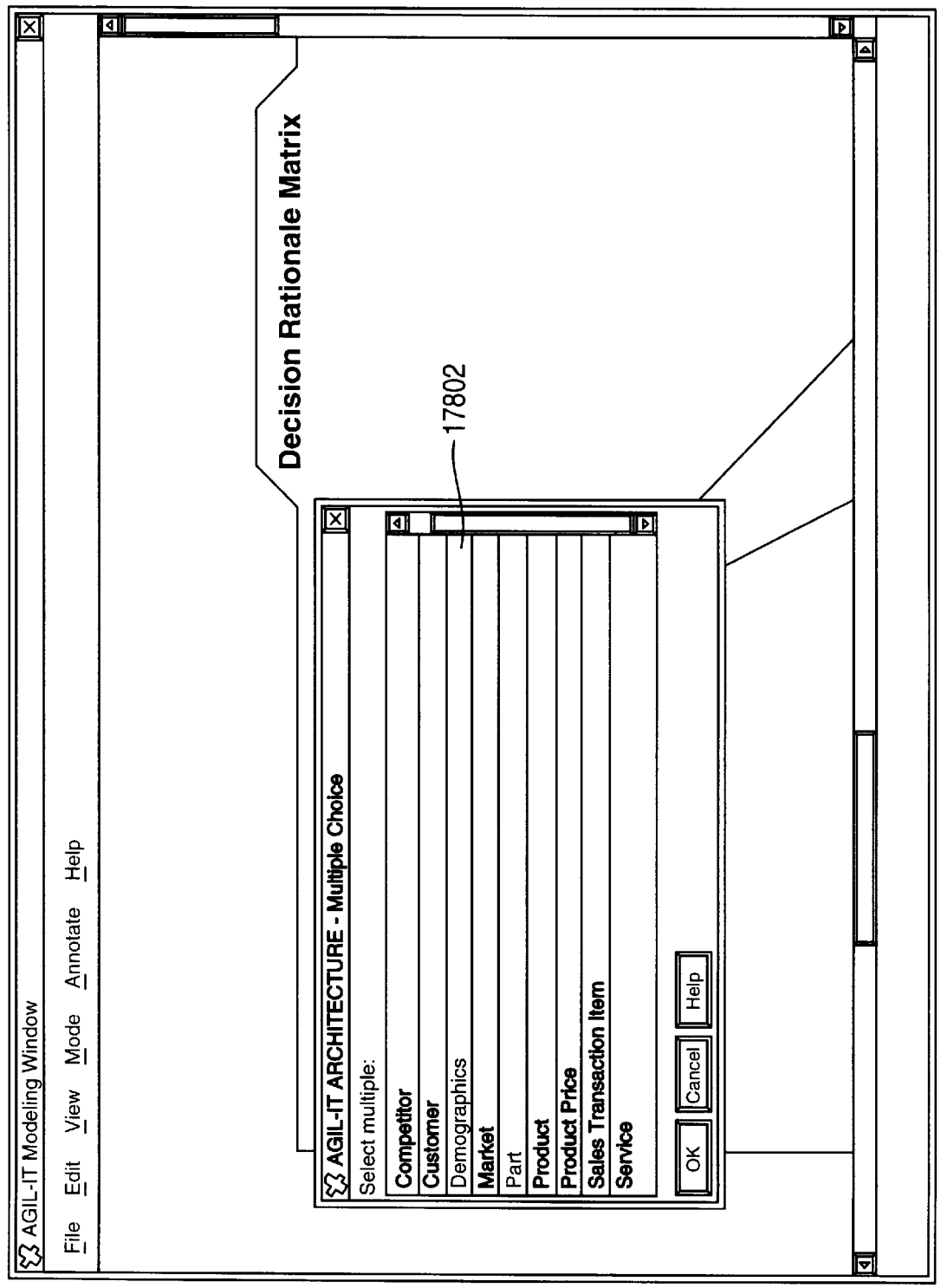

Referring to FIG. 178, there is shown a display on a computer screen illustrating information window 17802. As shown in FIG. 178, information window 17802 contains all data related objects (only seven of these objects are selected). Only data element objects are listed due to the Y-axis type specification (Data Element—(Business Application Elements)) as shown in FIG. 173, parameter field 17306. By selecting OK button, the process is led to FIG. 179.

Figure 179:
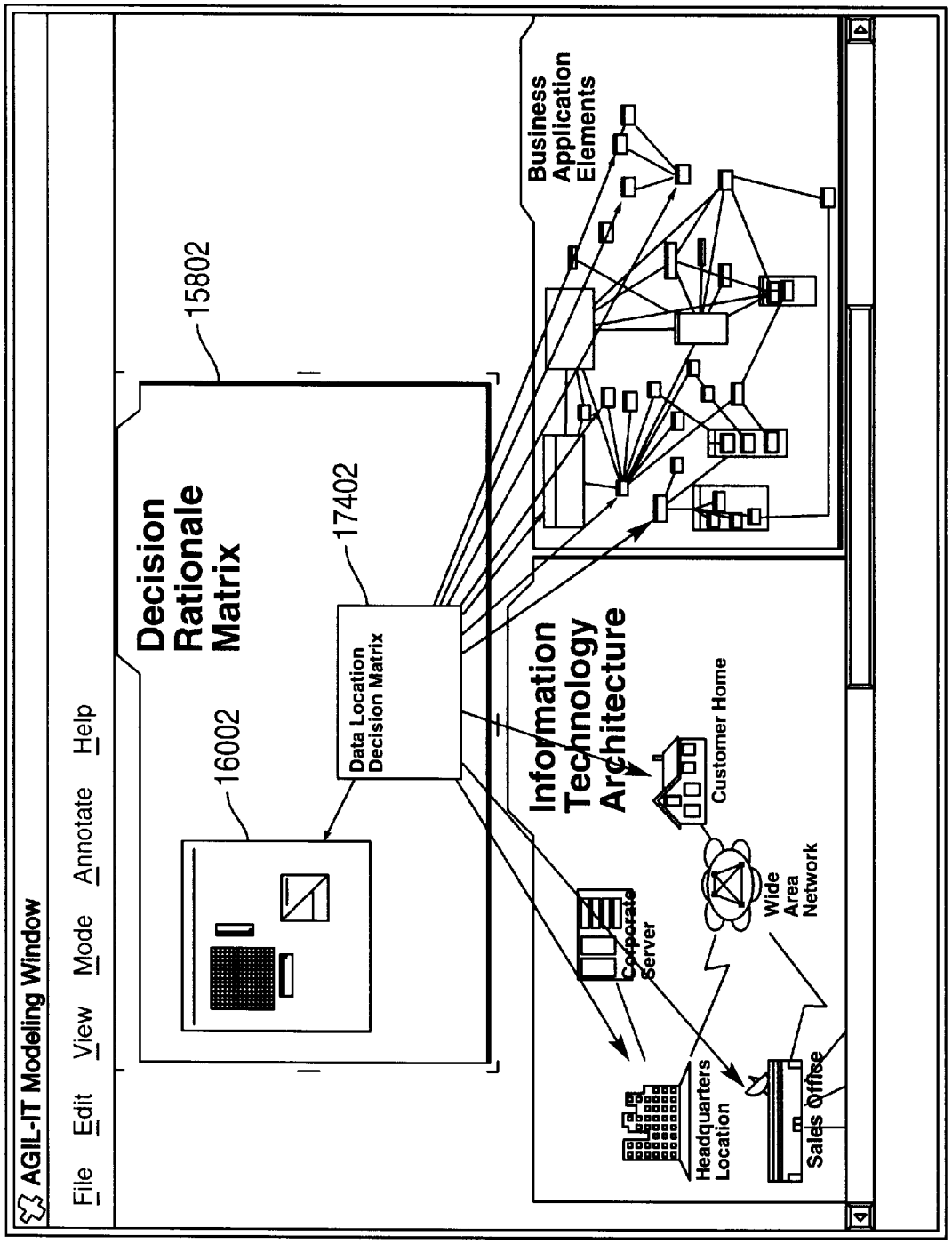

Referring to FIG. 179, there is shown a display on a computer screen illustrating the relationships established between the Data Location Decision Matrix (17402) object and the location and data related objects. As shown in FIG. 179, the data related objects are located in Business Application Elements sub-container, which itself is a container within the Information Technology Architecture container. Therefore, the two-dimensional table area setup is specified by the objects established within Locations to Data Matrix Setup object 16002 and the selection of location type and data element objects are specified via relationships established from the Data Location Decision Matrix object 17402. The Data Location Decision Matrix is now setup and can be activated for use. This leads to FIG. 180.

Figure 180:
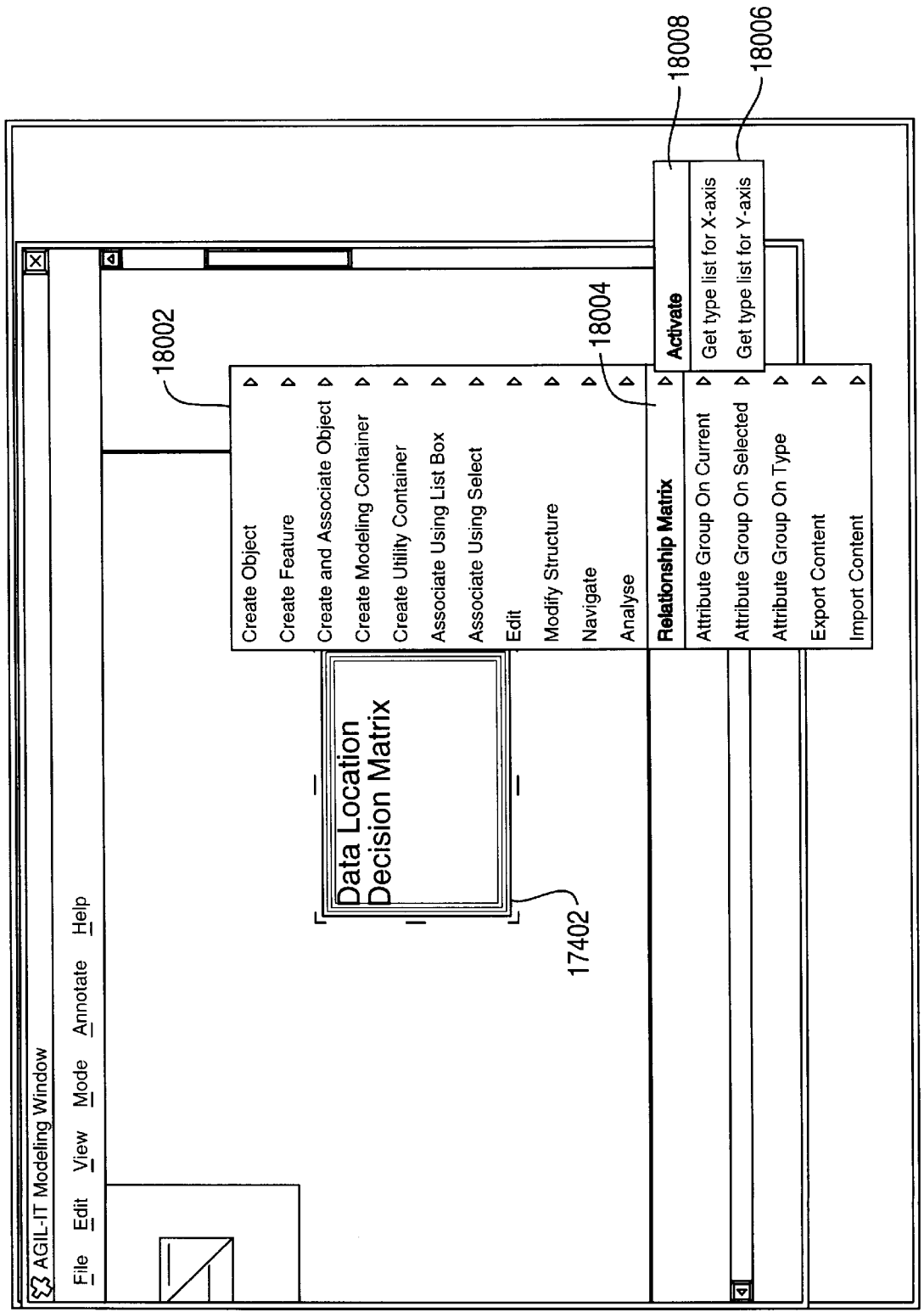

Referring to FIG. 180, there is shown a display on a computer screen illustrating visual interfaces 18002 and 18006. As shown in FIG. 180, visual interface 18002 is invoked by selecting and activating Data Location Decision Matrix object 17402, and visual interface 18006 is invoked by selecting and activating item 18004 (Relationship Matrix) in visual interface 18002. By selecting and activating item 18008 (Activate), the activation process is started in which the decision matrix area is graphically established as specified in the Locations to Decision Matrix Setup object 16002 and the Location Type and Data Element objects and any previously established relationships between these objects are also graphically and symbolically displayed as shown in FIG. 181.

Figure 181:
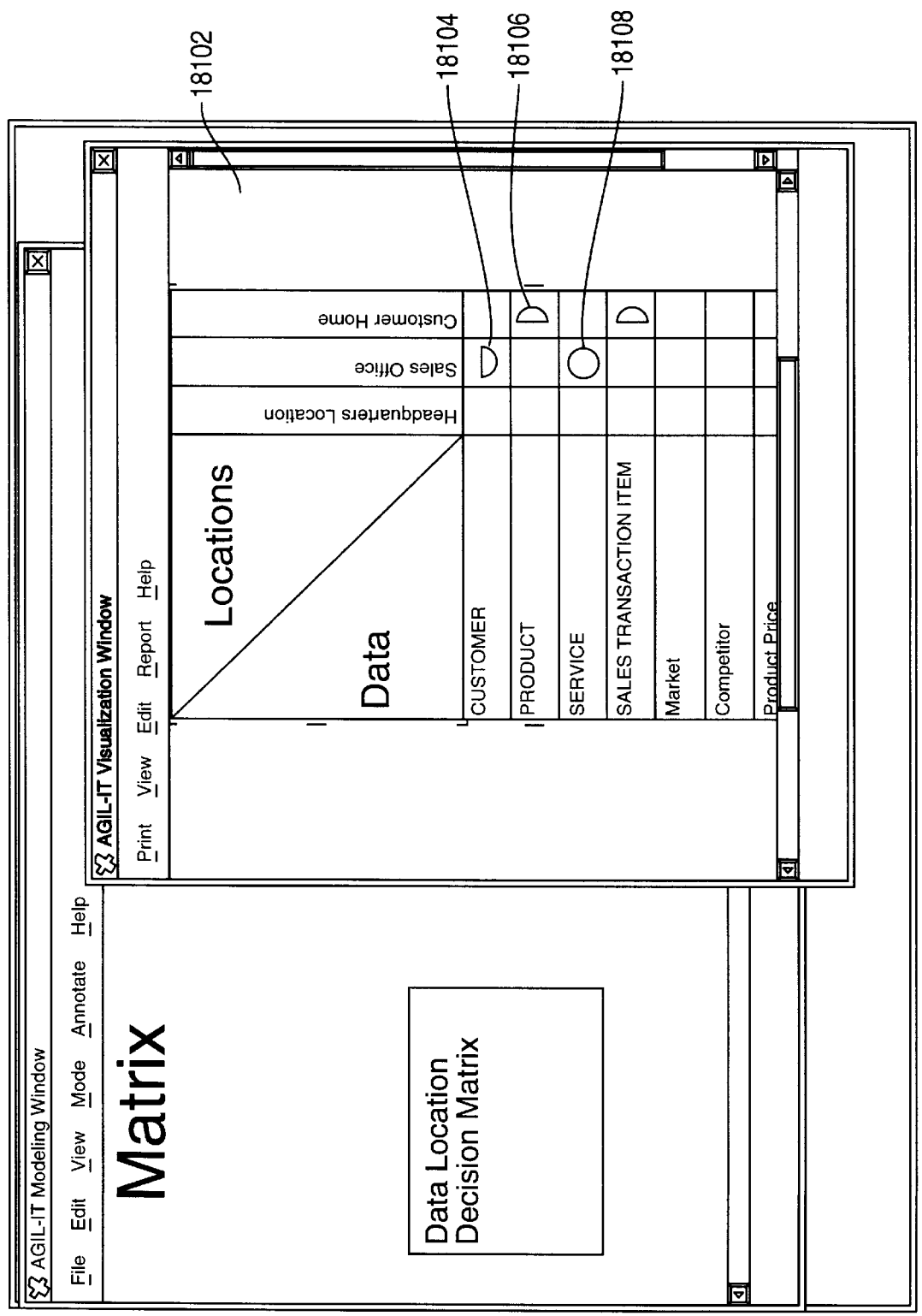

Referring to FIG. 181, there is shown a display on a computer screen illustrating the two dimensional table 18102. As shown in FIG. 181, the "X" or location dimension includes three location related objects: Headquarters Location, Sales Office, and Customer Home objects; the "Y" or data element dimension includes seven data related objects: Customer, Product, Service, Sales Transaction Item, Market, Competitor, and Product Price objects. In table 18102, the horizontal half circle 18104 at the intersection between Customer and Sales Office objects visually indicates there exits a horizontal data partition relationship between these two objects; the vertical half circle 18106 at the intersection between Product and Customer Home objects visually indicates there exits a vertical data partition relationship between these two objects; the full circle 18108 at the intersection between Service and Sales Office objects visually indicates there exists a full data partition relationship between these two objects.

FIGS. 182–195 illustrate the application of the symbol-based decision rationale table to provide further functionality to the user of an IT architecture visual model.

FIGS. 182–187 illustrate a process of establishing a relationship by using the symbol-based decision rationale table.

Figure 182:
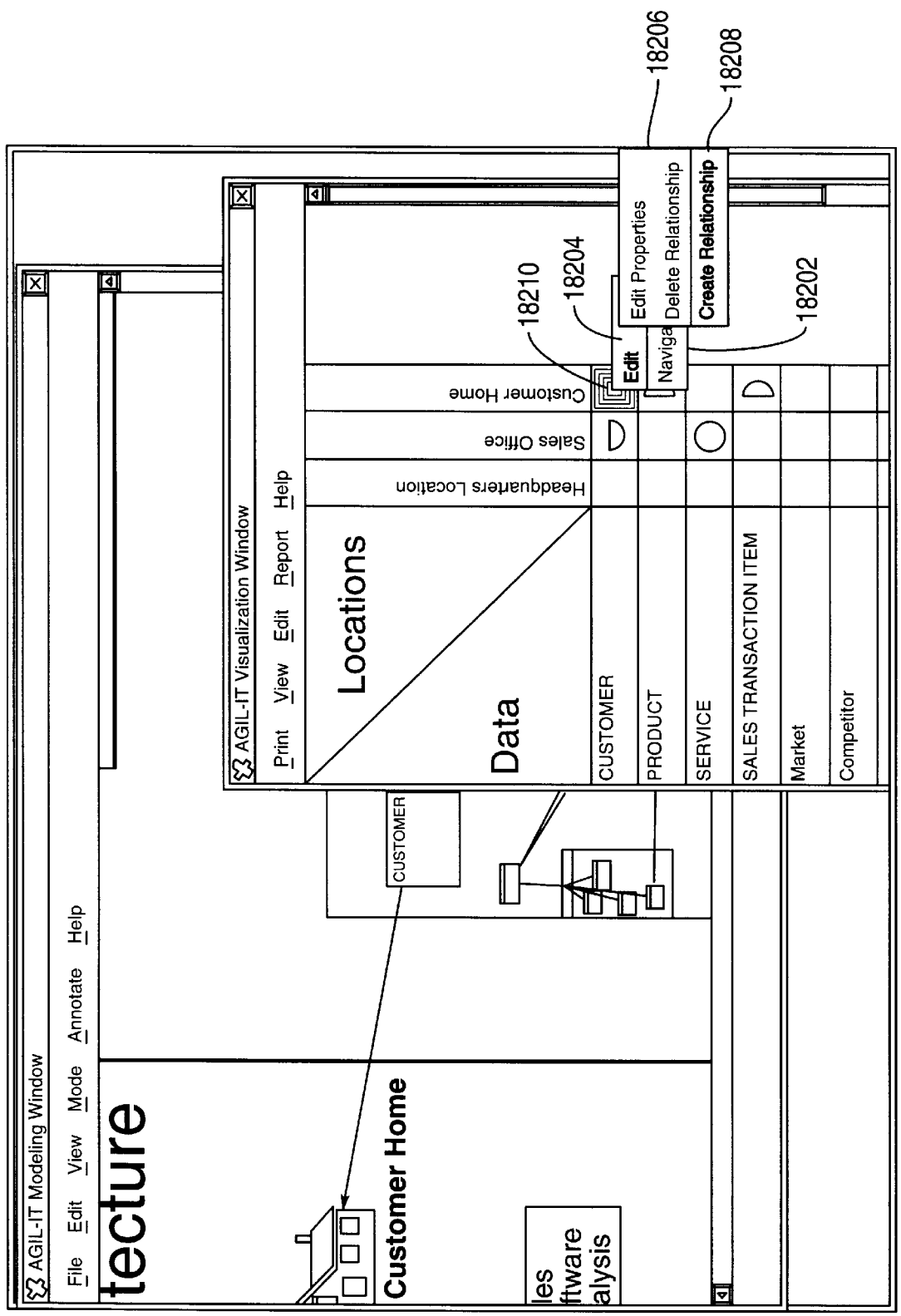

Referring to FIG. 182, there is shown a display on a computer screen illustrating visual interfaces 18202 and 18206. As shown in FIG. 182, visual interface 18202 is invoked by selecting and activating intersection 18210 (intersecting CUSTOMER and Customer Home), and visual interface 18206 is invoked by selecting and activating item 18204 (Edit) in visual interface 18202. By selecting and activating item 18208 (Create Relationship), the process is led to FIG. 183.

Figure 183:
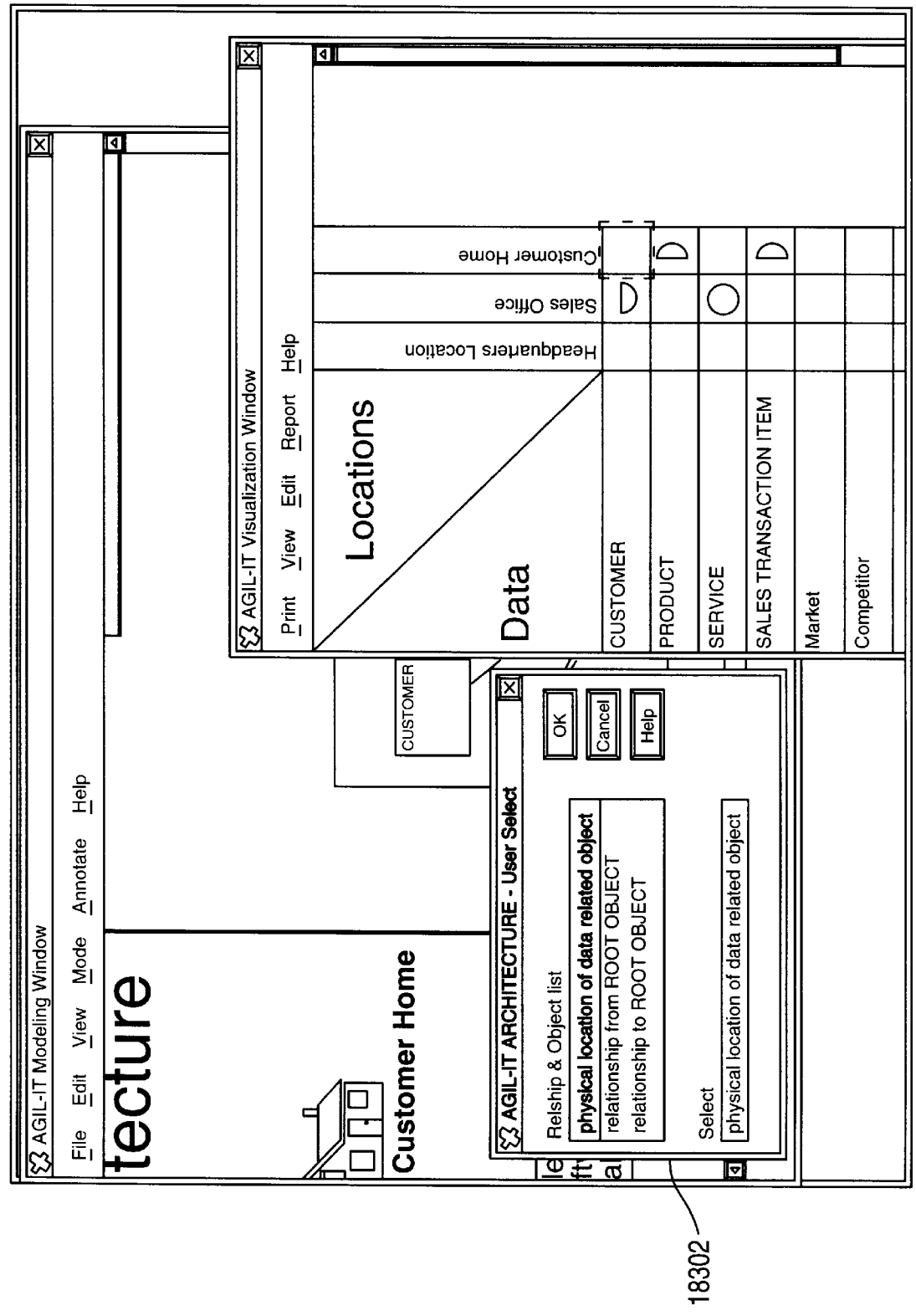

Referring to FIG. 183, there is shown a display on a computer screen illustrating information window 18302. The tool Agil-IT visual modeling tool will search the information which represents the IT architecture methodology (both within and across the sub-methodology software components shown in FIG. 4 to establish all possible relationships for selection between a Location Type object and a Data Element object. As shown within information window 18302 in FIG. 183, "physical location of data related object" is listed and selected. This relationship type "physical location of data related object" is found by searching the methodology and sub-methodology software components to locate all valid relationship types between the Location-Type and Data element object types. Selection of this relationship type indicates that the location type 'Customer Home' is a physical location of the 'CUSTOMER' data element. By clicking OK button, the process is led to FIG. 184.

Figure 184:
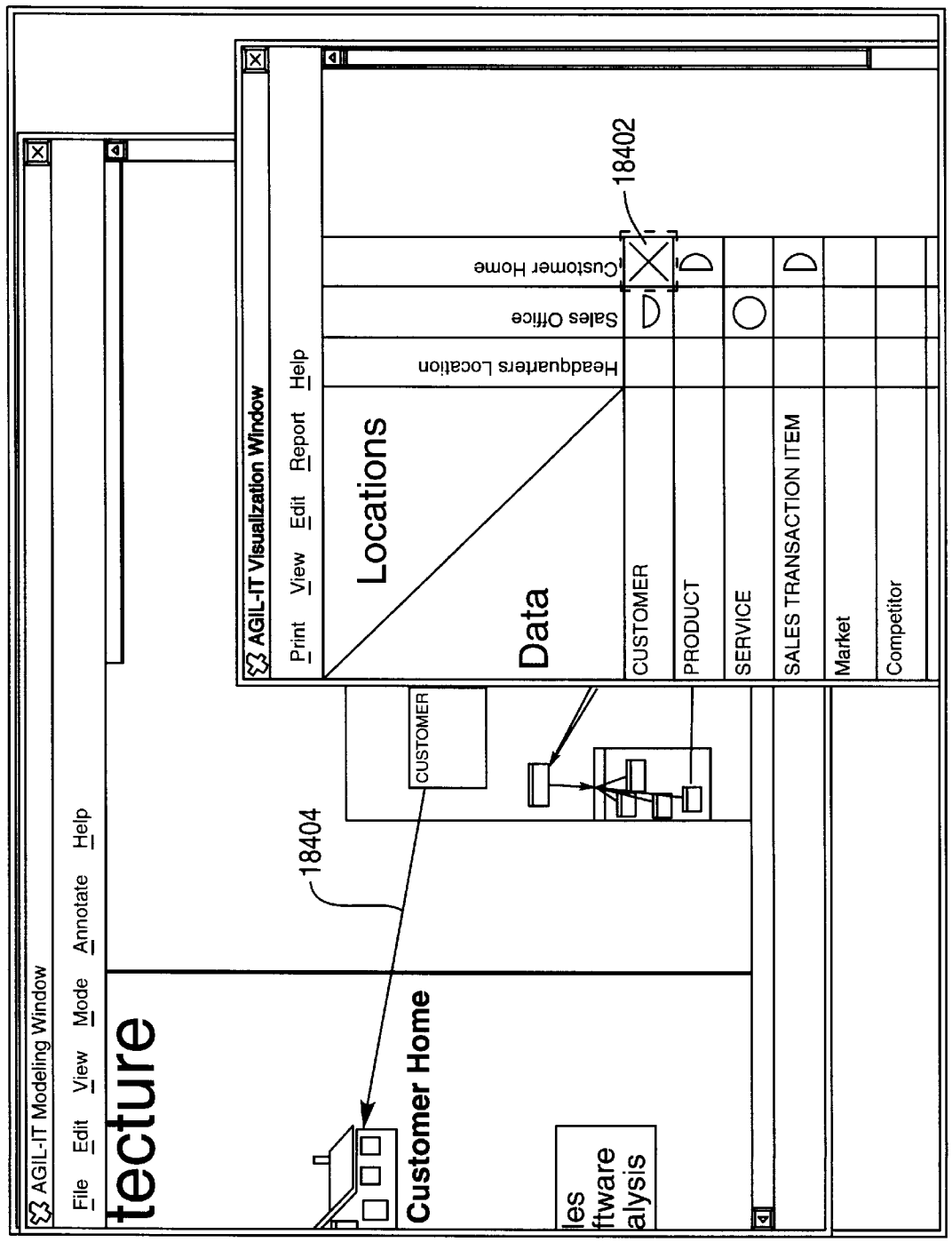

Referring to FIG. 184, there is shown a display on a computer screen illustrating that a new visual relationship is established between Customer and Customer Home objects by cross symbol 18402 and line symbol 18404.

Figure 185:
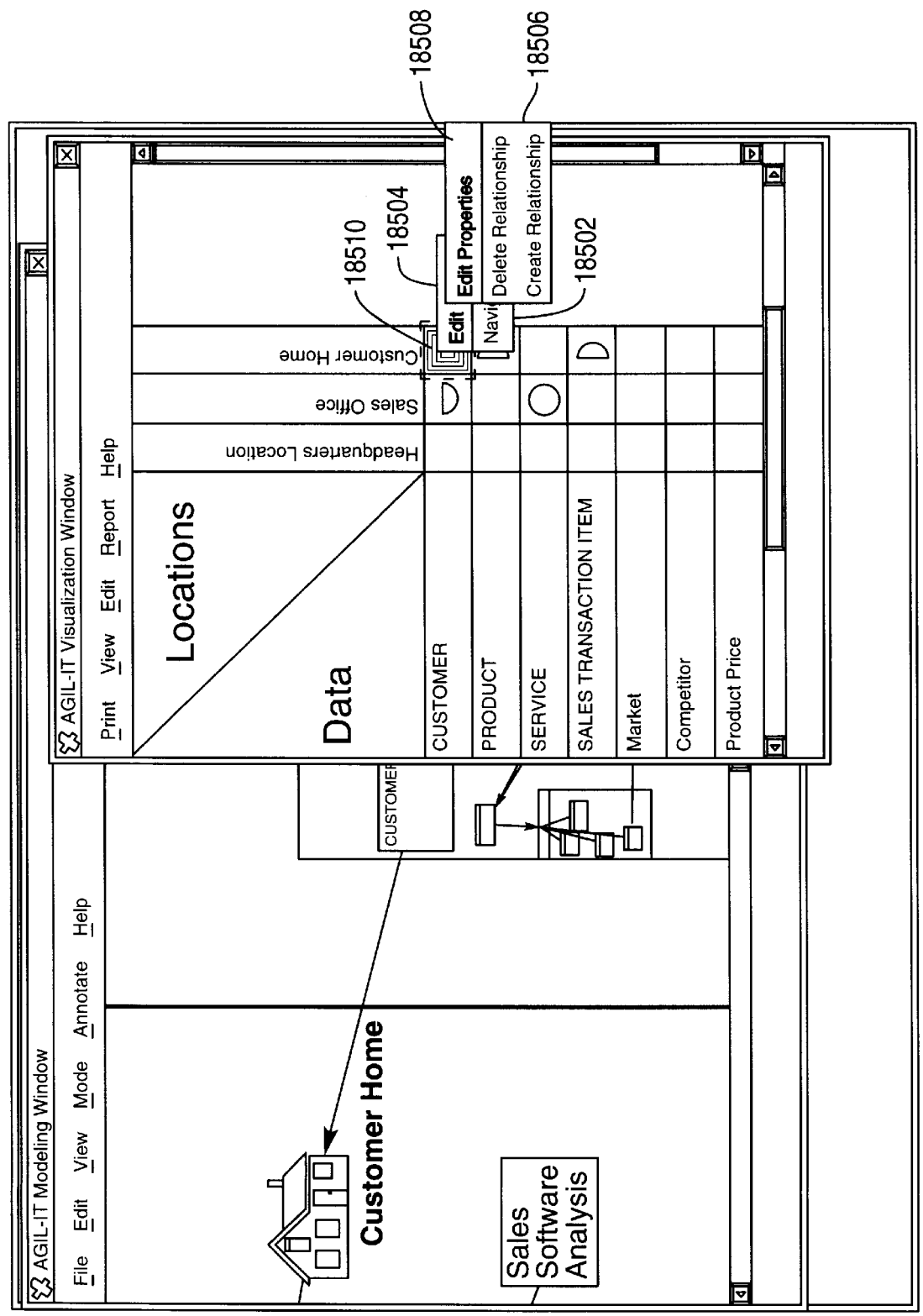

Referring to FIG. 185, there is shown a display on a computer screen illustrating visual interfaces 18502 and 18506. As shown in FIG. 185, visual interface 18502 is invoked by selecting and activating intersection 18510, and visual interface 18506 is invoked by selecting and activating item 18504 (Edit) in visual interface 18502. By selecting and activating item 18508 (Edit Properties), the process is led to FIG. 186.

Figure 186:
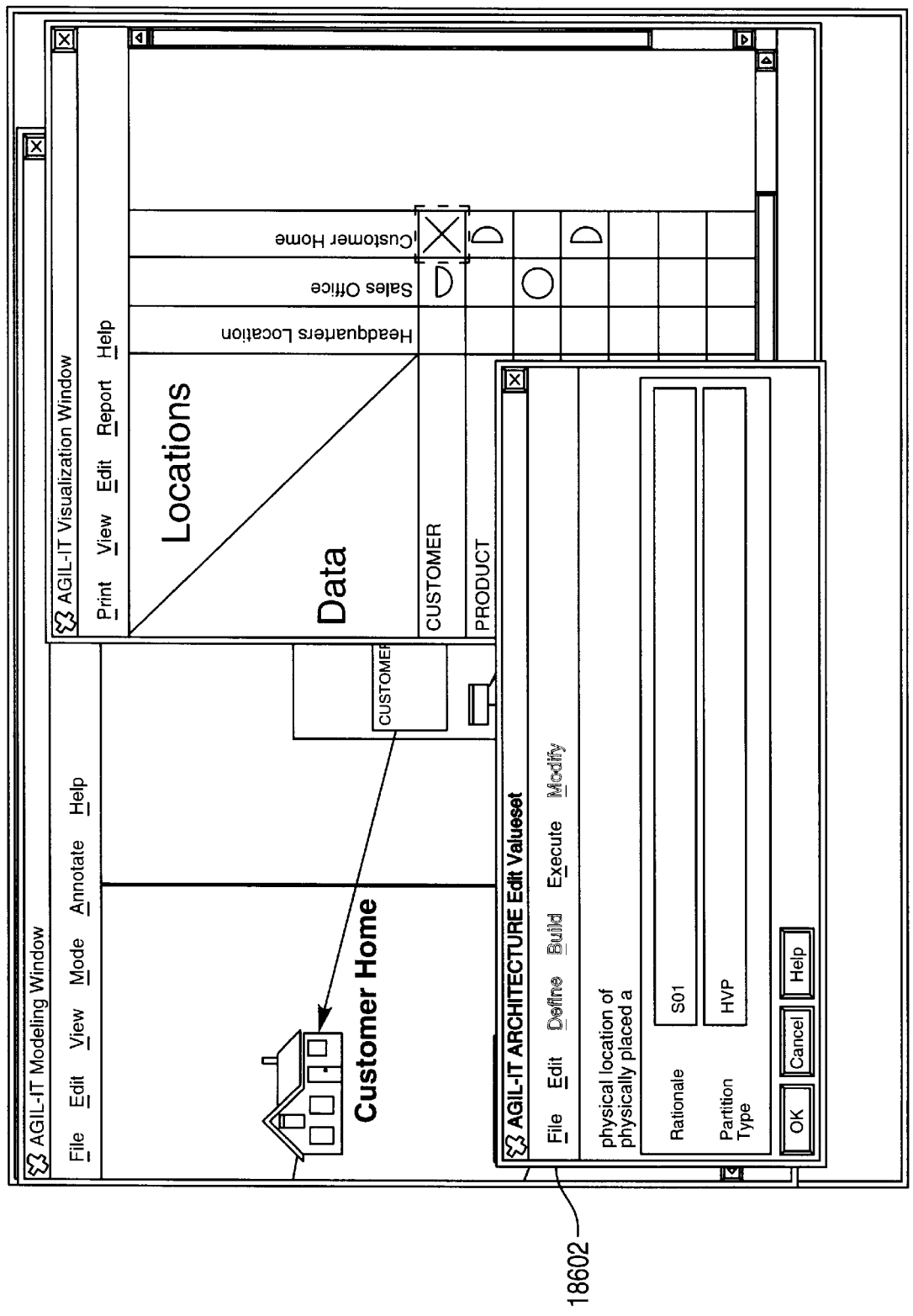

Referring to FIG. 186, there is shown a display on a computer screen, illustrating information window 18602 for entering parameters for the newly created object. As shown in FIG. 186, HVP (horizontal-vertical data partition) is entered for the parameter Partition Type. By clicking OK button, the process is led to FIG. 187.

Figure 187:
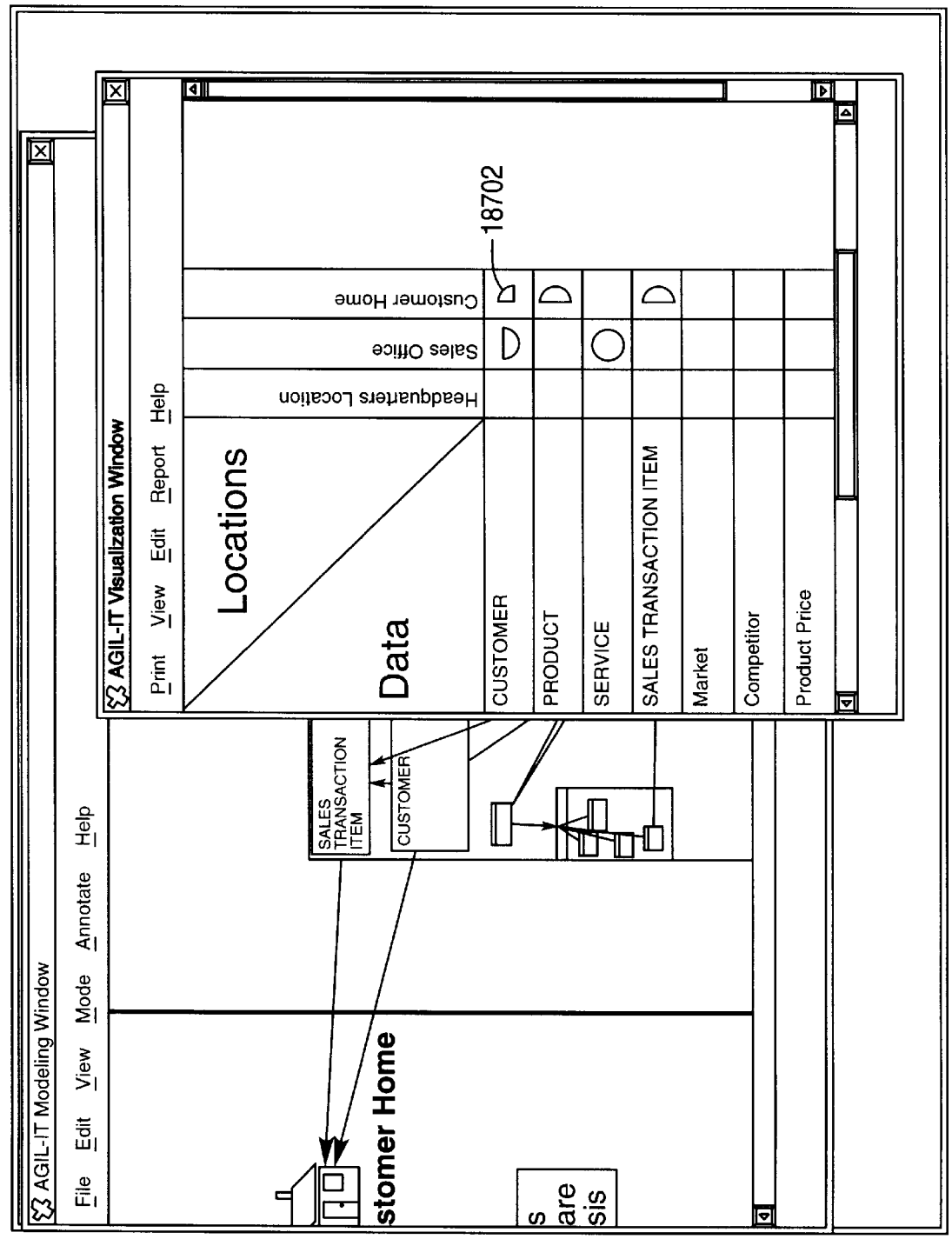

Referring to FIG. 187, there is shown a display on a computer screen, illustrating that a horizontal-vertical data partition relationship is established between Customer and Customer Home objects, as indicated by visual symbol 18702 of a quarter circle.

FIGS. 188–189 illustrate a process of deleting a relationship by using the symbol-based decision rationale table.

Referring to FIG. 188, there is shown a display on a computer screen illustrating visual interfaces 18802 and 18806. As shown in FIG. 188, visual interface 18802 is invoked by selecting and activating intersection 18810, and visual interface 18806 is invoked by selecting and activating item 18804 (Edit) in visual interface 18802. By clicking on the Delete Relationship operation 18808 in visual interface 18806, relationship line 18804 will be deleted as shown in FIG. 189.

Referring to FIG. 189, there is shown a display on a computer screen illustrating that relationship 18404 (as shown in FIG. 188) between Customer and Customer Home objects is deleted and the quarter circle visual symbol at the intersection between CUSTOMER and Customer Home is also deleted.

FIGS. 190–193 illustrate a process of navigating a relationship or an object by using the symbol-based decision rationale table.

Figure 190:
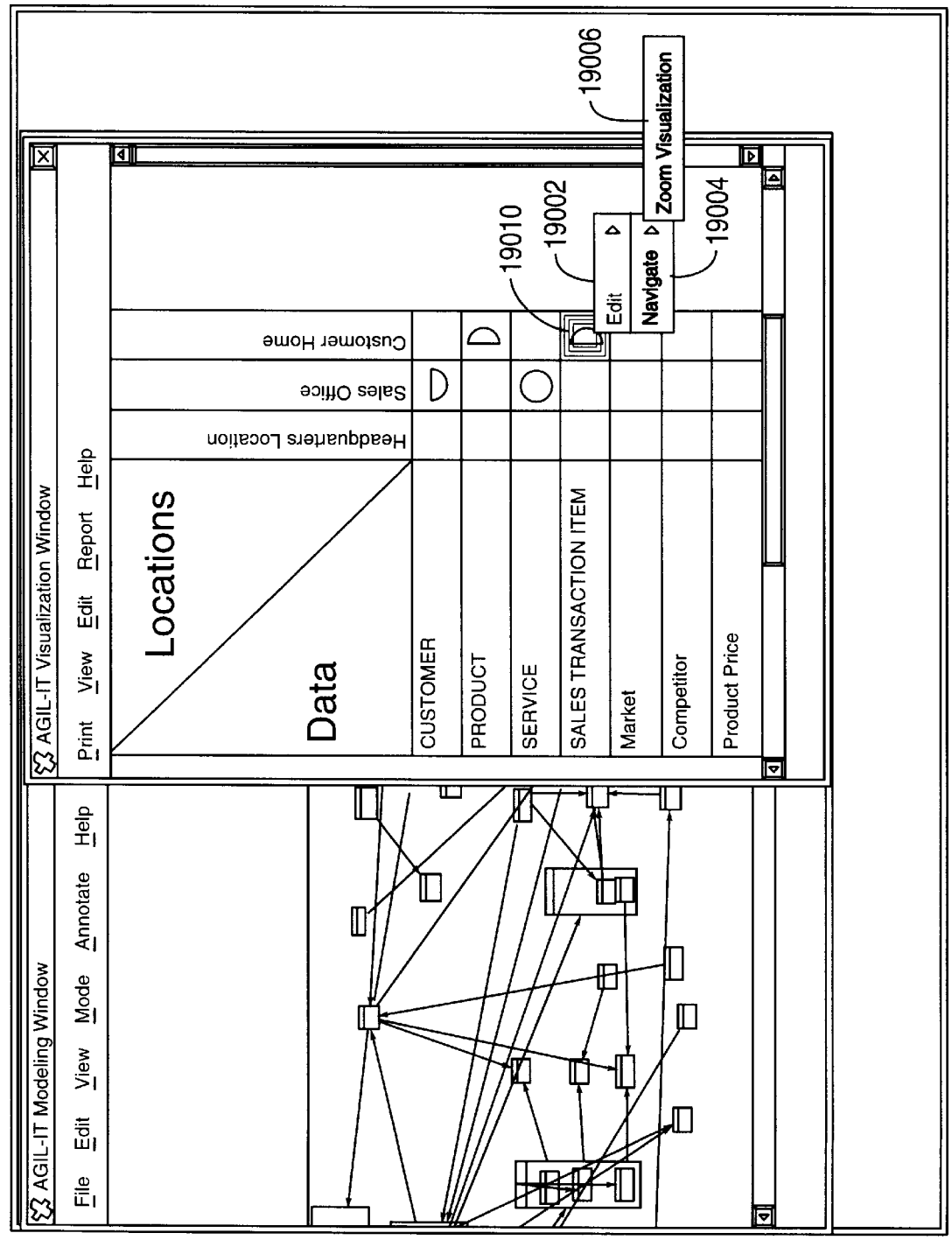

Referring to FIG. 190, there is shown a display on a computer screen illustrating visual interfaces 19002 and 19006. As shown in FIG. 190, visual interface 19002 is invoked by selecting and activating intersection 19010 (intersecting objects SALES TRANSACTION ITEM and Customer Home), and visual interface 19006 is invoked by selecting and activating item 19004 (Navigate) in visual interface 19002. By activating and selecting visual interface 19006 (Zoom Visualization), the process is led to FIG. 191.

Figure 191:
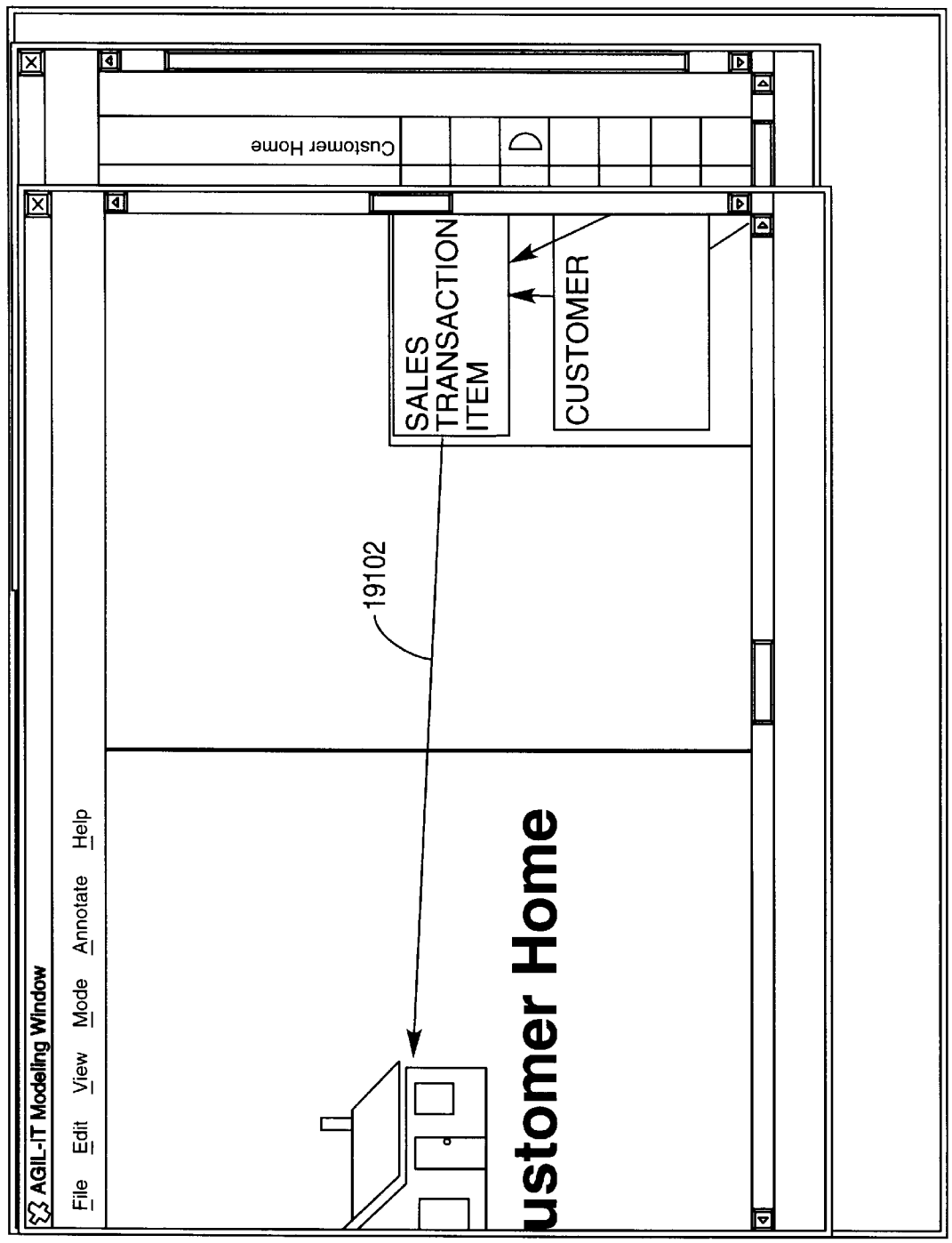

Referring to FIG. 191, there is shown a display on a computer screen illustrating that the visual symbol 19102 for the relationship between the Sales Transaction Item and Customer Home objects is located in response to the selection (Zoom Visualization) in FIG. 190.

Figure 192:
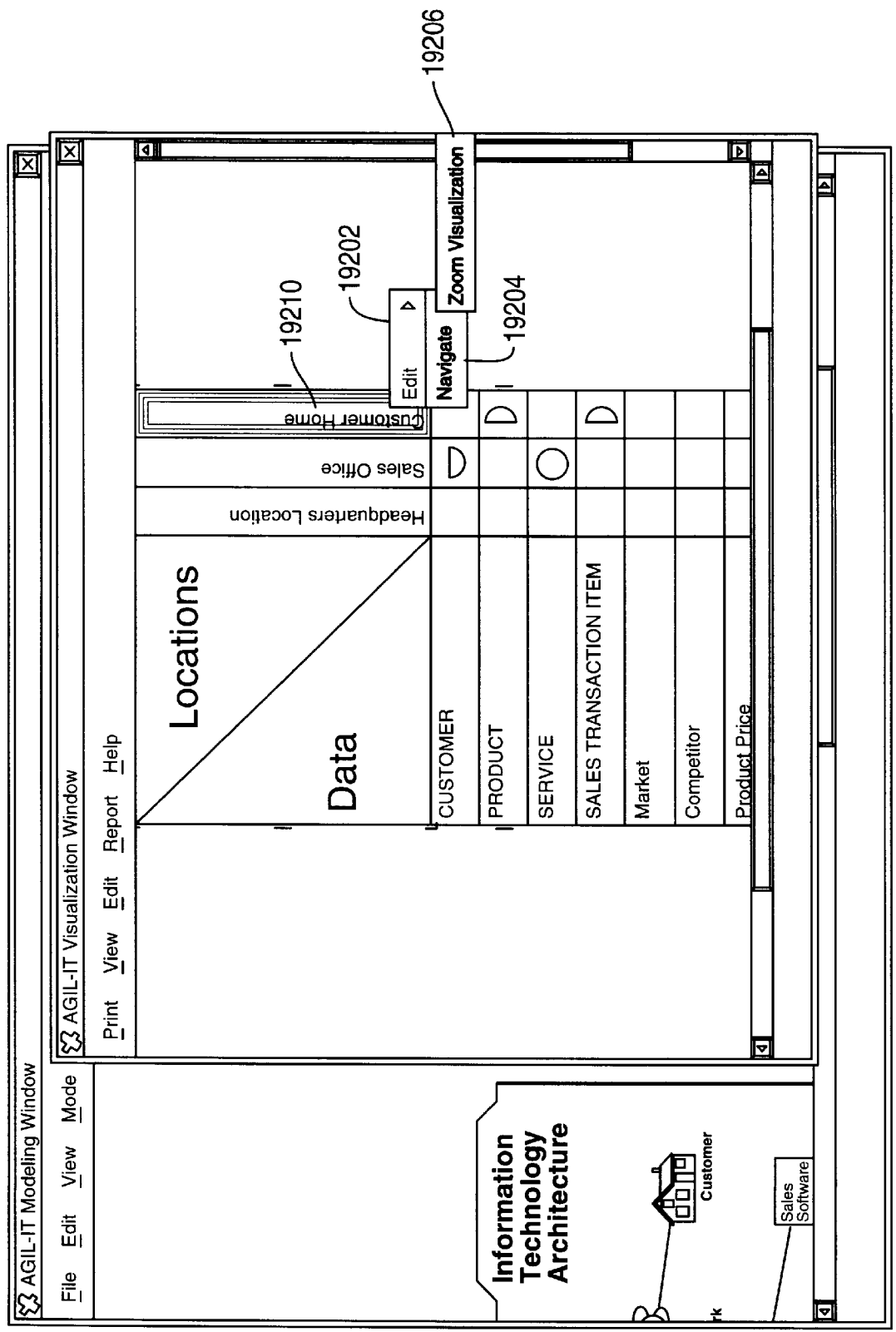

Referring to FIG. 192, there is shown a display on a computer screen illustrating visual interfaces 19202 and 19206. As shown in FIG. 192, visual interface 19202 is invoked by selecting and activating Customer Home 19210 in the X-AREA of the two dimension table, and visual interface 19206 is invoked by selecting and activating item 19204 (Navigate) in visual interface 19202. By selecting and activating visual interface 19206 (Zoom Visualization), the process is led to FIG. 193.

Figure 193:
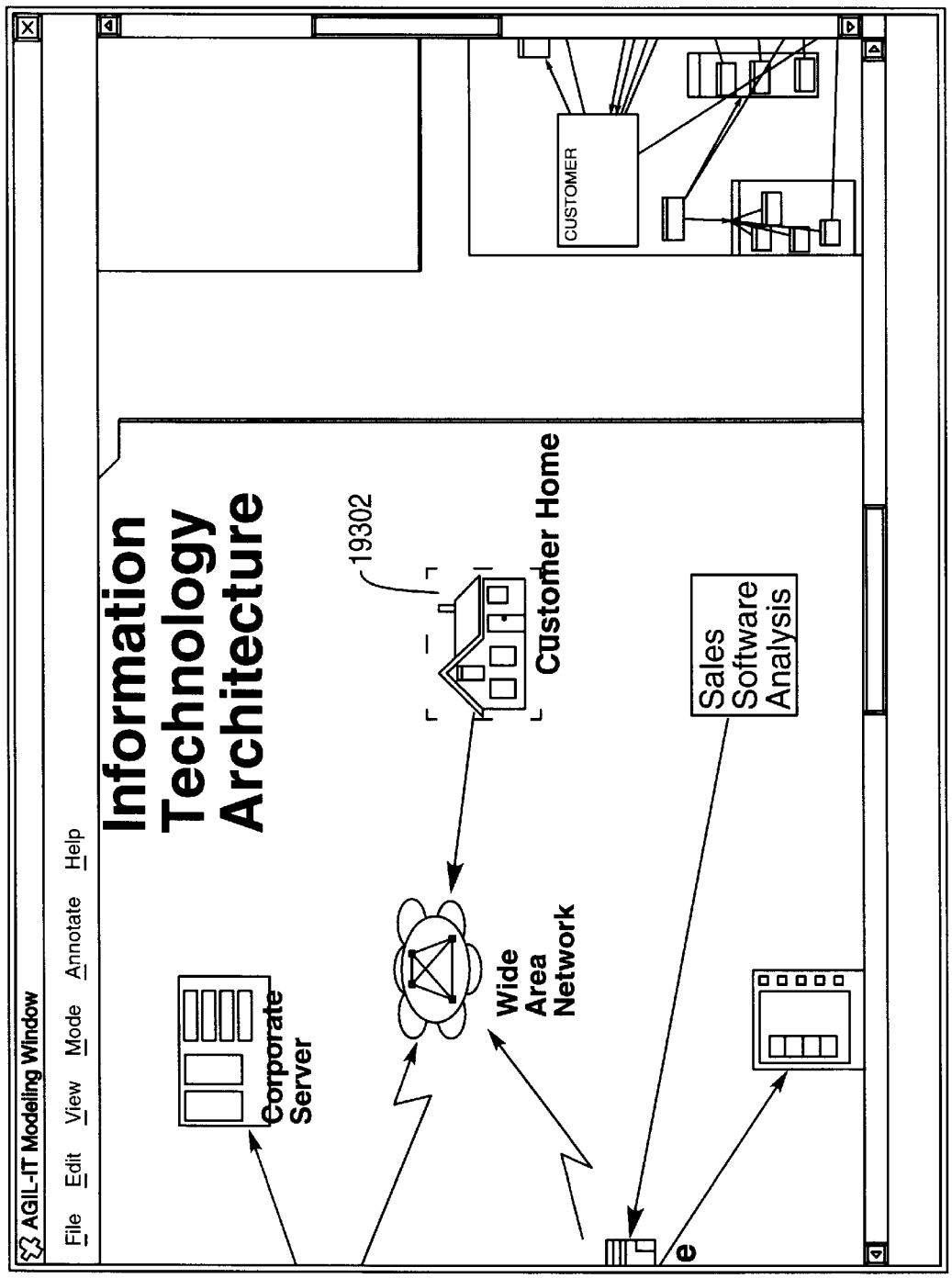

Referring to FIG. 193, there is shown a display on a computer screen illustrating that the visual symbol 19302 for the Customer Home object is located in response to the selection in FIG. 192 (19206—Zoom Visualization).

FIGS. 194–195 illustrate a process of displaying or updating the properties for a relationship or an object by using the symbol-based decision rationale table.

Referring to FIG. 194, there is shown a display on a computer screen illustrating visual interfaces 19402 and 19406. As shown in FIG. 194, visual interface 19402 is invoked by selecting and activating Customer Home 19410 in the X-AREA of the two dimension table, and visual interface 19406 is invoked by selecting and activating item 19404 (Edit) in visual interface 19402. By selecting and activating visual interface 19406 (Edit Properties), the process is led to FIG. 195.

Referring to FIG. 195, there is shown a display on a computer screen illustrating that information window 19502 containing descriptions for the Customer Home (LOCATION_TYPE) object. If necessary, the descriptions can be updated and the same functionality works as well for objects listed in the Y-AREA axis of the decision rationale table.

FIGS. 196–201 illustrate a process of creating, configuring, and using a general visual modeling technique to readily locate and navigate a configuration of objects contained within an IT architecture visual model.

Figure 196:
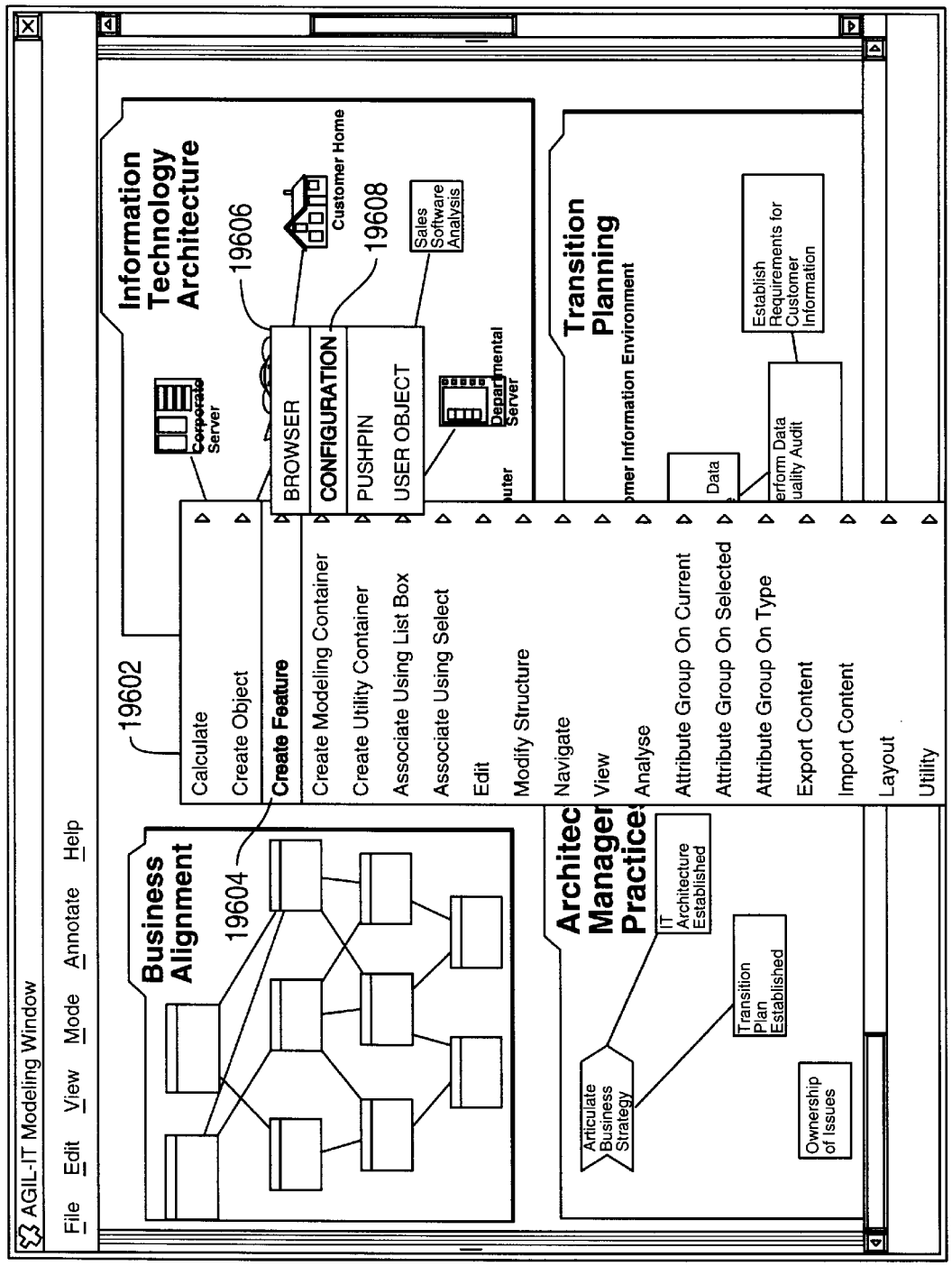

Referring to FIG. 196, there is shown a display on a computer screen illustrating visual interfaces 19602 and 19606. As shown in FIG. 196, visual interface 19602 is invoked by selecting and activating an area outside the four containers shown and visual interface 19606 is invoked by selecting and activating item 19604 (Create Feature) in visual interface 19602. The visual interface (19604) Create Feature operation is an example of the functionality provided by the Applied Utility Function sub-methodology and software components found in FIG. 1 (110) and FIG. 4 (410) respectively. By selecting item 19608 (CONFIGURATION) in visual interface 19606, the process is led to FIG. 197.

Figure 197:
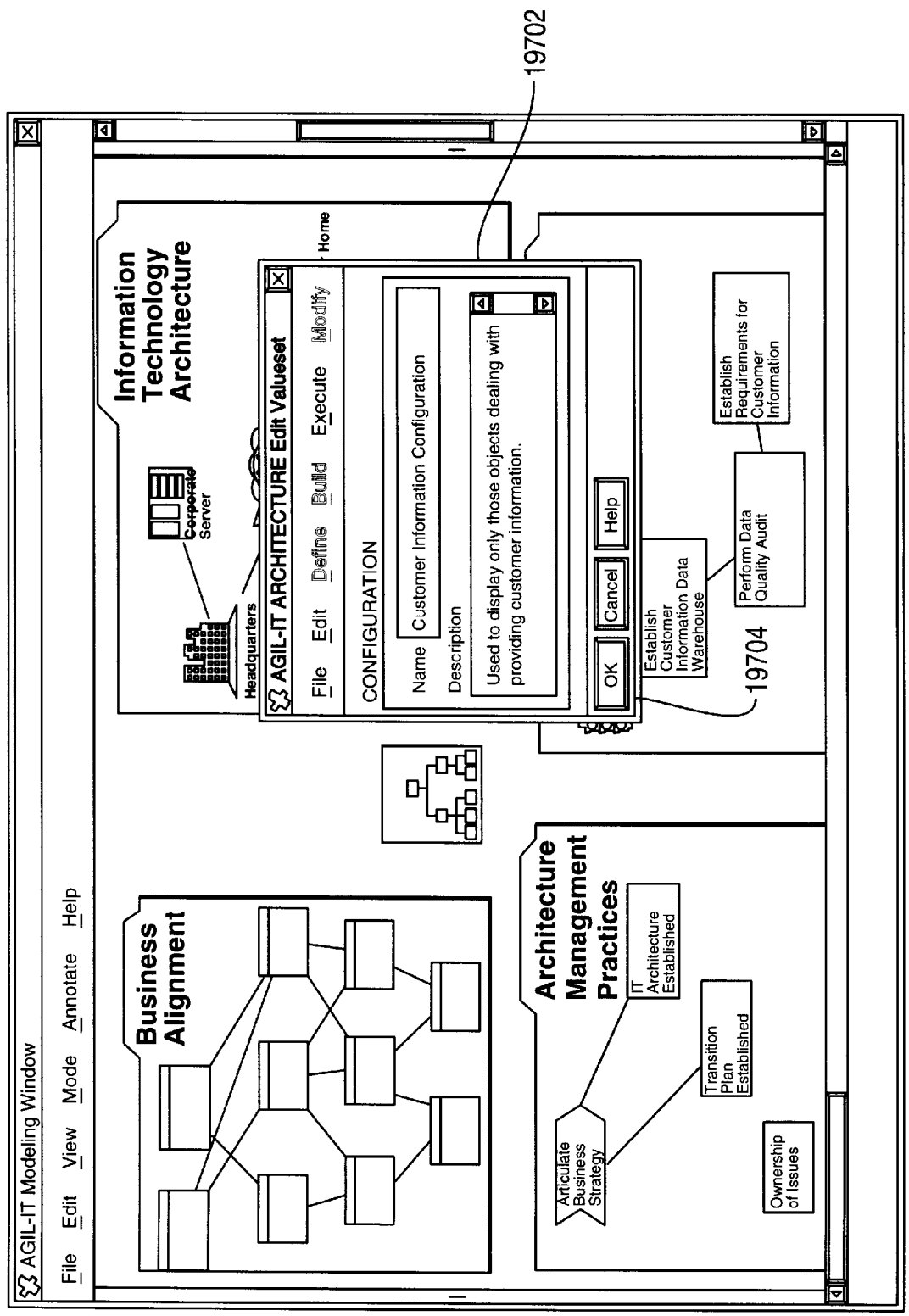

Referring to FIG. 197, there is shown a display on a computer screen illustrating information window 19702 containing descriptions for the newly created 'configuration' object. As shown in information window 19702 in FIG. 197, the created object is a configuration type utility object. By clicking OK button (19704), the process is led to FIG. 198.

Figure 198:
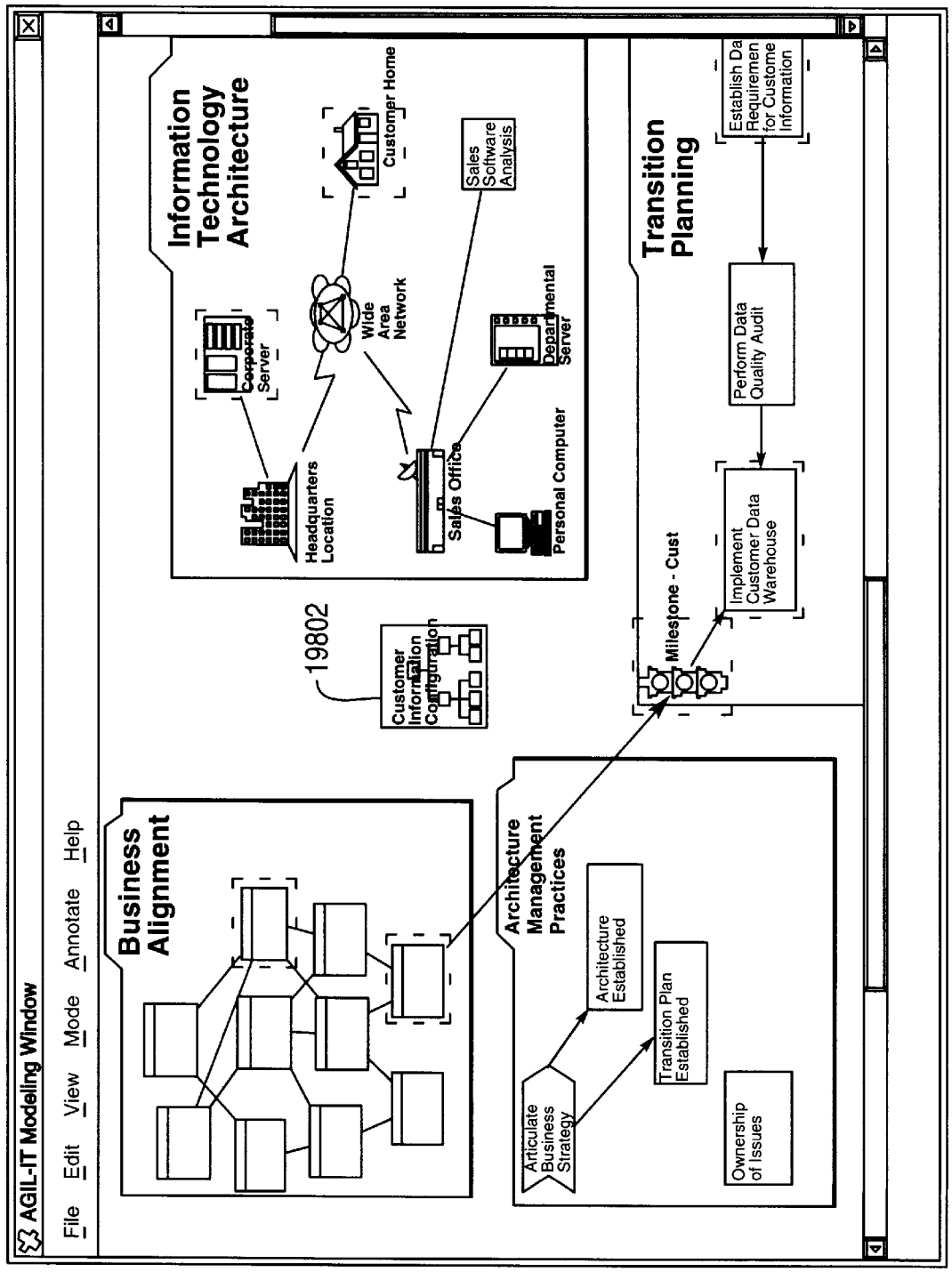

Referring to FIG. 198, there is shown a display on a computer screen illustrating that a new object entitled Customer Information Configuration (19802) is established. Also note that there are seven objects selected (two objects in Business Alignment container, two objects in Information Technology Architecture container, and three objects in Transition Planning container) as illustrated by the dotted lines encircling these selected objects. These selected objects will be related to the newly created configuration utility object as illustrated in FIG. 199.

Figure 199:
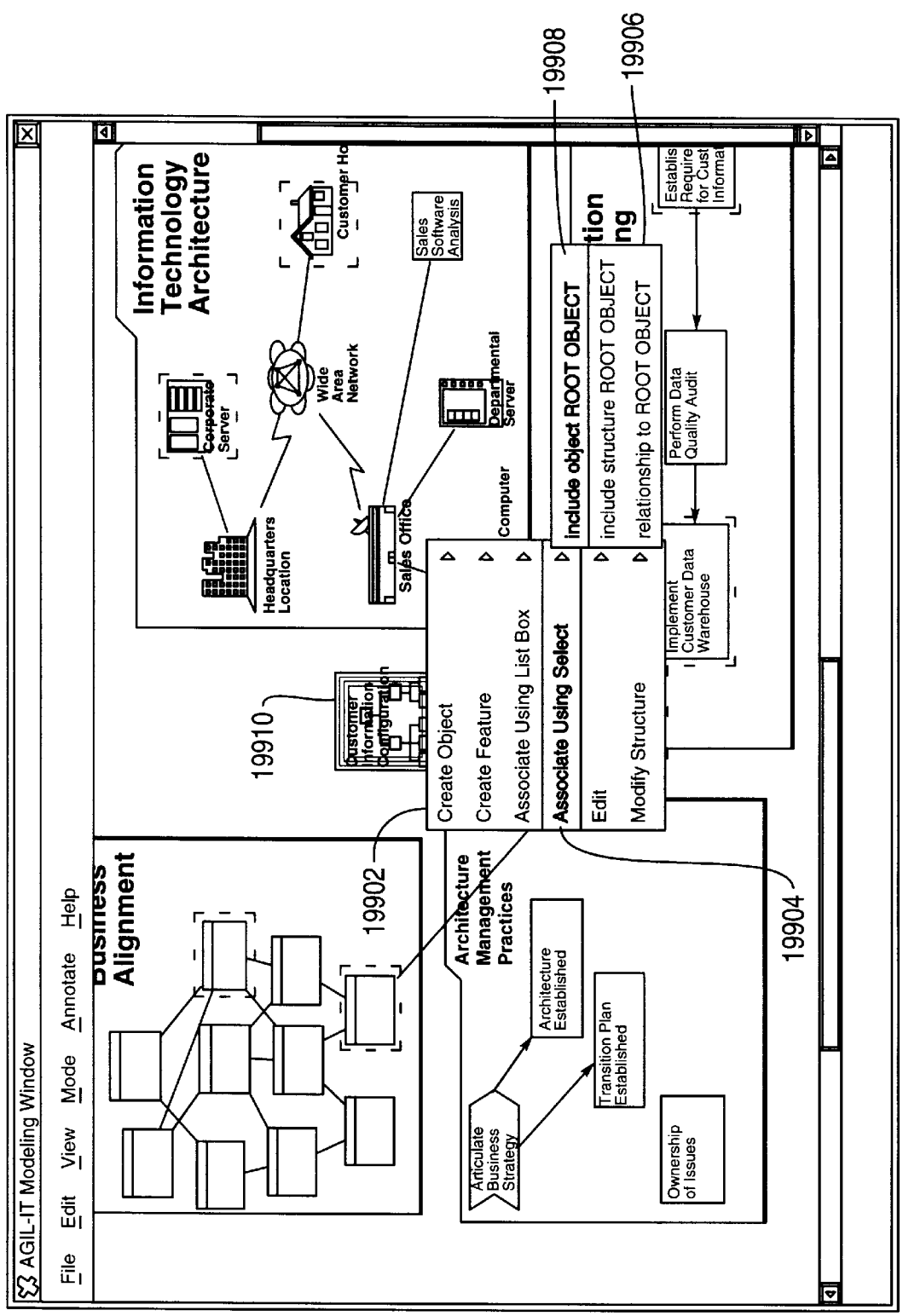

Referring to FIG. 199, there is shown a display on a computer screen illustrating visual interfaces 19902 and 19906. As shown in FIG. 199, visual interface 19902 is invoked by selecting and activating object 19910, and visual interface 19906 is invoked by selecting and activating item 19904 (Associate Using Select) in visual interface 19902. By selecting and activating item 19908 (include object ROOT OBJECT) to relate object 19910 to the selected objects encircled by dotted lines, the process is led to FIG. 200.

Referring to FIG. 200, there is shown a display on a computer screen, illustrating that dotted relationship line symbols have been established between object 19910 and the seven selected objects encircled by dotted lines. By clicking on the configuration object 19910 in FIG. 200, the process is led to FIG. 201.

Referring to FIG. 201, there is shown a display on a computer screen, illustrating that all objects present in the architecture visual model have been hidden except for the seven objects that have been related to object 19910 as shown in FIG. 200. Object 19910 therefore is used to display only those objects in the architecture visual model that are related to the configuration of interest within the visual model.

It should be noted that, in the symbol-based decision rationale table, because the symbols found at the intersections of two objects within the table symbolically represent the parameter values of the relationship represented by said intersection, a rationale table can convey very detailed information regarding how or in what manner for instance data is to be located at a particular location within the IT architecture. These 'symbolic values' (symbols used to represent differing parameter values of relationships) have a pre-defined meaning to the rationale table user. Additionally, rows and columns found in the table can have values as well. By adding numerical relationship parameter values across a row or down a column, the user can readily see the numerical impact of all relationships in said row or column.

The application of using a symbol-based decision rationale table containing data related to locations has the following benefits to the user of a data location table:

1. A symbol-based data location table user can see not only what data is distributed across an IT infrastructure but also can readily see how that data is distributed. Being able to see how data is distributed is key to making important IT infrastructure decisions regarding data volume, data flow, and data maintenance issues.
2. Specifically, looking across a 'row' of a table, the user can easily see the various types of data partitions required across locations for a specific data element found within the IT architecture. Looking down a 'column' of a table, a user can see what the types and characteristics of data being placed within a specific location support by the IT Infrastructure.

3. Finally, multiple symbol-based data location tables can be used to show multiple characteristics of the same data elements located across the same IT infrastructure locations. For instance, a symbol-based data location table can be produced (as shown) to illustrate how specific data elements are partitioned across the IT infrastructure locations. A second symbol-based data location table can be used to illustrate how data flows across these locations. And a third symbol-based table can be used to illustrate the data synchronization requirements of the each data element across the different locations supported by the IT infrastructure. Taken together, these three 'views' of the data location table provides the user a complete symbolic and therefore easy to understand and apply representation of the data location characteristics within the IT infrastructure.

Referring to FIG. 202, there is shown a block diagram of a computer system 20200, which can be used as a user terminal to run the Agil-IT visual modeling tool.

As shown in FIG. 202, the computer system comprises a processing unit 20202, a memory device 20204, a hard disk 20206, a disk drive interface 20208, a display monitor 20210 (including a computer screen), a display interface 20212, a serial interface 20224, a mouse 20225, a keyboard 20226, and a system bus 20214.

Hard disk 20206 is coupled to disk drive interface 20208; display monitor 20210 is coupled to display interface 20212; and mouse 20225 and keyboard 20226 are coupled to serial interface 20224. Coupled to system bus 20214 are: processing unit 20202, memory device 20204, disk drive interface 20208, display interface 20212, and serial interface 20224.

Memory device 20204 is able to store programs (including program codes for Agil-IT visual modeling tool and the visual model results shown in item 6810 in FIG. 68B. Operating together with disk drive interface 20208, hard disk 20206 is also able to store programs. However, memory device 20204 has faster access speed than hard disk 20206, while hard disk 20206 has higher capacity than memory device 20204.

Operating together with display interface 20212, display monitor 20210 is able to provide visual interface between programs being executed and a user.

Operating together with serial interface 20224, mouse 20225 and keyboard 20226 are able to provide inputs to computer system 20200.

Processing unit 20202 has access to memory device 20204 and hard disk 20206; and is able to control operations of computer 20200 by executing programs stored in memory device 20204 or hard disk 20206. Processing unit 20202 is also able to control the transmissions of programs and data between memory device 20204 and hard disk 20206.

While the invention has been illustrated and described in detail in the drawing and foregoing description, it should be understood that the invention may be implemented through alternative embodiments within the sprit of the present invention. Thus, the scope of the invention is not intended to be limited to the illustration and description in this specification, but is to be defined by the appended claims.

What is claimed is:

1. A computer implemented method of building an architecture visual model to be used as a business strategy model, comprising:

creating a plurality of architectural visual components each having a container, each container including a plurality of objects, wherein the plurality of architectural visual components include a business alignment component, an information technology architecture component, a transition planning component and an architecture management component;

each of the objects being of a particular type, each type having operations associated therewith for intra-container relationships and inter-container relationships, each object being linked to at least another object in the same or another container and each object inheriting properties from linked objects depending upon the operations associated with the linked objects; and visually displaying at least a portion of the architectural visual model including visual objects and linkages wherein the architectural visual model is to be used as a business strategy model.

2. The method of claim 1, wherein the type of objects in the business alignment container can include a business question type, a business requirement type, a CSF type environmental factor type, a goal type, an objective type, a strategy type, a success factor type, and a vision type.

3. The method of claim 2, wherein the operations for each object for the business alignment container can include a create object operation, a create feature operation, a create and associate object operation, a create modeling container operation, a create utility container operation, an associate using list box operation, an associate using select operation, an edit operation, a modify structure operation, a navigate operation, an analyse operation, an attribute group on current operation, an attribute group on selected operation, attribute group on type operation, an export content operation, an import content operation and a utility operation.

4. The method of claim 3, wherein the objective type objects can be intra-container linked to the strategy type object, the business question type object, the environmental factor type object and the goal type object.

5. The method of claim 1, wherein the type of objects in the information technology architecture container can include a business s/w sub-model type, a conceptual network type, a conceptual network type, a functional technology layer type, an IT-system type, and a location type.

6. The method of claim 5, wherein the operations for each object in the information technology architecture can include a create object operation, a create feature operation, a create modeling container operation, a create utility container operation, an associate using list box operation, an associate using select operation, an edit operation, a modify structure operation, a navigate operation, a view operation, an analyse operation, an attribute group on current operation, an attribute group on selected operation, an attribute group on type operation, an export content operation, an import content operation and a layout operation.

7. The method of claim 6, wherein the wide-area network type object can be linked to the IT-system type object, the conceptual network type object and the location type object.

8. The method of claim 1, wherein the types of objects in the transition planning container include a transition milestone type and a transition planning initiative type.

9. The method of claim 8, wherein the operations for each object in the transition planning container include a transition planning initiative.

10. The method of claim 1, wherein the type of objects in the architecture management container includes an AMP issue/barrier, an AMP milestone, an AMP process and an AMP rationale.

11. The method of claim 10, wherein the operations for each object for the architecture management container include a create object type, a create feature type, a decompose object type, a create and associate object type, a create modeling container type, a create utility container type, an associate using list box type, an associate using select type, an edit type, a modify structure type, a navigate type, a view type, an analyse type, an attribute group on current type, an attribute group on selected type, an attribute group on type, an export content type, an import content type and a layout type.

12. The method of claim 1, wherein each of the linkages is weighted.

13. A computer implemented method of building an architecture visual model to be used as a business strategy model, comprising:

creating a business alignment container, an information technology container, a transition planning container and an architecture management container;

establishing a plurality of objects within each container, each object being of a particular type and having operations associated therewith for intra-container relationships and inter-container relationships, each object being linked to at least another object in the same or another container and each object inheriting properties from linked objects depending upon the operations associated with the linked objects and wherein the type of objects in the business alignment container can include a business question type, a business requirement type, a CSF type environmental factor type, a goal type, an objective type, a strategy type, a success factor type, and a vision type; and visually displaying at least a portion of the architectural visual model including visual objects and linkages wherein the architectural visual model is to be used as a business strategy model.

14. The method of claim 13, wherein the operations for each object for the business alignment container can include a create object operation, a create feature operation, a create and associate object operation, a create modeling container operation, a create utility container operation, an associate using list box operation, an associate using select operation, an edit operation, a modify structure operation, a navigate operation, an analyse operation, an attribute group on current operation, an attribute group on selected operation, attribute group on type operation, an export content operation, an import content operation and a utility operation.

15. The method of claim 14, wherein the objective type objects can be intra-container linked to the strategy type object, the business question type object, the environmental factor type object and the goal type object.

16. The method of claim 13, wherein the type of objects in the information technology architecture container can include a business s/w sub-model type, a conceptual network type, a conceptual network type, a functional technology layer type, an IT-system type, and a location type.

17. The method of claim 16, wherein the operations for each object in the information technology architecture can include a create object operation, a create feature operation, a create modeling container operation, a create utility container operation, an associate using list box operation, an associate using select operation, an edit operation, a modify structure operation, a navigate operation, a view operation, an analyse operation, an attribute group on current operation, an attribute group on selected operation, an attribute group on type operation, an export content operation, an import content operation and a layout operation.

18. The method of claim 17, wherein the wide-area network type object can be linked to the IT-system type object, the conceptual network type object and the location type object.

19. The method of claim 13, wherein the types of objects in the transition planning container include a transition milestone type and a transition planning initiative type.

20. The method of claim 19, wherein the operations for each object in the transition planning container include a transition planning initiative.

21. The method of claim 13, wherein the type of objects in the architecture management container includes an AMP issue/barrier, an AMP milestone, an AMP process and an AMP rationale.

22. The method of claim 21, wherein the operations for each object for the architecture management container include a create object type, a create feature type, a decompose object type, a create and associate object type, a create modeling container type, a create utility container type, an associate using list box type, an associate using select type, an edit type, a modify structure type, a navigate type, a view type, an analyse type, an attribute group on current type, an attribute group on selected type, an attribute group on type, an export content type, an import content type and a layout type.

23. The method of claim 13, wherein each of the linkages is weighted.

* * * * *